US012505284B2

(12) United States Patent
Dvorak et al.

(10) Patent No.: US 12,505,284 B2

(45) Date of Patent: Dec. 23, 2025

(54) METHODS AND SYSTEMS FOR BUCKETING VALUES IN SPREADSHEET FUNCTIONS

(71) Applicant: Adaptam Inc., Palo Alto, CA (US)

(72) Inventors: Robert E. Dvorak, Portola Valley, CA (US); Yuriy Garin, San Carlos, CA (US)

(73) Assignee: Adaptam Inc., Palo Alto, CA (US)

( * ) Notice: Subject to any disclaimer, the term of this patent is extended or adjusted under 35 U.S.C. 154(b) by 303 days.

(21) Appl. No.: 18/142,557

(22) Filed: May 2, 2023

(65) Prior Publication Data

US 2023/0367956 A1 Nov. 16, 2023

Related U.S. Application Data

(60) Provisional application No. 63/337,572, filed on May 2, 2022.

(51) Int. Cl.
*G06F 40/18* (2020.01)

(52) U.S. Cl.
CPC .................................... *G06F 40/18* (2020.01)

(58) Field of Classification Search
CPC ....................................................... G06F 40/18
See application file for complete search history.

(56) References Cited

U.S. PATENT DOCUMENTS

| | | | | |
|---|---|---|---|---|
| 7,774,302 | B2 * | 8/2010 | Arras | G06F 16/283 707/603 |
| 8,726,143 | B2 | 5/2014 | Simkhay et al. | |
| 9,886,474 | B2 * | 2/2018 | De Smet | G06F 16/244 |
| 10,545,953 | B2 * | 1/2020 | Becker | G06F 16/2379 |
| 10,579,724 | B2 * | 3/2020 | Campbell | G06T 11/60 |
| 11,709,993 | B2 * | 7/2023 | Duzak | G06F 40/157 715/212 |
| 11,720,596 | B2 * | 8/2023 | Nelmes | G06F 16/221 707/601 |
| 12,147,758 | B1 * | 11/2024 | Thomas | G06F 40/18 |
| 12,271,687 | B2 * | 4/2025 | Sarkar | G06F 16/287 |
| 2009/0210430 | A1 * | 8/2009 | Averbuch | G06F 16/283 |
| 2014/0019842 | A1 * | 1/2014 | Montagna | G06F 40/18 715/227 |
| 2015/0199328 | A1 | 7/2015 | Danziger et al. | |
| 2017/0315979 | A1 * | 11/2017 | Boucher | G06Q 10/101 |

(Continued)

OTHER PUBLICATIONS

Rahman et al., NOAH: interactive spreadsheet exploration with dynamic hierarchical overviews, VLDB Endowment, vol. 14, No. 6, issn 2150-8097, https://doi.org/10.14778/3447689.3447701, doi 10.14778/3447689.3447701, 14 pages, Feb. 2021 (Year: 2021).*

(Continued)

*Primary Examiner* — Barbara M Level

(74) *Attorney, Agent, or Firm* — HAYNES BEFFEL & WOLFELD LLP; Ernest J. Beffel, Jr.

(57) ABSTRACT

The disclosed technology creates new families of (pre-defined formula) spreadsheet functions which allow users to bucket values, supports use of those bucketing functions in other functions, and adds value bucketing capabilities as an option in existing spreadsheet functions. The technology disclosed can use as inputs either cell ranges or Non-Spreadsheet Cell (NSC) data formulas. The capability allows users to bucket numerical, text and time/date values.

33 Claims, 181 Drawing Sheets
(120 of 181 Drawing Sheet(s) Filed in Color)

(56) References Cited

U.S. PATENT DOCUMENTS

| | | | | |
|---|---|---|---|---|
| 2018/0150531 | A1* | 5/2018 | Demonsant | G06F 16/284 |
| 2018/0239748 | A1* | 8/2018 | Zhang | G06F 3/0482 |
| 2019/0251158 | A1* | 8/2019 | Toronto | G06F 40/18 |
| 2019/0340219 | A1 | 11/2019 | Schoedl | |
| 2020/0012656 | A1* | 1/2020 | Pugh | G06F 16/248 |

OTHER PUBLICATIONS

U.S. Appl. No. 16/031,339, filed Jul. 10, 2018, U.S. Pat. No. 11,182,548, Nov. 23, 2021, Issued.

U.S. Appl. No. 16/031,379, filed Jul. 10, 2018, U.S. Pat. No. 11,354,494, Jun. 7, 2022, Issued.

U.S. Appl. No. 16/031,759, filed Jul. 10, 2018, U.S. Pat. No. 11,017,165, May 25, 2021, Issued.

U.S. Appl. No. 16/191,402, filed Nov. 14, 2018, U.S. Pat. No. 11,036,929, Jun. 15, 2021, Issued.

U.S. Appl. No. 17/359,430, filed Jun. 25, 2021, U.S. Pat. No. 11,836,444, Dec. 5, 2023, Issued.

U.S. Appl. No. 17/359,418, filed Jun. 25, 2021, U.S. Pat. No. 11,657,217, May 23, 2023, Issued.

U.S. Appl. No. 17/384,404, filed Jul. 23, 2021, 20220027555, Jan. 27, 2022, Allowed.

U.S. Appl. No. 17/374,898, filed Jul. 13, 2021, U.S. Pat. No. 11,694,023, Jul. 4, 2023, Issued.

U.S. Appl. No. 17/374,901, filed Jul. 13, 2021, U.S. Pat. No. 11,972,204, Apr. 30, 2024, Issued.

U.S. Appl. No. 17/752,814, filed May 24, 2022, U.S. Pat. No. 11,977,835, May 7, 2024, Issued.

U.S. Appl. No. 17/903,934, filed Sep. 6, 2022, U.S. Pat. No. 12,050,859, Jul. 30, 2024, Issued.

U.S. Appl. No. 17/988,641, filed Nov. 16, 2022, 20230153518, May 18, 2023, Pending.

U.S. Appl. No. 18/074,301, filed Dec. 2, 2022, 20230177751, Jun. 8, 2023, Pending.

U.S. Appl. No. 18/142,560, filed May 2, 2023, 20230351104, Nov. 2, 2023, Allowed.

* cited by examiner

ALL PRIOR ART

PRIOR ART

FIG. 4B
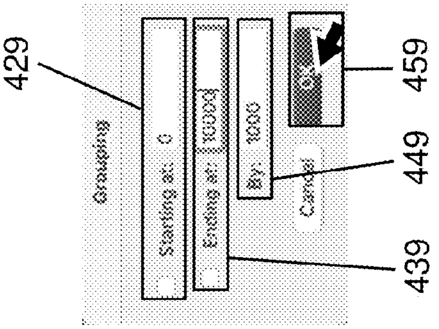
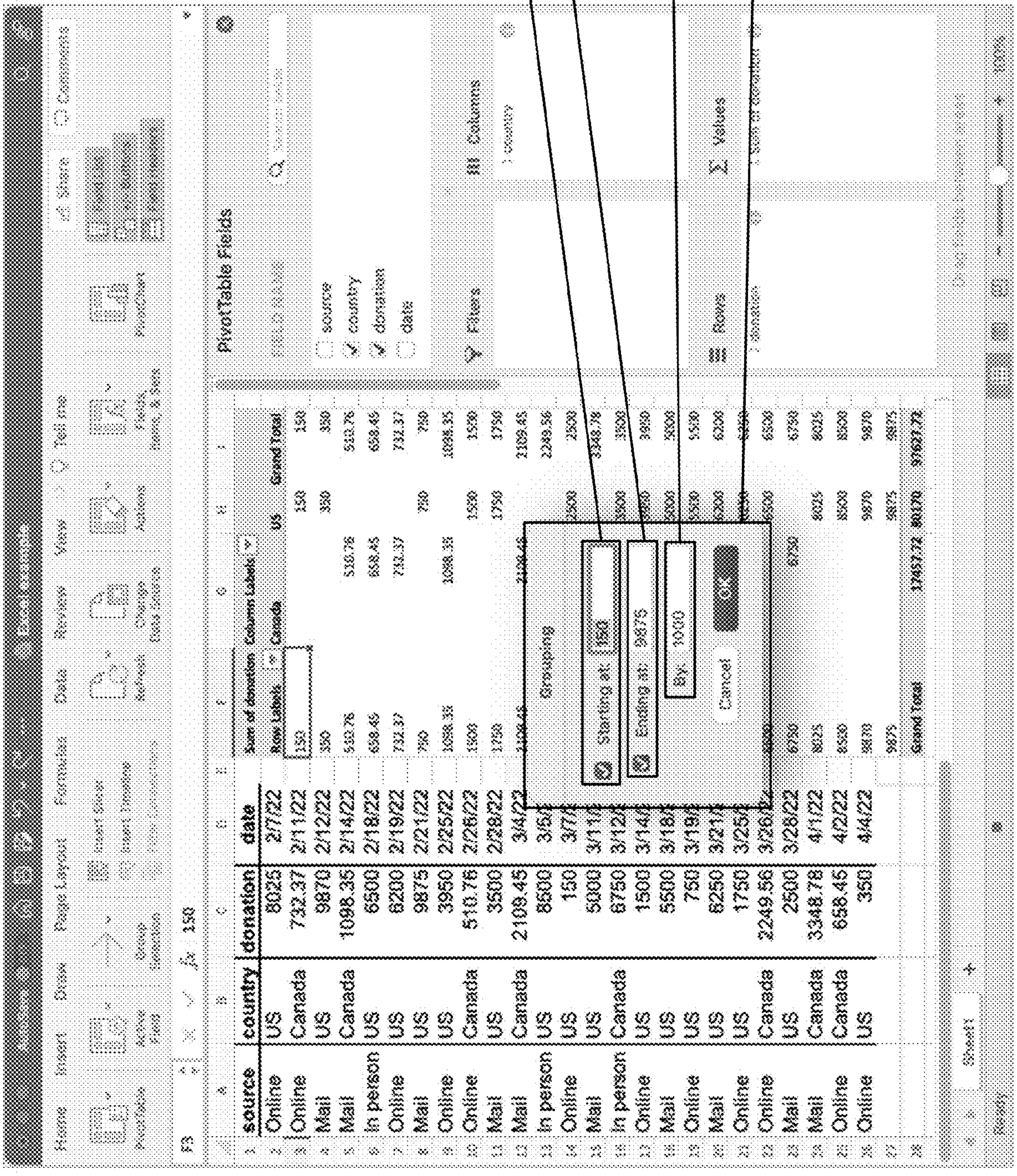
FIG. 4A
ALL PRIOR ART

PRIOR ART

PRIOR ART

PRIOR ART

ALL PRIOR ART

PRIOR ART

ALL PRIOR ART

PRIOR ART

PRIOR ART

PRIOR ART

ALL PRIOR ART 2817
2822
2823
B5
=CUBEMEMBER("ThisWorkbookDataModel","[Table3].[date (Month)].&[Feb]")
Sum of donation Column Labels
Row Labels Canada US
Feb 2341.48 47920
Mar 11109.01 31900
Apr 4007.23 350

2857
2863
C4
=CUBEMEMBER("ThisWorkbookDataModel","[Table3].[country].&[Canada]")

2877
2883
C5
=CUBEVALUE("ThisWorkbookDataModel",$B$3,$B5,C$4)
ALL PRIOR ART

ALL PRIOR ART

PRIOR ART

ALL PRIOR ART

FIG. 35A

*Formulaic data available*

| district | source | country | donation | date |
|---|---|---|---|---|
| 5 | Online | US | 8025 | 2/7/22 |
| 52 | Online | Canada | 732.37 | 2/11/22 |
| 22 | Mail | US | 9870 | 2/12/22 |
| 53 | Mail | Canada | 1098.35 | 2/14/22 |
| 1 | In person | US | 6500 | 2/18/22 |
| 6 | Online | US | 6200 | 2/19/22 |
| 45 | Mail | US | 9875 | 2/21/22 |
| 25 | Mail | US | 3950 | 2/25/22 |
| 54 | Online | Canada | 510.76 | 2/26/22 |
| 1 | Mail | US | 3500 | 2/28/22 |
| 52 | Mail | Canada | 2109.45 | 3/4/22 |
| 7 | In person | US | 8500 | 3/5/22 |
| 6 | Online | US | 150 | 3/7/22 |
| 21 | Mail | US | 5000 | 3/11/22 |
| 56 | In person | Canada | 6750 | 3/12/22 |
| 5 | Online | US | 1500 | 3/14/22 |
| 29 | Mail | US | 5500 | 3/18/22 |
| 43 | Online | US | 750 | 3/19/22 |
| 7 | Mail | US | 6250 | 3/21/22 |
| 47 | Online | US | 1750 | 3/25/22 |
| 54 | Online | Canada | 2249.56 | 3/26/22 |
| 45 | Mail | US | 2500 | 3/28/22 |
| 54 | Mail | Canada | 3348.78 | 4/1/22 |
| 53 | Online | Canada | 658.45 | 4/2/22 |
| 42 | Online | US | 350 | 4/4/22 |

3563

FIG. 35B

*Data retrieved*

| donation |
|---|
| 8025 |
| 732.37 |
| 9870 |
| 1098.35 |
| 6500 |
| 6200 |
| 9875 |
| 3950 |
| 510.76 |
| 3500 |
| 2109.45 |
| 8500 |
| 150 |
| 5000 |
| 6750 |
| 1500 |
| 5500 |
| 750 |
| 6250 |
| 1750 |
| 2249.56 |
| 2500 |
| 3348.78 |
| 658.45 |
| 350 |

FIG. 35C

*donations sorted*

| donation |
|---|
| 150 |
| 350 |
| 510.76 |
| 658.45 |
| 732.37 |
| 750 |
| 1098.35 |
| 1500 |
| 1750 |
| 2109.45 |
| 2249.56 |
| 2500 |
| 3348.78 |
| 3500 |
| 3950 |
| 5000 |
| 5500 |
| 6200 |
| 6250 |
| 6500 |
| 6750 |
| 8025 |
| 8500 |
| 9875 |
| 9870 |

FIG. 35F

*BUCKET values created*

| donation | Bucket values |
|---|---|
| 150 | 0 - 999.99... |
| 350 | |
| 510.76 | |
| 658.45 | |
| 732.37 | |
| 750 | |
| 1098.35 | 1000 - 1999.99... |
| 1500 | |
| 1750 | |
| 2109.45 | 2000 - 2999.99... |
| 2249.56 | |
| 2500 | |
| 3348.78 | 3000 - 3999.99... |
| 3500 | |
| 3950 | |
| 5000 | 5000 - 5999.99... |
| 5500 | |
| 6200 | 6000 - 6999.99... |
| 6250 | |
| 6500 | |
| 6750 | |
| 8025 | 8000 - 8999.99... |
| 8500 | |
| 9870 | 9000 - 9999.99... |
| 9875 | |

3527 3526 3537 3536 3586 3587

FIG. 35G

*First BUCKET value returned to cell C4*

0 - 999.99...

FIG. 35D

*Auto starting point determination*

*150/1000=0.15*

*0/1000=0*

FIG. 35E

*Auto ending point determination*

*9999.99...*

FIG. 36A

*Formulaic data available*

| district | source | country | donation | date |
|---|---|---|---|---|
| 5 | Online | US | 8025 | 2/7/22 |
| 52 | Online | Canada | 732.37 | 2/11/22 |
| 22 | Mail | US | 9870 | 2/12/22 |
| 53 | Mail | Canada | 1098.35 | 2/14/22 |
| 1 | In person | US | 6500 | 2/18/22 |
| 6 | Online | US | 6200 | 2/19/22 |
| 45 | Mail | US | 9875 | 2/21/22 |
| 25 | Mail | US | 3950 | 2/25/22 |
| 54 | Online | Canada | 510.76 | 2/26/22 |
| 1 | Mail | US | 3500 | 2/28/22 |
| 52 | Mail | Canada | 2109.45 | 3/4/22 |
| 7 | In person | US | 8500 | 3/5/22 |
| 6 | Online | US | 150 | 3/7/22 |
| 21 | Mail | US | 5000 | 3/11/22 |
| 56 | In person | Canada | 6750 | 3/12/22 |
| 5 | Online | US | 1500 | 3/14/22 |
| 29 | Mail | US | 5500 | 3/18/22 |
| 43 | Online | US | 750 | 3/19/22 |
| 7 | Mail | US | 6250 | 3/21/22 |
| 47 | Online | US | 1750 | 3/25/22 |
| 54 | Online | Canada | 2249.56 | 3/26/22 |
| 45 | Mail | US | 2500 | 3/28/22 |
| 54 | Mail | Canada | 3348.78 | 4/1/22 |
| 53 | Online | Canada | 658.45 | 4/2/22 |
| 42 | Online | US | 350 | 4/4/22 |

← or ←

A4 $f_x$ Online

| | A | B | C | D | E | F |
|---|---|---|---|---|---|---|
| 1 | Source data | | | | | |
| 2 | | | | | | |
| 3 | source | country | donation | date | | |
| 4 | Online | US | 8025 | 2/7/22 | | |
| 5 | Online | Canada | 732.37 | 2/7/22 | | |
| 6 | Mail | US | 9870 | 2/7/22 | | |
| 7 | Mail | Canada | 1098.35 | 2/7/22 | | |
| 8 | In person | US | 6500 | 2/7/22 | | |
| 9 | Online | US | 6200 | 2/7/22 | | |
| 10 | Mail | US | 9875 | 2/8/22 | | |
| 11 | Mail | US | 3950 | 2/8/22 | | |
| 12 | Online | Canada | 510.76 | 2/8/22 | | |
| 13 | Mail | US | 3500 | 2/9/22 | | |
| 14 | Mail | Canada | 2109.45 | 2/9/22 | | |
| 15 | In person | US | 8500 | 2/9/22 | | |
| 16 | Online | US | 150 | 2/9/22 | | |
| 17 | Mail | US | 5000 | 2/9/22 | | |
| 18 | In person | Canada | 6750 | 2/9/22 | | |
| 19 | Online | US | 1500 | 2/10/22 | | |
| 20 | Mail | US | 5500 | 2/11/22 | | |
| 21 | Online | US | 750 | 2/11/22 | | |
| 22 | Mail | US | 6250 | 2/11/22 | | |
| 23 | Online | US | 1750 | 2/11/22 | | |
| 24 | Online | Canada | 2249.56 | 2/11/22 | | |
| 25 | Mail | US | 2500 | 2/12/22 | | |
| 26 | Mail | Canada | 3348.78 | 2/12/22 | | |
| 27 | Online | Canada | 658.45 | 2/12/22 | | |
| 28 | Online | US | 350 | 2/12/22 | | |

FIG. 36B

Non-Spreadsheet cell external data

FIG. 36C

FIG. 37A

*Formulaic data available*

| district | source | country | donation | date |
|---|---|---|---|---|
| 5 | Online | US | 8025 | 2/7/22 |
| 52 | Online | Canada | 732.37 | 2/11/22 |
| 22 | Mail | US | 9870 | 2/12/22 |
| 53 | Mail | Canada | 1098.35 | 2/14/22 |
| 1 | In person | US | 6500 | 2/18/22 |
| 6 | Online | US | 6200 | 2/19/22 |
| 45 | Mail | US | 9875 | 2/21/22 |
| 25 | Mail | US | 3950 | 2/25/22 |
| 54 | Online | Canada | 510.76 | 2/26/22 |
| 1 | Mail | US | 3500 | 2/28/22 |
| 52 | Mail | Canada | 2109.45 | 3/4/22 |
| 7 | In person | US | 8500 | 3/5/22 |
| 6 | Online | US | 150 | 3/7/22 |
| 21 | Mail | US | 5000 | 3/11/22 |
| 56 | In person | Canada | 6750 | 3/12/22 |
| 5 | Online | US | 1500 | 3/14/22 |
| 29 | Mail | US | 5500 | 3/18/22 |
| 43 | Online | US | 750 | 3/19/22 |
| 7 | Mail | US | 6250 | 3/21/22 |
| 47 | Online | US | 1750 | 3/25/22 |
| 54 | Online | Canada | 2249.56 | 3/26/22 |
| 45 | Mail | US | 2500 | 3/28/22 |
| 54 | Mail | Canada | 3348.78 | 4/1/22 |
| 53 | Online | Canada | 658.45 | 4/2/22 |
| 42 | Online | US | 350 | 4/4/22 |

FIG. 37B

*Data retrieved*

| donation |
|---|
| 8025 |
| 732.37 |
| 9870 |
| 1098.35 |
| 6500 |
| 6200 |
| 9875 |
| 3950 |
| 510.76 |
| 3500 |
| 2109.45 |
| 8500 |
| 150 |
| 5000 |
| 6750 |
| 1500 |
| 5500 |
| 750 |
| 6250 |
| 1750 |
| 2249.56 |
| 2500 |
| 3348.78 |
| 658.45 |
| 350 |

FIG. 37C

*donations sorted*

| donation |
|---|
| 150 |
| 350 |
| 510.76 |
| 658.45 |
| 732.37 |
| 750 |
| 1098.35 |
| 1500 |
| 1750 |
| 2109.45 |
| 2249.56 |
| 2500 |
| 3348.78 |
| 3500 |
| 3950 |
| 5000 |
| 5500 |
| 6200 |
| 6250 |
| 6500 |
| 6750 |
| 8025 |
| 8500 |
| 9875 |
| 9870 |

FIG. 37E

*BUCKET values created*

| donation | Bucket values |
|---|---|
| 150 | 0 -1999.99… |
| 350 | |
| 510.76 | |
| 658.45 | |
| 732.37 | |
| 750 | |
| 1098.35 | |
| 1500 | |
| 1750 | |
| 2109.45 | 2000 - 3999.99… |
| 2249.56 | |
| 2500 | |
| 3348.78 | |
| 3500 | |
| 3950 | |
| 5000 | 4000 - 6999.99… |
| 5500 | |
| 6200 | |
| 6250 | |
| 6500 | |
| 6750 | |
| 8025 | 8000 - 9999.99… |
| 8500 | |
| 9870 | |
| 9875 | |

3727

3736

3786

FIG. 37F

*First BUCKET value returned to cell C4*

0 - 1999.99…

FIG. 37D

*Auto starting point determination*

*150/2000=0.075*

*0/2000=0*

FIG. 39A

*Data retrieved*

| donation |
|---|
| 8025 |
| 732.37 |
| 9870 |
| 1098.35 |
| 6500 |
| 6200 |
| 9875 |
| 3950 |
| 510.76 |
| 3500 |
| 2109.45 |
| 8500 |
| 150 |
| 5000 |
| 6750 |
| 1500 |
| 5500 |
| 750 |
| 6250 |
| 1750 |
| 2249.56 |
| 2500 |
| 3348.78 |
| 658.45 |
| 350 |

FIG. 39B

*donations sorted*

| donation |
|---|
| 150 |
| 350 |
| 510.76 |
| 658.45 |
| 732.37 |
| 750 |
| 1098.35 |
| 1500 |
| 1750 |
| 2109.45 |
| 2249.56 |
| 2500 |
| 3348.78 |
| 3500 |
| 3950 |
| 5000 |
| 5500 |
| 6200 |
| 6250 |
| 6500 |
| 6750 |
| 8025 |
| 8500 |
| 9875 |
| 9870 |

FIG. 39C

*BUCKET values created*

| donation | Bucket values |
|---|---|
| 150 | 0 - 999.99... |
| 350 | |
| 510.76 | |
| 658.45 | |
| 732.37 | |
| 750 | |
| 1098.35 | 1000 - 1999.99... |
| 1500 | |
| 1750 | |
| 2109.45 | 2000 - 2999.99... |
| 2249.56 | |
| 2500 | |
| 3348.78 | 3000 - 3999.99... |
| 3500 | |
| 3950 | |
| 5000 | 5000 - 5999.99... |
| 5500 | |
| 6200 | 6000 - 6999.99... |
| 6250 | |
| 6500 | |
| 6750 | |
| 8025 | 8000 - 8999.99... |
| 8500 | |
| 9870 | 9000 - 9999.99... |
| 9875 | |

FIG. 39D

*Add three additional copy paste values*

| |
|---|
| 1000 - 1999.99... |
| 2000 - 2999.99... |
| 3000 - 3999.99... |
| 5000 - 5999.99... |
| 6000 - 6999.99... |
| 8000 - 8999.99... |
| 9000 - 9999.99... |
| #NODATA! |
| #NODATA! |
| #NODATA! |

FIG. 39E

*Format for cells A5 to A14*

| |
|---|
| 1000 - 1999.99... |
| 2000 - 2999.99... |
| 3000 - 3999.99... |
| 5000 - 5999.99... |
| 6000 - 6999.99... |
| 8000 - 8999.99... |
| 9000 - 9999.99... |
| #NODATA! |
| #NODATA! |
| #NODATA! |

FIG. 39F

*Format for cells A5 to A11*

| |
|---|
| 1000 - 1999.99... |
| 2000 - 2999.99... |
| 3000 - 3999.99... |
| 5000 - 5999.99... |
| 6000 - 6999.99... |
| 8000 - 8999.99... |
| 9000 - 9999.99... |

FIG. 44A

*Data retrieved*

| donation |
|---|
| 8025 |
| 732.37 |
| 9870 |
| 1098.35 |
| 6500 |
| 6200 |
| 9875 |
| 3950 |
| 510.76 |
| 3500 |
| 2109.45 |
| 8500 |
| 150 |
| 5000 |
| 6750 |
| 1500 |
| 5500 |
| 750 |
| 6250 |
| 1750 |
| 2249.56 |
| 2500 |
| 3348.78 |
| 658.45 |
| 350 |

FIG. 44B

*donations sorted*

| donation |
|---|
| 150 |
| 350 |
| 510.76 |
| 658.45 |
| 732.37 |
| 750 |
| 1098.35 |
| 1500 |
| 1750 |
| 2109.45 |
| 2249.56 |
| 2500 |
| 3348.78 |
| 3500 |
| 3950 |
| 5000 |
| 5500 |
| 6200 |
| 6250 |
| 6500 |
| 6750 |
| 8025 |
| 8500 |
| 9875 |
| 9870 |

FIG. 44C

*BUCKET values created*

| donation | Bucket values |
|---|---|
| 150 | 0 - 999.99... |
| 350 | |
| 510.76 | |
| 658.45 | |
| 732.37 | |
| 750 | |
| 1098.35 | 1000 - 1999.99... |
| 1500 | |
| 1750 | |
| 2109.45 | 2000 - 2999.99... |
| 2249.56 | |
| 2500 | |
| 3348.78 | 3000 - 3999.99... |
| 3500 | |
| 3950 | |
| 5000 | 5000 - 5999.99... |
| 5500 | |
| 6200 | 6000 - 6999.99... |
| 6250 | |
| 6500 | |
| 6750 | |
| 8025 | 8000 - 8999.99... |
| 8500 | |
| 9870 | 9000 - 9999.99... |
| 9875 | |

FIG. 44D

*Fill BUCKET values and add one additional paste value*

| |
|---|
| 1000 - 1999.99... |
| 2000 - 2999.99... |
| 3000 - 3999.99... |
| 4000 - 4999.99... |
| 5000 - 5999.99... |
| 6000 - 6999.99... |
| 7000 - 7999.99... |
| 8000 - 8999.99... |
| 9000 - 9999.99... |
| #NODATA! |

4437 4447

FIG. 44E

*Format for cells A5 to A14*

| |
|---|
| 1000 - 1999.99... |
| 2000 - 2999.99... |
| 3000 - 3999.99... |
| 4000 - 4999.99... |
| 5000 - 5999.99... |
| 6000 - 6999.99... |
| 7000 - 7999.99... |
| 8000 - 8999.99... |
| 9000 - 9999.99... |
| #NODATA! |

FIG. 44F

*Format for cells A5 to A13*

| |
|---|
| 1000 - 1999.99... |
| 2000 - 2999.99... |
| 3000 - 3999.99... |
| 4000 - 4999.99... |
| 5000 - 5999.99... |
| 6000 - 6999.99... |
| 7000 - 7999.99... |
| 8000 - 8999.99... |
| 9000 - 9999.99... |

FIG. 50A

*Formulaic data available*

| district | source | country | donation | date |
|---|---|---|---|---|
| 5 | Online | US | 8025 | 2/7/22 |
| 52 | Online | Canada | 732.37 | 2/11/22 |
| 22 | Mail | US | 9870 | 2/12/22 |
| 53 | Mail | Canada | 1098.35 | 2/14/22 |
| 1 | In person | US | 6500 | 2/18/22 |
| 6 | Online | US | 6200 | 2/19/22 |
| 45 | Mail | US | 9875 | 2/21/22 |
| 25 | Mail | US | 3950 | 2/25/22 |
| 54 | Online | Canada | 510.76 | 2/26/22 |
| 1 | Mail | US | 3500 | 2/28/22 |
| 52 | Mail | Canada | 2109.45 | 3/4/22 |
| 7 | In person | US | 8500 | 3/5/22 |
| 6 | Online | US | 150 | 3/7/22 |
| 21 | Mail | US | 5000 | 3/11/22 |
| 56 | In person | Canada | 6750 | 3/12/22 |
| 5 | Online | US | 1500 | 3/14/22 |
| 29 | Mail | US | 5500 | 3/18/22 |
| 43 | Online | US | 750 | 3/19/22 |
| 7 | Mail | US | 6250 | 3/21/22 |
| 47 | Online | US | 1750 | 3/25/22 |
| 54 | Online | Canada | 2249.56 | 3/26/22 |
| 45 | Mail | US | 2500 | 3/28/22 |
| 54 | Mail | Canada | 3348.78 | 4/1/22 |
| 53 | Online | Canada | 658.45 | 4/2/22 |
| 42 | Online | US | 350 | 4/4/22 |

FIG. 50B

*Data retrieved for donation in the bucket in A4*

| Increment values | donation |
|---|---|
| 0 - 999.99... | 150 |
| | 350 |
| | 510.76 |
| | 658.45 |
| | 732.37 |
| | 750 |

FIG. 50C

*COUNT calculation*

| Increment values | donation | COUNT |
|---|---|---|
| 0 - 999.99... | 150 | 6 |
| | 350 | |
| | 510.76 | |
| | 658.45 | |
| | 732.37 | |
| | 750 | |

FIG. 50D

*Result returned to cell B4*

6

FIG. 50E

*Data retrieved for district in the bucket in A4*

| Increment values | district |
|---|---|
| 0 - 999.99... | 52 |
| | 54 |
| | 6 |
| | 43 |
| | 53 |
| | 42 |

FIG. 50F

*MAX calculation*

| Increment values | district | MAX |
|---|---|---|
| 0 - 999.99... | 54 | 54 |
| | 53 | |
| | 52 | |
| | 43 | |
| | 42 | |
| | 6 | |

FIG. 50G

*Result returned to cell C4*

54

FIG. 52A

*Formulaic data available*

| district | source | country | donation | date |
|---|---|---|---|---|
| 5 | Online | US | 8025 | 2/7/22 |
| 52 | Online | Canada | 732.37 | 2/11/22 |
| 22 | Mail | US | 9870 | 2/12/22 |
| 53 | Mail | Canada | 1098.35 | 2/14/22 |
| 1 | In person | US | 6500 | 2/18/22 |
| 6 | Online | US | 6200 | 2/19/22 |
| 45 | Mail | US | 9875 | 2/21/22 |
| 25 | Mail | US | 3950 | 2/25/22 |
| 54 | Online | Canada | 510.76 | 2/26/22 |
| 1 | Mail | US | 3500 | 2/28/22 |
| 52 | Mail | Canada | 2109.45 | 3/4/22 |
| 7 | In person | US | 8500 | 3/5/22 |
| 6 | Online | US | 150 | 3/7/22 |
| 21 | Mail | US | 5000 | 3/11/22 |
| 56 | In person | Canada | 6750 | 3/12/22 |
| 5 | Online | US | 1500 | 3/14/22 |
| 29 | Mail | US | 5500 | 3/18/22 |
| 43 | Online | US | 750 | 3/19/22 |
| 7 | Mail | US | 6250 | 3/21/22 |
| 47 | Online | US | 1750 | 3/25/22 |
| 54 | Online | Canada | 2249.56 | 3/26/22 |
| 45 | Mail | US | 2500 | 3/28/22 |
| 54 | Mail | Canada | 3348.78 | 4/1/22 |
| 53 | Online | Canada | 658.45 | 4/2/22 |
| 42 | Online | US | 350 | 4/4/22 |

FIG. 52B

*Data retrieved for donation in A13*

| Increment values | donation |
|---|---|
| 9000 - 9999.99... | 9870 |
| | 9875 |

FIG. 52C

*COUNT calculation*

| Increment values | donation | COUNT |
|---|---|---|
| 9000 - 9999.99... | 9870 | 2 |
| | 9875 | |

FIG. 52D

*Result returned to cell B13*

2

FIG. 52E

*Data retrieved for donation in A13*

| Increment values | donation |
|---|---|
| 9000 - 9999.99... | 9870 |
| | 9875 |

FIG. 52F

*SUM calculation*

| Increment values | donation | SUM |
|---|---|---|
| 9000 - 9999.99... | 9870 | 19745 |
| | 9875 | |

FIG. 52G

*Result returned to cell C13*

$19,745.00

FIG. 53A

*Formulaic data available*

| district | source | country | donation | date |
|---|---|---|---|---|
| 5 | Online | US | 8025 | 2/7/22 |
| 52 | Online | Canada | 732.37 | 2/11/22 |
| 22 | Mail | US | 9870 | 2/12/22 |
| 53 | Mail | Canada | 1098.35 | 2/14/22 |
| 1 | In person | US | 6500 | 2/18/22 |
| 6 | Online | US | 6200 | 2/19/22 |
| 45 | Mail | US | 9875 | 2/21/22 |
| 25 | Mail | US | 3950 | 2/25/22 |
| 54 | Online | Canada | 510.76 | 2/26/22 |
| 1 | Mail | US | 3500 | 2/28/22 |
| 52 | Mail | Canada | 2109.45 | 3/4/22 |
| 7 | In person | US | 8500 | 3/5/22 |
| 6 | Online | US | 150 | 3/7/22 |
| 21 | Mail | US | 5000 | 3/11/22 |
| 56 | In person | Canada | 6750 | 3/12/22 |
| 5 | Online | US | 1500 | 3/14/22 |
| 29 | Mail | US | 5500 | 3/18/22 |
| 43 | Online | US | 750 | 3/19/22 |
| 7 | Mail | US | 6250 | 3/21/22 |
| 47 | Online | US | 1750 | 3/25/22 |
| 54 | Online | Canada | 2249.56 | 3/26/22 |
| 45 | Mail | US | 2500 | 3/28/22 |
| 54 | Mail | Canada | 3348.78 | 4/1/22 |
| 53 | Online | Canada | 658.45 | 4/2/22 |
| 42 | Online | US | 350 | 4/4/22 |

FIG. 53B

*Data retrieved*

| donation |
|---|
| 8025 |
| 732.37 |
| 9870 |
| 1098.35 |
| 6500 |
| 6200 |
| 9875 |
| 3950 |
| 510.76 |
| 3500 |
| 2109.45 |
| 8500 |
| 150 |
| 5000 |
| 6750 |
| 1500 |
| 5500 |
| 750 |
| 6250 |
| 1750 |
| 2249.56 |
| 2500 |
| 3348.78 |
| 658.45 |
| 350 |

FIG. 53C

*donations sorted*

| donation |
|---|
| 150 |
| 350 |
| 510.76 |
| 658.45 |
| 732.37 |
| 750 |
| 1098.35 |
| 1500 |
| 1750 |
| 2109.45 |
| 2249.56 |
| 2500 |
| 3348.78 |
| 3500 |
| 3950 |
| 5000 |
| 5500 |
| 6200 |
| 6250 |
| 6500 |
| 6750 |
| 8025 |
| 8500 |
| 9875 |
| 9870 |

FIG. 53D

*BUCKET values created*

| donation | Bucket values |
|---|---|
| 150 | 0 - 999.99... |
| 350 | |
| 510.76 | |
| 658.45 | |
| 732.37 | |
| 750 | |
| 1098.35 | 1000 - 1999.99... |
| 1500 | |
| 1750 | |
| 2109.45 | 2000 - 2999.99... |
| 2249.56 | |
| 2500 | |
| 3348.78 | 3000 - 3999.99... |
| 3500 | |
| 3950 | |
| 5000 | 5000 - 5999.99... |
| 5500 | |
| 6200 | 6000 - 6999.99... |
| 6250 | |
| 6500 | |
| 6750 | |
| 8025 | 8000 - 8999.99... |
| 8500 | |
| 9870 | 9000 - 9999.99... |
| 9875 | |

FIG. 53E

*Fill BUCKET values*

| |
|---|
| 0 - 999.99... |
| 1000 - 1999.99... |
| 2000 - 2999.99... |
| 3000 - 3999.99... |
| 4000 - 4999.99... |
| 5000 - 5999.99... |
| 6000 - 6999.99... |
| 7000 - 7999.99... |
| 8000 - 8999.99... |
| 9000 - 9999.99... |

FIG. 54A

*Data retrieved for BUCKET_1000(donation{ !BT_10}*

| Increment values | donation |
|---|---|
| 9000 - 9999.99... | 9870 |
| | 9875 |

FIG. 54B

*COUNT calculation*

| Increment values | donation | COUNT |
|---|---|---|
| 9000 - 9999.99... | 9870 | 2 |
| | 9875 | |

FIG. 54C

*Result returned to cell B13*

2

FIG. 54D

*Data retrieved for BUCKET_1000(donation{ !BT_10}*

| Increment values | donation |
|---|---|
| 9000 - 9999.99... | 9870 |
| | 9875 |

FIG. 54E

*SUM calculation*

| Increment values | donation | SUM |
|---|---|---|
| 9000 - 9999.99... | 9870 | 19745 |
| | 9875 | |

FIG. 54F

*Result returned to cell C13*

$19,745.00

FIG. 56A

*Column A BUCKET values*

| Bucket values |
|---|
| 1000 - 1999.99... |
| |
| |
| 2000 - 2999.99... |
| |
| |
| 3000 - 3999.99... |
| |
| |
| 4000 - 4999.99... |
| 5000 - 5999.99... |
| |
| 6000 - 6999.99... |
| |
| |
| |
| 7000 - 7999.99... |
| 8000 - 8999.99... |
| |
| 9000 - 9999.99... |

FIG. 56B

*Donation data retrieved with BUCKET sorting*

| donation |
|---|
| 1098.35 |
| 1500 |
| 1750 |
| 2109.45 |
| 2249.56 |
| 2500 |
| 3348.78 |
| 3500 |
| 3950 |
| |
| 5000 |
| 5500 |
| 6200 |
| 6250 |
| 6500 |
| 6750 |
| |
| 8025 |
| 8500 |
| 9870 |
| 9875 |

FIG. 56C

*Do the COUNT calculations*

| COUNT |
|---|
| 3 |
| 3 |
| 3 |
| 2 |
| 4 |
| 2 |
| 2 |

FIG. 56D

*Do the SUM calculations*

| SUM |
|---|
| 4348.4 |
| 6859 |
| 10799 |
| 10500 |
| 25700 |
| 16525 |
| 19745 |

FIG. 56E

*Format for cells B5 to C13*

| | |
|---|---|
| 3 | $4,348.35 |
| 3 | $6,859.01 |
| 3 | $10,798.78 |
| | |
| 2 | $10,500.00 |
| 4 | $25,700.00 |
| | |
| 2 | $16,525.00 |
| 2 | $19,745.00 |

FIG. 59A

*Formulaic data available*

| district | source | country | donation | date |
|---|---|---|---|---|
| 5 | Online | US | 8025 | 2/7/22 |
| 52 | Online | Canada | 732.37 | 2/11/22 |
| 22 | Mail | US | 9870 | 2/12/22 |
| 53 | Mail | Canada | 1098.35 | 2/14/22 |
| 1 | In person | US | 6500 | 2/18/22 |
| 6 | Online | US | 6200 | 2/19/22 |
| 45 | Mail | US | 9875 | 2/21/22 |
| 25 | Mail | US | 3950 | 2/25/22 |
| 54 | Online | Canada | 510.76 | 2/26/22 |
| 1 | Mail | US | 3500 | 2/28/22 |
| 52 | Mail | Canada | 2109.45 | 3/4/22 |
| 7 | In person | US | 8500 | 3/5/22 |
| 6 | Online | US | 150 | 3/7/22 |
| 21 | Mail | US | 5000 | 3/11/22 |
| 56 | In person | Canada | 6750 | 3/12/22 |
| 5 | Online | US | 1500 | 3/14/22 |
| 29 | Mail | US | 5500 | 3/18/22 |
| 43 | Online | US | 750 | 3/19/22 |
| 7 | Mail | US | 6250 | 3/21/22 |
| 47 | Online | US | 1750 | 3/25/22 |
| 54 | Online | Canada | 2249.56 | 3/26/22 |
| 45 | Mail | US | 2500 | 3/28/22 |
| 54 | Mail | Canada | 3348.78 | 4/1/22 |
| 53 | Online | Canada | 658.45 | 4/2/22 |
| 42 | Online | US | 350 | 4/4/22 |

FIG. 59B

*Data retrieved*

| donation |
|---|
| 8025 |
| 732.37 |
| 9870 |
| 1098.35 |
| 6500 |
| 6200 |
| 9875 |
| 3950 |
| 510.76 |
| 3500 |
| 2109.45 |
| 8500 |
| 150 |
| 5000 |
| 6750 |
| 1500 |
| 5500 |
| 750 |
| 6250 |
| 1750 |
| 2249.56 |
| 2500 |
| 3348.78 |
| 658.45 |
| 350 |

FIG. 59C

*donations sorted*

| donation |
|---|
| 150 |
| 350 |
| 510.76 |
| 658.45 |
| 732.37 |
| 750 |
| 1098.35 |
| 1500 |
| 1750 |
| 2109.45 |
| 2249.56 |
| 2500 |
| 3348.78 |
| 3500 |
| 3950 |
| 5000 |
| 5500 |
| 6200 |
| 6250 |
| 6500 |
| 6750 |
| 8025 |
| 8500 |
| 9875 |
| 9870 |

FIG. 59D

*BUCKET values created*

| donation | Bucket values |
|---|---|
| 150 | 0 - 999.99... |
| 350 | |
| 510.76 | |
| 658.45 | |
| 732.37 | |
| 750 | |
| 1098.35 | 1000 - 1999.99... |
| 1500 | |
| 1750 | |
| 2109.45 | 2000 - 2999.99... |
| 2249.56 | |
| 2500 | |
| 3348.78 | 3000 - 3999.99... |
| 3500 | |
| 3950 | |
| 5000 | 5000 - 5999.99... |
| 5500 | |
| 6200 | 6000 - 6999.99... |
| 6250 | |
| 6500 | |
| 6750 | |
| 8025 | 8000 - 8999.99... |
| 8500 | |
| 9870 | 9000 - 9999.99... |
| 9875 | |

FIG. 59E

*Fill BUCKET values*

| |
|---|
| 0 - 999.99... |
| 1000 - 1999.99... |
| 2000 - 2999.99... |
| 3000 - 3999.99... |
| 4000 - 4999.99... |
| 5000 - 5999.99... |
| 6000 - 6999.99... |
| 7000 - 7999.99... |
| 8000 - 8999.99... |
| 9000 - 9999.99... |

FIG. 60A

*donation(BUCKET_1000(donation{})) values*

| BUCKET values | donation |
|---|---|
| 0 - 999.99... | 150 |
| | 350 |
| | 510.76 |
| | 658.45 |
| | 732.37 |
| | 750 |
| 1000 - 1999.99... | 1098.35 |
| | 1500 |
| | 1750 |
| 2000 - 2999.99... | 2109.45 |
| | 2249.56 |
| | 2500 |
| 3000 - 3999.99... | 3348.78 |
| | 3500 |
| | 3950 |
| 5000 - 5999.99... | 5000 |
| | 5500 |
| 6000 - 6999.99... | 6200 |
| | 6250 |
| | 6500 |
| | 6750 |
| 8000 - 8999.99... | 8025 |
| | 8500 |

FIG. 60B

*Do the COUNT calculations*

| COUNT |
|---|
| 6 |
| 3 |
| 3 |
| 3 |
| 2 |
| 4 |
| 2 |

FIG. 60C

*Do the SUM calculations*

| SUM |
|---|
| 3151.58 |
| 4348.35 |
| 6859.01 |
| 10798.78 |
| 10500 |
| 25700 |
| 16525 |

FIG. 60D

*Format for cells B4 to C12*

| | |
|---|---|
| 6 | $3,151.58 |
| 3 | $4,348.35 |
| 3 | $6,859.01 |
| 3 | $10,798.78 |
| | |
| 2 | $10,500.00 |
| 4 | $25,700.00 |
| | |
| 2 | $16,525.00 |

FIG. 62A

*Formulaic data available*

| district | source | country | donation | date |
|---|---|---|---|---|
| 5 | Online | US | 8025 | 2/7/22 |
| 52 | Online | Canada | 732.37 | 2/11/22 |
| 22 | Mail | US | 9870 | 2/12/22 |
| 53 | Mail | Canada | 1098.35 | 2/14/22 |
| 1 | In person | US | 6500 | 2/18/22 |
| 6 | Online | US | 6200 | 2/19/22 |
| 45 | Mail | US | 9875 | 2/21/22 |
| 25 | Mail | US | 3950 | 2/25/22 |
| 54 | Online | Canada | 510.76 | 2/26/22 |
| 1 | Mail | US | 3500 | 2/28/22 |
| 52 | Mail | Canada | 2109.45 | 3/4/22 |
| 7 | In person | US | 8500 | 3/5/22 |
| 6 | Online | US | 150 | 3/7/22 |
| 21 | Mail | US | 5000 | 3/11/22 |
| 56 | In person | Canada | 6750 | 3/12/22 |
| 5 | Online | US | 1500 | 3/14/22 |
| 29 | Mail | US | 5500 | 3/18/22 |
| 43 | Online | US | 750 | 3/19/22 |
| 7 | Mail | US | 6250 | 3/21/22 |
| 47 | Online | US | 1750 | 3/25/22 |
| 54 | Online | Canada | 2249.56 | 3/26/22 |
| 45 | Mail | US | 2500 | 3/28/22 |
| 54 | Mail | Canada | 3348.78 | 4/1/22 |
| 53 | Online | Canada | 658.45 | 4/2/22 |
| 42 | Online | US | 350 | 4/4/22 |

FIG. 62B

*Data retrieved*

| country | district |
|---|---|
| US | 5 |
| Canada | 52 |
| US | 22 |
| Canada | 53 |
| US | 1 |
| US | 6 |
| US | 45 |
| US | 25 |
| Canada | 54 |
| US | 1 |
| Canada | 52 |
| US | 7 |
| US | 6 |
| US | 21 |
| Canada | 56 |
| US | 5 |
| US | 29 |
| US | 43 |
| US | 7 |
| US | 47 |
| Canada | 54 |
| US | 45 |
| Canada | 54 |
| Canada | 53 |
| US | 42 |

FIG. 62C

*Values constrained to country US*

| country | district |
|---|---|
| US | 5 |
| | |
| US | 22 |
| | |
| US | 1 |
| US | 6 |
| US | 45 |
| US | 25 |
| | |
| US | 1 |
| | |
| US | 7 |
| US | 6 |
| US | 21 |
| | |
| US | 5 |
| US | 29 |
| US | 43 |
| US | 7 |
| US | 47 |
| | |
| US | 45 |
| | |
| | |
| US | 42 |

FIG. 62D

*Sort district values*

| district |
|---|
| 1 |
| 1 |
| 5 |
| 5 |
| 6 |
| 6 |
| 7 |
| 7 |
| 21 |
| 22 |
| 25 |
| 29 |
| 42 |
| 43 |
| 45 |
| 45 |
| 47 |

FIG. 62E

*Auto start point determination*

*1/10=0.1*

*0/10=0*

FIG. 62F

*Auto end point determination*

*49*

FIG. 62G

*BUCKET values created*

| district | bucket values |
|---|---|
| 1 | 0 - 9 |
| 1 | |
| 5 | |
| 5 | |
| 6 | |
| 6 | |
| 7 | |
| 7 | |
| 21 | 20 - 29 |
| 22 | |
| 25 | |
| 29 | |
| 42 | 40 - 49 |
| 43 | |
| 45 | |
| 45 | |
| 47 | |

FIG. 62H

*Populate first BUCKET in A4*

0 - 9

FIG. 62I

*Populate BUCKETS in A5 and A6*

20 - 29
40 - 49

FIG. 64A

*Formulaic data available*

| exp | date | factor_1 | factor_2 | factor_3 |
|---|---|---|---|---|
| 32 | 3/19/22 | 1345 | 188 | 1172 |
| 14 | 1/22/22 | 1864 | 133 | 8688 |
| 31 | 2/5/22 | 1592 | 119 | 4763 |
| 44 | 3/3/22 | 1674 | 160 | 14437 |
| 39 | 1/6/22 | 1818 | 99 | 5931 |
| 5 | 2/25/22 | 860 | 157 | 12746 |
| 45 | 2/27/22 | 1820 | 73 | 14782 |
| 39 | 1/6/22 | 1758 | 77 | 4037 |
| 7 | 1/15/22 | 1032 | 91 | 7982 |
| 11 | 3/12/22 | 1620 | 153 | 12778 |
| 14 | 1/23/22 | 818 | 143 | 13659 |
| 40 | 1/10/22 | 831 | 161 | 7541 |
| 7 | 1/15/22 | 1373 | 78 | 7586 |
| 44 | 3/3/22 | 949 | 135 | 8823 |
| 44 | 3/3/22 | 1052 | 161 | 10131 |
| 11 | 3/13/22 | 1336 | 181 | 8523 |
| 5 | 2/25/22 | 911 | 110 | 3846 |
| 45 | 2/27/22 | 749 | 138 | 13794 |
| 31 | 2/5/22 | 1204 | 170 | 2780 |
| 39 | 2/8/22 | 1074 | 92 | 14706 |
| 40 | 1/10/22 | 1692 | 145 | 812 |
| 44 | 3/4/22 | 1638 | 110 | 4009 |
| 39 | 2/9/22 | 1661 | 117 | 2214 |
| 11 | 2/4/22 | 1861 | 146 | 10825 |
| 5 | 2/25/22 | 1663 | 135 | 9987 |

FIG. 64B

*Data retrieved*

| exp |
|---|
| 32 |
| 14 |
| 31 |
| 44 |
| 39 |
| 5 |
| 45 |
| 39 |
| 7 |
| 11 |
| 14 |
| 40 |
| 7 |
| 44 |
| 44 |
| 11 |
| 5 |
| 45 |
| 31 |
| 39 |
| 40 |
| 44 |
| 39 |
| 11 |
| 5 |

FIG. 64C

*Test for options*

| Tests | |
|---|---|
| 0.1 | X |
| 1 | X |
| 5 | ✓ |
| 10 | ✓ |
| 25 | ✓ |
| 50 | X |

FIG. 64D

*BUCKET values created with filling*

*Sort*

| exp |
|---|
| 5 |
| 5 |
| 5 |
| 7 |
| 7 |
| 11 |
| 11 |
| 11 |
| 14 |
| 14 |
| 31 |
| 31 |
| 32 |
| 39 |
| 39 |
| 39 |
| 39 |
| 40 |
| 40 |
| 44 |
| 44 |
| 44 |
| 44 |
| 45 |
| 45 |

| exp | bucket values |
|---|---|
| 5 | 0 - 9 |
| 5 | |
| 5 | |
| 7 | |
| 7 | |
| 11 | 10 - 19 |
| 11 | |
| 11 | |
| 14 | |
| 14 | |
| | 20 - 29 |
| 31 | 30 - 39 |
| 31 | |
| 32 | |
| 39 | |
| 39 | |
| 39 | |
| 39 | |
| 40 | 40 - 49 |
| 40 | |
| 44 | |
| 44 | |
| 44 | |
| 44 | |
| 45 | |
| 45 | |

FIG. 64E

*First BUCKET value returned to cell A5*

| |
|---|
| 0 - 9 |

FIG. 66A

*Formulaic data available*

| district | source | country | donation | date |
|---|---|---|---|---|
| 5 | Online | US | 8025 | 2/9/22 |
| 52 | Online | Canada | 732.37 | 2/11/22 |
| 22 | Mail | US | 9870 | 2/12/22 |
| 53 | Mail | Canada | 1098.35 | 2/16/22 |
| 1 | In person | US | 6500 | 2/18/22 |
| 6 | Online | US | 6200 | 2/19/22 |
| 45 | Mail | US | 9875 | 2/23/22 |
| 25 | Mail | US | 3950 | 2/25/22 |
| 54 | Online | Canada | 510.76 | 2/26/22 |
| 1 | Mail | US | 3500 | 3/2/22 |
| 52 | Mail | Canada | 2109.45 | 3/4/22 |
| 7 | In person | US | 8500 | 3/5/22 |
| 6 | Online | US | 150 | 3/5/22 |
| 21 | Mail | US | 5000 | 3/6/22 |
| 56 | In person | Canada | 6750 | 3/7/22 |
| 5 | Online | US | 1500 | 3/14/22 |
| 29 | Mail | US | 5500 | 3/14/22 |
| 43 | Online | US | 750 | 3/15/22 |
| 7 | Mail | US | 6250 | 3/21/22 |
| 47 | Online | US | 1750 | 3/21/22 |
| 54 | Online | Canada | 2249.56 | 3/22/22 |
| 45 | Mail | US | 2500 | 3/28/22 |
| 54 | Mail | Canada | 3348.78 | 3/28/22 |
| 53 | Online | Canada | 658.45 | 3/29/22 |
| 42 | Online | US | 350 | 4/4/22 |

FIG. 66B

*Data retrieved*

| date |
|---|
| 2/7/22 |
| 2/11/22 |
| 2/12/22 |
| 2/14/22 |
| 2/18/22 |
| 2/19/22 |
| 2/21/22 |
| 2/25/22 |
| 2/26/22 |
| 2/28/22 |
| 3/4/22 |
| 3/5/22 |
| 3/7/22 |
| 3/11/22 |
| 3/12/22 |
| 3/14/22 |
| 3/18/22 |
| 3/19/22 |
| 3/21/22 |
| 3/25/22 |
| 3/26/22 |
| 3/28/22 |
| 4/1/22 |
| 4/2/22 |
| 4/4/22 |

FIG. 66C

*Test for options*

| Tests | |
|---|---|
| Minute | X |
| Hour | X |
| Day | X |
| Week | ✓ |
| Month | ✓ |
| Quarter | ✓ |
| Year | X |
| Decade | X |

FIG. 66D

*BUCKET values created with filling*

| date | Bucket values |
|---|---|
| 2/9/22 | 2/7/22 - 2/13/22 |
| 2/11/22 | |
| 2/12/22 | |
| 2/16/22 | 2/14/22 - 2/20/22 |
| 2/18/22 | |
| 2/19/22 | |
| 2/23/22 | 2/21/22 - 2/27/22 |
| 2/25/22 | |
| 2/26/22 | |
| 3/2/22 | 2/28/22 - 3/6/22 |
| 3/4/22 | |
| 3/5/22 | |
| 3/5/22 | |
| 3/6/22 | |
| 3/6/22 | |
| | 3/7/22 - 3/13/22 |
| 3/14/22 | 3/14/22 - 3/20/22 |
| 3/14/22 | |
| 3/15/22 | |
| 3/21/22 | 3/21/22 - 3/27/22 |
| 3/21/22 | |
| 3/22/22 | |
| 3/28/22 | 3/28/22 - 4/3/22 |
| 3/28/22 | |
| 3/29/22 | |
| 4/4/22 | 4/4/22 - 4/10/22 |

FIG. 66E

*First BUCKET value returned to cell A4*

2/7/22 - 2/13/22

FIG. 66F

*Copy paste values returned to A5 to A12*

2/14/22 - 2/20/22
2/21/22 - 2/27/22
2/28/22 - 3/6/22
3/7/22 - 3/13/22
3/14/22 - 3/20/22
3/21/22 - 3/27/22
3/28/22 - 4/3/22
4/4/22 - 4/10/22

FIG. 68A

*Formulaic data available*

| district | source | country | donation | date |
|---|---|---|---|---|
| 5 | Online | US | 8025 | 2/9/22 |
| 52 | Online | Canada | 732.37 | 2/11/22 |
| 22 | Mail | US | 9870 | 2/12/22 |
| 53 | Mail | Canada | 1098.35 | 2/16/22 |
| 1 | In person | US | 6500 | 2/18/22 |
| 6 | Online | US | 6200 | 2/19/22 |
| 45 | Mail | US | 9875 | 2/23/22 |
| 25 | Mail | US | 3950 | 2/25/22 |
| 54 | Online | Canada | 510.76 | 2/26/22 |
| 1 | Mail | US | 3500 | 3/2/22 |
| 52 | Mail | Canada | 2109.45 | 3/4/22 |
| 7 | In person | US | 8500 | 3/5/22 |
| 6 | Online | US | 150 | 3/5/22 |
| 21 | Mail | US | 5000 | 3/6/22 |
| 56 | In person | Canada | 6750 | 3/6/22 |
| 5 | Online | US | 1500 | 3/14/22 |
| 29 | Mail | US | 5500 | 3/14/22 |
| 43 | Online | US | 750 | 3/15/22 |
| 7 | Mail | US | 6250 | 3/21/22 |
| 47 | Online | US | 1750 | 3/21/22 |
| 54 | Online | Canada | 2249.56 | 3/22/22 |
| 45 | Mail | US | 2500 | 3/28/22 |
| 54 | Mail | Canada | 3348.78 | 3/28/22 |
| 53 | Online | Canada | 658.45 | 3/29/22 |
| 42 | Online | US | 350 | 4/4/22 |

FIG. 68B

*date bucket data in A7 for COUNT formula*

| | Bucket values | date |
|---|---|---|
| | 2/7/22 - 2/13/22 | 2/9/22 |
| | | 2/11/22 |
| | | 2/12/22 |
| | 2/14/22 - 2/20/22 | 2/16/22 |
| | | 2/18/22 |
| | | 2/19/22 |
| | 2/21/22 - 2/27/22 | 2/23/22 |
| | | 2/25/22 |
| | | 2/26/22 |
| **date bucket value in A7** | 2/28/22 - 3/6/22 | 3/2/22 |
| | | 3/4/22 |
| | | 3/5/22 |
| | | 3/5/22 |
| `BUCKET_X(date{!BT_4} \| Week)` | | 3/6/22 |
| | | 3/6/22 |
| | 3/7/22 - 3/13/22 | |
| | 3/14/22 - 3/20/22 | 3/14/22 |
| | | 3/14/22 |
| | | 3/15/22 |
| | 3/21/22 - 3/27/22 | 3/21/22 |
| | | 3/21/22 |
| | | 3/22/22 |
| | 3/28/22 - 4/3/22 | 3/28/22 |
| | | 3/28/22 |
| | | 3/29/22 |
| | 4/4/22 - 4/10/22 | 4/4/22 |

FIG. 68C

*Retrieve matching donation data*

| donation |
|---|
| 3500 |
| 2109.45 |
| 8500 |
| 150 |
| 5000 |
| 6750 |

FIG. 68D

*Do the COUNT calc*

| COUNT |
|---|
| 6 |

FIG. 68E

*Return formatted value to cell B7*

6

FIG. 71A

*Data available*

| first | last | donation | date |
|---|---|---|---|
| Tom | Henry | 8025 | 2/7/22 |
| Sally | James | 732.37 | 2/11/22 |
| Bob | Edwards | 9870 | 2/12/22 |
| Mary | Watters | 1098.35 | 2/14/22 |
| Marc | Riener | 6500 | 2/18/22 |
| Laurie | Jones | 6200 | 2/19/22 |
| Harry | Franklin | 9875 | 2/21/22 |
| Elle | Johns | 3950 | 2/25/22 |
| Mia | Rawlings | 510.76 | 2/26/22 |
| David | Liu | 3500 | 2/28/22 |
| Raj | Lal | 2109.45 | 3/4/22 |
| Pierre | Joille | 8500 | 3/5/22 |
| Amy | Long | 150 | 3/7/22 |
| Henry | Latterman | 5000 | 3/11/22 |
| James | Edelman | 6750 | 3/12/22 |
| Bonnie | Mattery | 1500 | 3/14/22 |
| Sue | Waverley | 5500 | 3/18/22 |
| Ned | Allen | 750 | 3/19/22 |
| Howard | Kleiner | 6250 | 3/21/22 |
| Krish | Krishnam | 1750 | 3/25/22 |
| Jenny | Wong | 2249.56 | 3/26/22 |
| Raj | Gupta | 2500 | 3/28/22 |
| Kelli | Zang | 3348.78 | 4/1/22 |
| Julie | Jacobs | 658.45 | 4/2/22 |
| Allison | Altos | 350 | 4/4/22 |

FIG. 71B

*Data retrieved*

| date | last |
|---|---|
| 2/7/22 | Henry |
| 2/11/22 | James |
| 2/12/22 | Edwards |
| 2/14/22 | Watters |
| 2/18/22 | Riener |
| 2/19/22 | Jones |
| 2/21/22 | Franklin |
| 2/25/22 | Johns |
| 2/26/22 | Rawlings |
| 2/28/22 | Liu |
| 3/4/22 | Lal |
| 3/5/22 | Joille |
| 3/7/22 | Long |
| 3/11/22 | Latterman |
| 3/12/22 | Edelman |
| 3/14/22 | Mattery |
| 3/18/22 | Waverley |
| 3/19/22 | Allen |
| 3/21/22 | Kleiner |
| 3/25/22 | Krishnam |
| 3/26/22 | Wong |
| 3/28/22 | Gupta |
| 4/1/22 | Zang |
| 4/2/22 | Jacobs |
| 4/4/22 | Altos |

FIG. 71C

*Constrain (filter) data to date{'2/1/22'.. '3/31/22'}"*

| date | last |
|---|---|
| 2/7/22 | Henry |
| 2/11/22 | James |
| 2/12/22 | Edwards |
| 2/14/22 | Watters |
| 2/18/22 | Riener |
| 2/19/22 | Jones |
| 2/21/22 | Franklin |
| 2/25/22 | Johns |
| 2/26/22 | Rawlings |
| 2/28/22 | Liu |
| 3/4/22 | Lal |
| 3/5/22 | Joille |
| 3/7/22 | Long |
| 3/11/22 | Latterman |
| 3/12/22 | Edelman |
| 3/14/22 | Mattery |
| 3/18/22 | Waverley |
| 3/19/22 | Allen |
| 3/21/22 | Kleiner |
| 3/25/22 | Krishnam |
| 3/26/22 | Wong |
| 3/28/22 | Gupta |

FIG. 71D

*Bucket last first letter with [letter] and no fill*

| *Sort* last | *Create buckets* last | Bucket value |
|---|---|---|
| Allen | Allen | A |
| Edelman | Edelman | E |
| Edwards | Edwards | |
| Franklin | Franklin | F |
| Gupta | Gupta | G |
| Henry | Henry | H |
| James | James | J |
| Johns | Johns | |
| Joille | Joille | |
| Jones | Jones | |
| Kleiner | Kleiner | K |
| Krishnam | Krishnam | |
| Lal | Lal | L |
| Latterman | Latterman | |
| Liu | Liu | |
| Long | Long | |
| Mattery | Mattery | M |
| Rawlings | Rawlings | R |
| Riener | Riener | |
| Watters | Watters | W |
| Waverley | Waverley | |
| Wong | Wong | |

FIG. 71E

*First BUCKET value returned to cell A4*

A

FIG. 71F

*Copy paste values returned to A5 to A14*

E
F
G
H
J
K
L
M
R
W

FIG. 72A

*Organize the data for the calcs using the bucketed headings*

| Bucket value | last | donation |
|---|---|---|
| A | Allen | 750 |
| E | Edelman | 6750 |
| | Edwards | 9870 |
| F | Franklin | 9875 |
| G | Gupta | 2500 |
| H | Henry | 8025 |
| J | James | 732.37 |
| | Johns | 3950 |
| | Joille | 8500 |
| | Jones | 6200 |
| K | Kleiner | 6250 |
| | Krishnam | 1750 |
| L | Lal | 2109.45 |
| | Latterman | 5000 |
| | Liu | 3500 |
| | Long | 150 |
| M | Mattery | 1500 |
| R | Rawlings | 510.76 |
| | Riener | 6500 |
| W | Watters | 1098.35 |
| | Waverley | 5500 |
| | Wong | 2249.56 |

7233

FIG. 72B

*Do the AVERAGE and COUNT calculations*

| AVERAGE | COUNT |
|---|---|
| 750 | 1 |
| 8310 | 2 |
| 9875 | 1 |
| 2500 | 1 |
| 8025 | 1 |
| 4845.5925 | 4 |
| 4000 | 2 |
| 2689.8625 | 4 |
| 1500 | 1 |
| 3505.38 | 2 |
| 2949.3033 | 3 |

7235

FIG. 72C

*Format the data adding the Labels and send to cells A4 to C14 with formulas*

| | | | |
|---|---|---|---|
| A | | $750.00 | 1 |
| E | | $8,310.00 | 2 |
| F | | $9,875.00 | 1 |
| G | | $2,500.00 | 1 |
| H | | $8,025.00 | 1 |
| J | | $4,845.59 | 4 |
| K | | $4,000.00 | 2 |
| L | | $2,689.86 | 4 |
| M | | $1,500.00 | 1 |
| R | | $3,505.38 | 2 |
| W | | $2,949.30 | 3 |

7238

FIG. 74A

*Formulaic data available*

| exp | date | factor_1 | factor_2 | factor_3 |
|---|---|---|---|---|
| 32 | 3/19/22 | 1345 | 188 | 1172 |
| 14 | 1/22/22 | 1864 | 133 | 8688 |
| 31 | 2/5/22 | 1592 | 119 | 4763 |
| 44 | 3/3/22 | 1674 | 160 | 14437 |
| 39 | 1/6/22 | 1818 | 99 | 5931 |
| 5 | 2/25/22 | 860 | 157 | 12746 |
| 45 | 2/27/22 | 1820 | 73 | 14782 |
| 39 | 1/6/22 | 1758 | 77 | 4037 |
| 7 | 1/15/22 | 1032 | 91 | 7982 |
| 11 | 3/12/22 | 1620 | 153 | 12778 |
| 14 | 1/23/22 | 818 | 143 | 13659 |
| 40 | 1/10/22 | 831 | 161 | 7541 |
| 7 | 1/15/22 | 1373 | 78 | 7586 |
| 44 | 3/3/22 | 949 | 135 | 8823 |
| 44 | 3/3/22 | 1052 | 161 | 10131 |
| 11 | 3/13/22 | 1336 | 181 | 8523 |
| 5 | 2/25/22 | 911 | 110 | 3846 |
| 45 | 2/27/22 | 749 | 138 | 13794 |
| 31 | 2/5/22 | 1204 | 170 | 2780 |
| 39 | 2/8/22 | 1074 | 92 | 14706 |
| 40 | 1/10/22 | 1692 | 145 | 812 |
| 44 | 3/4/22 | 1638 | 110 | 4009 |
| 39 | 2/9/22 | 1661 | 117 | 2214 |
| 11 | 2/4/22 | 1861 | 146 | 10825 |
| 5 | 2/25/22 | 1663 | 135 | 9987 |

FIG. 74B

*Data retrieved*

| exp |
|---|
| 32 |
| 14 |
| 31 |
| 44 |
| 39 |
| 5 |
| 45 |
| 39 |
| 7 |
| 11 |
| 14 |
| 40 |
| 7 |
| 44 |
| 44 |
| 11 |
| 5 |
| 45 |
| 31 |
| 39 |
| 40 |
| 44 |
| 39 |
| 11 |
| 5 |

FIG. 74C

*Test for options*

| Tests | |
|---|---|
| 0.1 | X |
| 1 | X |
| 5 | ✓ |
| 10 | ✓ |
| 25 | ✓ |
| 50 | X |

FIG. 74D

*BUCKET values created with filling*

*Sort*

| exp |
|---|
| 5 |
| 5 |
| 5 |
| 7 |
| 7 |
| 11 |
| 11 |
| 11 |
| 14 |
| 14 |
| 31 |
| 31 |
| 32 |
| 39 |
| 39 |
| 39 |
| 39 |
| 40 |
| 40 |
| 44 |
| 44 |
| 44 |
| 44 |
| 45 |
| 45 |

| exp | bucket values |
|---|---|
| 5 | 0 - 9 |
| 5 | |
| 5 | |
| 7 | |
| 7 | |
| 11 | 10 - 19 |
| 11 | |
| 11 | |
| 14 | |
| 14 | |
| | 20 - 29 |
| 31 | 30 - 39 |
| 31 | |
| 32 | |
| 39 | |
| 39 | |
| 39 | |
| 39 | |
| 40 | 40 - 49 |
| 40 | |
| 44 | |
| 44 | |
| 44 | |
| 44 | |
| 45 | |
| 45 | |

FIG. 74E

*First BUCKET value returned to cell A5*

0 - 9

FIG. 75A

| Retrieve bucket data | | SUM calculation | | | COUNT calculation | |
|---|---|---|---|---|---|---|
| bucket values | factor_1 | SQRT(factor_1) | 1.3 | SUM | COUNT(factor_1) | SUM/COUNT |
| 0 - 9 | 860 | 29.3257566 | 1.3 | 170.77 | 5 | 34.1534403 |
| | 911 | 30.18277655 | | | | |
| | 1663 | 40.77989701 | | | | |
| | 1032 | 32.12475681 | | | | |
| | 1373 | 37.05401463 | | | | |

FIG. 75B

| Retrieve bucket data | | DEVSQ(COS()) calculation | |
|---|---|---|---|
| bucket values | factor_2 | COS(factor_2) | DEVSQ |
| 0 - 9 | 157 | 0.996830993 | 3.0834874 |
| | 110 | -0.999020813 | |
| | 135 | -0.996087835 | |
| | 91 | -0.994367461 | |
| | 78 | -0.857803093 | |

FIG. 75C

| Retrieve bucket data | | SUM(LOG10) calculation | |
|---|---|---|---|
| bucket values | factor_3 | LOG10(factor_3) | SUM |
| 0 - 9 | 12746 | 4.105373914 | 19.472 |
| | 3846 | 3.58500928 | |
| | 9987 | 3.99943505 | |
| | 7982 | 3.902111723 | |
| | 7586 | 3.880012838 | |

FIG. 75D

| Calc value |
|---|
| 34.1534403 |
| + 3.0834874 |
| -19.72 |
| =17.5169277 |

FIG. 75E

| Format value and send to cell B5 |
|---|
| 17.517 |

| Retrieve bucket data | | SUM calculation | | | COUNT calculation | |
|---|---|---|---|---|---|---|
| bucket values | factor_1 | SQRT(factor_1) | 1.3 | SUM | COUNT(factor_1) | SUM/COUNT |
| 10 - 19 | 1620 | 40.24922359 | 1.3 | 193.01 | 5 | 38.6029264 |
| | 1336 | 36.55133376 | | | | |
| | 1861 | 43.13930922 | | | | |
| | 1864 | 43.17406629 | | | | |
| | 818 | 28.60069929 | | | | |
| 20 - 29 | | | | | | |
| 30 - 39 | 1592 | 39.89987469 | 1.3 | 270.67 | 7 | 38.666664 |
| | 1204 | 34.69870315 | | | | |
| | 1345 | 36.67424164 | | | | |
| | 1818 | 42.63801121 | | | | |
| | 1758 | 41.92851059 | | | | |
| | 1074 | 32.77193922 | | | | |
| | 1661 | 40.75536774 | | | | |
| 40 - 49 | 831 | 28.82707061 | 1.3 | 285.92 | 8 | 35.7396839 |
| | 1692 | 41.1339276 | | | | |
| | 1674 | 40.91454509 | | | | |
| | 949 | 30.8058436 | | | | |
| | 1052 | 32.43454948 | | | | |
| | 1638 | 40.47221269 | | | | |
| | 1820 | 42.66145802 | | | | |
| | 749 | 27.36786437 | | | | |

FIG. 77

| Retrieve bucket data | | DEVSQ(COS()) calculation | |
|---|---|---|---|
| bucket values | factor_2 | COS(factor_2) | DEVSQ |
| 10 - 19 | 153 | -0.591369684 | 0.6967056 |
| | 181 | 0.350797342 | |
| | 146 | 0.083959437 | |
| | 133 | 0.49487222 | |
| | 143 | 0.057502525 | |
| 20 - 29 | | | |
| 30 - 39 | 119 | 0.928471321 | 3.1532728 |
| | 170 | 0.937994752 | |
| | 188 | 0.879702927 | |
| | 99 | 0.03982088 | |
| | 77 | -0.030975032 | |
| | 92 | -0.626444448 | |
| | 117 | -0.724097197 | |
| 40 - 49 | 161 | -0.711774756 | 4.8874792 |
| | 145 | 0.883863374 | |
| | 160 | -0.975629313 | |
| | 135 | -0.996087835 | |
| | 161 | -0.711774756 | |
| | 110 | -0.999020813 | |
| | 73 | -0.736192718 | |
| | 138 | 0.973648893 | |

FIG. 78

| Retrieve bucket data | | SUM(LOG10) calculation | |
|---|---|---|---|
| bucket values | factor_3 | LOG10(factor_3) | SUM |
| 10 - 19 | 12778 | 4.106462884 | 20.146 |
| | 8523 | 3.930592488 | |
| | 10825 | 4.034427905 | |
| | 8688 | 3.938919812 | |
| | 13659 | 4.135418905 | |
| 20 - 29 | | | |
| 30 - 39 | 4763 | 3.677880582 | 25.083 |
| | 2780 | 3.444044796 | |
| | 1172 | 3.068927612 | |
| | 5931 | 3.773127924 | |
| | 4037 | 3.606058749 | |
| | 14706 | 4.167494562 | |
| | 2214 | 3.345177617 | |
| 40 - 49 | 7541 | 3.877428941 | 30.81 |
| | 812 | 2.909556029 | |
| | 14437 | 4.159476956 | |
| | 8823 | 3.945616279 | |
| | 10131 | 4.005652315 | |
| | 4009 | 3.603036056 | |
| | 14782 | 4.169733198 | |
| | 13794 | 4.139690222 | |

FIG. 79A

Do Value calculations

| bucket values | Value |
|---|---|
| 10 - 19 | 19.15381007 |
| 20 - 29 | |
| 30 - 39 | 16.73722499 |
| 40 - 49 | 9.816973125 |

FIG. 79B

Format for cells A6 to B9

| | |
|---|---|
| 10 - 19.99... | 19.154 |
| 20 - 29.99... | |
| 30 - 39.99... | 16.737 |
| 40 - 49.99... | 9.817 |

FIG. 79C

FIG. 81A

*Data retrieved*

| district | donation |
|---|---|
| 5 | 8025 |
| 52 | 732.37 |
| 22 | 9870 |
| 53 | 1098.35 |
| 1 | 6500 |
| 6 | 6200 |
| 45 | 9875 |
| 25 | 3950 |
| 54 | 510.76 |
| 1 | 3500 |
| 52 | 2109.45 |
| 7 | 8500 |
| 6 | 150 |
| 21 | 5000 |
| 56 | 6750 |
| 5 | 1500 |
| 29 | 5500 |
| 43 | 750 |
| 7 | 6250 |
| 47 | 1750 |
| 54 | 2249.56 |
| 45 | 2500 |
| 54 | 3348.78 |
| 53 | 658.45 |
| 42 | 350 |

FIG. 81B

*Do BUCKET_10(district)*

*Sort*

| district |
|---|
| 1 |
| 1 |
| 5 |
| 5 |
| 6 |
| 6 |
| 7 |
| 7 |
| 21 |
| 22 |
| 25 |
| 29 |
| 42 |
| 43 |
| 45 |
| 45 |
| 47 |
| 52 |
| 52 |
| 53 |
| 53 |
| 54 |
| 54 |
| 54 |
| 56 |

*Create filled buckets*

| district | Bucket values |
|---|---|
| 1 | 0 - 9 |
| 1 | |
| 5 | |
| 5 | |
| 6 | |
| 6 | |
| 7 | |
| 7 | |
| | 10 - 19 |
| 21 | 20 - 29 |
| 22 | |
| 25 | |
| 29 | |
| | 30 - 39 |
| 42 | 40 - 49 |
| 43 | |
| 45 | |
| 45 | |
| 47 | |
| 52 | 50 - 59 |
| 52 | |
| 53 | |
| 53 | |
| 54 | |
| 54 | |
| 54 | |
| 56 | |

FIG. 81C

*Use bucket values in rest of WRITE*

*Match values* *Do calculations*

| donation | COUNT | SUM |
|---|---|---|
| 6500 | 8 | 40625 |
| 3500 | | |
| 8025 | | |
| 1500 | | |
| 6200 | | |
| 150 | | |
| 8500 | | |
| 6250 | | |
| | | |
| 5000 | 4 | 24320 |
| 9870 | | |
| 3950 | | |
| 5500 | | |
| | | |
| 350 | 5 | 15225 |
| 750 | | |
| 9875 | | |
| 2500 | | |
| 1750 | | |
| 732.37 | 8 | 17457.7 |
| 2109.45 | | |
| 1098.35 | | |
| 658.45 | | |
| 510.76 | | |
| 2249.56 | | |
| 3348.78 | | |
| 6750 | | |

FIG. 81D

*Format for cells A4 to C9*

| | | |
|---|---|---|
| 0 - 9 | 8 | $40,625.00 |
| 10 - 19 | | |
| 20 - 29 | 4 | $24,320.00 |
| 30 - 39 | | |
| 40 - 49 | 5 | $15,225.00 |
| 50 - 59 | 8 | $17,457.72 |

FIG. 83A

*Data retrieved*

| district | donation |
|---|---|
| 5 | 8025 |
| 52 | 732.37 |
| 22 | 9870 |
| 53 | 1098.35 |
| 1 | 6500 |
| 6 | 6200 |
| 45 | 9875 |
| 25 | 3950 |
| 54 | 510.76 |
| 1 | 3500 |
| 52 | 2109.45 |
| 7 | 8500 |
| 6 | 150 |
| 21 | 5000 |
| 56 | 6750 |
| 5 | 1500 |
| 29 | 5500 |
| 43 | 750 |
| 7 | 6250 |
| 47 | 1750 |
| 54 | 2249.56 |
| 45 | 2500 |
| 54 | 3348.78 |
| 53 | 658.45 |
| 42 | 350 |

FIG. 83B

*Do BUCKET_10(district)*

| *Sort* district | *Create filled buckets* district | Bucket values |
|---|---|---|
| 1 | 1 | 0 - 9 |
| 1 | 1 | |
| 5 | 5 | |
| 5 | 5 | |
| 6 | 6 | |
| 6 | 6 | |
| 7 | 7 | |
| 7 | 7 | |
| 21 | 21 | 20 - 29 |
| 22 | 22 | |
| 25 | 25 | |
| 29 | 29 | |
| 42 | 42 | 40 - 49 |
| 43 | 43 | |
| 45 | 45 | |
| 45 | 45 | |
| 47 | 47 | |
| 52 | 52 | 50 - 59 |
| 52 | 52 | |
| 53 | 53 | |
| 53 | 53 | |
| 54 | 54 | |
| 54 | 54 | |
| 54 | 54 | |
| 56 | 56 | |

FIG. 83C

*Use bucket values in rest of WRITE*

| *Match values* donation | *Do calculations* COUNT | SUM |
|---|---|---|
| 6500 | 8 | 40625 |
| 3500 | | |
| 8025 | | |
| 1500 | | |
| 6200 | | |
| 150 | | |
| 8500 | | |
| 6250 | | |
| 5000 | 4 | 24320 |
| 9870 | | |
| 3950 | | |
| 5500 | | |
| 350 | 5 | 15225 |
| 750 | | |
| 9875 | | |
| 2500 | | |
| 1750 | | |
| 732.37 | 8 | 17457.72 |
| 2109.45 | | |
| 1098.35 | | |
| 658.45 | | |
| 510.76 | | |
| 2249.56 | | |
| 3348.78 | | |
| 6750 | | |

FIG. 83D

*Format for cells A4 to C7*

| | | |
|---|---|---|
| 0 - 9 | 8 | $40,625.00 |
| 20 - 29 | 4 | $24,320.00 |
| 40 - 49 | 5 | $15,225.00 |
| 50 - 59 | 8 | $17,457.72 |

FIG. 85A

*Formulaic data available*

| source | country | donation | date |
|---|---|---|---|
| Online | US | 8025 | 2/7/22 |
| Online | Canada | 732.37 | 2/11/22 |
| Mail | US | 9870 | 2/12/22 |
| Mail | Canada | 1098.35 | 2/14/22 |
| In person | US | 6500 | 2/18/22 |
| Online | US | 6200 | 2/19/22 |
| Mail | US | 9875 | 2/21/22 |
| Online | US | 3950 | 2/25/22 |
| Online | Canada | 510.76 | 2/26/22 |
| Mail | US | 3500 | 2/28/22 |
| Mail | Canada | 2109.45 | 3/4/22 |
| In person | US | 8500 | 3/5/22 |
| Online | US | 150 | 3/7/22 |
| Mail | US | 5000 | 3/11/22 |
| In person | Canada | 6750 | 3/12/22 |
| Online | US | 1500 | 3/14/22 |
| Mail | US | 5500 | 3/18/22 |
| Online | US | 750 | 3/19/22 |
| Mail | US | 6250 | 3/21/22 |
| Online | US | 1750 | 3/25/22 |
| Online | Canada | 2249.56 | 3/26/22 |
| Mail | US | 2500 | 3/28/22 |
| Mail | Canada | 3348.78 | 4/1/22 |
| Online | Canada | 658.45 | 4/2/22 |
| Online | US | 350 | 4/4/22 |

FIG. 85B

*Data retrieved*

| donation |
|---|
| 8025 |
| 732.37 |
| 9870 |
| 1098.35 |
| 6500 |
| 6200 |
| 9875 |
| 3950 |
| 510.76 |
| 3500 |
| 2109.45 |
| 8500 |
| 150 |
| 5000 |
| 6750 |
| 1500 |
| 5500 |
| 750 |
| 6250 |
| 1750 |
| 2249.56 |
| 2500 |
| 3348.78 |
| 658.45 |
| 350 |

FIG. 85C

*donations sorted*

| donation |
|---|
| 150 |
| 350 |
| 510.76 |
| 658.45 |
| 732.37 |
| 750 |
| 1098.35 |
| 1500 |
| 1750 |
| 2109.45 |
| 2249.56 |
| 2500 |
| 3348.78 |
| 3500 |
| 3950 |
| 5000 |
| 5500 |
| 6200 |
| 6250 |
| 6500 |
| 6750 |
| 8025 |
| 8500 |
| 9875 |
| 9870 |

FIG. 85F

*BUCKET values created*

| donation | Increment values |
|---|---|
| 150 | 0 - 999.99... |
| 350 | |
| 510.76 | |
| 658.45 | |
| 732.37 | |
| 750 | |
| 1098.35 | 1000 - 1999.99... |
| 1500 | |
| 1750 | |
| 2109.45 | 2000 - 2999.99... |
| 2249.56 | |
| 2500 | |
| 3348.78 | 3000 - 3999.99... |
| 3500 | |
| 3950 | |
| 5000 | 5000 - 5999.99... |
| 5500 | |
| 6200 | 6000 - 6999.99... |
| 6250 | |
| 6500 | |
| 6750 | |
| 8025 | 8000 - 8999.99... |
| 8500 | |
| 9870 | 9000 - 9999.99... |
| 9875 | |

FIG. 85G

*BUCKET values prepared for cells and filled*

0 - 999.99...
1000 - 1999.99...
2000 - 2999.99...
3000 - 3999.99...
4000 - 4999.99...
5000 - 5999.99...
6000 - 6999.99...
7000 - 7999.99...
8000 - 8999.99...
9000 - 9999.99...

8538 8558

FIG. 85D

*Auto starting point determination*

*150/1000=0.15*

*0/1000=0*

FIG. 85E

*Auto ending point determination*

*9999.99...*

FIG. 88A

*Formulaic data available*

| source | country | donation | date |
|---|---|---|---|
| Online | US | 8025 | 2/7/22 |
| Online | Canada | 732.37 | 2/11/22 |
| Mail | US | 9870 | 2/12/22 |
| Mail | Canada | 1098.35 | 2/14/22 |
| In person | US | 6500 | 2/18/22 |
| Online | US | 6200 | 2/19/22 |
| Mail | US | 9875 | 2/21/22 |
| Online | US | 3950 | 2/25/22 |
| Online | Canada | 510.76 | 2/26/22 |
| Mail | US | 3500 | 2/28/22 |
| Mail | Canada | 2109.45 | 3/4/22 |
| In person | US | 8500 | 3/5/22 |
| Online | US | 150 | 3/7/22 |
| Mail | US | 5000 | 3/11/22 |
| In person | Canada | 6750 | 3/12/22 |
| Online | US | 1500 | 3/14/22 |
| Mail | US | 5500 | 3/18/22 |
| Online | US | 750 | 3/19/22 |
| Mail | US | 6250 | 3/21/22 |
| Online | US | 1750 | 3/25/22 |
| Online | Canada | 2249.56 | 3/26/22 |
| Mail | US | 2500 | 3/28/22 |
| Mail | Canada | 3348.78 | 4/1/22 |
| Online | Canada | 658.45 | 4/2/22 |
| Online | US | 350 | 4/4/22 |

FIG. 88B

*Data retrieved*

| donation |
|---|
| 8025 |
| 732.37 |
| 9870 |
| 1098.35 |
| 6500 |
| 6200 |
| 9875 |
| 3950 |
| 510.76 |
| 3500 |
| 2109.45 |
| 8500 |
| 150 |
| 5000 |
| 6750 |
| 1500 |
| 5500 |
| 750 |
| 6250 |
| 1750 |
| 2249.56 |
| 2500 |
| 3348.78 |
| 658.45 |
| 350 |

FIG. 88C

*donations sorted*

| donation |
|---|
| 150 |
| 350 |
| 510.76 |
| 658.45 |
| 732.37 |
| 750 |
| 1098.35 |
| 1500 |
| 1750 |
| 2109.45 |
| 2249.56 |
| 2500 |
| 3348.78 |
| 3500 |
| 3950 |
| 5000 |
| 5500 |
| 6200 |
| 6250 |
| 6500 |
| 6750 |
| 8025 |
| 8500 |
| 9875 |
| 9870 |

FIG. 88D

*BUCKET values created*

| donation | Increment values |
|---|---|
| 150 | 0 - 999.99... |
| 350 | |
| 510.76 | |
| 658.45 | |
| 732.37 | |
| 750 | |
| 1098.35 | 1000 - 1999.99... |
| 1500 | |
| 1750 | |
| 2109.45 | 2000 - 2999.99... |
| 2249.56 | |
| 2500 | |
| 3348.78 | 3000 - 3999.99... |
| 3500 | |
| 3950 | |
| 5000 | 5000 - 5999.99... |
| 5500 | |
| 6200 | 6000 - 6999.99... |
| 6250 | |
| 6500 | |
| 6750 | |
| 8025 | 8000 - 8999.99... |
| 8500 | |
| 9870 | 9000 - 9999.99... |
| 9875 | |

FIG. 88E

*BUCKET values prepared for cells with NO filling*

| |
|---|
| 0 - 999.99... |
| 1000 - 1999.99... |
| 2000 - 2999.99... |
| 3000 - 3999.99... |
| 5000 - 5999.99... |
| 6000 - 6999.99... |
| 8000 - 8999.99... |
| 9000 - 9999.99... |

FIG. 90A

*Formulaic data available*

| source | country | donation | date |
|---|---|---|---|
| Online | US | 8025 | 2/7/22 |
| Online | Canada | 732.37 | 2/7/22 |
| Mail | US | 9870 | 2/7/22 |
| Mail | Canada | 1098.35 | 2/7/22 |
| In person | US | 6500 | 2/7/22 |
| Online | US | 6200 | 2/7/22 |
| Mail | US | 9875 | 2/8/22 |
| Online | US | 3950 | 2/8/22 |
| Online | Canada | 510.76 | 2/8/22 |
| Mail | US | 3500 | 2/9/22 |
| Mail | Canada | 2109.45 | 2/9/22 |
| In person | US | 8500 | 2/9/22 |
| Online | US | 150 | 2/9/22 |
| Mail | US | 5000 | 2/9/22 |
| In person | Canada | 6750 | 2/9/22 |
| Online | US | 1500 | 2/10/22 |
| Mail | US | 5500 | 2/11/22 |
| Online | US | 750 | 2/11/22 |
| Mail | US | 6250 | 2/11/22 |
| Online | US | 1750 | 2/11/22 |
| Online | Canada | 2249.56 | 2/11/22 |
| Mail | US | 2500 | 2/12/22 |
| Mail | Canada | 3348.78 | 2/12/22 |
| Online | Canada | 658.45 | 2/12/22 |
| Online | US | 350 | 2/12/22 |

FIG. 90B

*Data retrieved for Insert value of donation in A4*

| Increment values | donation |
|---|---|
| 0 - 999.99... | 150 |
| | 350 |
| | 510.76 |
| | 658.45 |
| | 732.37 |
| | 750 |

FIG. 90C

*COUNT calculation*

| Increment values | donation | COUNT |
|---|---|---|
| 0 - 999.99... | 150 | 6 |
| | 350 | |
| | 510.76 | |
| | 658.45 | |
| | 732.37 | |
| | 750 | |

FIG. 90D

*Result returned to cell B4*

6

FIG. 90E

*Data retrieved for Insert value of donation in A4*

| Increment values | donation |
|---|---|
| 0 - 999.99... | 150 |
| | 350 |
| | 510.76 |
| | 658.45 |
| | 732.37 |
| | 750 |

FIG. 90F

*COUNT calculation*

| Increment values | donation | SUM |
|---|---|---|
| 0 - 999.99... | 150 | $3,151.58 |
| | 350 | |
| | 510.76 | |
| | 658.45 | |
| | 732.37 | |
| | 750 | |

FIG. 90G

*Result returned to cell C4*

$3,151.58

FIG. 92A

*Column A BUCKET values retrieved*

| Bucket values |
|---|
| 1000 - 1999.99... |
| |
| |
| 2000 - 2999.99... |
| |
| |
| 3000 - 3999.99... |
| |
| |
| 4000 - 4999.99... |
| 5000 - 5999.99... |
| |
| 6000 - 6999.99... |
| |
| |
| |
| 7000 - 7999.99... |
| 8000 - 8999.99... |
| |
| 9000 - 9999.99... |
| |

FIG. 92B

*Donation data retrieved with BUCKET sorting*

| donation |
|---|
| 1098.35 |
| 1500 |
| 1750 |
| 2109.45 |
| 2249.56 |
| 2500 |
| 3348.78 |
| 3500 |
| 3950 |
| |
| 5000 |
| 5500 |
| 6200 |
| 6250 |
| 6500 |
| 6750 |
| |
| 8025 |
| 8500 |
| 9870 |
| 9875 |

FIG. 92C

*Do the SUM calculations*

| COUNT |
|---|
| 3 |
| 3 |
| 3 |
| 2 |
| 4 |
| 2 |
| 2 |

FIG. 92D

*Do the COUNT calculations*

| SUM |
|---|
| 4348.4 |
| 6859 |
| 10799 |
| 10500 |
| 25700 |
| 16525 |
| 19745 |

FIG. 92E

*Format for cells B5 to C13*

| | |
|---|---|
| 3 | $4,348.35 |
| 3 | $6,859.01 |
| 3 | $10,798.78 |
| | |
| 2 | $10,500.00 |
| 4 | $25,700.00 |
| | |
| 2 | $16,525.00 |
| 2 | $19,745.00 |

FIG. 98A

*Formulaic data available*

| source | country | donation | date |
|---|---|---|---|
| Online | US | 8025 | 2/7/22 |
| Online | Canada | 732.37 | 2/11/22 |
| Mail | US | 9870 | 2/12/22 |
| Mail | Canada | 1098.35 | 2/14/22 |
| In person | US | 6500 | 2/18/22 |
| Online | US | 6200 | 2/19/22 |
| Mail | US | 9875 | 2/21/22 |
| Online | US | 3950 | 2/25/22 |
| Online | Canada | 510.76 | 2/26/22 |
| Mail | US | 3500 | 2/28/22 |
| Mail | Canada | 2109.45 | 3/4/22 |
| In person | US | 8500 | 3/5/22 |
| Online | US | 150 | 3/7/22 |
| Mail | US | 5000 | 3/11/22 |
| In person | Canada | 6750 | 3/12/22 |
| Online | US | 1500 | 3/14/22 |
| Mail | US | 5500 | 3/18/22 |
| Online | US | 750 | 3/19/22 |
| Mail | US | 6250 | 3/21/22 |
| Online | US | 1750 | 3/25/22 |
| Online | Canada | 2249.56 | 3/26/22 |
| Mail | US | 2500 | 3/28/22 |
| Mail | Canada | 3348.78 | 4/1/22 |
| Online | Canada | 658.45 | 4/2/22 |
| Online | US | 350 | 4/4/22 |

FIG. 98B

*Data retrieved*

| donation |
|---|
| 8025 |
| 732.37 |
| 9870 |
| 1098.35 |
| 6500 |
| 6200 |
| 9875 |
| 3950 |
| 510.76 |
| 3500 |
| 2109.45 |
| 8500 |
| 150 |
| 5000 |
| 6750 |
| 1500 |
| 5500 |
| 750 |
| 6250 |
| 1750 |
| 2249.56 |
| 2500 |
| 3348.78 |
| 658.45 |
| 350 |

FIG. 98C

*donations sorted*

| donation |
|---|
| 150 |
| 350 |
| 510.76 |
| 658.45 |
| 732.37 |
| 750 |
| 1098.35 |
| 1500 |
| 1750 |
| 2109.45 |
| 2249.56 |
| 2500 |
| 3348.78 |
| 3500 |
| 3950 |
| 5000 |
| 5500 |
| 6200 |
| 6250 |
| 6500 |
| 6750 |
| 8025 |
| 8500 |
| 9875 |
| 9870 |

FIG. 98E

*BUCKET values created*

| donation | Increment values |
|---|---|
| 150 | 0 - 999.99... |
| 350 | |
| 510.76 | |
| 658.45 | |
| 732.37 | |
| 750 | |
| 1098.35 | 1000 - 1999.99... |
| 1500 | |
| 1750 | |
| 2109.45 | 2000 - 2999.99... |
| 2249.56 | |
| 2500 | |
| 3348.78 | 3000 - 3999.99... |
| 3500 | |
| 3950 | |
| 5000 | 5000 - 5999.99... |
| 5500 | |
| 6200 | 6000 - 6999.99... |
| 6250 | |
| 6500 | |
| 6750 | |
| 8025 | 8000 - 8999.99... |
| 8500 | |
| 9870 | 9000 - 9999.99... |
| 9875 | |

FIG. 98F

*BUCKET values prepared for cells NO fill*

| |
|---|
| 0 - 999.99... |
| 1000 - 1999.99... |
| 2000 - 2999.99... |
| 3000 - 3999.99... |
| 5000 - 5999.99... |
| 6000 - 6999.99... |
| 8000 - 8999.99... |
| 9000 - 9999.99... |

FIG. 98D

*Test for options*

| Tests | |
|---|---|
| 0.1 | X |
| 1 | X |
| 5 | ✓ |
| 10 | ✓ |
| 20 | ✓ |
| 50 | ✓ |
| 100 | ✓ |
| 200 | ✓ |
| 500 | ✓ |
| 1000 | ✓ |
| 2000 | ✓ |
| 5000 | ✓ |
| 10000 | X |

FIG. 99A

*Formulaic data available*

| district | source | country | donation | date |
|---|---|---|---|---|
| 5 | Online | US | 8025 | 2/7/22 |
| 52 | Online | Canada | 732.37 | 2/11/22 |
| 22 | Mail | US | 9870 | 2/12/22 |
| 53 | Mail | Canada | 1098.35 | 2/14/22 |
| 1 | In person | US | 6500 | 2/18/22 |
| 6 | Online | US | 6200 | 2/19/22 |
| 45 | Mail | US | 9875 | 2/21/22 |
| 25 | Mail | US | 3950 | 2/25/22 |
| 54 | Online | Canada | 510.76 | 2/26/22 |
| 1 | Mail | US | 3500 | 2/28/22 |
| 52 | Mail | Canada | 2109.45 | 3/4/22 |
| 7 | In person | US | 8500 | 3/5/22 |
| 6 | Online | US | 150 | 3/7/22 |
| 21 | Mail | US | 5000 | 3/11/22 |
| 56 | In person | Canada | 6750 | 3/12/22 |
| 5 | Online | US | 1500 | 3/14/22 |
| 29 | Mail | US | 5500 | 3/18/22 |
| 43 | Online | US | 750 | 3/19/22 |
| 7 | Mail | US | 6250 | 3/21/22 |
| 47 | Online | US | 1750 | 3/25/22 |
| 54 | Online | Canada | 2249.56 | 3/26/22 |
| 45 | Mail | US | 2500 | 3/28/22 |
| 54 | Mail | Canada | 3348.78 | 4/1/22 |
| 53 | Online | Canada | 658.45 | 4/2/22 |
| 42 | Online | US | 350 | 4/4/22 |

FIG. 99B

*Data retrieved*

| country | donation |
|---|---|
| US | 8025 |
| Canada | 732.37 |
| US | 9870 |
| Canada | 1098.35 |
| US | 6500 |
| US | 6200 |
| US | 9875 |
| US | 3950 |
| Canada | 510.76 |
| US | 3500 |
| Canada | 2109.45 |
| US | 8500 |
| US | 150 |
| US | 5000 |
| Canada | 6750 |
| US | 1500 |
| US | 5500 |
| US | 750 |
| US | 6250 |
| US | 1750 |
| Canada | 2249.56 |
| US | 2500 |
| Canada | 3348.78 |
| Canada | 658.45 |
| US | 350 |

FIG. 99C

*Values constrained to country Canada*

| country | donation |
|---|---|
| Canada | 732.37 |
| Canada | 1098.35 |
| Canada | 510.76 |
| Canada | 2109.45 |
| Canada | 6750 |
| Canada | 2249.56 |
| Canada | 3348.78 |
| Canada | 658.45 |

FIG. 99D

*Sort donation values*

| donation |
|---|
| 510.76 |
| 658.45 |
| 732.37 |
| 1098.35 |
| 2109.45 |
| 2249.56 |
| 3348.78 |
| 6750 |

FIG. 99F

*BUCKET values created*

| donation | bucket values |
|---|---|
| 510.76 | 0 - 999.99... |
| 658.45 | |
| 732.37 | |
| 1098.35 | 1000 - 1999.99... |
| 2109.45 | 2000 - 2999.99... |
| 2249.56 | |
| 3348.78 | 3000 - 3999.99... |
| 6750 | 6000 - 6999.99... |

FIG. 99E

*Test for options*

| Tests | |
|---|---|
| 0.1 | X |
| 1 | X |
| 5 | ✓ |
| 10 | ✓ |
| 20 | ✓ |
| 50 | ✓ |
| 100 | ✓ |
| 200 | ✓ |
| 500 | ✓ |
| 1000 | ✓ |
| 2000 | ✓ |
| 5000 | ✓ |
| 10000 | X |

FIG. 99G

*BUCKET values prepared for cells NO fill*

| |
|---|
| 0 - 999.99... |
| 1000 - 1999.99... |
| 2000 - 2999.99... |
| 3000 - 3999.99... |
| 6000 - 6999.99... |

FIG. 101A

*Formulaic data available*

| district | source | country | donation | date |
|---|---|---|---|---|
| 5 | Online | US | 8025 | 2/9/22 |
| 52 | Online | Canada | 732.37 | 2/11/22 |
| 22 | Mail | US | 9870 | 2/12/22 |
| 53 | Mail | Canada | 1098.35 | 2/16/22 |
| 1 | In person | US | 6500 | 2/18/22 |
| 6 | Online | US | 6200 | 2/19/22 |
| 45 | Mail | US | 9875 | 2/23/22 |
| 25 | Mail | US | 3950 | 2/25/22 |
| 54 | Online | Canada | 510.76 | 2/26/22 |
| 1 | Mail | US | 3500 | 3/2/22 |
| 52 | Mail | Canada | 2109.45 | 3/4/22 |
| 7 | In person | US | 8500 | 3/5/22 |
| 6 | Online | US | 150 | 3/5/22 |
| 21 | Mail | US | 5000 | 3/6/22 |
| 56 | In person | Canada | 6750 | 3/7/22 |
| 5 | Online | US | 1500 | 3/14/22 |
| 29 | Mail | US | 5500 | 3/14/22 |
| 43 | Online | US | 750 | 3/15/22 |
| 7 | Mail | US | 6250 | 3/21/22 |
| 47 | Online | US | 1750 | 3/21/22 |
| 54 | Online | Canada | 2249.56 | 3/22/22 |
| 45 | Mail | US | 2500 | 3/28/22 |
| 54 | Mail | Canada | 3348.78 | 3/28/22 |
| 53 | Online | Canada | 658.45 | 3/29/22 |
| 42 | Online | US | 350 | 4/4/22 |

FIG. 101B

*Data retrieved*

| date |
|---|
| 2/7/22 |
| 2/11/22 |
| 2/12/22 |
| 2/14/22 |
| 2/18/22 |
| 2/19/22 |
| 2/21/22 |
| 2/25/22 |
| 2/26/22 |
| 2/28/22 |
| 3/4/22 |
| 3/5/22 |
| 3/7/22 |
| 3/11/22 |
| 3/12/22 |
| 3/14/22 |
| 3/18/22 |
| 3/19/22 |
| 3/21/22 |
| 3/25/22 |
| 3/26/22 |
| 3/28/22 |
| 4/1/22 |
| 4/2/22 |
| 4/4/22 |

FIG. 101C

*Test for options*

| Tests | |
|---|---|
| Minute | X |
| Hour | X |
| Day | X |
| Week | ✓ |
| Month | ✓ |
| Quarter | ✓ |
| Year | X |
| Decade | X |

FIG. 101D

*BUCKET values created with filling*

| date | Bucket values |
|---|---|
| 2/9/22 | 2/7/22 - 2/13/22 |
| 2/11/22 | |
| 2/12/22 | |
| 2/16/22 | 2/14/22 - 2/20/22 |
| 2/18/22 | |
| 2/19/22 | |
| 2/23/22 | 2/21/22 - 2/27/22 |
| 2/25/22 | |
| 2/26/22 | |
| 3/2/22 | 2/28/22 - 3/6/22 |
| 3/4/22 | |
| 3/5/22 | |
| 3/5/22 | |
| 3/6/22 | |
| 3/6/22 | |
| | 3/7/22 - 3/13/22 |
| 3/14/22 | 3/14/22 - 3/20/22 |
| 3/14/22 | |
| 3/15/22 | |
| 3/21/22 | 3/21/22 - 3/27/22 |
| 3/21/22 | |
| 3/22/22 | |
| 3/28/22 | 3/28/22 - 4/3/22 |
| 3/28/22 | |
| 3/29/22 | |
| 4/4/22 | 4/4/22 - 4/10/22 |

FIG. 101E

*Values formatted and sent to cells A4 to A11*

| |
|---|
| 2/7/22 - 2/13/22 |
| 2/14/22 - 2/20/22 |
| 2/21/22 - 2/27/22 |
| 2/28/22 - 3/6/22 |
| 3/7/22 - 3/13/22 |
| 3/14/22 - 3/20/22 |
| 3/21/22 - 3/27/22 |
| 3/28/22 - 4/3/22 |
| 4/4/22 - 4/10/22 |

FIG. 104A

*Data retrieved*

| date | last |
|---|---|
| 2/7/22 | Henry |
| 2/11/22 | James |
| 2/12/22 | Edwards |
| 2/14/22 | Watters |
| 2/18/22 | Riener |
| 2/19/22 | Jones |
| 2/21/22 | Franklin |
| 2/25/22 | Johns |
| 2/26/22 | Rawlings |
| 2/28/22 | Liu |
| 3/4/22 | Lal |
| 3/5/22 | Joille |
| 3/7/22 | Long |
| 3/11/22 | Latterman |
| 3/12/22 | Edelman |
| 3/14/22 | Mattery |
| 3/18/22 | Waverley |
| 3/19/22 | Allen |
| 3/21/22 | Kleiner |
| 3/25/22 | Krishnam |
| 3/26/22 | Wong |
| 3/28/22 | Gupta |
| 4/1/22 | Zang |
| 4/2/22 | Jacobs |
| 4/4/22 | Altos |

FIG. 104B

*Test for options*

| Tests | |
|---|---|
| Characters | X |
| Alphanumerics | X |
| Letter | ✓ |
| Letter groups | ✓ |
| Custom | ✓ |
| Words | X |

FIG. 104C

*Constrain (filter) data to date{'2/1/22'.. '3/31/22'}"*

| date | last |
|---|---|
| 2/7/22 | Henry |
| 2/11/22 | James |
| 2/12/22 | Edwards |
| 2/14/22 | Watters |
| 2/18/22 | Riener |
| 2/19/22 | Jones |
| 2/21/22 | Franklin |
| 2/25/22 | Johns |
| 2/26/22 | Rawlings |
| 2/28/22 | Liu |
| 3/4/22 | Lal |
| 3/5/22 | Joille |
| 3/7/22 | Long |
| 3/11/22 | Latterman |
| 3/12/22 | Edelman |
| 3/14/22 | Mattery |
| 3/18/22 | Waverley |
| 3/19/22 | Allen |
| 3/21/22 | Kleiner |
| 3/25/22 | Krishnam |
| 3/26/22 | Wong |
| 3/28/22 | Gupta |

FIG. 104D

*Bucket last first letter with [letter] and no fill*

*Sort* | *Create buckets*

| last | last | Bucket value |
|---|---|---|
| Allen | Allen | A |
| Edelman | Edelman | E |
| Edwards | Edwards | |
| Franklin | Franklin | F |
| Gupta | Gupta | G |
| Henry | Henry | H |
| James | James | J |
| Johns | Johns | |
| Joille | Joille | |
| Jones | Jones | |
| Kleiner | Kleiner | K |
| Krishnam | Krishnam | |
| Lal | Lal | L |
| Latterman | Latterman | |
| Liu | Liu | |
| Long | Long | |
| Mattery | Mattery | M |
| Rawlings | Rawlings | R |
| Riener | Riener | |
| Watters | Watters | W |
| Waverley | Waverley | |
| Wong | Wong | |

FIG. 104E

*Values formatted for cells A4 to A14*

| |
|---|
| A |
| E |
| F |
| G |
| H |
| J |
| K |
| L |
| M |
| R |
| W |

FIG. 105A

*Organize the data for the calcs using the bucketed headings*

| Bucket value | last | donation |
|---|---|---|
| A | Allen | 750 |
| E | Edelman | 6750 |
| | Edwards | 9870 |
| F | Franklin | 9875 |
| G | Gupta | 2500 |
| H | Henry | 8025 |
| J | James | 732.37 |
| | Johns | 3950 |
| | Joille | 8500 |
| | Jones | 6200 |
| K | Kleiner | 6250 |
| | Krishnam | 1750 |
| L | Lal | 2109.45 |
| | Latterman | 5000 |
| | Liu | 3500 |
| | Long | 150 |
| M | Mattery | 1500 |
| R | Rawlings | 510.76 |
| | Riener | 6500 |
| W | Watters | 1098.35 |
| | Waverley | 5500 |
| | Wong | 2249.56 |

FIG. 105B

*Do the calculations*

| AVERAGE | COUNT |
|---|---|
| 750 | 1 |
| 8310 | 2 |
| 9875 | 1 |
| 2500 | 1 |
| 8025 | 1 |
| 4845.5925 | 4 |
| 4000 | 2 |
| 2689.8625 | 4 |
| 1500 | 1 |
| 3505.38 | 2 |
| 2949.3033 | 3 |

FIG. 105C

*Format the data adding the Labels and send to cells A3 to C14 with formulas*

| Last: | AVERAGE(donation) | COUNT(donation) |
|---|---|---|
| A | $750.00 | 1 |
| E | $8,310.00 | 2 |
| F | $9,875.00 | 1 |
| G | $2,500.00 | 1 |
| H | $8,025.00 | 1 |
| J | $4,845.59 | 4 |
| K | $4,000.00 | 2 |
| L | $2,689.86 | 4 |
| M | $1,500.00 | 1 |
| R | $3,505.38 | 2 |
| W | $2,949.30 | 3 |

10553

10548

FIG. 111A

*Data available*

| district | source | country | donation | date |
|---|---|---|---|---|
| 5 | Online | US | 8025 | 2/7/22 |
| 52 | Online | Canada | 732.37 | 2/11/22 |
| 22 | Mail | US | 9870 | 2/12/22 |
| 53 | Mail | Canada | 1098.35 | 2/14/22 |
| 1 | In perso | US | 6500 | 2/18/22 |
| 6 | Online | US | 6200 | 2/19/22 |
| 45 | Mail | US | 9875 | 2/21/22 |
| 25 | Mail | US | 3950 | 2/25/22 |
| 54 | Online | Canada | 510.76 | 2/26/22 |
| 1 | Mail | US | 3500 | 2/28/22 |
| 52 | Mail | Canada | 2109.45 | 3/4/22 |
| 7 | In perso | US | 8500 | 3/5/22 |
| 6 | Online | US | 150 | 3/7/22 |
| 21 | Mail | US | 5000 | 3/11/22 |
| 56 | In perso | Canada | 6750 | 3/12/22 |
| 5 | Online | US | 1500 | 3/14/22 |
| 29 | Mail | US | 5500 | 3/18/22 |
| 43 | Online | US | 750 | 3/19/22 |
| 7 | Mail | US | 6250 | 3/21/22 |
| 47 | Online | US | 1750 | 3/25/22 |
| 54 | Online | Canada | 2249.56 | 3/26/22 |
| 45 | Mail | US | 2500 | 3/28/22 |
| 54 | Mail | Canada | 3348.78 | 4/1/22 |
| 53 | Online | Canada | 658.45 | 4/2/22 |
| 42 | Online | US | 350 | 4/4/22 |

11153

FIG. 111B

*Data retrieved*

| district | donation | date |
|---|---|---|
| 5 | 8025 | 2/7/22 |
| 52 | 732.37 | 2/11/22 |
| 22 | 9870 | 2/12/22 |
| 53 | 1098.35 | 2/14/22 |
| 1 | 6500 | 2/18/22 |
| 6 | 6200 | 2/19/22 |
| 45 | 9875 | 2/21/22 |
| 25 | 3950 | 2/25/22 |
| 54 | 510.76 | 2/26/22 |
| 1 | 3500 | 2/28/22 |
| 52 | 2109.45 | 3/4/22 |
| 7 | 8500 | 3/5/22 |
| 6 | 150 | 3/7/22 |
| 21 | 5000 | 3/11/22 |
| 56 | 6750 | 3/12/22 |
| 5 | 1500 | 3/14/22 |
| 29 | 5500 | 3/18/22 |
| 43 | 750 | 3/19/22 |
| 7 | 6250 | 3/21/22 |
| 47 | 1750 | 3/25/22 |
| 54 | 2249.56 | 3/26/22 |
| 45 | 2500 | 3/28/22 |
| 54 | 3348.78 | 4/1/22 |
| 53 | 658.45 | 4/2/22 |
| 42 | 350 | 4/4/22 |

11176

FIG. 111C

*Test for district options*

| Tests |
|---|
| 0.1 X |
| 1 X |
| 5 ✓ |
| 10 ✓ |
| 25 ✓ |
| 50 ✓ |
| 100 X |

FIG. 111D

*Auto starting point determination*

*1/10=0.1*

*0/10=0*

FIG. 111E

*Auto ending point determination*

*59*

11148 11158

FIG. 111F

*Do district 10 with fill and "to" label*

*Sort*

| district |
|---|
| 1 |
| 1 |
| 5 |
| 5 |
| 6 |
| 6 |
| 7 |
| 7 |
| 21 |
| 22 |
| 25 |
| 29 |
| 42 |
| 43 |
| 45 |
| 45 |
| 47 |
| 52 |
| 52 |
| 53 |
| 53 |
| 54 |
| 54 |
| 54 |
| 56 |

*Create filled buckets*

| district | Bucket values |
|---|---|
| 1 | 0 to 9 |
| 1 | |
| 5 | |
| 5 | |
| 6 | |
| 6 | |
| 7 | |
| 7 | |
| | 10 to 19 |
| 21 | 20 to 29 |
| 22 | |
| 25 | |
| 29 | |
| | 30 to 39 |
| 42 | 40 to 49 |
| 43 | |
| 45 | |
| 45 | |
| 47 | |
| 52 | 50 to 59 |
| 52 | |
| 53 | |
| 53 | |
| 54 | |
| 54 | |
| 54 | |
| 56 | |

11187 11148 11178

FIG. 112A

*Test for date options*

| Tests | |
|---|---|
| Hour | X |
| Day | X |
| Week | ✓ |
| Month | ✓ |
| Quarter | ✓ |
| Year | X |

11231

FIG. 112B

*Do date Month with fill and Full*

*Sort*

| date |
|---|
| 2/7/22 |
| 2/11/22 |
| 2/12/22 |
| 2/14/22 |
| 2/18/22 |
| 2/19/22 |
| 2/21/22 |
| 2/25/22 |
| 2/26/22 |
| 2/28/22 |
| 3/4/22 |
| 3/5/22 |
| 3/7/22 |
| 3/11/22 |
| 3/12/22 |
| 3/14/22 |
| 3/18/22 |
| 3/19/22 |
| 3/21/22 |
| 3/25/22 |
| 3/26/22 |
| 3/28/22 |
| 4/1/22 |
| 4/2/22 |
| 4/4/22 |

*Create filled buckets*

| date | Bucket values |
|---|---|
| 2/7/22 | February |
| 2/11/22 | |
| 2/12/22 | |
| 2/14/22 | |
| 2/18/22 | |
| 2/19/22 | |
| 2/21/22 | |
| 2/25/22 | |
| 2/26/22 | |
| 2/28/22 | |
| 3/4/22 | March |
| 3/5/22 | |
| 3/7/22 | |
| 3/11/22 | |
| 3/12/22 | |
| 3/14/22 | |
| 3/18/22 | |
| 3/19/22 | |
| 3/21/22 | |
| 3/25/22 | |
| 3/26/22 | |
| 3/28/22 | |
| 4/1/22 | April |
| 4/2/22 | |
| 4/4/22 | |

FIG. 112C

*Organize the data for the 2D calculations using the bucketed headings*

| district buckets | date buckets | donation |
|---|---|---|
| 0 to 9 | February | 8025 |
| 0 to 9 | February | 6500 |
| 0 to 9 | February | 6200 |
| 0 to 9 | February | 3500 |
| 0 to 9 | March | 8500 |
| 0 to 9 | March | 150 |
| 0 to 9 | March | 1500 |
| 0 to 9 | March | 6250 |
| 10 to 19 | | |
| 20 to 29 | February | 9870 |
| 20 to 29 | February | 3950 |
| 20 to 29 | March | 5000 |
| 20 to 29 | March | 5500 |
| 30 to 39 | | |
| 40 to 49 | February | 9875 |
| 40 to 49 | March | 750 |
| 40 to 49 | March | 1750 |
| 40 to 49 | March | 2500 |
| 40 to 49 | April | 350 |
| 50 to 59 | February | 732.37 |
| 50 to 59 | February | 1098.35 |
| 50 to 59 | February | 510.76 |
| 50 to 59 | March | 2109.45 |
| 50 to 59 | March | 6750 |
| 50 to 59 | March | 2249.56 |
| 50 to 59 | April | 3348.78 |
| 50 to 59 | April | 658.45 |

FIG. 112D

*Do the 2D SUM calculations*

| Vertical headings | Horizontal headings | SUM |
|---|---|---|
| 0 to 9 | February | 24225 |
| 0 to 9 | March | 16400 |
| 10 to 19 | | |
| 20 to 29 | February | 13820 |
| 20 to 29 | March | 10500 |
| 30 to 39 | | |
| 40 to 49 | February | 9875 |
| 40 to 49 | March | 5000 |
| 40 to 49 | April | 350 |
| 50 to 59 | February | 2341.48 |
| 50 to 59 | March | 11109.01 |
| 50 to 59 | April | 4007.23 |

FIG. 113A

*2D organize the data for the calculations using the bucketed headings*

| | Feb | Mar | Apr |
|---|---|---|---|
| 0 to 9 | 24225 | 16400 | |
| 10 to 19 | | | |
| 20 to 29 | 13820 | 10500 | |
| 30 to 39 | | | |
| 40 to 49 | 9875 | 5000 | 350 |
| 50 to 59 | 2341.48 | 11109.01 | 4007.23 |

FIG. 113B

*Format the data adding the Labels and send to cells A4 to D11 with formulas*

| **Date:** | **Feb** | **Mar** | **Apr** |
|---|---|---|---|
| **District:** | | | |
| **0 to 9** | $24,225.00 | $16,400.00 | |
| **10 to 19** | | | |
| **20 to 29** | $13,820.00 | $10,500.00 | |
| **30 to 39** | | | |
| **40 to 49** | $9,875.00 | $5,000.00 | $350.00 |
| **50 to 59** | $2,341.48 | $11,109.01 | $4,007.23 |

FIG. 115A
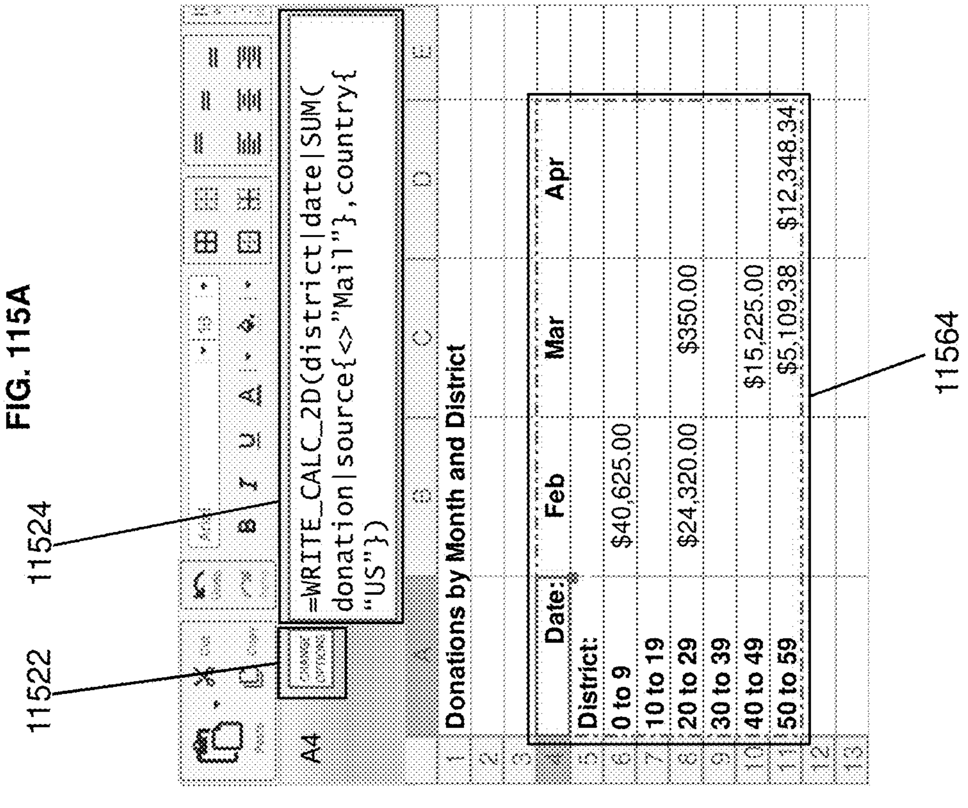
FIG. 115B
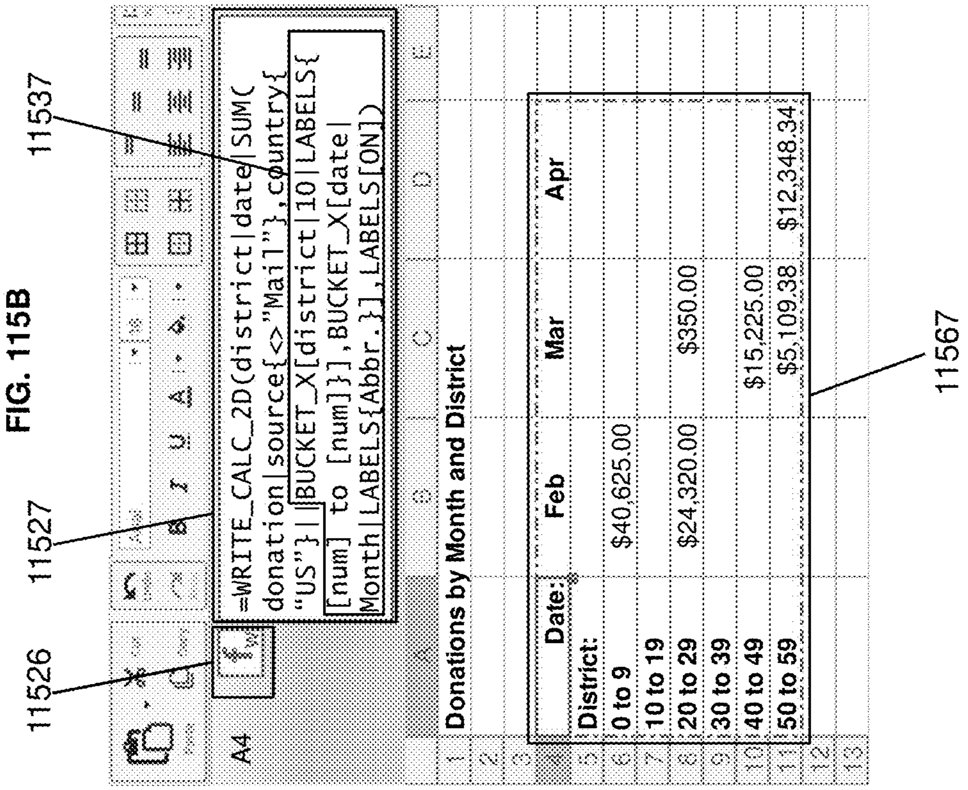
FIG. 115C
WRITE_CALC_2D(field_V1, ...|field_H1, ...|calc_2D|constraint1,constraint2)
11598
WRITE_CALC_2D(field_V1, ...|field_H1, ...|calc_2D|constraint1, constraint2|option1, option2,option3)
FIG. 115D

FIG. 116A

*Data retrieved*

| country | source | district | donation | date |
|---|---|---|---|---|
| US | Online | 5 | 8025 | 2/7/22 |
| Canada | Online | 52 | 732.37 | 2/11/22 |
| US | Mail | 22 | 9870 | 2/12/22 |
| Canada | Mail | 53 | 1098.35 | 2/14/22 |
| US | In person | 1 | 6500 | 2/18/22 |
| US | Online | 6 | 6200 | 2/19/22 |
| US | Mail | 45 | 9875 | 2/21/22 |
| US | Mail | 25 | 3950 | 2/25/22 |
| Canada | Online | 54 | 510.76 | 2/26/22 |
| US | Mail | 1 | 3500 | 2/28/22 |
| Canada | Mail | 52 | 2109.45 | 3/4/22 |
| US | In person | 7 | 8500 | 3/5/22 |
| US | Online | 6 | 150 | 3/7/22 |
| US | Mail | 21 | 5000 | 3/11/22 |
| Canada | In person | 56 | 6750 | 3/12/22 |
| US | Online | 5 | 1500 | 3/14/22 |
| US | Mail | 29 | 5500 | 3/18/22 |
| US | Online | 43 | 750 | 3/19/22 |
| US | Mail | 7 | 6250 | 3/21/22 |
| US | Online | 47 | 1750 | 3/25/22 |
| Canada | Online | 54 | 2249.56 | 3/26/22 |
| US | Mail | 45 | 2500 | 3/28/22 |
| Canada | Mail | 54 | 3348.78 | 4/1/22 |
| Canada | Online | 53 | 658.45 | 4/2/22 |
| US | Online | 42 | 350 | 4/4/22 |

FIG. 116B

*Constrain (filter) data to country equals "US"*

| country | source | district | donation | date |
|---|---|---|---|---|
| US | Online | 5 | 8025 | 2/7/22 |
| US | Mail | 22 | 9870 | 2/12/22 |
| US | In person | 1 | 6500 | 2/18/22 |
| US | Online | 6 | 6200 | 2/19/22 |
| US | Mail | 45 | 9875 | 2/21/22 |
| US | Mail | 25 | 3950 | 2/25/22 |
| US | Mail | 1 | 3500 | 2/28/22 |
| US | In person | 7 | 8500 | 3/5/22 |
| US | Online | 6 | 150 | 3/7/22 |
| US | Mail | 21 | 5000 | 3/11/22 |
| US | Online | 5 | 1500 | 3/14/22 |
| US | Mail | 29 | 5500 | 3/18/22 |
| US | Online | 43 | 750 | 3/19/22 |
| US | Mail | 7 | 6250 | 3/21/22 |
| US | Online | 47 | 1750 | 3/25/22 |
| US | Mail | 45 | 2500 | 3/28/22 |
| US | Online | 42 | 350 | 4/4/22 |

FIG. 116C

*Constrain (filter) data to source does not equal "Mail"*

| country | source | district | donation | date |
|---|---|---|---|---|
| US | Online | 5 | 8025 | 2/7/22 |
| US | In person | 1 | 6500 | 2/18/22 |
| US | Online | 6 | 6200 | 2/19/22 |
| US | In person | 7 | 8500 | 3/5/22 |
| US | Online | 6 | 150 | 3/7/22 |
| US | Online | 5 | 1500 | 3/14/22 |
| US | Online | 43 | 750 | 3/19/22 |
| US | Online | 47 | 1750 | 3/25/22 |
| US | Online | 42 | 350 | 4/4/22 |

FIG. 117A

*Test for district options*

| Tests | |
|---|---|
| 0.1 | X |
| 1 | ✓ |
| 5 | ✓ |
| 10 | ✓ |
| 25 | ✓ |
| 50 | X |

FIG. 117B

*Bucket district 10 with fill and "to"*

*Sort*

| district |
|---|
| 1 |
| 5 |
| 5 |
| 6 |
| 6 |
| 7 |
| 42 |
| 43 |
| 47 |

*Create filled buckets*

| district | Bucket values |
|---|---|
| 1 | 0 to 9 |
| 5 | |
| 5 | |
| 6 | |
| 6 | |
| 7 | |
| | 10 to 19 |
| | 20 to 29 |
| | 30 to 39 |
| 42 | 40 to 49 |
| 43 | |
| 47 | |

FIG. 117C

*Test for date options*

| Tests | |
|---|---|
| Hour | X |
| Day | X |
| Week | ✓ |
| Month | ✓ |
| Quarter | ✓ |
| Year | X |

FIG. 117D

*Bucket date Month with fill and Full*

*Sort*

| date |
|---|
| 2/7/22 |
| 2/18/22 |
| 2/19/22 |
| 3/5/22 |
| 3/7/22 |
| 3/14/22 |
| 3/19/22 |
| 3/25/22 |
| 4/4/22 |

*Create filled buckets*

| date | Bucket values |
|---|---|
| 2/7/22 | February |
| 2/18/22 | |
| 2/19/22 | |
| 3/5/22 | March |
| 3/7/22 | |
| 3/14/22 | |
| 3/19/22 | |
| 3/25/22 | |
| 4/4/22 | April |

FIG. 118A

*Organize the data for the 2D calculations using the bucketed headings*

| district buckets | date buckets | donation |
|---|---|---|
| 0 to 9 | February | 6500 |
| 0 to 9 | February | 8025 |
| 0 to 9 | February | 6200 |
| 0 to 9 | March | 1500 |
| 0 to 9 | March | 150 |
| 0 to 9 | March | 8500 |
| 10 - 19 | | |
| 20 - 29 | | |
| 30 - 39 | | |
| 40 to 49 | March | 750 |
| 40 to 49 | March | 1750 |
| 40 to 49 | April | 350 |

FIG. 118B

*Do the 2D SUM calculations*

| Vertical headings | Horizontal headings | SUM |
|---|---|---|
| 0 to 9 | February | 20725 |
| | | |
| | | |
| 0 to 9 | March | 10150 |
| | | |
| | | |
| 10 - 19 | | |
| 20 - 29 | | |
| 30 - 39 | | |
| 40 to 49 | March | 2500 |
| | | |
| 40 to 49 | April | 350 |

FIG. 118C

*2D organize the data for the calculations using the bucketed headings*

| | Feb | Mar | Apr |
|---|---|---|---|
| 0 to 9 | 40625 | | |
| 10 to 19 | | | |
| 20 to 29 | 14870 | 9450 | |
| 30 to 39 | | | |
| 40 to 49 | | 15225 | |
| 50 to 59 | | 5109.38 | 12348.34 |

FIG. 118D

*Format the data adding the Labels and send to cells A4 to D11 with formulas*

| **Date:** | **Feb** | **Mar** | **Apr** |
|---|---|---|---|
| **District:** | | | |
| **0 to 9** | $40,625.00 | | |
| **10 to 19** | | | |
| **20 to 29** | $24,320.00 | $9,450.00 | |
| **30 to 39** | | | |
| **40 to 49** | | $15,225.00 | |
| **50 to 59** | | $5,109.38 | $12,348.34 |

BUCKET SETTINGS
Field
Increment
Labels
Fill
last
OFF
[letter]
Letter
custom
Cancel
Save
12021
12027
12057
12077
12084
12087
12088
12089
12093

FIG. 123A

*Data available*

| first | last | donation | date |
|---|---|---|---|
| Tom | Henry | 8025 | 2/7/22 |
| Sally | James | 732.37 | 2/11/22 |
| Bob | Edwards | 9870 | 2/12/22 |
| Mary | Watters | 1098.35 | 2/14/22 |
| Marc | Riener | 6500 | 2/18/22 |
| Laurie | Jones | 6200 | 2/19/22 |
| Harry | Franklin | 9875 | 2/21/22 |
| Elle | Johns | 3950 | 2/25/22 |
| Mia | Rawlings | 510.76 | 2/26/22 |
| David | Liu | 3500 | 2/28/22 |
| Raj | Lal | 2109.45 | 3/4/22 |
| Pierre | Joille | 8500 | 3/5/22 |
| Amy | Long | 150 | 3/7/22 |
| Henry | Latterman | 5000 | 3/11/22 |
| James | Edelman | 6750 | 3/12/22 |
| Bonnie | Mattery | 1500 | 3/14/22 |
| Sue | Waverley | 5500 | 3/18/22 |
| Ned | Allen | 750 | 3/19/22 |
| Howard | Kleiner | 6250 | 3/21/22 |
| Krish | Krishnam | 1750 | 3/25/22 |
| Jenny | Wong | 2249.56 | 3/26/22 |
| Raj | Gupta | 2500 | 3/28/22 |
| Kelli | Zang | 3348.78 | 4/1/22 |
| Julie | Jacobs | 658.45 | 4/2/22 |
| Allison | Altos | 350 | 4/4/22 |

FIG. 123B

*Data retrieved*

| date | last | donation |
|---|---|---|
| 2/7/22 | Henry | 8025 |
| 2/11/22 | James | 732.37 |
| 2/12/22 | Edwards | 9870 |
| 2/14/22 | Watters | 1098.35 |
| 2/18/22 | Riener | 6500 |
| 2/19/22 | Jones | 6200 |
| 2/21/22 | Franklin | 9875 |
| 2/25/22 | Johns | 3950 |
| 2/26/22 | Rawlings | 510.76 |
| 2/28/22 | Liu | 3500 |
| 3/4/22 | Lal | 2109.45 |
| 3/5/22 | Joille | 8500 |
| 3/7/22 | Long | 150 |
| 3/11/22 | Latterman | 5000 |
| 3/12/22 | Edelman | 6750 |
| 3/14/22 | Mattery | 1500 |
| 3/18/22 | Waverley | 5500 |
| 3/19/22 | Allen | 750 |
| 3/21/22 | Kleiner | 6250 |
| 3/25/22 | Krishnam | 1750 |
| 3/26/22 | Wong | 2249.56 |
| 3/28/22 | Gupta | 2500 |
| 4/1/22 | Zang | 3348.78 |
| 4/2/22 | Jacobs | 658.45 |
| 4/4/22 | Altos | 350 |

FIG. 123C

*Constrain (filter) data to date{'2/1/22'..'3/31/22'}"*

| date | last | donation |
|---|---|---|
| 2/7/22 | Henry | 8025 |
| 2/11/22 | James | 732.37 |
| 2/12/22 | Edwards | 9870 |
| 2/14/22 | Watters | 1098.35 |
| 2/18/22 | Riener | 6500 |
| 2/19/22 | Jones | 6200 |
| 2/21/22 | Franklin | 9875 |
| 2/25/22 | Johns | 3950 |
| 2/26/22 | Rawlings | 510.76 |
| 2/28/22 | Liu | 3500 |
| 3/4/22 | Lal | 2109.45 |
| 3/5/22 | Joille | 8500 |
| 3/7/22 | Long | 150 |
| 3/11/22 | Latterman | 5000 |
| 3/12/22 | Edelman | 6750 |
| 3/14/22 | Mattery | 1500 |
| 3/18/22 | Waverley | 5500 |
| 3/19/22 | Allen | 750 |
| 3/21/22 | Kleiner | 6250 |
| 3/25/22 | Krishnam | 1750 |
| 3/26/22 | Wong | 2249.56 |
| 3/28/22 | Gupta | 2500 |

FIG. 123D

*Bucket 'last' by 'last' value first letter with no fill*

| *Sort* | *Create buckets* | |
|---|---|---|
| last | last | Bucket value |
| Allen | Allen | A |
| Edelman | Edelman | E |
| Edwards | Edwards | |
| Franklin | Franklin | F |
| Gupta | Gupta | G |
| Henry | Henry | H |
| James | James | J |
| Johns | Johns | |
| Joille | Joille | |
| Jones | Jones | |
| Kleiner | Kleiner | K |
| Krishnam | Krishnam | |
| Lal | Lal | L |
| Latterman | Latterman | |
| Liu | Liu | |
| Long | Long | |
| Mattery | Mattery | M |
| Rawlings | Rawlings | R |
| Riener | Riener | |
| Watters | Watters | W |
| Waverley | Waverley | |
| Wong | Wong | |

FIG. 124A

*Organize the data for the calcs using the bucketed headings*

| Bucket value | last | donation |
|---|---|---|
| A | Allen | 750 |
| E | Edelman | 6750 |
| | Edwards | 9870 |
| F | Franklin | 9875 |
| G | Gupta | 2500 |
| H | Henry | 8025 |
| J | James | 732.37 |
| | Johns | 3950 |
| | Joille | 8500 |
| | Jones | 6200 |
| K | Kleiner | 6250 |
| | Krishnam | 1750 |
| L | Lal | 2109.45 |
| | Latterman | 5000 |
| | Liu | 3500 |
| | Long | 150 |
| M | Mattery | 1500 |
| R | Rawlings | 510.76 |
| | Riener | 6500 |
| W | Watters | 1098.35 |
| | Waverley | 5500 |
| | Wong | 2249.56 |

FIG. 124B

*Do the calculations*

| AVERAGE | COUNT |
|---|---|
| 750 | 1 |
| 8310 | 2 |
| 9875 | 1 |
| 2500 | 1 |
| 8025 | 1 |
| 4845.5925 | 4 |
| 4000 | 2 |
| 2689.8625 | 4 |
| 1500 | 1 |
| 3505.38 | 2 |
| 2949.3033 | 3 |

FIG. 124C

*Format the data adding the Labels and send to cells A3 to C14 with formulas*

| Last: | AVERAGE(donation) | COUNT(donation) |
|---|---|---|
| A | $750.00 | 1 |
| E | $8,310.00 | 2 |
| F | $9,875.00 | 1 |
| G | $2,500.00 | 1 |
| H | $8,025.00 | 1 |
| J | $4,845.59 | 4 |
| K | $4,000.00 | 2 |
| L | $2,689.86 | 4 |
| M | $1,500.00 | 1 |
| R | $3,505.38 | 2 |
| W | $2,949.30 | 3 |

FIG. 126A

*Formulaic data available*

| exp | date | factor_1 | factor_2 | factor_3 |
|---|---|---|---|---|
| 32 | 3/19/22 | 1345 | 188 | 1172 |
| 14 | 1/22/22 | 1864 | 133 | 8688 |
| 31 | 2/5/22 | 1592 | 119 | 4763 |
| 44 | 3/3/22 | 1674 | 160 | 14437 |
| 39 | 1/6/22 | 1818 | 99 | 5931 |
| 5 | 2/25/22 | 860 | 157 | 12746 |
| 45 | 2/27/22 | 1820 | 73 | 14782 |
| 39 | 1/6/22 | 1758 | 77 | 4037 |
| 7 | 1/15/22 | 1032 | 91 | 7982 |
| 11 | 3/12/22 | 1620 | 153 | 12778 |
| 14 | 1/23/22 | 818 | 143 | 13659 |
| 40 | 1/10/22 | 831 | 161 | 7541 |
| 7 | 1/15/22 | 1373 | 78 | 7586 |
| 44 | 3/3/22 | 949 | 135 | 8823 |
| 44 | 3/3/22 | 1052 | 161 | 10131 |
| 11 | 3/13/22 | 1336 | 181 | 8523 |
| 5 | 2/25/22 | 911 | 110 | 3846 |
| 45 | 2/27/22 | 749 | 138 | 13794 |
| 31 | 2/5/22 | 1204 | 170 | 2780 |
| 39 | 2/8/22 | 1074 | 92 | 14706 |
| 40 | 1/10/22 | 1692 | 145 | 812 |
| 44 | 3/4/22 | 1638 | 110 | 4009 |
| 39 | 2/9/22 | 1661 | 117 | 2214 |
| 11 | 2/4/22 | 1861 | 146 | 10825 |
| 5 | 2/25/22 | 1663 | 135 | 9987 |

FIG. 126B

*Data retrieved*

| exp |
|---|
| 32 |
| 14 |
| 31 |
| 44 |
| 39 |
| 5 |
| 45 |
| 39 |
| 7 |
| 11 |
| 14 |
| 40 |
| 7 |
| 44 |
| 44 |
| 11 |
| 5 |
| 45 |
| 31 |
| 39 |
| 40 |
| 44 |
| 39 |
| 11 |
| 5 |

FIG. 126C

*Test for options*

| Tests | |
|---|---|
| 0.1 | X |
| 1 | X |
| 5 | ✓ |
| 10 | ✓ |
| 25 | ✓ |
| 50 | X |

FIG. 126D

*BUCKET values created with filling*

*Sort*

| exp |
|---|
| 5 |
| 5 |
| 5 |
| 7 |
| 7 |
| 11 |
| 11 |
| 11 |
| 14 |
| 14 |
| 31 |
| 31 |
| 32 |
| 39 |
| 39 |
| 39 |
| 39 |
| 40 |
| 40 |
| 44 |
| 44 |
| 44 |
| 44 |
| 45 |
| 45 |

*Create buckets*

| exp | bucket values |
|---|---|
| 5 | 0 - 9 |
| 5 | |
| 5 | |
| 7 | |
| 7 | |
| 11 | 10 - 19 |
| 11 | |
| 11 | |
| 14 | |
| 14 | |
| | 20 - 29 |
| 31 | 30 - 39 |
| 31 | |
| 32 | |
| 39 | |
| 39 | |
| 39 | |
| 39 | |
| 40 | 40 - 49 |
| 40 | |
| 44 | |
| 44 | |
| 44 | |
| 44 | |
| 45 | |
| 45 | |

FIG. 127A

*Data retrieved*

| date |
|---|
| 3/19/22 |
| 1/22/22 |
| 2/5/22 |
| 3/3/22 |
| 1/6/22 |
| 2/25/22 |
| 2/27/22 |
| 1/6/22 |
| 1/15/22 |
| 3/12/22 |
| 1/23/22 |
| 1/10/22 |
| 1/15/22 |
| 3/3/22 |
| 3/3/22 |
| 3/13/22 |
| 2/25/22 |
| 2/27/22 |
| 2/5/22 |
| 2/8/22 |
| 1/10/22 |
| 3/4/22 |
| 2/9/22 |
| 2/4/22 |
| 2/25/22 |

FIG. 127B

*Test for options*

| Tests | |
|---|---|
| Hours | X |
| Day | X |
| Week | ✓ |
| Month | ✓ |
| Quarter | X |

FIG. 127C

*BUCKET values created with filling*

| *Sort* date | *Create buckets* date | bucket values |
|---|---|---|
| 1/6/22 | 1/6/22 | Jan |
| 1/6/22 | 1/6/22 | |
| 1/10/22 | 1/10/22 | |
| 1/10/22 | 1/10/22 | |
| 1/15/22 | 1/15/22 | |
| 1/15/22 | 1/15/22 | |
| 1/22/22 | 1/22/22 | |
| 1/23/22 | 1/23/22 | |
| 2/4/22 | 2/4/22 | Feb |
| 2/5/22 | 2/5/22 | |
| 2/5/22 | 2/5/22 | |
| 2/8/22 | 2/8/22 | |
| 2/9/22 | 2/9/22 | |
| 2/25/22 | 2/25/22 | |
| 2/25/22 | 2/25/22 | |
| 2/25/22 | 2/25/22 | |
| 2/27/22 | 2/27/22 | |
| 2/27/22 | 2/27/22 | |
| 3/3/22 | 3/3/22 | Mar |
| 3/3/22 | 3/3/22 | |
| 3/3/22 | 3/3/22 | |
| 3/4/22 | 3/4/22 | |
| 3/12/22 | 3/12/22 | |
| 3/13/22 | 3/13/22 | |
| 3/19/22 | 3/19/22 | |

| Retrieve bucket data | | | SUM calculation | | | COUNT calculation | |
|---|---|---|---|---|---|---|---|
| exp | date | factor_1 | SQRT(factor_1) | +1.3 | SUM | COUNT(factor_1) | SUM/COUNT |
| 0 - 9 | Jan | 1032 | 32.12475681 | 33.42476 | 71.7788 | 2 | 35.8893857 |
| 0 - 9 | Jan | 1373 | 37.05401463 | 38.35401 | | | |
| 10 - 19 | Feb | 860 | 29.3257566 | 30.62576 | 104.188 | 3 | 34.7294767 |
| 10 - 19 | Feb | 911 | 30.18277655 | 31.48278 | | | |
| 10 - 19 | Feb | 1663 | 40.77989701 | 42.0799 | | | |
| 10 - 19 | Jan | 1864 | 43.17406629 | 44.47407 | 74.3748 | 2 | 37.1873828 |
| 10 - 19 | Jan | 818 | 28.60069929 | 29.9007 | | | |
| 10 - 19 | Feb | 1861 | 43.13930922 | 44.43931 | 44.4393 | 1 | 44.4393092 |
| 10 - 19 | Mar | 1620 | 40.24922359 | 41.54922 | 79.4006 | 2 | 39.7002787 |
| 10 - 19 | Mar | 1336 | 36.55133376 | 37.85133 | | | |
| 20 - 29 | | | | | | | |
| 30 - 39 | Jan | 1818 | 42.63801121 | 43.93801 | 87.1665 | 2 | 43.5832609 |
| 30 - 39 | Jan | 1758 | 41.92851059 | 43.22851 | | | |
| 30 - 39 | Feb | 1592 | 39.89987469 | 41.19987 | 153.326 | 4 | 38.3314712 |
| 30 - 39 | Feb | 1204 | 34.69870315 | 35.9987 | | | |
| 30 - 39 | Feb | 1074 | 32.77193922 | 34.07194 | | | |
| 30 - 39 | Feb | 1661 | 40.75536774 | 42.05537 | | | |
| 30 - 39 | Mar | 1345 | 36.67424164 | 37.97424 | 37.9742 | 1 | 37.9742416 |
| 40 - 49 | Jan | 831 | 28.82707061 | 30.12707 | 72.561 | 2 | 36.2804991 |
| 40 - 49 | Jan | 1692 | 41.1339276 | 42.43393 | | | |
| 40 - 49 | Feb | 1820 | 42.66145802 | 43.96146 | 72.6293 | 2 | 36.3146612 |
| 40 - 49 | Feb | 749 | 27.36786437 | 28.66786 | | | |
| 40 - 49 | Mar | 1674 | 40.91454509 | 42.21455 | 149.827 | 4 | 37.4567877 |
| 40 - 49 | Mar | 949 | 30.8058436 | 32.10584 | | | |
| 40 - 49 | Mar | 1052 | 32.43454948 | 33.73455 | | | |
| 40 - 49 | Mar | 1638 | 40.47221269 | 41.77221 | | | |

FIG. 128

| Retrieve bucket data | | | DEVSQ(COS()) calculation | |
|---|---|---|---|---|
| exp | date | factor_2 | COS(factor_2) | DEVSQ |
| 0 - 9 | Jan | 91 | -0.994367461 | 0.009325 |
| 0 - 9 | Jan | 78 | -0.857803093 | |
| 10 - 19 | Feb | 157 | 0.996830993 | 2.651719 |
| 10 - 19 | Feb | 110 | -0.999020813 | |
| 10 - 19 | Feb | 135 | -0.996087835 | |
| 10 - 19 | Jan | 133 | 0.49487222 | 0.095646 |
| 10 - 19 | Jan | 143 | 0.057502525 | |
| 10 - 19 | Feb | 146 | 0.083959437 | 0 |
| 10 - 19 | Mar | 153 | -0.591369684 | 0.443839 |
| 10 - 19 | Mar | 181 | 0.350797342 | |
| 20 - 29 | | | | |
| 30 - 39 | Jan | 99 | 0.03982088 | 0.002506 |
| 30 - 39 | Jan | 77 | -0.030975032 | |
| 30 - 39 | Feb | 119 | 0.928471321 | 2.592098 |
| 30 - 39 | Feb | 170 | 0.937994752 | |
| 30 - 39 | Feb | 92 | -0.626444448 | |
| 30 - 39 | Feb | 117 | -0.724097197 | |
| 30 - 39 | Mar | 188 | 0.879702927 | 0 |
| 40 - 49 | Jan | 161 | -0.711774756 | 1.273031 |
| 40 - 49 | Jan | 145 | 0.883863374 | |
| 40 - 49 | Feb | 73 | -0.736192718 | 1.461779 |
| 40 - 49 | Feb | 138 | 0.973648893 | |
| 40 - 49 | Mar | 160 | -0.975629313 | 0.058484 |
| 40 - 49 | Mar | 135 | -0.996087835 | |
| 40 - 49 | Mar | 161 | -0.711774756 | |
| 40 - 49 | Mar | 110 | -0.999020813 | |

FIG. 129

| Retrieve bucket data | | | SUM(LOG10) calculation | |
|---|---|---|---|---|
| exp | date | factor_3 | LOG10(factor_3) | SUM |
| 0 - 9 | Jan | 7982 | 3.902111723 | 7.7821 |
| 0 - 9 | Jan | 7586 | 3.880012838 | |
| 10 - 19 | Feb | 12746 | 4.105373914 | 11.69 |
| 10 - 19 | Feb | 3846 | 3.58500928 | |
| 10 - 19 | Feb | 9987 | 3.99943505 | |
| 10 - 19 | Jan | 8688 | 3.938919812 | 8.0743 |
| 10 - 19 | Jan | 13659 | 4.135418905 | |
| 10 - 19 | Feb | 10825 | 4.034427905 | 4.0344 |
| 10 - 19 | Mar | 12778 | 4.106462884 | 8.0371 |
| 10 - 19 | Mar | 8523 | 3.930592488 | |
| 20 - 29 | | | | |
| 30 - 39 | Jan | 5931 | 3.773127924 | 7.3792 |
| 30 - 39 | Jan | 4037 | 3.606058749 | |
| 30 - 39 | Feb | 4763 | 3.677880582 | 14.635 |
| 30 - 39 | Feb | 2780 | 3.444044796 | |
| 30 - 39 | Feb | 14706 | 4.167494562 | |
| 30 - 39 | Feb | 2214 | 3.345177617 | |
| 30 - 39 | Mar | 1172 | 3.068927612 | 3.0689 |
| 40 - 49 | Jan | 7541 | 3.877428941 | 6.787 |
| 40 - 49 | Jan | 812 | 2.909556029 | |
| 40 - 49 | Feb | 14782 | 4.169733198 | 8.3094 |
| 40 - 49 | Feb | 13794 | 4.139690222 | |
| 40 - 49 | Mar | 14437 | 4.159476956 | 15.714 |
| 40 - 49 | Mar | 8823 | 3.945616279 | |
| 40 - 49 | Mar | 10131 | 4.005652315 | |
| 40 - 49 | Mar | 4009 | 3.603036056 | |

FIG. 130A

| Calculate |
|---|
| Value |
| 28.116586 |
| |
| 25.691378 |
| |
| |
| 29.20869 |
| |
| 40.404881 |
| 32.107063 |
| |
| |
| 36.20658 |
| |
| 26.288972 |
| |
| |
| |
| 34.905314 |
| 30.766545 |
| |
| 29.467017 |
| |
| 21.801491 |

FIG. 130B

FIG. 131A

*2D transform the calculated values*

| | Jan | Feb | Mar |
|---|---|---|---|
| 0 - 9 | 28.116586 | 25.691378 | |
| 10 - 19 | 29.20869 | 40.404881 | 32.107063 |
| 20 - 29 | | | |
| 30 - 39 | 36.20658 | 26.288972 | 34.905314 |
| 40 - 49 | 30.766545 | 29.467017 | 21.801491 |

FIG. 131B

*Add the labels and format the data for the cells A4 to D10*

| **Date:** | Jan | Feb | Mar |
|---|---|---|---|
| **Exp:** | | | |
| 0 - 9 | 28.117 | 25.691 | |
| 10 -19 | 29.209 | 40.405 | 32.107 |
| 20 - 29 | | | |
| 30 - 39 | 36.207 | 26.289 | 34.905 |
| 40 - 49 | 30.767 | 29.467 | 21.801 |

FIG. 133A

*Assemble column values*

| exp (field_1) | date (field_2) | calc_1 |
|---|---|---|
| 0 - 9 | Jan | 28.117 |
| 0 - 9 | Feb | 25.691 |
| 0 - 9 | Mar | |
| 10 - 19 | Jan | 29.209 |
| 10 - 19 | Feb | 40.405 |
| 10 - 19 | Mar | 32.107 |
| 20 - 29 | Jan | |
| 20 - 29 | Feb | |
| 20 - 29 | Mar | |
| 30 - 39 | Jan | 36.207 |
| 30 - 39 | Feb | 26.289 |
| 30 - 39 | Mar | 34.905 |
| 40 - 49 | Jan | 30.767 |
| 40 - 49 | Feb | 29.467 |
| 40 - 49 | Mar | 21.801 |

FIG. 133B

*Add the labels and format the data for the cells A4 to C18*

| **Exp:** | **Date:** | **Calc_1:** |
|---|---|---|
| 0 - 9 | Jan | 28.117 |
| 0 - 9 | Feb | 25.691 |
| 0 - 9 | Mar | |
| 10 -19 | Jan | 29.209 |
| 10 -19 | Feb | 40.405 |
| 10 -19 | Mar | 32.107 |
| 20 - 29 | Jan | |
| 20 - 29 | Feb | |
| 20 - 29 | Mar | |
| 30 - 39 | Jan | 36.207 |
| 30 - 39 | Feb | 26.289 |
| 30 - 39 | Mar | 34.905 |
| 40 - 49 | Jan | 30.767 |
| 40 - 49 | Feb | 29.467 |
| 40 - 49 | Mar | 21.801 |

FIG. 135A

*Retrieved the A column Buckets and donation data for the paste cells*

| Bucket value | last | donation |
|---|---|---|
| A | Allen | 750 |
| E | Edelman | 6750 |
| | Edwards | 9870 |
| F | Franklin | 9875 |
| G | Gupta | 2500 |
| H | Henry | 8025 |
| J | James | 732.37 |
| | Johns | 3950 |
| | Joille | 8500 |
| | Jones | 6200 |
| K | Kleiner | 6250 |
| | Krishnam | 1750 |
| L | Lal | 2109.45 |
| | Latterman | 5000 |
| | Liu | 3500 |
| | Long | 150 |
| M | Mattery | 1500 |
| R | Rawlings | 510.76 |
| | Riener | 6500 |
| W | Watters | 1098.35 |
| | Waverley | 5500 |
| | Wong | 2249.56 |

FIG. 135B

*Do the COUNT calculations*

| COUNT |
|---|
| 1 |
| 2 |
| |
| 1 |
| 1 |
| 1 |
| 4 |
| |
| |
| |
| 2 |
| |
| 4 |
| |
| |
| |
| 1 |
| 2 |
| |
| 3 |
| |
| |

13523

FIG. 135C

*Format the data and send to cell C4 with formulas*

| |
|---|
| 1 |

FIG. 135D

*Format the data and send to cells C5 to C14 with formulas*

| |
|---|
| 2 |
| 1 |
| 1 |
| 1 |
| 4 |
| 2 |
| 4 |
| 1 |
| 2 |
| 3 |

FIG. 138A

*Retrieve the bucketed/grouped data in the formula*

| A6 | B4 | donation |
|---|---|---|
| 0 to 9 | February | 8025 |
| 0 to 9 | February | 6500 |
| 0 to 9 | February | 6200 |
| 0 to 9 | February | 3500 |

FIG. 138B

*Do the COUNT calculation*

| COUNT |
|---|
| 4 |

FIG. 138C

*Retrieve the bucketed/grouped data in the formula*

| A6 | F4 | donation |
|---|---|---|
| 0 to 9 | February | 8025 |
| 0 to 9 | February | 6500 |
| 0 to 9 | February | 6200 |
| 0 to 9 | February | 3500 |

FIG. 138D

*Do the COUNT calculation*

| COUNT |
|---|
| 4 |

FIG. 140A

*district bucket values and associated donation values*

| district bucket values | donation |
|---|---|
| 0 - 9 | 3500 |
| | 6500 |
| | 1500 |
| | 8025 |
| | 150 |
| | 6200 |
| | 6250 |
| | 8500 |
| 20 - 29 | 5000 |
| | 9870 |
| | 3950 |
| | 5500 |
| 40 - 49 | 350 |
| | 750 |
| | 2500 |
| | 9875 |
| | 1750 |

FIG. 140B

*Do the calculations*

| STDEV( donation) | AVERAGE( donation) | Calc |
|---|---|---|
| 3038.48639 | 5078.125 | 0.598348 |
| 2607.92382 | 6080 | 0.428935 |
| 3910.01918 | 3045 | 1.284079 |

FIG. 140C

*Format and send value and formula to F4*

59.8%

FIG. 140D

*Format and send value and formula to F5*

42.9%

FIG. 140E

*Format and send value and formula to F6*

128.4%

FIG. 144A

*Formulaic data available*

| district | source | country | donation | date |
|---|---|---|---|---|
| 5 | Online | US | 8025 | 2/7/22 |
| 52 | Online | Canada | 732.37 | 2/7/22 |
| 22 | Mail | US | 9870 | 2/7/22 |
| 53 | Mail | Canada | 1098.35 | 2/7/22 |
| 1 | In person | US | 6500 | 2/7/22 |
| 6 | Online | US | 6200 | 2/7/22 |
| 45 | Mail | US | 9875 | 2/8/22 |
| 25 | Mail | US | 3950 | 2/8/22 |
| 54 | Online | Canada | 510.76 | 2/8/22 |
| 1 | Mail | US | 3500 | 2/9/22 |
| 52 | Mail | Canada | 2109.45 | 2/9/22 |
| 7 | In person | US | 8500 | 2/9/22 |
| 6 | Online | US | 150 | 2/9/22 |
| 21 | Mail | US | 5000 | 2/9/22 |
| 56 | In person | Canada | 6750 | 2/9/22 |
| 5 | Online | US | 1500 | 2/10/22 |
| 29 | Mail | US | 5500 | 2/11/22 |
| 43 | Online | US | 750 | 2/11/22 |
| 7 | Mail | US | 6250 | 2/11/22 |
| 47 | Online | US | 1750 | 2/11/22 |
| 54 | Online | Canada | 2249.56 | 2/11/22 |
| 45 | Mail | US | 2500 | 2/12/22 |
| 54 | Mail | Canada | 3348.78 | 2/12/22 |
| 53 | Online | Canada | 658.45 | 2/12/22 |
| 42 | Online | US | 350 | 2/12/22 |

FIG. 144B

*Data retrieved*

| district |
|---|
| 5 |
| 52 |
| 22 |
| 53 |
| 1 |
| 6 |
| 45 |
| 25 |
| 54 |
| 1 |
| 52 |
| 7 |
| 6 |
| 21 |
| 56 |
| 5 |
| 29 |
| 43 |
| 7 |
| 47 |
| 54 |
| 45 |
| 54 |
| 53 |
| 42 |

FIG. 144C

*Test for options*

| Tests | |
|---|---|
| 0.1 | X |
| 1 | X |
| 5 | ✓ |
| 10 | ✓ |
| 25 | ✓ |
| 50 | X |

FIG. 144D

*BUCKET values created with filling*

*Sort*

| district | district | Bucket values |
|---|---|---|
| 1 | 1 | 0 - 9 |
| 1 | 1 | |
| 5 | 5 | |
| 5 | 5 | |
| 6 | 6 | |
| 6 | 6 | |
| 7 | 7 | |
| 7 | 7 | |
| 21 | 21 | 20 - 29 |
| 22 | 22 | |
| 25 | 25 | |
| 29 | 29 | |
| 42 | 42 | 40 - 49 |
| 43 | 43 | |
| 45 | 45 | |
| 45 | 45 | |
| 47 | 47 | |
| 52 | 52 | 50 - 59 |
| 52 | 52 | |
| 53 | 53 | |
| 53 | 53 | |
| 54 | 54 | |
| 54 | 54 | |
| 54 | 54 | |
| 56 | 56 | |

FIG. 144E

*First BUCKET value returned to cell B3*

0 - 9

FIG. 144F

*Dropdown values with the filling*

0 - 9
10 - 19
20 - 29
30 - 39
40 - 49
50 - 59

FIG. 147A
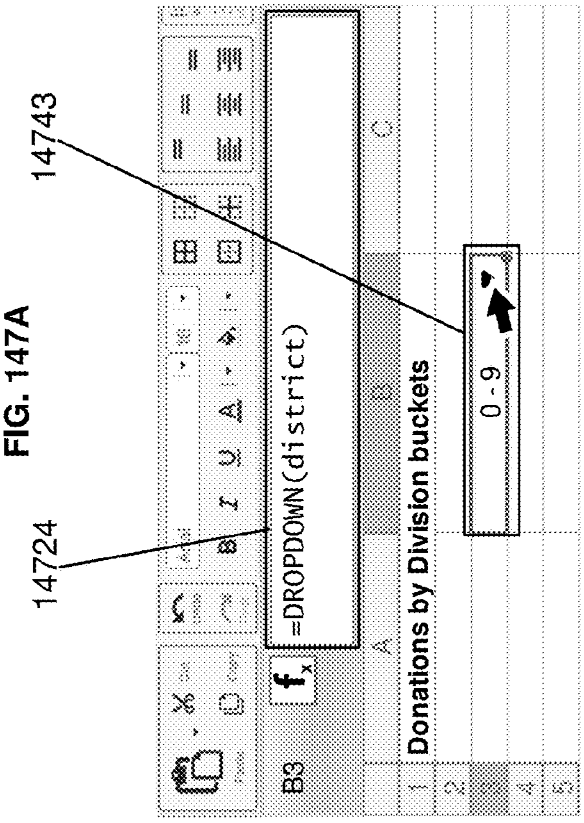
FIG. 147B
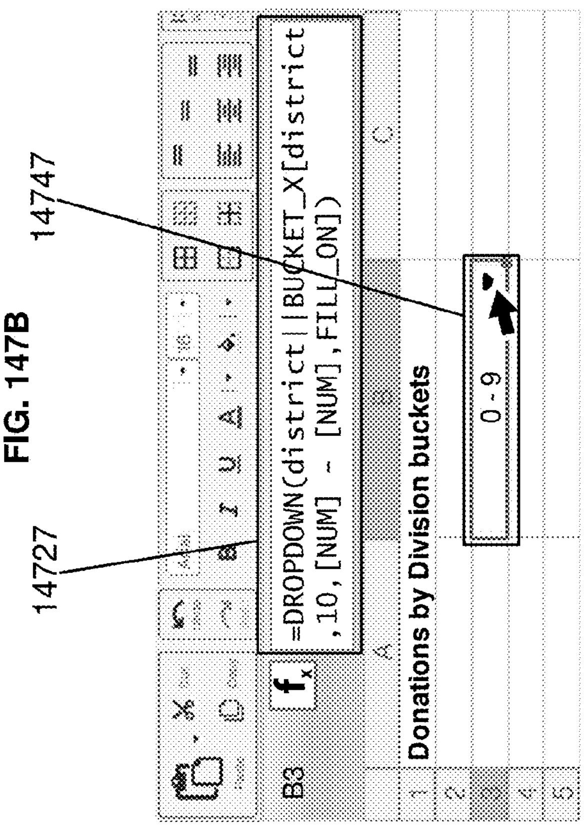
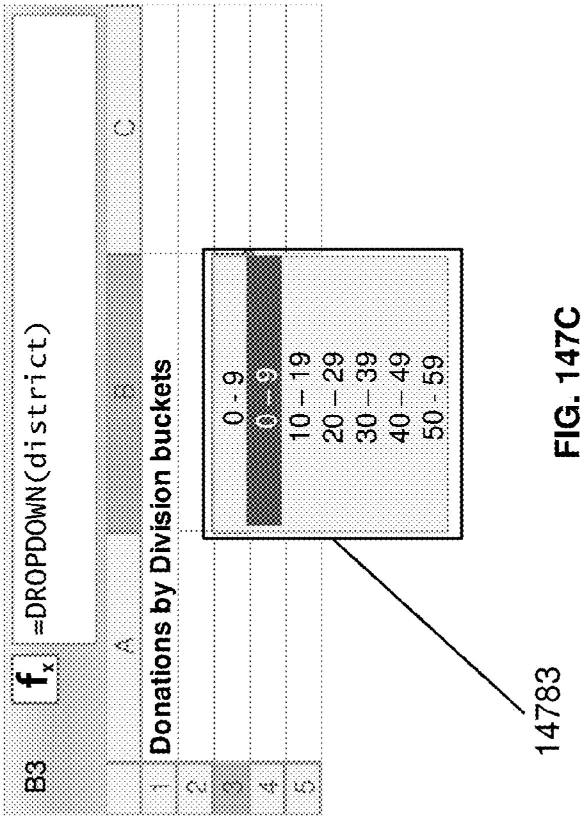
FIG. 147C
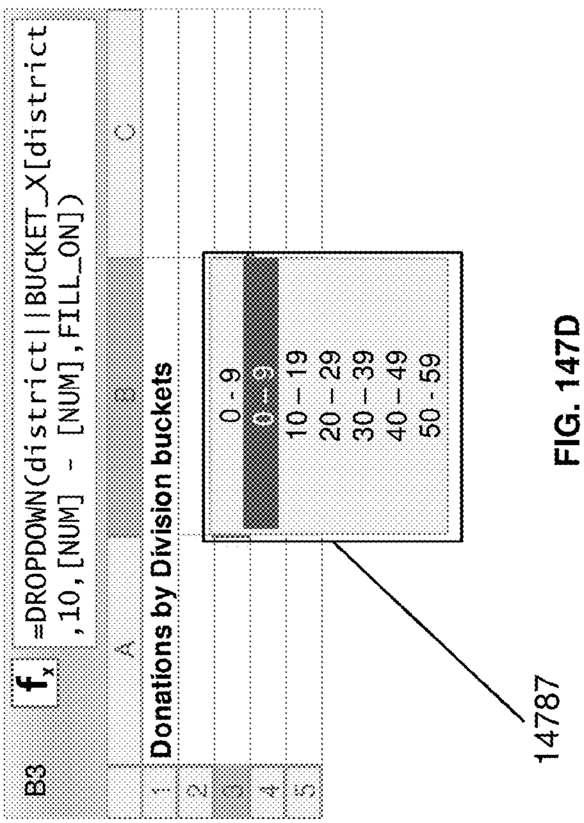
FIG. 147D FIG. 148A
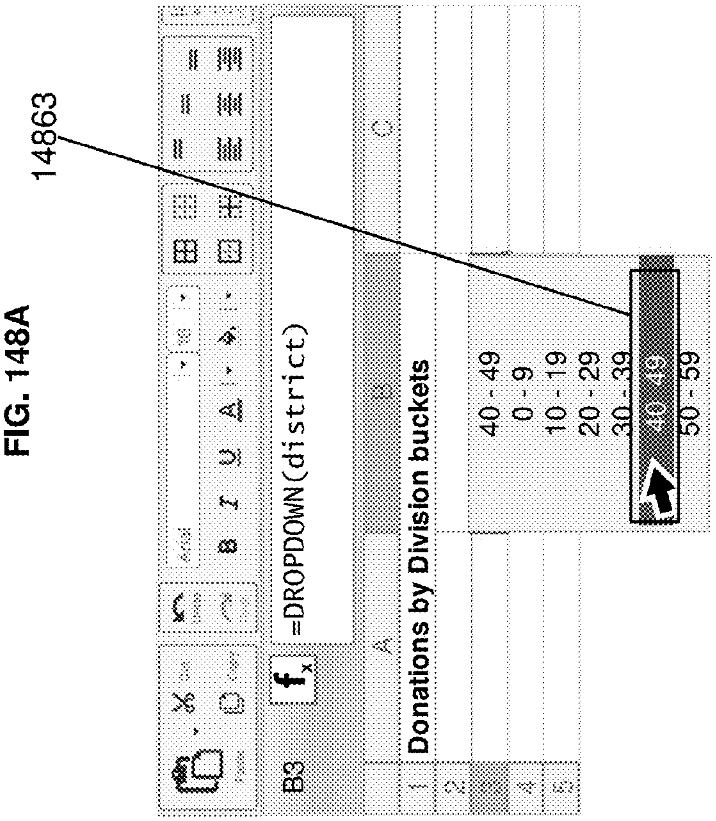
FIG. 148B
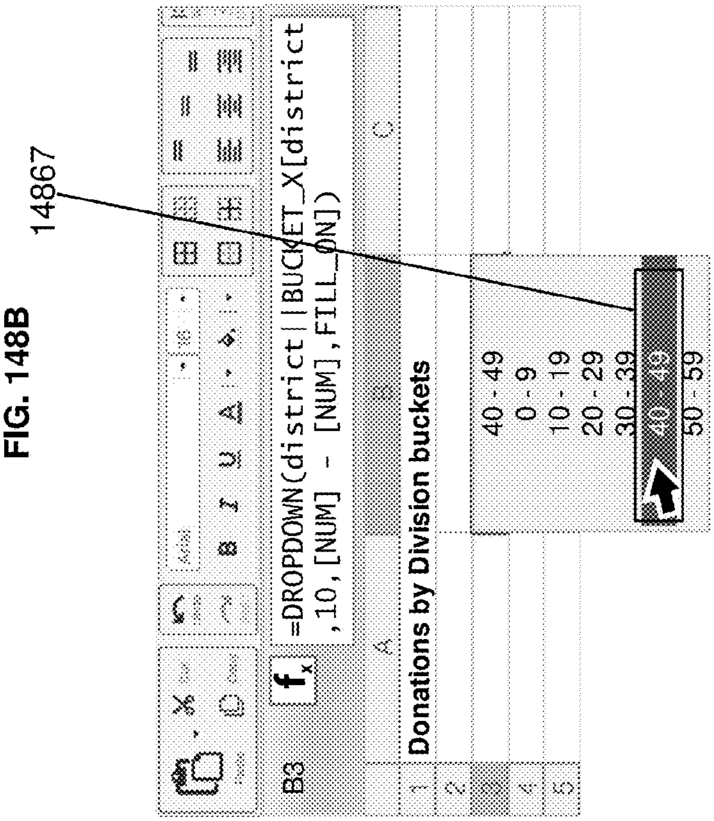
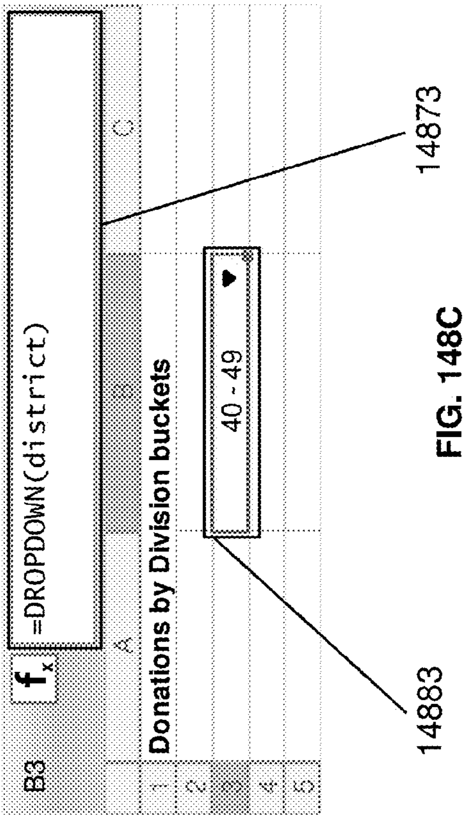
FIG. 148C
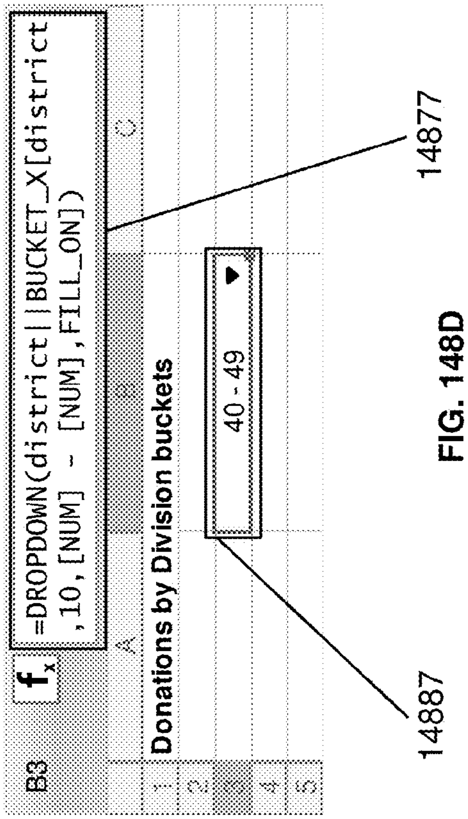
FIG. 148D 15163
B3
=DROPDOWN(BUCKET_10(district))
Donations by Division buckets
40 - 49
0 - 9
10 - 19
20 - 29
30 - 39
40 - 49
50 - 59

15167
=DROPDOWN(BUCKET_10(district||[NUM] - [NUM],FILL[ON]))

FIG. 153A

*Retrieves the Bucket values*

FIG. 153B

*Retrieves the matching donation values*

FIG. 153C

*Does the SUM calcs*

| district | Bucket values | donation | SUM |
|---|---|---|---|
| 1 | 0 - 9 | 6500 | 40625 |
| 1 | | 3500 | |
| 5 | | 8025 | |
| 5 | | 1500 | |
| 6 | | 6200 | |
| 6 | | 150 | |
| 7 | | 8500 | |
| 7 | | 6250 | |
| | 10 - 19 | | |
| 21 | 20 - 29 | 5000 | 24320 |
| 22 | | 9870 | |
| 25 | | 3950 | |
| 29 | | 5500 | |
| | 30 - 39 | | |
| 42 | 40 - 49 | 350 | 15225 |
| 43 | | 750 | |
| 45 | | 9875 | |
| 45 | | 2500 | |
| 47 | | 1750 | |
| 52 | 50 - 59 | 732.37 | 17457.72 |
| 52 | | 2109.45 | |
| 53 | | 1098.35 | |
| 53 | | 658.45 | |
| 54 | | 510.76 | |
| 54 | | 2249.56 | |
| 54 | | 3348.78 | |
| 56 | | 6750 | |

FIG. 153D

*Returns the formatted value to B4*

$40,625.00

FIG. 153E

*Returns the formatted value to B4*

$15,225.00

FIG. 155A

*Retrieves data*

| country | date |
|---|---|
| US | 2/9/22 |
| Canada | 2/11/22 |
| US | 2/12/22 |
| Canada | 2/16/22 |
| US | 2/18/22 |
| US | 2/19/22 |
| US | 2/23/22 |
| US | 2/25/22 |
| Canada | 2/26/22 |
| US | 3/2/22 |
| Canada | 3/4/22 |
| US | 3/5/22 |
| US | 3/5/22 |
| US | 3/6/22 |
| Canada | 3/6/22 |
| US | 3/14/22 |
| US | 3/14/22 |
| US | 3/15/22 |
| US | 3/21/22 |
| US | 3/21/22 |
| Canada | 3/22/22 |
| US | 3/28/22 |
| Canada | 3/28/22 |
| Canada | 3/29/22 |
| US | 4/4/22 |

FIG. 155B

*Constrains values to country US*

| country | date |
|---|---|
| US | 2/9/22 |
| US | 2/12/22 |
| US | 2/18/22 |
| US | 2/19/22 |
| US | 2/23/22 |
| US | 2/25/22 |
| US | 3/2/22 |
| US | 3/5/22 |
| US | 3/5/22 |
| US | 3/6/22 |
| US | 3/14/22 |
| US | 3/14/22 |
| US | 3/15/22 |
| US | 3/21/22 |
| US | 3/21/22 |
| US | 3/28/22 |
| US | 4/4/22 |

FIG. 155C

*Test for options*

| Tests | |
|---|---|
| Hours | X |
| Day | X |
| Week | ✓ |
| Month | ✓ |
| Quarter | X |

FIG. 155D

*Creates date Week bucket values with filling and counts*

| date | Bucket values | (count) |
|---|---|---|
| 2/9/22 | 2/7/22 - 2/13/22 | (2) |
| 2/12/22 | | |
| 2/18/22 | 2/14/22 - 2/20/22 | (2) |
| 2/19/22 | | |
| 2/23/22 | 2/21/22 - 2/27/22 | (2) |
| 2/25/22 | | |
| 3/2/22 | 2/28/22 - 3/6/22 | (4) |
| 3/5/22 | | |
| 3/5/22 | | |
| 3/6/22 | | |
| | 3/7/22 - 3/13/22 | (-) |
| 3/14/22 | 3/14/22 - 3/20/22 | (3) |
| 3/14/22 | | |
| 3/15/22 | | |
| 3/21/22 | 3/21/22 - 3/27/22 | (2) |
| 3/21/22 | | |
| 3/28/22 | 3/28/22 - 4/3/22 | (1) |
| 4/4/22 | 4/4/22 - 4/10/22 | (1) |

FIG. 155E

*Send values and counts to UI*

| | |
|---|---|
| 2/7/22 - 2/13/22 | (2) |
| 2/14/22 - 2/20/22 | (2) |
| 2/21/22 - 2/27/22 | (2) |
| 2/28/22 - 3/6/22 | (4) |
| 3/7/22 - 3/13/22 | (-) |
| 3/14/22 - 3/20/22 | (3) |
| 3/21/22 - 3/27/22 | (2) |
| 3/28/22 - 4/3/22 | (1) |
| 4/4/22 - 4/10/22 | (1) |

FIG. 155F

*Send starting selection !ALL with count*

| | |
|---|---|
| !ALL | (17) |

FIG. 159A

*Retrieves data*

| country | date |
|---|---|
| US | 2/9/22 |
| Canada | 2/11/22 |
| US | 2/12/22 |
| Canada | 2/16/22 |
| US | 2/18/22 |
| US | 2/19/22 |
| US | 2/23/22 |
| US | 2/25/22 |
| Canada | 2/26/22 |
| US | 3/2/22 |
| Canada | 3/4/22 |
| US | 3/5/22 |
| US | 3/5/22 |
| US | 3/6/22 |
| Canada | 3/6/22 |
| US | 3/14/22 |
| US | 3/14/22 |
| US | 3/15/22 |
| US | 3/21/22 |
| US | 3/21/22 |
| Canada | 3/22/22 |
| US | 3/28/22 |
| Canada | 3/28/22 |
| Canada | 3/29/22 |
| US | 4/4/22 |

FIG. 159B

*Constrains values to country US*

| country | date |
|---|---|
| US | 2/9/22 |
| US | 2/12/22 |
| US | 2/18/22 |
| US | 2/19/22 |
| US | 2/23/22 |
| US | 2/25/22 |
| US | 3/2/22 |
| US | 3/5/22 |
| US | 3/5/22 |
| US | 3/6/22 |
| US | 3/14/22 |
| US | 3/14/22 |
| US | 3/15/22 |
| US | 3/21/22 |
| US | 3/21/22 |
| US | 3/28/22 |
| US | 4/4/22 |

FIG. 159C

*Creates date Week bucket values with filling*

| date | Bucket values |
|---|---|
| 2/9/22 | 2/7/22 - 2/13/22 |
| 2/12/22 | |
| 2/18/22 | 2/14/22 - 2/20/22 |
| 2/19/22 | |
| 2/23/22 | 2/21/22 - 2/27/22 |
| 2/25/22 | |
| 3/2/22 | 2/28/22 - 3/6/22 |
| 3/5/22 | |
| 3/5/22 | |
| 3/6/22 | |
| | 3/7/22 - 3/13/22 |
| 3/14/22 | 3/14/22 - 3/20/22 |
| 3/14/22 | |
| 3/15/22 | |
| 3/21/22 | 3/21/22 - 3/27/22 |
| 3/21/22 | |
| 3/28/22 | 3/28/22 - 4/3/22 |
| 4/4/22 | 4/4/22 - 4/10/22 |

FIG. 159D

*Matching donation values*

| donation |
|---|
| 8025 |
| 9870 |
| 6500 |
| 6200 |
| 9875 |
| 3950 |
| 3500 |
| 8500 |
| 150 |
| 5000 |
| 1500 |
| 5500 |
| 750 |
| 6250 |
| 1750 |
| 2500 |
| 350 |

FIG. 159E

*Calc !ALL SUM*

80170

FIG. 159F

*Returns the formatted value to B4*

$80,170.00

FIG. 159G

*Calc *4* SUM*

43675

FIG. 159H

*Returns the formatted value to B4*

$43,675.00

FIG. 161A

*Data retrieved*

| date | last | donation |
|---|---|---|
| 2/7/22 | Henry | 8025 |
| 2/11/22 | James | 732.37 |
| 2/12/22 | Edwards | 9870 |
| 2/14/22 | Watters | 1098.35 |
| 2/18/22 | Riener | 6500 |
| 2/19/22 | Jones | 6200 |
| 2/21/22 | Franklin | 9875 |
| 2/25/22 | Johns | 3950 |
| 2/26/22 | Rawlings | 510.76 |
| 2/28/22 | Liu | 3500 |
| 3/4/22 | Lal | 2109.45 |
| 3/5/22 | Joille | 8500 |
| 3/7/22 | Long | 150 |
| 3/11/22 | Latterman | 5000 |
| 3/12/22 | Edelman | 6750 |
| 3/14/22 | Mattery | 1500 |
| 3/18/22 | Waverley | 5500 |
| 3/19/22 | Allen | 750 |
| 3/21/22 | Kleiner | 6250 |
| 3/25/22 | Krishnam | 1750 |
| 3/26/22 | Wong | 2249.56 |
| 3/28/22 | Gupta | 2500 |
| 4/1/22 | Zang | 3348.78 |
| 4/2/22 | Jacobs | 658.45 |
| 4/4/22 | Altos | 350 |

FIG. 161B

*Constrain (filter) data to date{'2/1/22'..'3/31/22'}"*

| date | last | donation |
|---|---|---|
| 2/7/22 | Henry | 8025 |
| 2/11/22 | James | 732.37 |
| 2/12/22 | Edwards | 9870 |
| 2/14/22 | Watters | 1098.35 |
| 2/18/22 | Riener | 6500 |
| 2/19/22 | Jones | 6200 |
| 2/21/22 | Franklin | 9875 |
| 2/25/22 | Johns | 3950 |
| 2/26/22 | Rawlings | 510.76 |
| 2/28/22 | Liu | 3500 |
| 3/4/22 | Lal | 2109.45 |
| 3/5/22 | Joille | 8500 |
| 3/7/22 | Long | 150 |
| 3/11/22 | Latterman | 5000 |
| 3/12/22 | Edelman | 6750 |
| 3/14/22 | Mattery | 1500 |
| 3/18/22 | Waverley | 5500 |
| 3/19/22 | Allen | 750 |
| 3/21/22 | Kleiner | 6250 |
| 3/25/22 | Krishnam | 1750 |
| 3/26/22 | Wong | 2249.56 |
| 3/28/22 | Gupta | 2500 |

FIG. 161C

*Bucket last first letter with [letter], no fill and counting values*

*Sort* / *Create buckets*

| last (Sort) | last | Bucket value | COUNT |
|---|---|---|---|
| Allen | Allen | A | 1 |
| Edelman | Edelman | E | 2 |
| Edwards | Edwards | | |
| Franklin | Franklin | F | 1 |
| Gupta | Gupta | G | 1 |
| Henry | Henry | H | 1 |
| James | James | J | 4 |
| Johns | Johns | | |
| Joille | Joille | | |
| Jones | Jones | | |
| Kleiner | Kleiner | K | 2 |
| Krishnam | Krishnam | | |
| Lal | Lal | L | 4 |
| Latterman | Latterman | | |
| Liu | Liu | | |
| Long | Long | | |
| Mattery | Mattery | M | 1 |
| Rawlings | Rawlings | R | 2 |
| Riener | Riener | | |
| Watters | Watters | W | 3 |
| Waverley | Waverley | | |
| Wong | Wong | | |

FIG. 161D

*Send values and counts to UI*

| | |
|---|---|
| A | (1) |
| E | (2) |
| F | (1) |
| G | (1) |
| H | (1) |
| J | (4) |
| K | (2) |
| L | (4) |
| M | (1) |
| R | (2) |
| W | (3) |

FIG. 161E

*Send starting selection !ALL with count*

| | |
|---|---|
| !ALL | (22) |

FIG. 164A
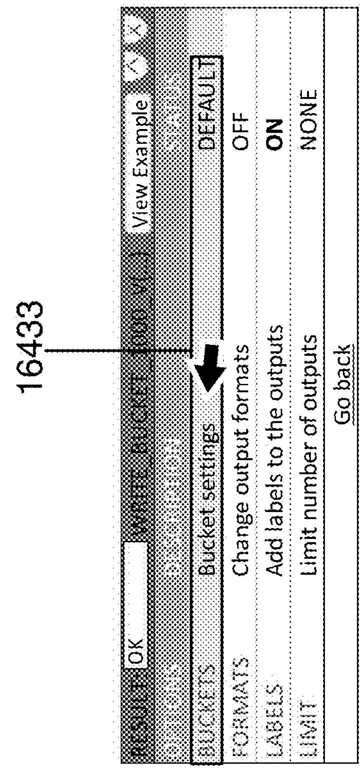
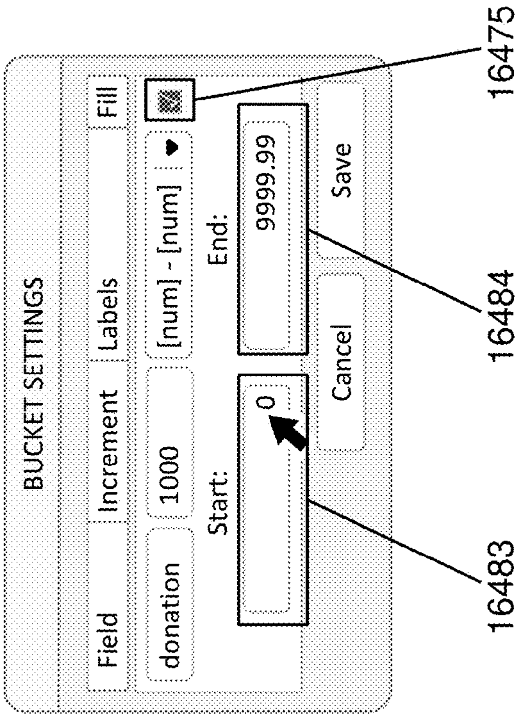
FIG. 164B
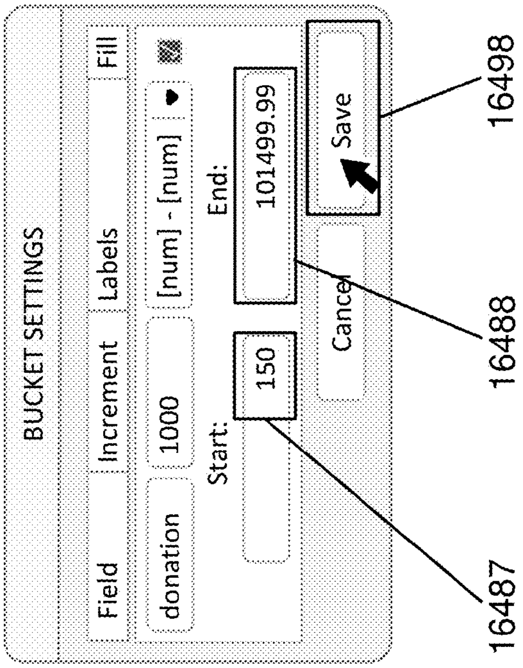
FIG. 164C
FIG. 164D
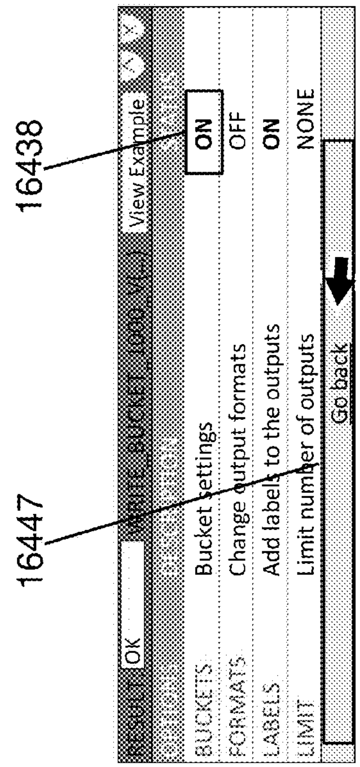

EXAMPLES OF RANGE OR ARRAY SPREADSHEET FUNCTIONS

| FUNCTION | VARIANTS |
|---|---|
| AVEDEV | |
| AVERAGE | all variants (e.g., A, IF and IFS) |
| COUNT | all variants (e.g., A, BLANK, IF and IFS) |
| GEOMEAN | |
| HARMEAN | |
| LARGE | |
| MAX | all variants including DMAX |
| MEDIAN | |
| MIN | all variants including DMIN |
| PERCENTILE | all variants |
| PERCENTRANK | all variants |
| QUARTILE | All variants |
| SMALL | |
| STDEV | all variants including DSTDEV and its variants |
| SUM | All variants including DSUM |
| VAR | all variants including DVAR and its variants |

FIG. 167

FIG. 170A

*Formulaic data available*

| district | source | country | donation | date |
|---|---|---|---|---|
| 5 | Online | US | 8025 | 2/7/22 |
| 52 | Online | Canada | 732.37 | 2/11/22 |
| 22 | Mail | US | 9870 | 2/12/22 |
| 53 | Mail | Canada | 1098.35 | 2/14/22 |
| 1 | Mail | US | 6500 | 2/18/22 |
| 6 | Online | US | 6200 | 2/19/22 |
| 45 | Mail | US | 9875 | 2/21/22 |
| 25 | Mail | US | 3950 | 2/25/22 |
| 54 | Mail | Canada | 510.76 | 2/26/22 |
| 1 | Mail | US | 3500 | 2/28/22 |
| 52 | Mail | Canada | 2109.45 | 3/4/22 |
| 7 | In perso | US | 8500 | 3/5/22 |
| 6 | Online | US | 150 | 3/7/22 |
| 21 | Mail | US | 5000 | 3/11/22 |
| 56 | Mail | Canada | 6750 | 3/12/22 |
| 5 | Online | US | 1500 | 3/14/22 |
| 29 | Mail | US | 5500 | 3/18/22 |
| 43 | Online | US | 750 | 3/19/22 |
| 7 | Mail | US | 6250 | 3/21/22 |
| 47 | Online | US | 1750 | 3/25/22 |
| 54 | Online | Canada | 2249.56 | 3/26/22 |
| 45 | Mail | US | 2500 | 3/28/22 |
| 54 | Mail | Canada | 3348.78 | 4/1/22 |
| 53 | Online | Canada | 658.45 | 4/2/22 |
| 42 | Online | US | 350 | 4/4/22 |

FIG. 170B

*Data retrieved*

| source | district |
|---|---|
| Online | 5 |
| Online | 52 |
| Mail | 22 |
| Mail | 53 |
| Mail | 1 |
| Online | 6 |
| Mail | 45 |
| Mail | 25 |
| Online | 54 |
| Mail | 1 |
| Mail | 52 |
| Mail | 7 |
| Online | 6 |
| Mail | 21 |
| Mail | 56 |
| Online | 5 |
| Mail | 29 |
| Online | 43 |
| Mail | 7 |
| Online | 47 |
| Online | 54 |
| Mail | 45 |
| Mail | 54 |
| Online | 53 |
| Online | 42 |

FIG. 170C

*source then district sort*

| source | district |
|---|---|
| Mail | 1 |
| Mail | 1 |
| Mail | 7 |
| Mail | 7 |
| Mail | 21 |
| Mail | 22 |
| Mail | 25 |
| Mail | 29 |
| Mail | 45 |
| Mail | 45 |
| Mail | 52 |
| Mail | 53 |
| Mail | 54 |
| Mail | 56 |
| Online | 5 |
| Online | 5 |
| Online | 6 |
| Online | 6 |
| Online | 42 |
| Online | 43 |
| Online | 47 |
| Online | 52 |
| Online | 53 |
| Online | 54 |
| Online | 54 |

FIG. 170D

*Test for district options*

| Tests |
|---|
| 0.1 X |
| 1 ✓ |
| 5 ✓ |
| 10 ✓ |
| 25 ✓ |
| 50 X |

FIG. 170E

*Auto starting point determination*

*1/10=0.1*

*0/10=0*

FIG. 170F

*Auto ending point determination*

*59*

FIG. 171A

*Bucket district 10 with fill*

| source | district | Bucket values |
|---|---|---|
| Mail | 1 | 1 - 19 |
| Mail | 1 | |
| Mail | 7 | |
| Mail | 7 | |
| Mail | 21 | 20 - 39 |
| Mail | 22 | |
| Mail | 25 | |
| Mail | 29 | |
| Mail | 45 | 40 - 59 |
| Mail | 45 | |
| Mail | 52 | |
| Mail | 53 | |
| Mail | 54 | |
| Mail | 56 | |
| Online | 5 | 1 - 19 |
| Online | 5 | |
| Online | 6 | |
| Online | 6 | |
| Online | | 20 - 39 |
| Online | 42 | 20 - 39 |
| Online | 43 | |
| Online | 47 | |
| Online | 52 | |
| Online | 53 | |
| Online | 54 | |
| Online | 54 | |

FIG. 171B

*district bucket value replacement*

| source | district |
|---|---|
| Mail | 1 - 19 |
| Mail | 20 - 39 |
| Mail | 40 - 59 |
| Online | 1 - 19 |
| Online | 20 - 39 |
| Online | 40 - 59 |

FIG. 171C

*Values formatted for cell*

| | |
|---|---|
| Mail | 1 - 19 |
| Mail | 20 - 39 |
| Mail | 40 - 59 |
| Online | 1 - 19 |
| Online | 20 - 39 |
| Online | 40 - 59 |

FIG. 174A

*Formulaic data available*

| district | source | country | donation | date |
|---|---|---|---|---|
| 5 | Online | US | 1500 | 3/14/22 |
| 1 | Mail | US | 6500 | 2/18/22 |
| 22 | Mail | US | 9870 | 2/12/22 |
| 43 | Online | US | 750 | 3/19/22 |
| 21 | Mail | US | 5000 | 3/11/22 |
| 6 | Online | US | 150 | 3/7/22 |
| 25 | Mail | US | 3950 | 2/25/22 |
| 5 | Online | US | 8025 | 2/7/22 |
| 54 | Mail | Canada | 510.76 | 2/26/22 |
| 54 | Mail | Canada | 3348.78 | 4/1/22 |
| 47 | Online | US | 1750 | 3/25/22 |
| 6 | Online | US | 6200 | 2/19/22 |
| 53 | Mail | Canada | 1098.35 | 2/14/22 |
| 54 | Online | Canada | 2249.56 | 3/26/22 |
| 52 | Online | Canada | 732.37 | 2/11/22 |
| 56 | Mail | Canada | 6750 | 3/12/22 |
| 29 | Mail | US | 5500 | 3/18/22 |
| 7 | In perso | US | 8500 | 3/5/22 |
| 52 | Mail | Canada | 2109.45 | 3/4/22 |
| 1 | Mail | US | 3500 | 2/28/22 |
| 45 | Mail | US | 9875 | 2/21/22 |
| 42 | Online | US | 350 | 4/4/22 |
| 7 | Mail | US | 6250 | 3/21/22 |
| 45 | Mail | US | 2500 | 3/28/22 |
| 53 | Online | Canada | 658.45 | 4/2/22 |

FIG. 174B

*Data retrieved*

| date | district |
|---|---|
| 3/14/22 | 5 |
| 2/18/22 | 1 |
| 2/12/22 | 22 |
| 3/19/22 | 43 |
| 3/11/22 | 21 |
| 3/7/22 | 6 |
| 2/25/22 | 25 |
| 2/7/22 | 5 |
| 2/26/22 | 54 |
| 4/1/22 | 54 |
| 3/25/22 | 47 |
| 2/19/22 | 6 |
| 2/14/22 | 53 |
| 3/26/22 | 54 |
| 2/11/22 | 52 |
| 3/12/22 | 56 |
| 3/18/22 | 29 |
| 3/5/22 | 7 |
| 3/4/22 | 52 |
| 2/28/22 | 1 |
| 2/21/22 | 45 |
| 4/4/22 | 42 |
| 3/21/22 | 7 |
| 3/28/22 | 45 |
| 4/2/22 | 53 |

FIG. 174C

*date sort*

| date | district |
|---|---|
| 2/7/22 | 5 |
| 2/11/22 | 52 |
| 2/12/22 | 22 |
| 2/14/22 | 53 |
| 2/18/22 | 1 |
| 2/19/22 | 6 |
| 2/21/22 | 45 |
| 2/25/22 | 25 |
| 2/26/22 | 54 |
| 2/28/22 | 1 |
| 3/4/22 | 52 |
| 3/5/22 | 7 |
| 3/7/22 | 6 |
| 3/11/22 | 21 |
| 3/12/22 | 56 |
| 3/14/22 | 5 |
| 3/18/22 | 29 |
| 3/19/22 | 43 |
| 3/21/22 | 7 |
| 3/25/22 | 47 |
| 3/26/22 | 54 |
| 3/28/22 | 45 |
| 4/1/22 | 54 |
| 4/2/22 | 53 |
| 4/4/22 | 42 |

FIG. 174D

*Test for date options*

| Tests | |
|---|---|
| Hour | X |
| Day | X |
| Week | ✓ |
| Month | ✓ |
| Quarter | ✓ |
| Year | X |

FIG. 175A

*Bucket date monthly*

| date | bucket values | district |
|---|---|---|
| 2/7/22 | Feb | 5 |
| 2/11/22 | | 52 |
| 2/12/22 | | 22 |
| 2/14/22 | | 53 |
| 2/18/22 | | 1 |
| 2/19/22 | | 6 |
| 2/21/22 | | 45 |
| 2/25/22 | | 25 |
| 2/26/22 | | 54 |
| 2/28/22 | | 1 |
| 3/4/22 | Mar | 52 |
| 3/5/22 | | 7 |
| 3/7/22 | | 6 |
| 3/11/22 | | 21 |
| 3/12/22 | | 56 |
| 3/14/22 | | 5 |
| 3/18/22 | | 29 |
| 3/19/22 | | 43 |
| 3/21/22 | | 7 |
| 3/25/22 | | 47 |
| 3/26/22 | | 54 |
| 3/28/22 | | 45 |
| 4/1/22 | Apr | 54 |
| 4/2/22 | | 53 |
| 4/4/22 | | 42 |

FIG. 175B

*Test for district options*

| Tests |
|---|
| 0.1 X |
| 1 ✓ |
| 5 ✓ |
| 10 ✓ |
| 25 ✓ |
| 50 X |

FIG. 175C

*Auto starting point determination*

*1/10=0.1*

*0/10=0*

FIG. 175D

*Auto ending point determination*

*59*

FIG. 175E

*Bucket district by 10 with fill*

| date | bucket values | district | bucket values |
|---|---|---|---|
| 2/18/22 | Feb | 1 | 1 - 19 |
| 2/28/22 | Feb | 1 | |
| 2/7/22 | Feb | 5 | |
| 2/19/22 | Feb | 6 | |
| 2/12/22 | Feb | 22 | 20 - 39 |
| 2/25/22 | Feb | 25 | |
| 2/21/22 | Feb | 45 | 40 - 59 |
| 2/11/22 | Feb | 52 | |
| 2/14/22 | Feb | 53 | |
| 2/26/22 | Feb | 54 | |
| 3/14/22 | Mar | 5 | 1 - 19 |
| 3/7/22 | Mar | 6 | |
| 3/5/22 | Mar | 7 | |
| 3/21/22 | Mar | 7 | |
| 3/11/22 | Mar | 21 | 20 - 39 |
| 3/18/22 | Mar | 29 | |
| 3/19/22 | Mar | 43 | 40 - 59 |
| 3/28/22 | Mar | 45 | |
| 3/25/22 | Mar | 47 | |
| 3/4/22 | Mar | 52 | |
| 3/26/22 | Mar | 54 | |
| 3/12/22 | Mar | 56 | |
| | | | 1 - 19 |
| | | | 20 - 39 |
| 4/4/22 | April | 42 | 40 - 59 |
| 4/2/22 | April | 53 | |
| 4/1/22 | April | 54 | |

FIG. 175F

*bucket value replacements*

| date | district |
|---|---|
| Feb | 1 - 19 |
| Feb | 20 - 39 |
| Feb | 40 - 59 |
| Mar | 1 - 19 |
| Mar | 20 - 39 |
| Mar | 40 - 59 |
| Apr | 1 - 19 |
| Apr | 20 - 39 |
| Apr | 40 - 59 |

FIG. 175G

*Format for cells*

| | |
|---|---|
| Feb | 1 - 19 |
| Feb | 20 - 39 |
| Feb | 40 - 59 |
| Mar | 1 - 19 |
| Mar | 20 - 39 |
| Mar | 40 - 59 |
| Apr | 1 - 19 |
| Apr | 20 - 39 |
| Apr | 40 - 59 |

FIG. 177A

*Formulaic data available*

| district | source | country | donation | date |
|---|---|---|---|---|
| 5 | Online | US | 8025 | 2/7/22 |
| 52 | Online | Canada | 732.37 | 2/7/22 |
| 22 | Mail | US | 9870 | 2/7/22 |
| 53 | Mail | Canada | 1098.35 | 2/7/22 |
| 1 | In person | US | 6500 | 2/7/22 |
| 6 | Online | US | 6200 | 2/7/22 |
| 45 | Mail | US | 9875 | 2/8/22 |
| 25 | Mail | US | 3950 | 2/8/22 |
| 54 | Online | Canada | 510.76 | 2/8/22 |
| 1 | Mail | US | 3500 | 2/9/22 |
| 52 | Mail | Canada | 2109.45 | 2/9/22 |
| 7 | In person | US | 8500 | 2/9/22 |
| 6 | Online | US | 150 | 2/9/22 |
| 21 | Mail | US | 5000 | 2/9/22 |
| 56 | In person | Canada | 6750 | 2/9/22 |
| 5 | Online | US | 1500 | 2/10/22 |
| 29 | Mail | US | 5500 | 2/11/22 |
| 43 | Online | US | 750 | 2/11/22 |
| 7 | Mail | US | 6250 | 2/11/22 |
| 47 | Online | US | 1750 | 2/11/22 |
| 54 | Online | Canada | 2249.56 | 2/11/22 |
| 45 | Mail | US | 2500 | 2/12/22 |
| 54 | Mail | Canada | 3348.78 | 2/12/22 |
| 53 | Online | Canada | 658.45 | 2/12/22 |
| 42 | Online | US | 350 | 2/12/22 |

FIG. 177B

*Data retrieved*

| district |
|---|
| 5 |
| 52 |
| 22 |
| 53 |
| 1 |
| 6 |
| 45 |
| 25 |
| 54 |
| 1 |
| 52 |
| 7 |
| 6 |
| 21 |
| 56 |
| 5 |
| 29 |
| 43 |
| 7 |
| 47 |
| 54 |
| 45 |
| 54 |
| 53 |
| 42 |

FIG. 177C

*Test for options*

| Tests | |
|---|---|
| 0.1 | X |
| 1 | X |
| 5 | ✓ |
| 10 | ✓ |
| 25 | ✓ |
| 50 | X |

FIG. 177D

*BUCKET values created with filling*

*Sort*

| district | district | Bucket values |
|---|---|---|
| 1 | 1 | 0 - 9 |
| 1 | 1 | |
| 5 | 5 | |
| 5 | 5 | |
| 6 | 6 | |
| 6 | 6 | |
| 7 | 7 | |
| 7 | 7 | |
| 21 | 21 | 20 - 29 |
| 22 | 22 | |
| 25 | 25 | |
| 29 | 29 | |
| 42 | 42 | 40 - 49 |
| 43 | 43 | |
| 45 | 45 | |
| 45 | 45 | |
| 47 | 47 | |
| 52 | 52 | 50 - 59 |
| 52 | 52 | |
| 53 | 53 | |
| 53 | 53 | |
| 54 | 54 | |
| 54 | 54 | |
| 54 | 54 | |
| 56 | 56 | |

FIG. 177E

*First BUCKET value returned to cell B3*

0 - 9

FIG. 177F

*Dropdown values with the filling*

0 - 9
10 - 19
20 - 29
30 - 39
40 - 49
50 - 59

FIG. 179A

*Retrieves data*

| country | date |
|---|---|
| US | 2/9/22 |
| Canada | 2/11/22 |
| US | 2/12/22 |
| Canada | 2/16/22 |
| US | 2/18/22 |
| US | 2/19/22 |
| US | 2/23/22 |
| US | 2/25/22 |
| Canada | 2/26/22 |
| US | 3/2/22 |
| Canada | 3/4/22 |
| US | 3/5/22 |
| US | 3/5/22 |
| US | 3/6/22 |
| Canada | 3/6/22 |
| US | 3/14/22 |
| US | 3/14/22 |
| US | 3/15/22 |
| US | 3/21/22 |
| US | 3/21/22 |
| Canada | 3/22/22 |
| US | 3/28/22 |
| Canada | 3/28/22 |
| Canada | 3/29/22 |
| US | 4/4/22 |

FIG. 179B

*Constrains values to country US*

| country | date |
|---|---|
| US | 2/9/22 |
| US | 2/12/22 |
| US | 2/18/22 |
| US | 2/19/22 |
| US | 2/23/22 |
| US | 2/25/22 |
| US | 3/2/22 |
| US | 3/5/22 |
| US | 3/5/22 |
| US | 3/6/22 |
| US | 3/14/22 |
| US | 3/14/22 |
| US | 3/15/22 |
| US | 3/21/22 |
| US | 3/21/22 |
| US | 3/28/22 |
| US | 4/4/22 |

FIG. 179C

*Test for options*

| Tests | |
|---|---|
| Hours | X |
| Day | X |
| Week | ✓ |
| Month | ✓ |
| Quarter | X |

FIG. 179D

*Creates date Week bucket values with filling and counts*

| date | Bucket values | (count) |
|---|---|---|
| 2/9/22 | 2/7/22 - 2/13/22 | (2) |
| 2/12/22 | | |
| 2/18/22 | 2/14/22 - 2/20/22 | (2) |
| 2/19/22 | | |
| 2/23/22 | 2/21/22 - 2/27/22 | (2) |
| 2/25/22 | | |
| 3/2/22 | 2/28/22 - 3/6/22 | (4) |
| 3/5/22 | | |
| 3/5/22 | | |
| 3/6/22 | | |
| | 3/7/22 - 3/13/22 | (-) |
| 3/14/22 | 3/14/22 - 3/20/22 | (3) |
| 3/14/22 | | |
| 3/15/22 | | |
| 3/21/22 | 3/21/22 - 3/27/22 | (2) |
| 3/21/22 | | |
| 3/28/22 | 3/28/22 - 4/3/22 | (1) |
| 4/4/22 | 4/4/22 - 4/10/22 | (1) |

FIG. 179E

*Send values and counts to UI*

| | |
|---|---|
| 2/7/22 - 2/13/22 | (2) |
| 2/14/22 - 2/20/22 | (2) |
| 2/21/22 - 2/27/22 | (2) |
| 2/28/22 - 3/6/22 | (4) |
| 3/7/22 - 3/13/22 | (-) |
| 3/14/22 - 3/20/22 | (3) |
| 3/21/22 - 3/27/22 | (2) |
| 3/28/22 - 4/3/22 | (1) |
| 4/4/22 - 4/10/22 | (1) |

FIG. 179F

*Send starting selection !ALL with count*

| | |
|---|---|
| !ALL | (17) |

18100
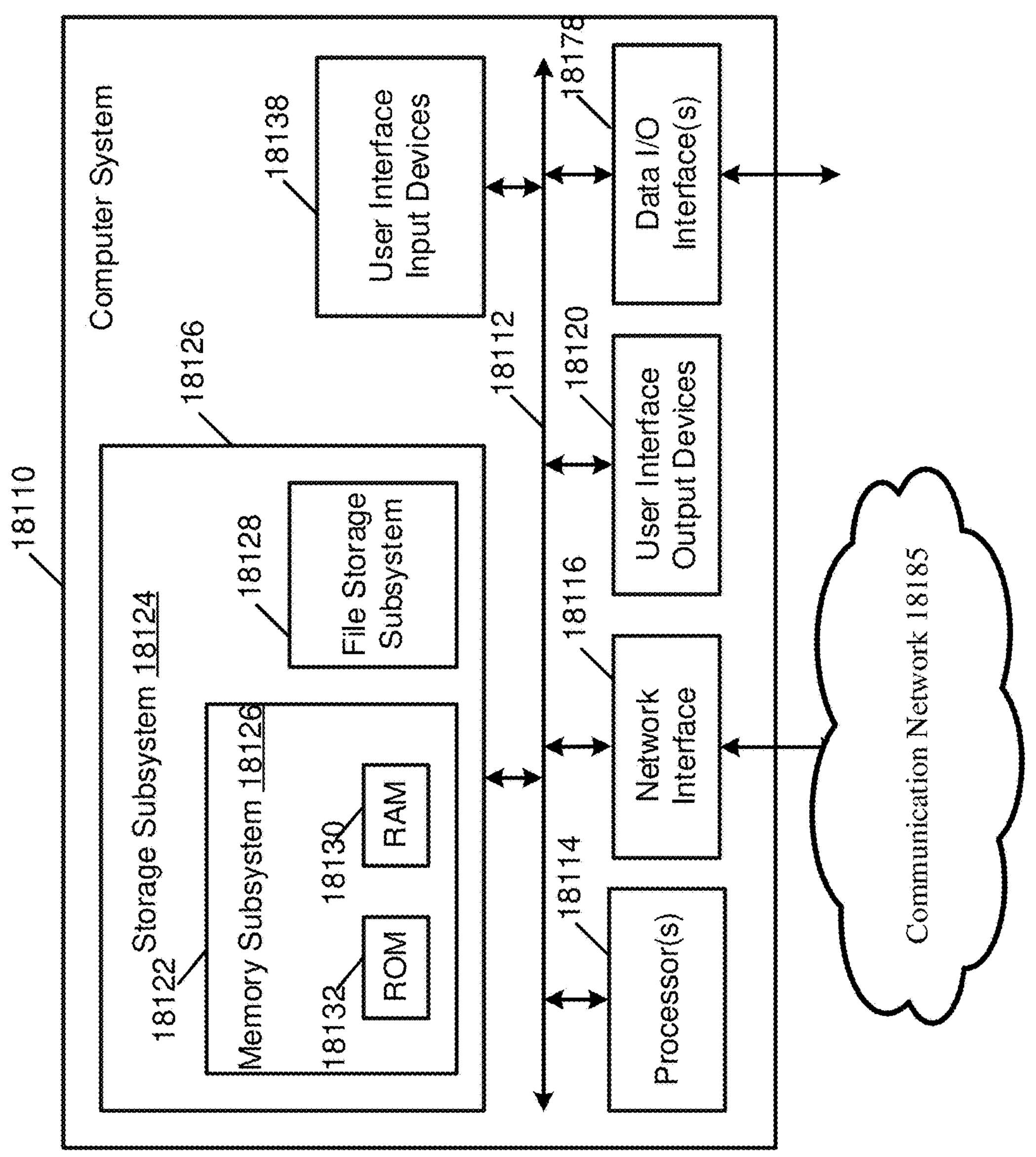
Fig. 181 Computer System

METHODS AND SYSTEMS FOR BUCKETING VALUES IN SPREADSHEET FUNCTIONS

CROSS-REFERENCE

This application claims priority to and the benefit of U.S. Application No. 63/337,572 titled "Methods and Systems for Bucketing Values in Spreadsheet Functions," filed 2 May 2022.

RELATED APPLICATIONS

This application is related to and incorporates by reference the following applications:

- U.S. application Ser. No. 18/142,560 titled "Methods and Systems for Spreadsheet Function and Flex Copy Paste Control of Formatting and Use of Selection List Panels," filed 2 May 2023, now U.S. Pat. No. 12,169,687, issued 17 Dec. 2024, which claims the benefit of U.S. Application No. 63/337,576 filed 2 May 2022, and
- U.S. application Ser. No. 16/031,339 titled "Methods and Systems for Providing Selective Multi-Way Replication and Atomization of Cell Blocks and Other Elements in Spreadsheets and Presentations," filed 10 Jul. 2018, now U.S. Pat. No, 11,182,548, issued 23 Nov. 2021, which claims the benefit of U.S. Provisional Application No. 62/530,835, filed Jul. 10, 2017, and
- U.S. application Ser. No. 16/031,379 titled "Methods and Systems for Connecting a Spreadsheet to External Data Sources with Formulaic Specification of Data Retrieval," filed 10 Jul. 2018, now U.S. Pat. No. 11,354,494, issued 7 Jun. 2022, which claims the benefit of U.S. Provisional Application No. 62/530,786, filed Jul. 10, 2017, and
- U.S. application Ser. No. 16/031,759 titled "Methods and Systems for Connecting A Spreadsheet to External Data Sources with Temporal Replication of Cell Blocks," filed 10 Jul. 2018, now U.S. Pat. No. 11,017,165, issued 25 May 2021, which claims the benefit of U.S. Provisional Patent Application No. 62/530,794, filed on Jul. 10, 2017, and
- U.S. application Ser. No. 16/191,402 titled "Methods and Systems for Connecting A Spreadsheet to External Data Sources with Ordered Formulaic Use of Data Retrieved," filed 14 Nov. 2018, now U.S. Pat. No. 11,036,929, issued 15 Jun. 2021, which claims the benefit of U.S. Provisional Patent Application No. 62/586,719, filed on 15 Nov. 2017, and
- U.S. application Ser. No. 17/359,430 titled "Methods and Systems for Constructing a Complex Formula in a Spreadsheet Cell," filed 25 Jun. 2021 which claims the benefit of U.S. Application No. 63/044,990, filed 26 Jun. 2020, and
- U.S. application Ser. No. 17/359,418 titled "Methods and Systems for Presenting Drop-Down, Pop-Up or Other Presentation of a Multi-Value Data Set in a Spreadsheet Cell," filed 25 Jun. 2021 which claims the benefit of U.S. Application No. 63/044,989, filed 26 Jun. 2020, and
- U.S. application Ser. No. 17/384,404 titled "Method and System for Improved Spreadsheet Charts," filed 23 Jul. 2021 which claims the benefit of U.S. Application No. 63/055,581, filed 23 Jul. 2020.
- U.S. application Ser. No. 17/374,898 titled "Method and System for Improved Spreadsheet Analytical Functioning," filed 13 Jul. 2021 which claims the benefit of U.S. Application No. 63/051,280, filed 13 Jul. 2020, and
- U.S. application Ser. No. 17/374,901 titled "Method and System for Improved Ordering of Output from Spreadsheet Analytical Functions," filed 13 Jul. 2021 which claims the benefit of U.S. Application No. 63/051,283, filed 13 Jul. 2020, and
- U.S. application Ser. No. 17/752,814 titled "Method and System for Spreadsheet Error Identification and Avoidance," filed 24 May 2022 which claims the benefit of U.S. 63/192,475, filed 24 May 2021, and
- U.S. application Ser. No. 17/903,934 titled "Method and System For Improved 2D Ordering of Output From Spreadsheet Analytical Functions," filed 6 Sep. 2022 which claims the benefit of U.S. Application No. 63/240,828, filed 3 Sep. 2021, and
- U.S. application Ser. No. 17/988,641 titled "Methods And Systems for Sorting Spreadsheet Cells With Formulas," filed 16 Nov. 2022 which claims the benefit of U.S. Application No. 63/280,590, filed 17 Nov. 2021, and
- U.S. application Ser. No. 18/074,301 titled "Method and System for Improved Visualization of Charts in Spreadsheets," filed 2 Dec. 2022 which claims the benefit of U.S. Application No. 63/285,945, filed 3 Dec. 2021 .

BACKGROUND

Today's spreadsheets have a very broad range of logical, math, engineering, statistical, etc. built-in functions (predefined formulas) designed to simplify analytics for users. However, none of those existing functions bucket or group data that can then be used by regular cell range or array function formulas, e.g., SUM, COUNT, MIN, and STDEV. The one place in the traditional spreadsheet where bucketing or grouping capabilities exist is in the Pivot Table. Which is not a function and as described by the Microsoft Excel 2019 Bible, published by Wiley, the "A PivotTable is essentially a dynamic summary report generated from a database". Which has a limited user set because, as the Microsoft Excel 2019 Bible published by Wiley states, "Unfortunately many users avoid this feature because they think it's too complicated".

Accordingly, an opportunity arises to allow all spreadsheet users to use functions to create bucketed or grouped data calculations using normal cell functional formulas rather than having to learn a specialized PivotTable feature or the specialized functions, e.g., GETPIVOTDATA or CUBE functions, that convert its output for separate cell use. There is an opportunity to dramatically broaden the functions that can be used in these bucketed or grouped calculations and to create much more complicated formulas combining different functions and algebraic operators. There is an opportunity to do bucketed or grouped calculations in regular cell formulas using regular cell functional formulas. There is also an opportunity to broaden the types of grouping done, simplify the grouping setup, and eliminate presentation of unapplicable options. Thus, broadening the capabilities for the PivotTable knowledgeable users and giving the many non-PivotTable users a regular spreadsheet cell functional capability to do bucketed or grouped analyses.

SUMMARY

The disclosed technology creates a family of spreadsheet functions which allows users to create bucketed/grouped data values which can be used by other cell function calculations and in some embodiments be used within other functions to add bucketing/grouping to their calculations. One embodiment of our disclosed technology creates single value bucket/group generating function which can be used to populate a cell or be used within another function to populate one or more cells. Another embodiment of our disclosed technology are functions which populate more than one cell with bucket/group values. Another embodiment of our disclosed technology is the addition of a bucketing/grouping capability to our other spreadsheet functions, allowing users the option of employing buckets/groups.

Each of these embodiments has numerous versions with different capabilities including automatic filling of missing buckets/groups, bucket/group labels that can be altered by users, and data constraining/filtering capabilities. Our embodiments support bucket/group usage with a broad spectrum of spreadsheet functions and functional formulas involving multiple different spreadsheet functions and algebraic operators. Our new functions support usage with a broad range or array functions, e.g., SUM, MIN, and STDEV, as well as broad usage of non-range or non-array functions, e.g., COS, SIN and LOG. Our bucketing/grouping capabilities have automated capabilities such as starting numeric value ranges with round numbers rather than the first value in the data being evaluated. Supporting date buckets in weeks with an auto set or user set week start day. Our technology supports text bucketing such as alphabetical and/or alphanumeric bucketing/grouping. Our technology delivers buckets/groups which can be used to formulaically access the data in the group or bucket for regular function calculations in other cells or within a larger formula.

Particular aspects of the technology disclosed are described in the claims, specification, and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The color drawings also may be available in PAIR via the Supplemental Content tab.

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

Figures 1A, 1B, 1C:
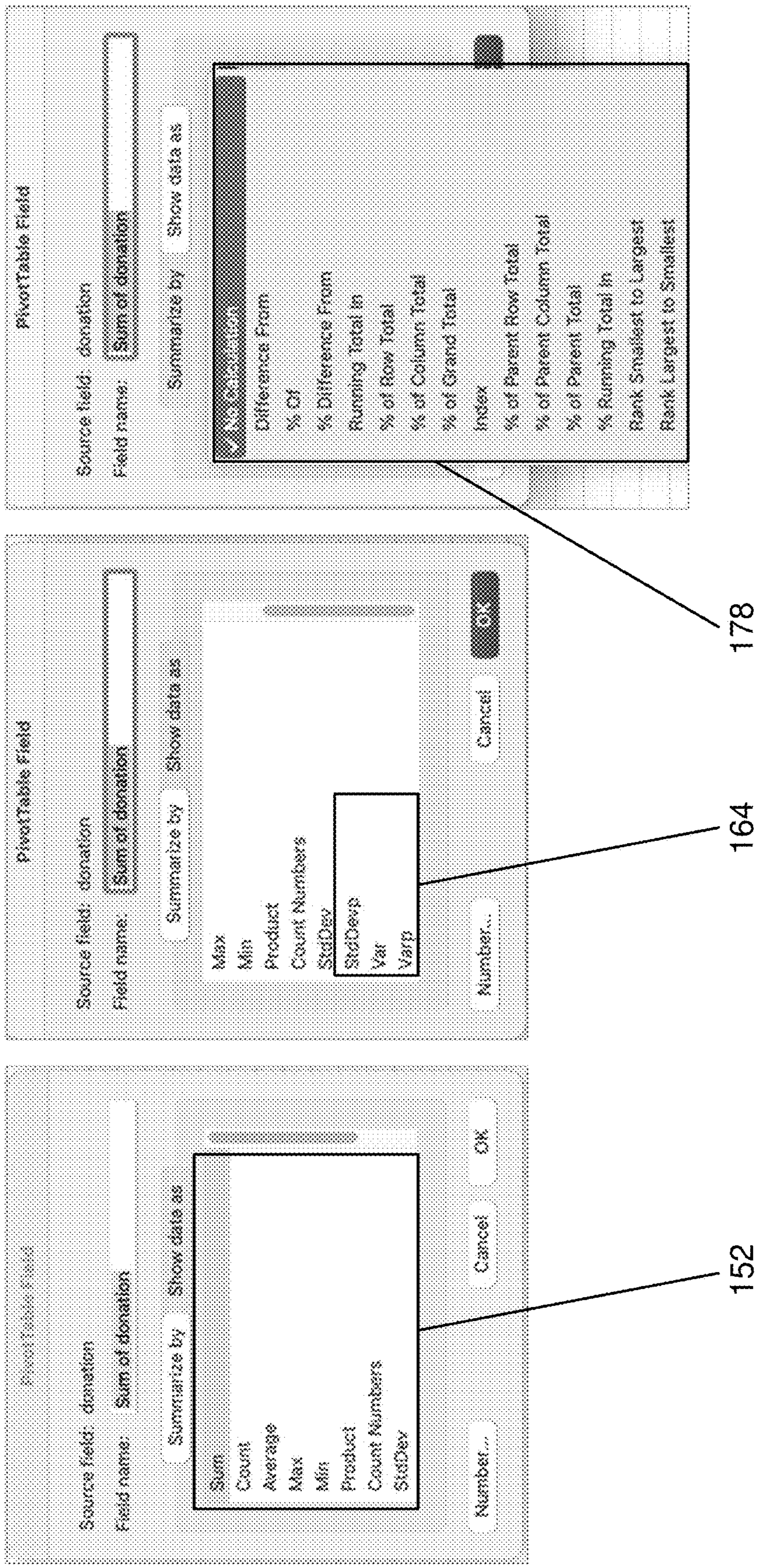

FIGS. 1A, 1B and 1C examples the eleven data summarization functions and other calculations available in Microsoft Excel PivotTables.

FIGS. 2, 3, 4A, 4B and 5 example use of Microsoft Excel PivotTable with 1000 increment numeric groups.

Figure 6:
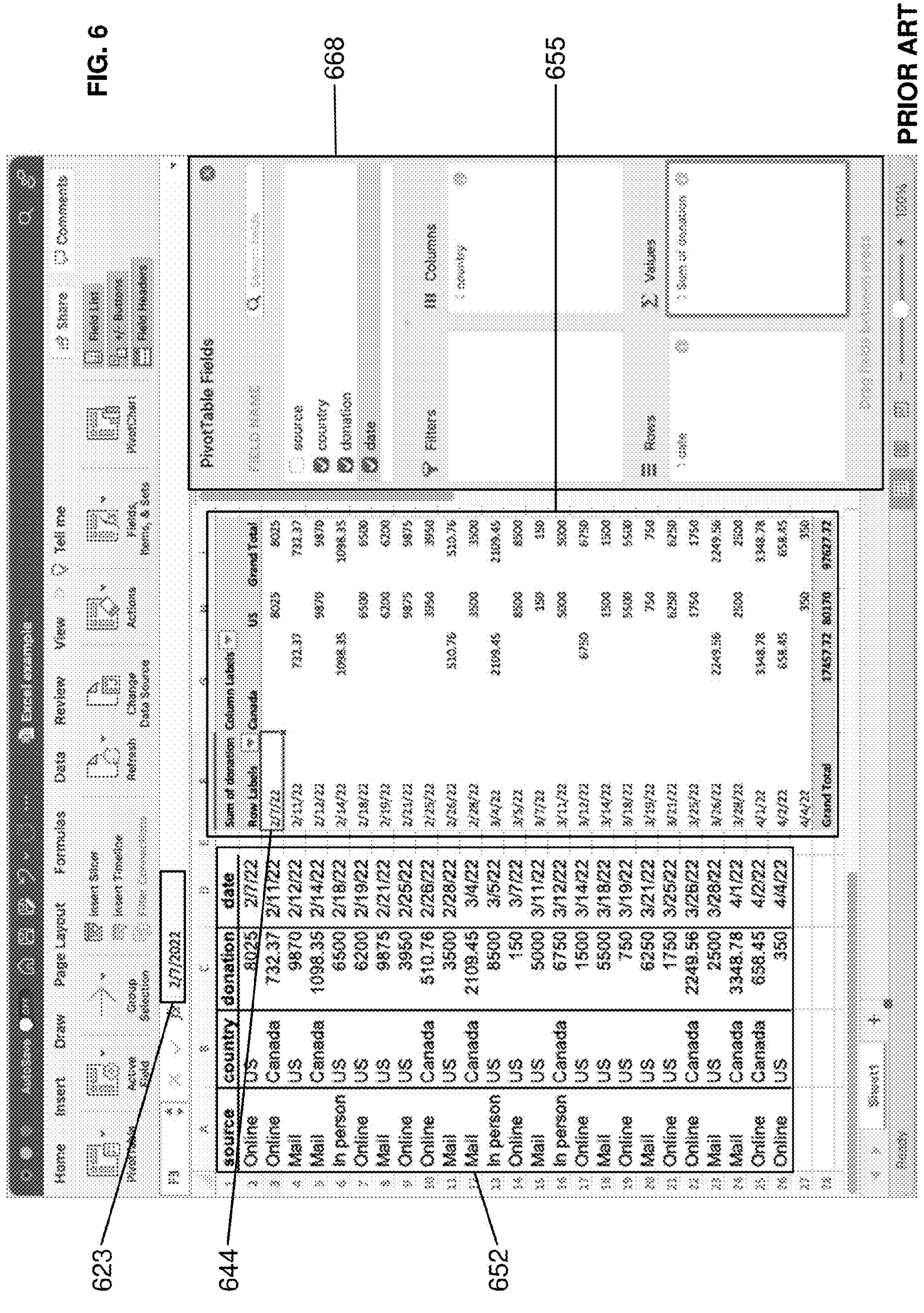
FIG. 6 PRIOR ART
Figure 7:
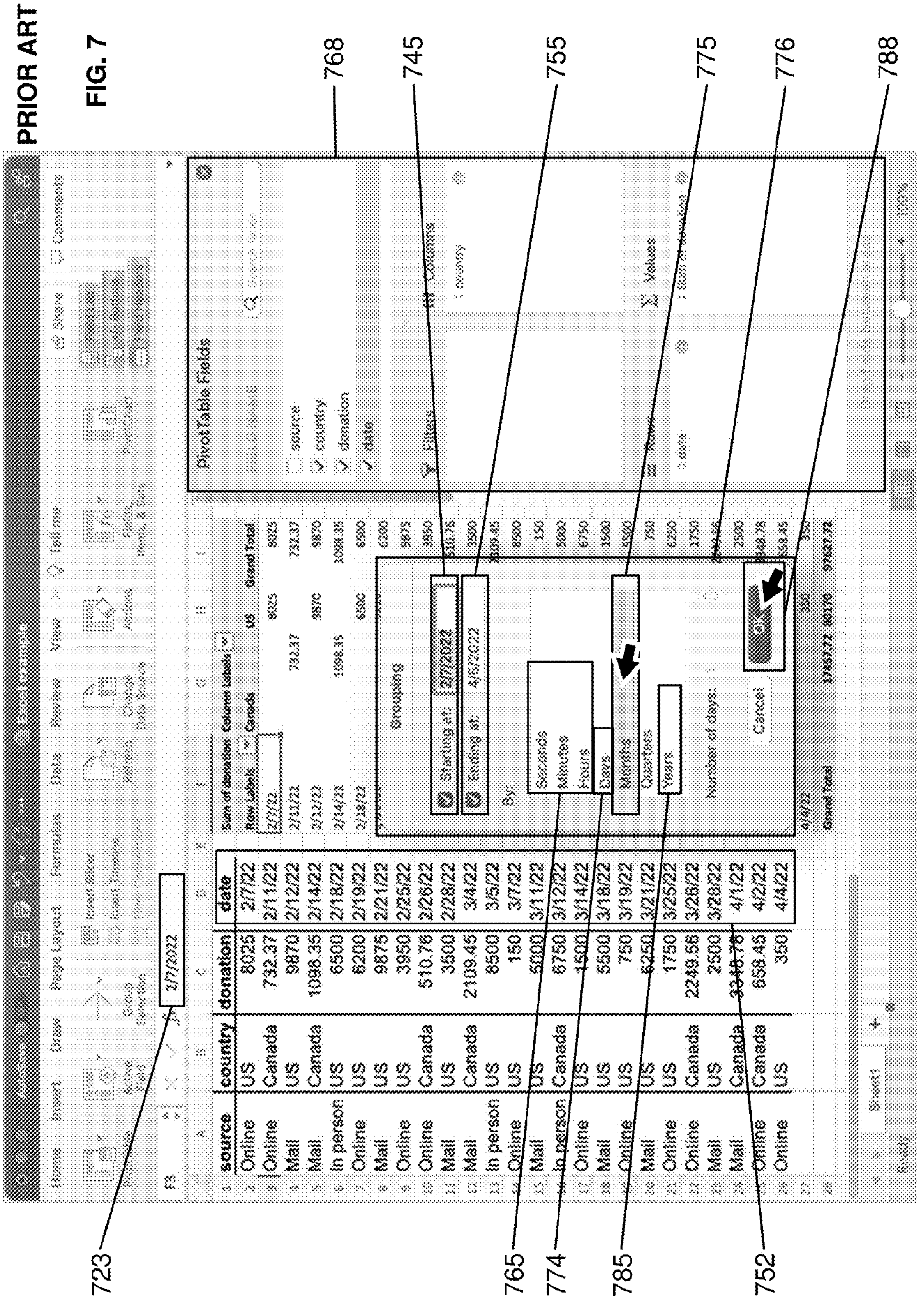
PRIOR ART FIG. 7
Figure 8:
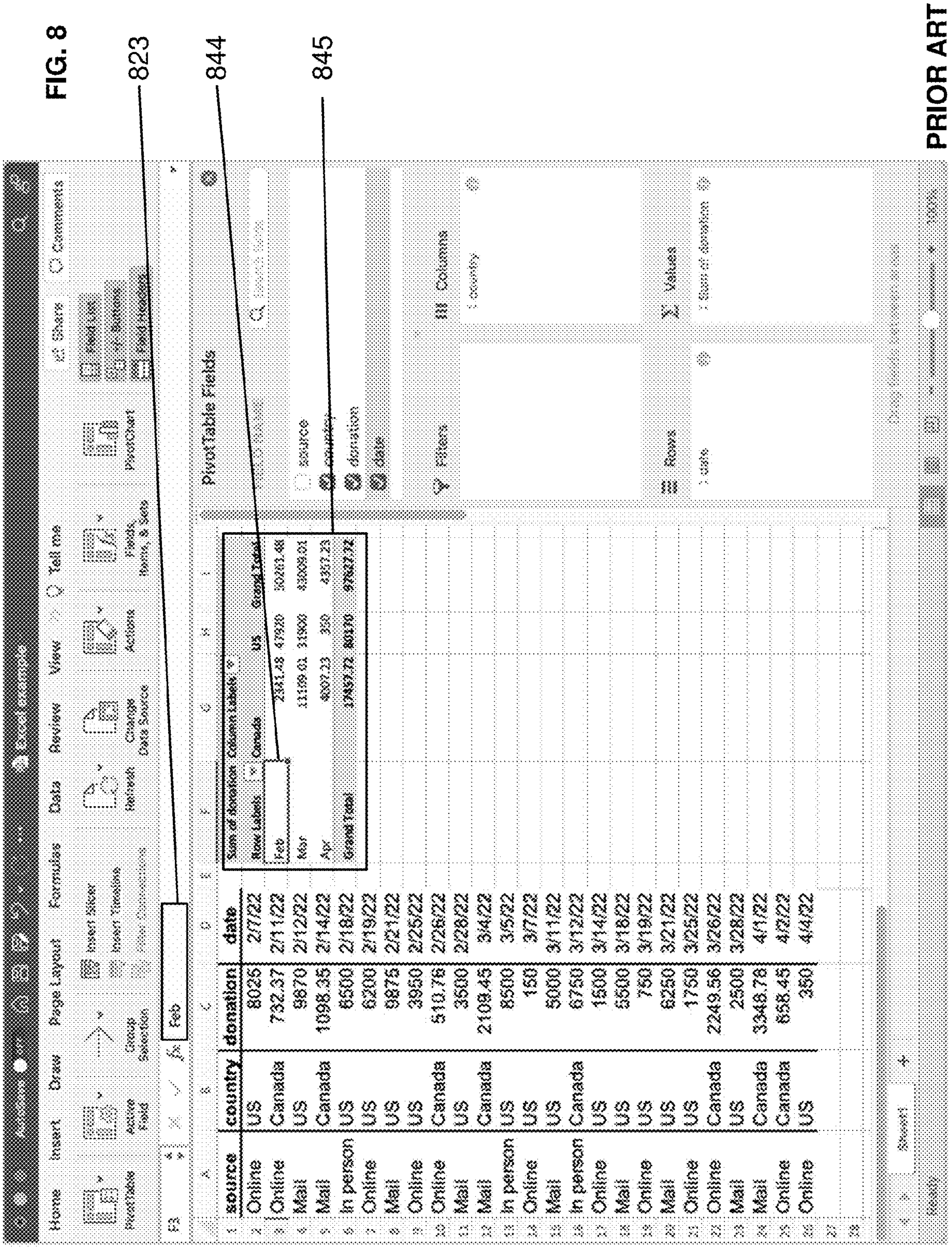

FIGS. 6, 7 and 8 example use of Microsoft Excel PivotTable with monthly increment date groups.

Figure 9:
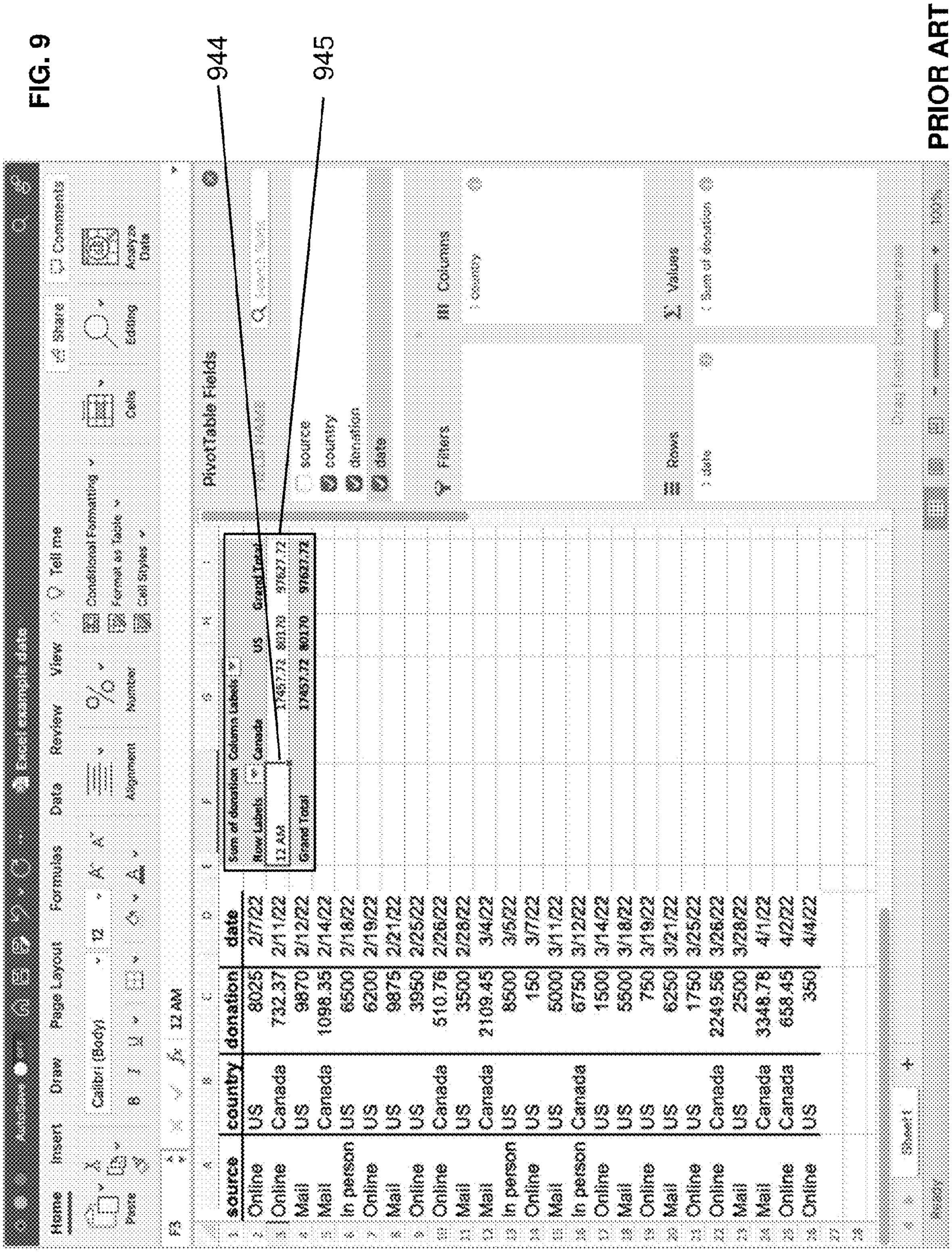

FIG. 9 examples use of Microsoft Excel PivotTable applying an hour increment to daily date data (i.e., applying an increment which is not applicable to the data).

Figure 10:
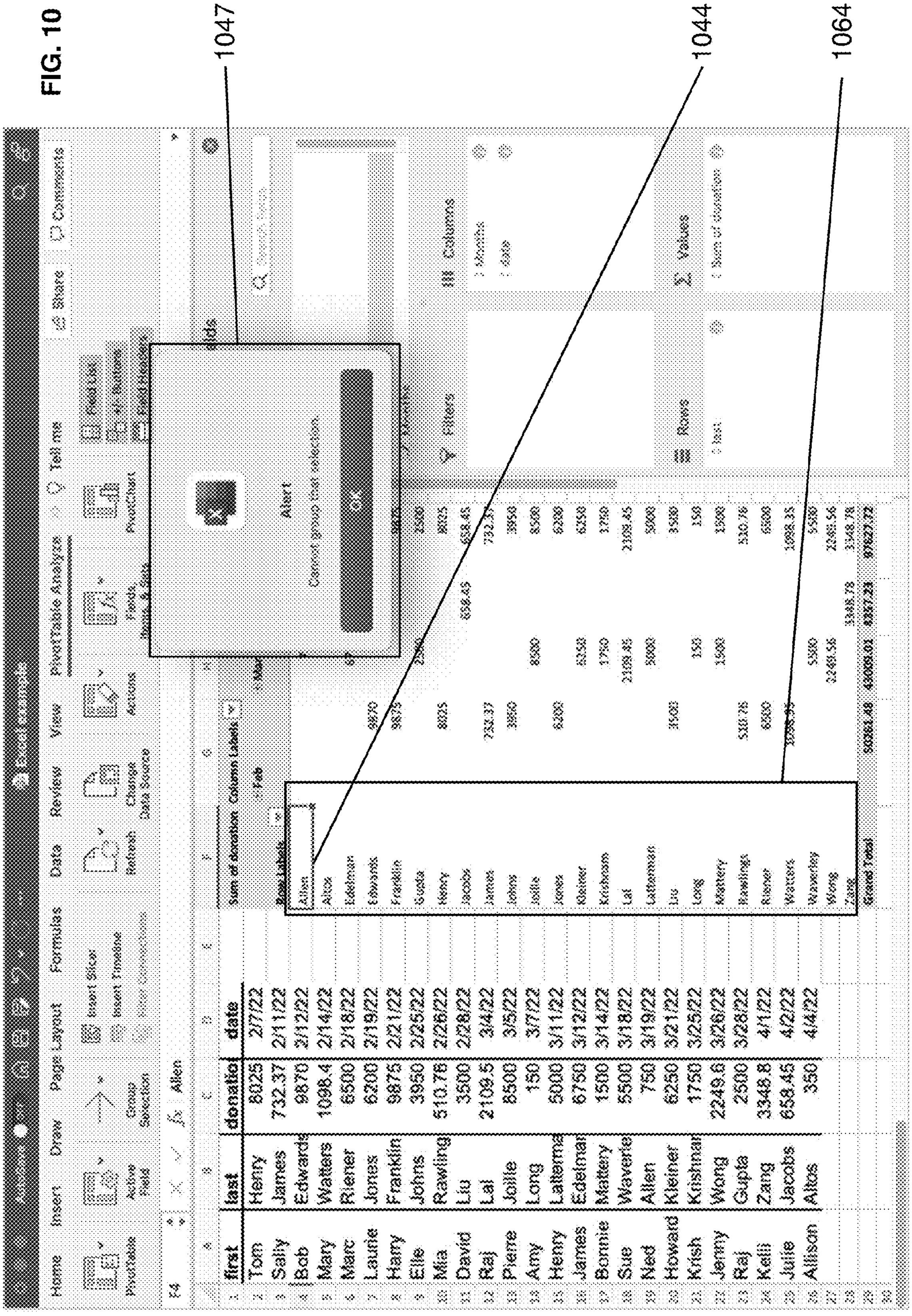

FIG. 10 examples use of Microsoft Excel PivotTable attempting to apply grouping to text data and seeing the Alert "Cannot group that selection (i.e., telling the user grouping cannot be applied to data which in this case is words).

Figure 11:
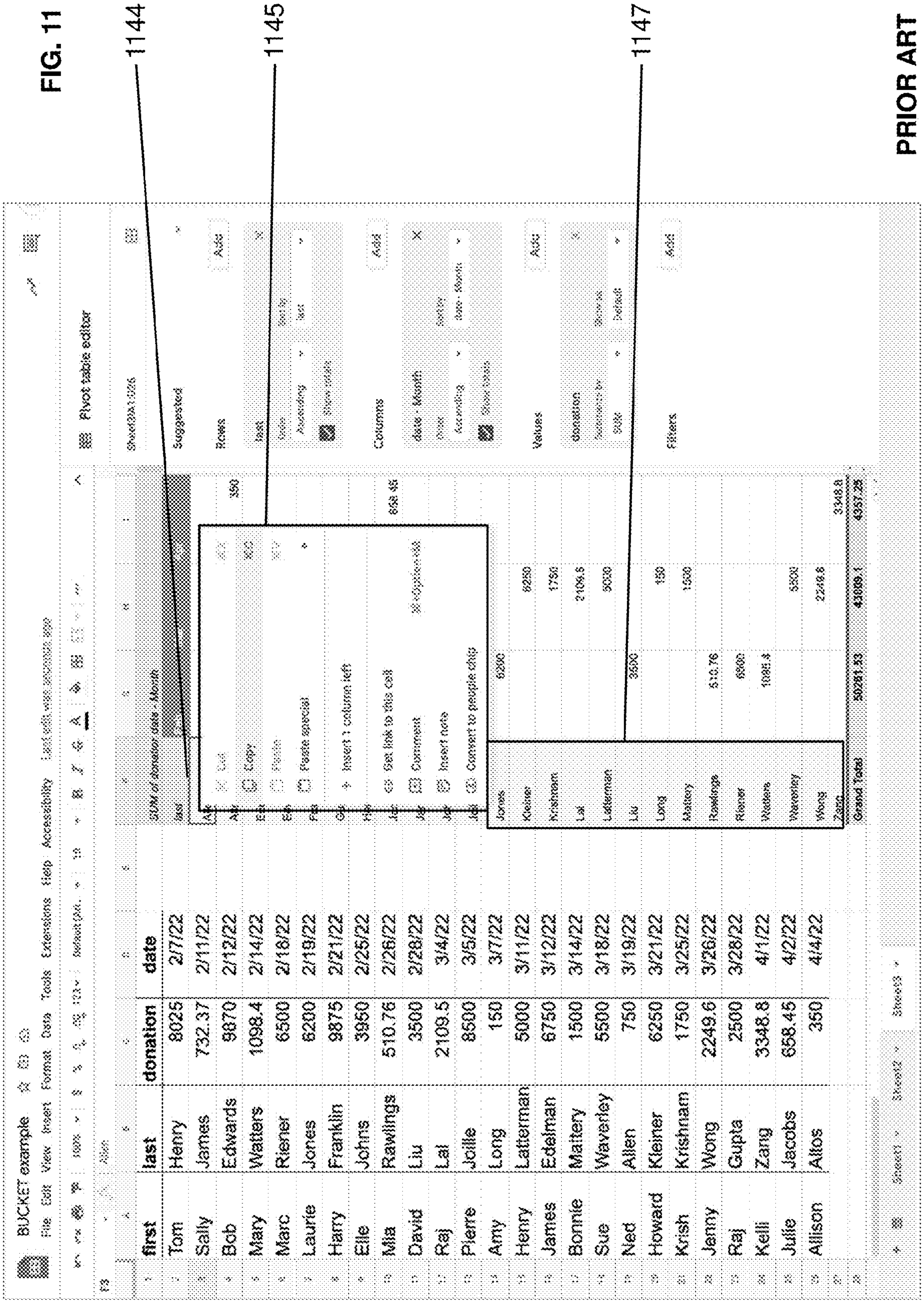
FIG. 11 PRIOR ART

FIG. 11 examples that the Google Sheets PivotTable capability also cannot group/bucket alphabetical content.

FIGS. 12, 13, 14A, 14B and 15 example use of the Google Sheets PivotTable capability with 1000 increment numeric groups.

Figure 16:
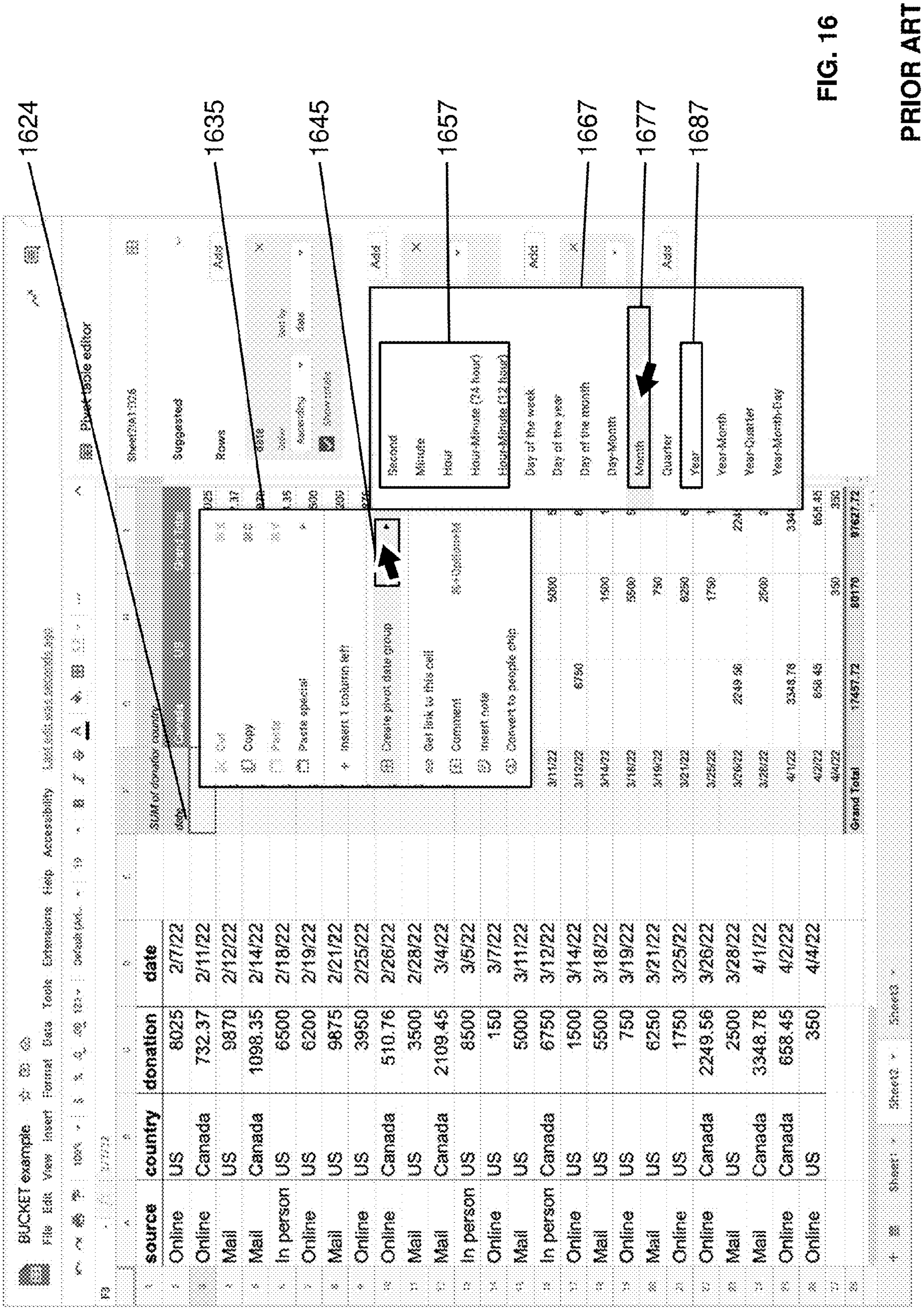
FIG. 16 PRIOR ART
Figure 17:
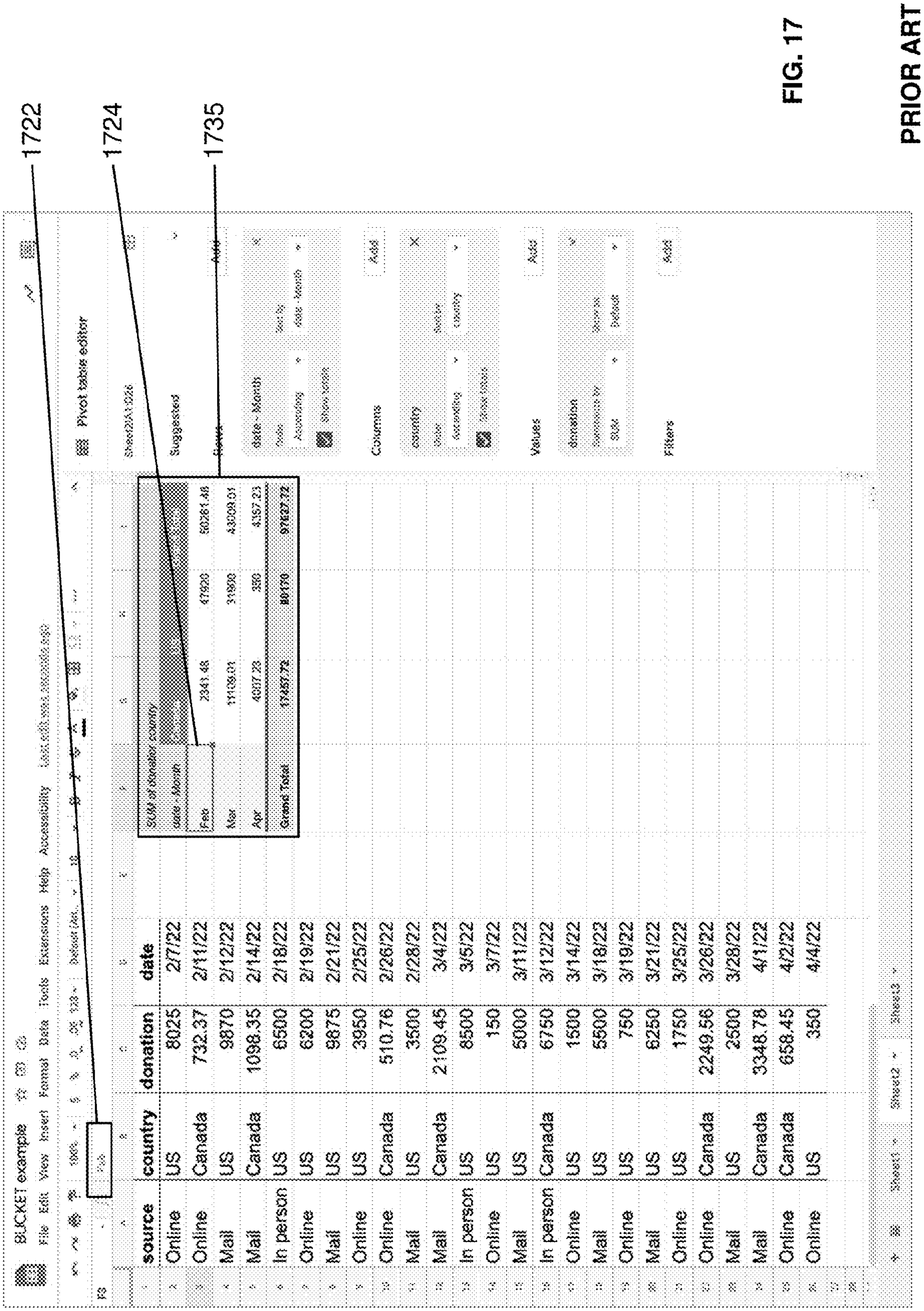
FIG. 17 PRIOR ART

FIG. 16 and FIG. 17 example use of the Google Sheets PivotTable capability with monthly increment date groups.

Figure 18:
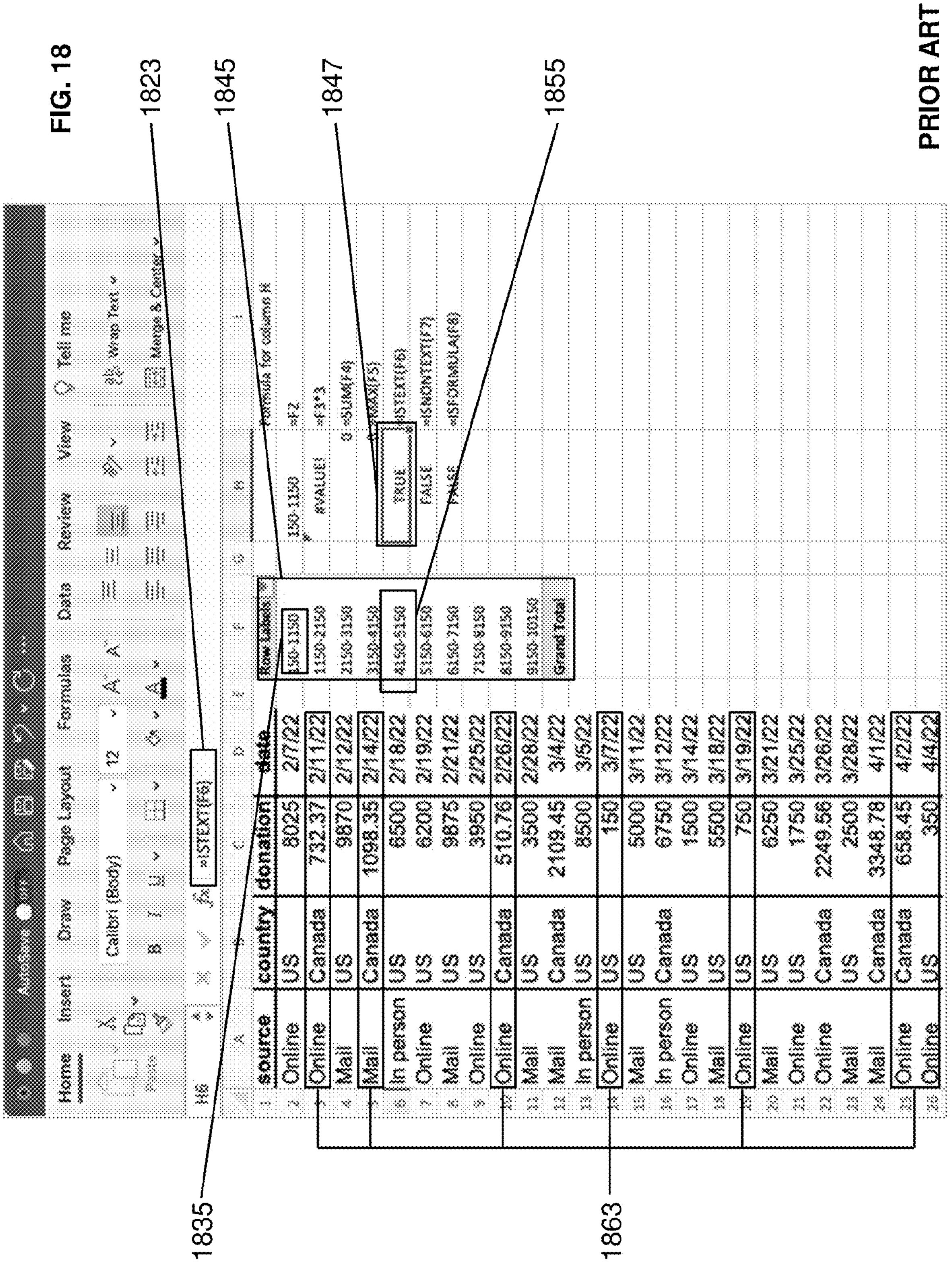

FIG. 18 examples that Microsoft Excel grouped PivotTable fields cannot be used in regular cell formulas with their associated data, that instead they are just text fields.

Figures 19A, 19B:
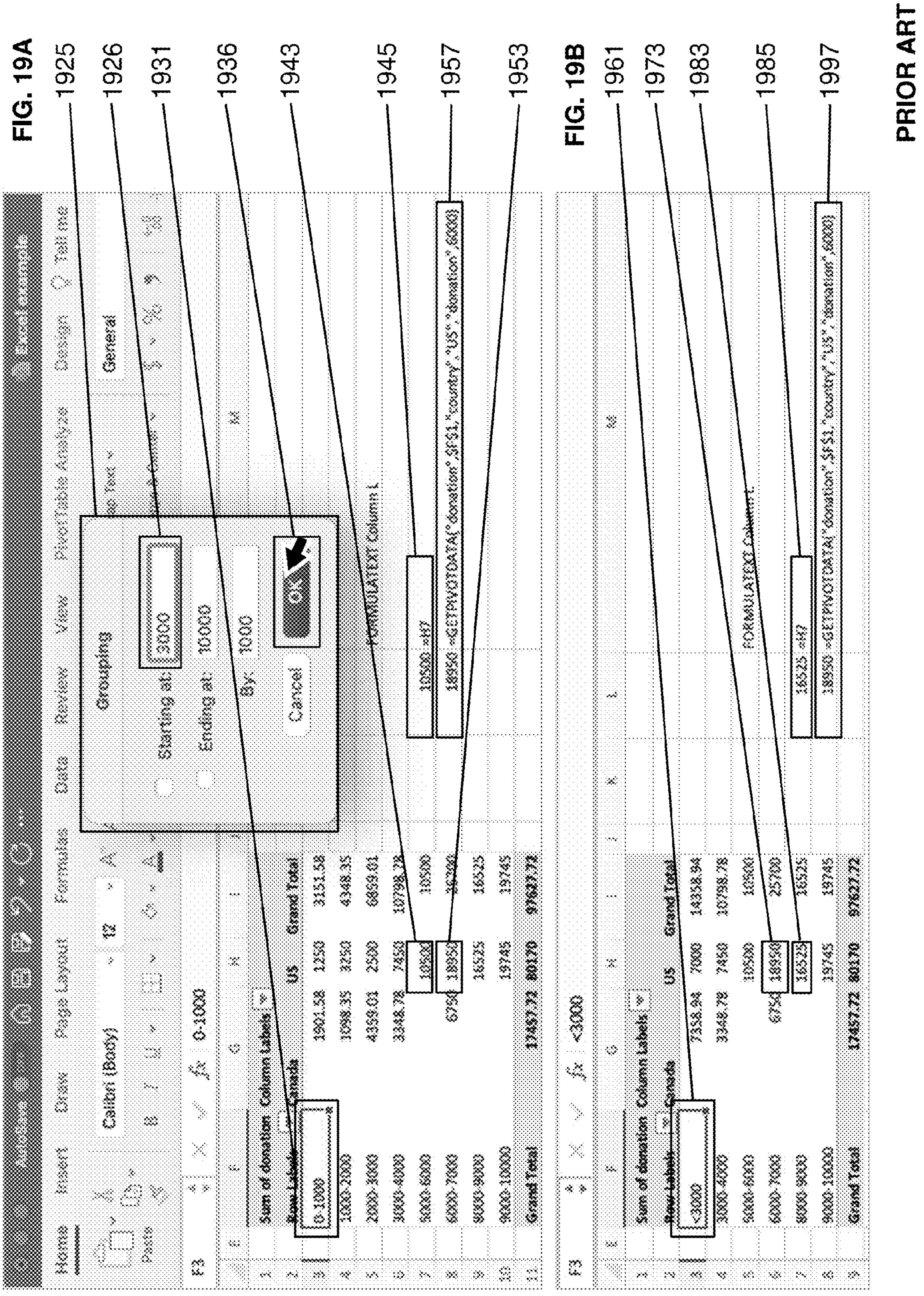
FIG. 19B PRIOR ART

FIG. 19A and FIG. 19B example the workings of the Microsoft Excel 'GETPIVOTDATA' function if the referenced data shifts position with a change in the PivotTable.

Figure 20A:
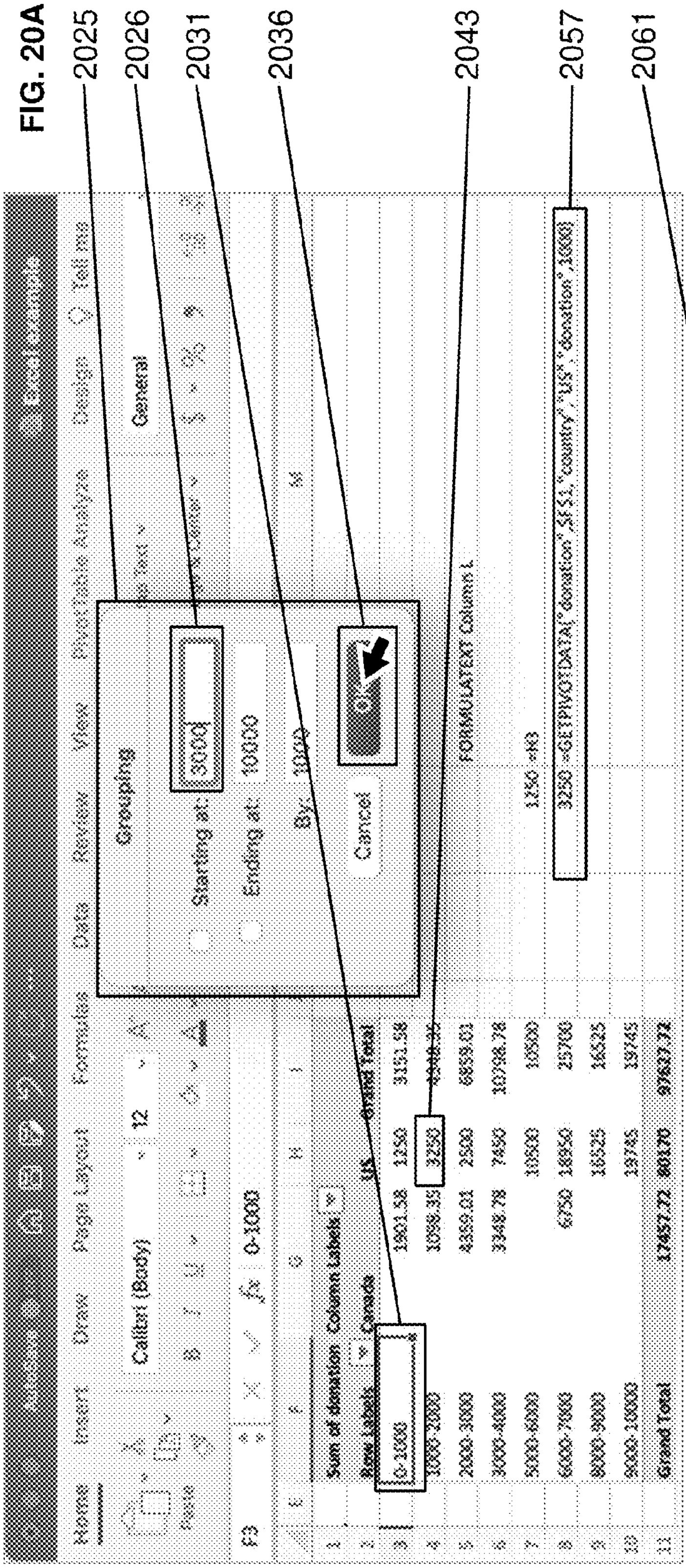
Figure 20B:
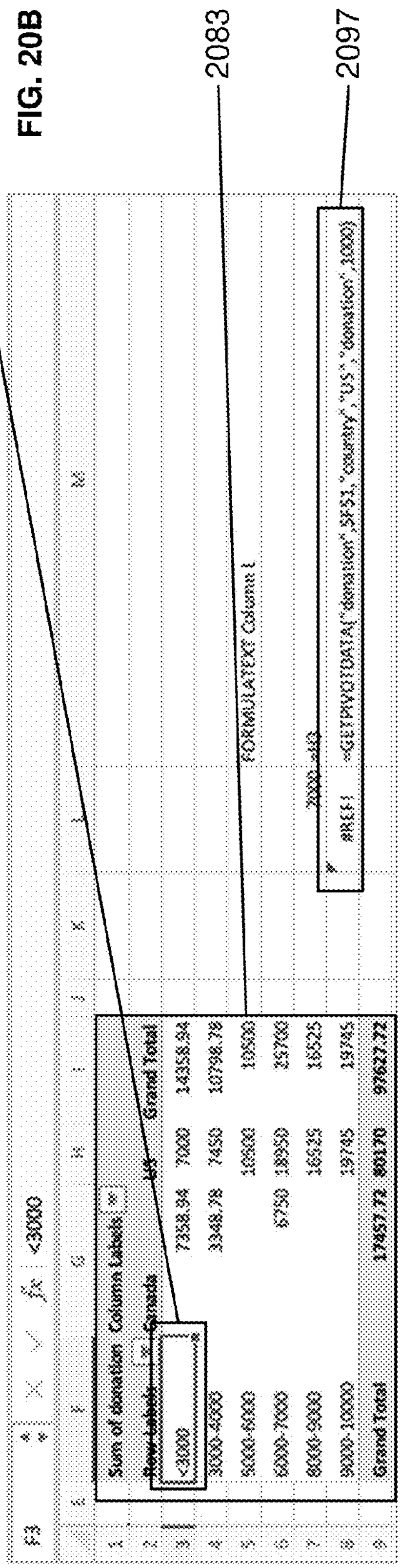
FIG. 20B PRIOR ART

FIG. 20A and FIG. 20B example the workings of the Microsoft Excel 'GETPIVOTDATA' function if the referenced data is eliminated by a change in the PivotTable.

Figure 21:
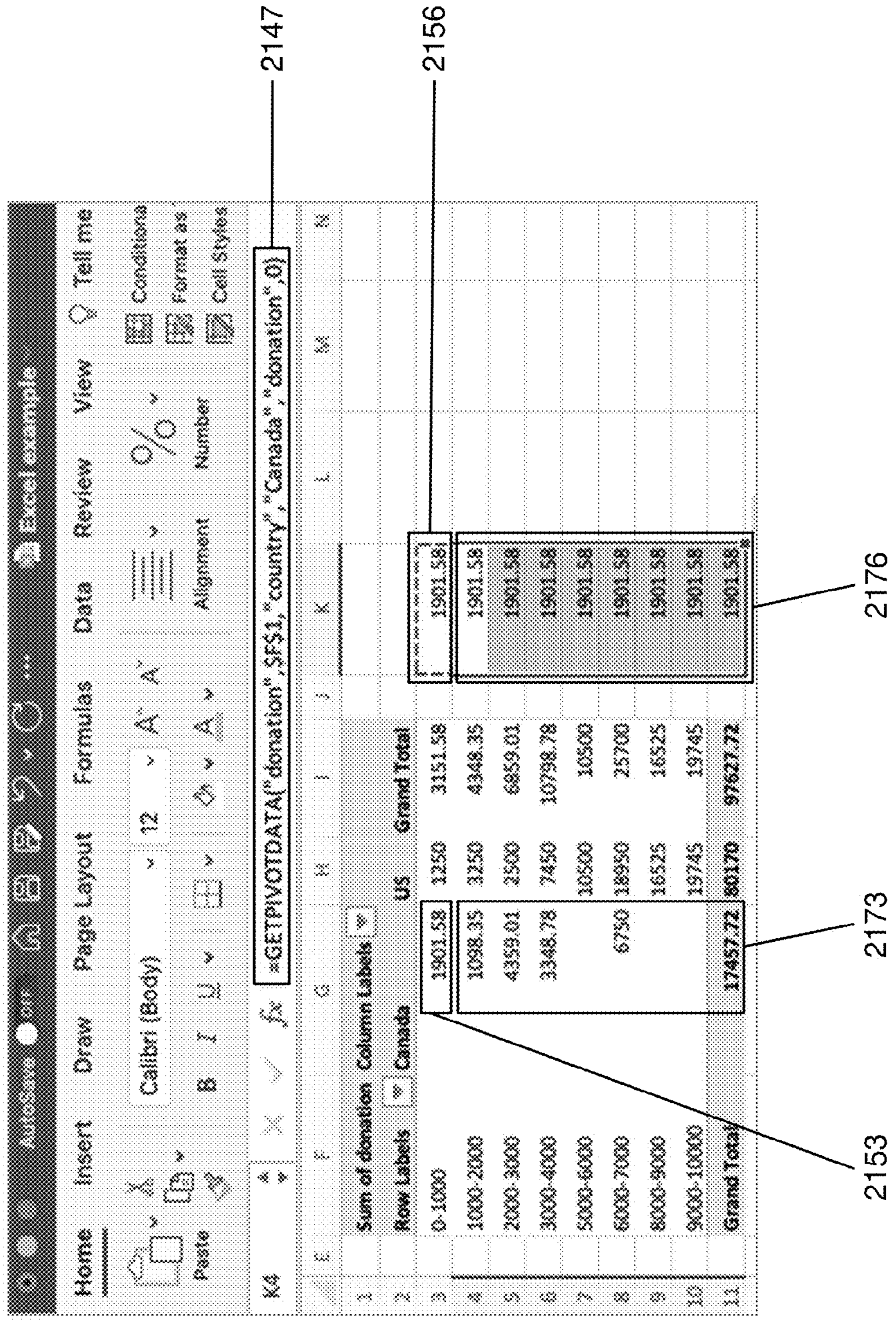
FIG. 21 PRIOR ART

FIG. 21 examples how the Microsoft Excel 'GETPIVOTDATA' function does not increment values when copy paste replicated.

Figure 22B:
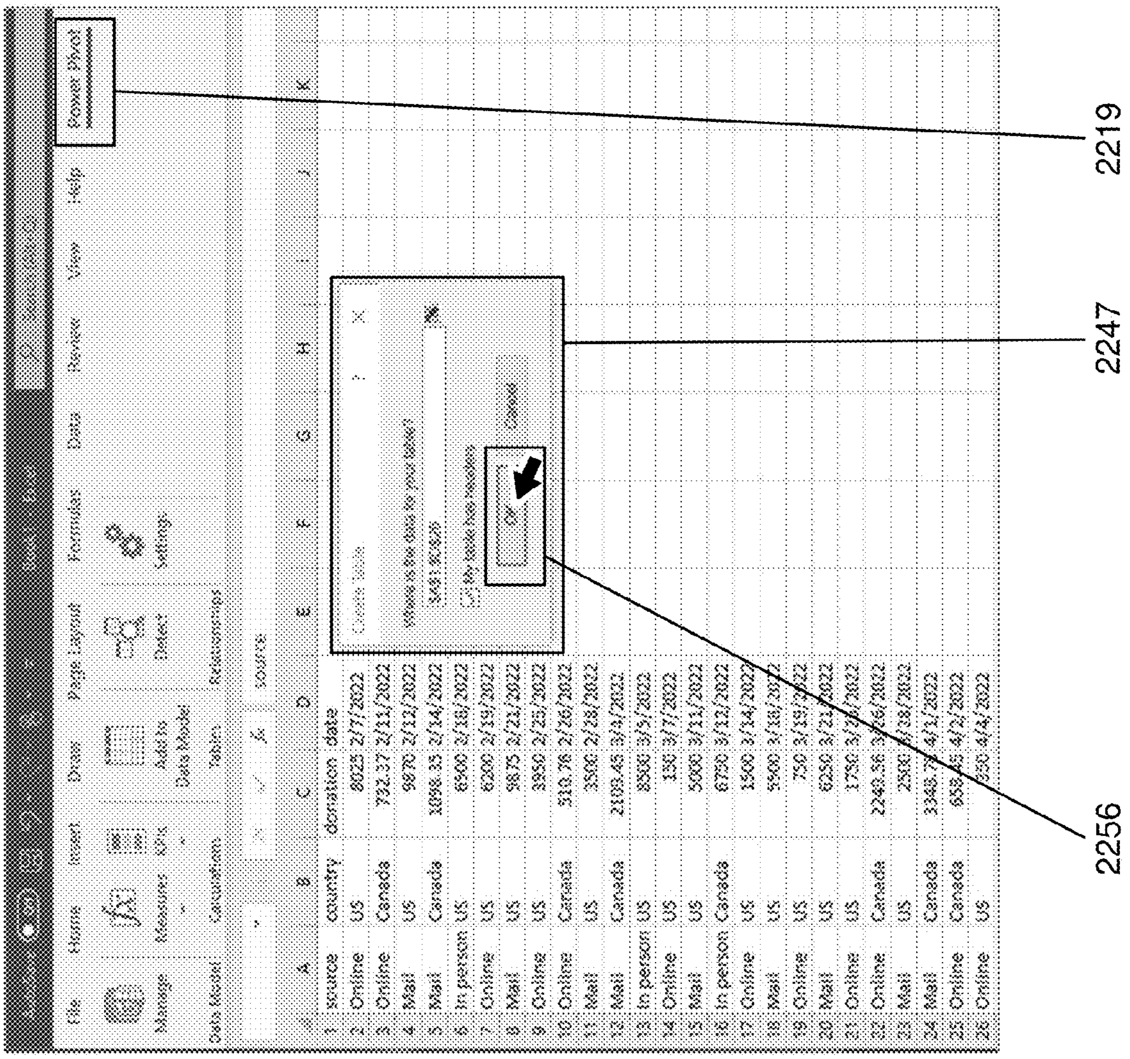
Figure 22A:
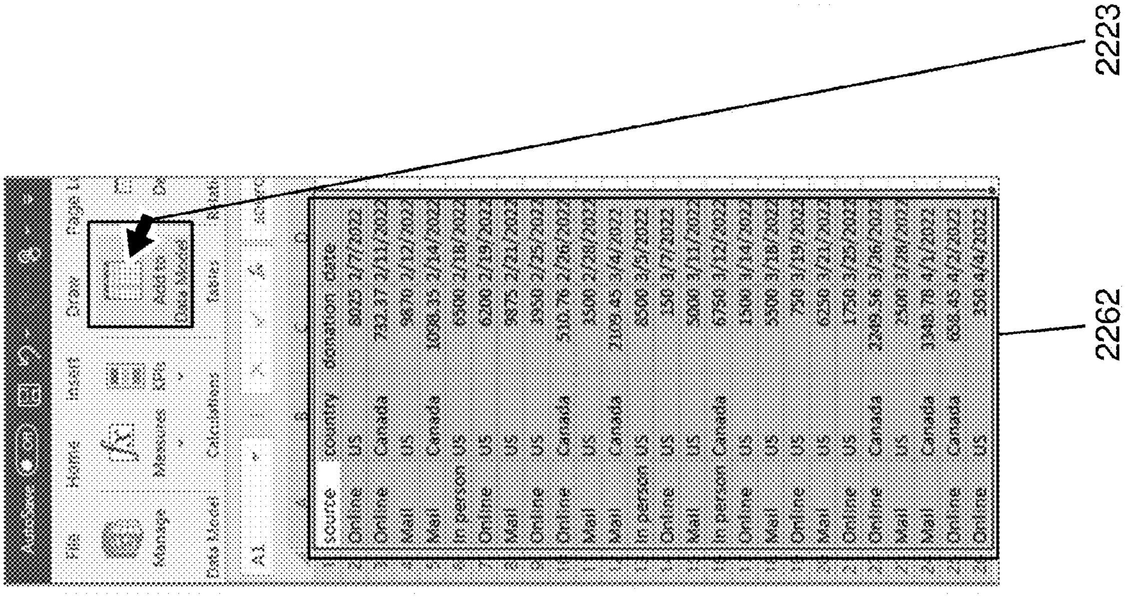

FIG. 22A and FIG. 22B examples the requirement to add data to the Power Pivot data model in Microsoft Excel to be able to use CUBE functions.

Figure 23:
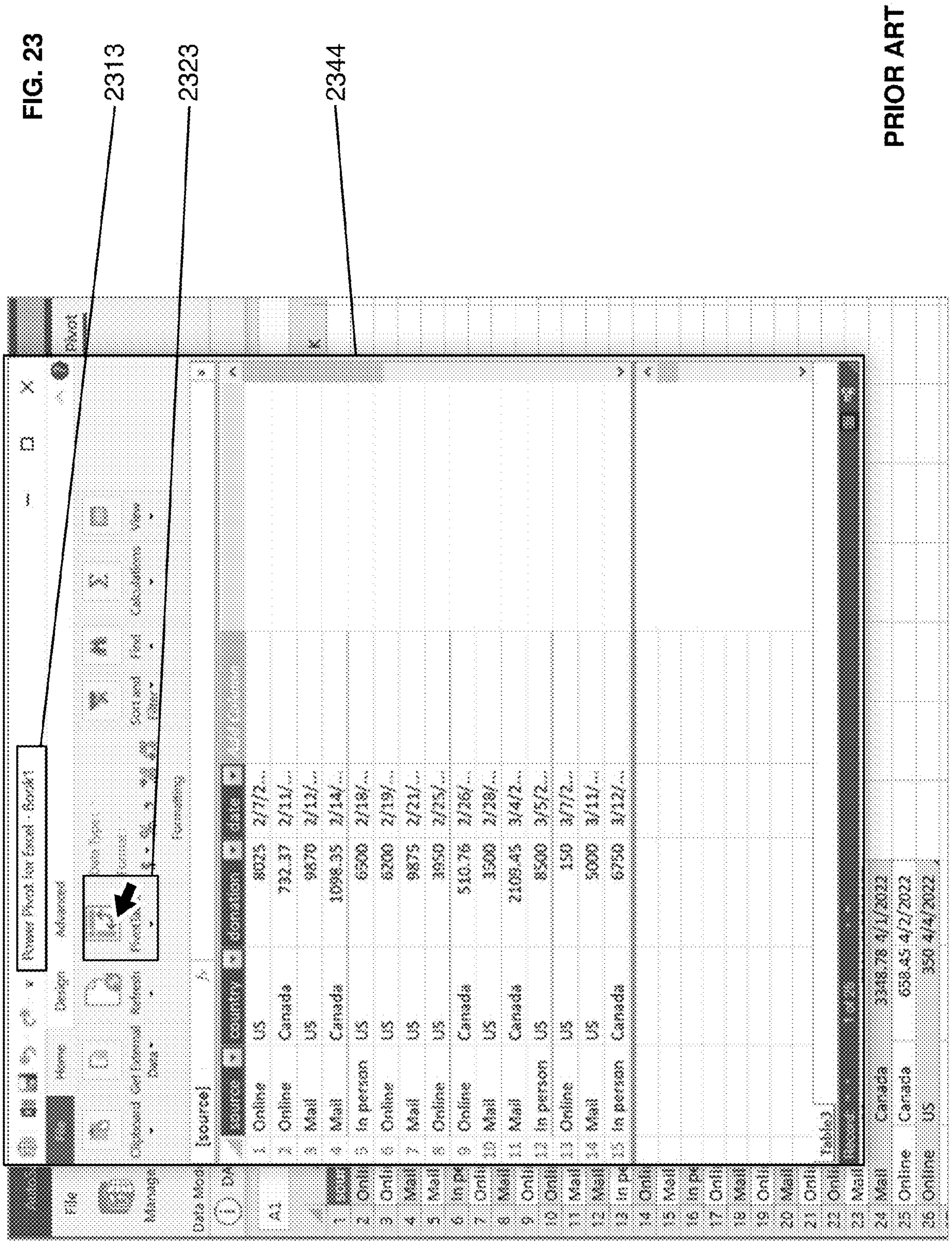
Figure 24:
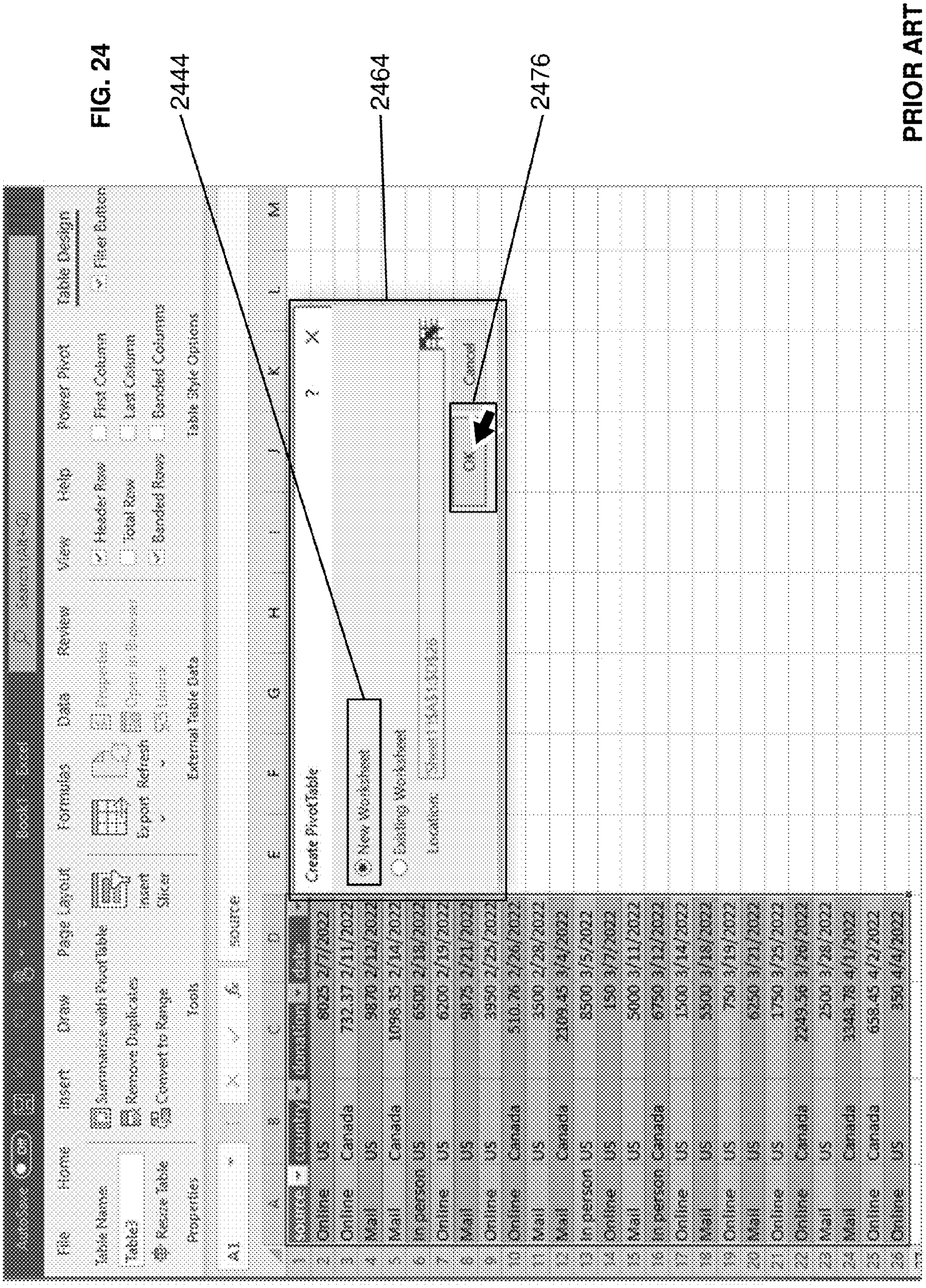
Figure 25:
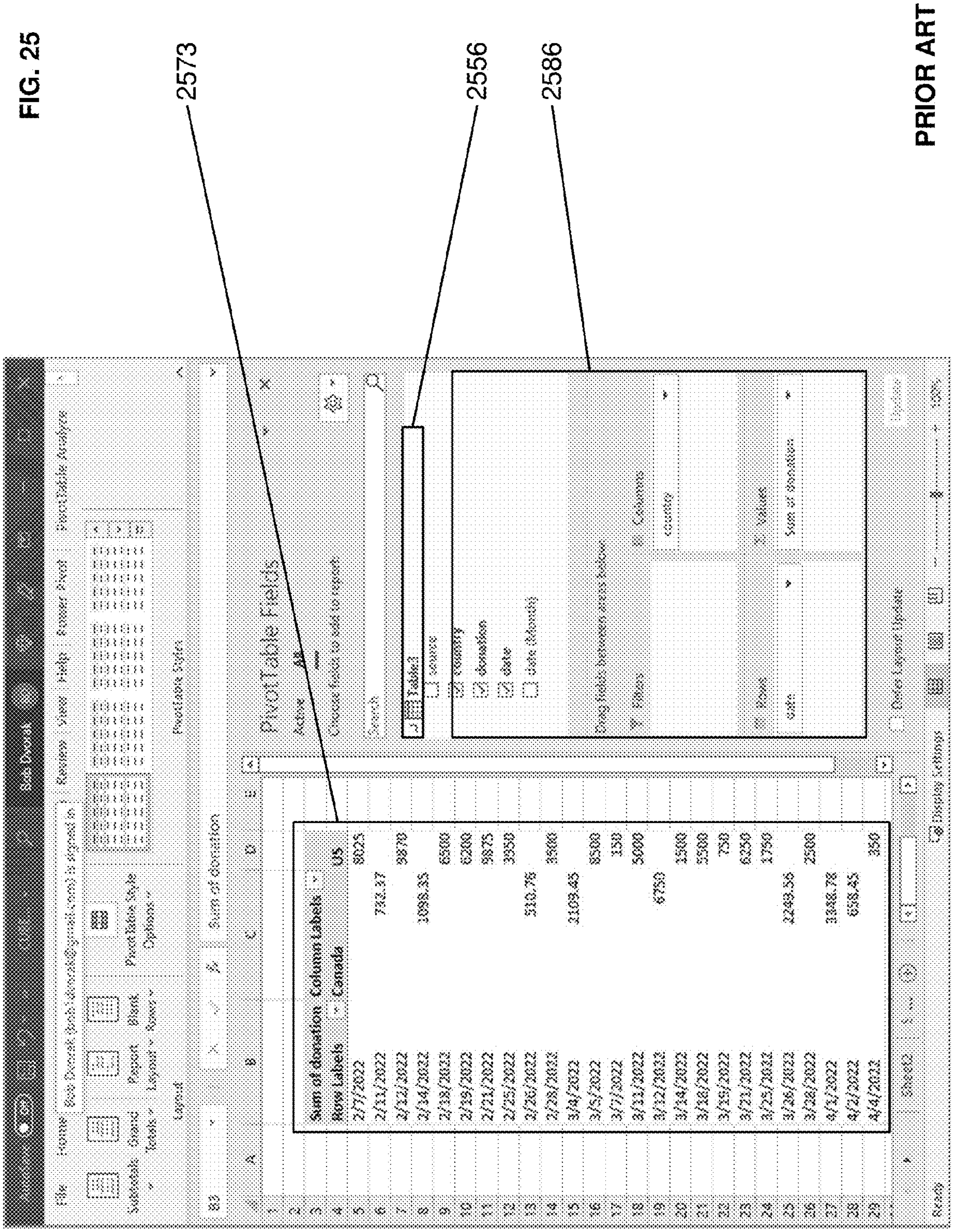

FIGS. 23, 24 and 25 example the setup in Microsoft Excel for a PivotTable using a table in the Power Pivot data model.

Figure 26B:
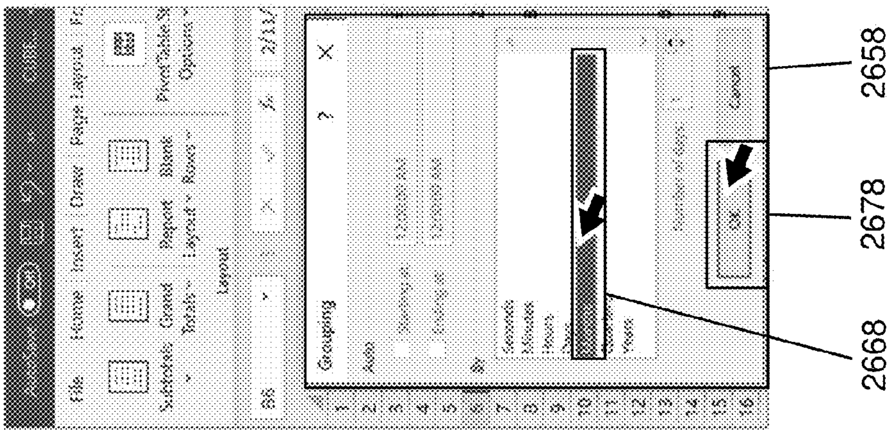
Figure 26A:
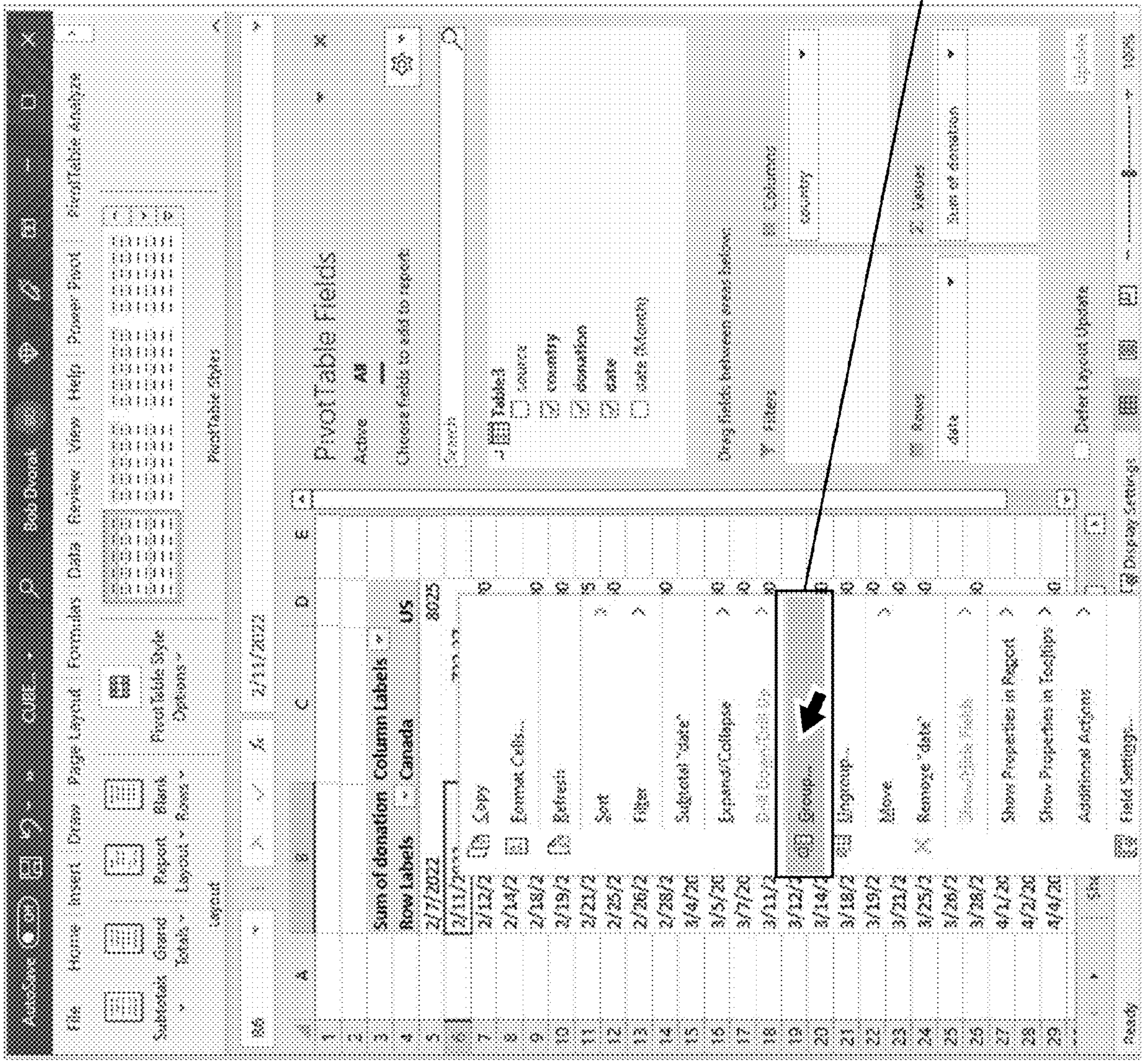
Figures 27A, 27B:
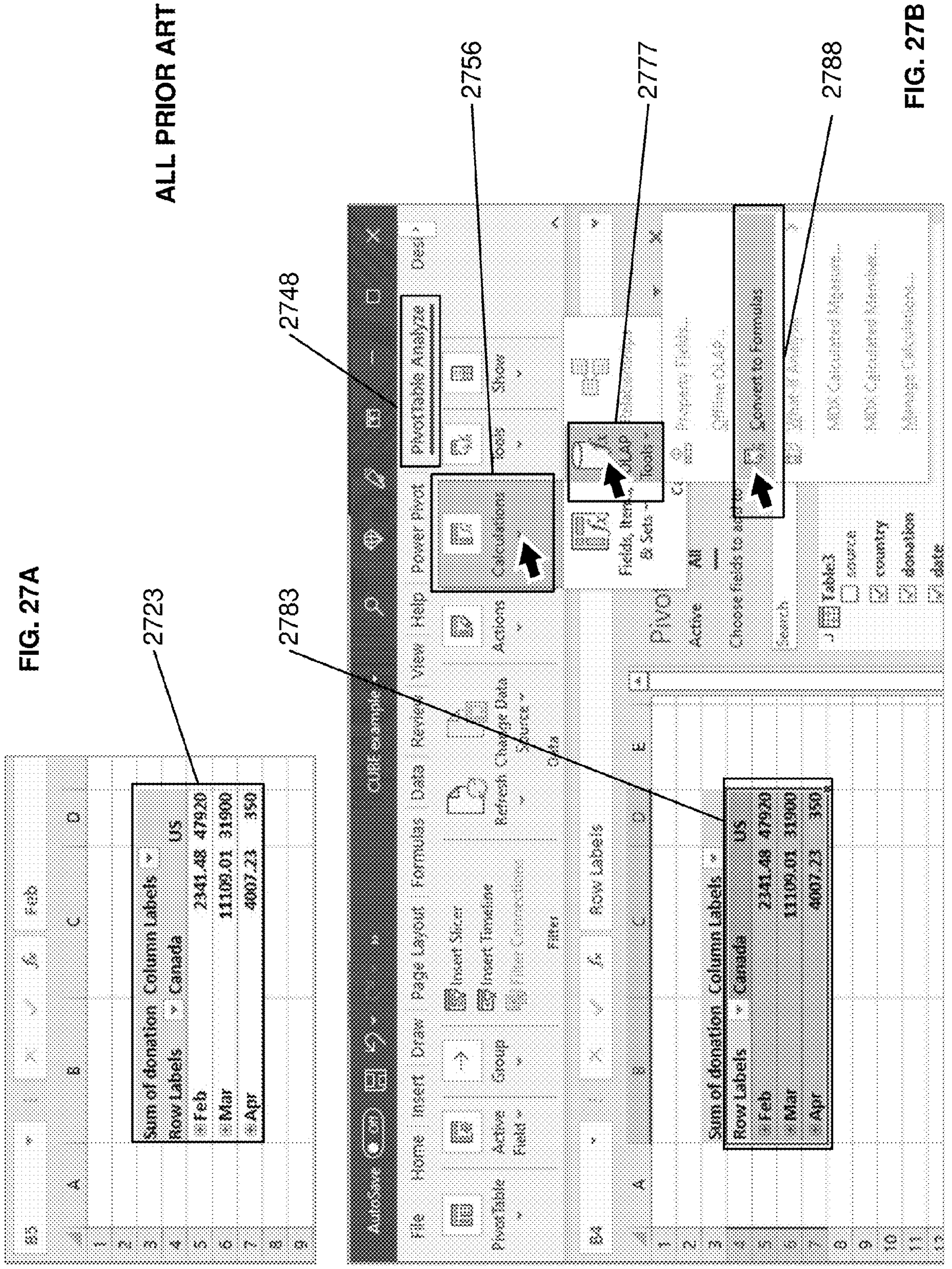

FIGS. 26A, 26B, and 27A example the setup of monthly increment date groups in the Microsoft Excel PivotTable using the Power Pivot data model.

FIGS. 27B, 28A, 28B and 28C example the Microsoft Excel CUBE functions conversion of the monthly grouped Pivot Table in FIG. 27A.

Figures 29A, 29B:
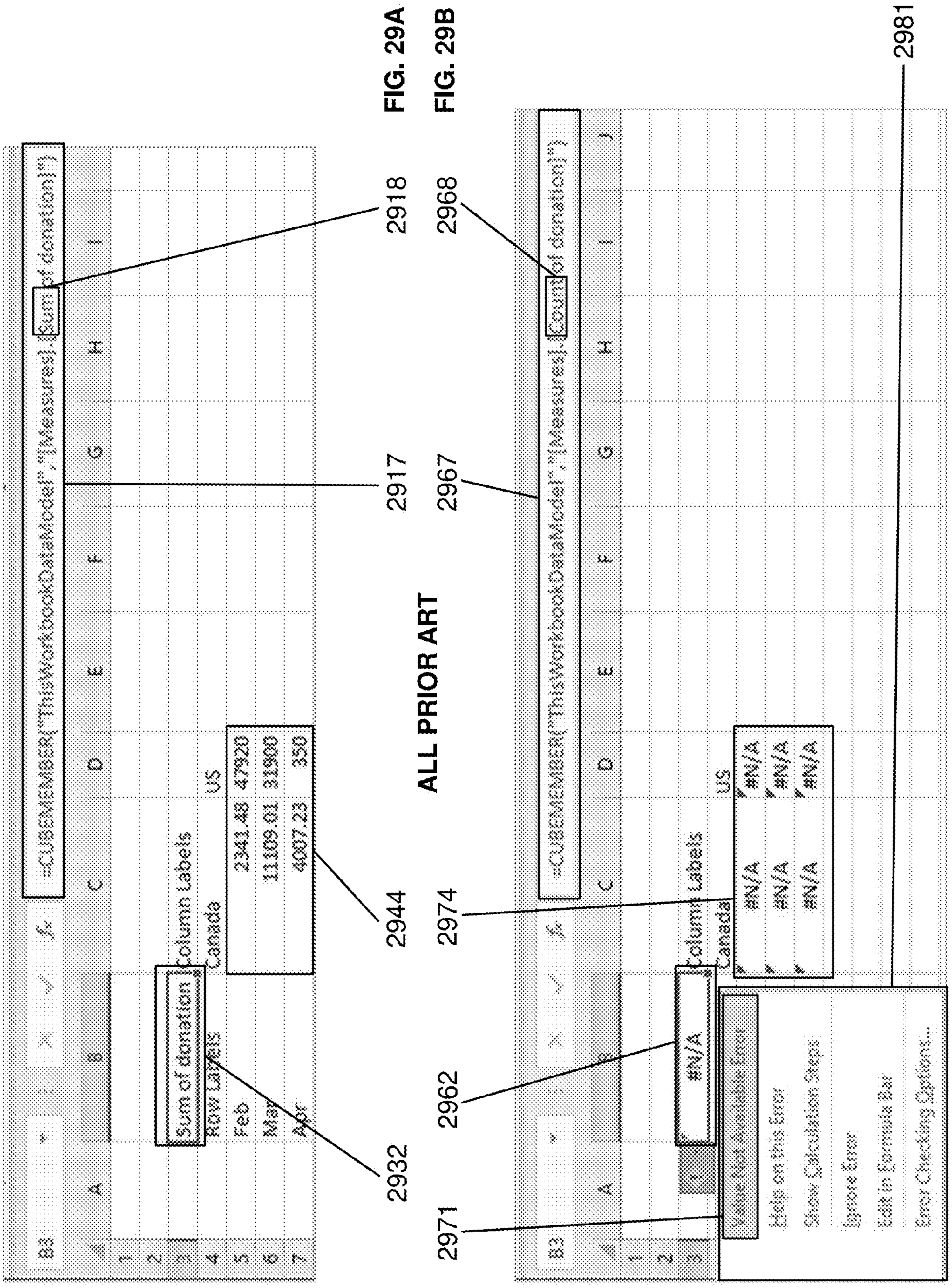

FIG. 29A and FIG. 29B example how the Microsoft Excel CUBE functions can only do functional calculations previously done by the PivotTable, they are not by themselves a functional computing capability where the function can be changed.

FIGS. 30, 31, 32A and 32B confirm in Microsoft Excel that a CUBE functions calculations are not independent of the PivotTable but reliant on them, essentially a conversion of what has been done in the PivotTable not a separate functional calculation capability.

Figures 33A, 33B, 33C:
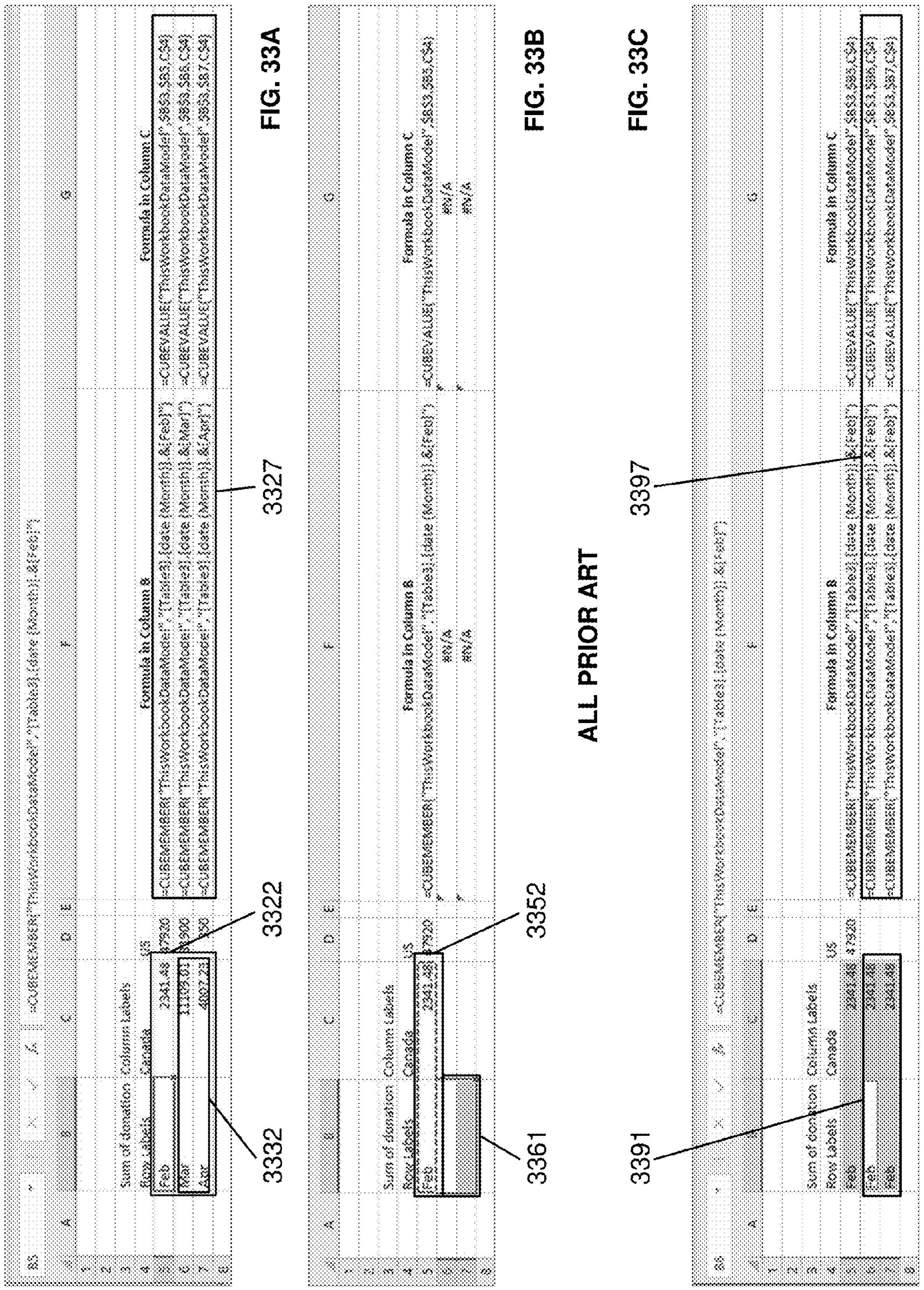

FIGS. 33A, 33B and 33C example how the Microsoft Excel CUBE functions do not increment values when copy paste replicated.

Figure 34B:
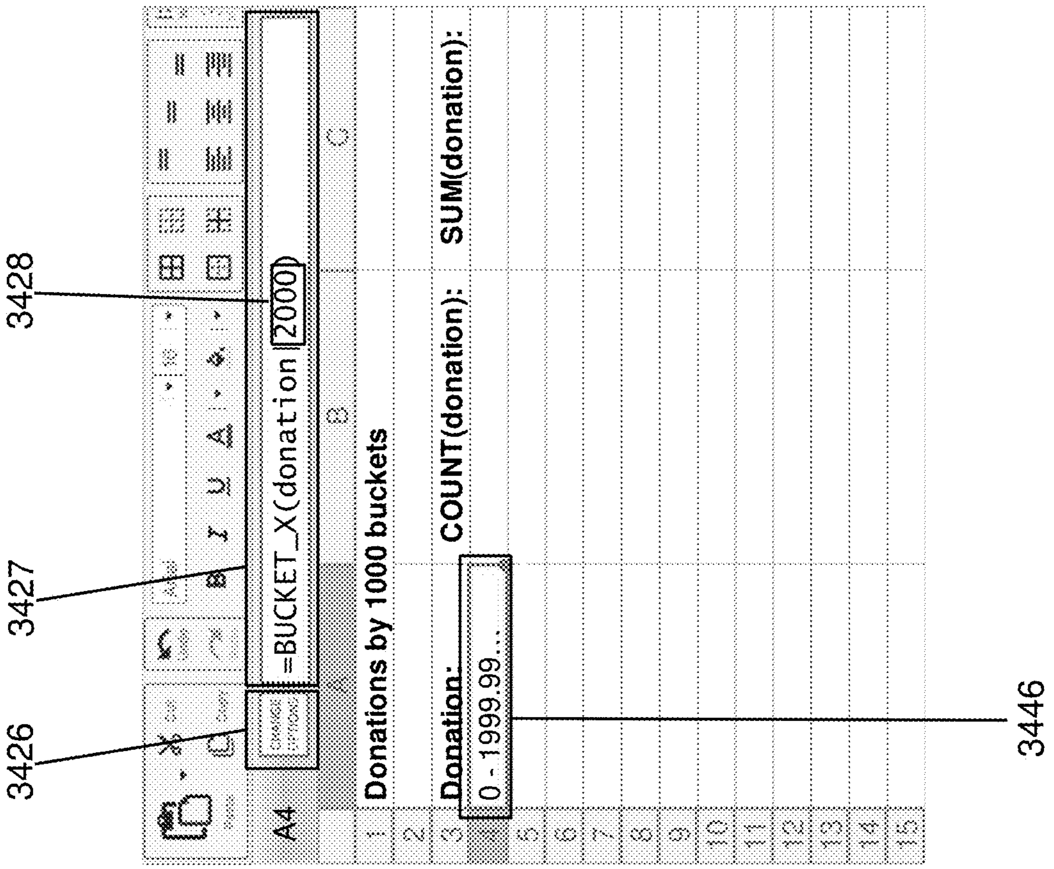
Figure 34A:
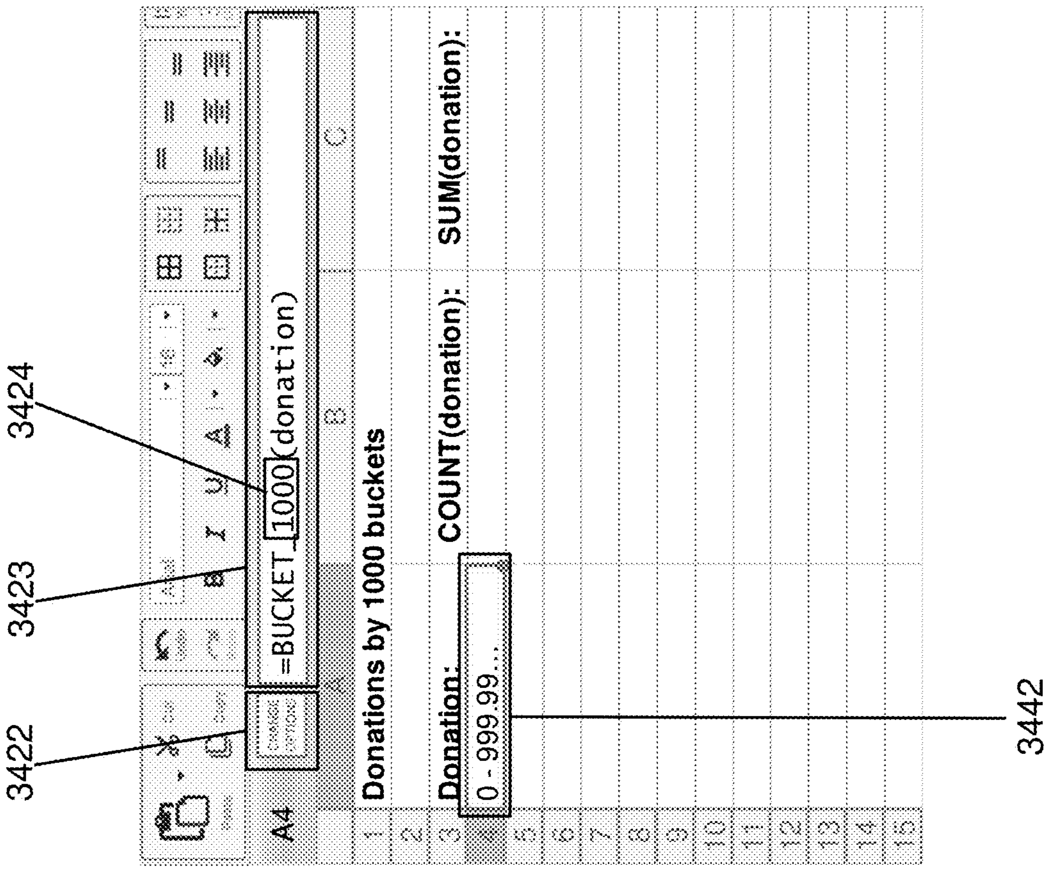

FIG. 34A and FIG. 34B example the numeric grouping/bucketing capability previously exampled in the Microsoft Excel and Google Sheets PivotTables done by our new regular spreadsheet cell functions which populate values usable with their associated data for regular spreadsheet cell calculations.

FIGS. 35A, 35B, 35C, 35D, 35E, 35F and 35G example the illustrative steps automatically executed by our new 'BUCKET_1000' function in FIG. 34A.

FIGS. 36A, 36B and 36C example how all the data used in any of our new technology examples can be sourced from non-spreadsheet cell (NSC) external data and/or in-cell formulaic data.

FIGS. 37A, 37B, 37C, 37D, 37E and 37F example the illustrative steps automatically executed by our new 'BUCKET_X' function in FIG. 34B.

Figure 38A:
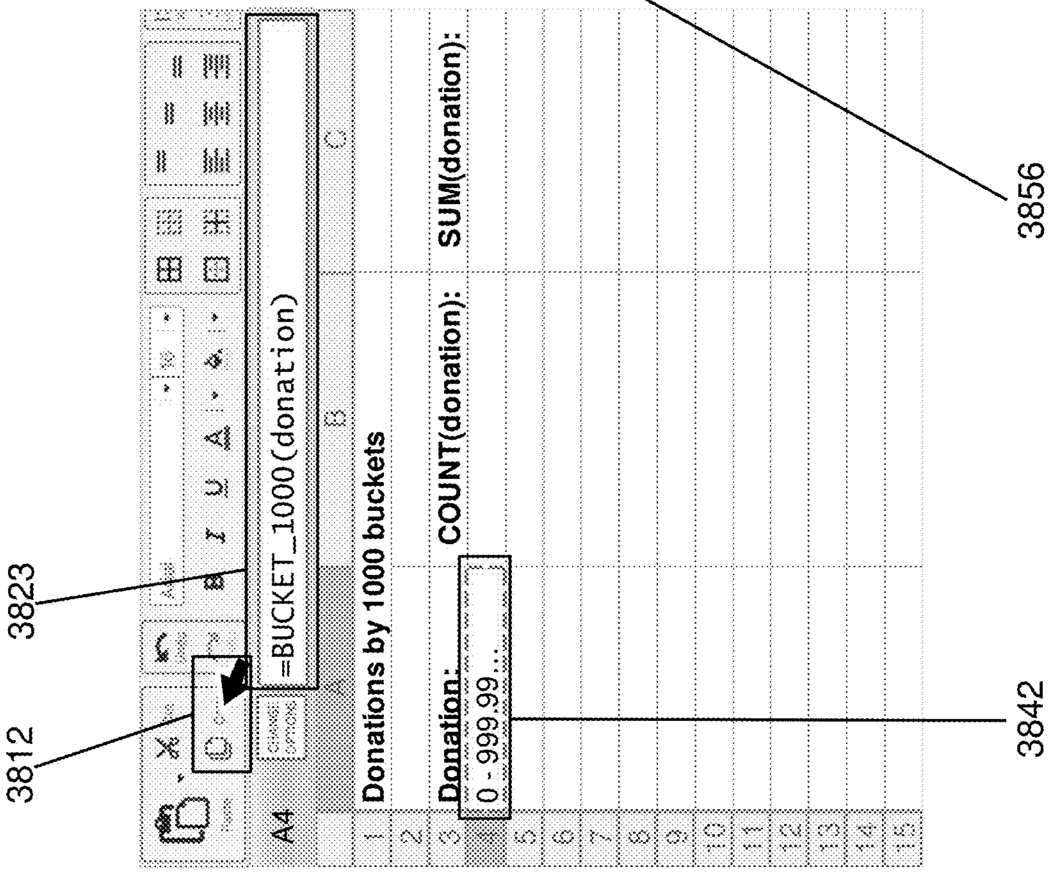
Figure 38B:
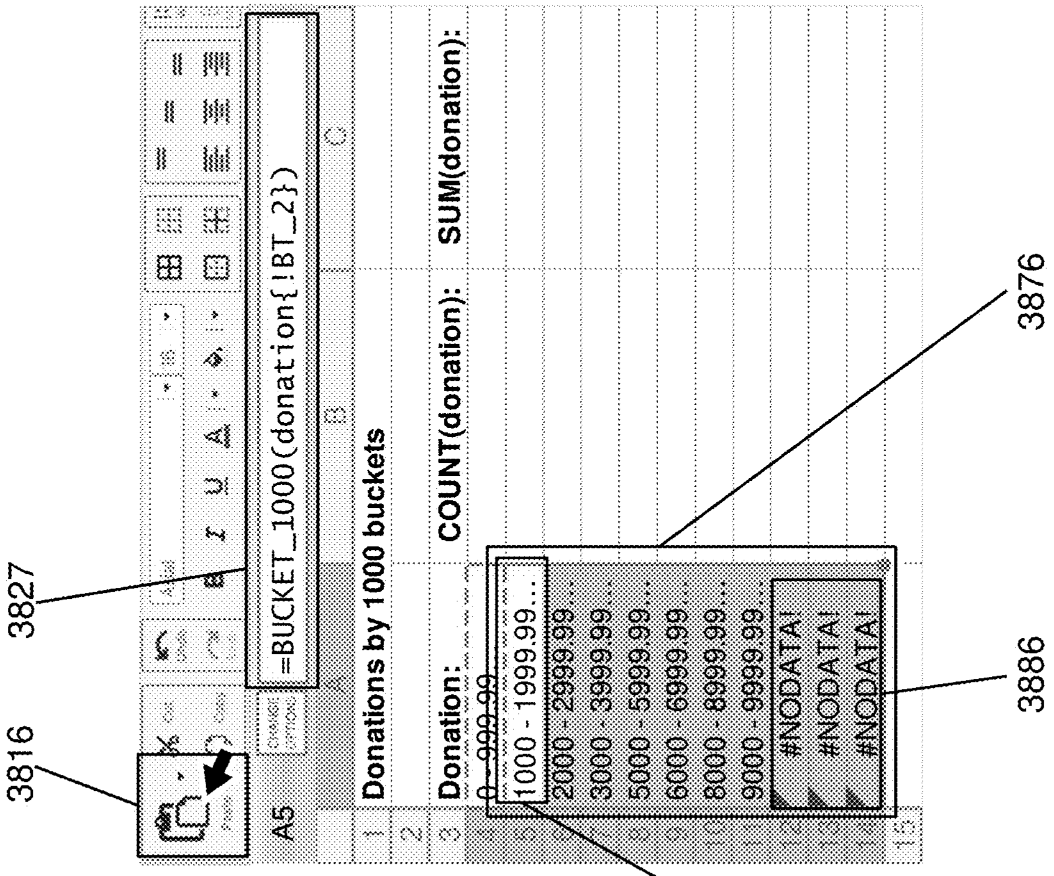

FIG. 38A and FIG. 38B example how our single value bucket/grouping function with no filling supports what we call "incremental copy paste".

FIGS. 39A, 39B, 39C, 39D, and 39E illustratively examples the automatically done steps by our technology supporting the copy paste in FIG. 38A and FIG. 38B.

Figure 40A:
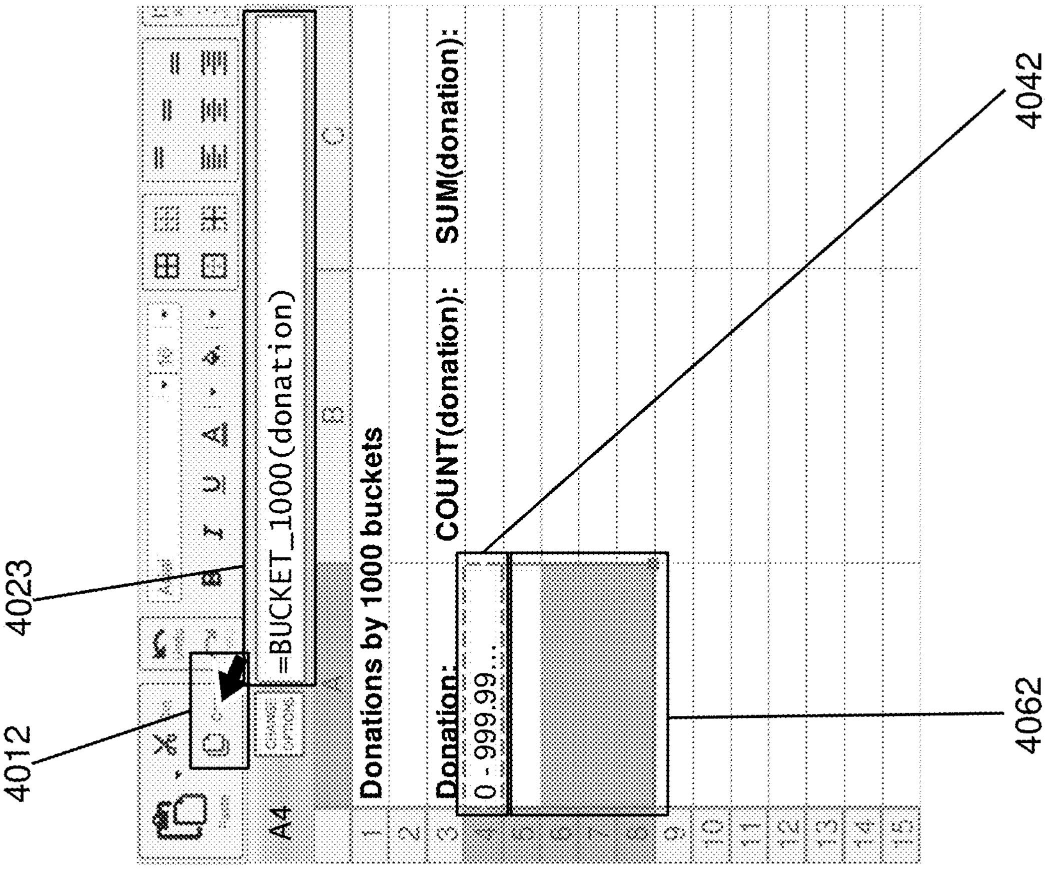
Figure 40B:
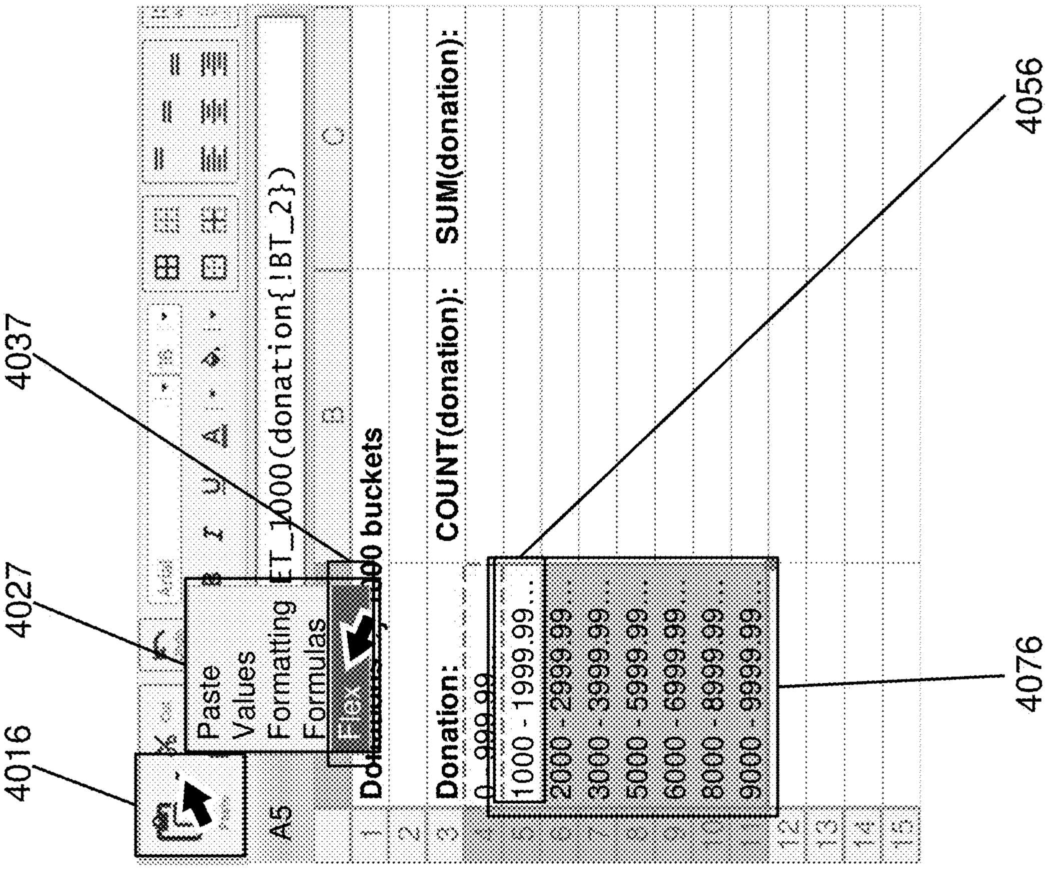

FIGS. 39A, 39B, 39C and 39F illustratively examples the automatically done steps by our technology supporting the FLEX copy paste in FIG. 40A and FIG. 40B FIG. 40A and FIG. 40B example how our single value bucket/grouping function with no filling supports what we call "FLEX copy paste" (i.e., that increments values until there are no more values).

FIGS. 41A, 41B, 42A, 42B, 43A, 43B, 44A, 44B, 44C, 44D, 44E, 44F, 45A and 45B examples one embodiment of our group/bucket filling capability as a specification which can be turned 'ON' or 'OFF', and how it works for incremental copy paste and FLEX copy paste.

FIGS. 46A, 46B, 47A, 47B and 47C example group/bucket labelling capabilities supported by our technology.

FIGS. 48A, 48B, 49A, 49B, 50A, 50B, 50C, 50D, 50E, 50F and 50G example how regular cell 'SUM' and 'COUNT' functional formulas referencing cells containing our bucketed/grouped functional values use their associated data for their calculations.

FIGS. 51A, 51B, 52A, 52B, 52C, 52D, 52E, 52F, 52G, 53A, 53B, 53C, 53D, 53E, 54A, 54B, 54C, 54D, 54E and 54F example how regular cell SUM or COUNT functional formulas can use our bucket/group functional formulas (and their associated data) via cell reference or by direct formula inclusion to achieve the same outcome.

FIGS. 55A, 55B, 56A, 56B, 56C, 56D and 56E example our technology supporting regular copy paste of a single bucket function cell formula and functional formulas referencing that cell.

Figure 57B:
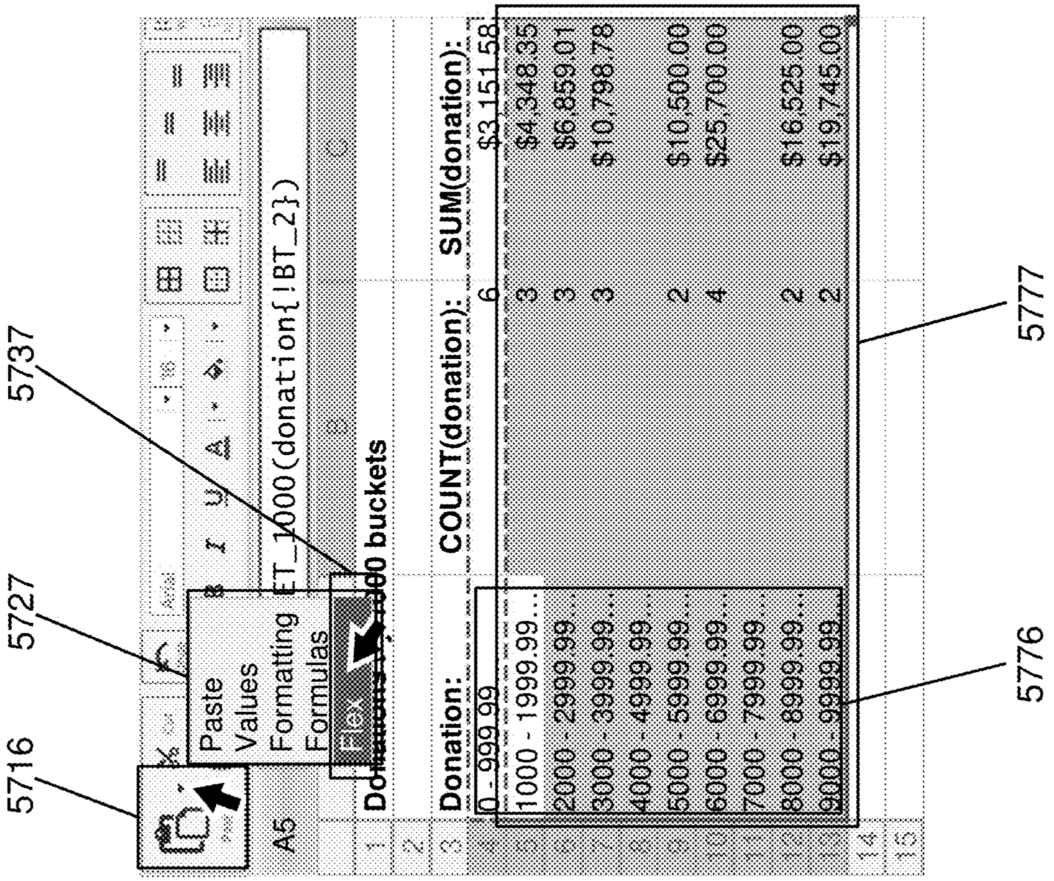
Figure 57A:
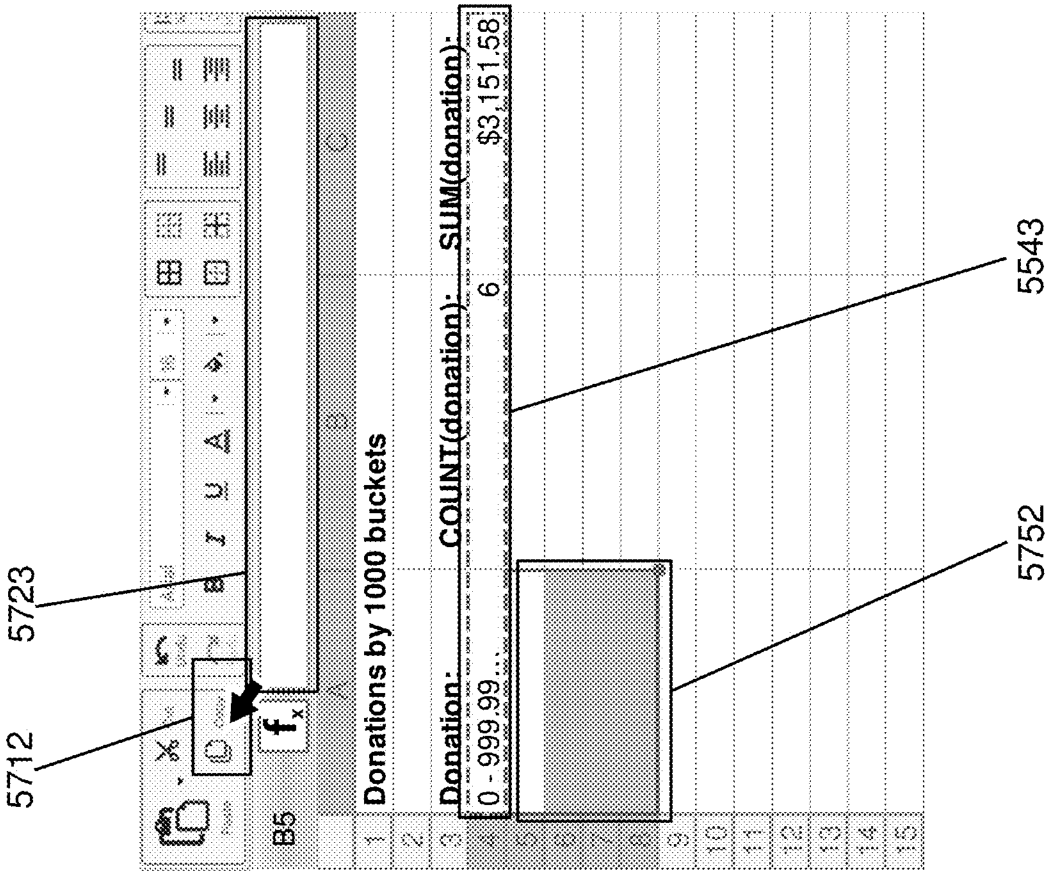
Figure 58A:
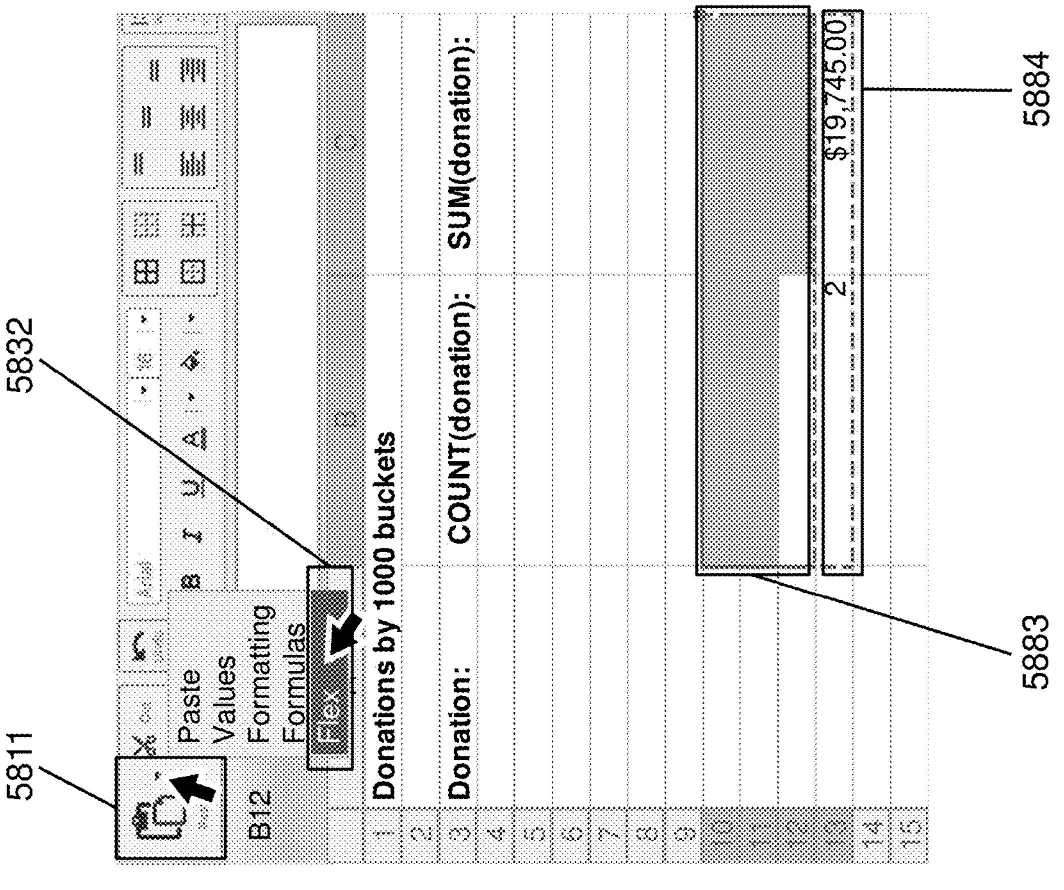
Figure 58B:
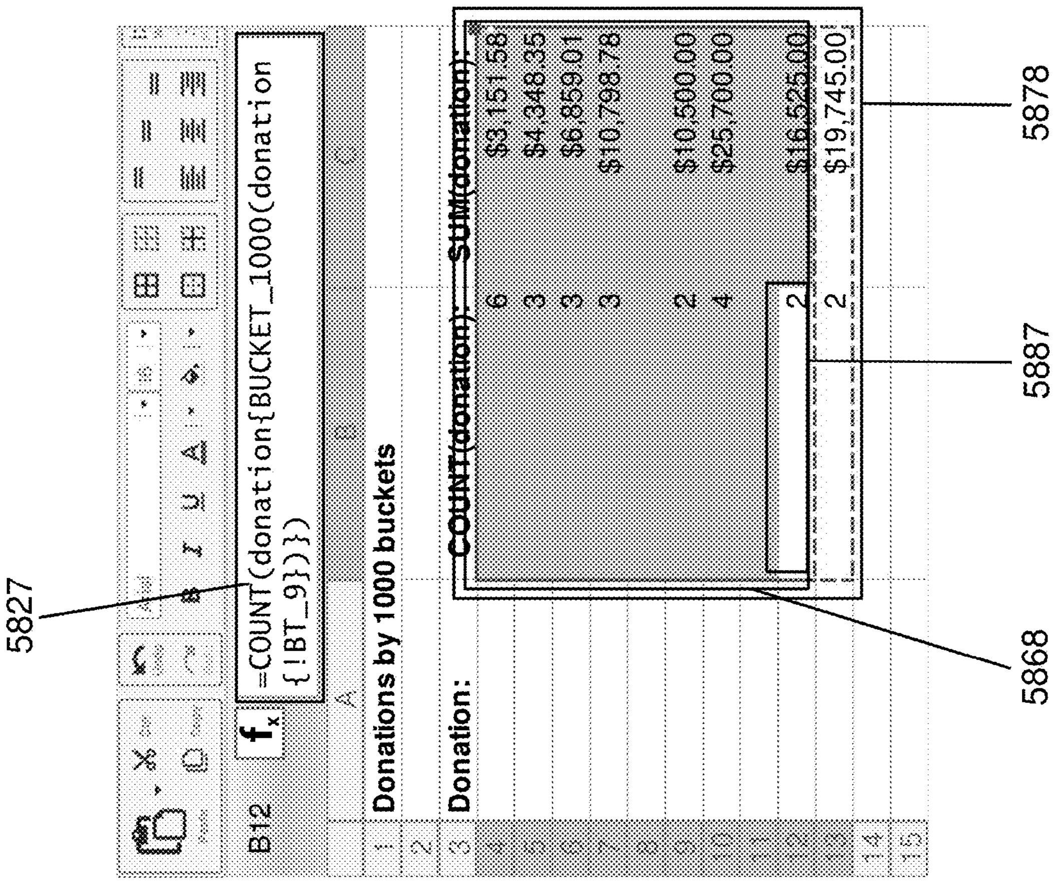

FIG. 57A and FIG. 57B examples our technology supporting flex copy paste of a single bucket function cell formula and functional formulas referencing that cell.

FIGS. 58A, 58B, 59A, 59B, 59C, 59D, 59E, 60A, 60B, 60C and 60D example our technology supporting Flex copy paste of functional formulas with direct formula inclusion of our single value bucketing/grouping functions.

FIGS. 61A, 61B, 62A, 62B, 62C, 62D, 62E, 62F, 62G, 6211 and 621 example our single value bucketing/grouping function technology supporting auto-rounded bucket/group labels and the use of constraints/filters in generating values and generating values through copy paste.

FIGS. 63A, 63B, 64A, 64B, 64C, 64D and 64E example intelligent presentation of only relevant bucketing/grouping options to users.

FIGS. 65A, 65B, 66A, 66B, 66C, 66D, 66E, 66F and 67A example bucketing/grouping working for date fields in originally generating a value and copy paste of that value, all with filling and our intelligent options.

FIGS. 67B, 68A, 68B, 68C, 68D, 68E, 69A and 69B examples our single value bucketing/group functions working for a data field with filling supporting functional formula usage via cell reference or by direct formula inclusion.

FIG. 70A and FIGS. 71A, 71B, 71C, 71D, 71E and 71F our single value bucketing/group functions working for a text field doing alphabetical bucketing/grouping with no filling generating a cell value and then supporting FLEX copy paste of that cell.

FIG. 70B and FIGS. 71A, 71B, 71C, 71D, 71E, 71F, 72A, 72B and 72C our single value bucketing/group functions working for a text field doing alphabetical bucketing/grouping with no filling referenced in AVERAGE and COUNT formula calculations that are then all FLEX copy pasted.

FIGS. 73A, 73B, 74A, 74B, 74C, 74D, 74E, 75A, 75B, 75C, 75D and 75E example our single value bucketing/grouping function with numeric groups/buckets supporting a complex functional and algebraic cell formula utilizing range/array and non-range/array functions referencing the bucketed cell value and using its associated data.

FIGS. 76A, 76B, 77, 78, 79A, 79B and 79C example the scientist regular copy paste (although they could have used a flex copy paste) replicating two cells, one cell containing a bucket/group function formula and a second cell referencing the first cell several times in its complex analytical functional and algebraic formula.

FIGS. 80A, 80B, 81A, 81B, 81C, 81D, 82A, 82B, 83A, 83B, 83C and 83D example two different usages of our single value bucketing/group (e.g., 'BUCKET') functions within one of our multi-cell populating (e.g., 'WRITE_CALC_V') function.

FIGS. 84A, 84B, 85A, 85B, 85C, 85D, 85E, 85F and 85G example a prespecified increment MULTI VALUE bucketing/grouping function employing automatic filling and automatic start/end specification.

FIGS. 86A, 86B, 87A, 87B, 87C, 88A, 88B, 88C, 88D and 88E example a prespecified increment multi-value bucketing/grouping function employing NO filling and showing another type of OPTION HINT usage.

FIGS. 89A, 89B, 90A, 90B, 90C, 90D, 90E, 90F and 90G example formula usage of our multi-value bucketing/grouping function ('WRITE_BUCKET') generated values in COUNT and SUM formulas.

FIGS. 91A, 91B, 92A, 92B, 92C, 92D and 92E example our multi-value bucketing/grouping functions supporting the copy paste of formulas referencing the bucket/group values.

Figure 93B:
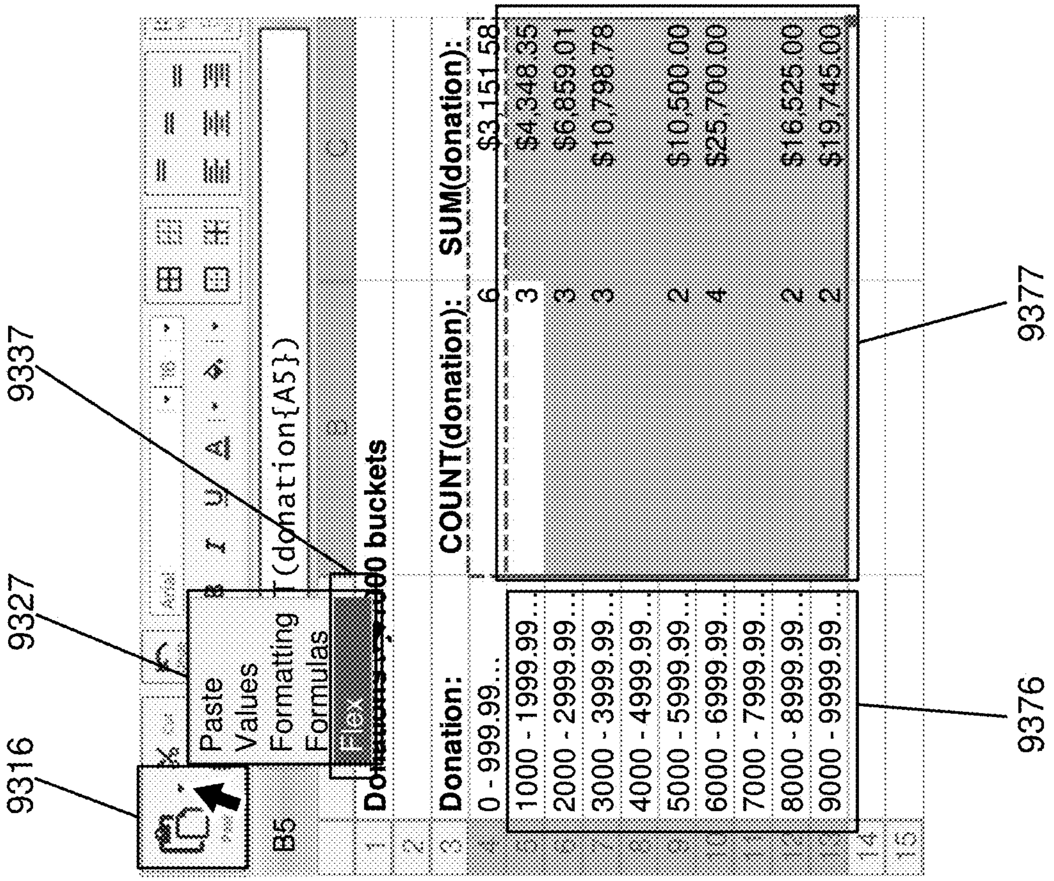
Figure 93A:
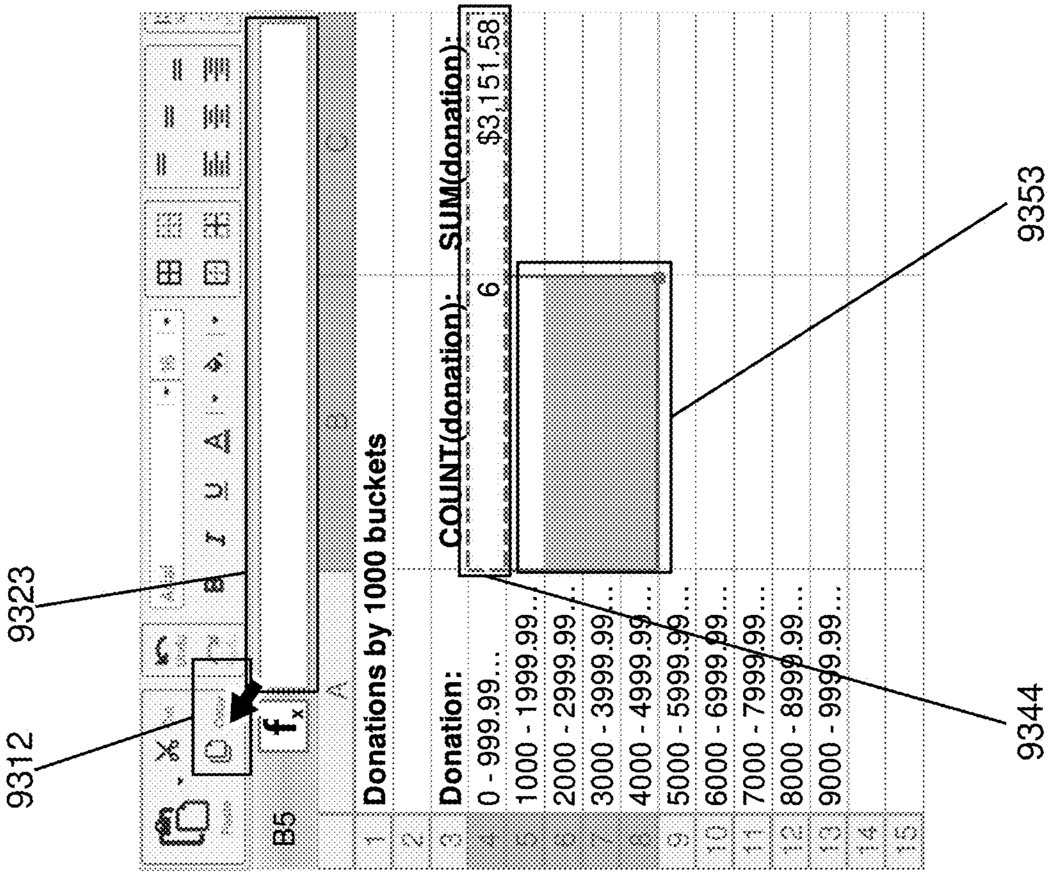

FIG. 93A and FIG. 93B example our multi-value bucketing/grouping functions supporting flex copy paste of formulas referencing the bucket/group values.

FIGS. 94A, 94B, 95A, 95B, 96A and 96B example the filling and flexing capabilities of our multi-value bucketing/grouping functions and the flex copy pasted cells referencing them.

FIGS. 97A, 97B, 98A, 98B, 98C, 98D, 98E, 98F,99A, 99B, 99C, 99D, 99E, 99E, 99F and 99G examples our multi-value bucketing/grouping function technology supporting constraints/filters and user selected labels in generating values.

FIGS. 100A, 100B, 101A, 101B, 101C, 101 D and 101E examples our multi-value bucketing/grouping function technology supporting date buckets/groups and intelligent bucket/group increment options.

Figure 102A:
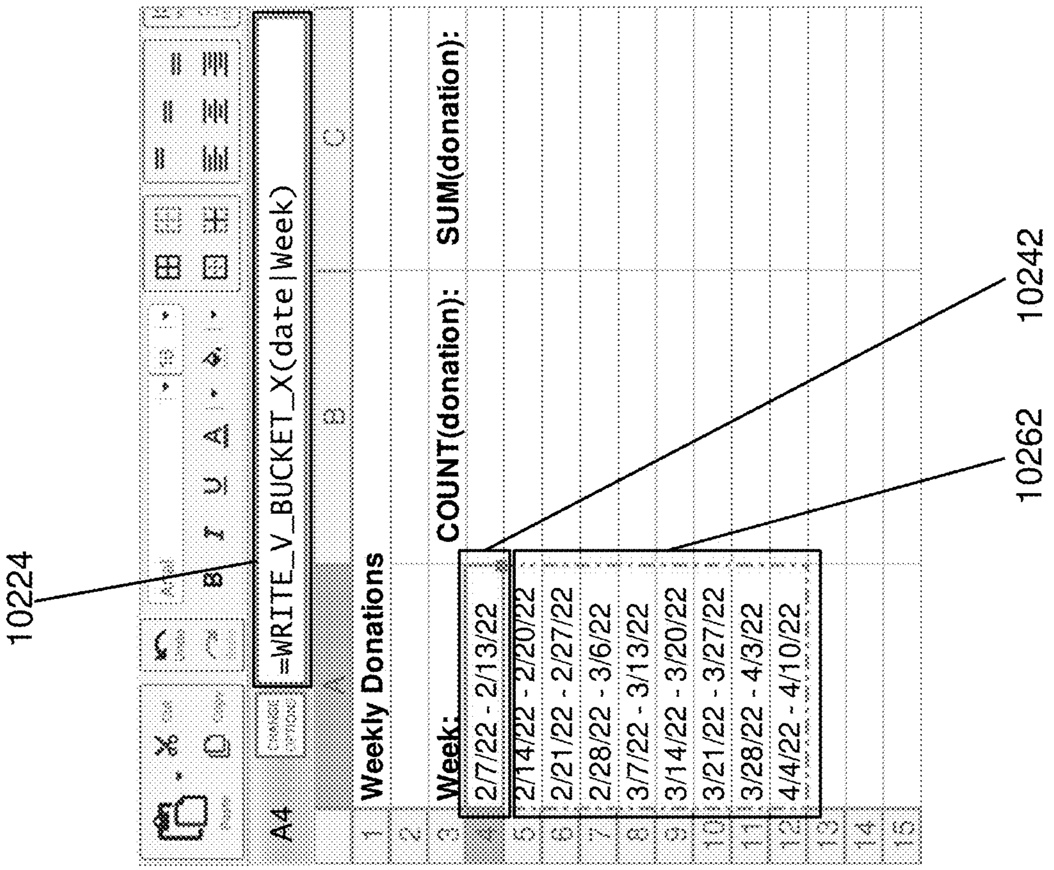
Figure 102B:
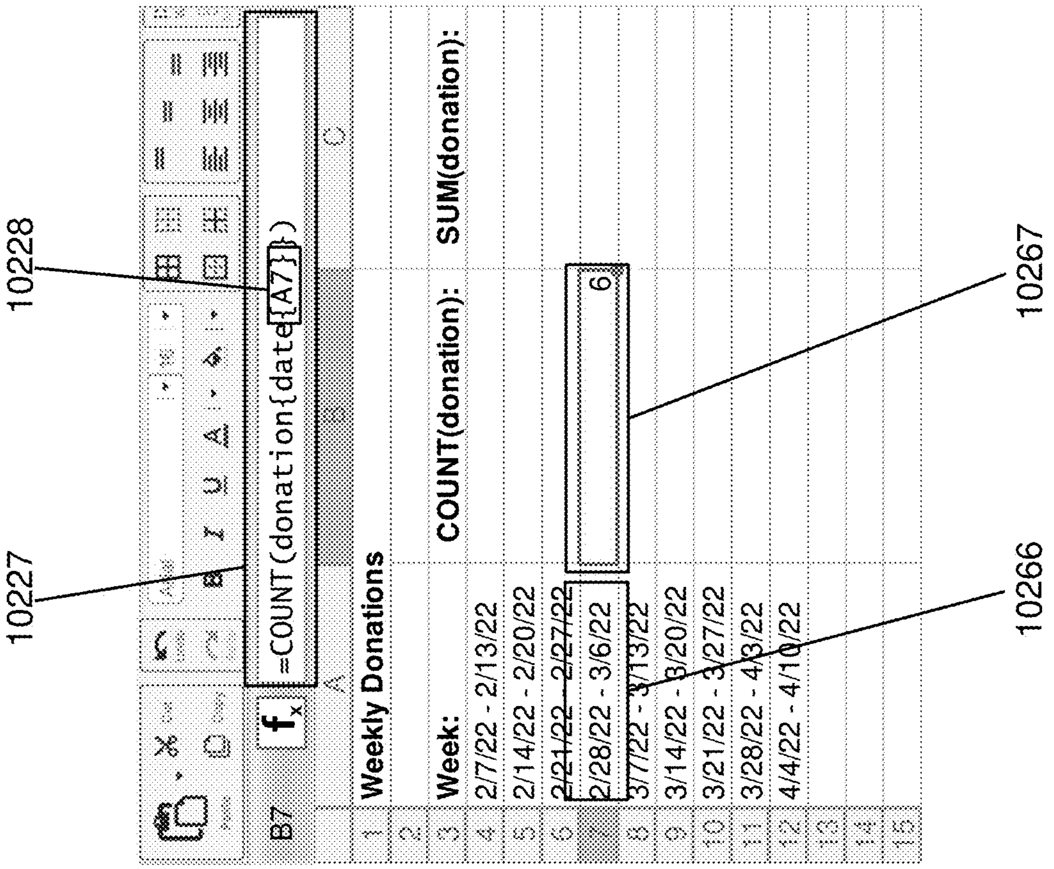

FIG. 102A and FIG. 102B examples that our multi-value bucketing/grouping function generated date buckets are usable with their associated data as our previous numerical examples.

FIGS. 103A, 103B, 104A, 104B, 104C, 104D, 104E, 105A, 105B and 105C examples our multi-value bucketing/grouping function technology supporting alphabetical/alphanumeric buckets/groups with no fill and a constraint generation and their usage with their associated data in cell functional formulas.

FIGS. 106A, 106B, 107A, 107B, 107C, 107D, 107E, 108A, 108B, 108C, 108D, 108E, 109A, 109B, 109C, 109D, 110, 111A, 111B, 111C, 111D, 111E, 111F, 112A, 112B, 112C, 112D, 113A and 113B example one of our two-dimensional multiple cells populating functions (WRITE_CALC_2D) with the addition of our NEW OPTIONAL BUCKETS/GROUPS CAPABILITY working for both numeric and date bucketing/grouping.

FIGS. 114A, 114B, 115A, 115B, 115C, 115D, 116A, 116B, 116C, 117A, 117B, 117C, 117D, 118A, 118B, 118C and 118D example numeric and date buckets/groups optionally set up in our 'WRITE_CALC_2D' function with multiple constraints and visible and invisible bucket/group arguments.

FIGS. 119A, 119B, 120A, 102B, 120C, 120D, 120E, 120F, 121A, 121B, 122A, 122B, 123A, 123B, 123C, 123D, 124A, 124B and 124C example text (alphabetical) buckets/groups optionally set up in one of our one-dimensional multiple cells populating functions ('WRITE_CALC_V').

FIGS. 125A, 125B, 126A, 126B, 126C, 126D, 127A, 127B, 127C, 128, 129, 130A, 130B, 131A and 131B example our Bucketing/grouping optional specification(s) in functions populating multiple cells supporting two-dimensional complex analytics for both numeric and date bucketed values with filling.

FIGS. 132A, 132B, 133A and 133B examples our technology supporting one-dimensional complex analytics in a function employing our bucketing/grouping optional specifications for both numeric and date paired (nested) bucketed values with filling.

FIGS. 134A, 134B, 134C, 135A, 135B, 135C and 135D example cell functional formula referenced use of one of the optionally created buckets/groups in the results of a multi-value populating function and then in the copy paste replication of that cell.

Figures 136A, 136B, 136C:
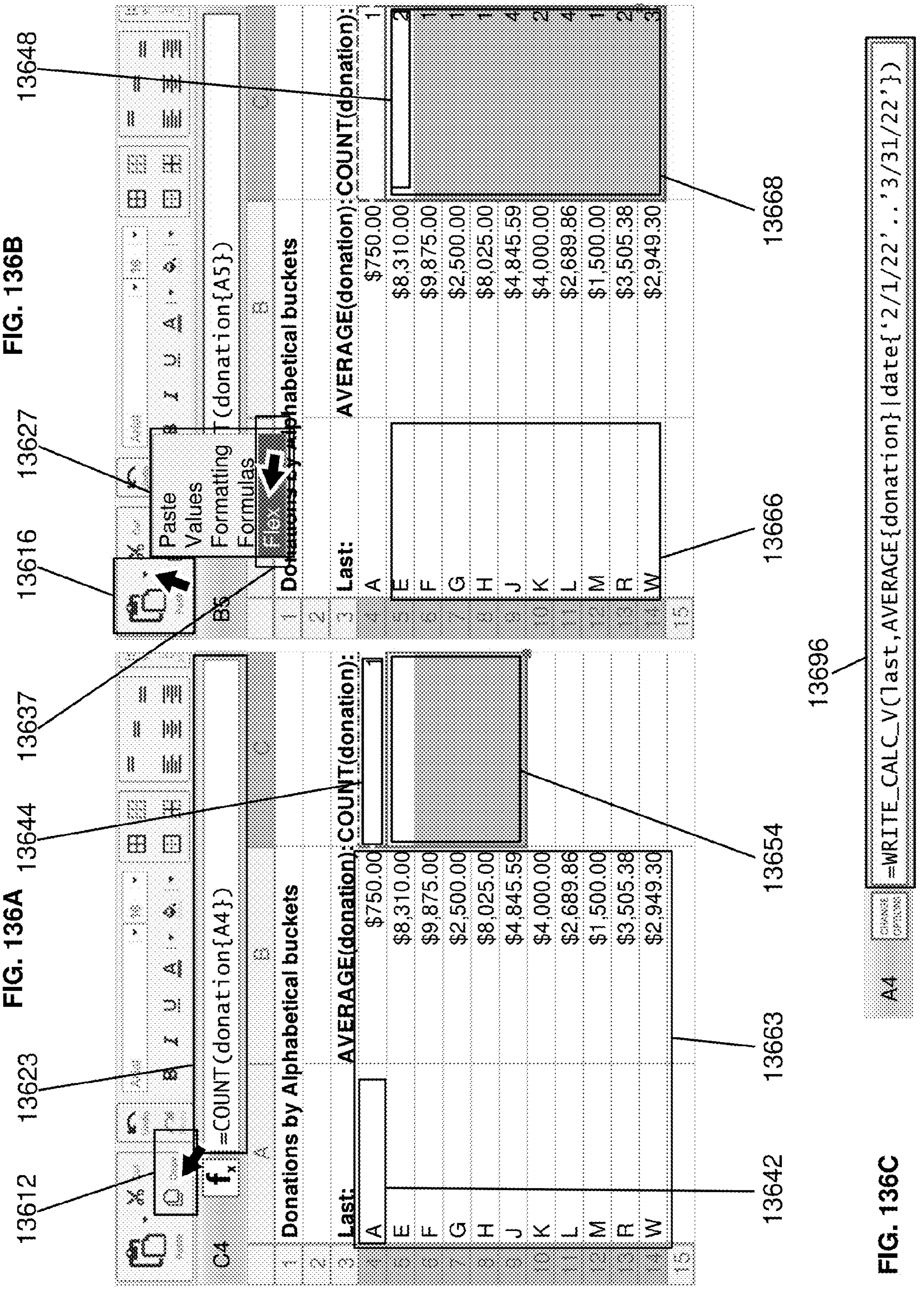

FIGS. 136A, 136B, and 136C example cell functional formula referenced use of one of the optionally created buckets/groups in the results of a multi-value populating function and then in FLEX copy paste replication of that cell.

FIGS. 137A, 137B, 137C, 137D, 137E, 137F, 138A, 138B, 138C and 138D example use of the buckets/groups generated by an optional specification employing function by cell reference (referring to the value and associated data) and by functional calculations referencing that referencing cell and using the value and associated data as if they had referenced the original cell.

FIGS. 139, 140A, 140B, 140C, 140D and 140E example use of the buckets/groups generated by three single value bucketing/grouping function results referenced by three cells (getting the value and associated data) and by functional calculations referencing those referencing cells and using their values and associated data as if they had referenced the original cells.

Figure 141:
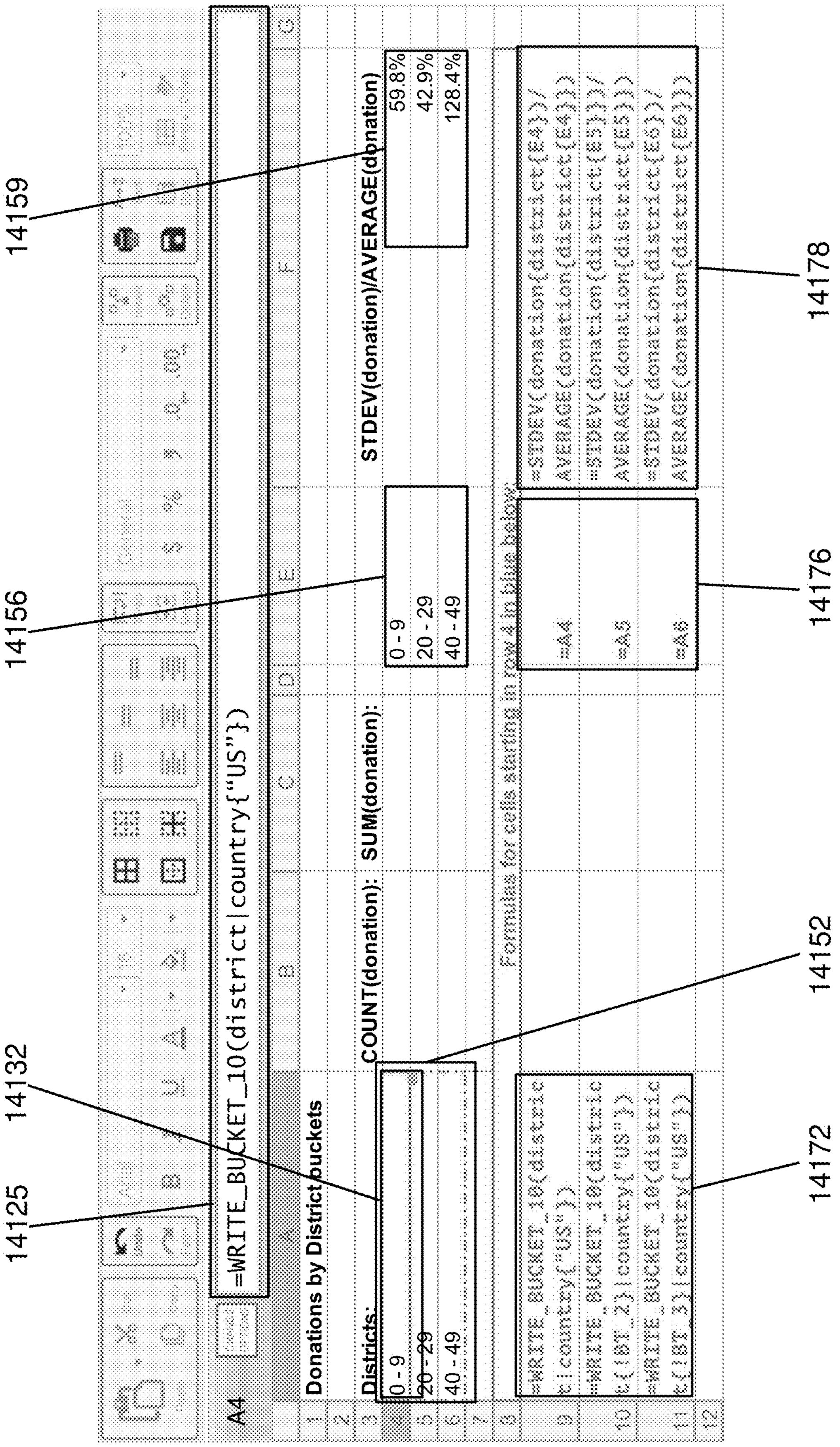

FIG. 141 examples use of three buckets/groups generated by one multi-value bucketing/grouping function referenced by three cells (getting the value and associated data) and by functional calculations referencing those referencing cells and using their values and associated data as if they had referenced the original cells.

FIGS. 142A, 142B, 143A, 143B, 143C, 143D, 143E, 144A, 144B, 144C, 144D, 144E, 144F, 145A, 145B, 146A, 146B, 147A, 147B, 147C, 147D, 148A, 148B, 148C and 148D example one embodiment of our bucketing/grouping optional specification in one of our functions populating multiple value selections within a single cell (e.g., 'DROPDOWN' function).

FIGS. 149A, 149B, 150A, 150B, 150C, 150D, 151A, 151B, 151C and 151D example the use of one of our single value bucketing/grouping functions (e.g., 'BUCKET_10') in the field of one of our functions populating multiple value selections within a single cell (e.g., 'DROPDOWN' function).

FIGS. 152A, 152B, 153A, 153B, 153C, 153D and 153E example the use of a function populating multiple value selections within a single cell ('DROPDOWN') populated cell with a selected bucket/group value and its associated data referenced in a 'SUM' function formula.

FIGS. 154A, 154B, 155A, 155B, 155C, 155D, 155E and 155F example the result of the use of a bucketing/grouping optional specification in a function ('DROPDOWN-_MANY') populating multiple value selections within a single cell and supporting the selection of multiple different bucketing/group values with invisible and visible bucketing/grouping formula arguments.

Figure 154B:
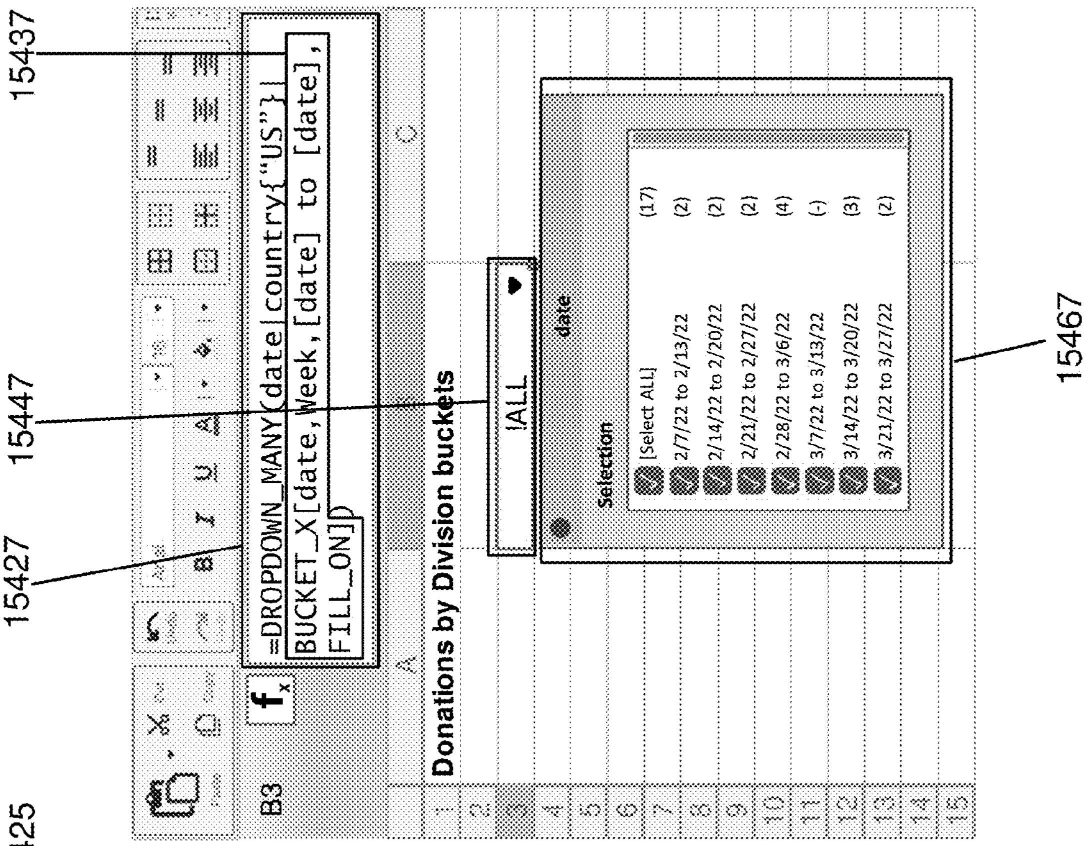
Figure 154A:
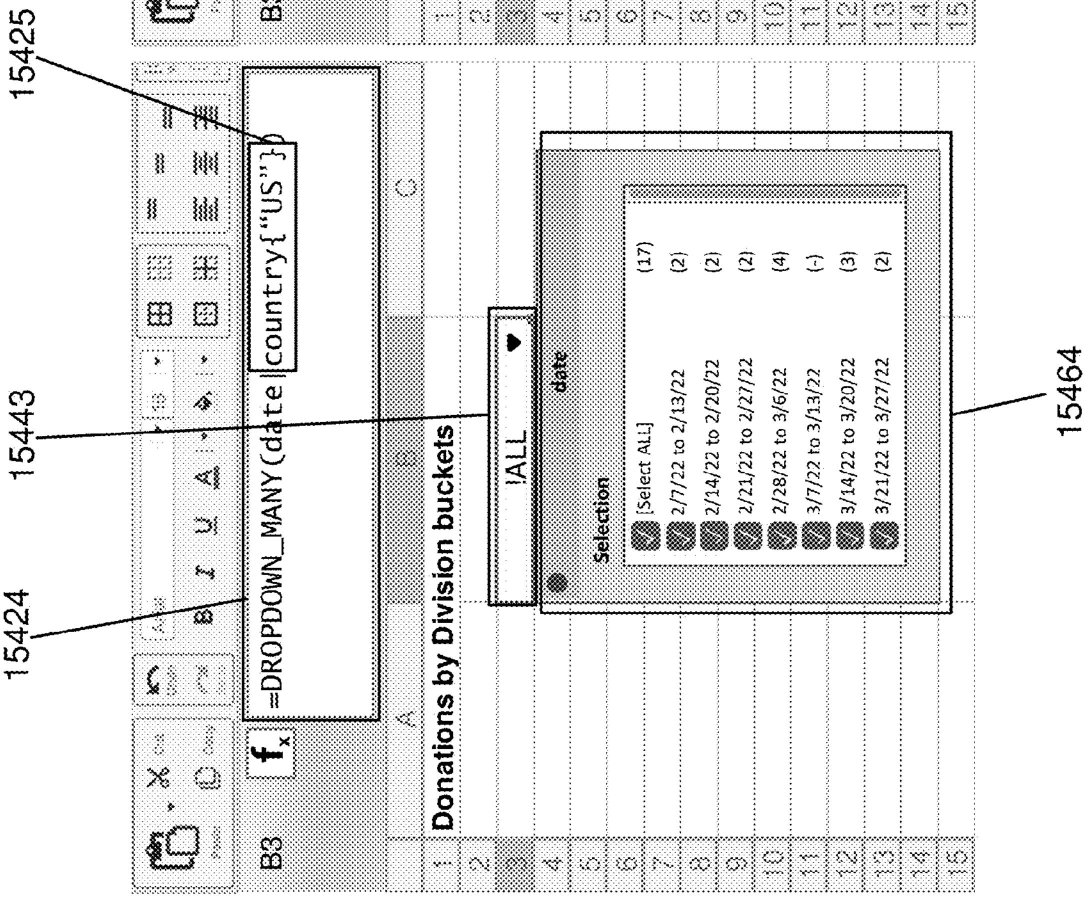
Figure 156B:
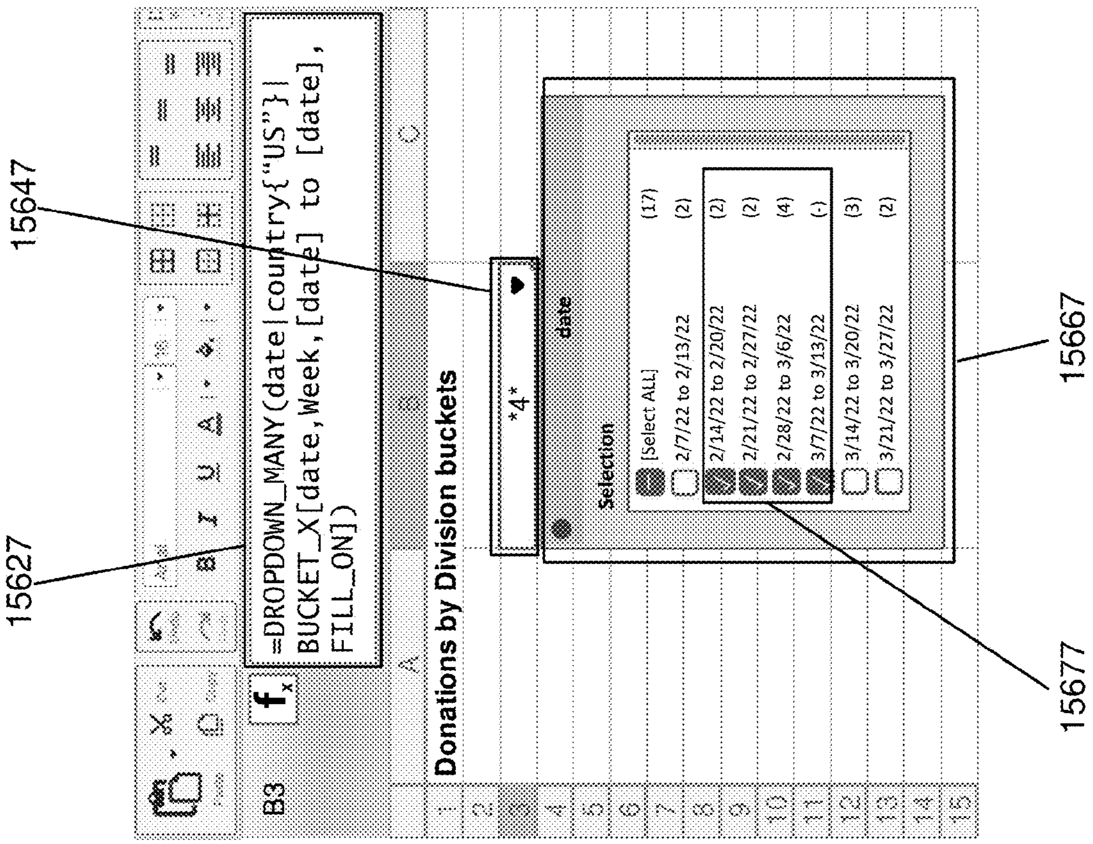
Figure 156A:
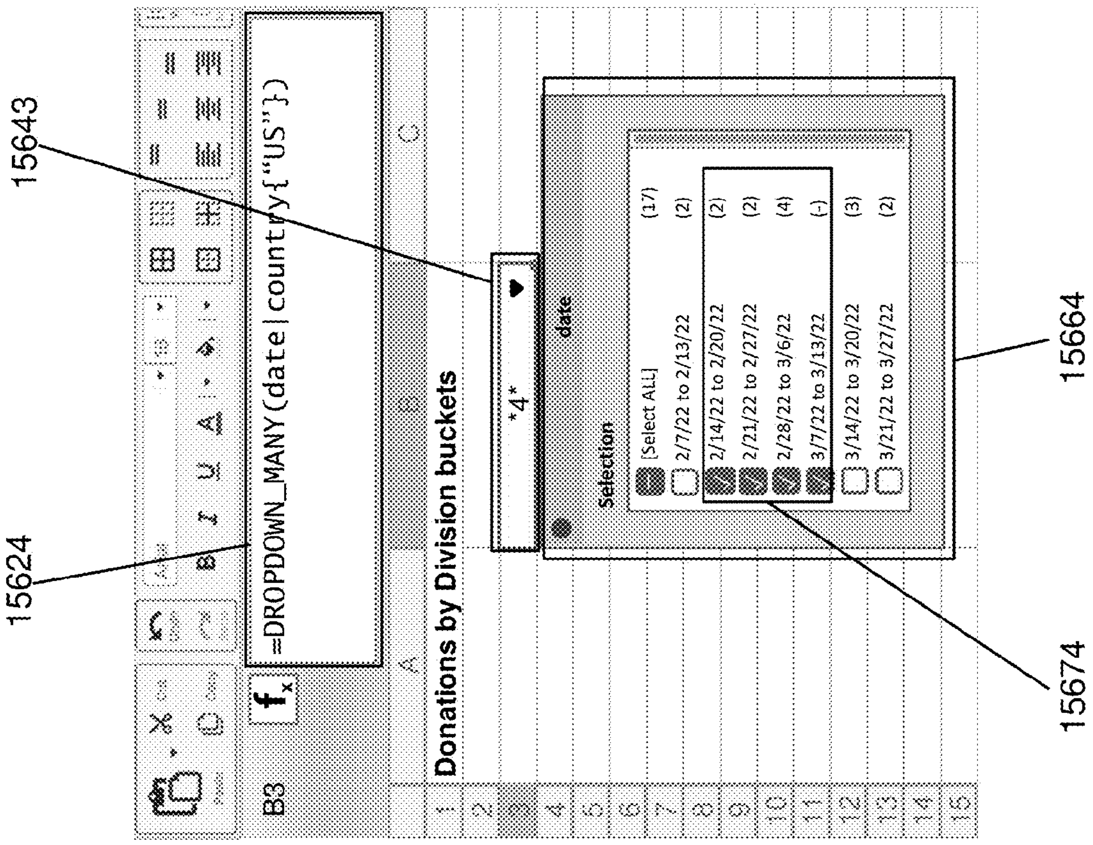

FIG. 156A and FIG. 156B example the bucket/group selections in FIG. 154A and FIG. 154B having been changed to four bucket/group values in the 'DROPDOWN_MANY' value selector UI with invisible and visible bucketing/grouping formula arguments.

Figure 157B:
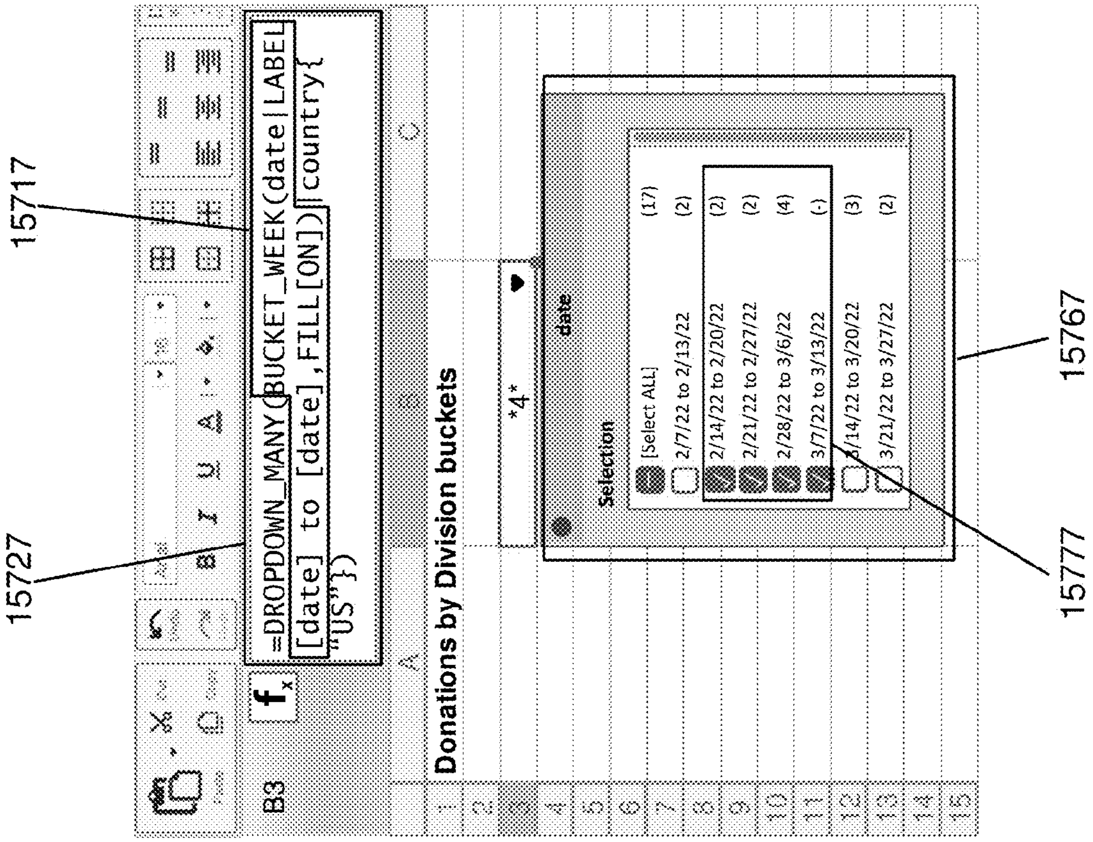
Figure 157A:
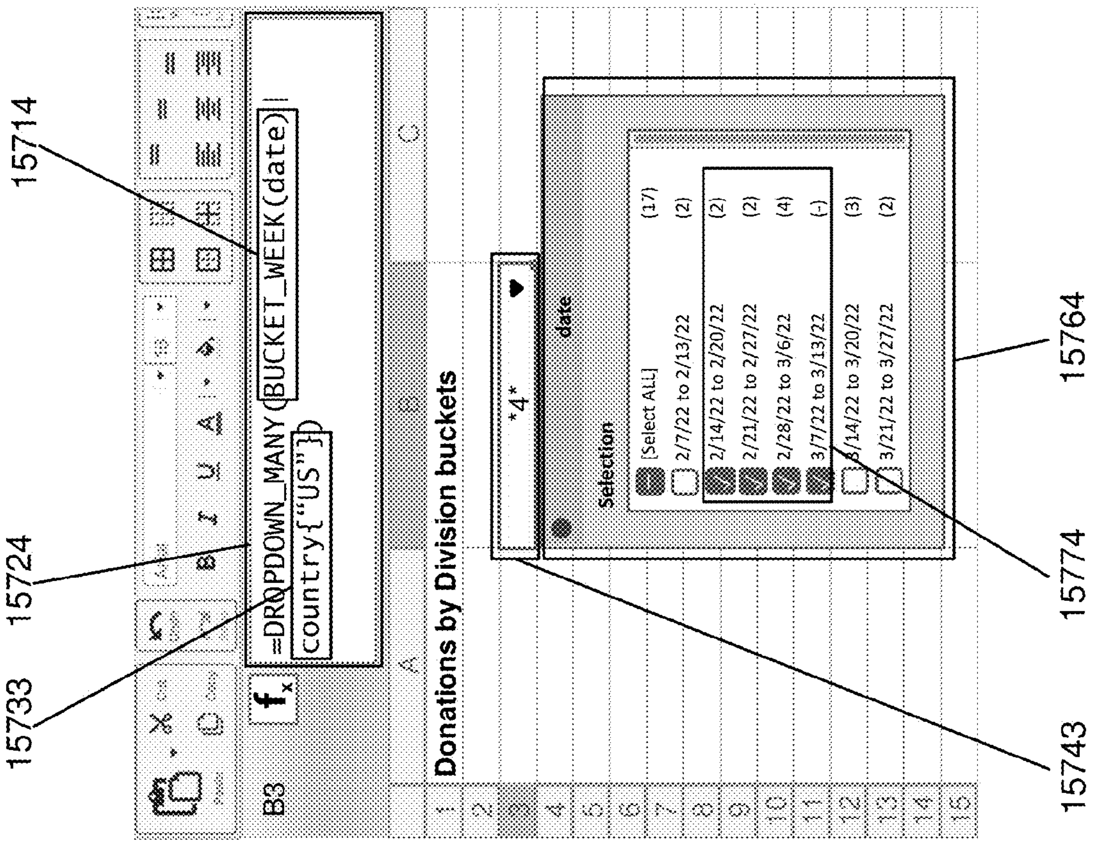

FIG. 157A and FIG. 157B example the same UI selector outcome as FIG. 156A and FIG. 156B however achieved using the use of one of our single value bucketing/grouping functions (e.g., 'BUCKET_WEEK') in the field of one of our functions populating multiple value selections and multiple values within a single cell (e.g., 'DROPDOWN_MANY' function).

FIGS. 158A, 158B, 159A, 159B, 159C, 159D, 159E, 159F, 159G and 15911 example the use of a function populating multiple value selections with multiple values within a single cell ('DROPDOWN_MANY') populated cell with four selected bucket/group values and their associated data referenced in a 'SUM' function formula.

FIGS. 160A, 160B, 161A, 161B, 161C, 161D and 161E example the use of a text (alphabetical) bucketing/grouping optional specification in a function ('DROPDOWN_MANY') populating multiple value selections within a single cell and supporting the selection of multiple different bucketing/group values with a constraint (filter), and no filling.

FIGS. 162A, 162B, 162C and 162D example user setting of the bucket starting and ending points for a single value bucketing/grouping function ('BUCKET_1000').

FIGS. 163A, 163B, 164A, 164B, 164C and 164D example the user starting with a multi-value bucketing/grouping function ('WRITE_BUCKET_1000') formula with optionally set bucketing/grouping that has automatically set (missing) bucket filling and bucket start/end points and then changing those start and end points for one of the two bucketed/grouped sets of values.

FIGS. 165A, 165B, 166A, 166B, 166C and 166D examples the user starting with a multi-value populating function ('WRITE_CALC_2D') formula with the automatically set (missing) bucket filling and bucket start/end points and then changing those start and end points.

FIG. 167 examples the breadth of range/array functions supported in calculations using our bucketed/grouped values and their associated data.

FIGS. 168A, 168B, 169A, 169B, 169C, 169D, 170A, 170B, 170C, 170D, 170E, 170F, 171A, 171B and 171C examples the use of our optional bucketing/grouping capability in one of our one-dimensional multiple cells populating functions ('WRITE_V') with one dimensional paired non bucketed/grouped values and bucketed/grouped values.

FIGS. 172A, 172B, 173A, 173B, 173C, 173D, 174A, 174B, 174C, 174D, 175A, 175B, 175C, 175D, 175E, 175F and 175G example the use of our optional bucketing/grouping capability in one of our one-dimensional multiple cells populating functions ('WRITE_V') with one dimensional paired (nested) bucketed/grouped values.

FIGS. 176A, 176B, 176C, 176D, 177A, 177B, 177C, 177D, 177E and 177F examples the creation and usage of our new single-value from multi-value selecting bucketing/grouping function technology.

FIGS. 178A, 178B, 178D, 179A, 179B, 179C, 179D, 179E and 179F example the creation and usage of our new multi-value bucketing/grouping in a single cell function technology.

Figure 180B:
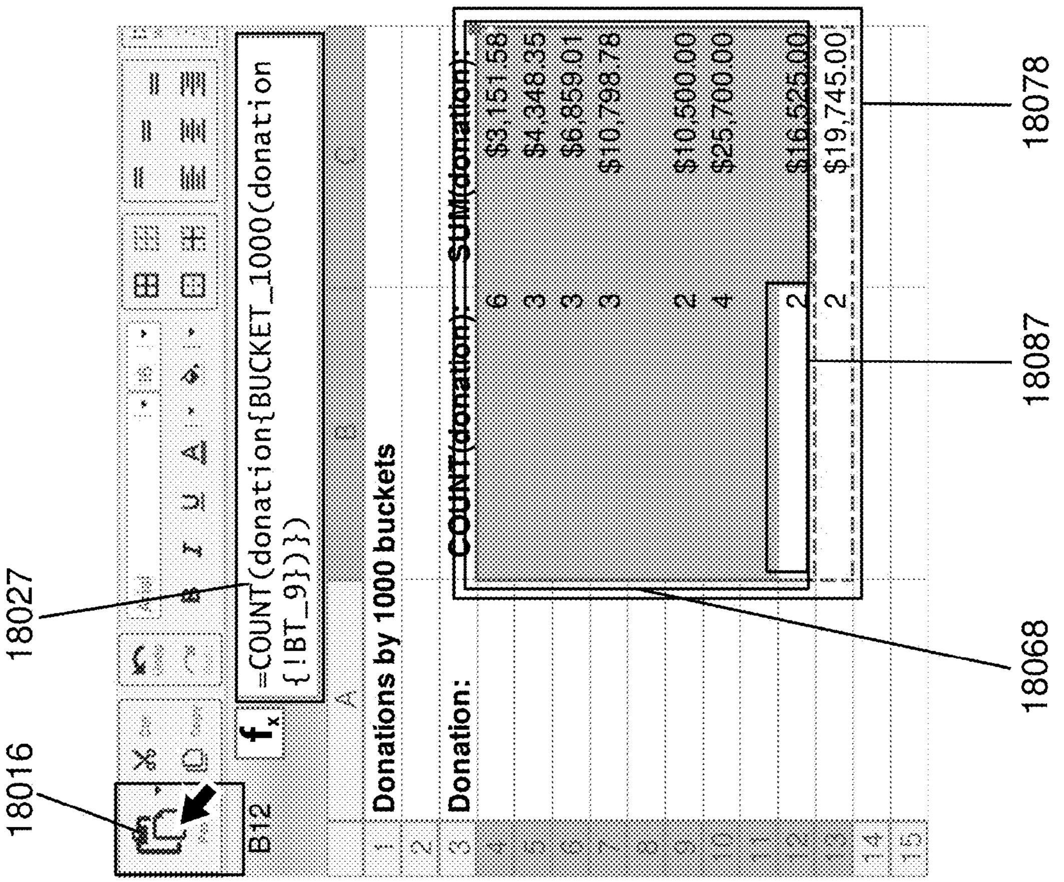
Figure 180A:
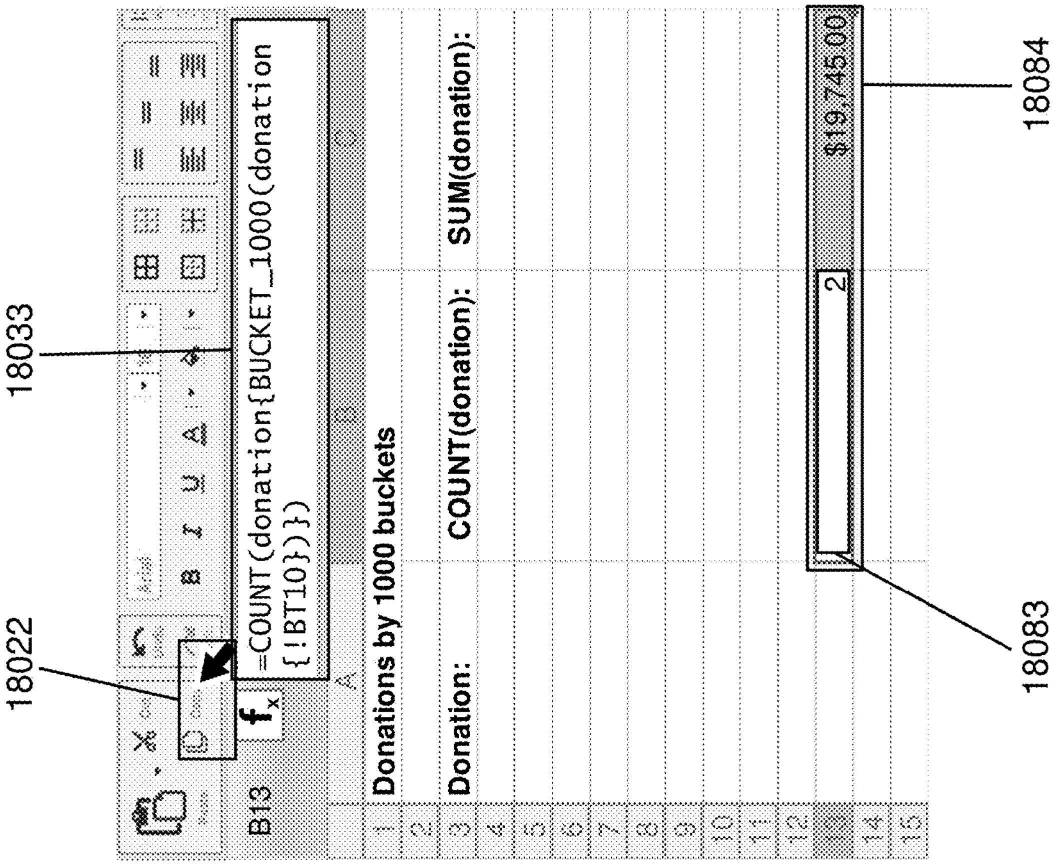

FIG. 180A and FIG. 180B examples our technology supporting copy paste of functional formulas with direct formula inclusion of our single value bucketing/grouping functions.

FIG. 181 depicts an example computer system that can be used to implement aspects of the technology disclosed.

DETAILED DESCRIPTION

The following detailed description is made with reference to the figures. Example implementations are described to illustrate the technology disclosed, not to limit its scope, which is defined by the claims. Those of ordinary skill in the art will recognize a variety of equivalent variations on the description that follows.

When spreadsheet applications were first created, they electronically emulated tabular paper spreadsheets. More recently, Microsoft Excel, Google Sheets, Apple Numbers, and others have dramatically increased the breadth of capabilities and usefulness of spreadsheets. Spreadsheet applications now access data across a wide variety of sources including relational, structured and semi-structured, open data protocol (OData), Web and Hadoop among others; and these applications manipulate data—such as in PivotTables and via Microsoft PowerPivot. Additionally, spreadsheets have extensive functionality for creating charts with SmartArt and for building forms, and they even have programming languages embedded within them, such as Visual Basic (VBA in Excel), Apps Script (in Google Sheets) and Apple Script (in Numbers).

With their added capabilities, spreadsheet applications have become substantially more complicated. The data manipulation and embedded programming language capabilities can be very powerful but are complicated to learn and therefore they are used by a very small fraction of the spreadsheet application user base. There are other advanced capabilities including Pivot Tables, Power Pivot and Power Query that allow users to manipulate data in spreadsheet overlays and processes from which formulas and cells can be extracted by further capabilities such as Cube Functions (e.g., for PivotTables). These capabilities require users to learn very different interfaces, and operations that operate very separately from their regular cell activities. As such only a fraction of users knows these capabilities which require learning and remembering very different feature operations. All this complexity has led to over a hundred books and thousands of online videos that have been published to help users understand the capabilities of Excel alone.

Spreadsheet providers like Microsoft Excel and Google Sheets cater to the specialized needs of users through many capabilities including vast numbers of spreadsheet functions (e.g., built in predefined formulas including SUM, COUNT and MIN). Microsoft Excel includes more than four hundred and fifty built-in functions and Google Sheets over four hundred. These built-in functions make operations desired by users dramatically simpler and are used by virtually every user.

The formulaically defined Non-Spreadsheet Cell (NSC) data variables and related technologies disclosed in "Methods and Systems for Connecting a Spreadsheet to External Data Sources with Formulaic Specification of Data Retrieval" filed previously, allow users to work with all types of numeric and text external data sets much larger and more complex than can currently fit in traditional spreadsheets. This external data connection creates the foundation for users to automate spreadsheet work without the use of embedded programming languages or special prebuilt data feeds, taking spreadsheets from a tool users employ to conduct one off or routine analytics to a real-time competitor of systems that automate repetitive activities.

The disclosed technology allows users to use one formula using one of our new functions to create bucketed data for data summarization and for data analytics (i.e., going beyond summarizing the data with functional and/or algebraic analytics). The disclosed technology goes beyond existing Pivot Table bucketing/grouping summarization of data used with eleven range or array functions (i.e., Sum, Count, Average, Max, Min, Product, Count numbers, StdDev, StdDevp, Var, and Varp shown in FIG. 1A and FIG. 1B for Microsoft Excel) to use a much broader set of range or array functions and a large fraction of the hundreds of additional non-range or non-array functions available. Our technology allows users to create their own combination of functions and algebraic operators in a single calculation not limited to the set list of operations as shown for Excel in FIG. 1C. Our technology is not a specialized feature only usable by itself (e.g., PivotTable), but spreadsheet functions that can be used in any cell and directly or via its cell output in other functional calculations using its formulaic data values (e.g., not losing the data underpinning the bucket/group). Our grouping/bucketing technology is usable in several ways, to populate an individual cell, to populate a value within another function, to write/populate many different groups/buckets in multiple cells, or as a feature within other functions adding the grouping/bucketing capability to those functions. Our technology brings bucketing/grouping capabilities to spreadsheet functions and spreadsheet function analytics, something lacking in today's spreadsheets.

Existing Spreadsheet Limitations—PivotTable

Because Microsoft Excel has the broadest capabilities of the available spreadsheets, we will primarily example user activities with it. Google Sheets and many of the other available spreadsheets have subsets of the Functions and Pivot Table capabilities available within Microsoft Excel and while there are differences, generally operate in similar manner.

We will example a charity worker summarizing donations for three months of data. It is a very simple data set to example how the current PivotTable features work and their limitations. FIG. 2 through FIG. 5 examples that charity user using Microsoft Excel to summarize the donations by size of donation buckets/groups by country, in this example Canada and the US. FIG. 6 through FIG. 9 examples the charity user summarizing the donations by date groups/buckets and FIG. 10 shows that Microsoft Excel has no alphabetical bucketing within its PivotTable.

Figure 2:
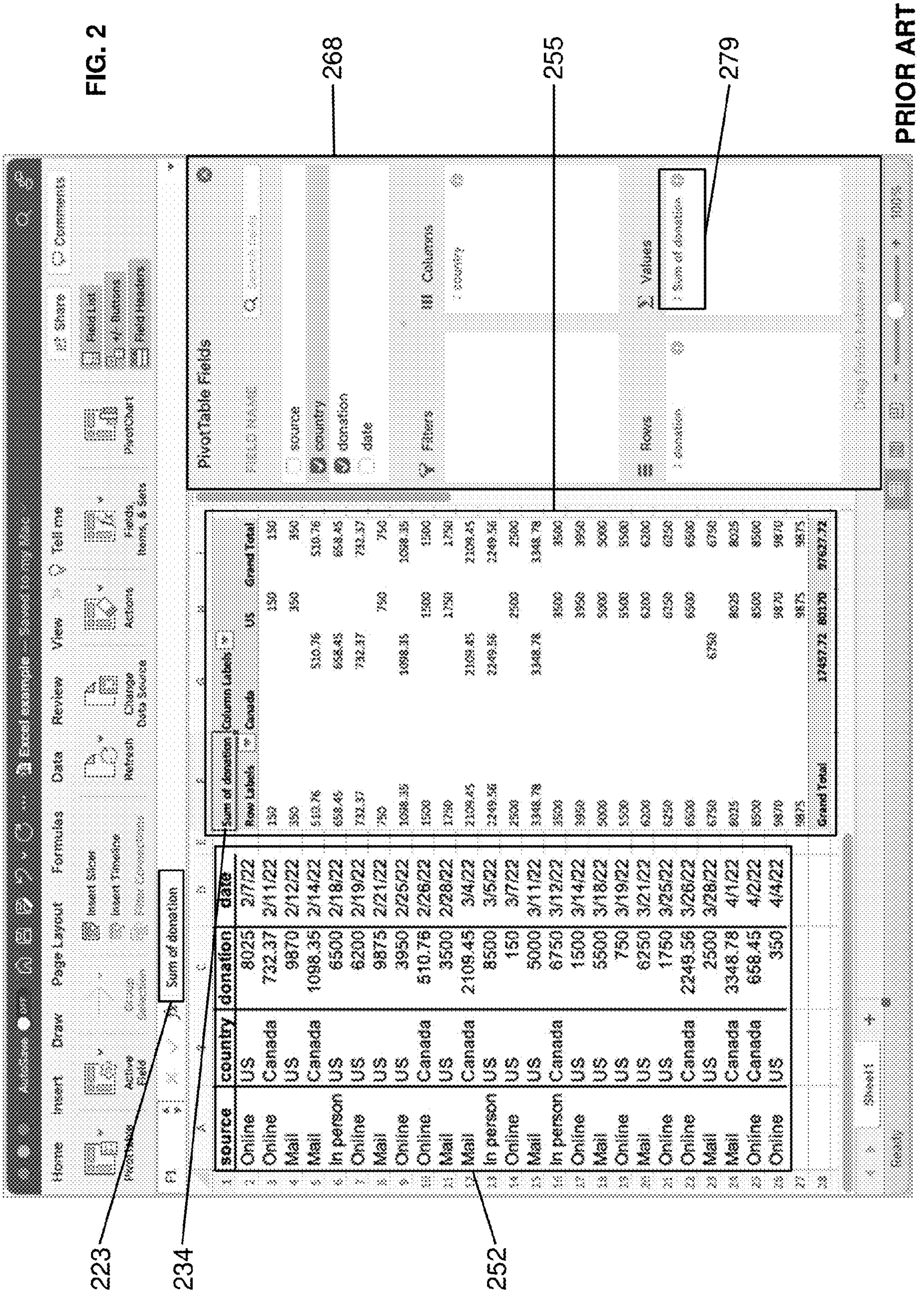
Figure 3:
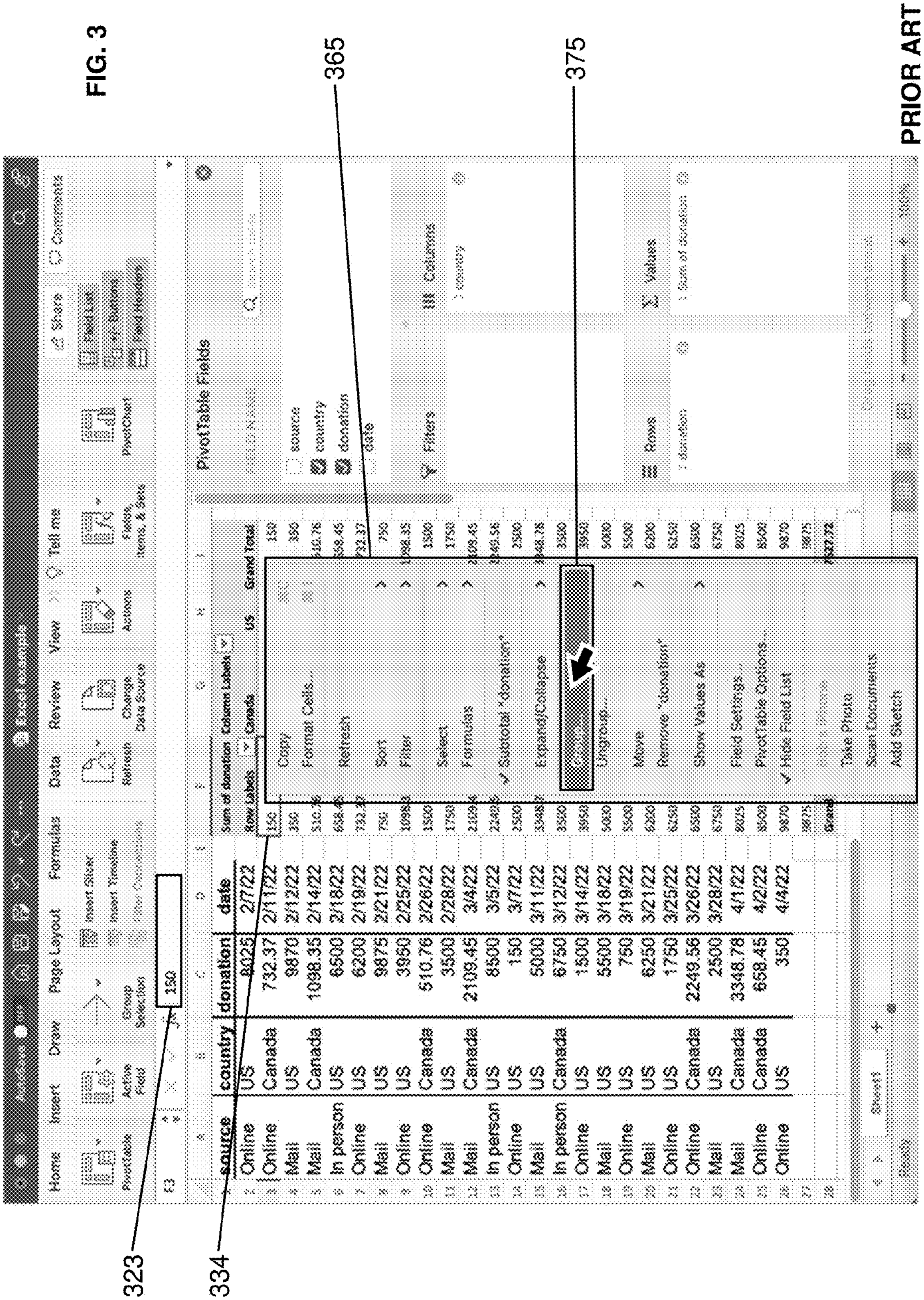
FIG. 3 PRIOR ART
Figure 5:
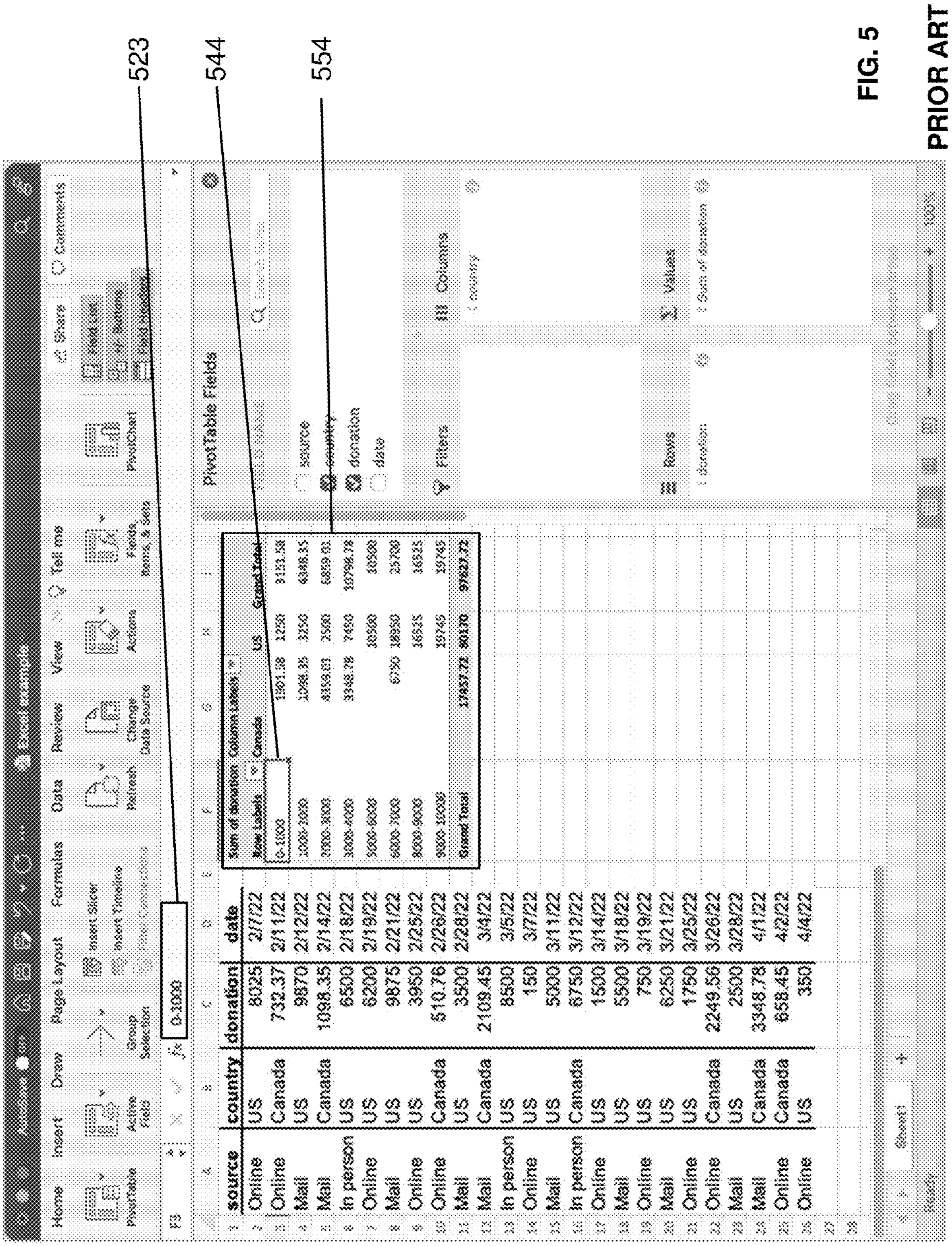
FIG. 5 PRIOR ART

In FIG. 2 the charity user has created a PivotTable 255 using the data in 252 setting it up via the controls 268. It is doing a daily 'Sum of donation' 234 which as shown in the formula bar is designated by what looks like text 223 matching what is in the PivotTable control 279. FIG. 3 examples the charity user right clicking one of the donation values 334 to get the right click menu 365 where the user clicks 'Group . . . ' 375 to get the 'Grouping' popup 474 in FIG. 4A. The suggested grouping settings start with the lowest value of '150' 465 with a suggested group increment of '1000' 485 and an 'Ending at: 9875' 475 which is the largest 'donation' not the endpoint of the last suggested group. Because in most situation users want rounded starting points, e.g., 0 rather than 150, the user opts in FIG. 4B to alter the 'Starting at' to '0' 429 and then alters the 'Ending at:' to '10000' 439 while leaving the 'By' at '1000' 449. When the user clicks 'OK' 459 they get the grouped/bucketed PivotTable 554 in FIG. 5. It is worth noting that the cell 'F3' which contains the '0-1000' 544 simply shows that content in the formula bar 523, like the 'F3' '150' 334 in FIG. 3 just showed '150' in the formula bar 323. Because as we will later example the user must do additional work to access the formula creating those values and make those values formulaically represent the data that generated them versus simply a number (i.e., '150') or text (i.e., '0-1000').

FIG. 6 examples the same charity user creating date-based groupings of the 'Sum of donation' using the same data 652 and the same controls 668 to generate the PivotTable 655. They then click into cell 'F3' which shows the first date '2/7/22' 644 and in the formula bar shows the exact same content '2/7/22' 623 rather than the formula that put the value there. We skip showing the right click menu with the grouping selection (as shown in FIG. 3) and go straight to FIG. 7 showing the 'Grouping' popup 776. Like in the numerical popup the 'Starting at: 2/7/2022' 745 is automatically populated with the first date '2/7/22' and the 'Ending at: 4/5/2022' 755 is automatically populated with the last date '4/5/2022' in the data. The difference here is rather than a single suggested increment ('By 1000' 485 in FIG. 4A) the popup 776 lists seven options. Those options are clearly generic to a data type because as is shown in the 'date' data 752 'Seconds', 'Minutes' and Hours' 765 are not applicable to the data. Clicking 'Days' 774 does nothing to change the output and therefore also does not feel like it, as configured here, is a helpful grouping suggestion in this situation. Likewise, 'Years' is also not very helpful as the data all resides within one year and so it is simply a 'Grand Total' line. The grouping option list has not been tested against relevant applicability of generating more than one group or changing the output by creating at least one group (bucket). When the user clicks 'Months' 775 and then clicks 'OK' 788 they get the PivotTable 845 in FIG. 8. Here again the 'Feb' in 'F3' 844 shows the same 'Feb' in the formula bar formula 823, nota formula for the grouped data.

FIG. 9 examples what happens if the user instead of selecting 'Months' in the Grouping popup 776 in FIG. 7 selects 'Hours' in 765. They get a single line with '12 AM' 944, which as previously described is not helpful as there were no hours in the data.

FIG. 10 shows that Microsoft Excel PivotTable cannot group/bucket alphabetical content. In this example the charity user had donation data by donor first and last name. They would like to group the data by the first letter of the donors' last name. To do so they create a PivotTable and then try to group the 'Row Labels' 1064 by right clicking into cell 'F4' 1044 and then clicking 'Group' in the menu as shown in FIG. 3 375, however instead of getting a 'Grouping' popup the user gets the 'Alert' 1047 telling the user 'Cannot group that selection'.

FIG. 11 shows that the Google Sheets PivotTable capability cannot group/bucket alphabetical content. When the charity user replicates the same PivotTable as FIG. 10 and tries to group the last names (1144 through 1147) the right click option 1145 contains no 'Group' option. Stopping the user from even attempting to do it. Otherwise, Google Sheets PivotTable setup works in a relatively similar manner (to the Microsoft Excel PivotTable) employing a different UI specifying the same inputs.

Figure 12:
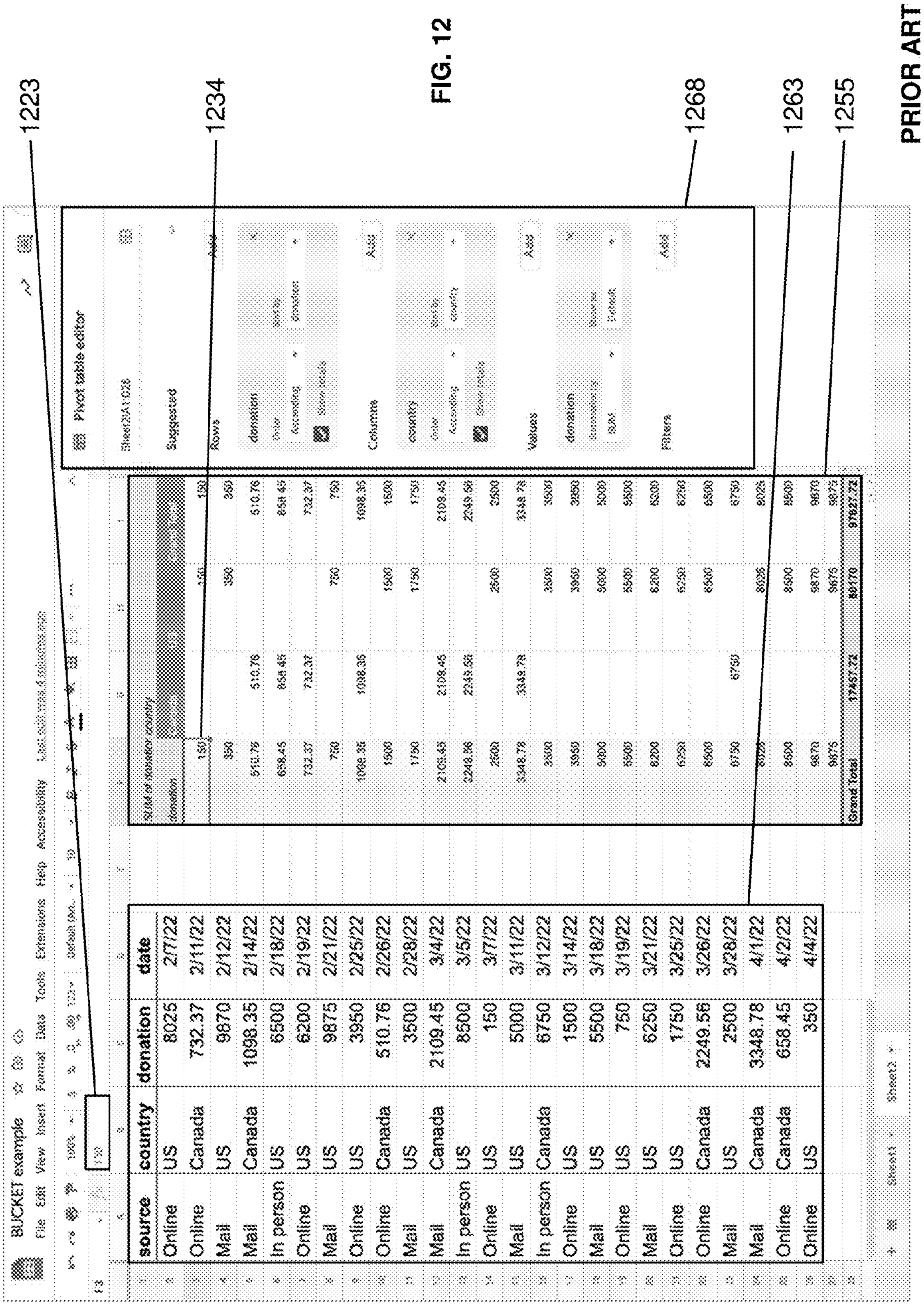
FIG. 12 PRIOR ART
Figure 13:
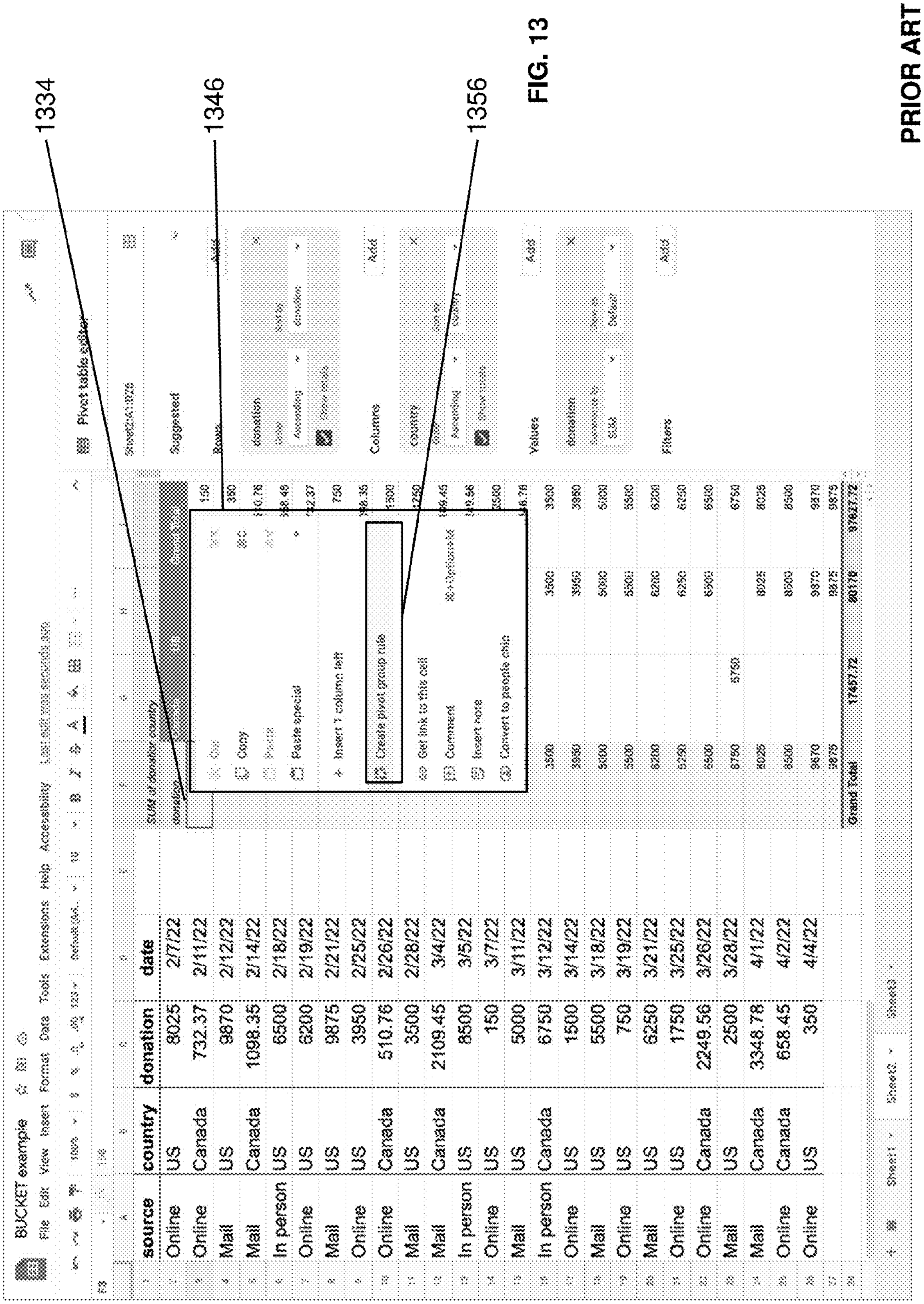
FIG. 13 PRIOR ART
Figure 14A:
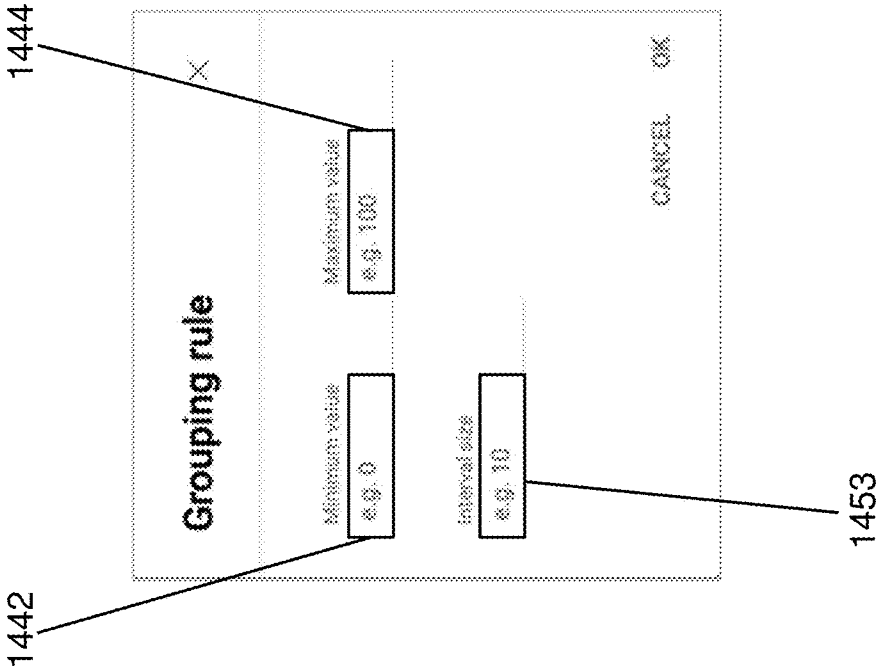
Figure 14B:
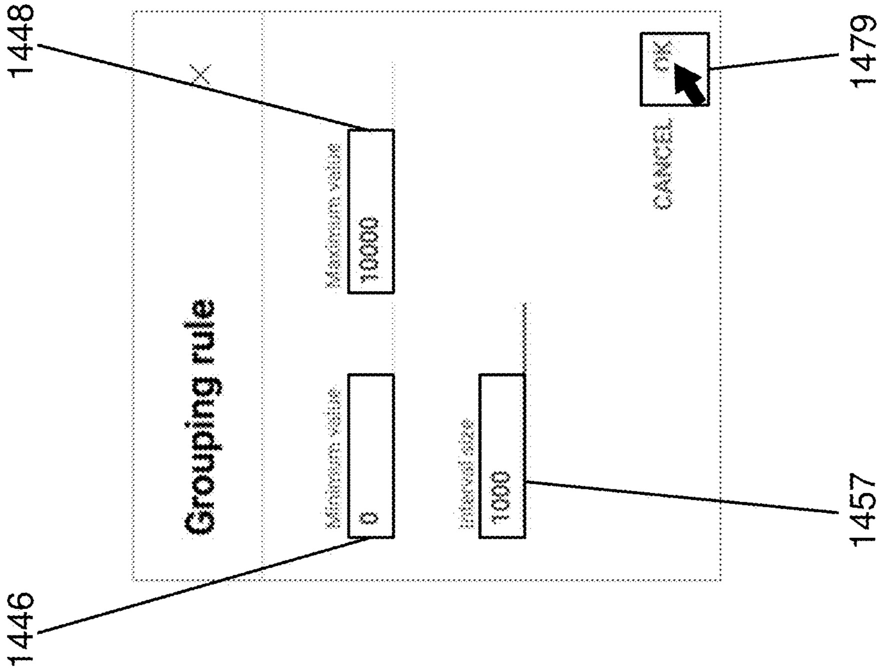
Figure 15:
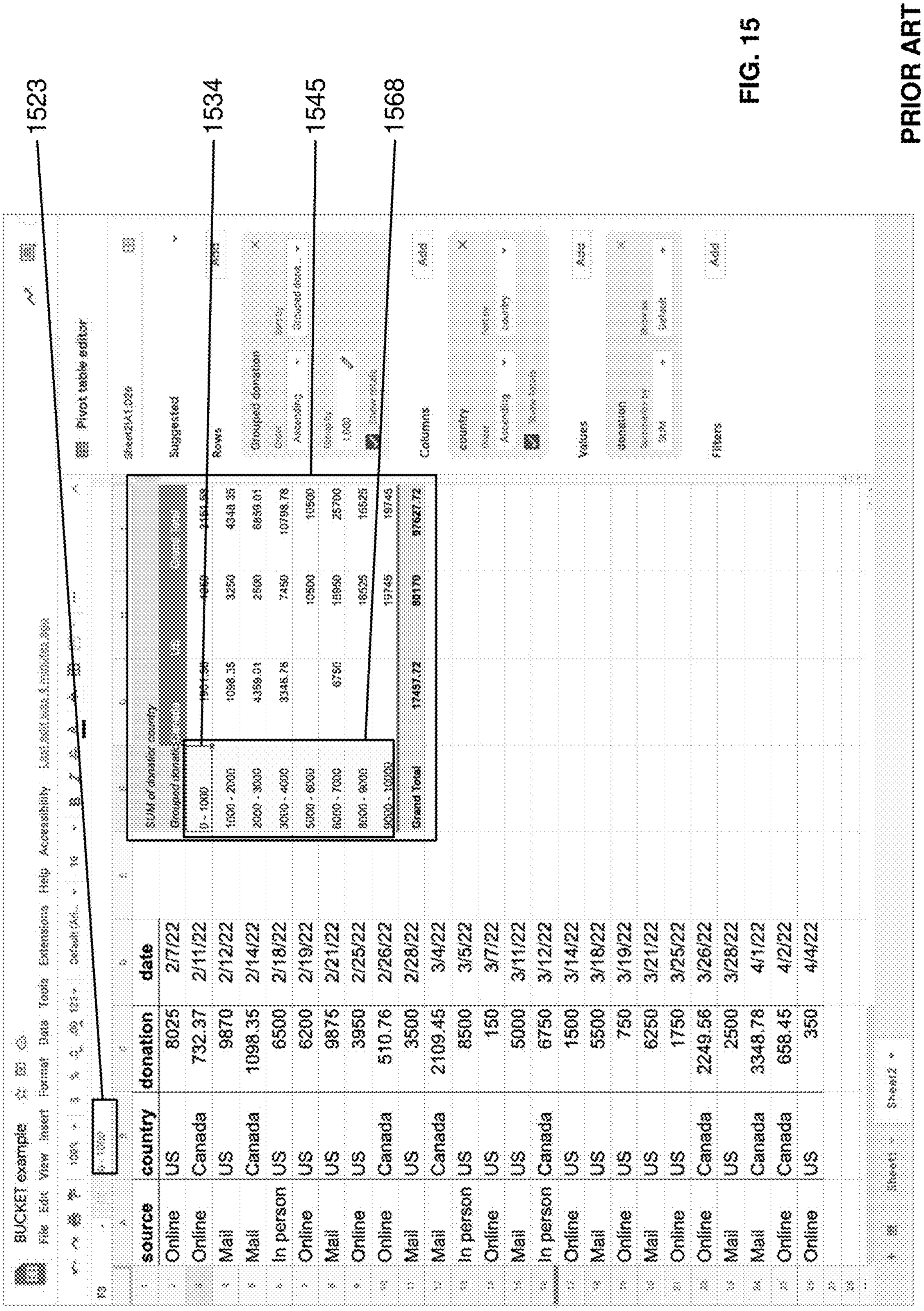
FIG. 15 PRIOR ART

FIG. 12 through FIG. 15 examples the grouping setup paralleling FIG. 2 through FIG. 5 in Microsoft Excel. In FIG. 12 the charity user has created a PivotTable 1255 using the data in 1263 setting it up via the controls 1268. Like in the Microsoft Excel example it is doing a daily 'Sum of donation'. The result of '150' shown in cell 'F3' 1234, like Microsoft Excel, is displayed in the formula bar as the value '150' 1223 not a formula of how that data is there. FIG. 13 examples the charity user right clicking one of the donation values 1334 to get the right click menu 1346 where the user clicks 'Create pivot group rule' 1356 to get the 'Grouping' popup in FIG. 14A. The decisions are the same as in Microsoft Excel but there are no suggested grouping settings (the 1442, 1444 and 1453 are not situational specific suggestions but just generic numeric examples). In FIG. 14B the charity user sets the 'Minimum value' to '0' 1446, sets the 'Maximum value' at '10000' 1448 and sets the 'Interval size' to '1000' 1457. When the user clicks 'OK' 1479 they get the grouped/bucketed vales 1568 in the PivotTable 1545 in FIG. 15. Like in Microsoft Excel, the Google Sheets formula bar does not show a formula for the grouped data but simply the text '0-1000' 1523 like what is in the corresponding cell 'F3' 1534.

FIG. 16 examples the same charity user creating date-based groupings of the sum of donations using the same data and the similar controls to generate the PivotTable as exampled for Microsoft Excel. When the user right clicks in cell 'F3' 1624 to get the menu 1635 it now has a selector arrow (not there for numerical values) which the user clicks 1645 to open a date grouping option menu 1667 with fifteen options—even more options than Microsoft Excel. However, like Microsoft Excel a number of those options are not applicable to the data set, i.e., Second, Minute, Hour, Hour—Minute (24 hour) and Hour—Minute (12 hour) 1657, or would give only one outcome, i.e., Year 1687. Numerous of the others result in the same number of groups/buckets with different date or time conventions. None of them fill in the missing groups/buckets. When the charity user clicks the "Month' 1677 selection they are delivered three different month groups/buckets 1735 with results matching those in Microsoft Excel (shown in FIG. 8 845). Also, like Microsoft Excel the group buckets have formula bar formula 1722 which only the shows a value, in this case 'Feb', rather than the formula determining the value. So, to attempt to use the PivotTable feature values formulaically requires employing other spreadsheet functions. The GETPIVOTDATA functional transformation has very limited capabilities but is implemented in more than just Microsoft Excel (e.g., Google Sheets and LibreOffice Calc), while the CUBE functions are a Microsoft Excel specialized capability requiring an advanced capability called PowerPivot which is an add-in for many users and not available to most Mac users. Neither of these capabilities allow a user to employ a PivotTable created value for calculations which have not been done by the PivotTable and therefore cannot support other data summarizations using the PivotTable data. We will now describe how those PivotTable transformation functions work and example their limitations.

PivotTable Cell References

PivotTable cell referenced values can be used in normal cell formulas but only as the value and not representing the associated data (e.g., 1863 is the associated data for the '150-1150' bucket 1835) underlying the value. FIG. 18 examples this for a PivotTable grouped set of donation values 1845 created by the equivalent of clicking 'OK' in the 'Grouping' popup 474 in FIG. 4A. In column 'H' the user attempts many ways to use the groups/buckets in a cell formula but finds that the data is text 1847/1855 and there is no way to analytically use the associated data underlying the group/bucket in typical cell functional formulas. The cell reference also does not shift if the content of the PivotTable changes and therefore conventional spreadsheets developed the 'GETPIVOTTABLE' function which overcomes this shifting limitation.

PivotTable GETPIVOTDATA Function Transformations

The GETPIVOTDATA function transformation of the PivotTable calculated values solves the cell shifting problem with changes in the PivotTable but is only applicable to the visible summarized values in the body of the PivotTable and not applicable to the Row or Column labels. FIG. 19A and FIG. 19B example the shifting workings of a 'GETPIVOTDATA' function and a typical cell for PivotTable changes. In this example the user alters the 'Grouping' 'Starting at:' from '0' (shown by the result in cell 'F3' 1931) to '3000' 1926 clicking the 'OK' 1936 in the 'Grouping' popup 1925 (changing the first row's label from '0-1000' 1931 in FIG. 19A to '<3000' 1961 in FIG. 19B). In FIG. 19A the charity user has setup a normal reference cell formula '=H7' in cell 'L7' 1945 and a 'GETPIVOTDATA' functional reference in cell 'L8' 1957 which refers to the value in cell 'H8' 1953. When the PivotTable changes as shown in FIG. 19B cell 'L7' 1985 still refers to the same 'H7' cell, but it has a different value ('16525' 1983 vs, '10500' 1943) because the PivotTable values shifted but the cell reference did not. However, the shift does not change the value in the 'GETPIVOTDATA' cell formula in 'L8' 1997 because while the '18950' value has shifted from cell 'H8' 1953 to cell 'H6' 1973 the 'GETPIVOTDATA' function automatically corrects for the shift.

However, this shifting capability only works if the value is still visible after the PivotTable change. FIG. 20A and FIG. 20B example what happens if the PivotTable change eliminates the value. In this example the charity user again alters the 'Grouping' 'Starting at:' from '0' (shown by the result in cell 'F3' 2031) to '3000' 2026 clicking the 'OK' 2036 in the 'Grouping' popup 2025 (giving the '<3000' row label 2061 in FIG. 20B). In FIG. 20A the charity user has setup a 'GETPIVOTDATA' functional reference in cell 'L8' 2057 which refers to the value in cell 'H4' 2043. However, that value disappears after the grouping/bucketing change so that the before value of '3250' 2057 is replaced by a '#REF!' error message because the value no longer exists in the PivotTable 2083.

FIG. 21 examples another limitation of the 'GETPIVOTDATA' function, which is its lack of incrementing in copy paste. In this example the charity user wants to replicate the 'Canada' column of values 2153 and 2173. They do so by creating the 'GETPIVOTDATA' formula in cell 'K3' 2156 by typing the '=' and then clicking on cell 'G3' 2153 to get the formula in the formula bar 2147 and the value in cell 'K3' 2156. They then copy paste cell 'K3' 2156 to cells 'K4' to 'K11' 2176 expecting to get the values in cells 'G4' to 'G11' 2173 but instead get eight copies of the value and formula in 'K3' 2156. Not the desired outcome, requiring the user to manually edit the formulas to get the desired incrementing value copy paste.

The limited capabilities of 'GETPIVOTDATA' does not allow users formulaic access to the data underlying the PivotTable and any grouping/bucketing it has performed is the extent of the capabilities for the other traditional spreadsheets. Microsoft Excel went one step farther solving the disappearing value problem (with CUBE functions discussed next) but not solving the normal cell regular function use of the PivotTable accessed data and not expanding the very limited functional calculations supported, i.e., the limitation to the eleven data summarization functions in FIG. 1A and FIG. 1B and no support of the much broader set of spreadsheet analytical functions.

Microsoft Excel CUBE Functions

Microsoft Excel's CUBE functions solves the disappearing value problem but does not give the user free access to use the PivotTable data in regular cell function (meaning non-CUBE function) calculations and those CUBE function calculations are limited to what the PivotTable they are accessing has previously done. So, users are limited to the eleven range/array functions previously previously (in FIG. 1A and FIG. 1B) sited and no use of the hundreds of other functions. No ability exists to use the grouped or bucketed data in a non-PivotTable previously done calculations. And the user must have the Power Pivot capability (an add-in for many Microsoft Excel versions and not available in all versions) and separately setup the PivotTable using Power Pivot, as a regular Pivot table setup does not generate the CUBE functions conversion.

FIG. 22A and FIG. 22B examples the necessary step of adding the data 2262 to the Power Pivot 2219 data model 'Add to Data Model' 2223 completed by clicking the 'OK' 2256 in the Table popup 2247. This creates a 'Power Pivot' 2313 table 2344 shown in FIG. 23 from which the charity user clicks the 'PivotTable' button 2323 to start the PivotTable creation process as shown in FIG. 24. In this example the charity user opts to create the PivotTable in a 'New Worksheet' 2444 by clicking 'OK' 2476 in the 'Create PivotTable' popup 2464. In FIG. 25 they then do what looks like a normal PivotTable setup 2586 except it is from a Power Pivot enabled table 'Table3' 2556. The result is a PivotTable 2573 that is like one previously exampled in FIG. 6 except this one can do CUBE conversions and that one cannot. The grouping/bucketing done in FIG. 26A and FIG. 26B works the same way with the right click opening a popup where the user clicks 'Group' 2656 to get the 'Grouping' popup 2658 in FIG. 26B. The screens look slightly different only because the user had to move from their Mac, which lacks the ability to do Power Pivot, to their PC which after adding in Power Pivot could do CUBE function conversions. This has not changed the fact that Microsoft Excel offers grouping options which are not applicable to this data or will give a single group (otherwise known as a Total). The user selects 'Month' 2668 and clicks 'OK' 2678 to generate the grouped/bucketed PivotTable 2723 in FIG. 27A.

The user can then start the process to convert the Power Pivot PivotTable to CUBE functions. In FIG. 27B the charity user examples highlighting the PivotTable 2783 with the 'PivotTable Analyze' ribbon 2748 and clicking the 'Calculations' button 2756. That opens a popup where the user clicks 'OLAP Tools' 2777 and to open another popup where the user clicks 'Convert to Formulas' 2788 selection to convert the PivotTable 2783 to CUBE function formulas shown in FIG. 28A through FIG. 29A.

Figures 28A, 28B, 28C:
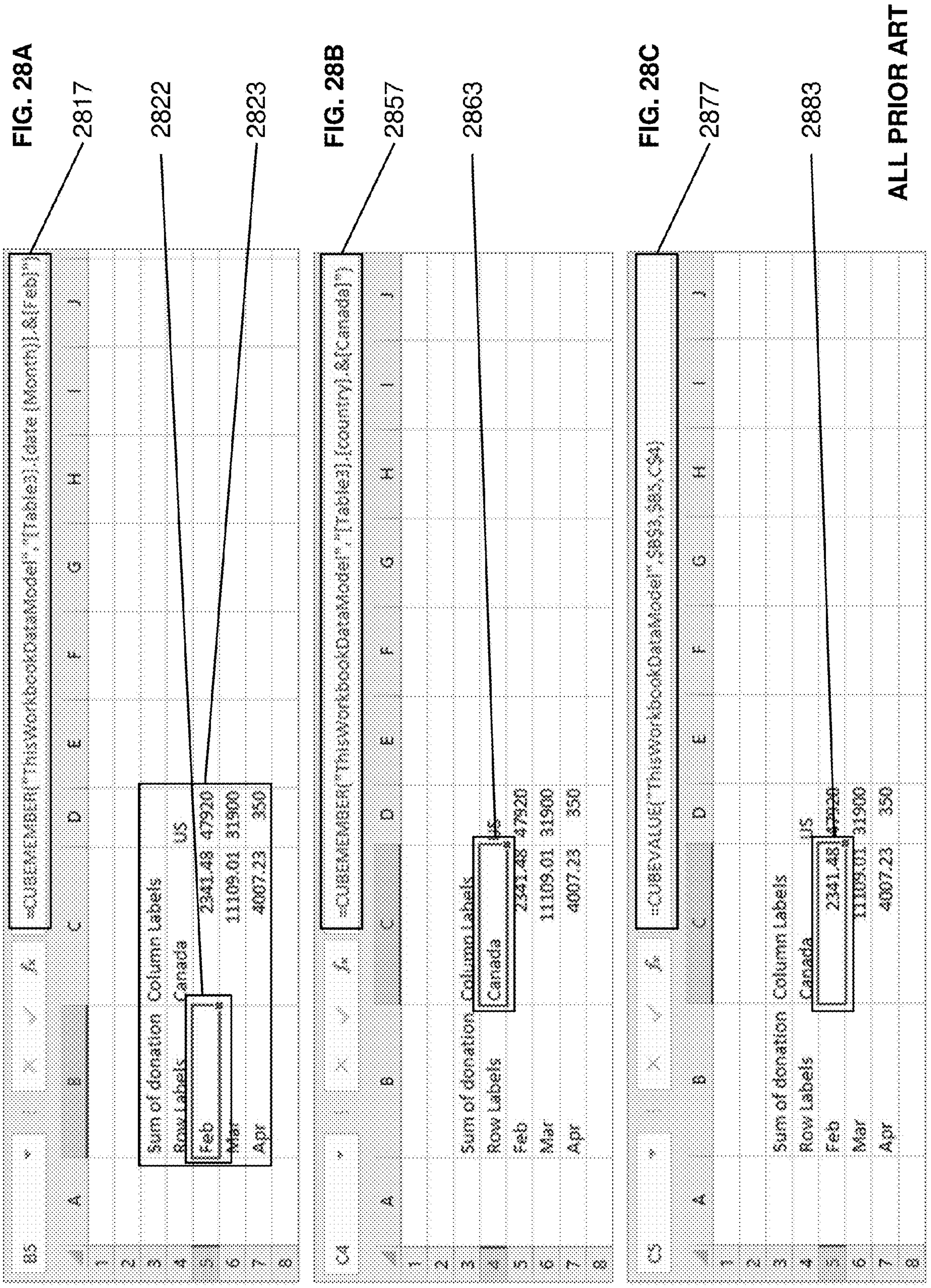

FIG. 28A and FIG. 28B example that the Row and Column labels are converted into 'CUBEMEMBER' function formulas (e.g., value 2822 with its formula 2817 in FIG. 28A and value 2863 with its formula 2857 in FIG. 28B) while the calculated values are converted in 'CUBEVALUE' function formulas (e.g., value 2883 with its formula 2877 in FIG. 28C). FIG. 29A shows the range/array function operation 'SUM of donation' done by the PivotTable 2932 has also been converted into a 'CUBEMEMBER' functional formula 2917. The user is now able to separately move each cell wherever they want without disrupting its value. The PivotTable is gone so changes to it do not disrupt these values. However, the user cannot change the values to something that has not been evaluated by a PivotTable working from this Power Pivot table. FIG. 29B examples this by the charity user changing the 'Sum of donation' in FIG. 29A 2918 to 'Count of donation' in FIG. 29B 2968 which turns the "CUBEVALUE' results from the calculated value 2944 to '#NA' errors 2974 and the 'Sum of donation' 2932 'CUBEMEMBER' value to a '#NA' error 2962. This is confirmed by user accessible error popup 2971 telling the user 'Value Not Available Error'. However, as exampled in FIG. 30 through FIG. 32B had the PivotTable 'Table3' previously done the 'Count of donation' evaluation then that exact same formula would work. Thus, demonstrating that the CUBE functions do not support user calculations which have not been done by the PivotTables using the Power Pivot source data. They can display data summaries already done, however do not have a stand-alone functional computing capability.

Figure 30:
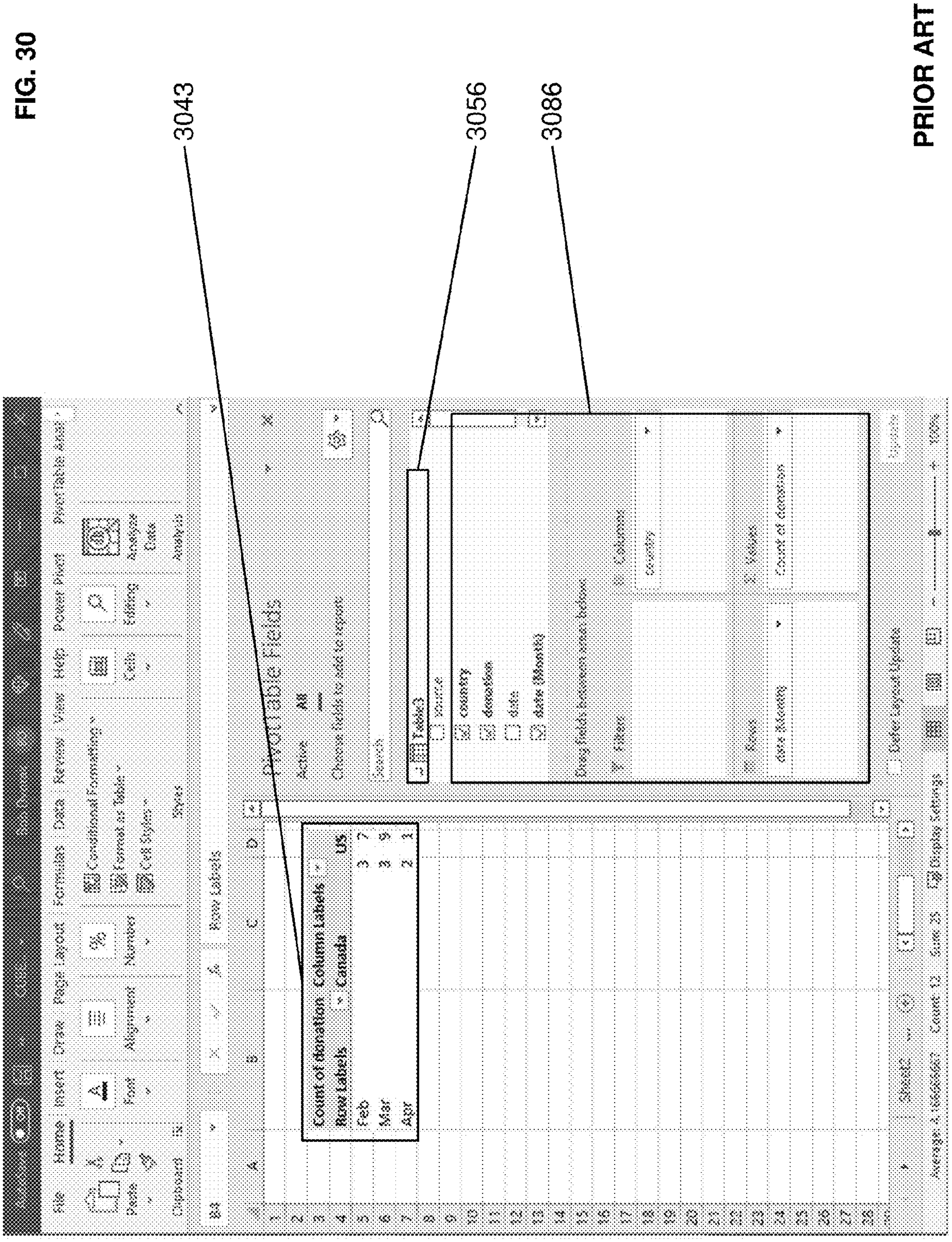
Figure 31:
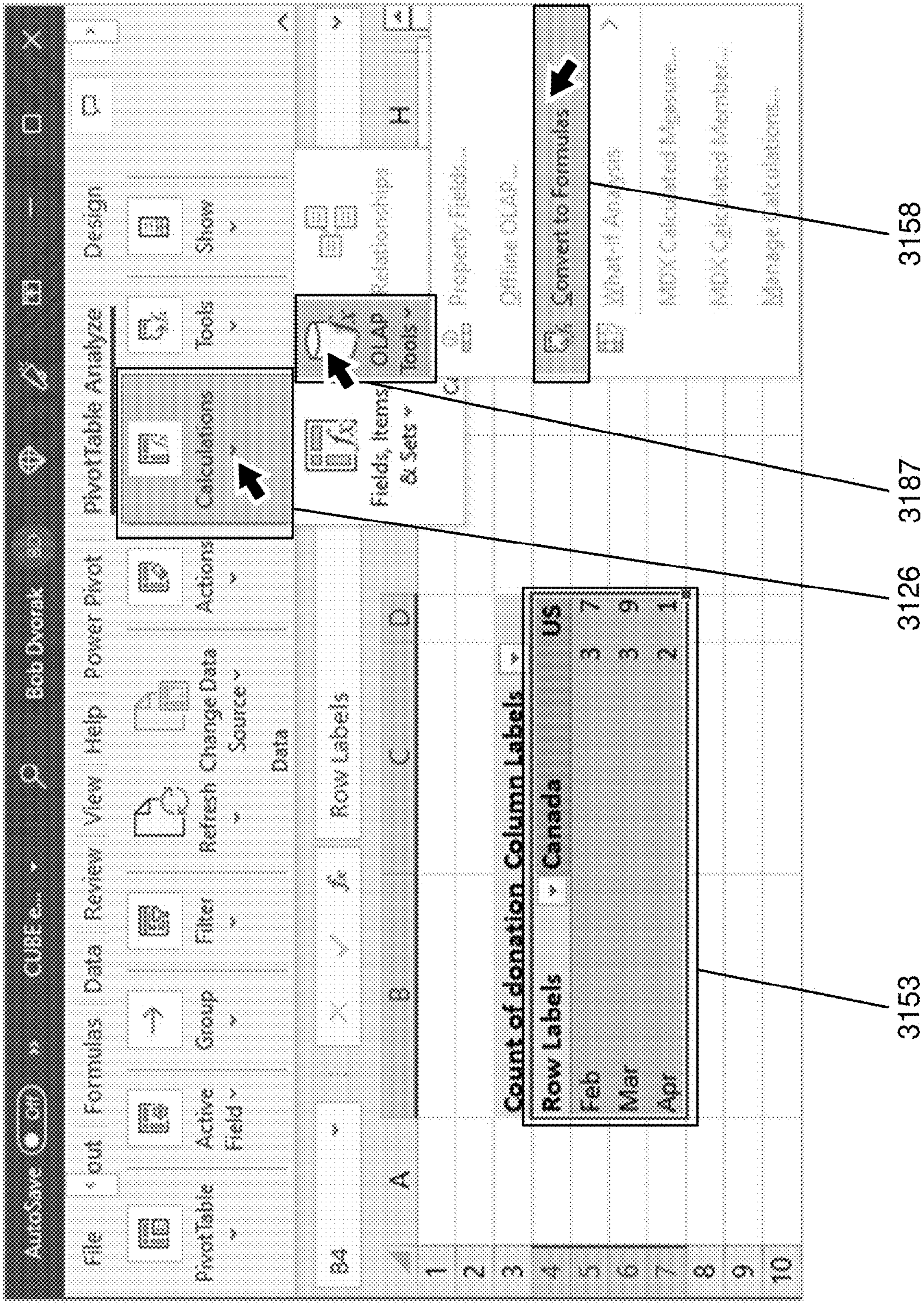
FIG. 31 PRIOR ART
Figures 32A, 32B:
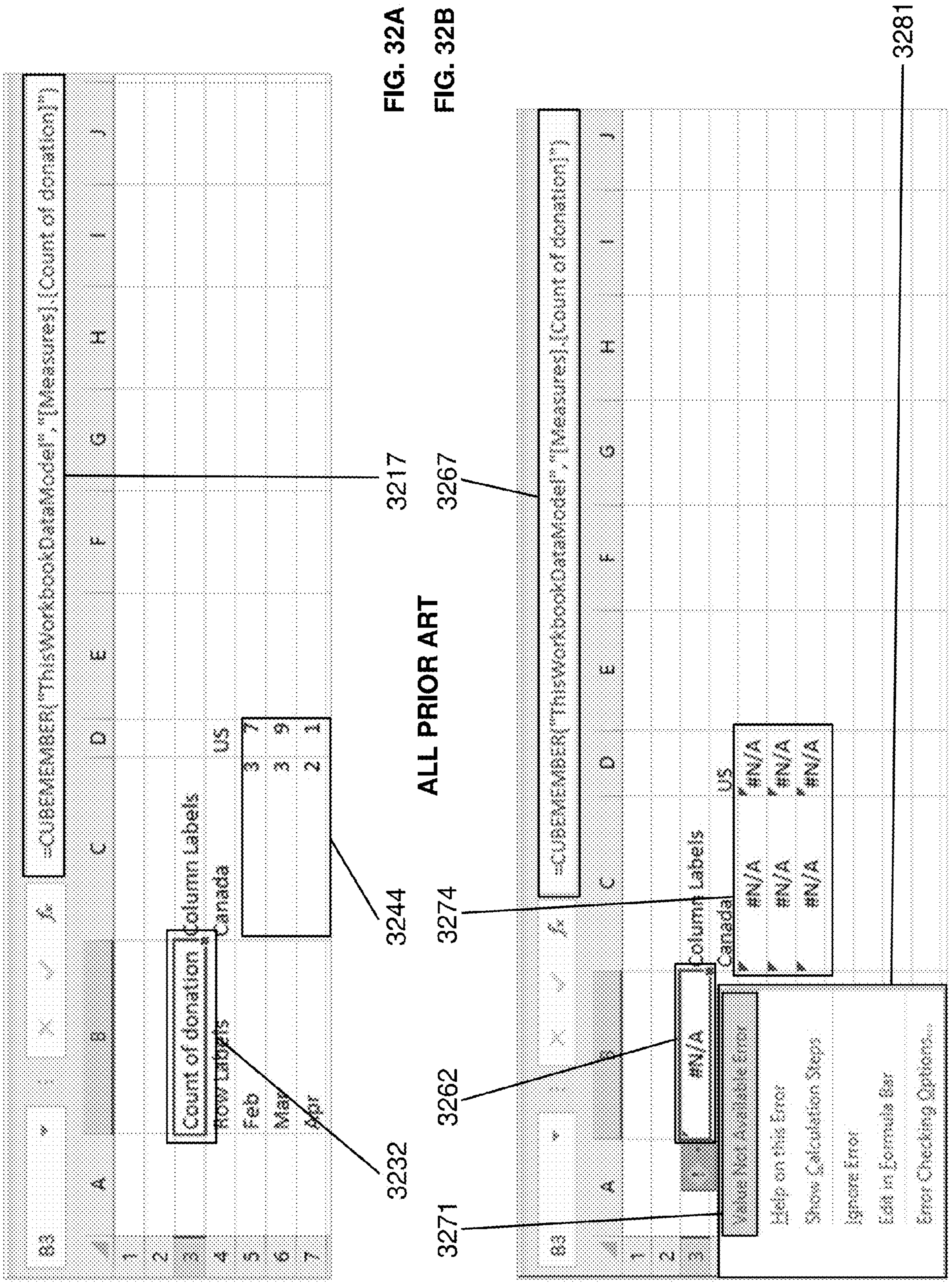

FIG. 30 examples the charity user having set up a 'Count of donation' PivotTable 3043 using the same 'Table3' 3056 Power Pivot table using the typical setup 3086. In FIG. 31 they then convert the PivotTable to CUBE functions highlighting the PivotTable 3153 clicking the 'Calculations' button 3126, then in the popup they open (clicking) the 'OLAP Tools' 3187 selection and then in the popup it opens clicking the 'Convert to Formulas' 3158 selection. This then converts the PivotTable to CUBE function formulas shown in FIG. 32A. For comparison the previous non-working 'Count of donation' FIG. 29B is repeated in FIG. 32B. The 'CUBEMEMBER' formulas 3217 and 3267 are identical, but the one created from a 'Table3' that has now done the calculations works while the other did not (e.g., 3232 vs. 3262 and 3244 vs. 3274).

FIG. 33A through FIG. 33C example that CUBE functions also lack the ability to do an incremental copy paste, but instead do exact replica copy paste. FIG. 33A examples what the charity user would like to see when they do a copy paste for both the values 3322 and the formulas 3327 (seen via the FORMULATEXT function). However, the user has the situation in FIG. 33B missing the 'Mar' and 'Apr' grouped/bucketed rows 3332. They copy the 'Feb' row 3352 hoping to get the other two months in the target rows 3361. Instead, the result is an exact copy of the 'Feb' row values 3391 and formulas 3397, not the incremented values displaying 'Mar' and 'Apr' values 3332 and formulas 3327. So while CUBE functions allow users the ability to both move the cells around and retain values previously calculated by the Power Pivot PivotTables using the Data table, they do not support groups/buckets not already done by the PivotTables, they do not support independent calculations, they do not support a broader set of range/array functions, they do not support non-range/array function calculations, they do not support incremental copy paste and they do not support regular cell functional calculations using their underlying data. We are now going to describe how our technology removes all those limitations and adds capabilities beyond those. Our technology also removes the requirement for user to know how to set up data in PowerPivot, do PowerPivot PivotTables, and do Cube function conversions. Each one a substantial barrier to usage given how different they are from creating a functional formula in a regular spreadsheet cell.

Our disclosed technology creates a family of (predefined formula) spreadsheet functions which allows users to create bucketed/grouped data values which can be used by other cell function calculations and in some embodiments be used within other functions to create bucketed/grouped values. There are three major family branches of the bucketing/grouping technology, one which is single value function, the second is a multi-value generating function and the third is adding this capability as an option to many of our other spreadsheet functions. We will example each of these families of capabilities and how they work with the broad spectrum of our spreadsheet functions.

Single Value Bucketing/Grouping Functions

We will begin exampling two different approaches to creating a bucketing/grouping single value, one where the function specifies the increment and another where the user specifies the grouping/bucketing increment. The idea behind the function specified increment is to present to the user a set of the commonly used increments for super simple setup and the option for the user to opt for a specified increment for custom situations.

FIG. 34A and FIG. 34B example the numeric grouping/bucketing capability, previously exampled in the Microsoft Excel and Google Sheets PivotTables, in a regular spreadsheet cell function usable with its associated data for regular spreadsheet cell calculations. We example embodiments which have our cell and formula bar color outlining (e.g., orange but it could be any color or some other way of visually differentiating the functions) so the user immediately sees they have a bucketing/grouping function. We have also included formula bar button triggered option access (3422 and 3426) as described contemporaneously in U.S. Application No. 63/337,576, titled "Methods and Systems for Spreadsheet Function and Flex Copy-Paste Control of Formatting and Use of Selection List Panels". In the FIG. 34A embodiment, the charity user has used a function formula called 'BUCKET_1000' with a function specified increment of '1000' for the formulaic data field 'donation' as shown in the formula '=BUCKET_1000(donation)3423. This simple functional formula automatically executes the steps in FIG. 35A through FIG. 35E to illustratively example what our function is doing, recognizing it illustrates the concepts realizing our application code can accomplish the same outcome differently.

FIG. 35A examples the available data which as exampled in FIG. 36A through FIG. 36C could be stored elsewhere in the spreadsheet or could be Non-spreadsheet cell (NSC) external data accessed as described in our previous filings. Throughout all our following examples the formulaic data used could be from either source (in-cell or external) or from a combination of the two different sources. FIG. 35B shows that for this formula only the 'donation' data values are retrieved. FIG. 35C examples the sortation done to set up the creation of the groups/buckets in FIG. 35F after the automatic determination of the starting point and ending point. In this embodiment our technology determines the closest number equal to or below the first data point that when divided by the bucket increment delivers an integer value. The lowest value '150' 3526 does not equal an integer when divided by the bucket increment of 1000 and as shown in FIG. 35D. The first value below '150' that fulfils that requirement is '0' which becomes the bucket starting point in this example. The auto determined ending point in this embodiment is the last increment that captures the highest value, in this example '9000-9999.99 . . . ' which captures the highest value of '9875' 3586 with the value '9999.99 . . . ' 3587 shown in FIG. 35F. In other embodiments the user can override the automatically set starting and ending points as later exampled.

We have set our bucket/group values, so it is obvious to the user what values are in which group/bucket not groups like other spreadsheets where '1000-2000' and '2000-3000' does not leave the user certain where the 2000 values went. Clearly other group labelling modes can be used but ours are unambiguous. Finally, the last step in FIG. 35G delivers the desired bucket, in this situation the first one, to the cell ‘A4’ 3442 holding the formula 3423 in FIG. 34A.

Our technology supports the use of each bucket value with its supporting data. The supporting data is all the data related to the bucket as exampled for the first bucket ‘0-999.99 . . . ’ 3527 in FIG. 35F having the associated data 3563 in FIG. 35A. As we will example later that associated data is usable in functional formulas referencing a cell populated with that bucket or in functional formulas containing the bucket function creating the bucket value. It includes, as exampled in 3563 in FIG. 35A, any column of the data not just the column used to create the bucket.

Figure 162A:
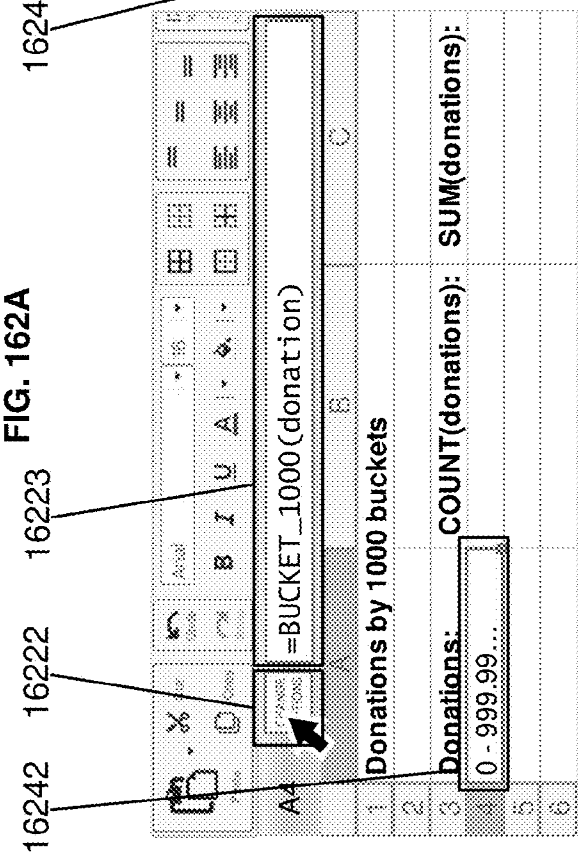
Figure 162B:
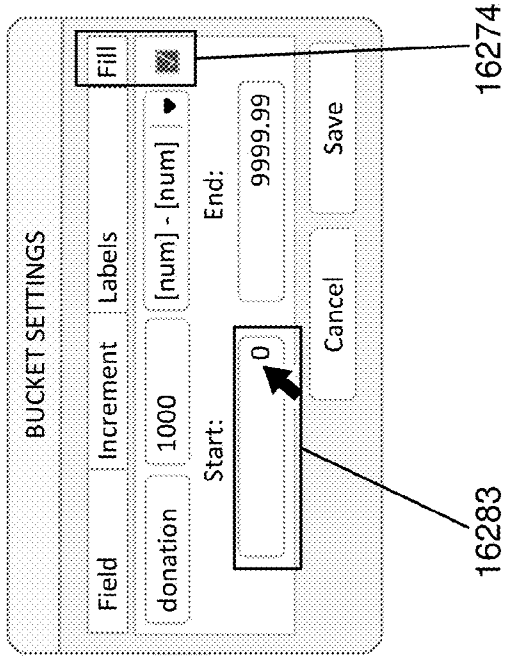
Figure 162C:
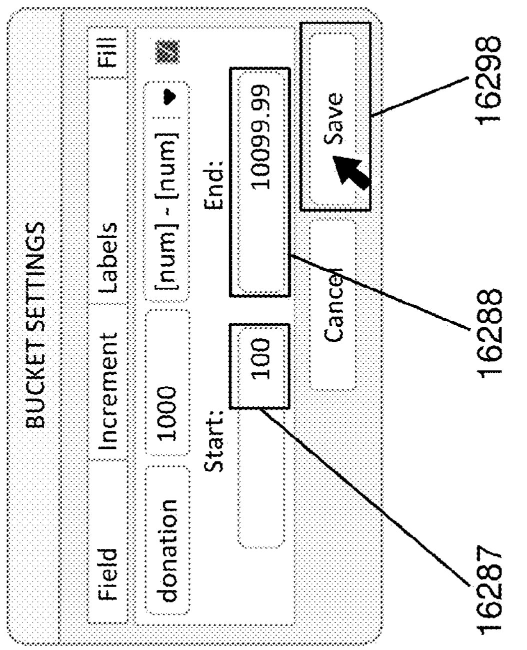
Figure 162D:
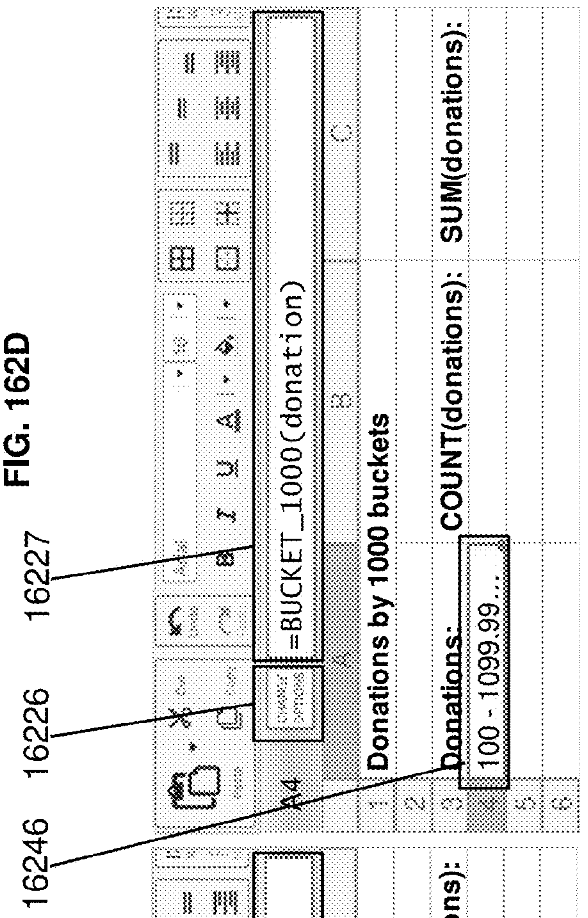

Our technology also supports the user specifying the bucket starting and ending points. FIG. 162A through FIG. 162D example the charity user setting the bucket starting and ending points. FIG. 162A examples the charity user creating the formula 16223 in cell ‘A4’ 16242 and in this embodiment all the automatically done settings of the start point, end point, label type and filling checked on as shown in FIG. 162B. The user decides they would like to change the starting and ending points of the buckets/groups so in this embodiment they click the ‘CHANGE OPTIONS’ button 16222 and to get the ‘BUCKET SETTINGS’ popup shown in FIG. 162B. The user then clicks into the ‘Start’ setting box 16283 which holds the automatically set value ‘0’. The user then changes that to ‘100’ 16287 in FIG. 162C which automatically triggers a ‘100’ value increase in the ‘End’ value to ‘10099.99’ 16288. In this example the user is fine with the new ‘End’ value, but had they wanted another value they could have changed it in 16288. The charity user is also fine with the other settings, so they click ‘Save’ 16298 to get the change in the bucket/group value ‘100-1099.99 . . . ’ in cell ‘A4’ 16246 in FIG. 162D. Which has changed from the value ‘0-999.99 . . . ’ in cell ‘A4’ 16242 in FIG. 162A. Because in this embodiment the bucket/group settings are in invisible arguments (see contemporaneously U.S. Application No. 63/337,576, titled “Methods and Systems for Spreadsheet Function and Flex Copy-Paste Control of Formatting and Use of Selection List Panels”) the formulas 16223 in FIG. 162A and 16227 in FIG. 162D are unchanged despite the user specified change. As later exampled our technology also supports bucket/group setting visual arguments.

In FIG. 34B the user specifies the bucketing/grouping increment value of ‘2000’ 3428 in the ‘BUCKET_X’ functional formula 3427. This functional formula automatically executes the illustrative steps in FIG. 37A through FIG. 37F. FIG. 37A examples the available data which as previously discussed could be stored in the spreadsheet or could be non-spreadsheet cell (NSC) external data. FIG. 37B shows that for this formula only the ‘donation’ data values are retrieved. FIG. 37C examples the sortation done to set up the creation of the groups/buckets in FIG. 37E. The lowest value ‘150’ 3727 does not equal an integer when divided by the bucket increment of 2000 and as shown in FIG. 37D. The first value below ‘150’ that fulfils that requirement is ‘0’ which becomes the bucket starting point in this example. The auto determined ending point in this embodiment is the last increment that captures the highest value, in this example ‘8000-9999.99 . . . ’ which captures the highest value of ‘9875’ 3786. FIG. 37F delivers the desired bucket, in this situation the first one, to the cell ‘A4’ 3446 holding the formula 3427 in FIG. 34B.

This method and other embodiments or implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features exampled across the different bucketing/grouping functions and capabilities can readily be utilized by those where the feature example is not repeated.

Single Value Bucketing/Grouping Functions—Incremental Copy Paste

FIG. 38A and FIG. 38B example how our single value bucket/grouping function with no filling supports what we call “incremental copy paste”. FIG. 38A starts with the formula 3823 and value 3842 in cell ‘A4’ as exampled in FIG. 34A and automatic steps shown in FIG. 35A through FIG. 35E. The charity user wants to see all the values, so they highlight cell ‘A4’ 3842 and clicks the ‘Copy’ button 3812 in the ribbon and then highlights in FIG. 38B the cells ‘A5’ to ‘A14’ 3876 clicking the regular ‘Paste’ button 3816 in the ribbon. This populates the values in 3876 having incremented through all the bucketing/grouping values and then added the three remaining cells 3886 in the paste area with ‘#NODATA!’ error messages.

FIG. 39A through FIG. 39E illustratively examples the automatically done steps by our technology supporting the copy paste. FIG. 39A examples the retrieved ‘donation’ values, while FIG. 39B sorts those values in preparation of the bucketing/grouping process. This step is conducted as previously described starting the first bucket at ‘0’ and using the function specified increment of ‘1000’ in ‘BUCKET_1000’ to give the ‘0-999.99 . . . ’ first bucket and then all the subsequent buckets with values until a last bucket/group of ‘9000-9999.99 . . . ’ fulfils the largest ‘donation’ value. Since the paste area includes three additional cells, FIG. 39D examples the addition of the three ‘#NODATA!’ error messages. FIG. 39E then formats the results for return to the cells ‘A5’ to ‘A14’ 3886 in FIG. 38B. Each of these non-erroneous values has a unique cell formula as exampled for cell ‘A5’ 3856 having the formula 3827:

‘=BUCKET_1000(donation{!*BT*_2})’

Wherein this embodiment the ‘{BT_2}’ shows that it is Bucket Term 2 with the number incrementing with additional values. In this embodiment the ‘donation’ in formula 3823:

‘=BUCKET_1000(donation)’ is the equivalent short version of donation{!BT_1}. Other argument syntaxes could be used to differentiate the bucket values in the formulas.

Single Value Bucketing/Grouping Functions—Flex Copy Paste

Our bucketing/grouping function technology supports more sophisticated versions of copy paste such as our ‘Flex’ copy paste exampled in FIG. 40A and FIG. 40B and disclosed in U.S. application Ser. No. 16/191,402. FIG. 40A examples the charity user copying the cell ‘A4’ 4042 then highlighting the paste area 4062. As you will see next the size of the paste area can be anything and only the direction matters because our Flex technology will determine the number of cells to be pasted. The user then clicks the ‘Paste’ button dropdown arrow 4016 as shown in FIG. 40B to get a dropdown list. The user clicks the ‘Flex’ option 4037 and our technology pastes the complete set of bucketing/grouping values 4076. This is automatically executed by executing the steps in FIG. 39A through FIG. 39C instead of FIG. 39D and FIG. 39E executing FIG. 39F. This fills only the cells with values ‘A5’ to ‘A11’ 4056 in FIG. 40B automatically stopping with the last value. In this embodiment these cells are then outlined in orange which identifies them as ‘BUCKET’ function cells instead of the usual blue identifying a flex copy paste area. However, they could have been blue or not color differentiated (as this is helpful identifier for users but not a necessary capability) for the flex copy paste to work.

Single Value Bucketing/Grouping Functions—Filling

Our technology has additional capabilities which can be optional specifications or default capabilities. A valuable capability for our charity user is automatically filling empty buckets which allows the user to put different variants of their analyses side-by-side ensuring all the groups line up despite different analyses having different missing groups. FIG. 41A through FIG. 45B examples one embodiment of our group/bucket filling capability as an optional specification which can be turned ‘ON’ or ‘OFF’, and how it works for incremental copy paste and FLEX copy paste. In other embodiments filling can be an automatically executed capability within bucketing/grouping.

Figure 41A:
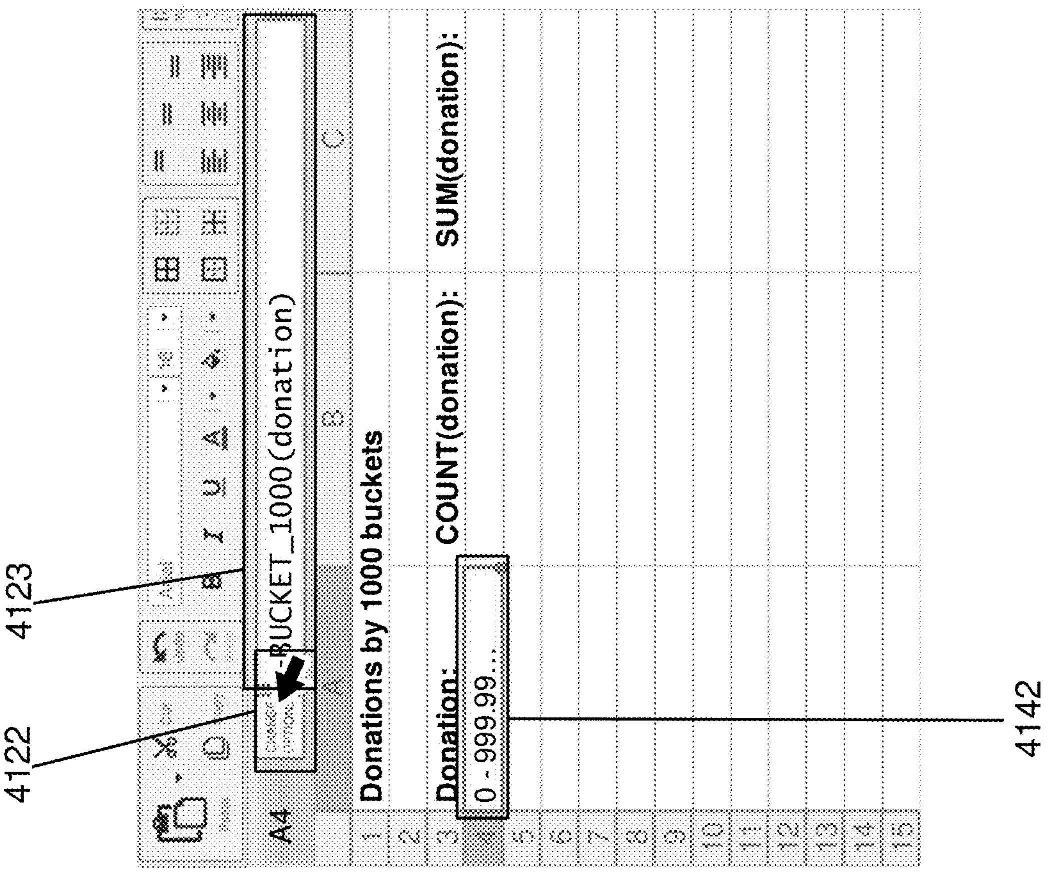
Figure 41B:
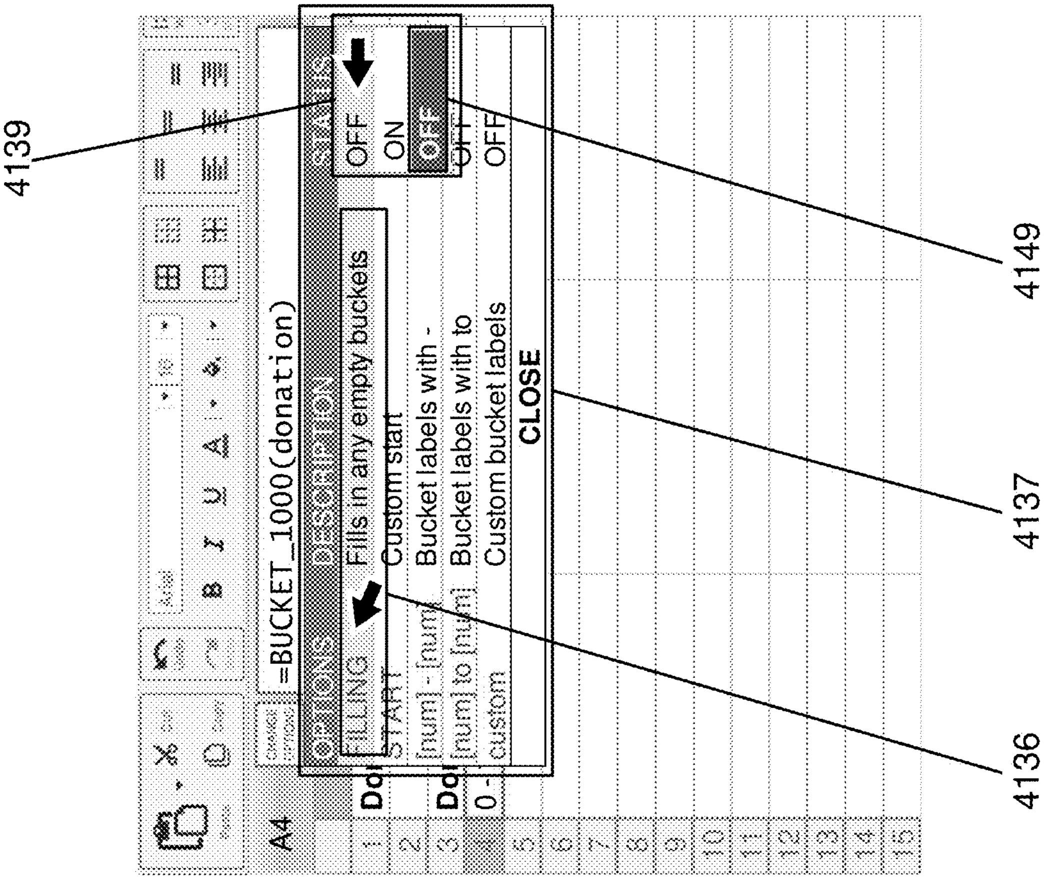
Figure 42B:
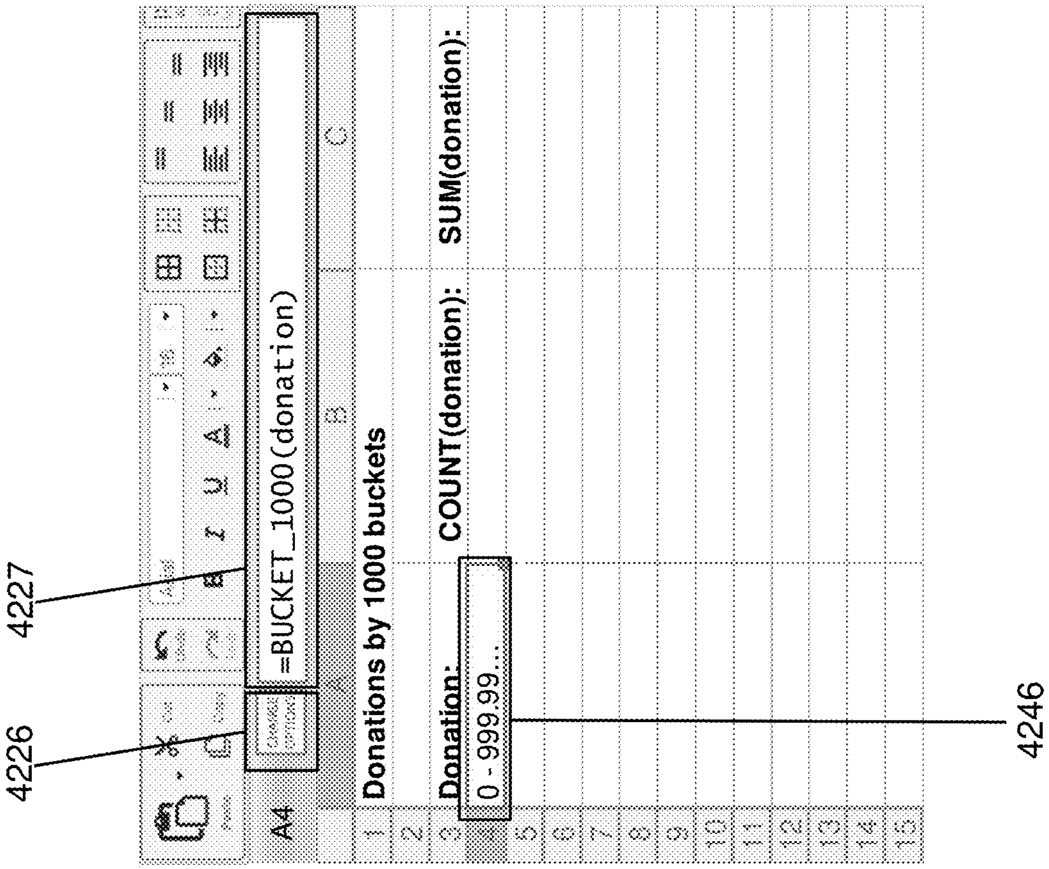
Figure 42A:
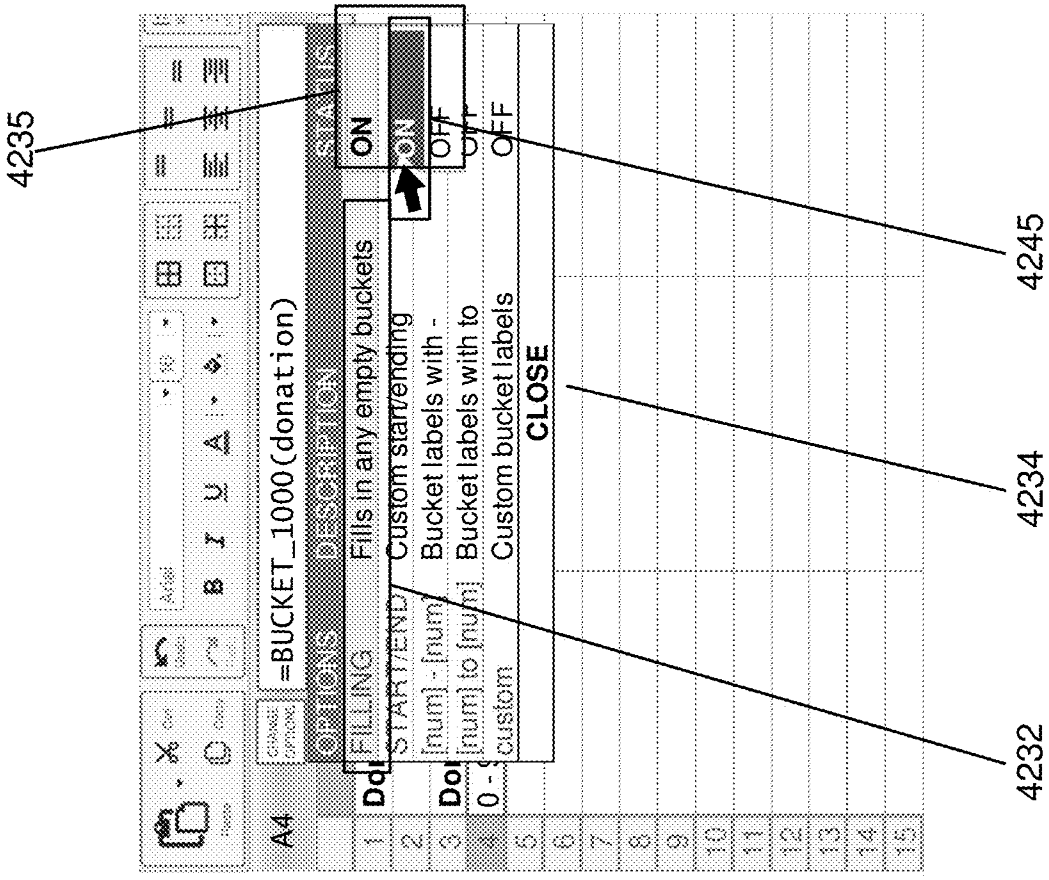
Figure 43A:
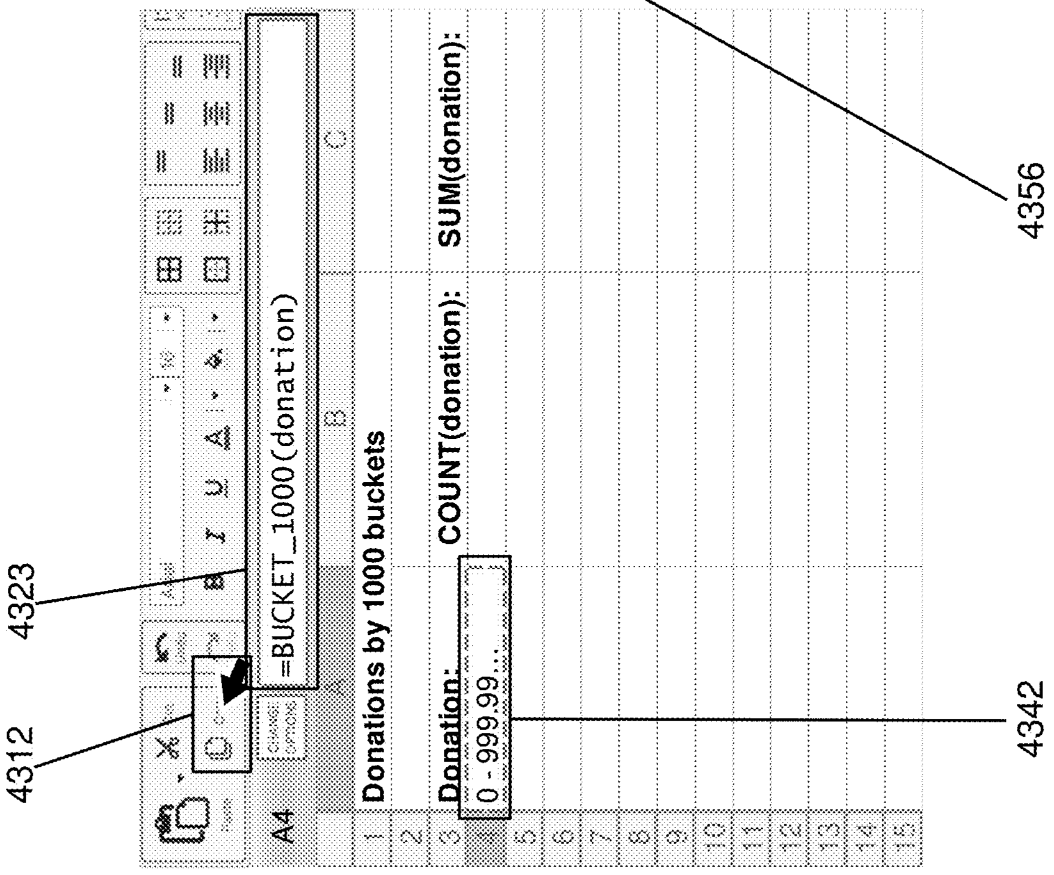
Figure 43B:
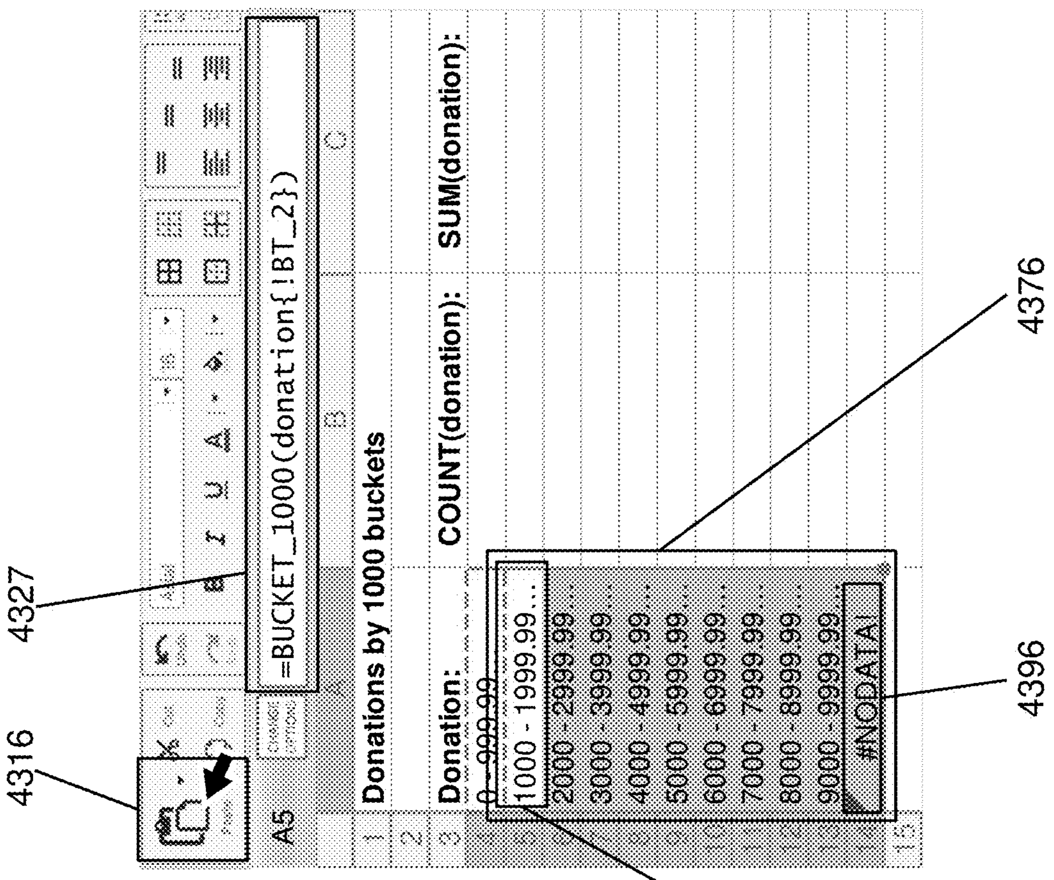

FIG. 41A examples a user of our specified interval bucketing/grouping function opting to turn on the filling capability. They are starting with the function formula 4123 and value 4142 with the no filling setting exampled in FIG. 38A through FIG. 40B. However, in this example the charity user clicks the ‘CHANGE OPTIONS’ button 4122 which opens a hint 4137 (per U.S. Provisional Patent Application No. 63/192,475. ADAP 1009-1 and contemporaneously per U.S. Application No. 63/337,576, titled “Methods and Systems for Spreadsheet Function and Flex Copy-Paste Control of Formatting and Use of Selection List Panels”) displaying the ‘BUCKET_1000’ ‘OPTIONS’. The user clicks on the ‘FILLING’ option 4136 that in this embodiment opens a selector dropdown 4139 displaying the current selection of ‘OFF’ 4149. This selector could be done many different ways but for this ‘ON’ and ‘OFF’ selection this is a simple and easy method. The user then click on the ‘OFF’ status 4139 opening the selection dropdown where they see the ‘OFF’ option 4149 currently selected. FIG. 42A examples the user clicking the ‘ON’ selection 4245 in the selector dropdown 4235 for ‘FILLING’ 4232 to get the result shown in FIG. 42B. Nothing looks different about the outcome in the value 4246 or the formula 4227 versus the starting point in FIG. 41A value 4142 and formula 4123. This is because the filling arguments are not displayed in the formula in this embodiment (although will be in other embodiments) and the filling does not change the first bucket shown value. However, the difference becomes readily apparent when the cell is copied and pasted as shown in FIG. 43A through FIG. 45B.

The charity user is going to repeat the copy paste process they did in FIG. 38A and FIG. 38 but with different outcomes. The user highlights cell ‘A4’ 4342 and clicks the ‘Copy’ button 4312 in the ribbon then highlights in FIG. 43B the cells ‘A5’ to ‘A14’ 4376 clicking the regular ‘Paste’ button 4316 in the ribbon. This populates the values in 4376 having incremented through all the bucketing/grouping values and then filled the one remaining cell 4396 (not three as in FIG. 38B 3886) with a ‘#NODATA!’ 4396 error message.

FIG. 44A through FIG. 44E illustratively examples the automatically done steps by our technology supporting the (incremental) copy paste. FIG. 44A examples the retrieved ‘donation’ values, while FIG. 44B sorts those values in preparation of the bucketing/grouping process. This step is conducted as previously described starting the first bucket at ‘0’ and using the function specified increment of ‘1000’ in ‘BUCKET_1000’ to give the ‘0-999.99 . . . ’ first bucket and then all the subsequent buckets with values until a last bucket/group of ‘9000-9999.99 . . . ’ fulfils the largest ‘donation’ value. However, the difference occurs in what is done in FIG. 44D where any missing buckets/groups, e.g., ‘4000-4999.99 . . . ’ 4437 and ‘7000-7999.99 . . . ’ 4447 are filled to complete the bucket/group progression (not done in FIG. 39D). Then the one additional cell is filled with a ‘#NODATA!’ error message. FIG. 44E then formats the results for return to the cells ‘A5’ to ‘A14’ 4376 in FIG. 43B. Like previously, each of these non-erroneous values has a unique cell formula as exampled for cell ‘A5’ 4356 having the formula 4327:

‘=BUCKET_1000(donation{!*BT*_2})’

Again, the ‘{BT_2}’ shows that it is Bucket Term 2 with the number incrementing with additional values. However, with the ‘FILLING’ optional specification setting of ‘ON’ there are more bucket/group values.

Figure 45A:
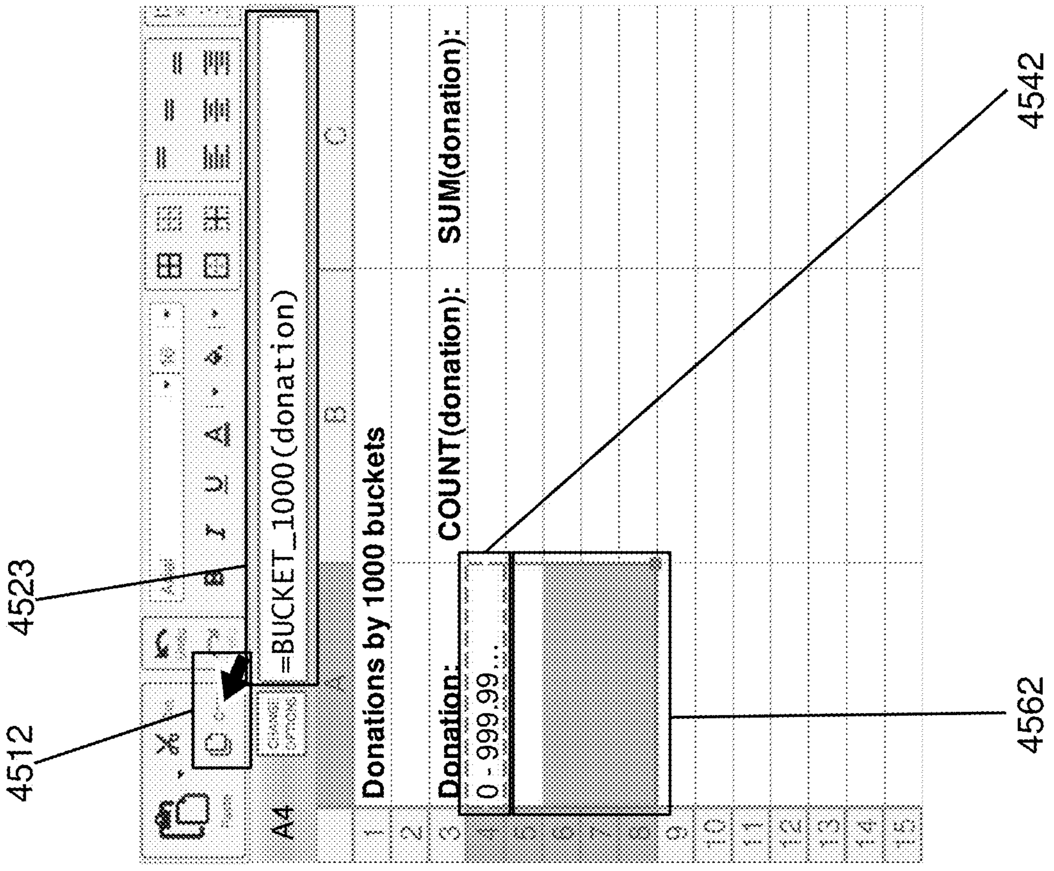
Figure 45B:
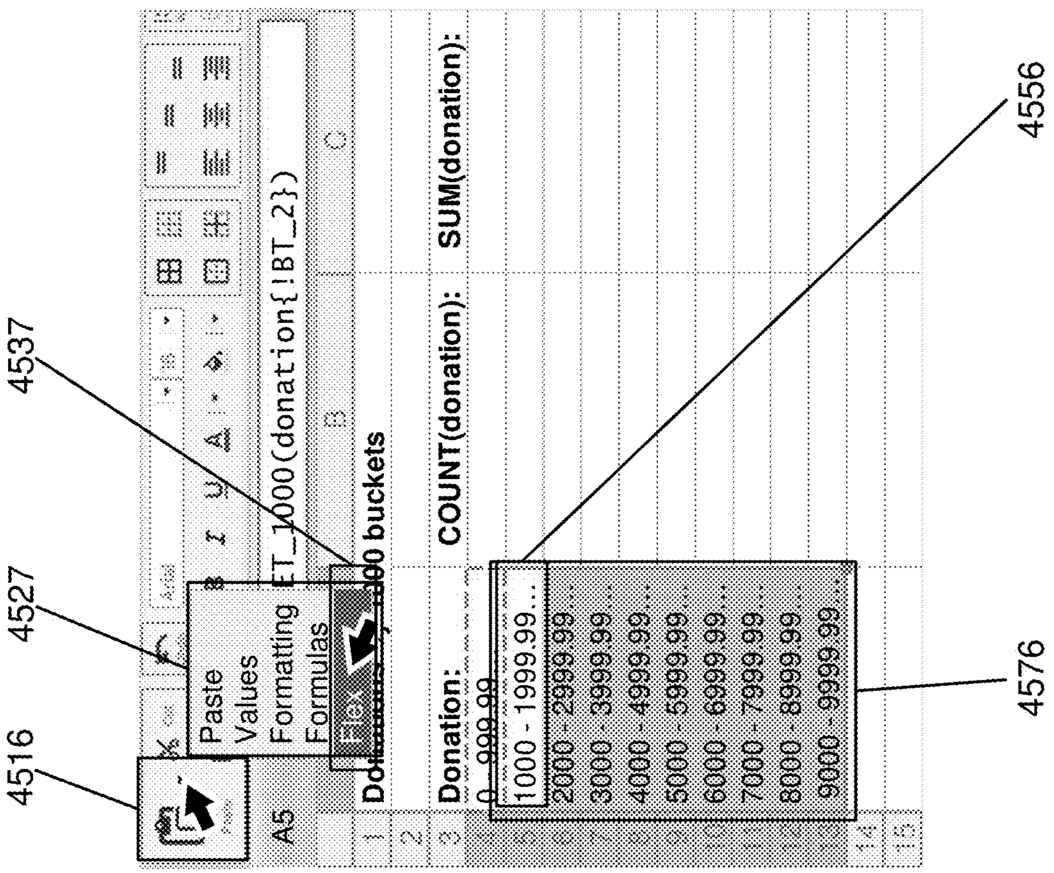
Figure 46B:
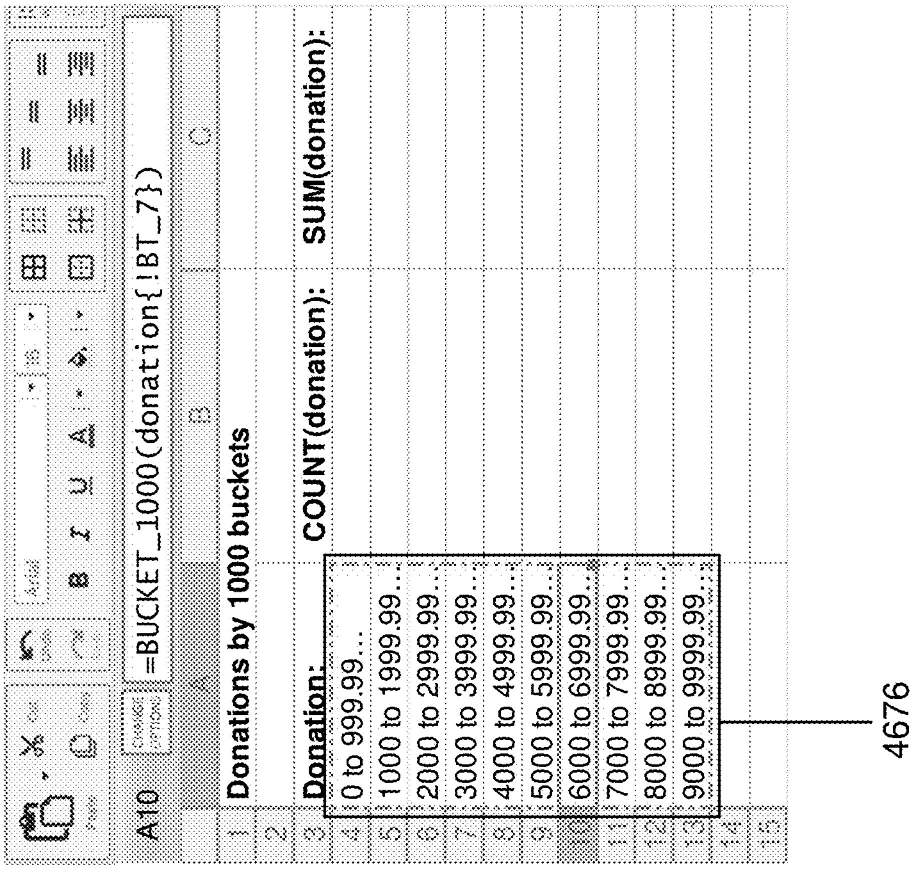
Figure 46A:
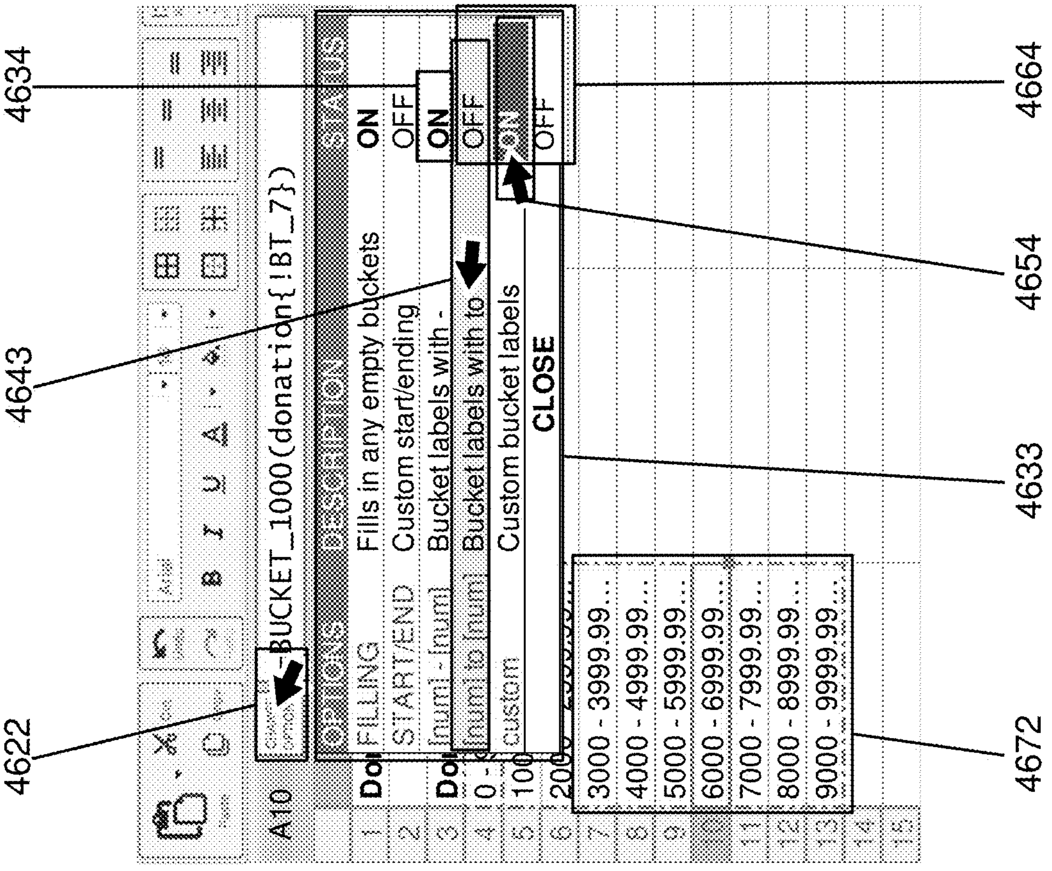

Our filling technology also works for ‘Flex’ copy paste as exampled in FIG. 45A and FIG. 45B. However, instead of getting seven pasted values as in 4076 FIG. 40B, the charity user gets nine pasted values 4576 FIG. 45B from what otherwise is an identical copy paste process by the user. They select cell ‘A4’ 4542, click copy 4512, select a paste area 4562, click the paste dropdown triangle 4516, select ‘Flex’ 4537 in the selections list 4527 to get the nine paste cells populated 4576. The automatically done illustrative steps by our application are shown in FIG. 44A through FIG. 44D and FIG. 44F. Thus, giving users easy ways to display the full set of buckets/groups.

Single Value Bucketing/Grouping Functions—Label Options

Our technology has additional capabilities supporting flexible usage by users. FIG. 46A through FIG. 47C example group/bucket labelling capabilities supported by our technology. We give users options to alter the labelling to meet their needs. Those options include alternative pre-specified options or a custom ability to create their own labels. In this embodiment the user initiates the change via the ‘CHANGE OPTIONS’ button 4622 although it could be initiated through the function argument hints, buttons, menus, or other methods. In the Options hint 4633 the user sees the pre-specified specification they want and clicks it 4643 opening the selector 4664 where the user clicks ‘ON’ 4654 which then will replace the ‘OFF’ triggering the change in the label for this cell and all its copy paste related cells 4676 shown in FIG. 46B (versus the previous labels 4672). It will also automatically change the ‘ON’ 4634 for the previous label selection to ‘OFF’. Our technology supports having more pre-specified options and different configurations of the selection process.

Figure 47C:
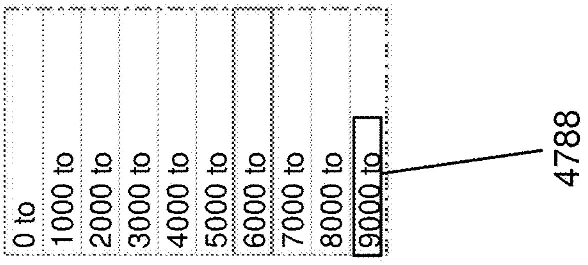
Figure 47B:
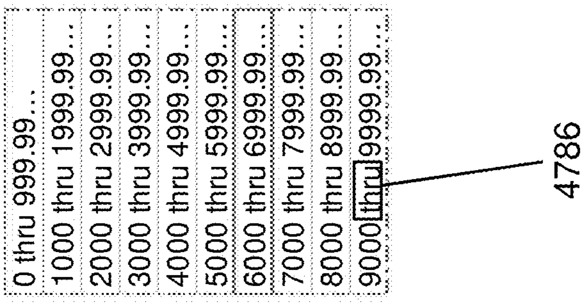
Figure 47A:
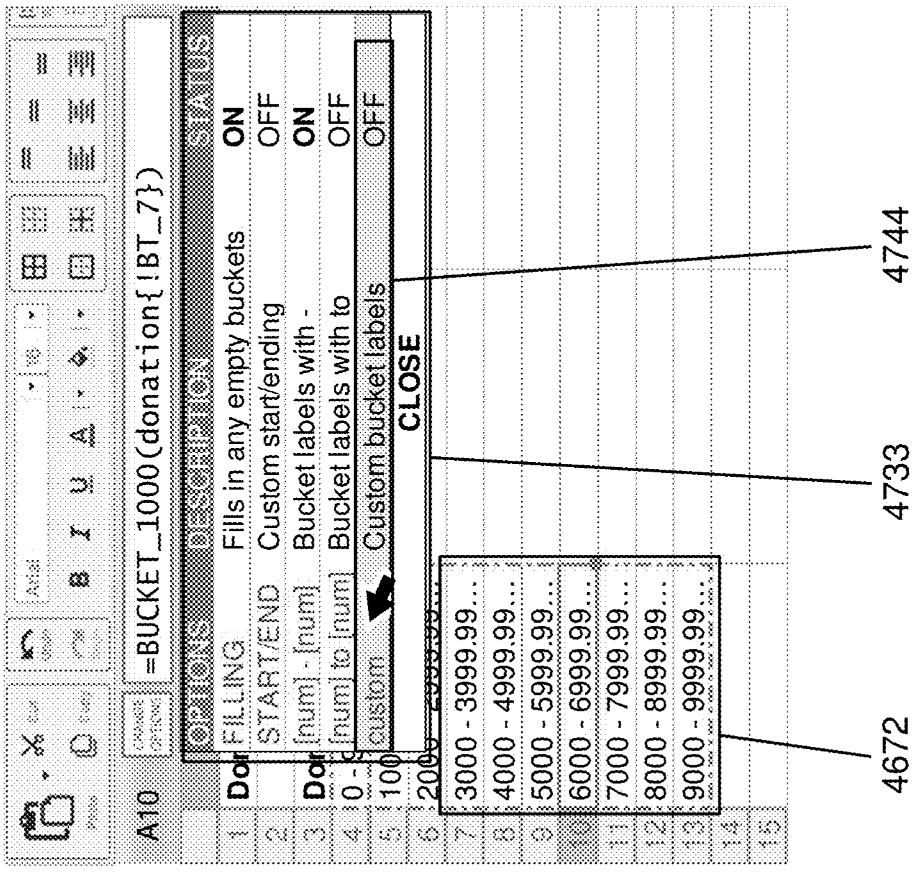

FIG. 47A through FIG. 47C example our technology giving user greater freedom to customize the labels to their choice. The user clicks the ‘custom’ optional specification 4744. That opens a UI where the user has many different alternative label configuration capabilities including specifying the word between the two label values of their choice allowing the charity user to specify ‘thru’ 4786 as exampled in FIG. 47B. FIG. 47C examples the outcome of another specification option where the user can go with a single ‘[num]’ numeric value preceded or followed by the word(s) or symbol(s) of their choice. Here the user selected to have the lead number followed by ‘to’ 4788. Thereby our technology allows users many ways to get a bucketing/grouping label of their choice and while these examples have been for numeric buckets/groups our technology supports similar flexibility in date or text buckets/groups.

Single Value Bucketing/Grouping Functions—Usable in Formulas Via Cell Reference

As described before each of our BUCKET function formulas has a usable formula that allows access to the underlying data for formulas. These formulas look and act like regular function formulas using our versions (which support formulaic data) of the same functions' users are familiar with. FIG. 48A through FIG. 50G example how regular cell 'SUM' and 'COUNT' functional formulas referencing cells containing our bucketed/grouped functional values use their associated data for their calculations. Then FIG. 51A through FIG. 53G example how regular cell SUM or COUNT functional formulas can use our bucket/group functional formulas (and their associated data) via cell reference or by direct formula inclusion to achieve the same outcome.

Figure 48A:
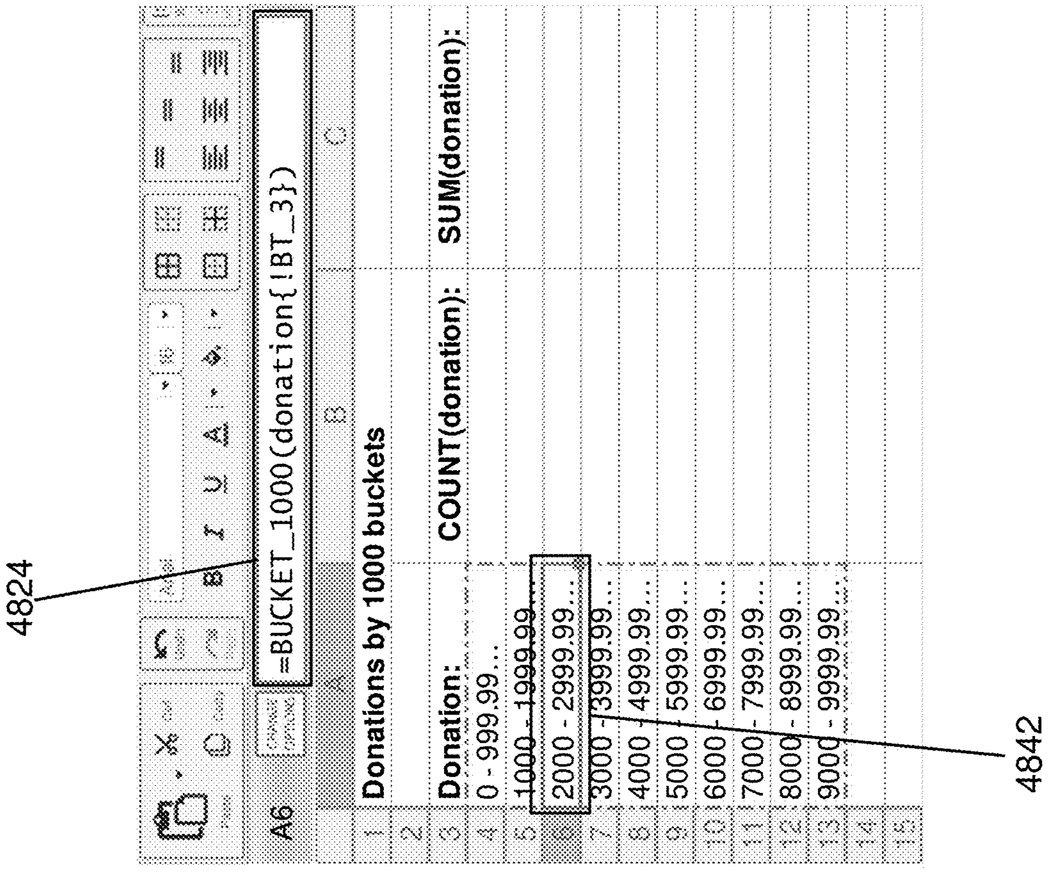
Figure 48B:
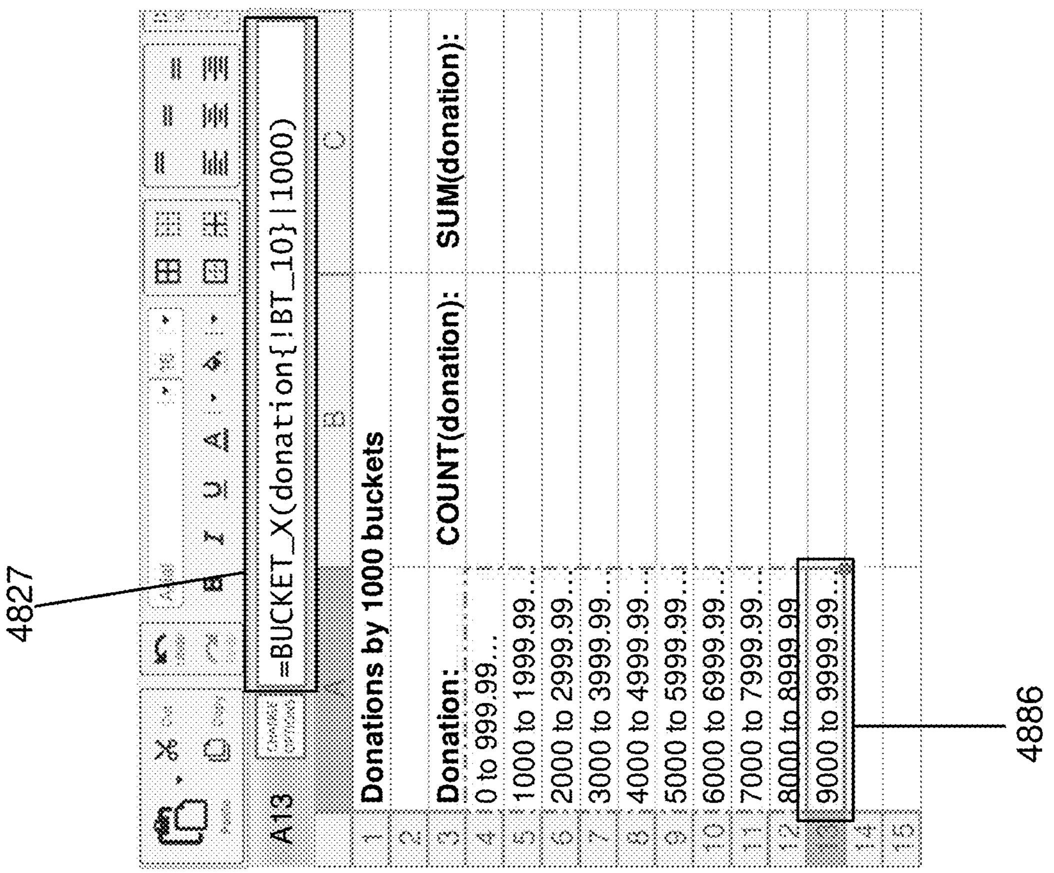

FIG. 48A and FIG. 48B example that each of the different variants of the single value bucketing/grouping function have formulas that allow other functions to access their formulaic data. In these embodiments those formulas are:

'BUCKET_1000(donation{!BT3})' 4824 for cell 'A6' 4842 in FIG. 48A

'BUCKET_X(donation{!BT10}|1000)' 4827 for cell 'A13' 4886 in FIG. 48B These formulas provide access to the bucket/group associated data.

Figure 49B:
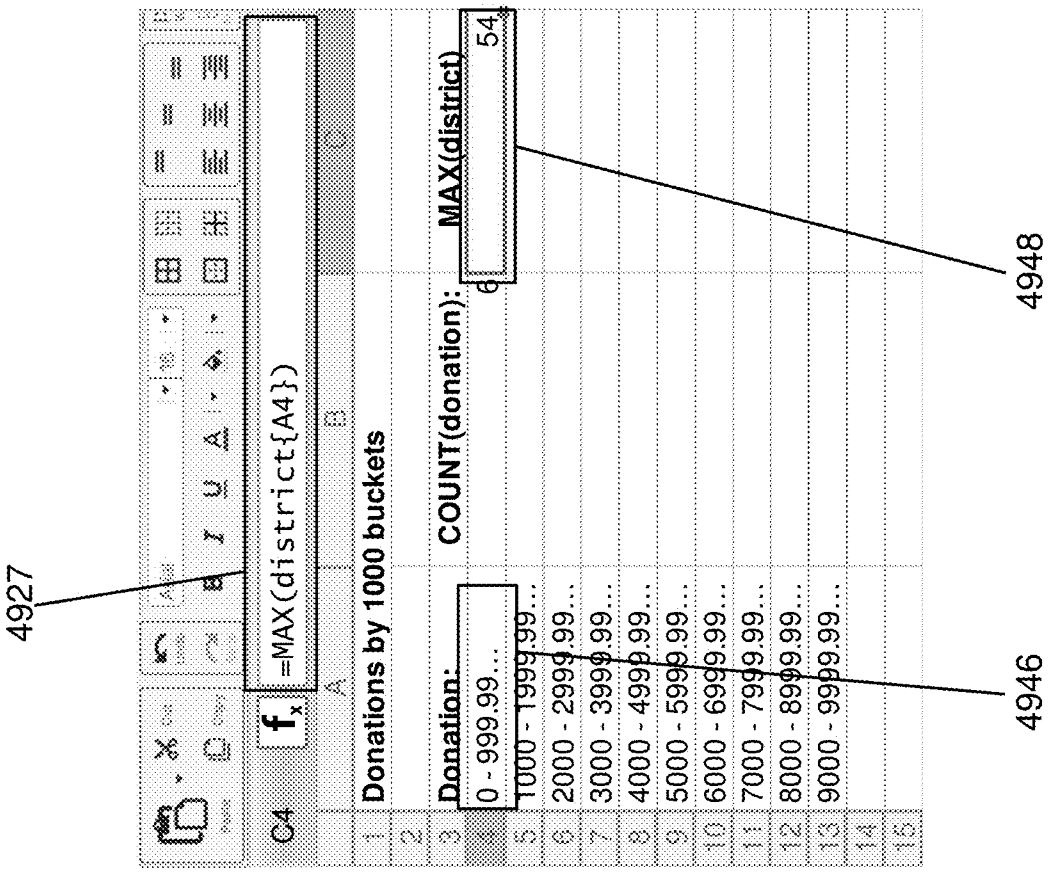
Figure 49A:
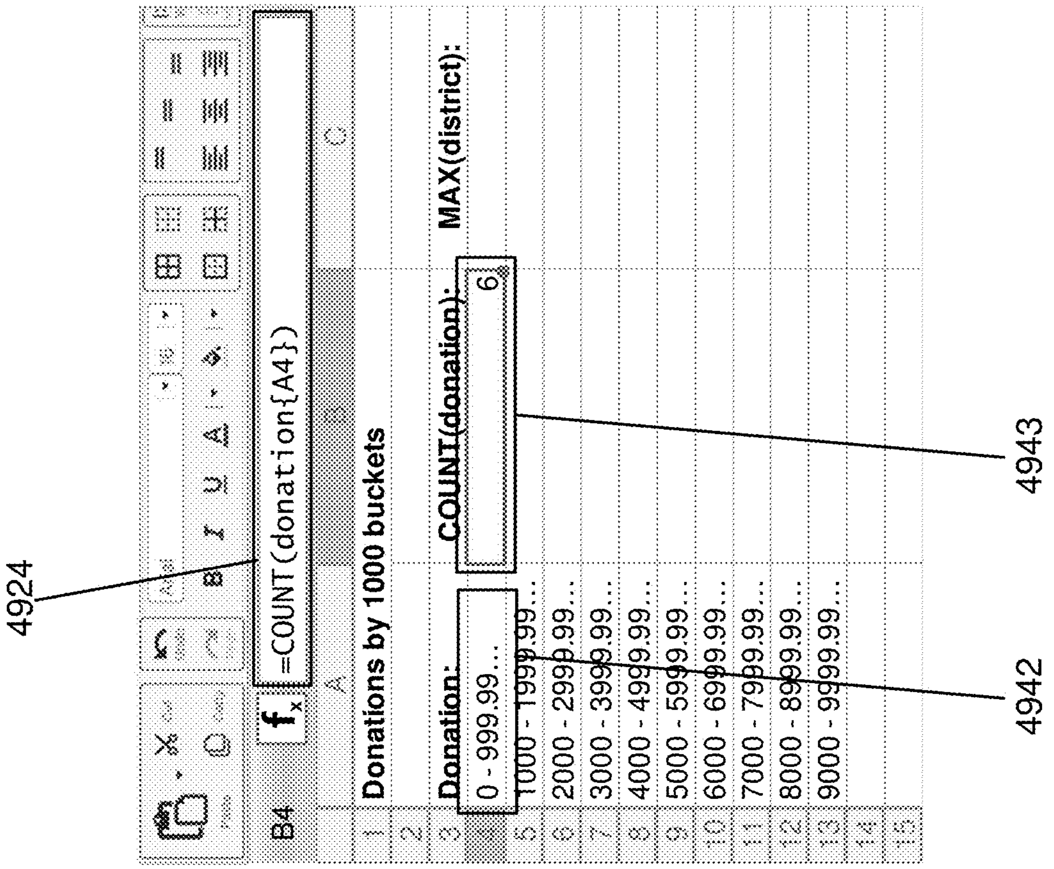

FIG. 49A examples the charity user using our formulaic data and the COUNT function to determine the number of donations in the first bucket '0-999.99 . . . ' in cell 'A4' 4942. To do so they create in cell 'B4' 4943 the formula 4924:

'=COUNT(donation{$A4$})'

That formula accesses the bucketed/grouped data in cell 'A4' 4942 to arrive at the count of '6' 4943 as exampled in FIG. 50A through FIG. 50D. FIG. 50A examples the formulaic data available with FIG. 50B illustratively exampling the data supplied by argument 'donation{A4}' which gets the bucketed/grouped data from our 'BUCKET' function formula in cell 'A4'. Note, this is the field/column of data from which the buckets are created but had the user specified a different field (e.g., 'district' in the associated data) the formula would have worked as shown next. FIG. 50C examples the 'COUNT' function counting the number of numeric values to get '6'. FIG. 50D then formats the result and returns it cell 'B4' 4943 in FIG. 49A.

FIG. 49B examples the charity user using our formulaic data and the MAX function to determine the highest (max) number of the district in the first bucket '0-999.99 . . . ' in cell 'A4' 4946. To do so they create in cell 'C4' 4948 the formula 4927:

'=MAX(district{$A4$})'

That formula accesses the bucketed data in cell 'A4' 4942 to arrive at the max of '54' 4948 as exampled in FIG. 50A and FIG. 50E through FIG. 50G. FIG. 50A examples the formulaic data available with FIG. 50E illustratively exampling the data supplied by argument 'district{A4}' which gets the bucketed/grouped data from our 'BUCKET' function formula in cell 'A4' for the field district. Note this is not the field that the data was bucketed on but associated data for that first bucket. FIG. 50F examples the 'MAX' function determining the max value to get '54'. FIG. 50G then formats the result and returns it cell 'C4' 4948 in FIG. 49B. The user has been able to write a normal looking MAX formula using a formulaic data argument to employ the bucketed/grouped values for the '0-999.99 . . . ' bucket in our technology.

Single Value bucketing/Grouping Functions—Usable in Formulas Directly

Figure 51A:
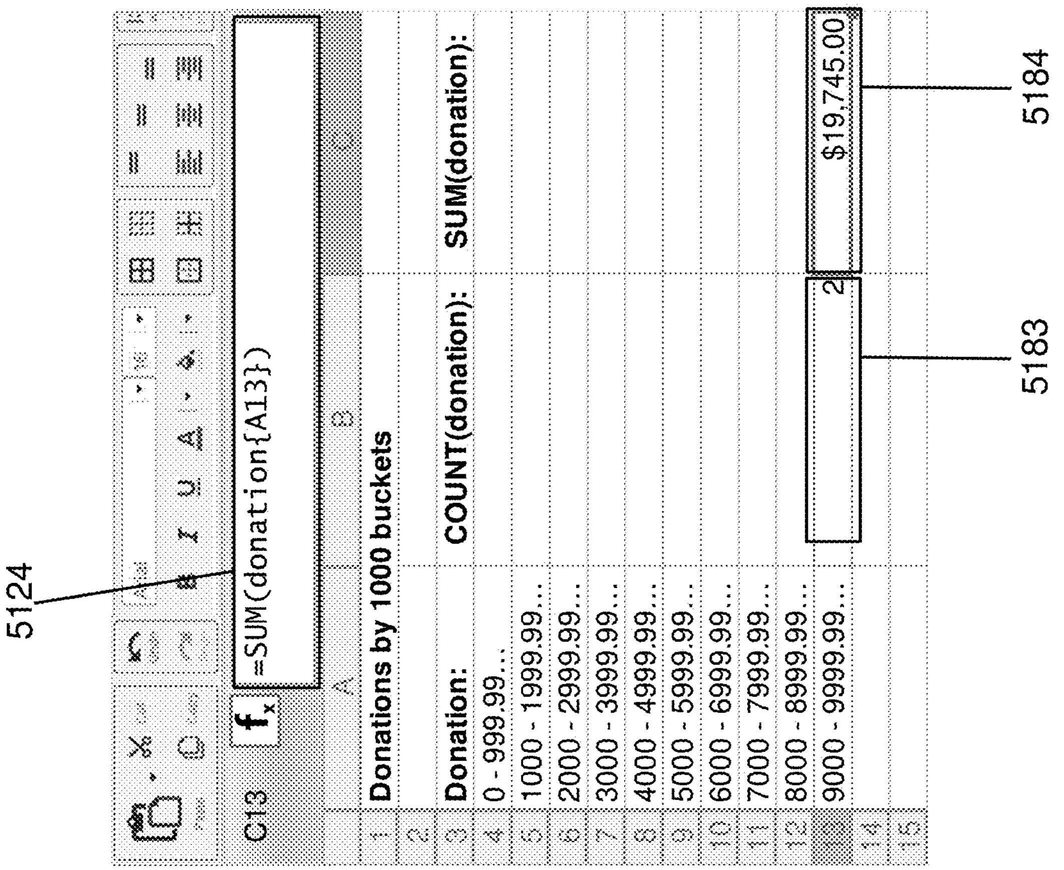
Figure 51B:
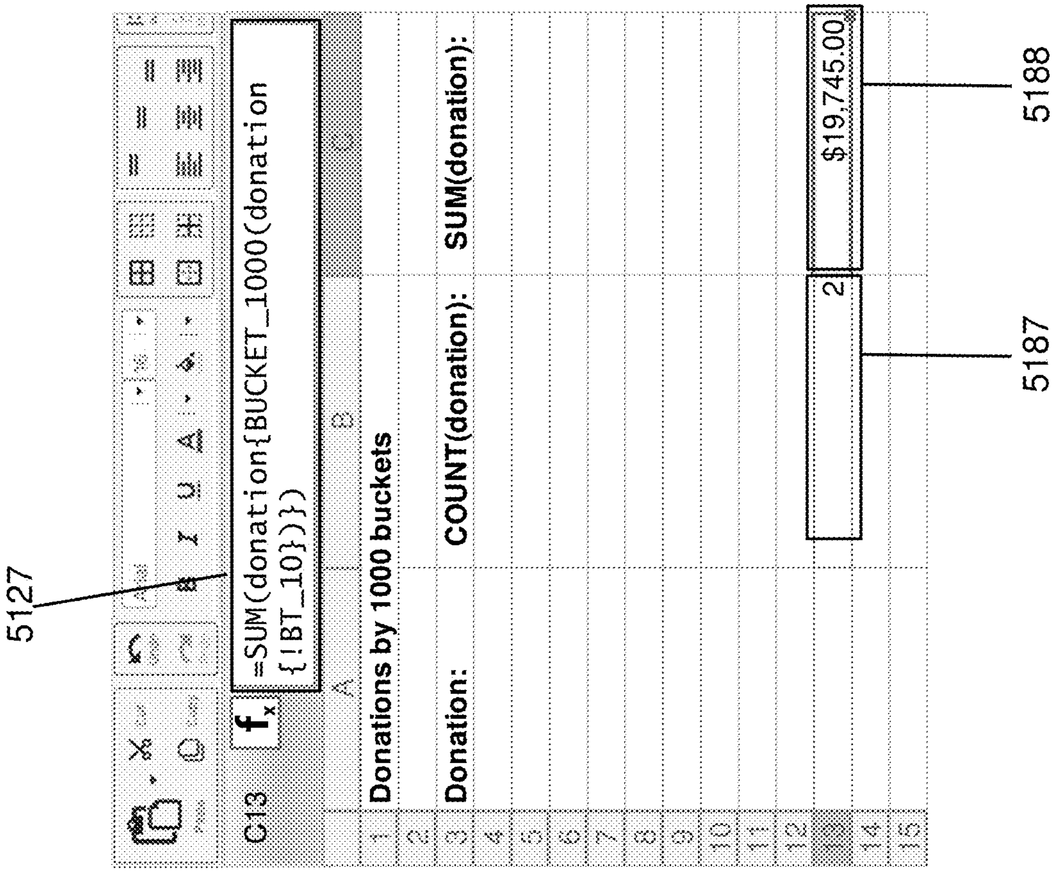

FIG. 51A and FIG. 51B example how the charity user can use our bucketing/grouping technology directly in a formula to get the same result as referencing it in a cell. FIG. 51A shows the 'COUNT' and 'SUM' bucketed calculation results using the cell referencing approach previously described with the cell referencing 'SUM' formula 5124 giving the result '$19,745.00' 5184 in cell 'C13'. FIG. 51B examples our technology producing the same result of '$19,745.00' 5188 in cell 'C13' however with a formula referencing no other cell. Instead, the 'BUCKET' function with the desired value is directly inputted into the formula 5127:

'=SUM(donation{BUCKET_1000(donation{!$BT10$})
})'

FIG. 52A through FIG. 54F example the automatically done calculations for those SUM and COUNT calculations done with and without cell references. No surprise there is little difference in them, and they yield the same answers. FIG. 52A through FIG. 52D example using the cell reference approach to do the 'COUNT' calculation for the tenth bucket/group and return the value of '2' to FIG. 51A cell 'B13' 5183. FIG. 52A and FIG. 52E through FIG. 52G example using the cell reference approach to do the 'SUM' calculation for the tenth bucket/group and return the value of '$19,745.00' to FIG. 51A cell 'C13' 5184. FIG. 53A through FIG. 54C example using the direct in cell use of the 'BUCKET' function to do the 'COUNT' calculation for the tenth bucket/group and return the same value of '2' to FIG. 51B cell 'B13' 5187. The big difference relative to the cell reference version is where the "BUCKET" steps FIG. 53A through FIG. 53E are done. In this situation they are done in this cell and therefore included in the steps done by the formula and in the cell reference version they are done in the cell referenced and therefore not shown in the cell calculation. The result is the same and it is just a situation of where the steps are done. FIG. 53A through FIG. 53E and FIG. 54D through FIG. 54F example using the direct in cell use of the 'BUCKET' function to do the 'SUM' calculation for the tenth bucket/group and return the value of '$19,745.00' to FIG. 51B cell 'C13' 5188. Like in the COUNT example the SUM example is also indicative of where the BUCKET function work is done. As exampled, our technology supports cell reference or in formula use of our single value bucketing/grouping functions.

Single Value Bucketing/Grouping Functions—Usable in Formulas Copy Paste

We previously exampled how our single value bucketing/grouping functions worked for different types of copy paste. We will now example how our technology supports copy paste of formulas referring to cells containing our single value bucketing/grouping functions as well as formulas containing our single value bucketing/grouping function within another function formula.

FIG. 55A through FIG. 56E examples our technology supporting regular copy paste of a single bucket function cell formula and functional formulas referencing that cell. In this example the charity user starts with the 'COUNT' and 'SUM' formulas created like those in FIG. 51A with their referenced cell 'A4' holding a single value bucketing/grouping function. They then highlight the three cells 'A4' through 'C4' 5543 and then clicking 'Copy' 5512 followed by highlighting the paste rows of cells 'A5' to 'B13' 5572.

The user then triggers the normal paste by clicking the 'Paste' button 5516 to fill the values in cells 'A5' to 'C13' 5577. This also fills the formula in cell 'A5' which is visible in the formula bar 5527 showing the second bucket value of the 'BUCKET_1000 function. The user has gotten the full set of buckets/groups and the donation counts and sums for each of the buckets/groups. FIG. 55A through FIG. 56E illustratively examples the steps to execute that copy paste which starts by generating the bucket values as shown in FIG. 53A through FIG. 53E which are then used in FIG. 56A to retrieve the associated data in FIG. 56B needed for the calculations. The 'COUNT' calculations are then done in FIG. 56C followed by the 'SUM' calculations in FIG. 56D before sending in FIG. 56E the formatted values to cells 'B5' to 'C13' 5577 in FIG. 55B.

Our technology supports regular paste where the single value bucketing/grouping function is used directly within a functional formula. FIG. 180A and FIG. 180B examples our technology supporting copy paste of functional formulas with direct formula inclusion of our single value bucketing/grouping functions. For this example, the charity user starts with the situation previously discussed in FIG. 51B, a 'COUNT' and a 'SUM' function formula each using an in-formula 'BUCKET_1000' function. The user then copies 18022 the cells 'B13' and 'C13' 18084 upward into the area 18068 shown in FIG. 180B. They then click the ribbon paste button 18016 to paste the cell 'B4' to 'C12' 18078 shown in FIG. 180B. The formula 18027 shown in the formula bar for cell 'B12' 18087 examples one of the flex copy pasted formulas including the 'BUCKET_1000(donation[BT-9})' function formula within the larger formula. FIG. 59A through FIG. 60D illustratively examples the steps taken by our app to first calculate the 'BUCKET' values and then to use them to calculate the overall values for the copy pasted cell formulas. FIG. 59A through FIG. 59E calculates all the different "BUCKET_1000' 'donation' values including doing the filling of the missing buckets as exampled by retrieving the data in FIG. 59B, sorting the donation values in FIG. 59C, creating the buckets in FIG. 59D and filling the buckets in FIG. 59E. FIG. 60A through FIG. 60D then uses those bucketed values to retrieve the 'donation values matching the buckets in FIG. 60A, then does the 'COUNT' calculations in FIG. 60B, does the 'SUM' calculations in FIG. 60C before formatting the values in FIG. 60D and sending the values to cells 'B4' to 'C12' 18068 in FIG. 180B.

Single Value Bucketing/Grouping Functions—Usable in Formulas Flex Copy Paste

FIG. 57A and FIG. 57B examples our technology supporting flex copy paste of a single bucket function cell formula and functional formulas referencing that cell. In this example the charity user again starts with the 'COUNT' and 'SUM' formulas like those in FIG. 51A with their referenced cell 'A4' holding a single value bucketing/grouping function. They then highlight the three cells 'A4' through 'C4' 5743 clicking 'Copy' 5712 followed by highlighting the paste rows of cells 'A5' to 'A8' 5752. As mentioned previously the size of this area does not matter as the Flex paste will determine the size. The user then triggers the Flex paste by clicking the 'Paste' type selector triangle 5716 to get the dropdown with the paste specification options 5727. The user then clicks the 'Flex' option 5737 to fill the values in cells 'A5' to 'C13' 5777. In this embodiment this also changes the outline to blue indicating this is a flex-controlled area connected to the flex copy pasted BUCKET formula in cells 'A4; to 'A13' 5776. The user has gotten the full set of donation counts and sums for each of the buckets/groups and the cells occupied with the calculations will flex with the number of buckets/groups in column A. FIG. 53A through FIG. 53E and FIG. 55A through FIG. 56E illustratively examples the steps to execute that flex copy paste because those steps completely fill the flex space. They begin generating the bucket values as shown in FIG. 53A through FIG. 53E which are then used in FIG. 56A to retrieve the associated data in FIG. 56B needed for the calculations. The 'COUNT' calculations are then done in FIG. 56C followed by the 'SUM' calculations in FIG. 56D before sending in FIG. 56E the formatted values to cells 'A5' to 'C13' 5777 in FIG. 57B. In this embodiment the blue outlining of the entire flex copy paste area is shown as a helpful indicator to the user that this area is flex copy paste connected. In a different embodiment that outlining could have been the orange color used in many examples for the bucket/group functions, thereby indicating that all the cells are connected to bucket/group functions.

Our technology supports regular and flex copy paste where the single value bucketing/grouping function is used directly within a functional formula. FIG. 58A through FIG. 60D examples our technology supporting Flex copy paste of functional formulas with direct formula inclusion of our single value bucketing/grouping functions. For this example, the charity user starts with the situation previously discussed in FIG. 51B, a 'COUNT' and a 'SUM' function formula each using an in-formula 'BUCKET_1000' function. The user then copies the cells 'B13' and 'C13' 5884 upward with the area 5883 recognizing the size of the area does not matter. They then click the ribbon paste button dropdown arrow 5811 selecting 'Flex' 5832 to trigger the flex paste to the cells 'B4' to 'C12' 5878 shown in FIG. 58B. The formula 5827 shown in the formula bar for cell 'B12' 5887 examples one of the flex copy pasted formulas including the 'BUCKET_1000(donation[BT-9})' function formula within the larger formula. FIG. 59A through FIG. 60D illustratively examples the steps taken by our app to first calculate the 'BUCKET' values and then to use them to calculate the overall values for the copy pasted cell formulas. FIG. 59A through FIG. 59E calculates all the different "BUCKET_1000' 'donation' values including doing the filling of the missing buckets as exampled by retrieving the data in FIG. 59B, sorting the donation values in FIG. 59C, creating the buckets in FIG. 59D and filling the buckets in FIG. 59E. FIG. 60A through FIG. 60D then uses those bucketed values to retrieve the 'donation values matching the buckets in FIG. 60A, then does the 'COUNT' calculations in FIG. 60B, does the 'SUM' calculations in FIG. 60C before formatting the values in FIG. 60D and sending the values to cells 'B4' to 'C12' 5868 in FIG. 58B. The user could have used a regular paste in which case the outlined paste space would matter and be filled with as many values as possible and as previously exampled filled with ' #NODATA!' once all the calculated values were exhausted.

Single Value Bucketing/Grouping Functions—Constraints/Filters

Figure 61A:
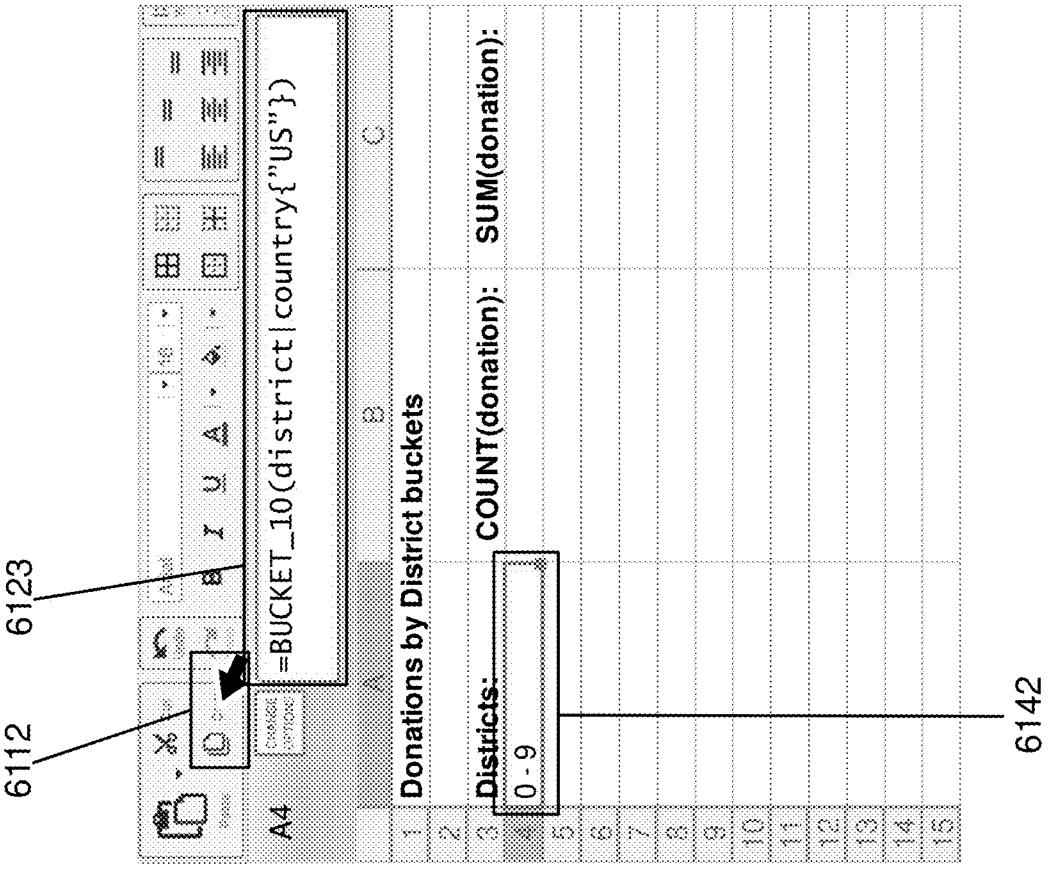
Figure 61B:
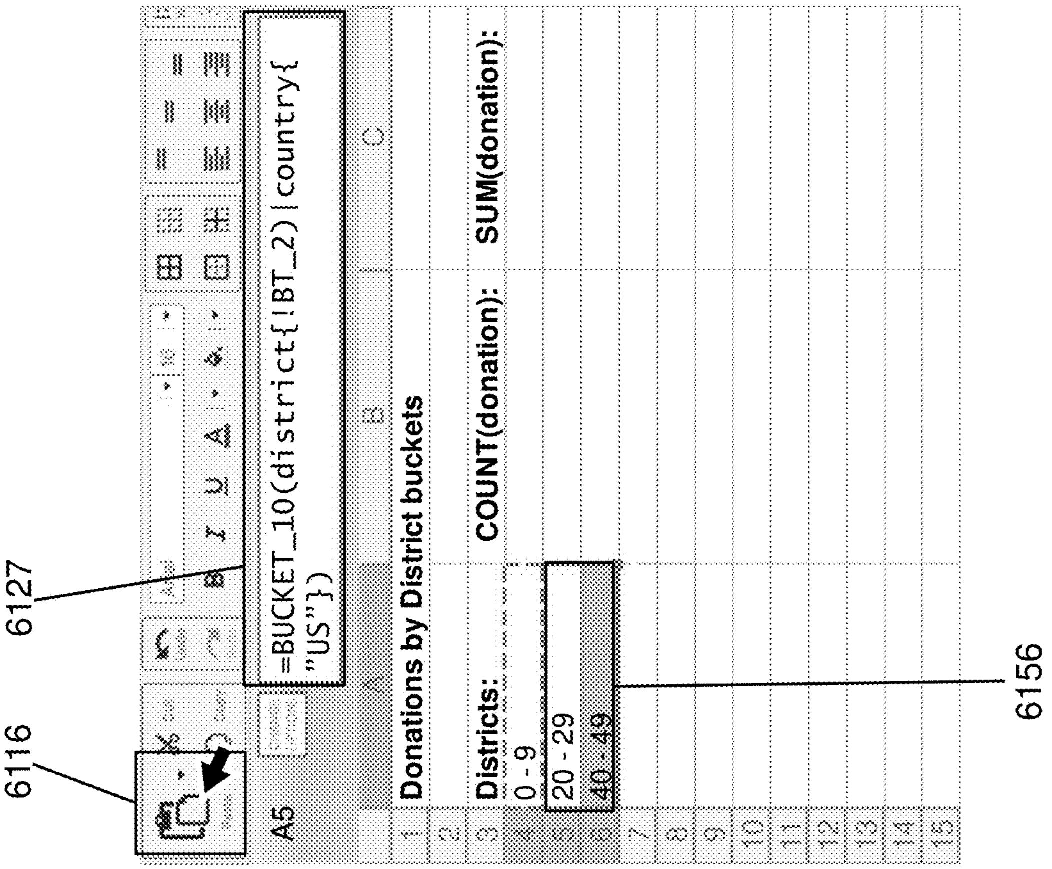

FIG. 61A through FIG. 62I example our single value bucketing/grouping function technology supporting constraints/filters in generating values and generating values through copy paste. FIG. 61A examples the charity users looking to analyze donation performance by geographic district buckets within the 'US'. To do so they created the bucket formula 6123:

'=BUCKET_10(district|country{"US"})'

Where the second argument group 'country{"US"}' is the constraint/filter.

FIG. 62A through FIG. 62F illustratively examples the automatically executed steps by our technology to deliver the value of '0-9' 6142 in FIG. 61A The steps start with the data retrieval in FIG. 62B, then the values constrained to only the 'US' in FIG. 62C (removing Canada data), followed by sorting of the district values in FIG. 62D, auto determination of the starting point in FIG. 62E, auto determination of the ending point in FIG. 62F, creation of the buckets/groups in FIG. 62G and the formatting of the value in FIG. 62H for return to cell 'A4' 6142 in FIG. 61A. Note in this example the user has no filling which becomes apparent in the copy paste done in FIG. 61B. Here the user clicks the copy button 6112 and then highlights cells 'A5' and 'A6' 6156 in FIG. 61B. They then click the paste button 6116 (or could have instead hit control v) to get the two values 6156 with the formula 6127 for cell 'A5' visible in the formula bar. The automatically executed steps for this copy paste parallel the previous steps in FIG. 62A through FIG. 62H except step FIG. 62H is replaced by the step in FIG. 62I returning the two values to cells 'A5' and 'A6' 6156 in FIG. 61B. Our technology supports additional constraints/filters, e.g., a date range, but the user here only wanted to limit the buckets and the fields that use them through a single constraint/filter of the 'US'.

Single Value Bucketing/Grouping Functions—Auto Rounded Labels

FIG. 61A through FIG. 62I exampled an additional capability of our technology, auto rounded numeric labels. More specifically our labels automatically communicate to a user the correct range of values. As previously mentioned, our labels are not confusing like "1000-2000" followed by "2000-3000" which does not clearly identify where value 2000 went. So, we do something that makes it clearer like "1000-1999.99 . . . ' followed by "2000-2999.99 . . . '. However, our technology also recognizes when all the values are integers, as in FIG. 61A through FIG. 62G, and therefore automatically does '0-9' 6142 instead of "0-9.99 . . . " which also lets the user know all the values are integers rather than reals. As described before our technology auto sets the starting and ending point. In this embodiment our technology determines the closest number equal to or below the first data point that when divided by the bucket increment delivers an integer value. The lowest value '1' in FIG. 62D when divided by the bucket increment of 10 does not equal an integer (0.1) and as shown in FIG. 62E '$1/10$=0.1'. The first value below '1' that fulfils that requirement is '0' which becomes the bucket starting point in this example. The auto determined ending point in this embodiment is the last increment that captures the highest value, in this example '40-49' which captures the highest value of '47' in FIG. 62D with the value '49' shown in FIG. 62F.

Figure 63B:
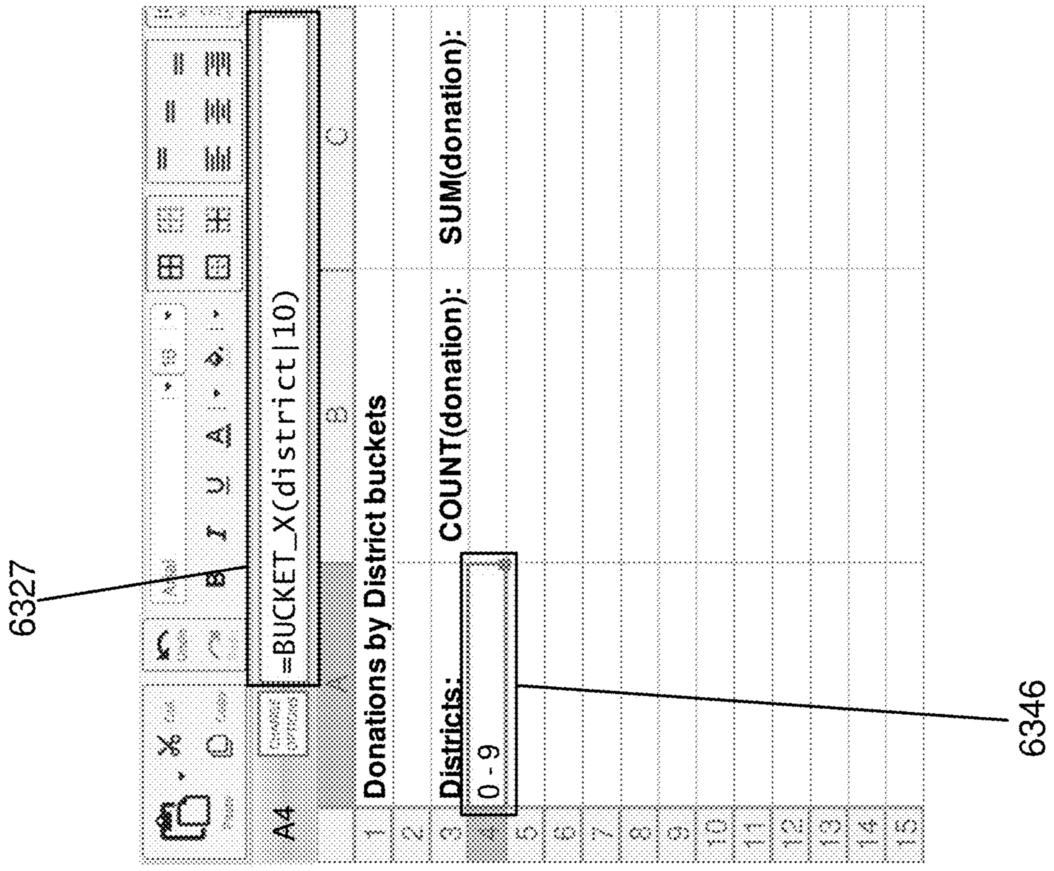
Figure 63A:
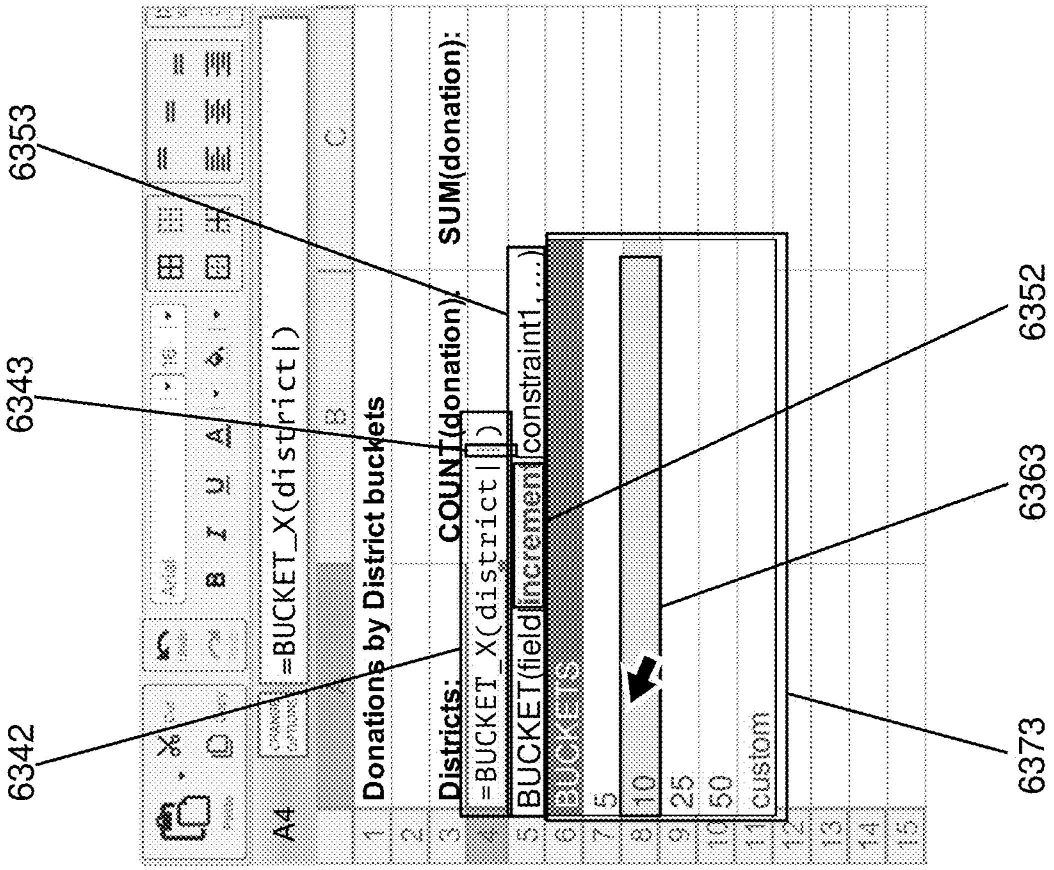

Single Value Bucketing/Grouping Functions—Intelligent Bucketing/Grouping Options FIG. 63A through FIG. 64E example another capability supported by our technology, an intelligent presentation of bucketing/grouping options to users of only relevant options. In this embodiment the definition of relevant is such that it would result in two or more buckets and generates buckets different than the values themselves eliminating all specifications that would result in one or no relevant buckets/groups or buckets/groups no different than the values themselves. FIG. 63A examples the charity user creating a 'BUCKET_X' functional formula where the cursor 6343 is in the second argument group that is for specifying the bucket increment 6352. This exposes the Hint 6373 which contains intelligently selected options. Specifically, only those optional specifications which will give two or more buckets/groups or buckets/groups that are different than the un-bucketed/ungrouped data (i.e., have at least one bucket/group that groups more than one unique value). FIG. 64C examples the specifications presented and the next specifications both directions rejected (smaller and larger values). The '0.1' option is rejected because it all the values are integers and it is not an integer increment as well as it would not generate any real buckets, meaning combinations of values. The '1' option is not presented because it does not create any buckets/groups combining unique values. The '5', '10' and '25' are presented because they generate two or more buckets/groups (combining values) while the '50' and any higher option are not presented because they would result in only one bucket/group. When the user clicks '10' 6363 it delivers the result '0-9' 6346 in cell 'A4' populating the '10' in the formula 6327 in FIG. 63B. All the steps delivering these changes are illustratively exampled in FIG. 64A through FIG. 64E.

As we will example later this capability works for different the bucketing/grouping of different data types and scales up (larger increments) or down (smaller increments) depending upon the values of data.

Single Value bucketing/Grouping Functions—Date Buckets/Groups

Figure 65B:
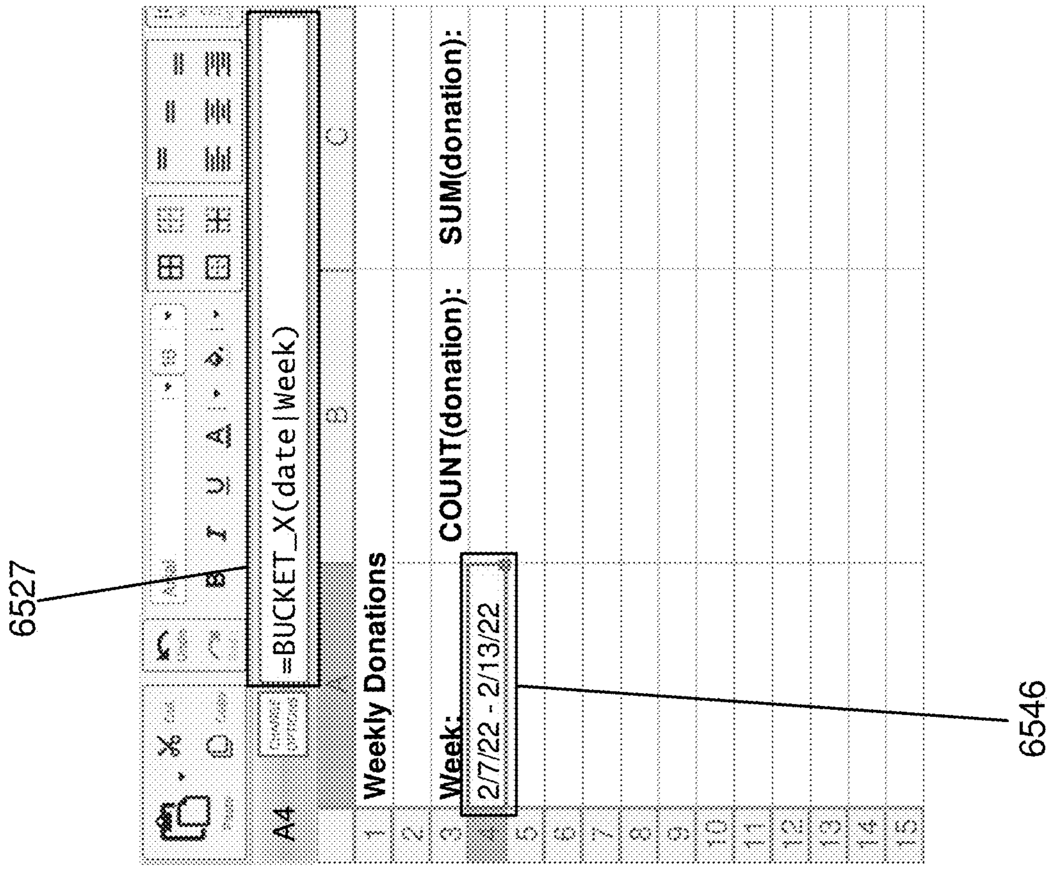
Figure 65A:
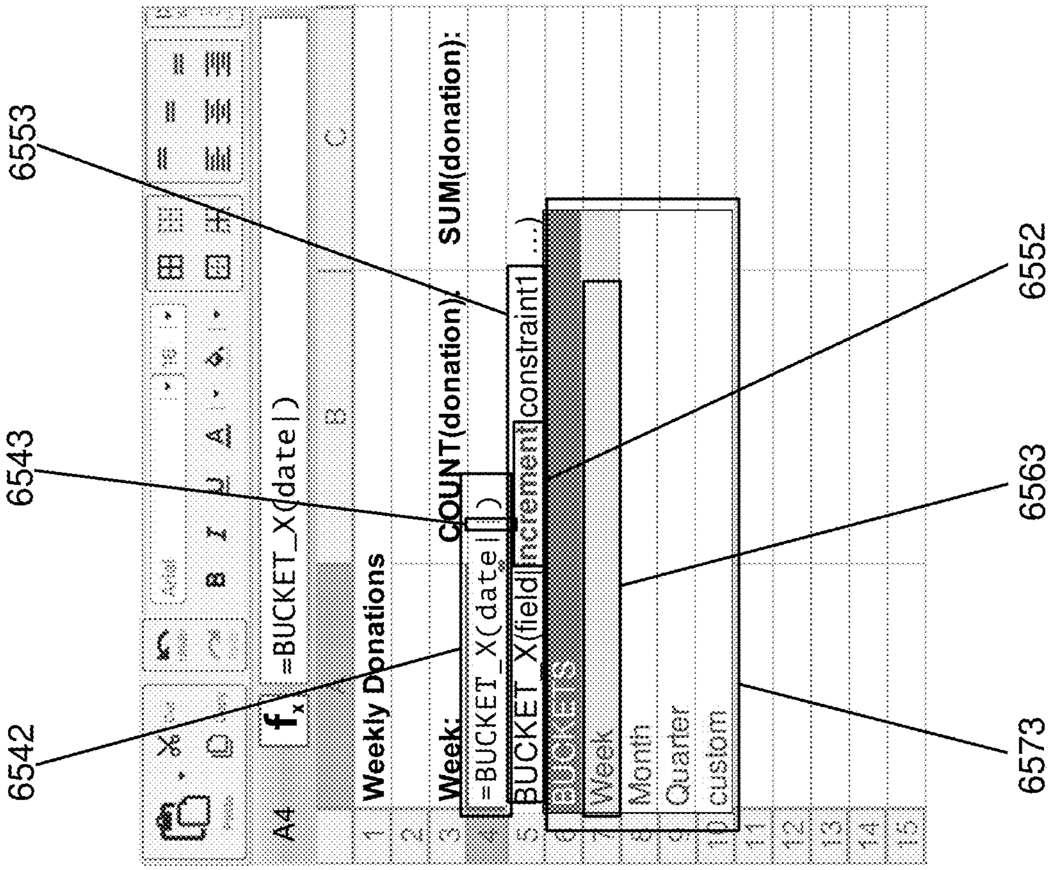

FIG. 65A through FIG. 66E example bucketing/grouping working for date fields with filling and our intelligent options. FIG. 65A examples the charity user creating a 'BUCKET_X' functional formula for a date field called 'date' where the cursor 6543 is in the second argument group that is for specifying the bucket increment 6552. This exposes the Hint 6573 which contains intelligently selected options. Specifically, only those specifications which will give two or more buckets/groups with at least one real bucket/group. FIG. 66C examples the specifications presented and rejected realizing that in different situations those options could alter down (e.g., second) or up (e.g., Century) in length of time and options therefore considered and offered. Here the 'Minute' or 'Hour' options are rejected because they do not exist in the data or because they will generate only one bucket (which they would do in Microsoft Excel as previously exampled). The 'Day' option is rejected for presentation to the user because it does not result in any combination of unique values (i.e., does not create any buckets/groups of more than one unique value). The 'Year' and anything beyond 'Year', in this case 'Decade' fail because they will only generate one bucket—which makes it the equivalent of running a total which does not have multiple buckets/groups. Calculation-wise the steps retrieving the data FIG. 66B, bucketing and filling FIG. 66D and returning the value '2/7'22-2/13/22' in FIG. 66E to cell 'A4' 6546 in FIG. 65B parallel steps in the numeric preceding examples. The formula in the formula bar 6527 gets populated with the 'Week' increment with a week starting on Monday and ending on Sunday (an option that can be set by the user for when the week starts, or different options can be presented to the user).

Figure 67B:
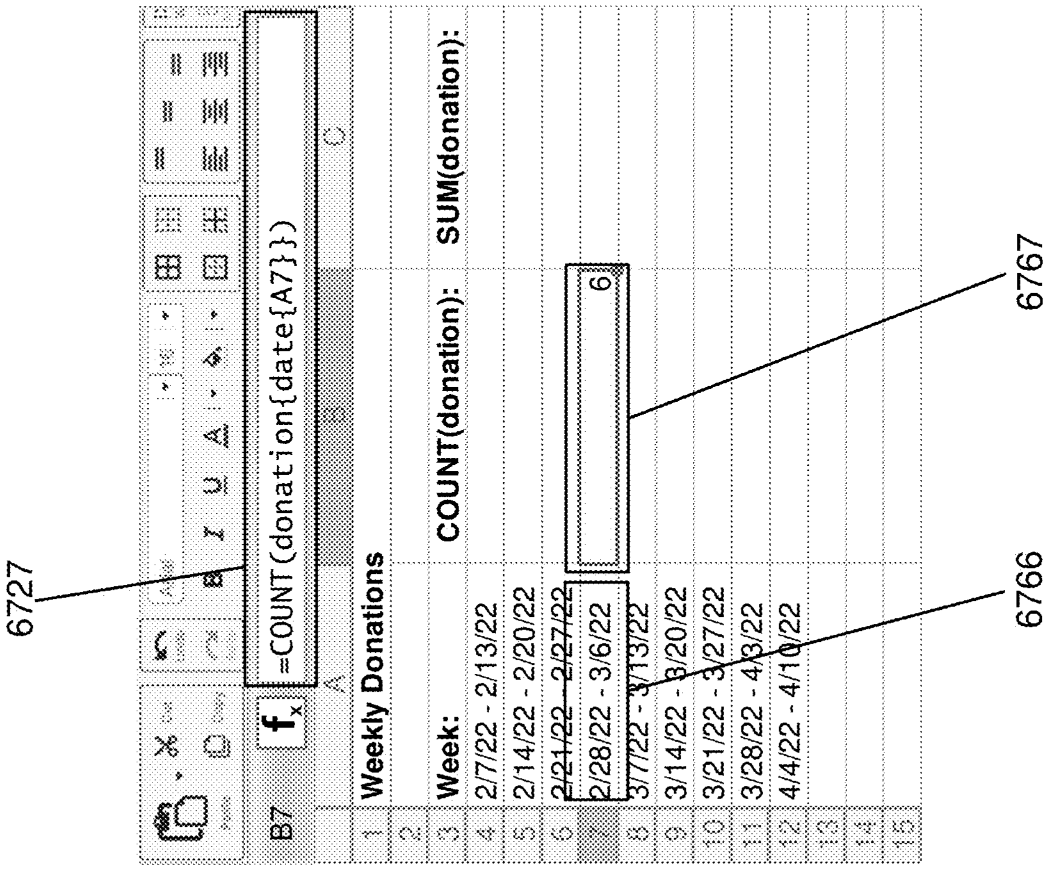
Figure 67A:
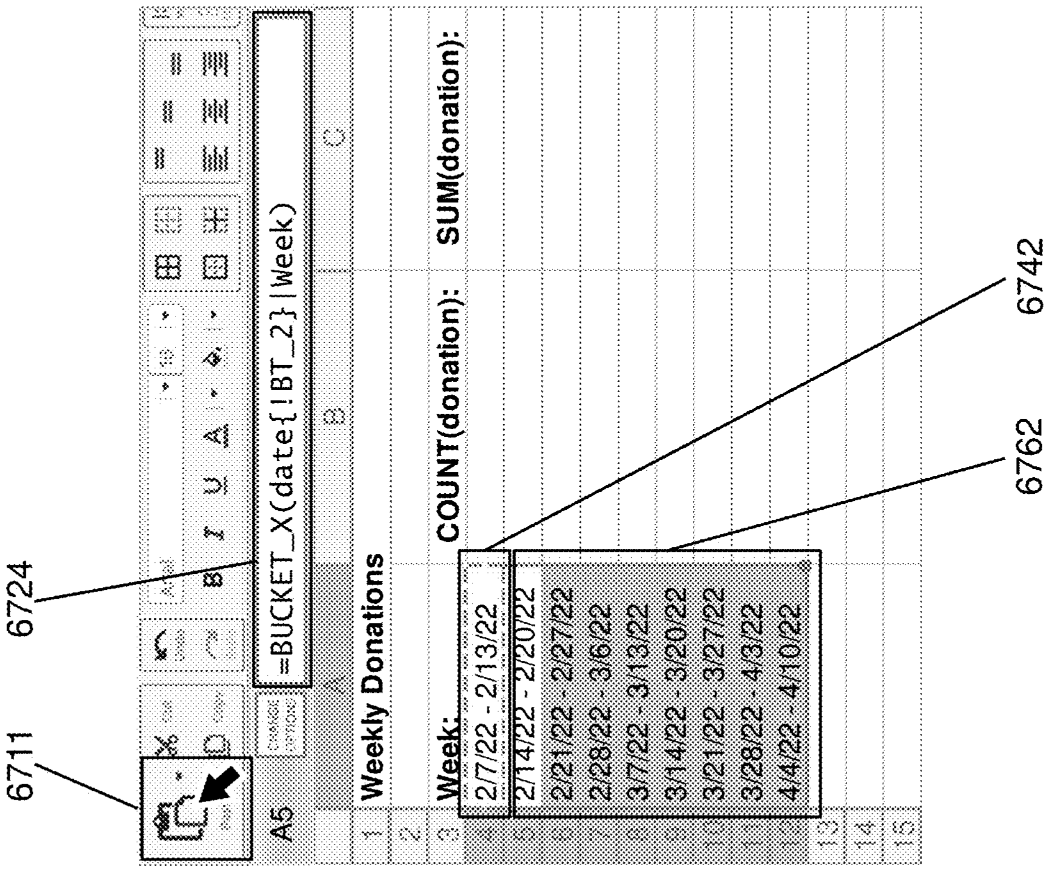

Single Value Bucketing/Grouping Functions—Date Buckets/Groups has all Capabilities FIG. 67A through FIG. 69B examples some previously described capabilities for numeric buckets/groups for dates. Since variants of all the numeric capabilities exampled previously are supported for dates, we will do a more abbreviated set of representative examples. FIG. 67A examples regular copy paste of a 'BUCKET_X' for a date field 'date' with 'Weekly' bucketing/group increments shown in the formula 6724. The charity user highlighted cell 'A4' 6742 hit the shortcut 'Control c', highlighted the target paste area 'A5' to 'A12' 6762 and then clicked the 'Paste' button 6711 returning the values from FIG. 66F to the cells 'A5' to 'A12' 6762. Our date bucketing/grouping capabilities also support flex copy paste.

FIG. 67B examples a 'COUNT' formula 6727 in cell 'B7' 6767 employs 'donation' values constrained to 'date{A7}' where the date is referencing the bucket/group values in cell 'A7' 6766. This is one of the values generated by the copy paste in FIG. 67A. FIG. 68A through FIG. 68E illustratively examples the steps automatically done by our application to calculate the value '6' in cell 'B7' 6767. Just as with the numeric examples the 'date' reference to the bucketed/grouped values supplies those values and their related data to the calculation as shown in FIG. 68B through FIG. 68D and then returns the value '6' as shown in FIG. 68E.

Figure 69B:
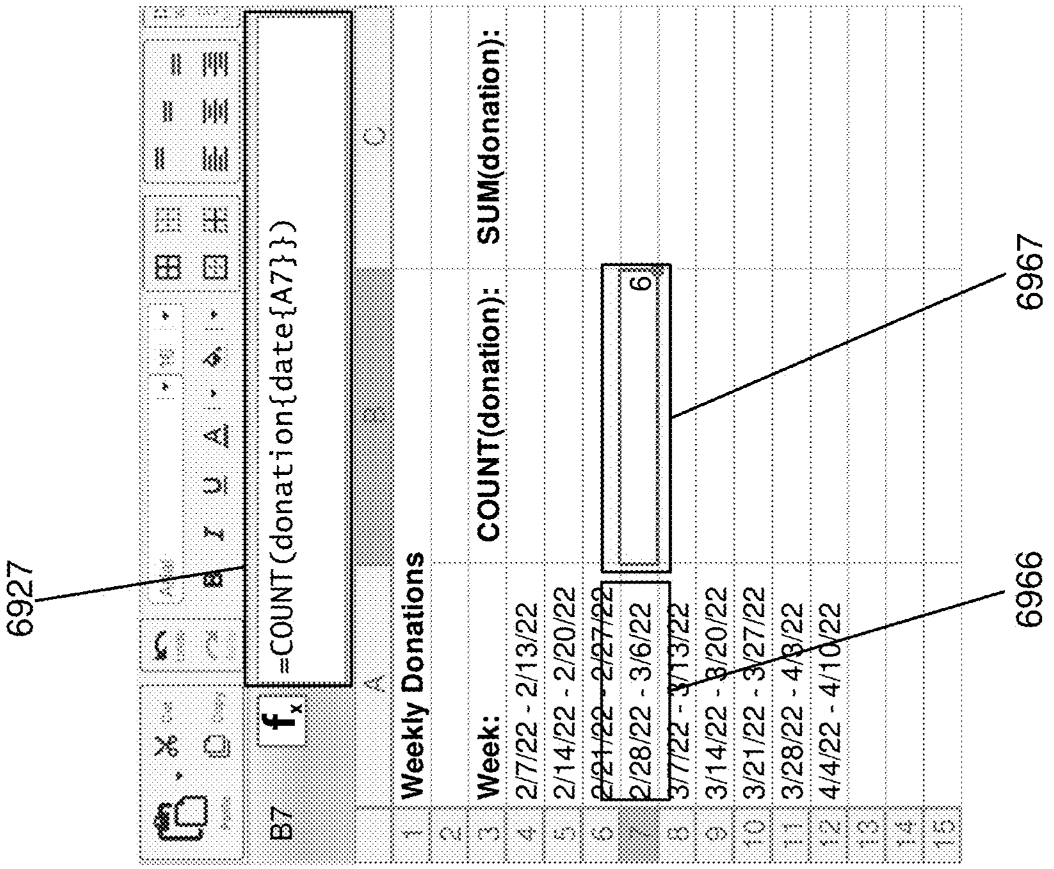
Figure 69A:
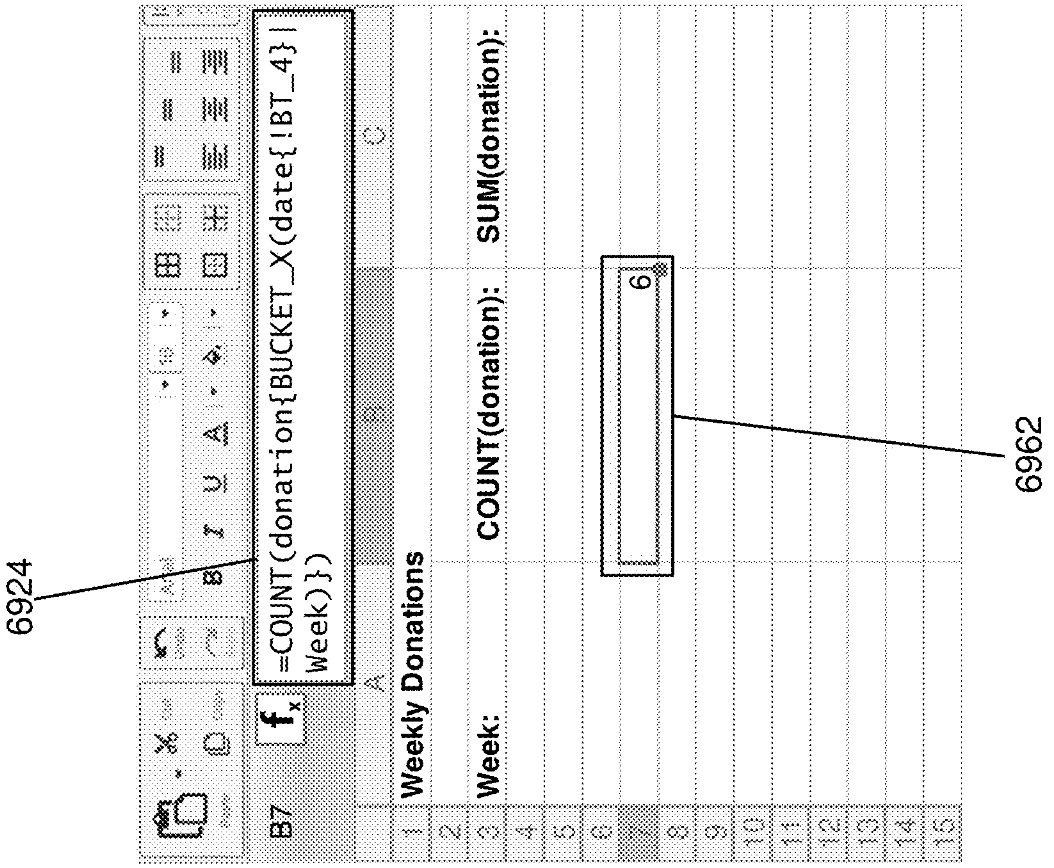

FIG. 69A and FIG. 69B example how our family of single value bucket/group functions applied to a date field are directly usable in a formula. FIG. 69A examples how cell 'B7' 6962 generates the value '6' from the formula in the formula bar 6924 which directly includes the 'BUCKET_X (date{!BT_4}|Week)' formula in the 'COUNT' formula:

'=COUNT(donation{BUCKET_*X* (date{!*BT*_4}|Week)})'

Where FIG. 69B examples the same cell 'B7' 6967 generating the same value '6' from the formula in the formula bar 6924 which indirectly includes the 'BUCKET_X (date{!BT_4}|Week)' formula from the cell 'A7' 6966 in its formula 6927:

'=COUNT(donation{*A*7})'

Both calculations have arrived at the same value using the same formulas although accessed different ways, directly in FIG. 69A and indirectly through cell 'A7' 6966 in FIG. 69B.

Rather than repeating additional date variant examples that were exampled for numeric buckets/groups (e.g., selecting different label variants or creating a custom one FIG. 46A through FIG. 47C), we will move to a capability not seen in existing spreadsheet function Pivot tables and certainly not seen in existing spreadsheet functions—text buckets/groups.

Single Value Bucketing/Grouping Functions—Text Buckets/Groups has All Capabilities FIG. 70A through FIG. 71F examples some of previously described bucketing/grouping capabilities for text (e.g., alphabetical) buckets/groups. There are many different potential text, alphabetical, alphanumeric or character bucketing/grouping increments. These initial examples are bucketed/grouped by the first letter of the specified field values. People relatively frequently bucket people's last names by their first letter and that is what the charity user wants to do with their data. Our technology supports creating standardized or custom buckets such as 'A to D', 'E to H' and so on, however we will keep the buckets/groups simple for example purposes.

Figures 70A, 70B:
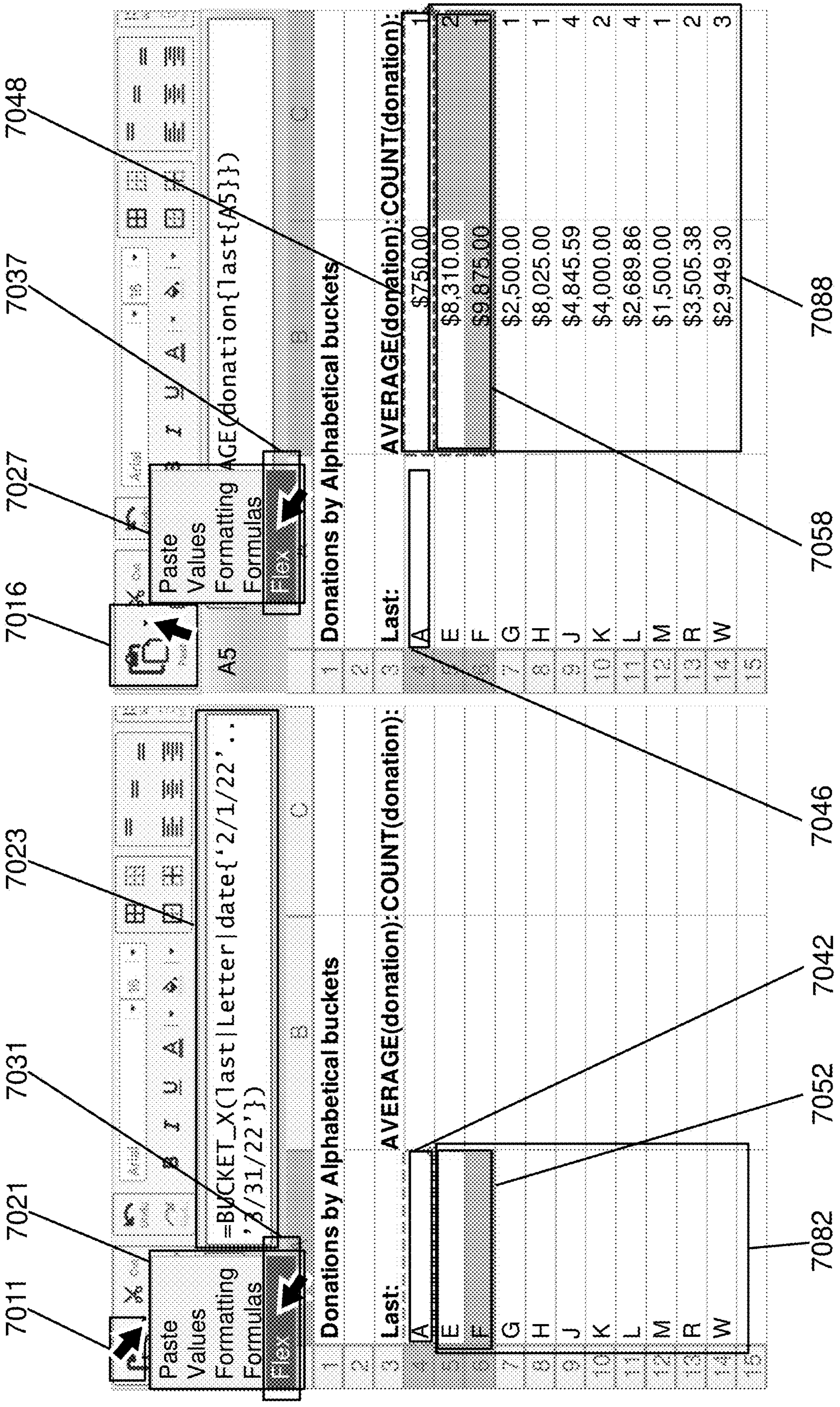

For brevity purposes we have combined multiple user actions into each figure. FIG. 70A examples the charity user creating the first alphabetical bucket and then copy paste to incrementally replicate that functional formula. The charity user creates a bucketing/grouping functional formula 7023 in cell 'A4' 7042 which contains a 'BUCKET_X' function working for the field 'last' and bucketing by 'Letter' with a constraint/filter of 'date'{2/1/22' . . . '3/31/22'}'. If you opened 'Options' you would find that there is no filling. FIG. 71A through FIG. 71E illustratively examples the steps automatically done by the formula including the data constraining/filtering in FIG. 71C, the sorting and bucketing done in FIG. 71D and the formatting and return in FIG. 71E to cell 'A4' 7042 in FIG. 70A.

The charity user then hits Control c to start a flex copy paste of cell 'A4' 7042. The user then highlights a paste direction 7052 clicking the 'Paste' dropdown arrow 7011 and then selecting (clicking) the 'Flex' paste specification 7031 in the paste specifications list 7021. This then populates the values in cells 'A5' through 'A14' 7082 which for brevity are not highlighted the way the app would do it but otherwise accurately example the results. The flex copy paste automatically executed steps by our technology are illustratively exampled in FIG. 71A through FIG. 71D and FIG. 71F.

FIG. 70B then examples the charity user using the value and associated data of the bucket/group function in cell 'A4' 7046 (created in FIG. 70A 7042) in two functional formulas created in cells 'B4' and 'C4' 7048. Followed then by a flex copy pastes of those two cells to create the full set of values 7088. To do this the charity user first creates the formulas in cells 'B4' and 'C4' 7048 automatically triggering the illustratively exampled steps 7233 in FIG. 72A, 7235 in FIG. 72B and 7238 in FIG. 72C. They then copy cells 'B4' and 'C4' 7048 in FIG. 70B followed by highlighting a paste direction 7058. The user then clicks the 'Paste' dropdown arrow 7016 selecting (clicking) the 'Flex' paste option 7037 in the options list 7027. This then populates the values in cells 'B5' through 'C14' 7088 which for brevity are not highlighted the way the app would do it but otherwise accurately portray the results. The automatically executed steps by our technology for the flex copy paste are illustratively exampled in FIG. 72A through FIG. 72C.

Rather than re-exampling all previous capabilities for different text data type bucketing/grouping (e.g., buckets combining letters and numbers like T1, T2, T3 and C1, C2, C3 for scientific or medical experiments differentiated by Test and Control), we will example the very broad analytical capabilities supported by our technology.

Single Value Bucketing/Grouping Functions—Analytics Support

Another dimension that differentiates our technology from the Pivot table and its related capabilities (GETPIVOTDATA and CUBE functions) is that our technology goes well beyond summarizing data to supporting broad based analytics. Going well beyond the Microsoft Excel 2019 Bible published by Wiley description "A PivotTable is essentially a dynamic summary report generated from a database". All the eleven functions traditional spreadsheet PivotTables support (FIG. 1A and FIG. 1B) summarize data for ranges/arrays while our technology supports a much broader spectrum of range/array functions but importantly supports non-range/array functions that do analytics not only summarization. Thus, our technology supports usage of the large number of analytical functions that make up the over four hundred functions supported in a typical spreadsheet and supports very complicated formulas using those functions and algebraic operators. These analytical capabilities apply to any of our different bucket/group types and while the numeric buckets are employed in the next example, it could have easily been done for a date, alphabetical or alphanumeric text one. Our single value bucketing/grouping functions support analytics which otherwise are not supported by any existing spreadsheet functions or features other than users writing code with the programming languages supported by the respective spreadsheets. This is a major advancement. And as described before, our functions work for any supported calculation and are not dependent on any other feature (e.g., Power Pivot PivotTable) having already done that specific calculation.

Figure 73B:
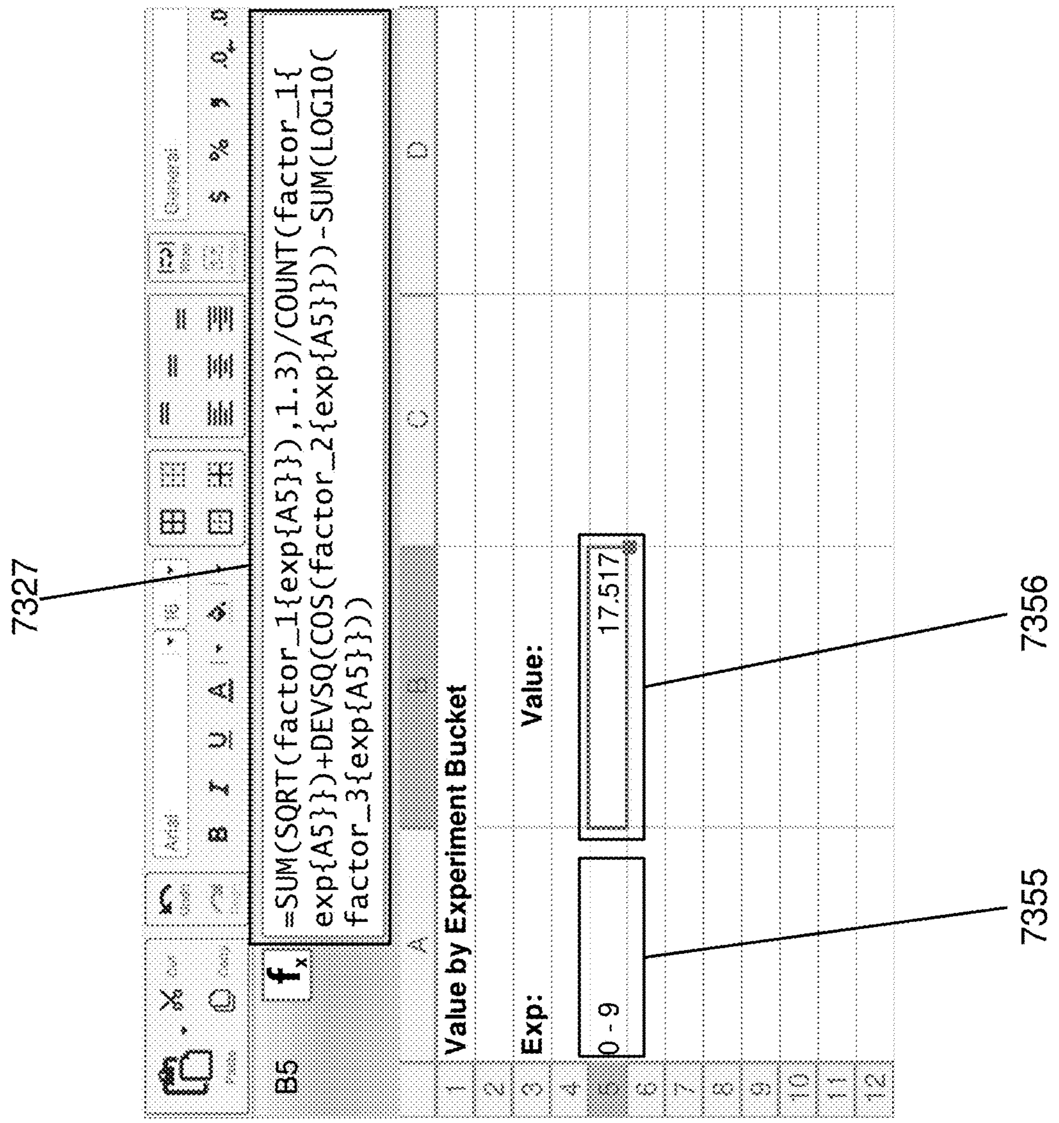
Figure 73A:
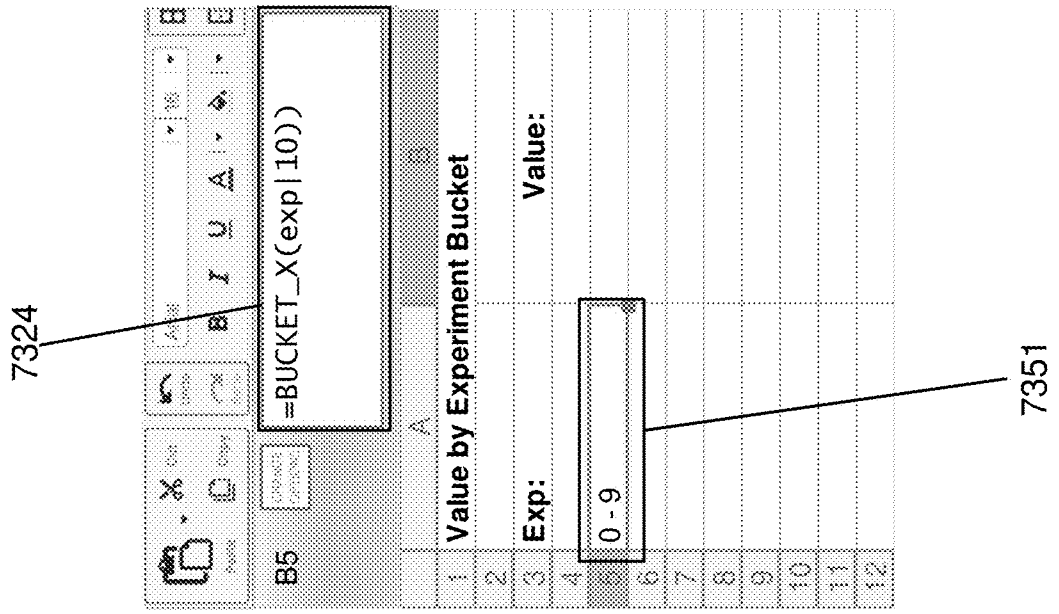

FIG. 73A through FIG. 75E examples our single value bucketing/grouping function with numeric groups/buckets supporting a complex functional and algebraic cell formula. That formula utilizes range/array and non-range/array functions with many algebraic operators referencing a bucketed cell value and using its associated data. FIG. 73A examples the single value bucket/group used in the complex analytical formula 7372 in FIG. 73B. It is created by a scientist who wants to calculate experimental test results for buckets of experiments. They want to look at buckets of ten experiment numbers recognizing that they have some holes in their data with experiments that have not yet concluded. For that reason, the scientist wants to fill any empty bucket now as they will have results later. They create the 'BUCKET_X (exp|10) formula 7324 in cell 'A5' 7351 which evaluates experiments '0-9'. The steps automatically done by that process, including the bucket options presented to the user, are illustratively exampled in FIG. 74A through FIG. 74E paralleling steps previously described.

Then in FIG. 73B the scientist creates the analytical formula 7327 in cell 'B5' 7356 to evaluate the experiments in the 'exp' bucket '0-9' 7355. That analytical formula is a combination of range/array functions (i.e., SUM, COUNT and DEVSQ), non-range/array functions (i.e., SQRT, COS and LOG10), a constant (i.e., 1.3) and algebraic operations (i.e., plus, minus and divide) which goes well beyond summarizing data and into analyzing it. The formula 7372 in cell 'B5' 7356 repeatedly uses the bucket/group values in 'A5' 7355 with the automatically done steps illustratively exampling the calculations done in FIG. 75A through FIG. 75E. FIG. 75A evaluates for each experiment ('exp') in the '0-9' the first part of the formula:

'SUM(SQRT(factor_1{exp{*A5*}}),1.3)/COUNT (factor_{exp{*A5*}})

FIG. 75B evaluates for each experiment ('exp') in the '0-9' the second part of the formula:

DEVSQ(COS(factor_2{exp{*A5*}}))

While FIG. 75C evaluates for each experiment ('exp') in the '0-9' the third part of the formula:

SUM(LOG10(factor_3{exp{*A5*}}))

FIG. 75D then evaluates the three parts of the formula for the final step in FIG. 75E to return to cell 'B5' 7356 in FIG. 73B. Thus, the scientist has repetitively utilized a single value bucket/group function in a complicated analytical cell formula. They also could have directly used the 'BUCKET' function in the formula if they had replaced each of the four 'A5' arguments with 'BUCKET_X(exp|10)' thereby delivering the same result.

Figure 76B:
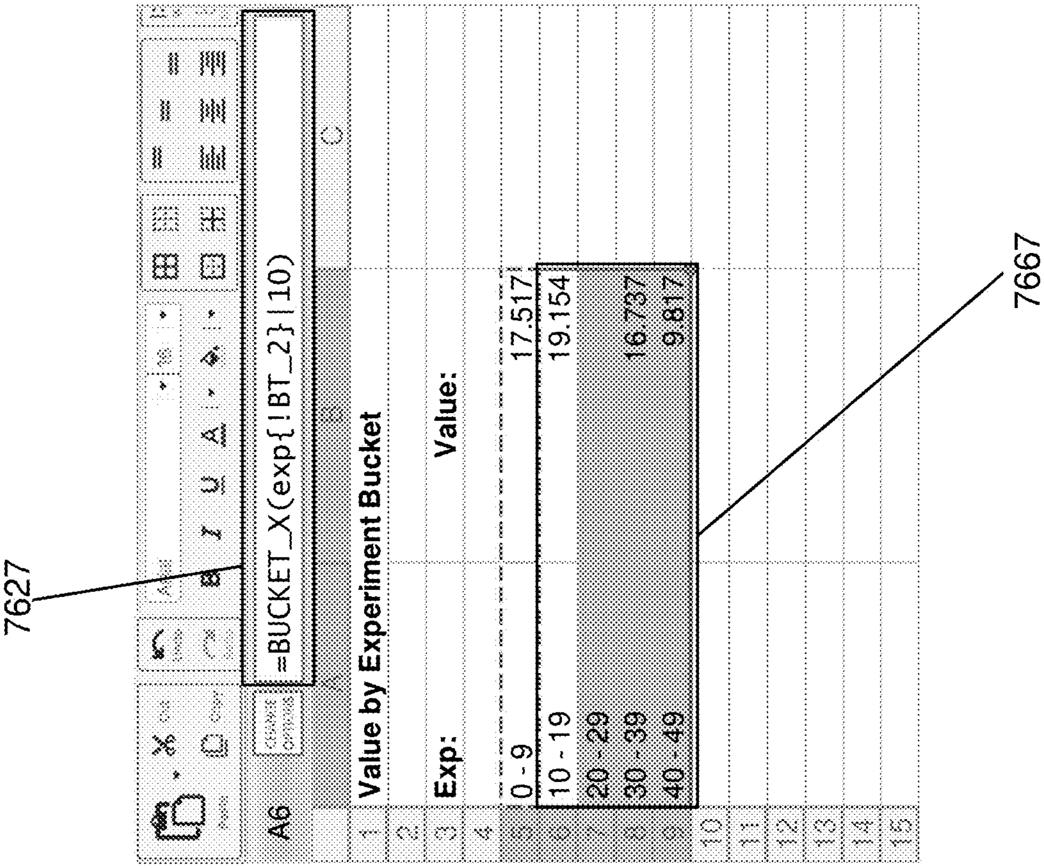
Figure 76A:
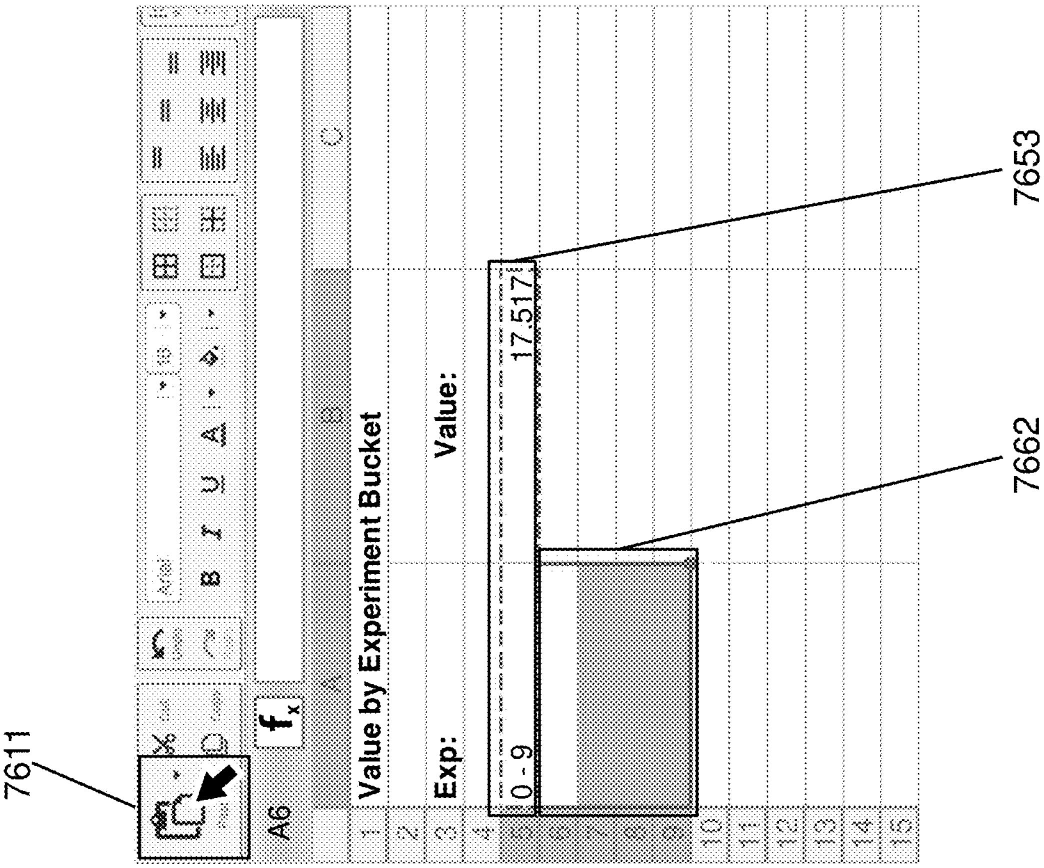

FIG. 76A and FIG. 76B examples the scientist then copy paste replicating the two cells in FIG. 73B containing the bucket/group function formula 7324 in FIG. 73A and the complex analytical formula 7327 in FIG. 73B using a regular copy paste (although they could have used a flex copy paste). The scientist user copies the two cells 7653 created in FIG. 73A and FIG. 73B highlighting the four output rows 7662 and then clicking 'Paste' 7611. The result are the values in cells 'A6' to 'B9' 7667 in FIG. 76B which are produced automatically by the steps illustratively exampled in FIG. 77 through FIG. 79C. These steps effectively replicate each of the calculations done in FIG. 75A through FIG. 75E for each of the four other buckets/groups, recognizing that one of those buckets/groups is currently empty and therefore filled.

The preceding has exampled different embodiments of our single value bucketing/grouping functions used in cells or in functional formulas that result in a single cell value. However, our single value bucketing/grouping functions can be used in multi-cell populating functions to deliver bucketed/grouped results.

Single Value Bucketing/Grouping Functions—Use in Our Multi-Cell Populating Functions Our single value bucketing/grouping functions can be used to populate multiple cells when used in our Multiple cells populating functions, e.g., our WRITE or WRITE_2D functions which are the subject of our patent applications U.S. application Ser. No. 16/191,402, U.S. application Ser. No. 17/374,901 and U.S. Application No. 63/240,828. FIG. 80A through FIG. 83D example two different usages of our single value bucketing/group functions (e.g., 'BUCKET_10') within one of our multi-cell populating functions (e.g., 'WRITE_CALC_V'). Our 'BUCKET_10' function transforms a normal formulaic data field into a bucketed/grouped data field within the 'WRITE' function. The example is done with a one-dimensional function providing columns of information, but if used in a different variant of WRITE functions it could have been rows of information or in a two-dimension variant rows and columns of information.

Figure 80B:
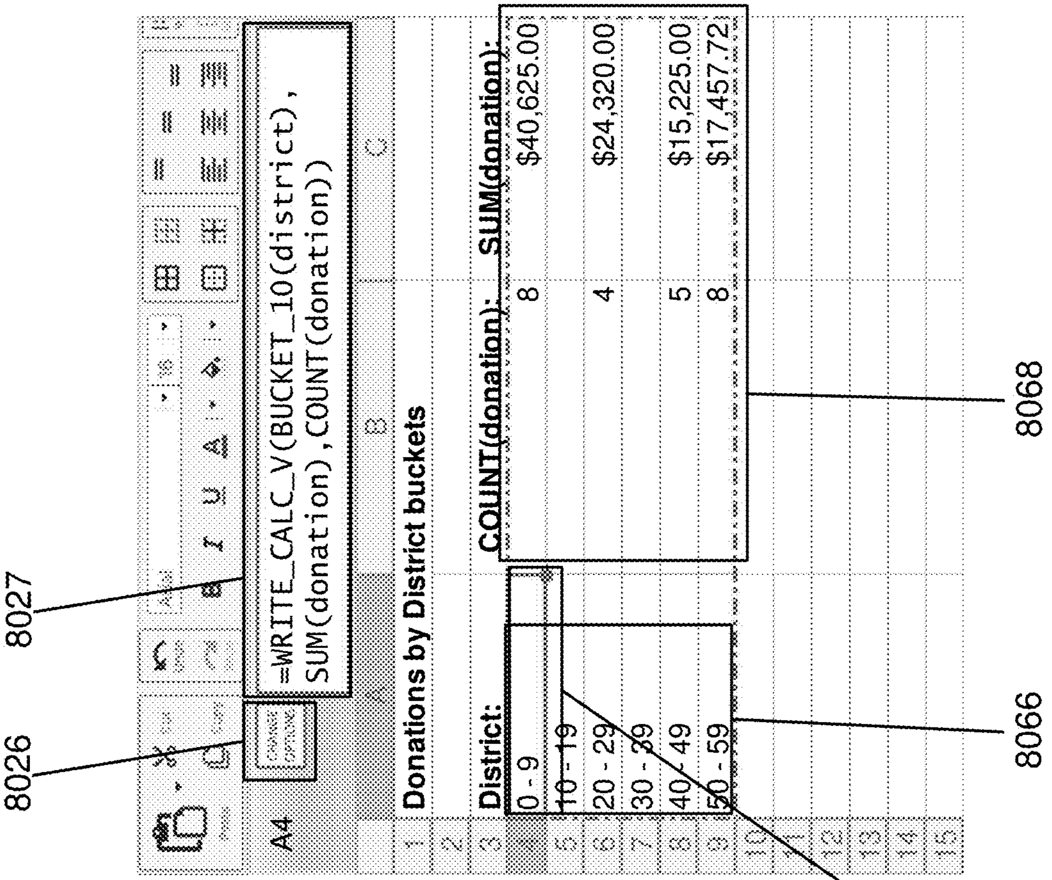
Figure 80A:
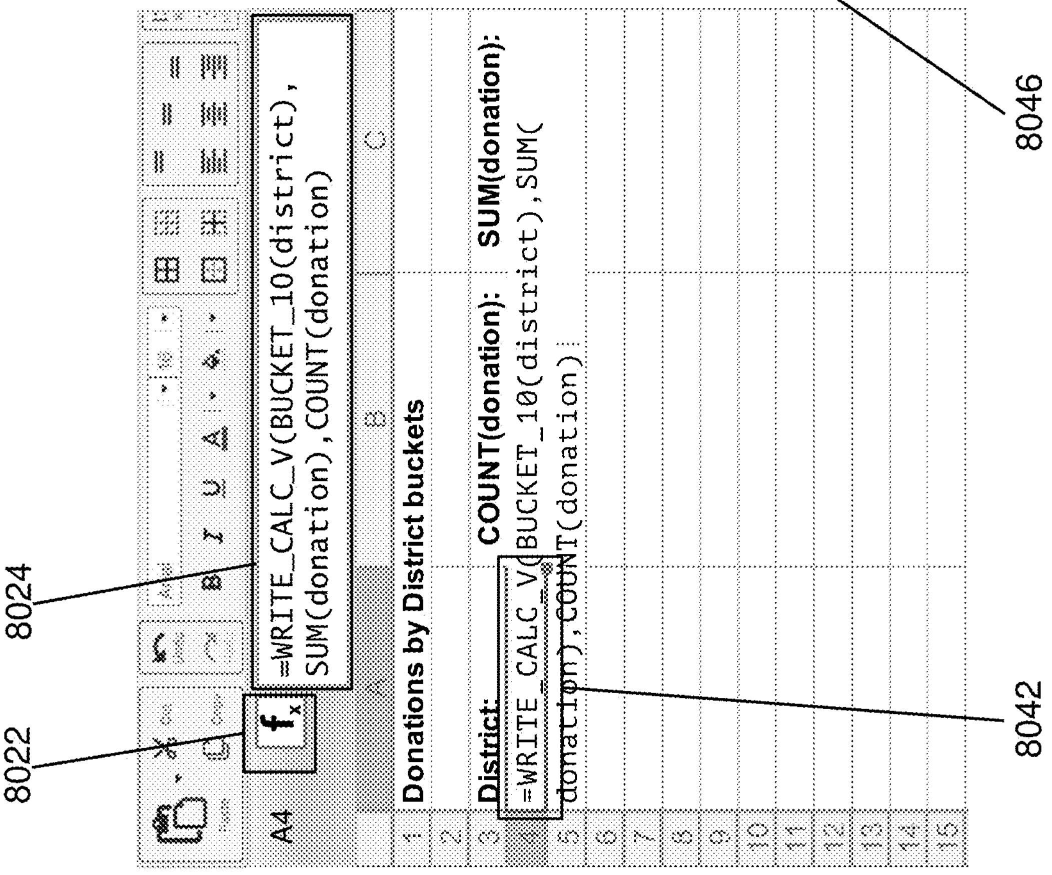
Figure 82B:
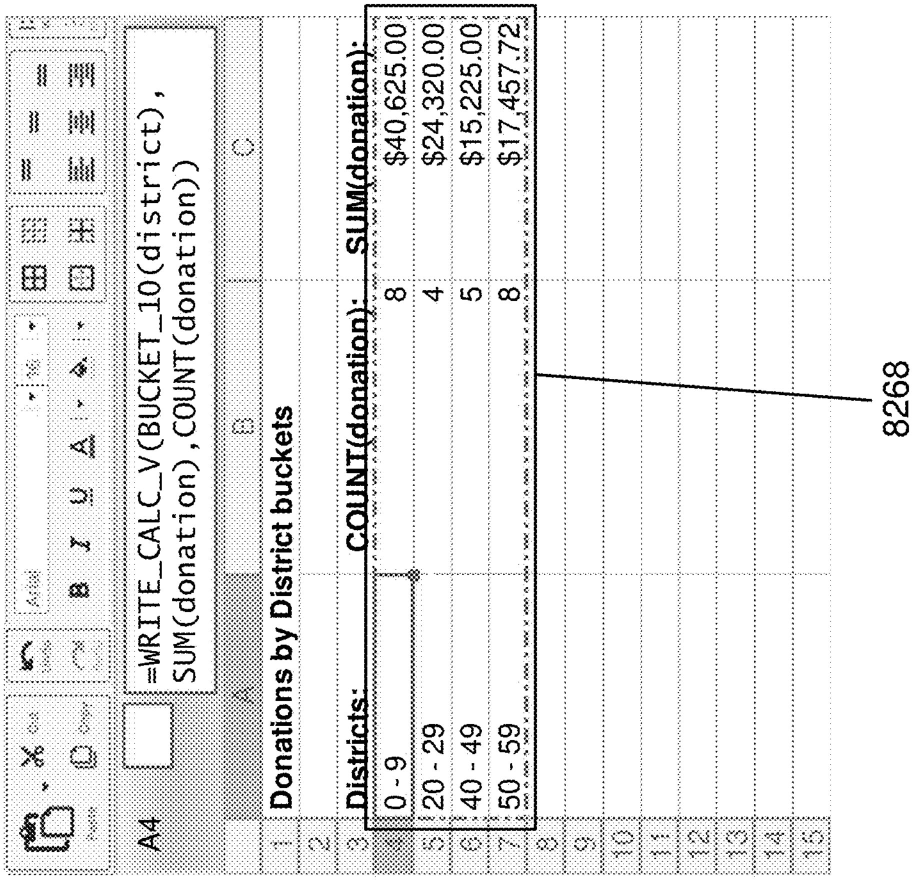
Figure 82A:
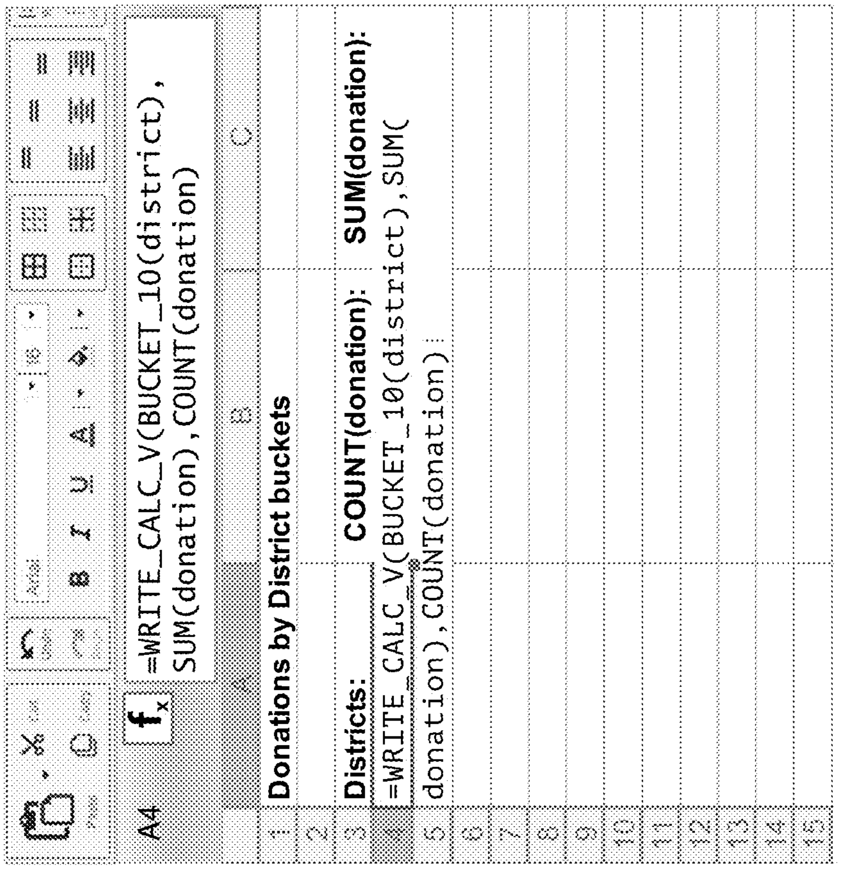

FIG. 80A examples the charity user creating a 'WRITE' function formula using our new 'BUCKET_10' function. The user wants to 'COUNT' and 'SUM' the donations, as they have done previously by writing a 'BUCKET' function formula, then a 'COUNT' function formula in another cell referencing it, then a 'SUM' function formula in a third cell referencing the 'BUCKET' function formula and finally copying all three cells to produce the full set of buckets. However, rather than separately doing all those steps they would prefer to create one functional formula to do it all as they are doing in cell 'A4' 8042 with the formula 8024. They have used one of our single value bucketing/grouping functions 'BUCKET_10(district)' as the first argument. When they finished the formula and hit ENTER this delivers the buckets/groups of 'district' 8066 shown in FIG. 80B. The rest of the 'WRITE_CALC_V' functional formula 8027 delivers the additional columns of results 8068 shown in FIG. 80B which were calculated using the bucketed/grouped values.

FIG. 81A through FIG. 81D examples the calculations done by the formula 8027 including the determination of the buckets/groups and their filling in FIG. 81B and then the use of those buckets/groups in the 'COUNT' and 'SUM' calculations in FIG. 81C. Those data summarization formulas could have been more complicated analytics formulas each involving more than one function and including non-range/array functions. FIG. 81D examples the returning of the values to the cells 'A4' to 'C9' 8066 and 8068 at which point in this embodiment the populated area is green dash dot outlined and the $f_x$ 8022 icon is replaced with the 'CHANGE OPTIONS' green button 8026. FIG. 82A through FIG. 83D examples the same actions as FIG. 80A through FIG. 82D except without the filling turned on in the 'BUCKET_10' function. Therefore, the results 8268 in FIG. 82B have four rows instead of the six rows in 8068 in FIG. 80B. Rather than re-exampling all the other single-value bucketing/grouping function capabilities working in multi-value functions, which they do, we will move onto the next major family of bucketing/grouping functions in our technology.

Single Value from Multi-Value Selecting Bucketing/Grouping Functions

Figures 176A, 176B, 176C, 176D:
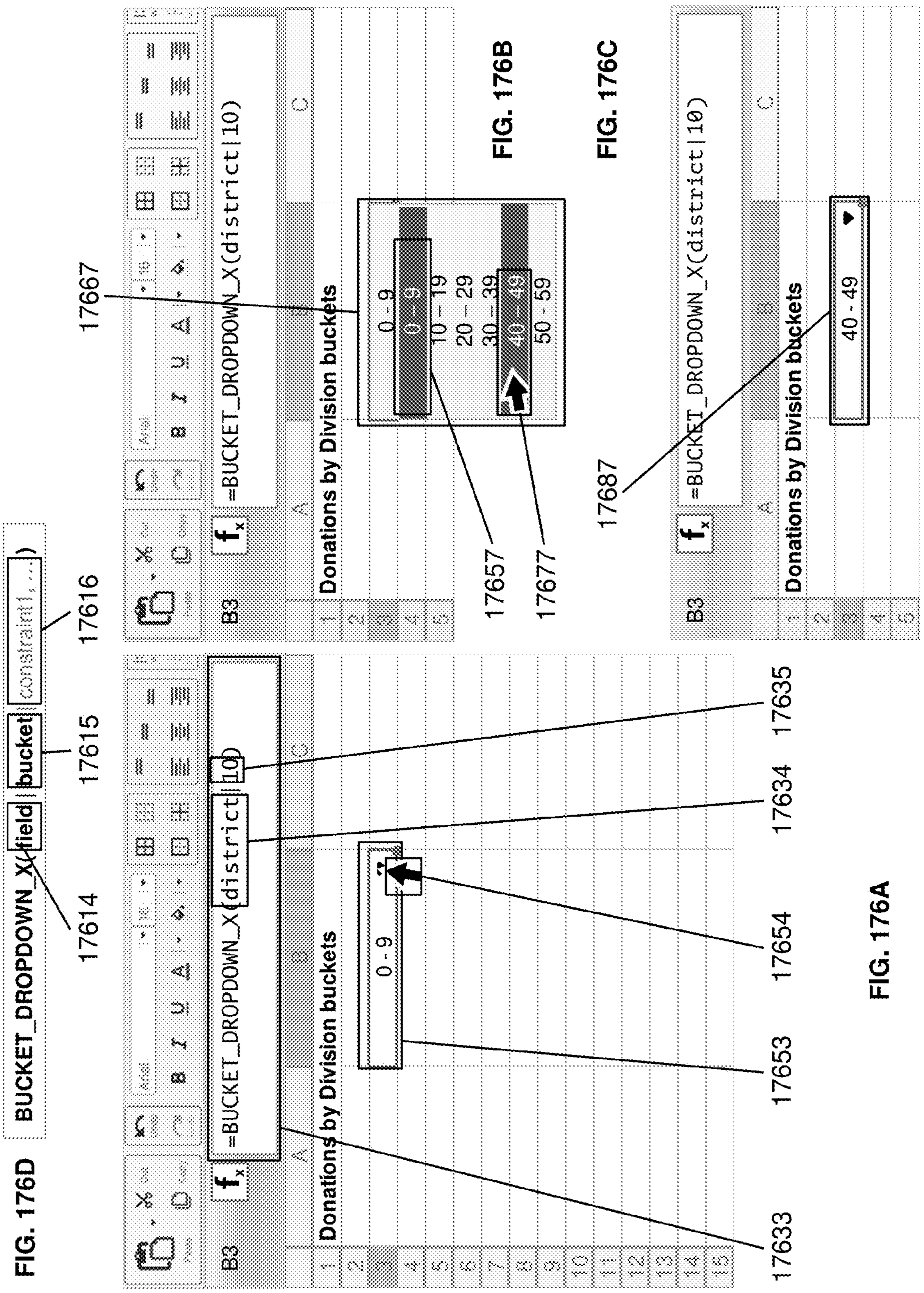

The preceding function capabilities populated a single bucket value into a single cell or spreadsheet formula cell, our next embodiment populates multiple selectable bucket/group values from which the user or the application default specifies one bucket/group value for population into the cell with its associated data. FIG. 176A through FIG. 177F examples the creation and usage of our new single-value from multi-value selecting bucketing/grouping function technology. FIG. 176A examples the user having created the formula 17633 using a new function called in this embodiment 'BUCKET_DROPDOWN_X' with the syntax shown in FIG. 176D. The first argument group is occupied by the 'field' 17614, the second argument group by the 'bucket' 17614 increment and the third optional argument group is for constraints 17616. In this example the charity user wants 'district' 17634 field values bucketed by increments of '10' 17635 with no constraints as shown in FIG. 176A getting in this embodiment the application default value of the first bucket '0-9' 17653 shown in cell 'B3'. This value is automatically generated by the function via the steps illustratively exampled in FIG. 177A through FIG. 177F.

The user then decides they would like to select a different bucket, so they click the button 17654 in FIG. 176A to expose the dropdown list 17667 in FIG. 176B. In this embodiment that opens with '0-9' 16757 highlighted as the current selection, the user then clicks their desired selection of '40-49' 17677 to see the value populated in the cell 'B3' 17687 in FIG. 176C. This is one embodiment of our technology for populating a bucket value and its associated data into a cell with a multi-bucket selector list allowing easy re-selection of the bucket value. That selected value with its associated data is then usable by other cells in calculations as exampled elsewhere in this filing.

Multi-Value Bucketing/Grouping Functions Populating a Single Cell

Figures 178A, 178B, 178D:
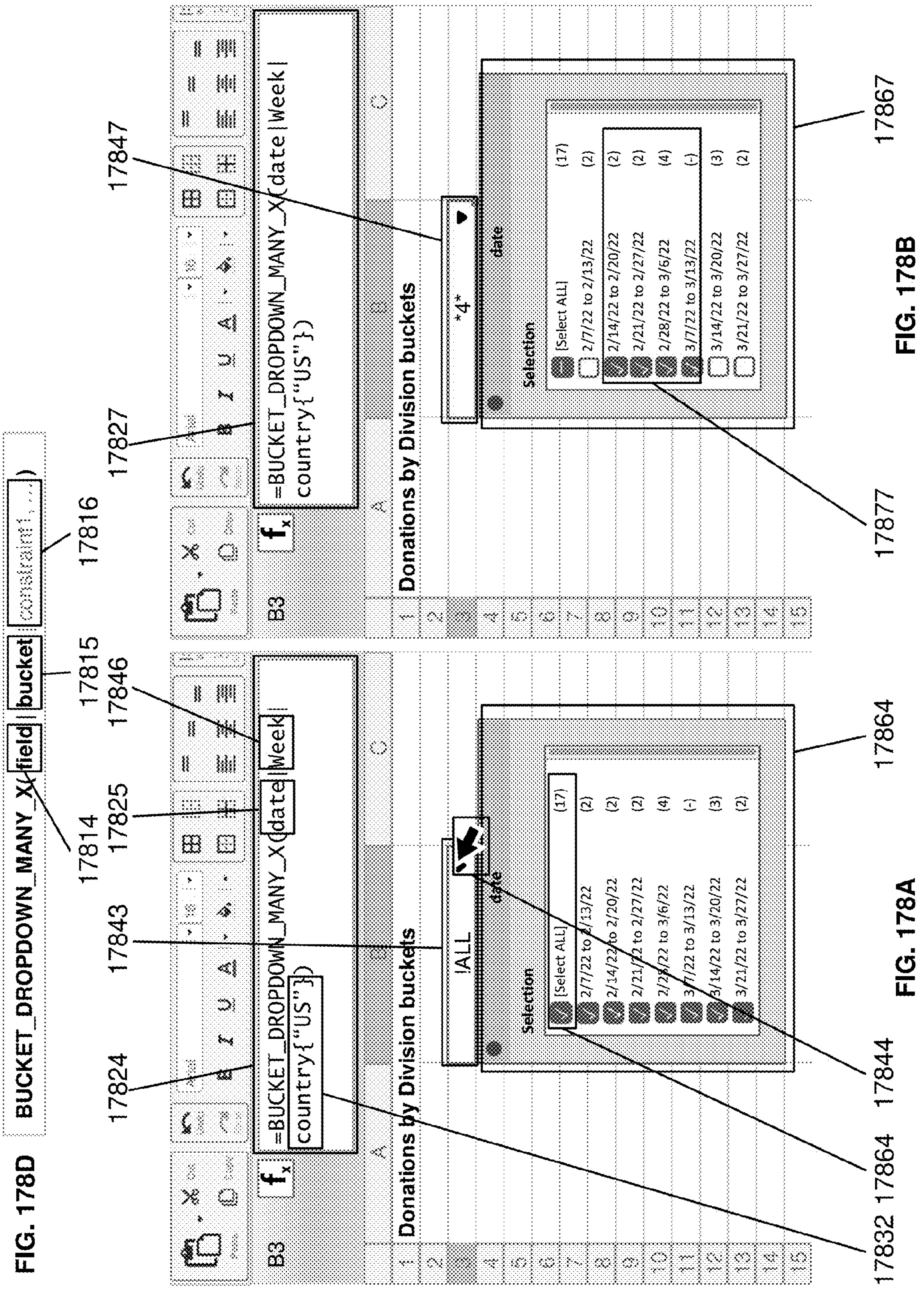

We will now example an embodiment that populates multiple bucket values and their associated data into a single cell. default specifies one bucket/group value for population into the cell with its associated data. FIG. 178A through FIG. 179F examples the creation and usage of our new multi-value bucketing/grouping in a single cell function technology. FIG. 178A examples the user having created the formula 17824 using a new function called in this embodiment 'BUCKET_DROPDOWN_X' with the syntax shown in FIG. 178D. The first argument group is occupied by the 'field' 17814, the second argument group by the 'bucket' 17814 increment and the third optional argument group is for constraints 17816. In this example the charity user wants 'date' 17825 field values bucketed by increments of 'Week' 17846 with one constraint 'country{"US"}' 18732 as shown in FIG. 178A getting in this embodiment the application default value of the first bucket '!ALL' 17843 shown in cell 'B3'. This value is automatically generated by the function via the steps illustratively exampled in FIG. 178A through FIG. 178F.

The user then decides they would like to select a different bucket, so they click the button 17844 in FIG. 176A to expose the dropdown list 17864 in FIG. 178A. There the user sees that '[Select ALL]' 17864 is on and the user then decides they would like to select four values 17877 shown in the popup 17867 in FIG. 178B. In this embodiment that populates the value '*4*' in the cell 'B3' 17847 which tells the user there are four bucket values and their associated data in that cell. This is one embodiment of our technology for populating multiple bucket values and their associated data into a cell with a multi-bucket selector list allowing easy changing of the selections. Those selected values with their associated data is then usable by other cells in calculations as exampled elsewhere in this filing.

The preceding has exampled different embodiments of what we labelled single value bucket/group functions and multi-bucket/group into a single cell functions. We will now example families of bucketing/grouping functions which deliver multiple values from a single functional formula into multiple different cells. We will break that into two different types of families of functions, the first dedicated functions that create the buckets/groups and the second where the bucketing/grouping capability is an optional specification added to existing or new functions that do more than creating the groups/buckets.

Multi-Value Bucketing/Grouping Functions

Our grouping/bucketing technology supports a multi-value populating family of functions supporting the different data types, filling/non-filling, external data/n-cell data, user selectable labels, user customizable labels, use by cell functional calculations, used by cell complex analytics functional calculations, regular/flex copy paste of those functional calculations, constraints, and intelligent options. Rather than re-exampling every previously mentioned capability for every data type and situation we will example a subset to give a representative view of our multi-value bucketing/grouping functions.

Figure 84B:
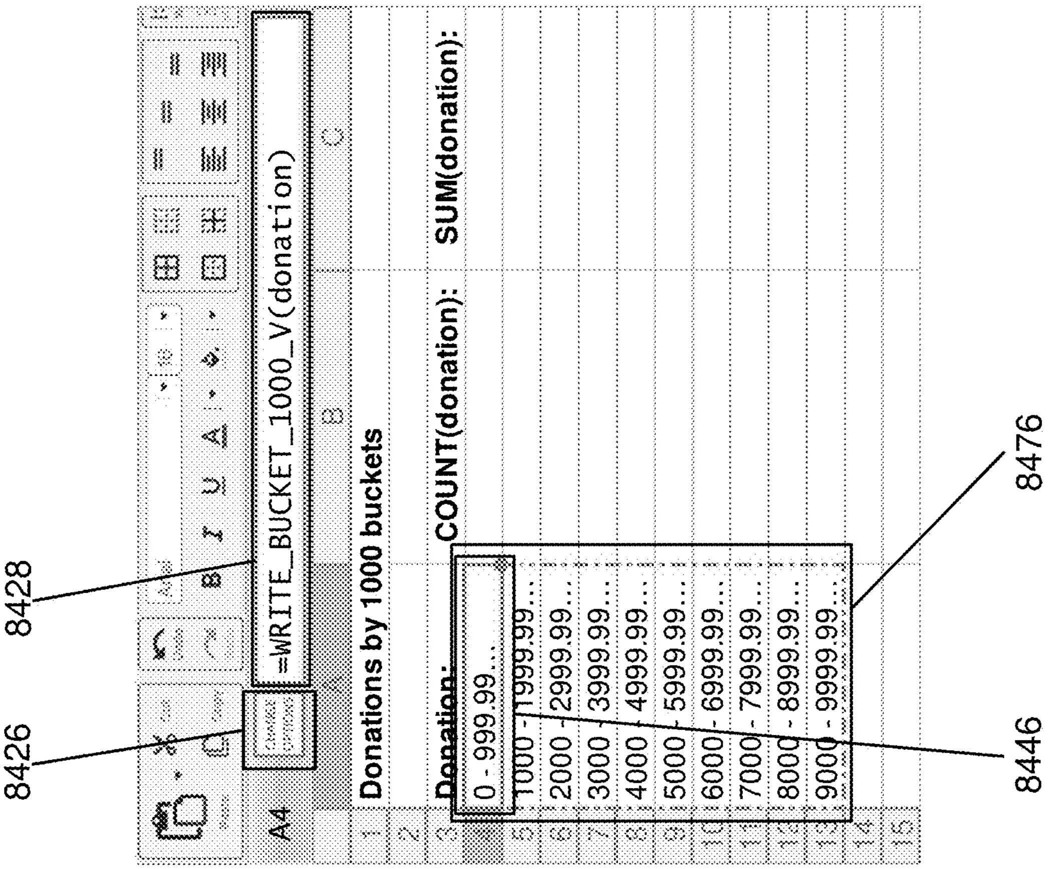
Figure 84A:
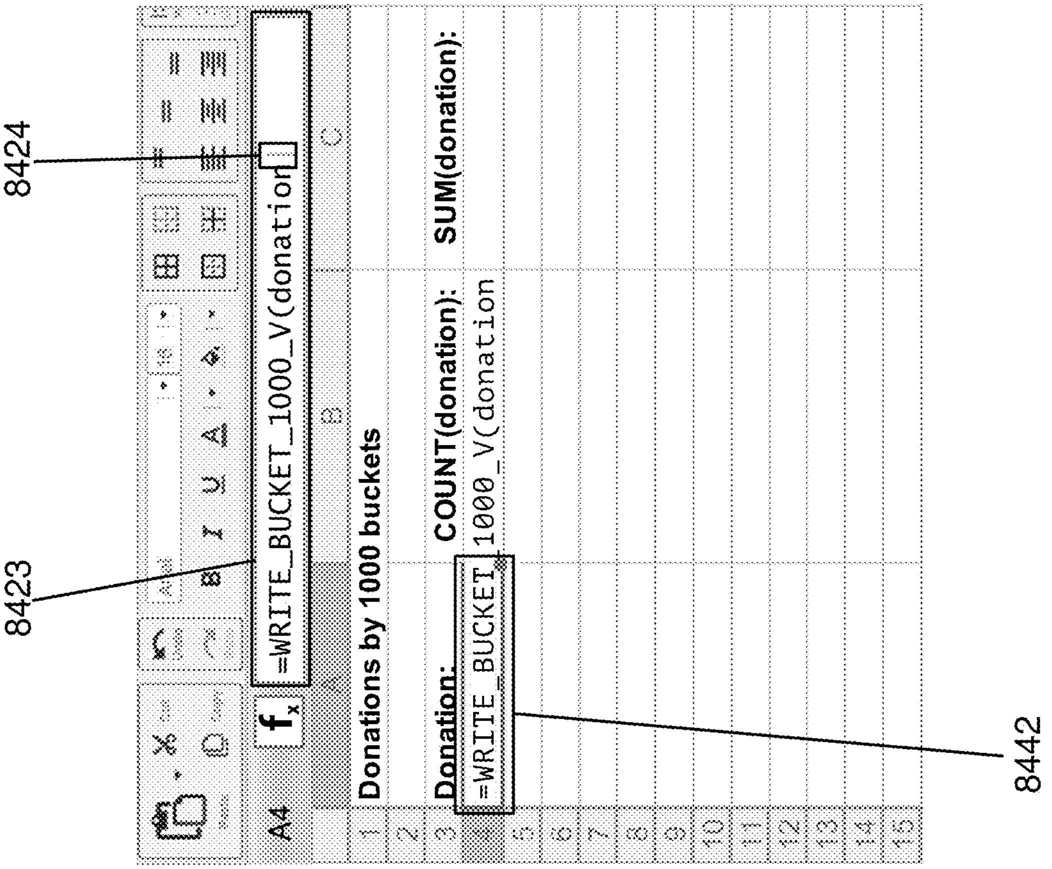

FIG. 84A through FIG. 85G examples a prespecified increment multi-value bucketing/grouping function employing automatic filling and automatic start/end specification. The charity user is redoing a previous analysis of donation counts and sums by donation buckets (with a 1000 increment). FIG. 84A examples the charity user creating the 'WRITE_BUCKET_1000_V' formula, which could have been named very differently. They have typed the formula 8423 in cell 'A4' 8442 with the cursor 8424 at the end of the formula. In FIG. 84A the user finishes the formula 8428 by adding the closing parenthesis ')' and then hitting 'ENTER/RETURN' to automatically populate the cells 'A4' to 'A13' 8476 with 'donation' buckets in the increments of 1000 starting at '0'. This embodiment also outlines the 'BUCKET' cells in orange and employs a 'CHANGE OPTIONS' button 8426. FIG. 85A through FIG. 85G illustratively examples the steps automatically executed by the function including the automatic filling of the buckets/groups 8538 and 8558. In this embodiment our technology automatically determines the bucket start value to be the closest number equal to or below the first data point that when divided by the bucket increment delivers an integer value. The lowest value '150' does not equal an integer when divided by the bucket increment of 1000 and as shown in FIG. 85D. The first value below '150' that fulfils that requirement is '0' which becomes the bucket starting point in this example. The auto determined ending point in this embodiment is the last increment that captures the highest value, in this example '9000-9999.99 . . . ' which captures the highest value of '9875' with the value '9999.99 . . . ' shown in FIG. 85E. In other embodiments the user can override the automatically set starting and ending points as exampled later. In another embodiment of our technology, we could use a variant of the illustrative algebraic test to create a value that in this example would be '0.0 . . . 1-1000', '1000.0 . . . 1-2000' and so on or display the values as '>0-1000'. '>1000-2000' and so on, or some other unambiguous series of buckets.

Figure 163B:
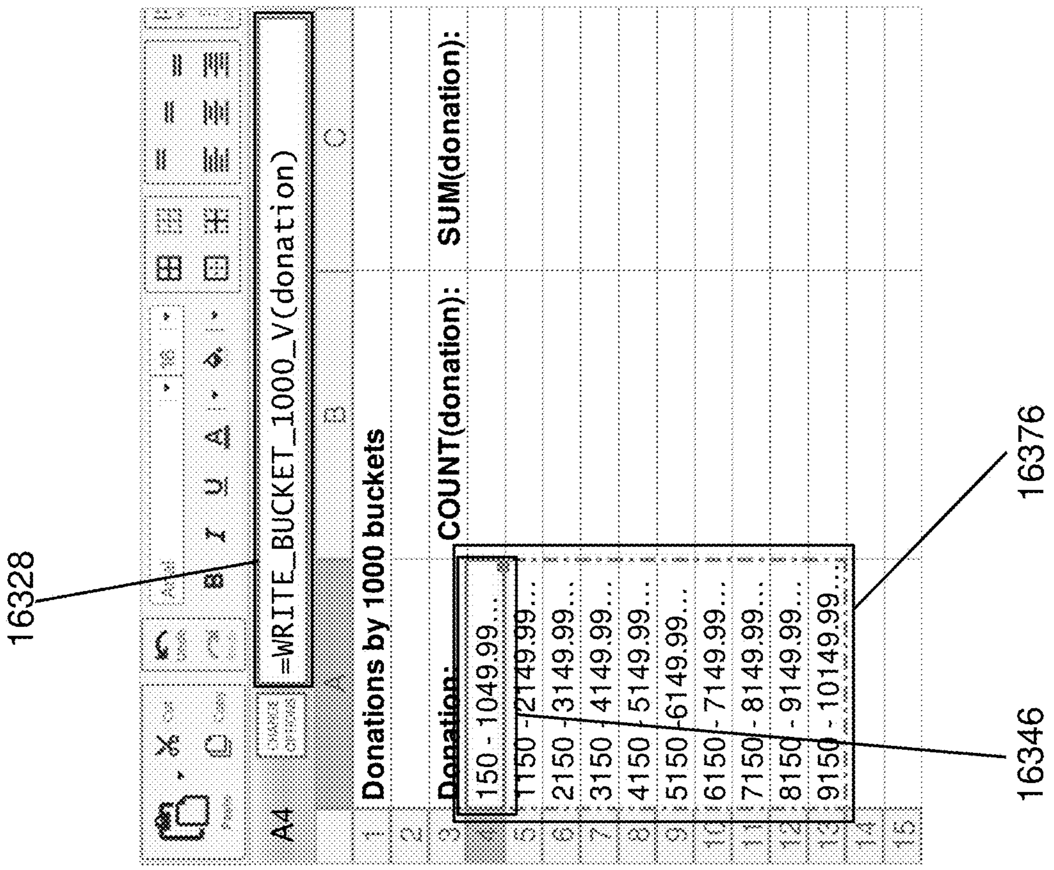
Figure 163A:
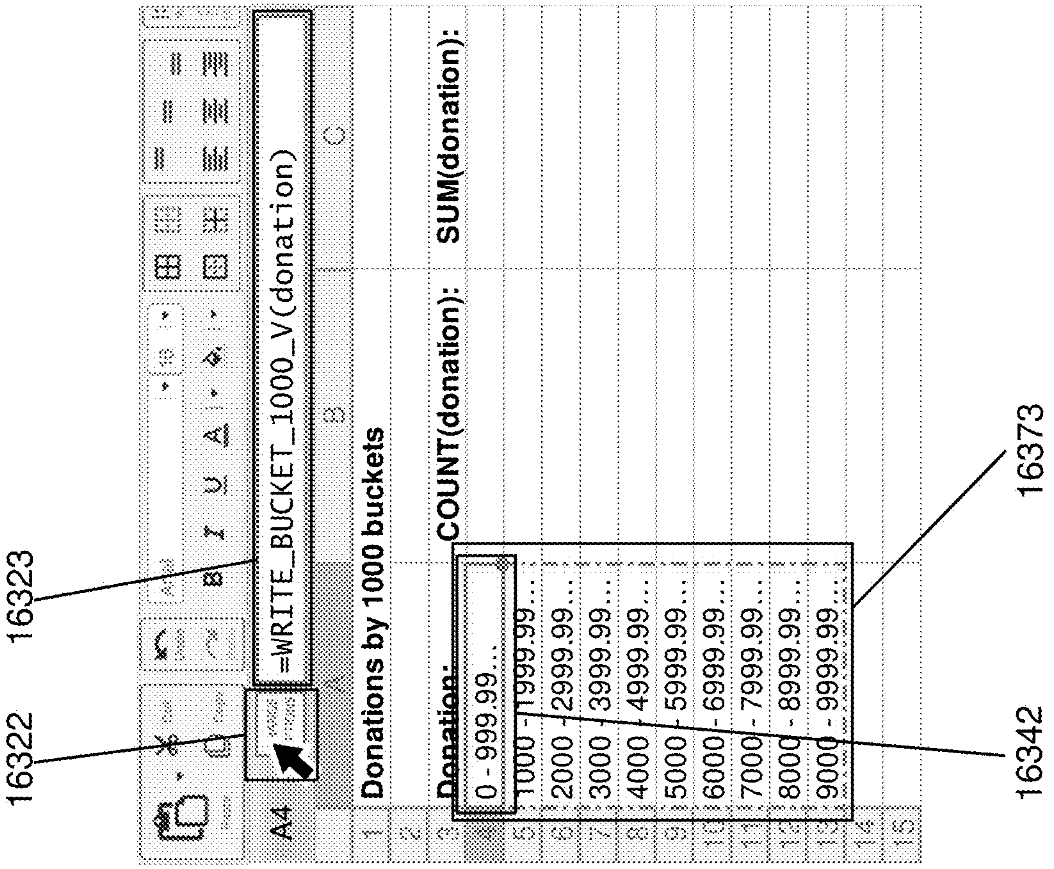
Figure 165B:
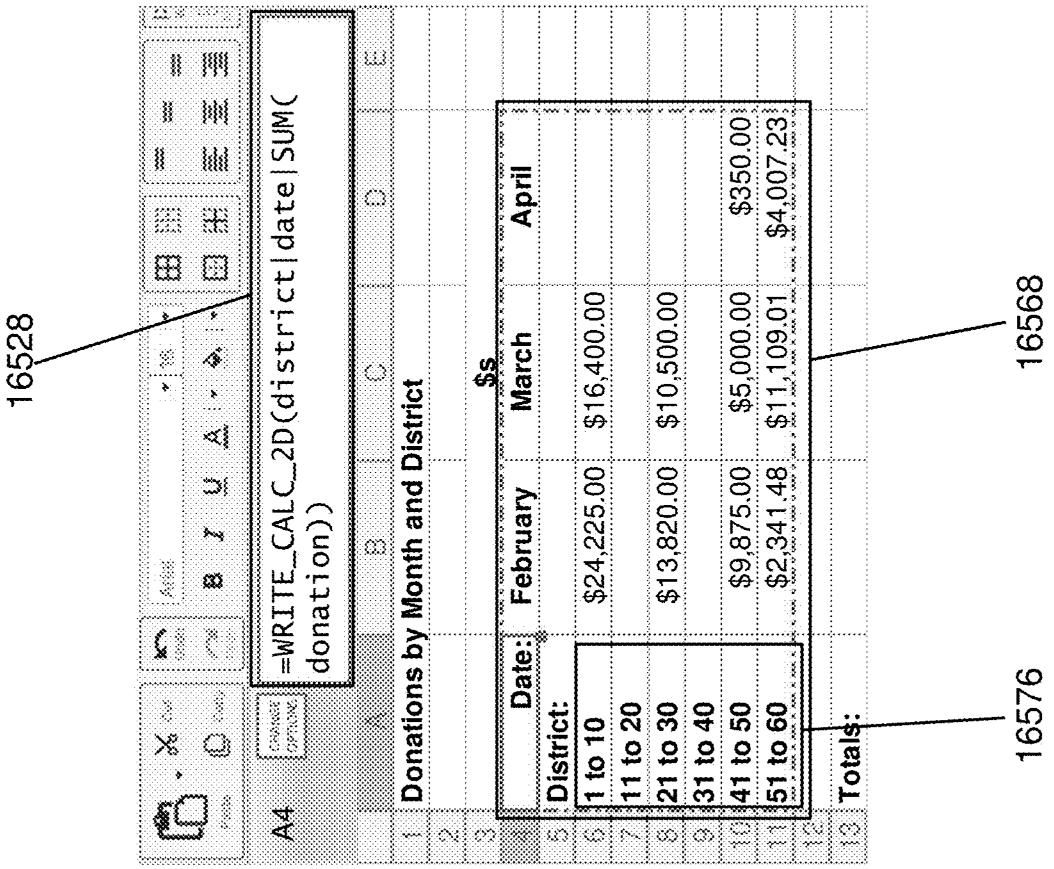
Figure 165A:
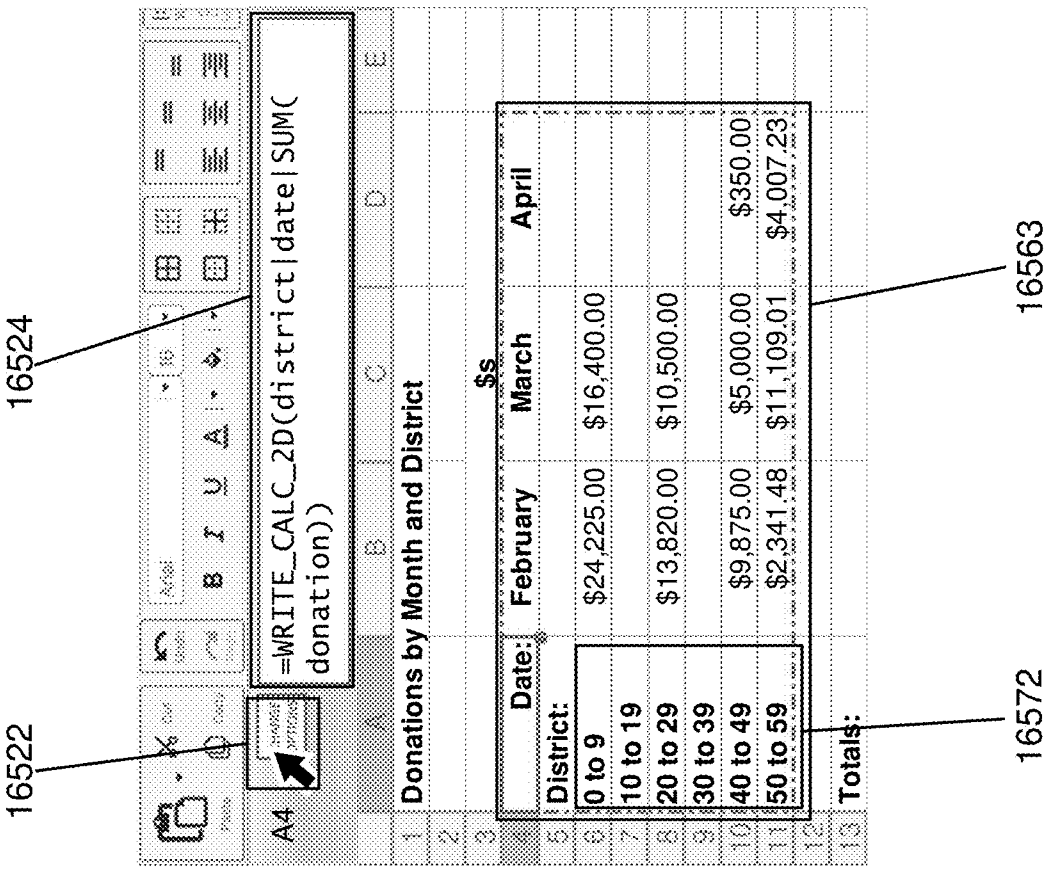
Figure 166A:
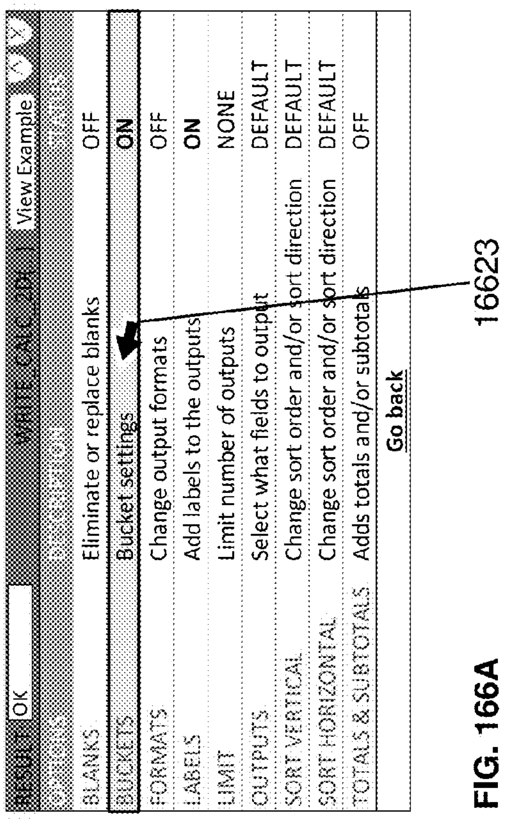
Figure 166B:
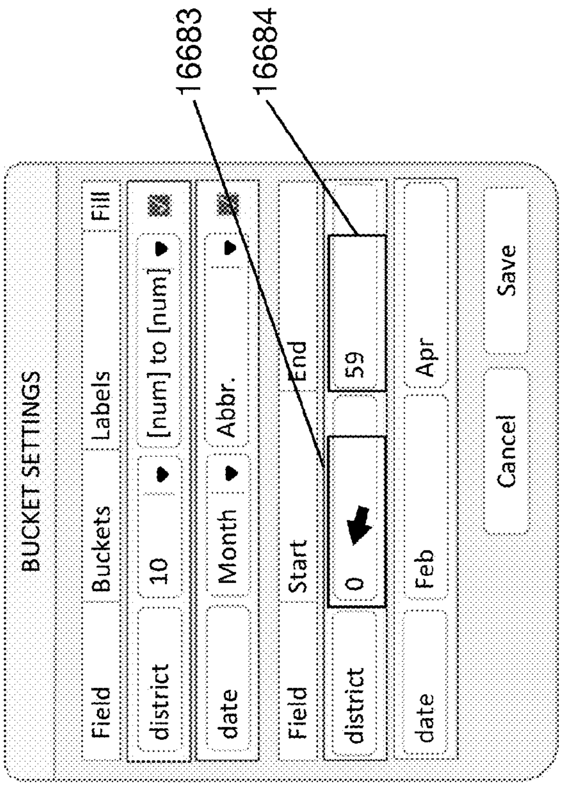
Figure 166C:
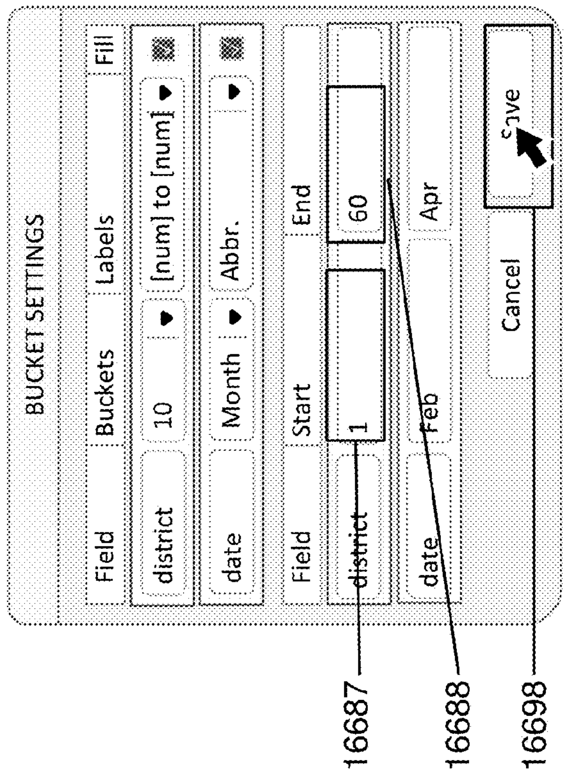
Figure 166D:
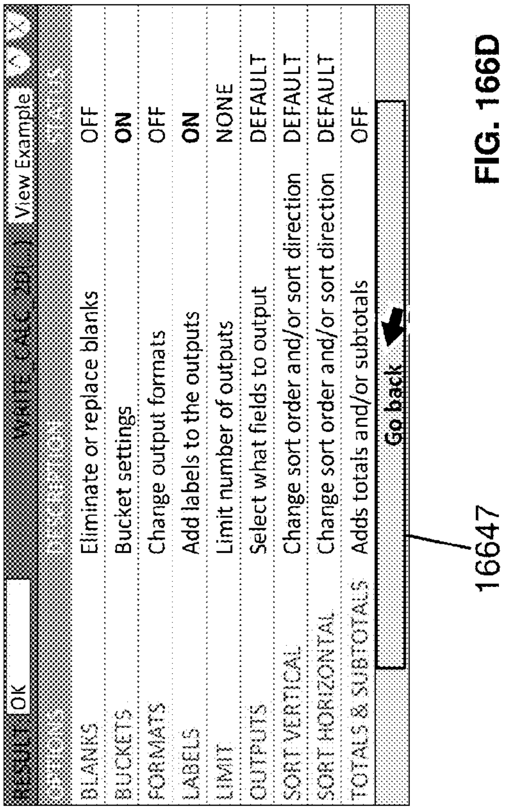

Our technology also supports the user specifying the bucket starting point. FIG. 163A through FIG. 164D examples the user starting with a formula that automatically fills missing buckets and automatically sets the bucket start/end point. That user then changes those start and end points. FIG. 163A shows the charity user starting with the finished formula 16323 and output 16373 for cell 'A4' 16342 with its automatically generated bucket/group start and end points as well as the automatically filling of missing buckets. However, the charity user has decided they want the buckets/groups to start at '150' rather than '0'. Therefore, in this embodiment the user clicks the 'CHANGE OPTIONS' button 16322 to open the 'OPTIONS' hint examples in FIG. 164A. The user then clicks the 'BUCKETS' optional specification 16433 to open the 'BUCKET SETTINGS' UI FIG. 164B where the user clicks into the 'Start:' box with the value '0' 16483. They then change that value to the desired '150' 16487 in FIG. 164C which in this embodiment automatically increments the 'End:' value to '10149.99 . . . ' 16488. The user is fine with that value, although they could have specified another value, so they click 'Save' 16498 to return to the 'OPTIONS' hint FIG. 164D. They now see that the 'STATUS' for 'BUCKETS' has changed from 'DEFAULT' before (in FIG. 164A 16433) to 'ON' 16438. You can also see that in this embodiment that 'DEFAULT' setting included 'FILL' be checked on 16475. The user then clicks the 'Go back' 16447 to deliver the revised bucket values 16376 in FIG. 164B starting with '150' in cell 'A4' 16346.

Figure 86B:
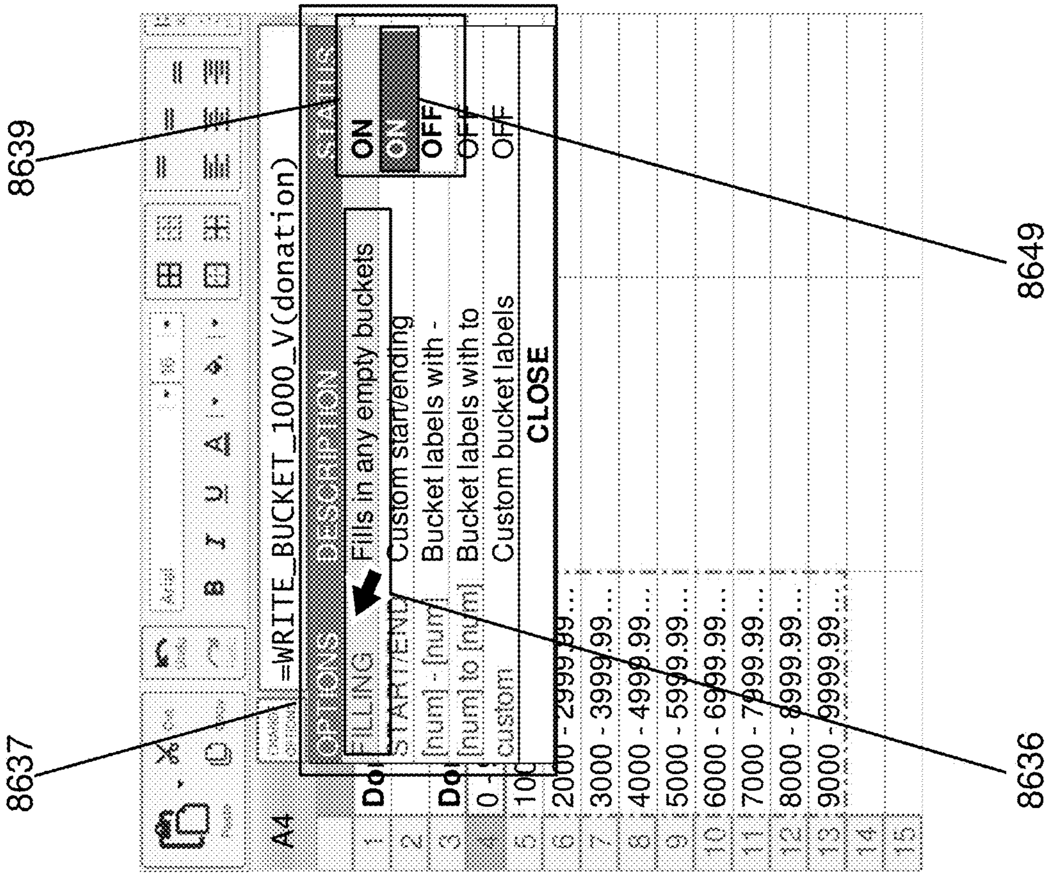
Figure 86A:
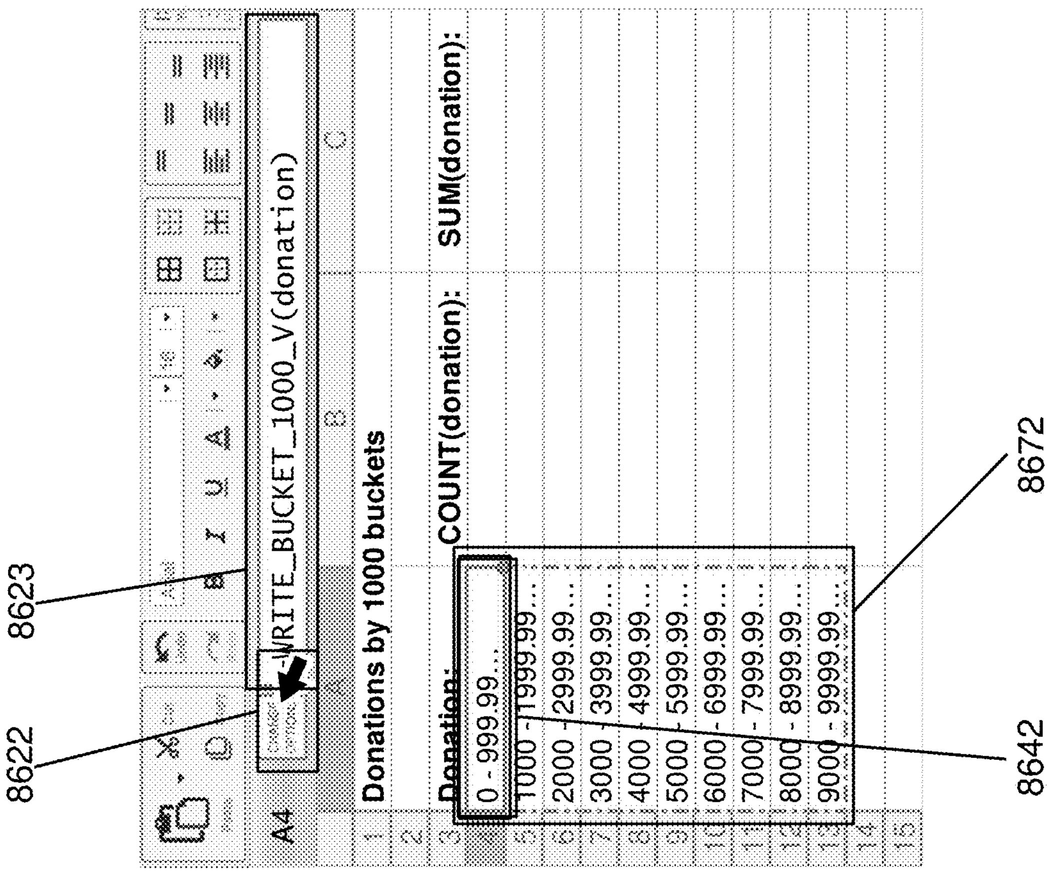
Figures 87A, 87B, 87C:
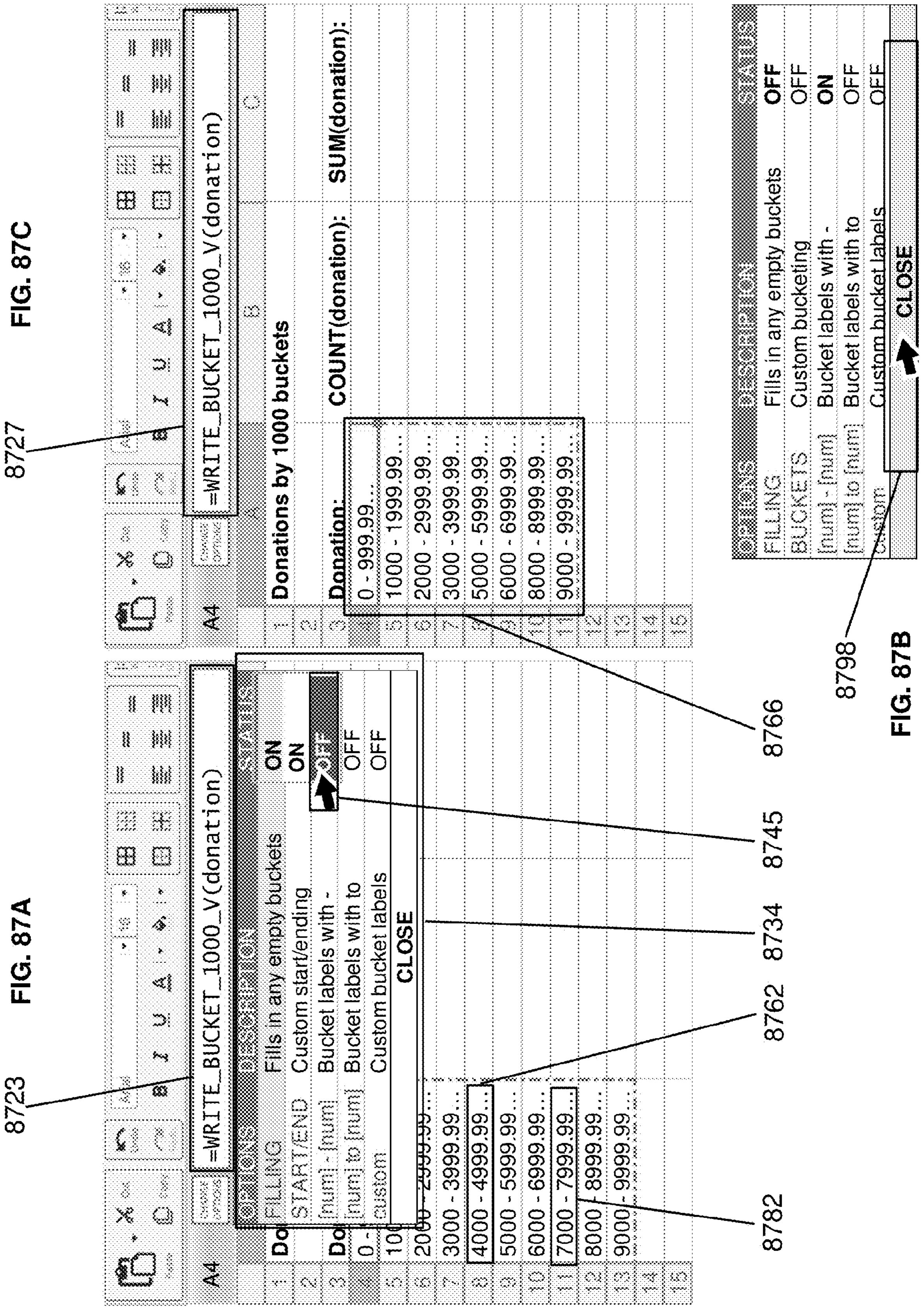

FIG. 86A through FIG. 88E examples a prespecified increment multi-value bucketing/grouping function employing NO filling and showing another type of OPTION HINT usage. FIG. 86A examples the charity user starting the process in this embodiment to turn off the bucket/group filling. The user is in cell 'A4' 8642 which, as previously shown in FIG. 84 through FIG. 85E, populates the buckets/groups 8672 with filling. However, once the user clicks the 'CHANGE OPTIONS' button 8622 it opens the 'OPTIONS' HINT 8637 in FIG. 86B where the user clicks the 'FILLING' option 8636 which in this embodiment opens the selector dropdown 8639 showing the current 'ON' 8649 setting. FIG. 87A then examples the user clicking the 'OFF' 8745 selection after which the user clicks the 'CLOSE' 8798 selection in FIG. 87B to get the unfilled bucket/group result 8766 in FIG. 87C. The filled buckets/groups '4000-4999.99 . . . ' 8762 in FIG. 87A and '7000-7999.99 . . . ' 8782 in FIG. 87A have been removed as shown in the illustratively recalculated steps in FIG. 88A through FIG. 88E. In this embodiment, because the option arguments are invisible, the formula 8723 and 8727 has not visibly changed despite the 'FILLING' option changing, as per our contemporaneous U.S. Application No. 63/337,576, titled "Methods and Systems for Spreadsheet Function and Flex Copy-Paste Control of Formatting and Use of Selection List Panels". However, in another embodiment the option arguments would be visible and therefore the user would see the change such as an option argument changing from 'FILLING[ON]' to 'FILLING[OFF]'.

Multi-Value Bucketing/Grouping Functions—Usable in Formulas Via Cell Reference

Figure 89B:
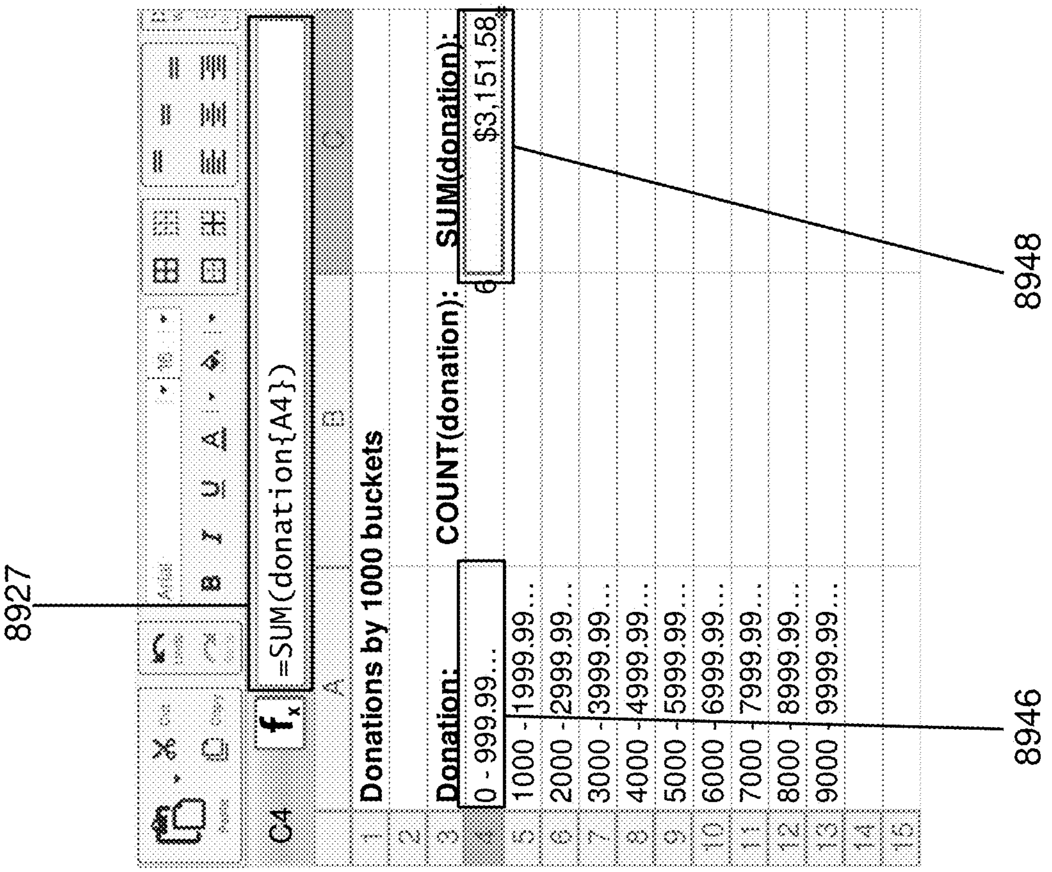
Figure 89A:
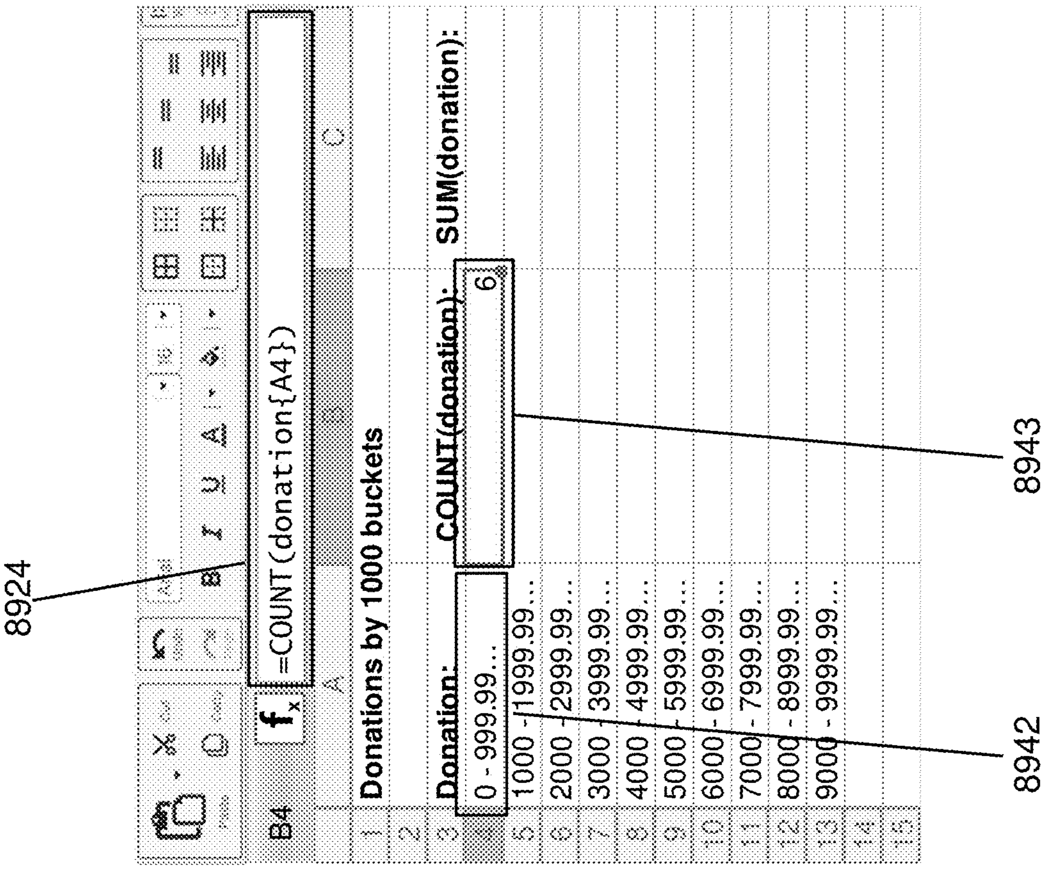
Figure 91B:
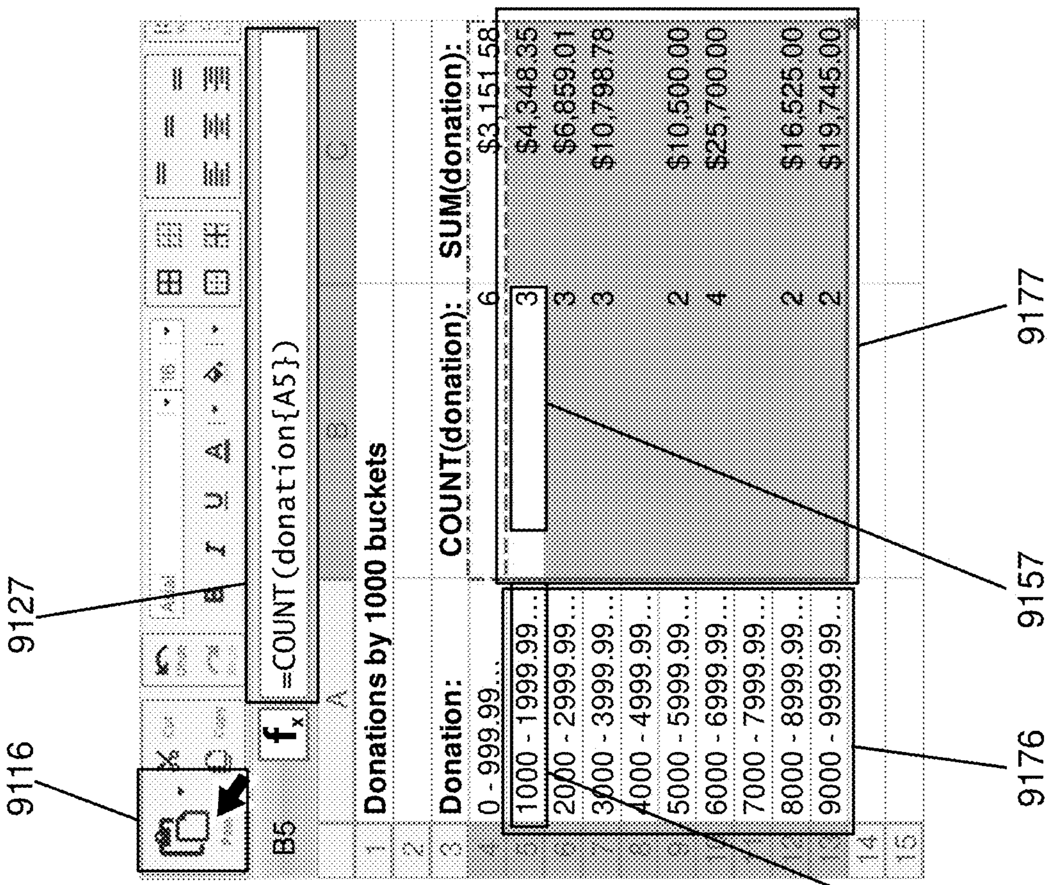
Figure 91A:
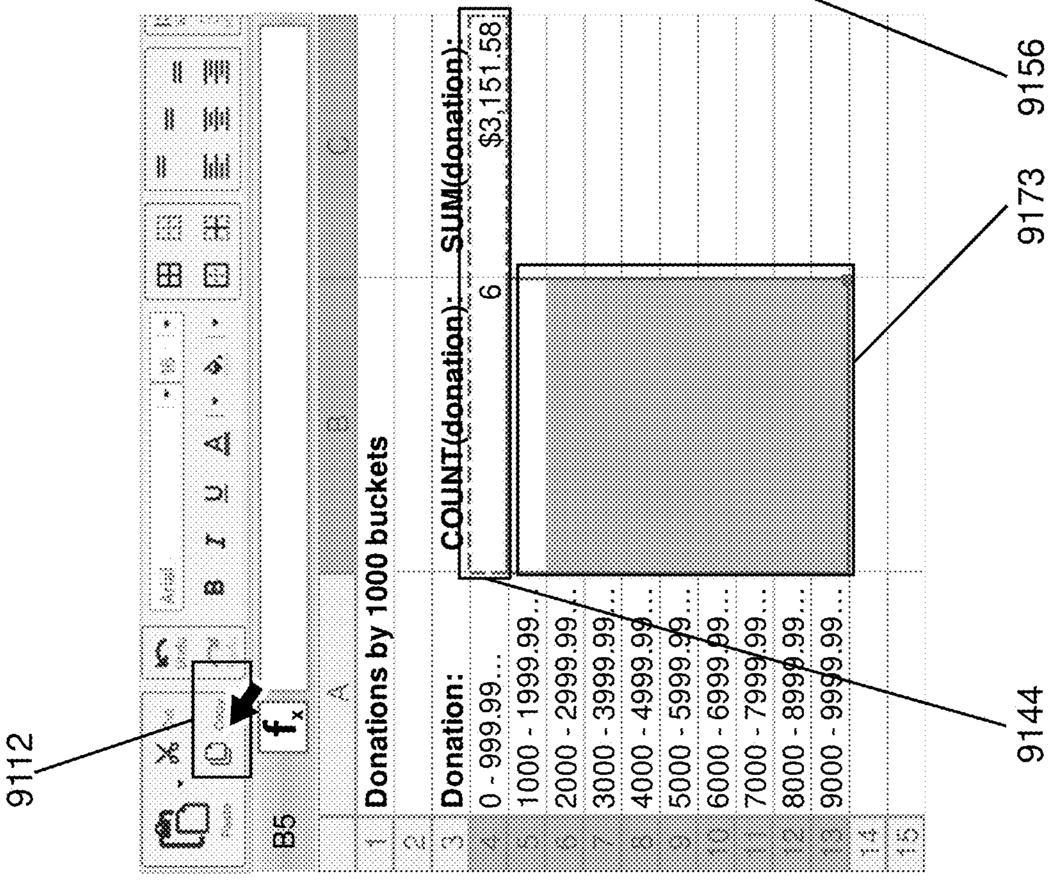

FIG. 89A through FIG. 90G examples formula usage of our multi-value bucketing/grouping function ('WRITE-_BUCKET_1000 V') generated values and their associated data in COUNT and SUM formulas. FIG. 89A examples the charity user creating in cell 'B4' 8943 a formula 8924:

'=COUNT(donation{$A4$})

This formula uses the bucket/group values in cell 'A4' 8942 as illustratively exampled in FIG. 90A through FIG. 90D where the 'COUNT' calculations in FIG. 90C use the bucket associated 'donation' data retrieved in FIG. 90B. FIG. 89B examples the charity user creating in cell 'C4' 8948 a formula 8927:

'=SUM(donation{$A4$})

This formula uses the bucket/group values in cell 'A4' 8946 as illustratively exampled in FIG. 90A and FIG. 90E through FIG. 90G where the 'SUM' calculations in FIG. 90F use the bucket associated 'donation' data retrieved in FIG. 90E. These examples used simple data summarization formulas, but our multi-value bucket/group function technology also supports complex analytical function formulas like those in FIG. 73B through FIG. 75E.

Multi-Value Bucketing/Grouping Functions—Usable in Formula Copy Paste

FIG. 91A through FIG. 92E examples our multi-value bucketing/grouping functions supporting the copy paste of formulas referencing the bucket/group values. The charity user is copying the formulas created in FIG. 89A and FIG. 89B in cells 'B4' and 'C4' 9144 highlighting the rows 9173 and clicking the 'Copy' button 9112. When they click 'Paste' 9116 in FIG. 91B they get the results illustratively calculated in FIG. 92A through FIG. 92E populating the cells 'B5' to 'C13' 9177 in FIG. 91B. Each of the copy pasted formulas references one of the multi-value bucket/group function generated values (and uses their associated data) as exampled by the cell 'B5' 9157 formula 9127 referencing cell 'A5' 9156. As mentioned before, these examples use simple data summarization functional formulas, but our multi-value bucket/group function technology also supports copy paste of complex analytical function formulas value/formulaic references like those in FIG. 76B through FIG. 79C.

Multi-Value Bucketing/Grouping Functions—Usable in Formula Flex Copy Paste

FIG. 93A through FIG. 93B examples our multi-value bucketing/grouping functions supporting flex copy paste of formulas referencing the bucket/group values. The charity user is copying the formulas created in FIG. 89A and FIG. 89B in cells 'B4' and 'C4' 9344 highlighting the rows 9353 and clicking the 'Copy' button 9312. When they click 'Paste' dropdown triangle 9316 in FIG. 91B to get the dropdown 9327 where they click the 'Flex' selection 9337 to get the results illustratively calculated in FIG. 92A through FIG. 92E populating the cells 'B5' to 'C13' 9377 in FIG. 93B. These values are created using the associated data for the buckets/groups in cells 'A5' to 'A13' 9376 and will flex with any changes to the formula populating those cells. As mentioned before, these examples use simple data summarization formulas, but our multi-value bucket/group function technology complex also supports copy paste of complex analytical function formulas value/formulaic references like those in FIG. 76B through FIG. 79C.

Multi-Value Bucketing/Grouping Functions—Filling and Flexing

Figures 94A, 94B:
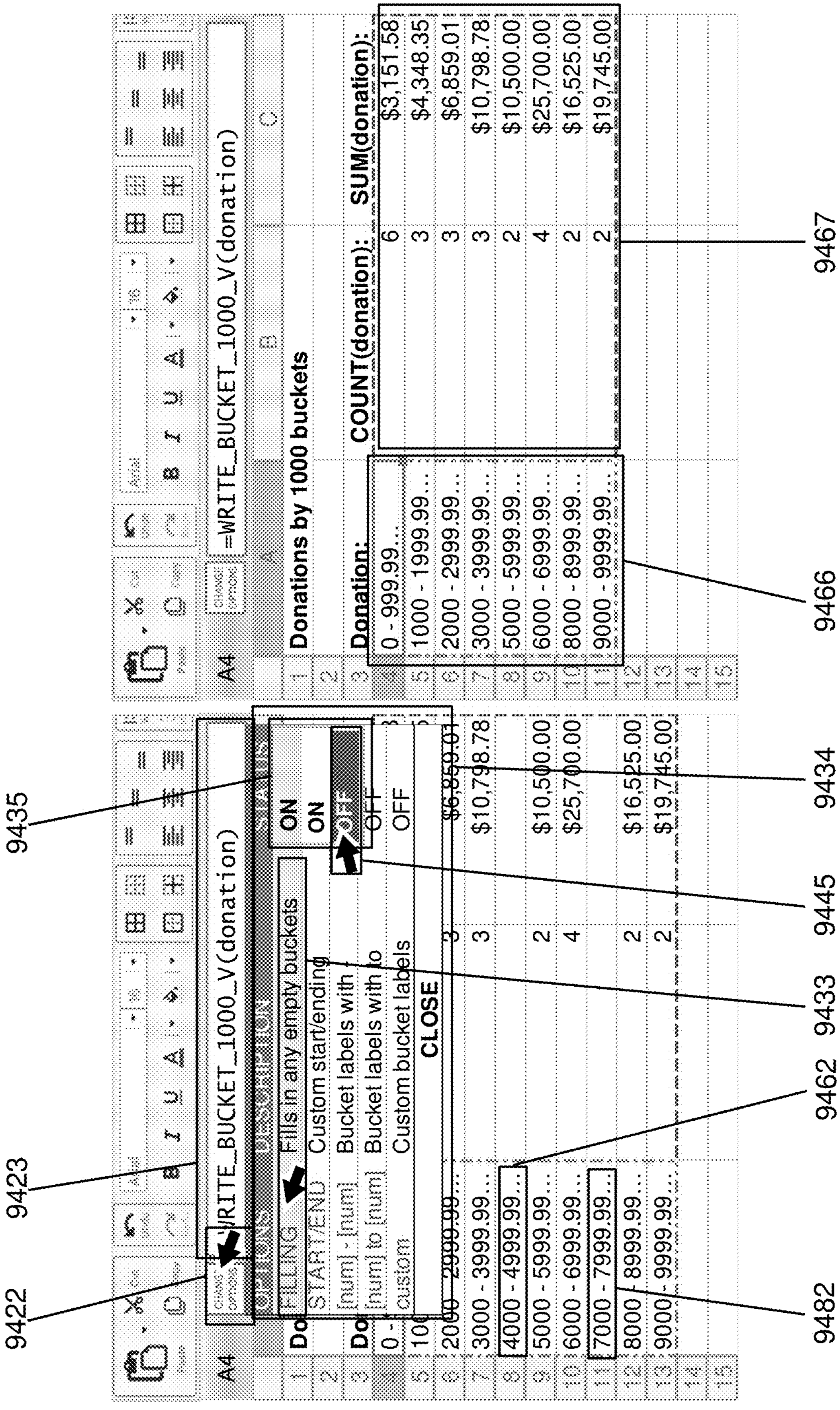

FIG. 94A through FIG. 96B examples the filling and flexing capabilities of our multi-value bucketing/grouping functions and the flex copy pasted cells referencing them. FIG. 94A examples the charity user turning off bucket/group filling by first clicking the 'CHANGE OPTIONS' button 9422 to open the HINT 9434, clicking on the 'FILLING' option 9433 to open the filling dropdown 9435 where they click 'OFF' 9445 to remove the two filled buckets/groups 9462 in FIG. 94A and 9482 in FIG. 94A in the buckets/groups 9466 in FIG. 94B. This causes the flex copy paste cells 9467 to shrink (flex). FIG. 95A examples how each of the 'WRITE_BUCKET' cells has a formula, exampled for cell 'A11' 9582 with the formula 9524 shown in the formula bar. This formula 9524:

'=WRITE_BUCKET_1000(donations{!$BT$_8})' could instead have been a 'BUCKET' freestanding formula populated by the 'WRITE' as follows:

'=BUCKET_1000(donations{!$BT$_8})'

Figure 95A:
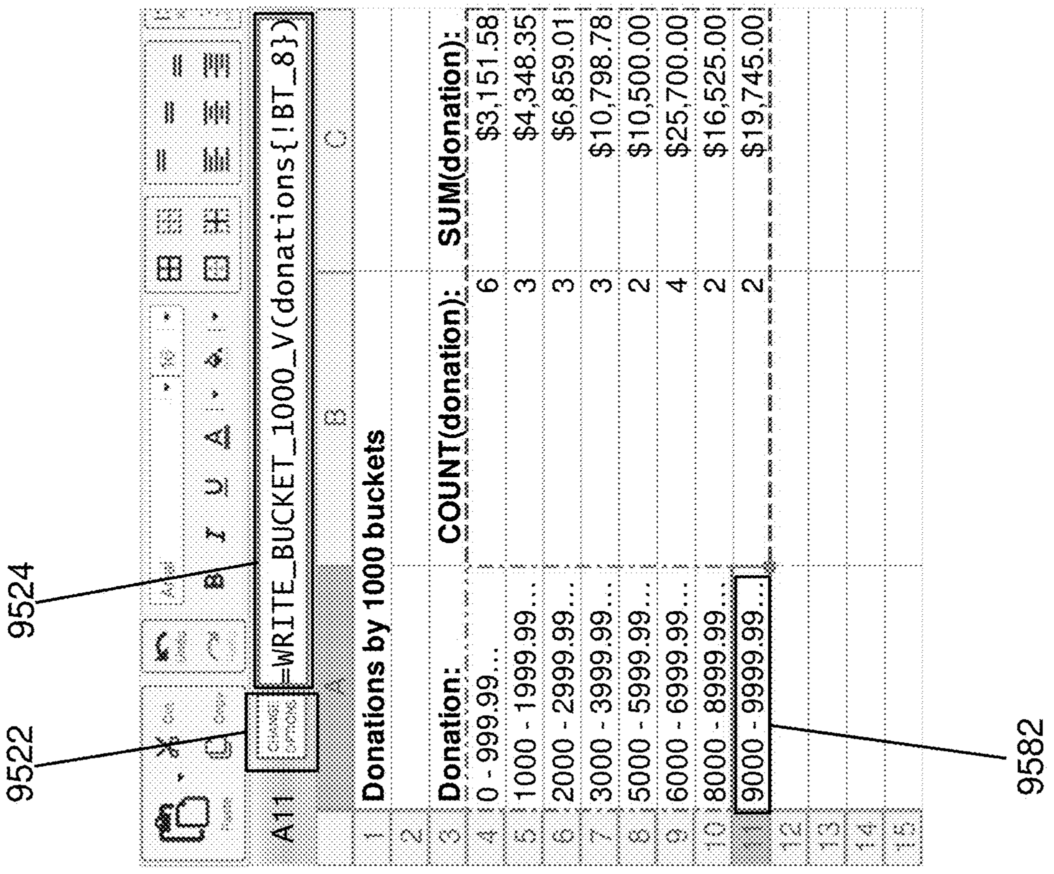
Figure 95B:
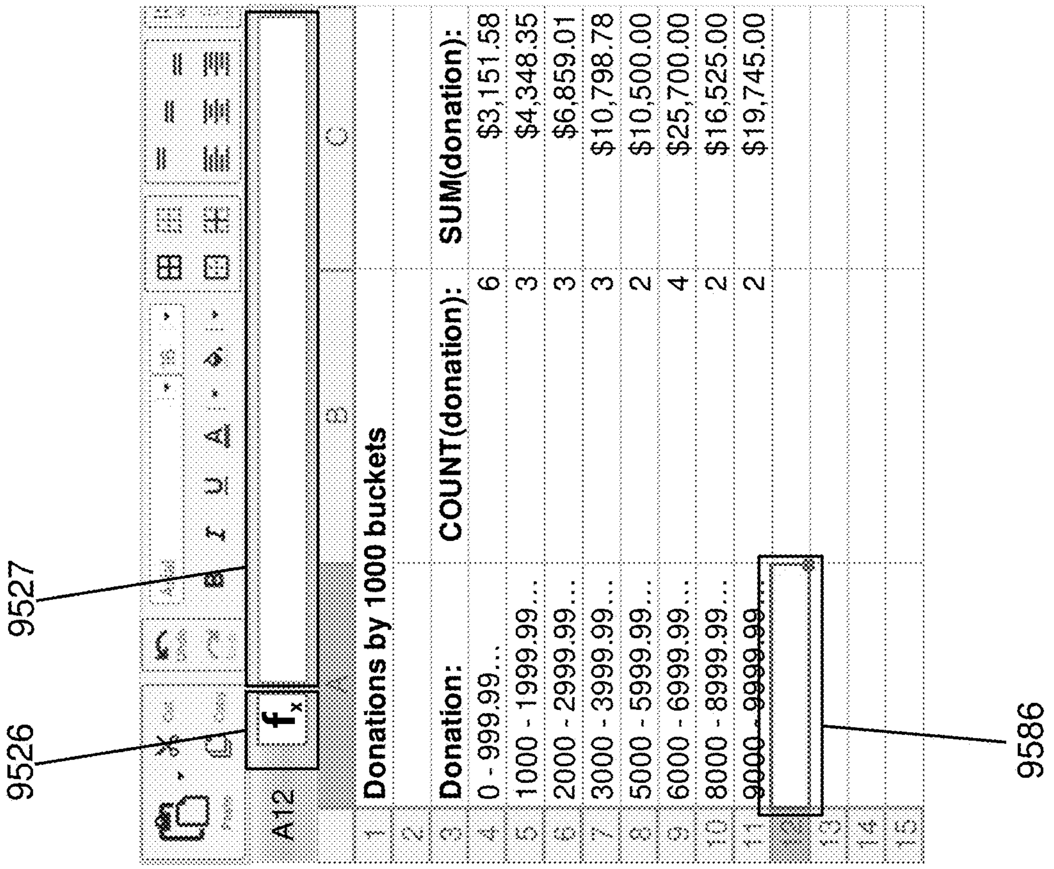
Figure 96B:
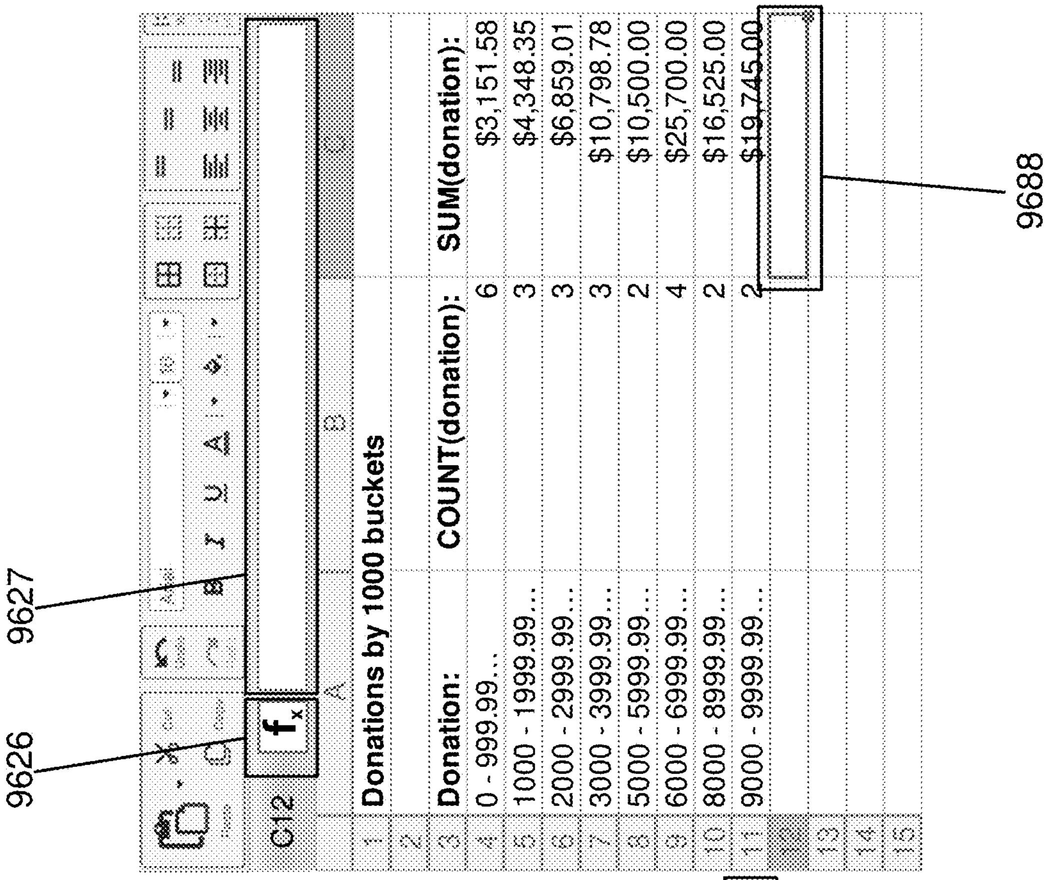
Figure 96A:
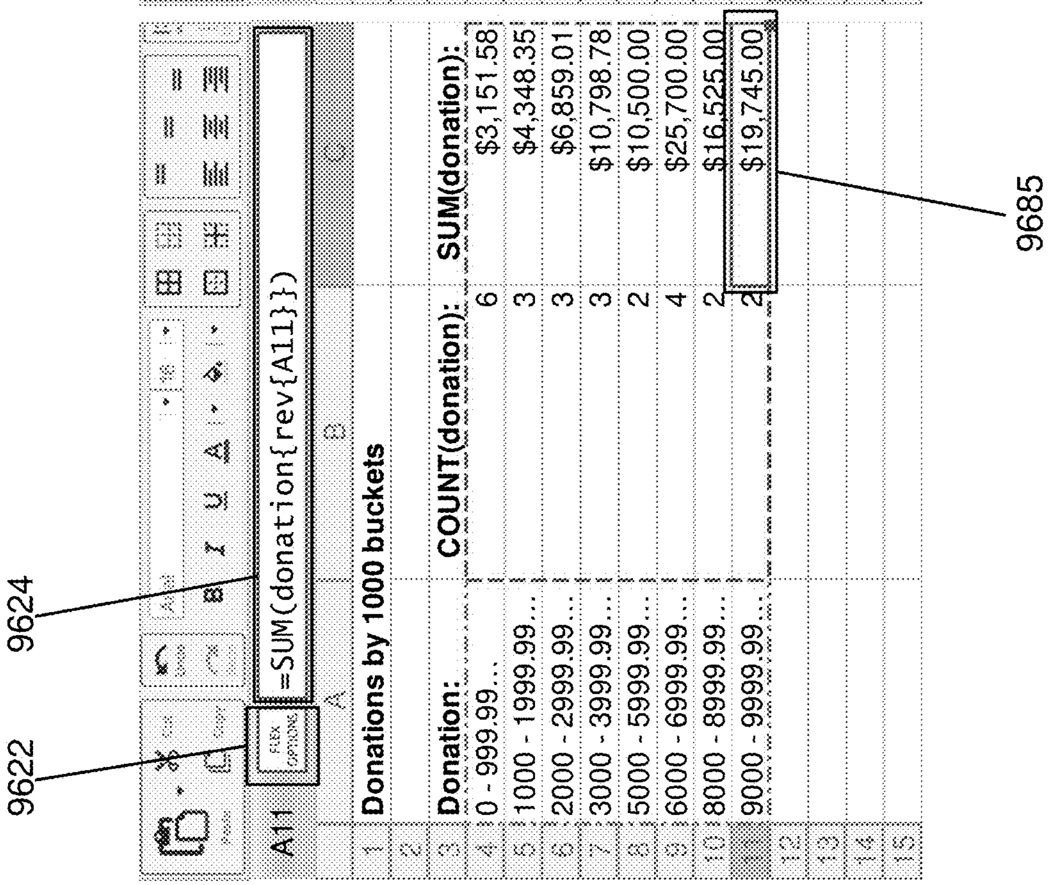

FIG. 95B examples how the flex collapsed cell 'A12' 9586 (previously populated by a bucket/group with 'FILLING' 'ON') has no formula 9527. And in this embodiment is also shown to not be part of the bucketed/grouped area because it lacks the orange outlining for both cell 'A12' 9586 and the formula bar 9527 and has the '$f_x$' button 9526 instead of the 'orange 'CHANGE OPTIONS' button 9522 shown in FIG. 95A. Likewise, the flex copy pasted formula each have a formula 9624 as exampled for cell 'C11' 9685 in FIG. 96A while the previously populated flex cells have no formula 9627 as exampled for cell 'C12' 9688 in FIG. 96B. In this embodiment the flex blue and related orange cell outlining and 'FLEX OPTIONS' button 9622 shown in FIG. 96A is gone with no cell outlining the '$f_x$' button 9626 instead in FIG. 96B.

Multi-Value Bucketing/Grouping Functions—Constraints

Figure 97B:
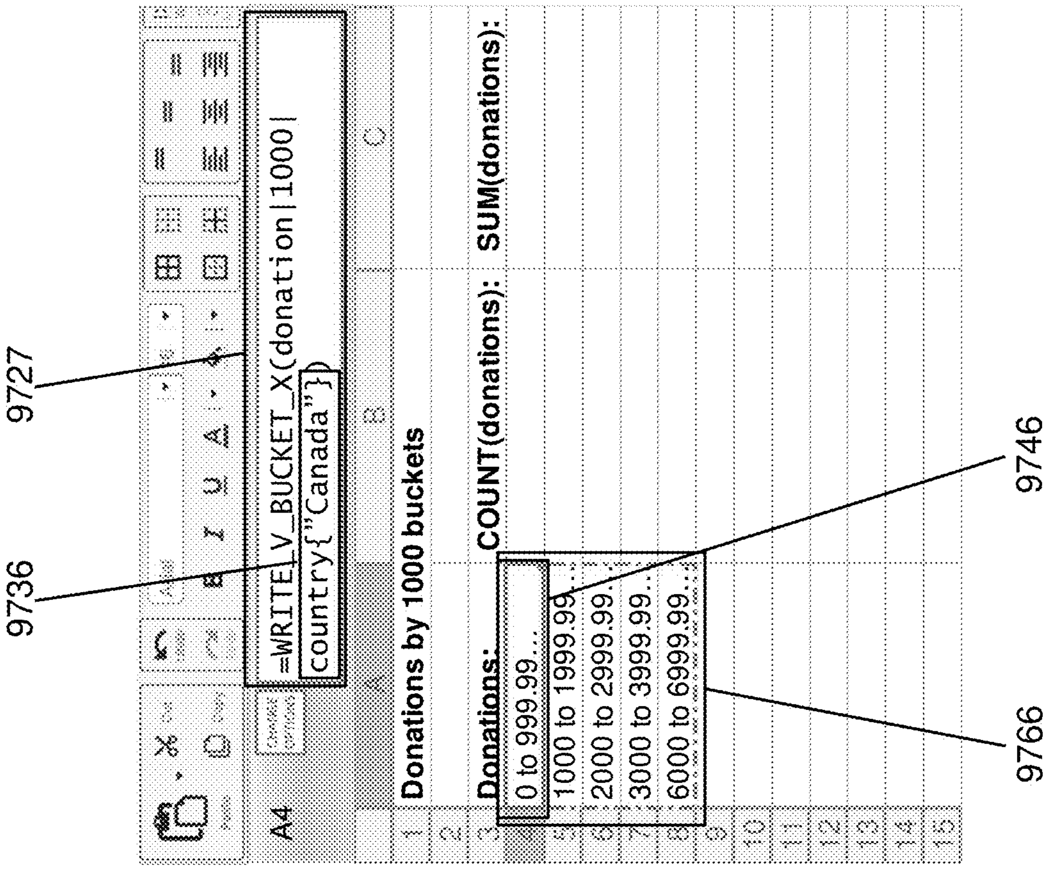
Figure 97A:
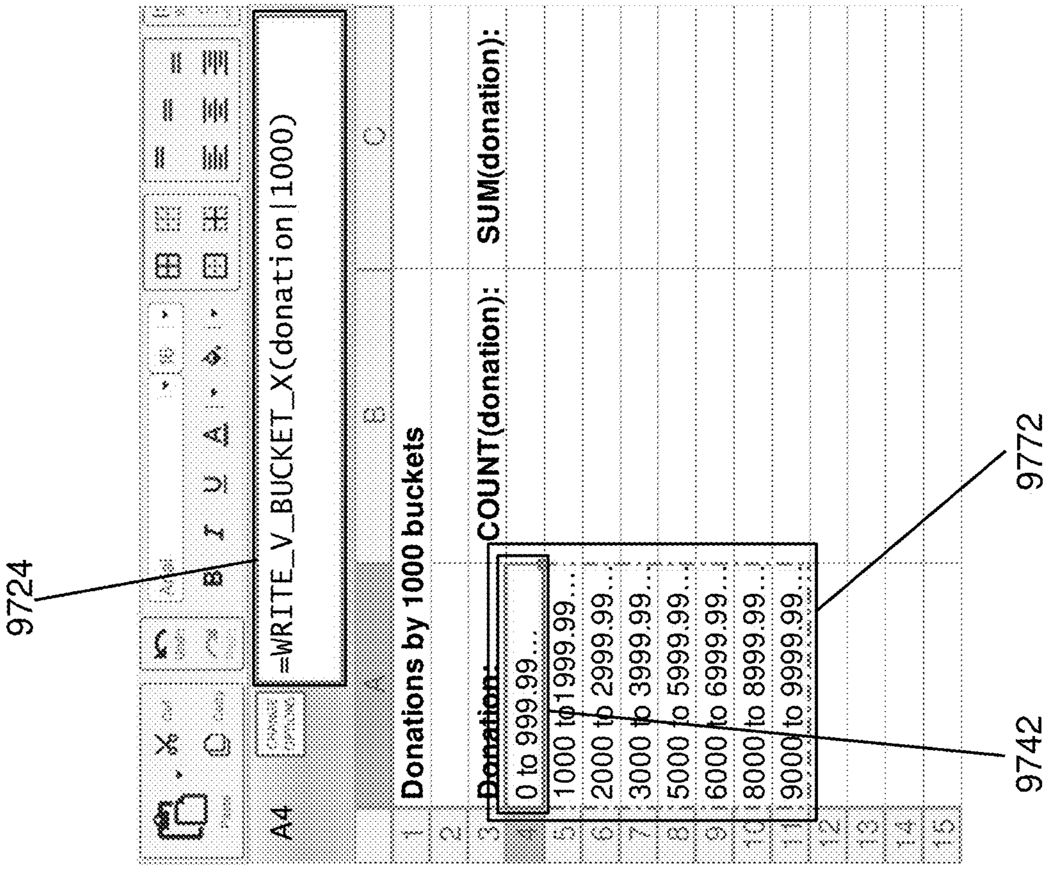

FIG. 97A through FIG. 99F examples our multi-value bucketing/grouping function technology supporting constraints/filters and user selected labels in generating values. FIG. 97A examples our 'WRITE_BUCKET_X' function formula 9727 for cell 'A4' 9742 generating bucket/group values 9772 with no constraint. FIG. 97B then examples the same 'WRITE_BUCKET_X' function for cell 'A4' 9746 generating bucket/group values 9766 with a constraint of 'country {"Canada" }' 9736 in the functional formula 9727. The difference is the no constraint formula 9724 populates eight cells 'A4' to 'A11' 9772 (as illustratively exampled in FIG. 98A through FIG. 98F) while the constrained formula 9727 populates only five cells 'A4' to 'A8' 9766 (as illustratively exampled in FIG. 99A through FIG. 99G). All of this was done where the user had previously selected a manually set label using 'to' between values rather than the default automatic usage in this embodiment of '-'. However, the user also could have opted to create a custom label which in this example they did not do. The user also selected the increment of '1000' from the set of increment specifications they were offered which includes all the check marked options in FIG. 98D but none of the 'X' marked specifications because those either generate no bucketed/grouped values or generate only one bucket for all the data.

Figure 100B:
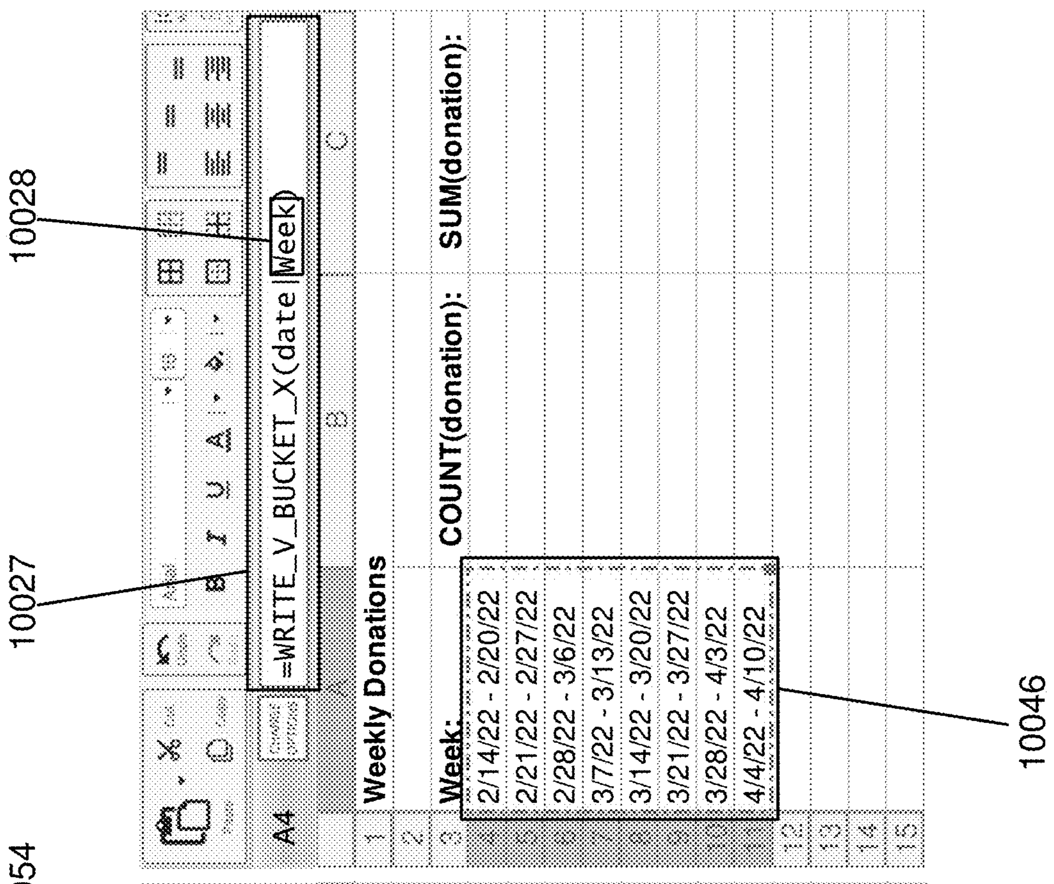
Figure 100A:
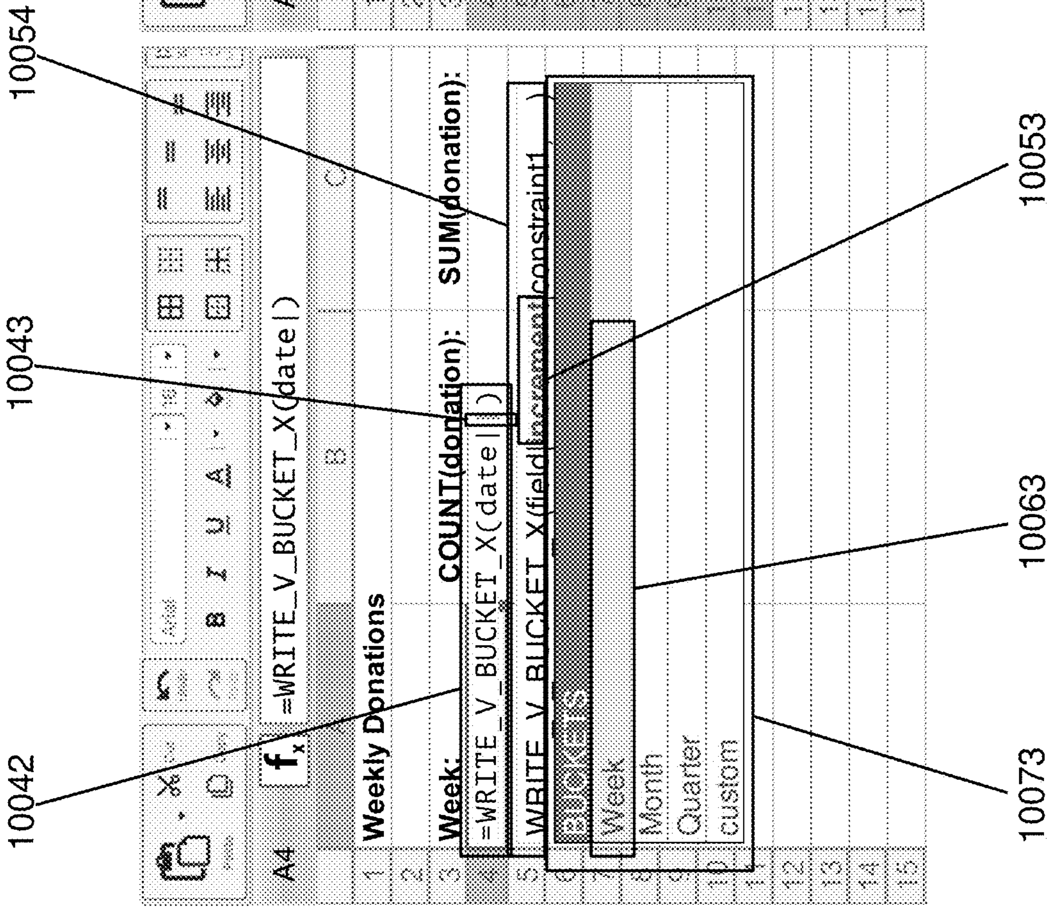

Multi-Value Bucketing/Grouping Functions—Date Buckets/Groups and Intelligent Increments FIG. 100A through FIG. 101E examples our multi-value bucketing/grouping function technology supporting date buckets/groups and intelligent bucket/group increment options. FIG. 100A examples the charity user in the process of creating a 'WRITE_BUCKET_X' formula at the stage of selecting/specifying 10043 the 'increment' 10053 value from the HINT 10073. The 'INCREMENTS' are intelligently determined by our application as exampled in FIG. 101C. Here our application works as previously described to determine the set of bucket/group increment specifications fitting the data, namely results with at least two values that are different than the data ungrouped. In this example eliminating 'Minute' and 'Hour' because those are not specified in the data FIG. 101B. Our technology eliminates 'Day', it does not result in bucketing/grouping of at least two unique values in the data as the data is already in the equivalent day buckets/groups. 'Week', 'Month' and 'Quarter' are all presented to the user because they result in at least two buckets/groups and group at least two unique data values. 'Year' and 'Decade' are not presented to the user because they do not result in more than one group/bucket given this data. The user is also presented with a 'Custom' specification option where they can select custom increments of days, weeks or even months in this example. The user selects 'Week' 10063 in the hint 10073 which gets populated 10028 into the finished formula 10027 giving the buckets in cells 'A4' to 'A11' 10046 from the illustrative steps exampled in FIG. 101A through FIG. 101E.

Multi-Value Bucketing/Grouping Functions—Date Buckets/Groups Use in Cell Calculations FIG. 102A and FIG. 102B examples that our multi-value bucketing/grouping function generated date buckets are usable with their associated data as our previous numerical examples. FIG. 102A examples the user populating cells 'A4' to 'A12' 10262 with weekly date buckets from the formula 10224 in cell 'A4' 10242. FIG. 102B then examples the user doing the 'COUNT' formula calculation 10227 in cell 'B7' 10267 using the bucket/group value 10228 and its associate data referenced in cell 'A7' 10266 from the illustrative steps exampled in FIG. 68A through FIG. 68E.

Figure 103A:
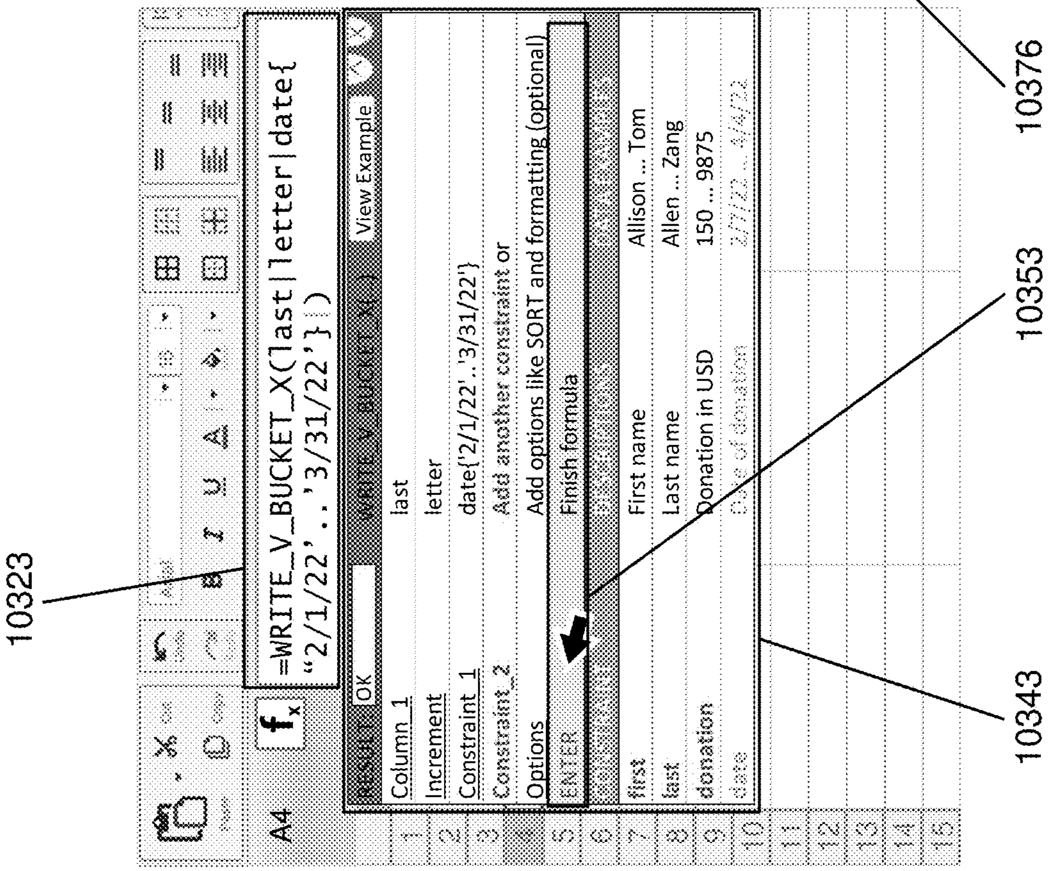
Figure 103B:
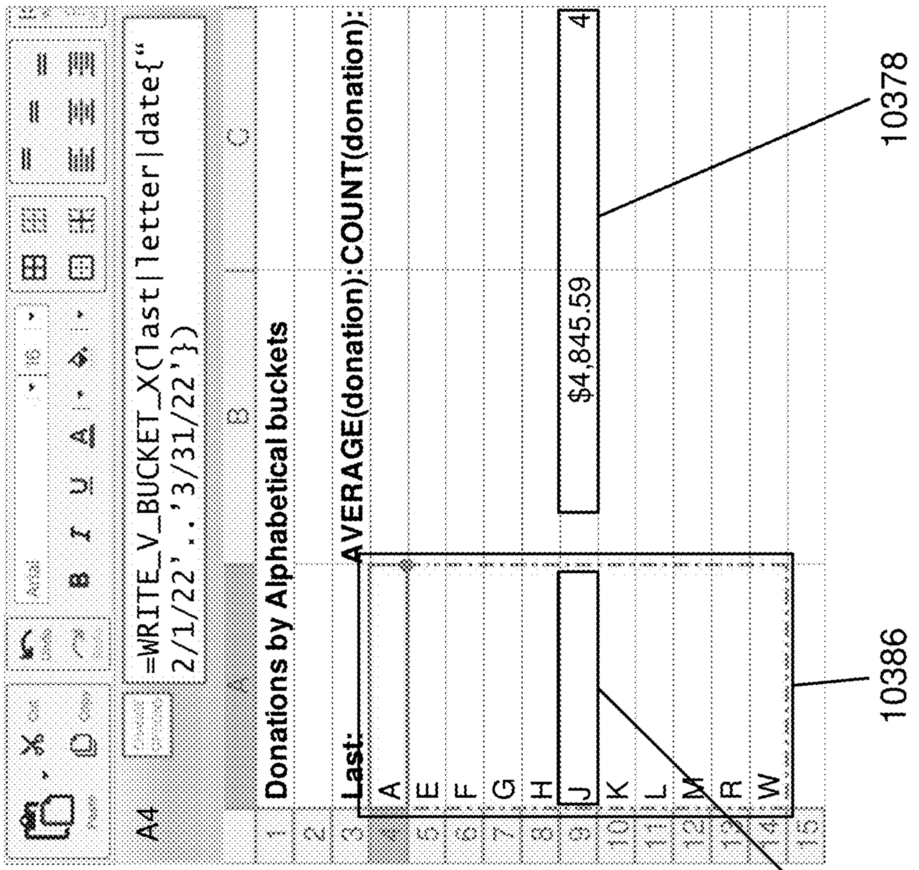

Multi-Value Bucketing/Grouping Functions—Alphabetical/Alphanumeric Buckets/Groups with No Fill and Constraints FIG. 103A through FIG. 105C examples our multi-value bucketing/grouping function technology supporting alphabetical text buckets/groups with no fill and a constraint, and their usage with their associated data in cell functional formulas. FIG. 103A examples the user finishing the formula 10323 with a click 10353 in a hint 10343 to populate cells 'A4' through'A14' 10386 in FIG. 103B with alphabetical buckets generated from the automatic illustrative steps exampled in FIG. 104A through FIG. 104E. The charity user then does the 'AVERAGE(donation)' and 'COUNT(donation)' calculations in cells 'B9' and 'C9' 10378 referencing the bucket/group value 'J' 10376 and its associated data via the illustrative steps automatically done for the cell formulas as exampled in FIG. 105A/FIG. 105B 10553 and FIG. 105C 10548. Exampling the use of alphabetical buckets/groups in cell formulas which in this situation are simple data summarization calculations but could have instead been complex analytical formulas using multiple range/array and/or non-range/array functions with multiple algebraic operators and functions within functions.

There are other mix and match combinations of capabilities and types of data supported by our 'WRITE . . . BUCKET . . . ' function variants, however rather than continuing to do the mix and match examples we are going to move to exampling how our bucketing/grouping technology can be added as an option to existing functions. We will example two different types of function situations, one where it is used in a function that populates multiple cells and the second where it is used in a function that populates a single cell.

Bucketing/Grouping Optional Specification in Functions Populating Multiple Cells—2D Function Our technology supports many different functions which can populate multiple cells with values. A number of these have been the subject of previous patent filings and referenced herein. FIG. 106A through FIG. 113B examples one of our two-dimensional multiple cells populating functions (WRITE_CALC_2D) with the addition of our new optional buckets/groups capability working for both numeric and date bucketing/grouping. 'WRITE_CALC_2D' is a versatile version of the two-dimensional functions that were the subject of our U.S. Provisional Patent Application No. 63/240,828. It combines several capabilities including the ability to do calculations with range/array functions, non-range/array functions and/or complex algebraic operations. We will start with the charity user doing a simple 'SUM' calculation and then will later example complex calculations using bucketed/grouped values.

Figure 106A:
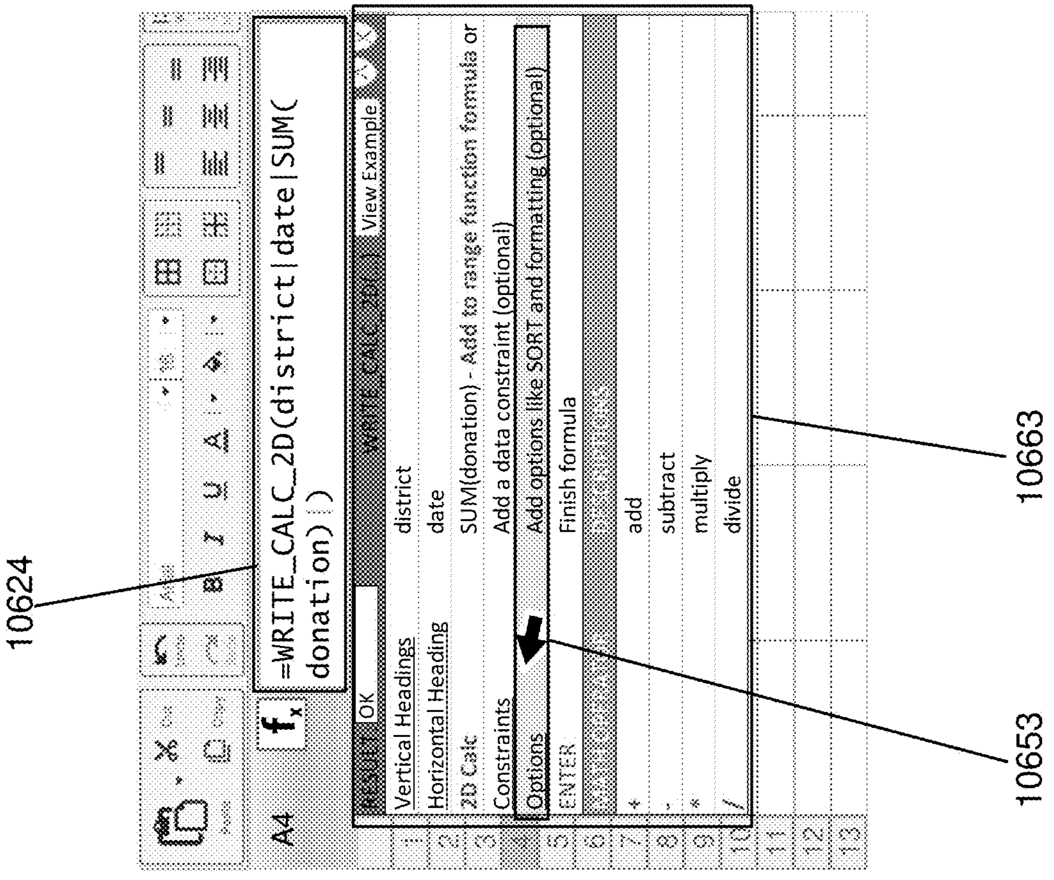
Figure 106B:
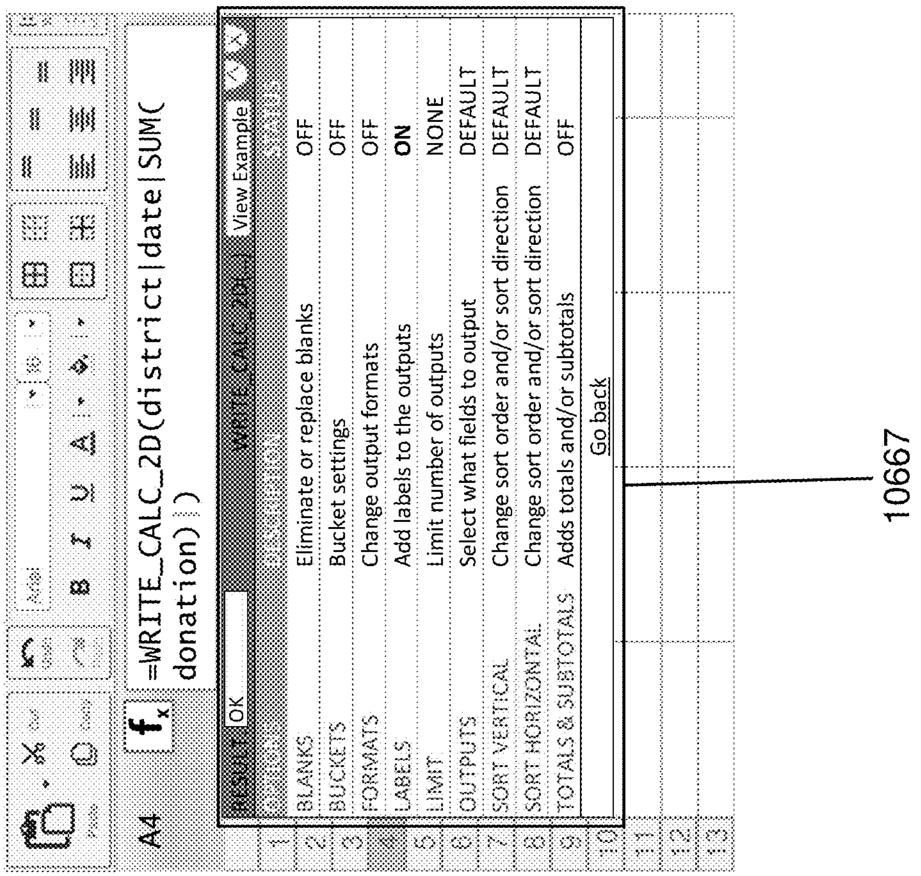
Figures 107A, 107B, 107C, 107D, 107E:
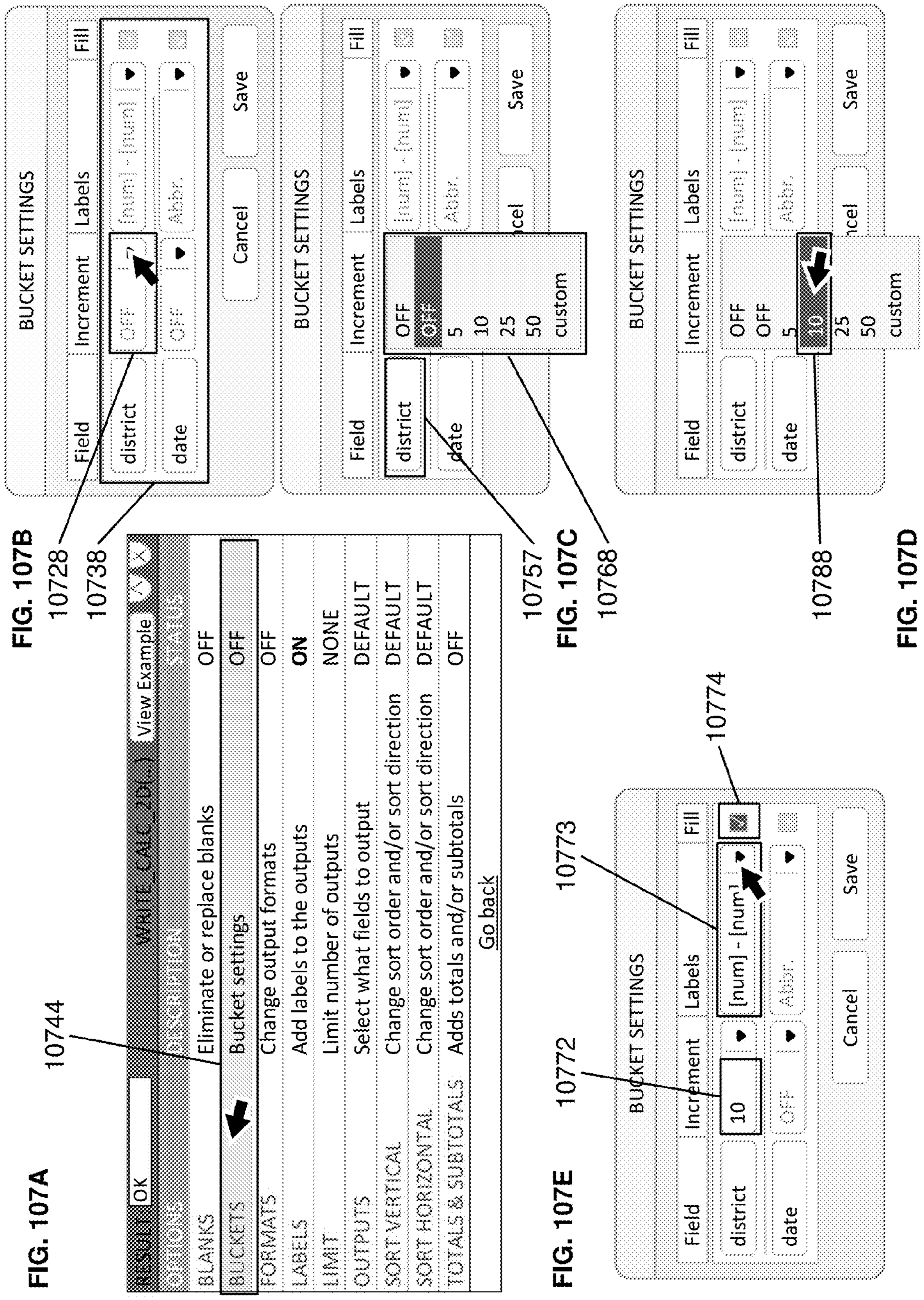

FIG. 106A examples the charity user looking to setup a two-dimensional summary of their donations by district and date buckets/groups. They have created the formula 10624 they desire:

=WRITE_CALC_2D(district|date|SUM(donation))

However, this formula will not bucket/group the 'district' and 'date' values so in this embodiment the user clicks 'Options' 10653 in the hint 10663. This opens the 'OPTIONS' hint 10667 in FIG. 106B. The user then selects the 'BUCKETS' specification 10744 in FIG. 107A to open the 'BUCKET SETTINGS' popup in FIG. 107B. This gives the user the option to bucket/group the 'WRITE_CALC_2D headings 10738. The user starts by clicking the 'district' bucket 'Increment' dropdown selector 10728 in FIG. 107A to get the 'district' 10757 Intelligent bucketing/grouping options 10768 in FIG. 107C. The user then selects '10' 10788 in FIG. 107D as shown in 10772 in FIG. 107E. The user then decides to change the grouping/bucketing labels by clicking 10773 (and notes that this embodiment defaults to the 'FILL' checked 10774 as ON, which they are fine with). This click opens the 'Label' selector 10824 in FIG. 108A which gives the user the option to select a different labelling approach or set a custom one. They select the '[num] to [num]' option 10839 in FIG. 108B.

Figures 108A, 108B, 108C, 108D, 108E:
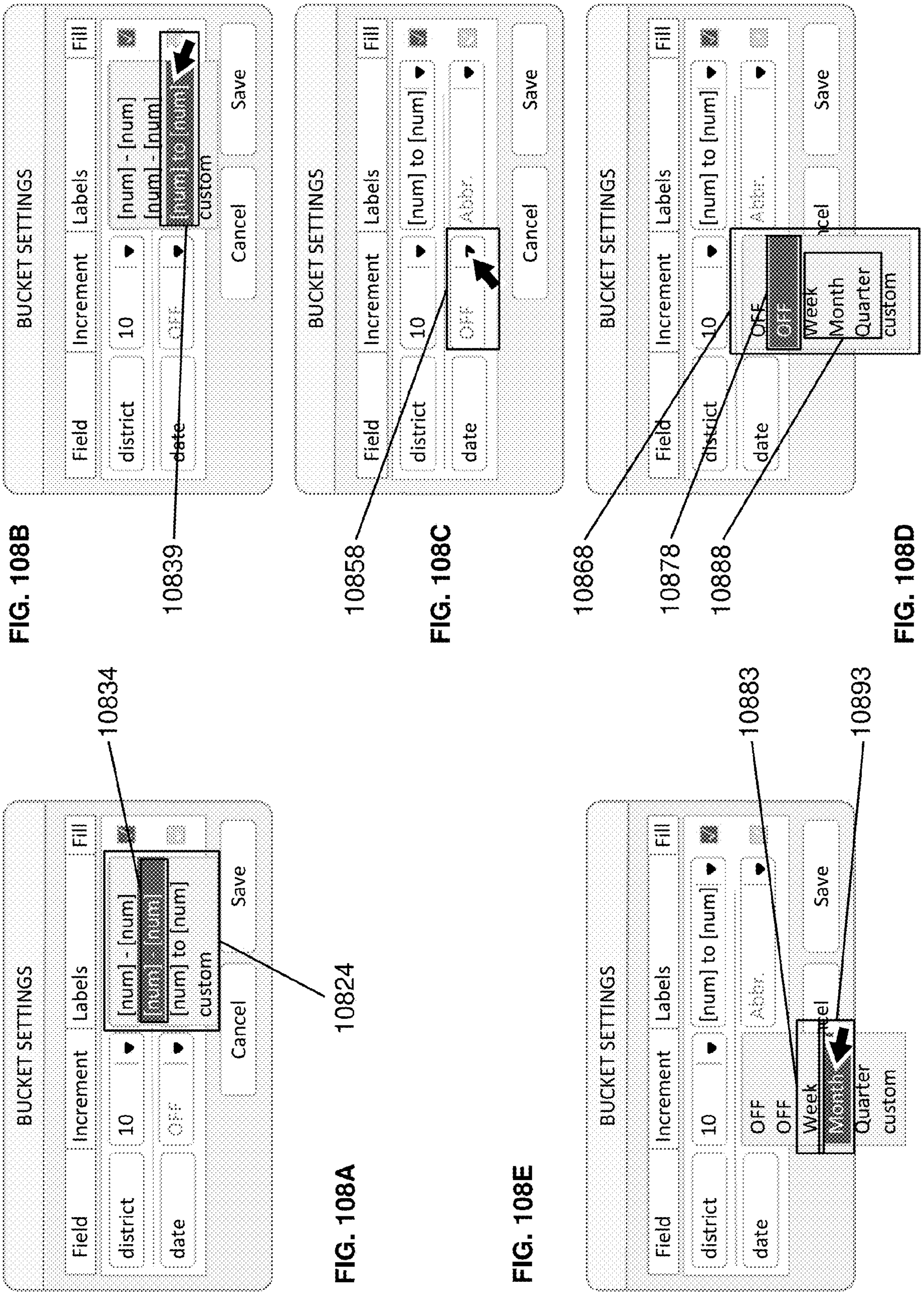
Figure 109A:
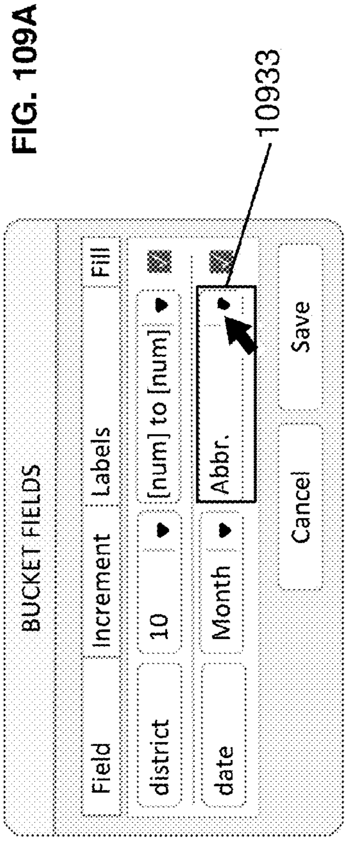
Figure 109B:
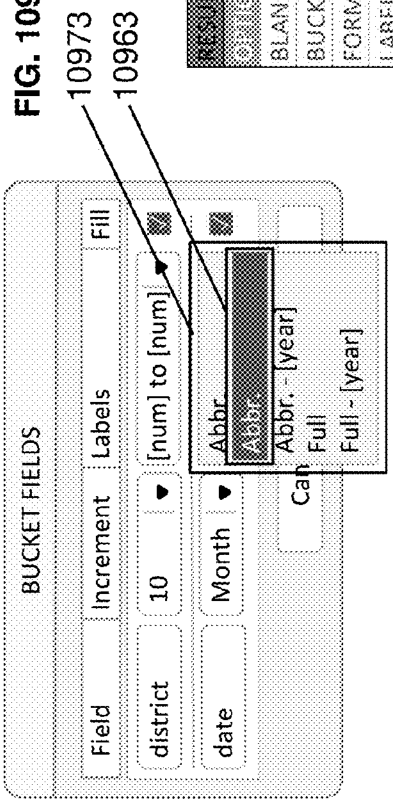
Figure 109C:
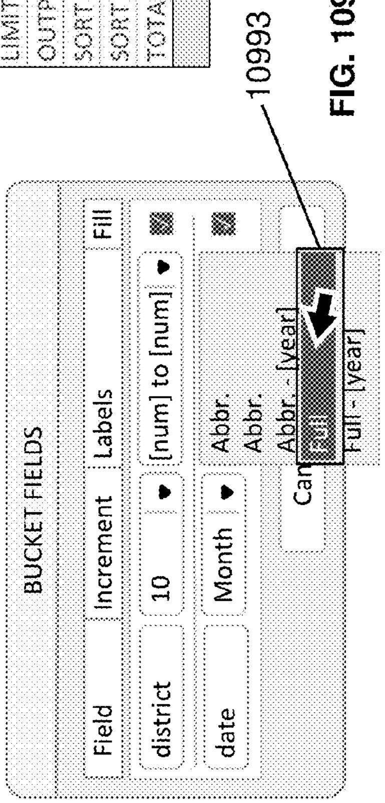
Figure 109D:
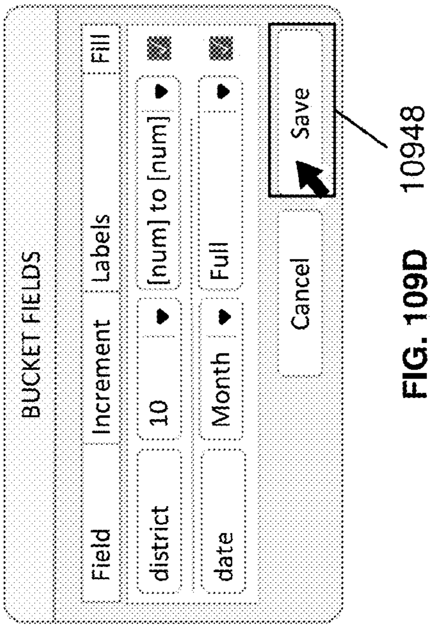
Figure 109E:
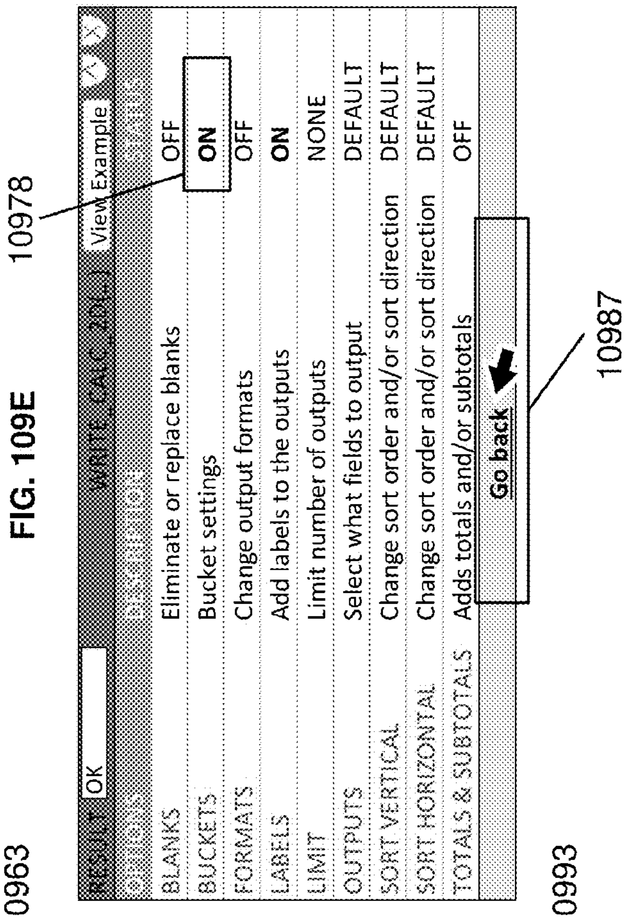

The user then decides they would like 'date' buckets/groups as well, so in FIG. 108C the click the bucket selector 10858 in get FIG. 108D the 'date' Intelligent bucketing/grouping options 10888 with the 'OFF' default 10878, 'Week', Month', 'Quarter' 10888, and 'custom' selections in the dropdown selector 10868. The user then changes the 'OFF' setting 10878 to 'Month' 10893 in FIG. 108E to see in FIG. 109A that the default label for 'Month' in this embodiment is 'Abbr.' (abbreviation). They want to see fully spelled out 'Month' labels, so they click the selector dropdown 10933 to get the selections 10973 in FIG. 109B. The user then changes the 'Abbr.' setting 10963 to 'Full' 10993 in FIG. 109C and sees they have set the 'BUCKET' specification to what they want in FIG. 109D. They click 'Save' 10948 and are returned to the 'OPTIONS' hint in FIG. 109E where they can see that the 'BUCKETS' specification shows 'ON' 10978. At that point the user is happy and clicks 'Go back' 10987 and then hits 'ENTER' to get the outcome in cells 'A4' to 'D11' 11067 in FIG. 110. Those results are shown for the formula 11025 in cell 'A4' using an embodiment where the bucketing/grouping specification arguments are invisibly recorded although as we will example later those arguments could also be visible.

Figure 110:
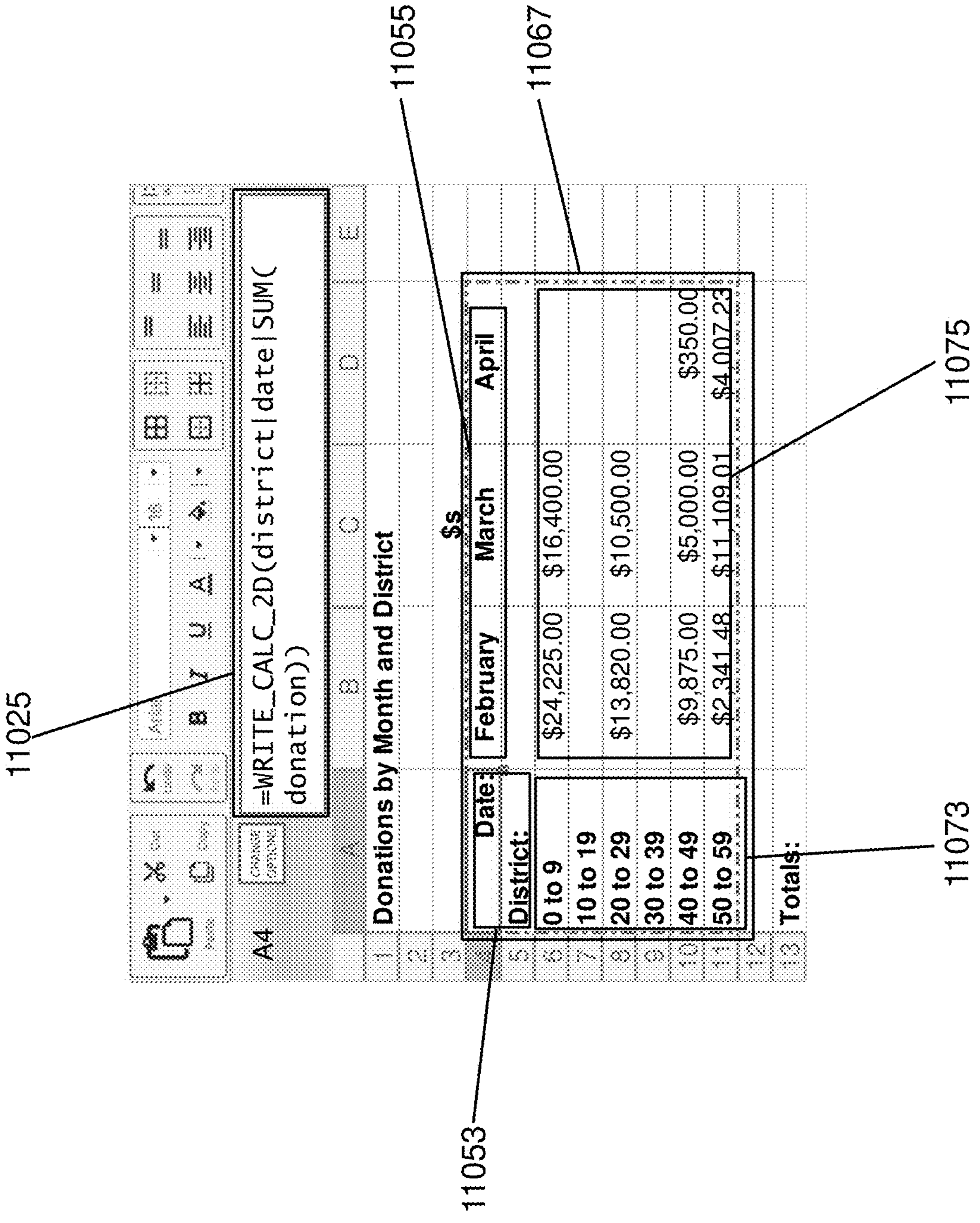

FIG. 111A through FIG. 111F illustratively examples the automatic generation of the six 10-increment filled numeric buckets 11073 in FIG. 110. Those steps determine the bucket increment specifications presented to the user as exampled in FIG. 111C. In this embodiment those specifications are limited to specifications that generate two or more buckets where at least one bucket combines unique values such as the '50 to 59' bucket 11148 combines the unique values '52'. '53', '54' and '56'. The steps also example the auto determination of the bucket start value in FIG. 111D and end value in FIG. 111E. These values match the integer data type of the 'district' data and therefore the bucket/group values begin and end with integers (e.g., '0 to 9' and '10 to 19'). FIG. 112A and FIG. 112B illustratively examples the automatic generation of the three monthly increment date buckets 11055 in FIG. 110. FIG. 112C and FIG. 112D illustratively examples the automatic generation of the calc_2D 'SUM' values 11075 in FIG. 110. Then FIG. 113A and FIG. 113B illustratively examples the two-dimensional organization of the results and the formatting for population to the cells 'A4' to 'D11' 11067 in FIG. 110. In this embodiment the specification arguments are recorded invisibly (per our contemporaneous U.S. Application No. 63/337,576, titled "Methods and Systems for Spreadsheet Function and Flex Copy-Paste Control of Formatting and Use of Selection List Panels") and therefore the formula 11025 in FIG. 110 has not changed from 10624 in FIG. 106A despite the specification changes. However, in other embodiments those specification argument(s) could have been visible.

Figure 114B:
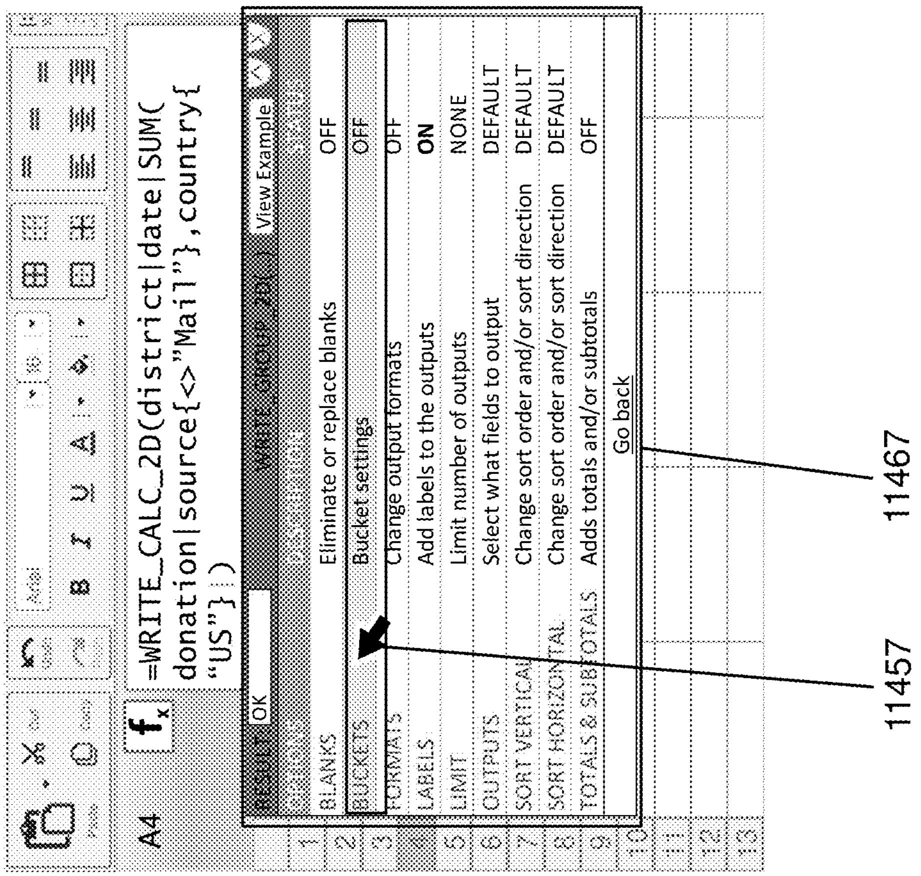
Figure 114A:
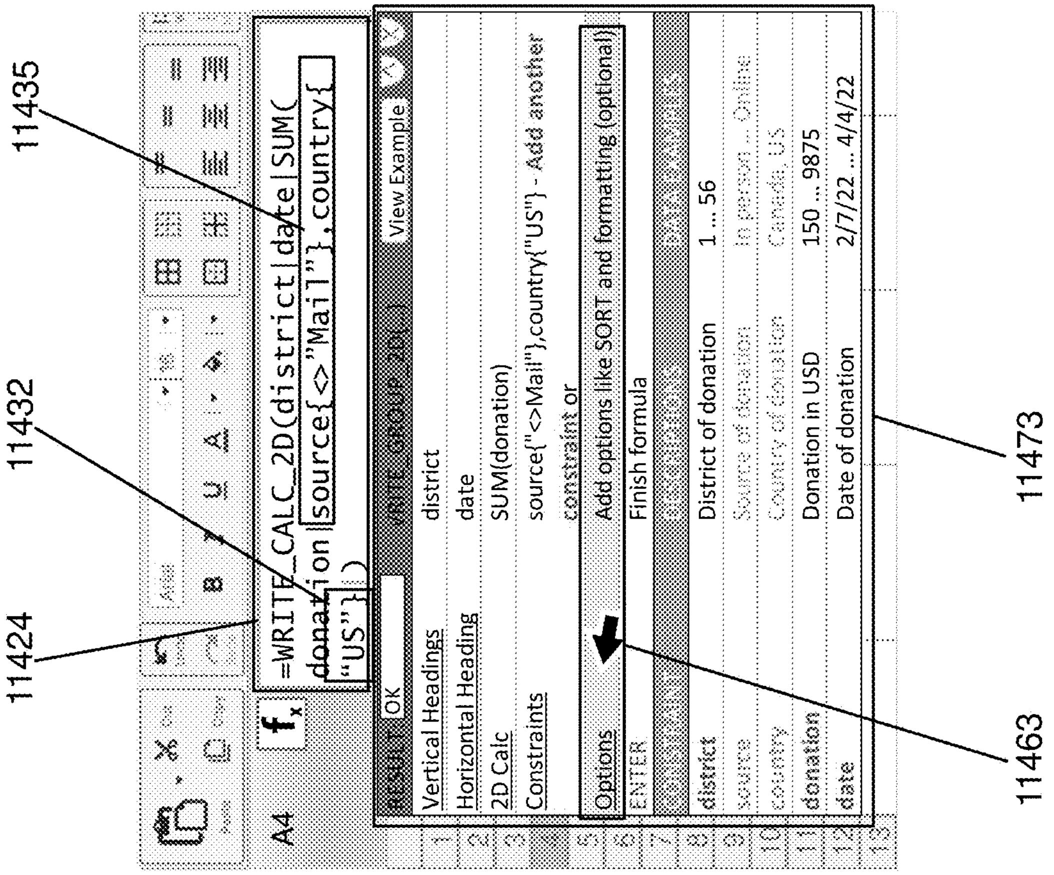

FIG. 114A through FIG. 118D examples numeric and date buckets/groups optionally setup in our 'WRITE_CALC_2D' function with multiple constraints and visible and invisible bucket/group option function formula arguments. FIG. 114A examples the charity user looking to setup a two-dimensional summary of their donations by district and date buckets/groups as they did in FIG. 106A through FIG. 113B. However, this time it is for a formula with multiple constraints 11435 and 11432. They have created the formula 11424 they desire:

=WRITE_CALC_2D(district|date|SUM(donation)
|source{ <>"Mail"},country{"US"})

However, this formula has the two constraints 'source { <>"Mail"}' and 'country("US")' because the user does not want to include 'Mail' donations and only wants donations from the 'US'. Like before, the 'WRITE_CALC_2D' function will not bucket/group the 'district' and 'date' values in this embodiment unless the user clicks 'Options' 11463 in the hint 11473. This opens the 'OPTIONS' hint 11467 in FIG. 114B. The user then selects the 'BUCKETS' option 11457 and then executes all the actions in FIG. 107B through FIG. 109E hitting 'ENTER' to get the result in cells 'A4' to 'D11' 11564 in FIG. 115A. The formula 11522 is unchanged (because of the invisible bucketing arguments) although now that the formula has been executed in this embodiment it green outlines the formula bar and the populated cells. It also displays a 'CHANGE OPTIONS' button 11522 in the formula bar as per contemporaneous U.S. Application No. 63/337,576, titled "Methods and Systems for Spreadsheet Function and Flex Copy-Paste Control of Formatting and Use of Selection List Panels".

FIG. 115A through FIG. 115D examples the formula difference between invisible option arguments and visible ones. FIG. 115A formula 11524 examples the invisible option (including 'BUCKETS') arguments with its function formula syntax in FIG. 115C. FIG. 115B formula 11529 examples the visible option (including 'BUCKETS') arguments 11537 with its function formula syntax in FIG. 115D exampling an options argument group with three options populated 11598 in this example.

FIG. 116A through FIG. 118D examples the illustrative steps automatically executed by either FIG. 115A or FIG. 115B. The constraints are applied in FIG. 116B and FIG. 116C, intelligent options in FIG. 117A and FIG. 117C, bucketing/grouping with filling in FIG. 117B and FIG. 117D, 2D SUM calculations in FIG. 118A and FIG. 118B and organizing and formatting of the results in FIG. 118C and FIG. 118D.

In the preceding 'WRITE_CALC_2D' examples employing our added optional bucket/grouping capability (FIG. 106A through FIG. 118D), the bucket start has been automatically set by our technology. However, our technology also supports a user specified start point as we will now example starting with the results 11067 exampled in FIG. 110. Those results and their formula 11025 are replicated in the formula 16524 and results 16563 in FIG. 165A. However, the charity user has decided they want the 'District:' buckets/groups 16572 to start at '1' rather than '0'. Therefore, in this embodiment the user clicks the 'CHANGE OPTIONS' button 16522 to open the 'OPTIONS' hint examples in FIG. 166A. The user then clicks the 'BUCKETS' option 16623 to open the 'BUCKET SETTINGS' UI FIG. 166B where the user clicks into the 'district' 'Start:' box with the value '0' 16683. They then change that value to the desired '1' 16687 in FIG. 166C which in this embodiment automatically increments the 'End:' value by one from '59' 16684 to '60' 16688. The user is fine with that value, although they could have specified another value, so they click 'Save' 16698 to return to the 'OPTIONS' hint FIG. 166D. The user then clicks 'Go back' 16647 and hits ENTER/RETURN to deliver the revised bucket values 16576 in FIG. 165B starting with '1'.

Bucketing/Grouping Optional Specification in Functions Populating Multiple Cells—1D Function FIG. 168A through FIG. 171C examples the use of our optional bucketing/grouping capability in one of our one-dimensional multiple cells populating functions, our 'WRITE_V' function, with one dimensional paired (nested) NON bucketed/grouped values and bucketed/grouped values. It is an example of the functions which were the subject of U.S. application Ser. No. 16/191,402, entitled, "Methods and Systems for Connecting A Spreadsheet to External Data Sources with Ordered Formulaic Specification of Data Retrieved" filed Nov. 14, 2018, now U.S. pat. No. 11,36,929, issued 15 Jun. 2021.

Figure 168B:
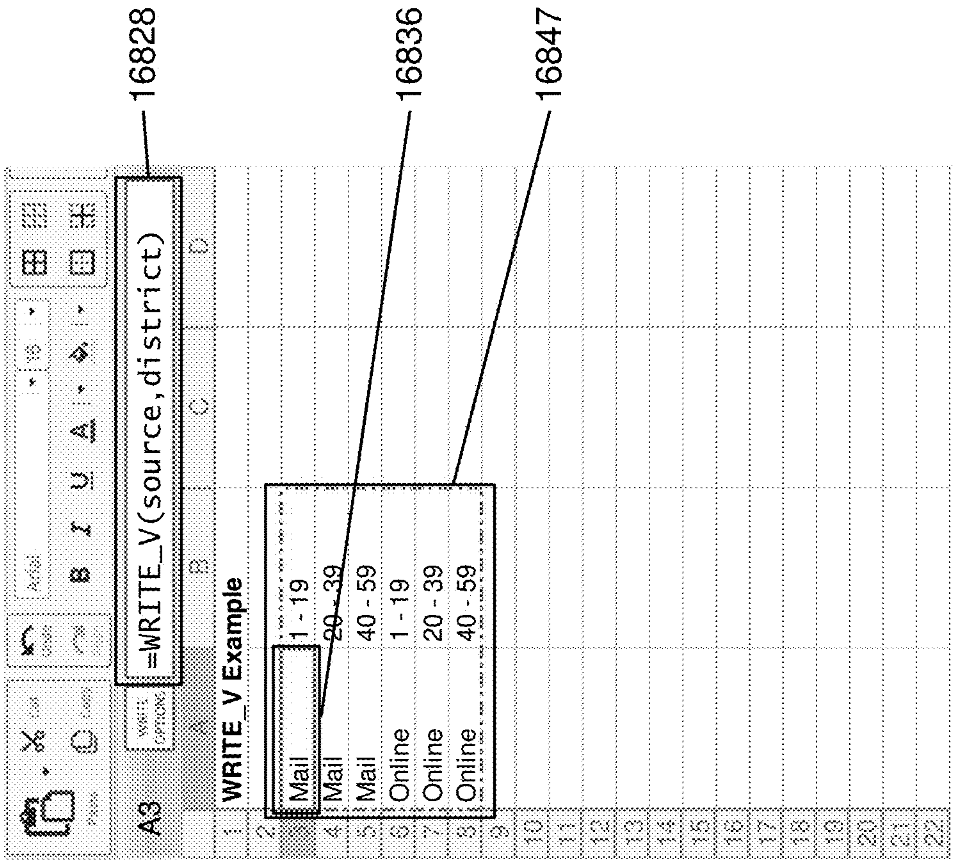
Figure 168A:
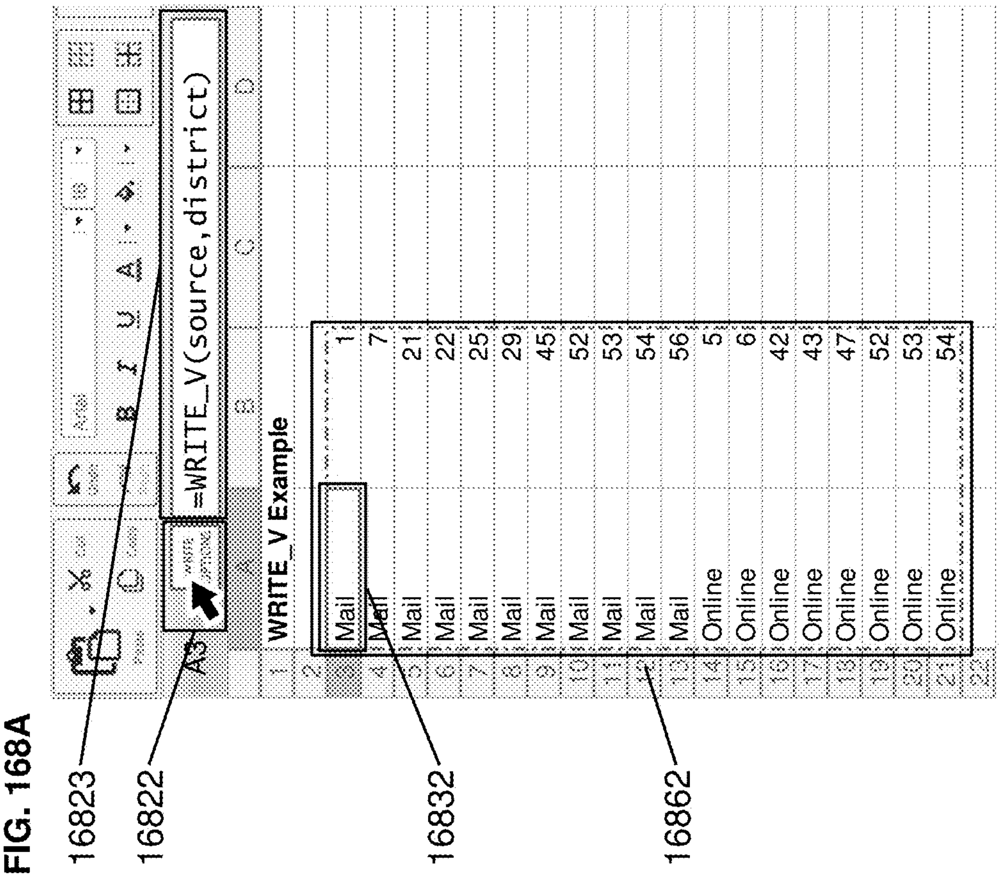
Figure 169B:
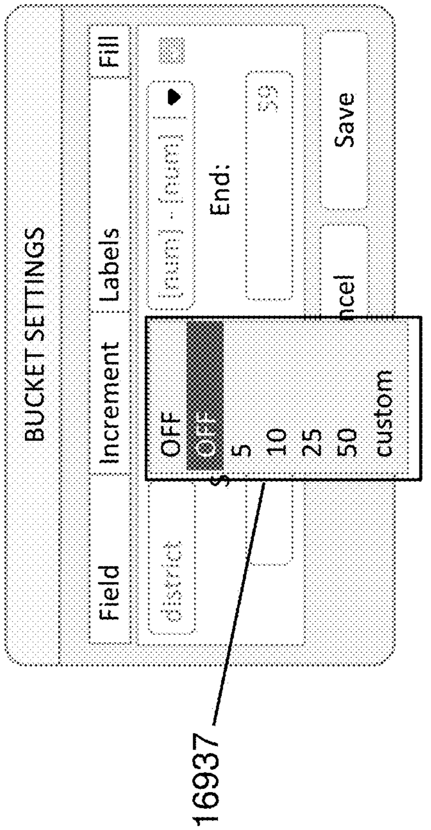
Figure 169C:
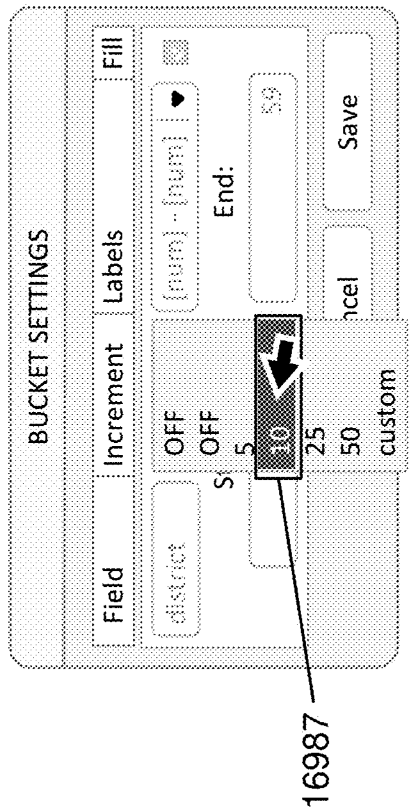
Figure 169A:
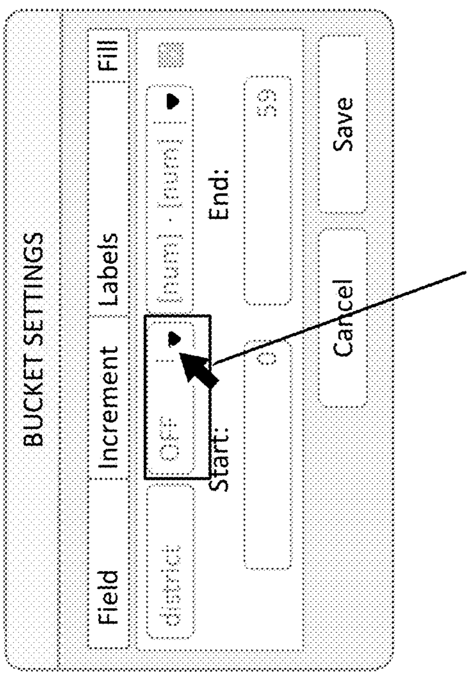
Figure 169D:
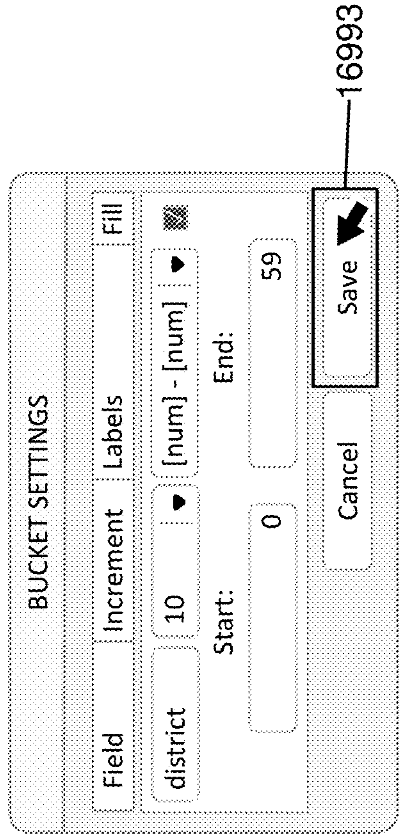

FIG. 168A examples the user in this embodiment starting to access the optional bucketing capability by clicking the 'WRITE OPTIONS' button 16822 to alter the settings for the formula 16823 in cell 'A3' 16832 that has populated the values in cells 'A3' through 'B21' 16862. They want to create some vertical headings that they can then use in a number of different analyses and would like one of the fields in those headings to be bucketed/grouped. In the hint or other selection UI presented to the user they select the bucket settings to get in this embodiment UI like the one in FIG. 169A. The only field shown there is 'district' because the other field 'source' has nothing to bucket (i.e., only having two different values and therefore any bucket would be the equivalent of a total). In this example the user then clicks the "OFF' dropdown triangle 16922 to open the automatically (intelligently) screened specifications 16937 in FIG. 169B where the generation is exampled in FIG. 170D applying our screening logic limiting specifications to those that generate two or more buckets where at least one bucket combines values (i.e., has more than one data field value in the bucket). The charity user then selects the bucket increment '10' 16987 in FIG. 169C and then clicks 'Save' 16993 in FIG. 169D. They then return to the hint or other UI where they confirm the changes to get the result shown in the cells 'A3' through 'B8' in FIG. 168B 16847. The values for 'district' have been bucketed/grouped with the resulting collapsing of the number of rows in the output. These cells are usable in regular spreadsheet cell calculations with their associated data. In this embodiment the bucket/group arguments are invisible in the formula 16828, although they could have been visible as previously exampled. All the application actions during the bucketing/grouping process and in delivering the results are exampled in FIG. 170A through FIG. 171C.

Figure 172B:
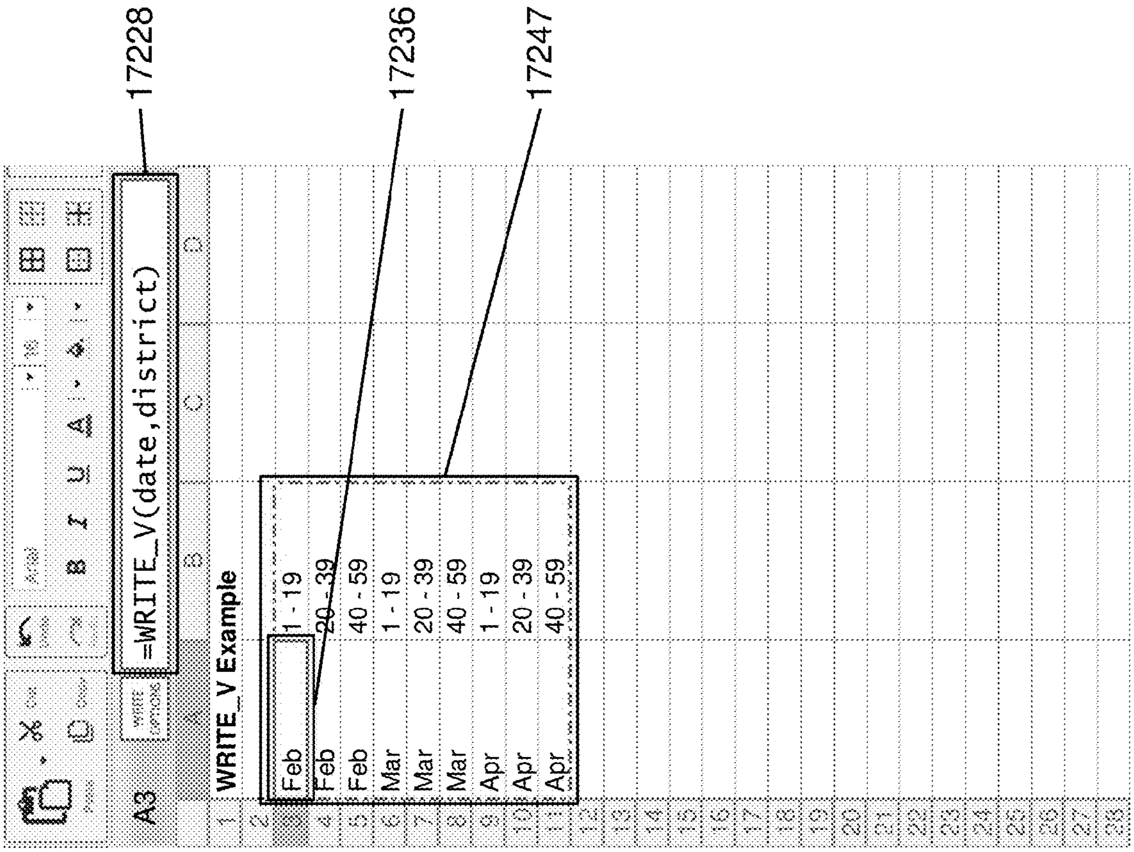
Figure 172A:
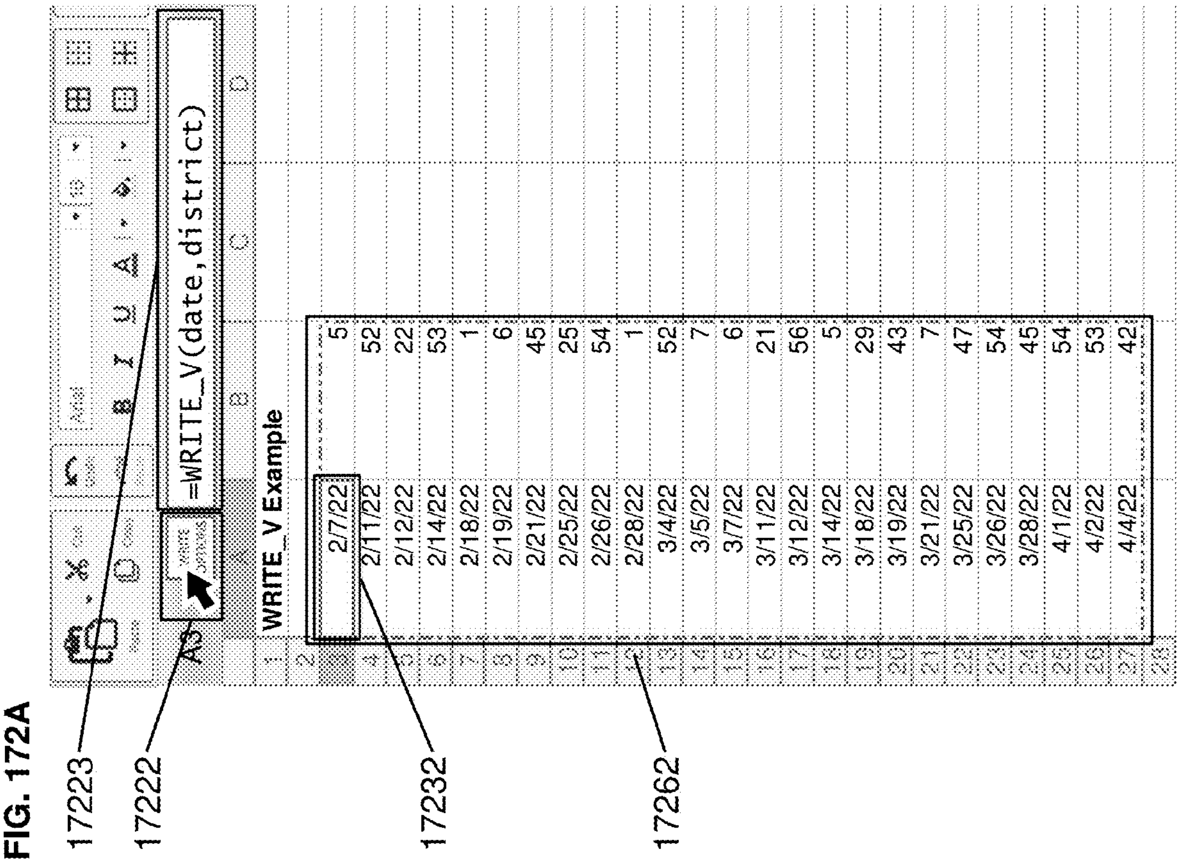
Figure 173D:
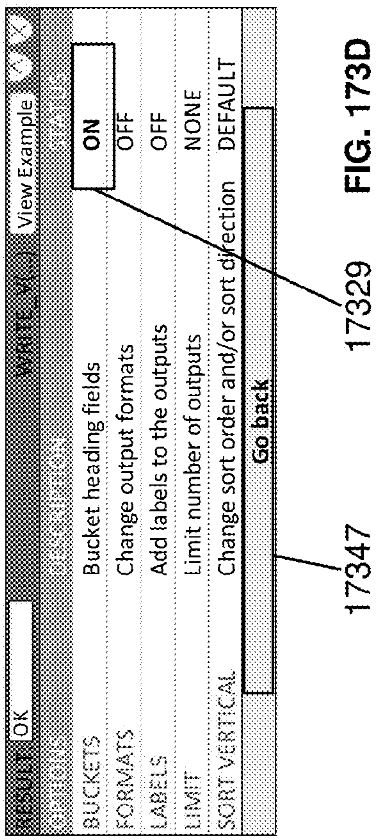
Figure 173A:
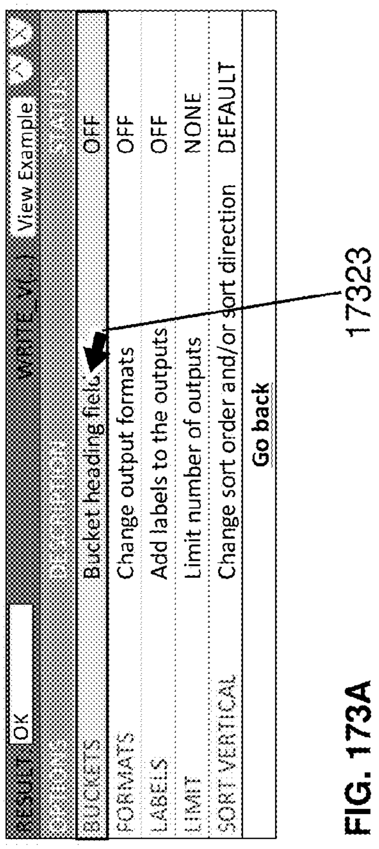
Figure 173C:
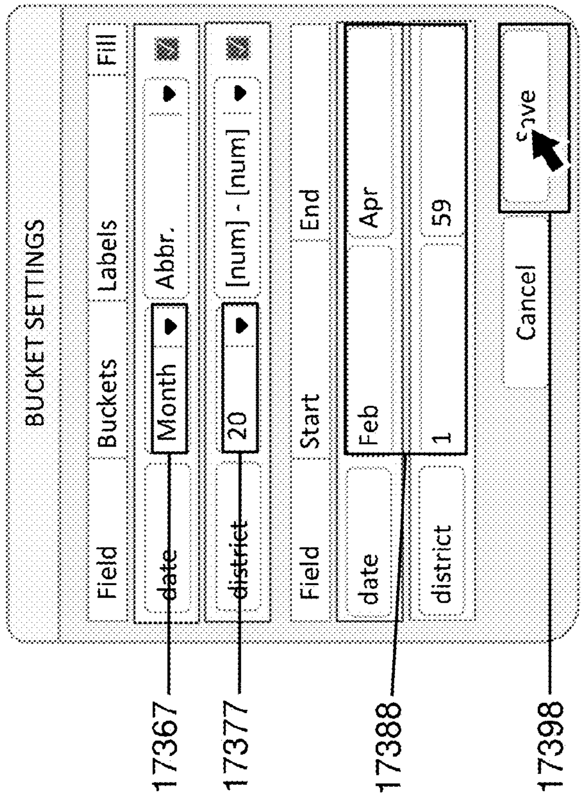
Figure 173B:
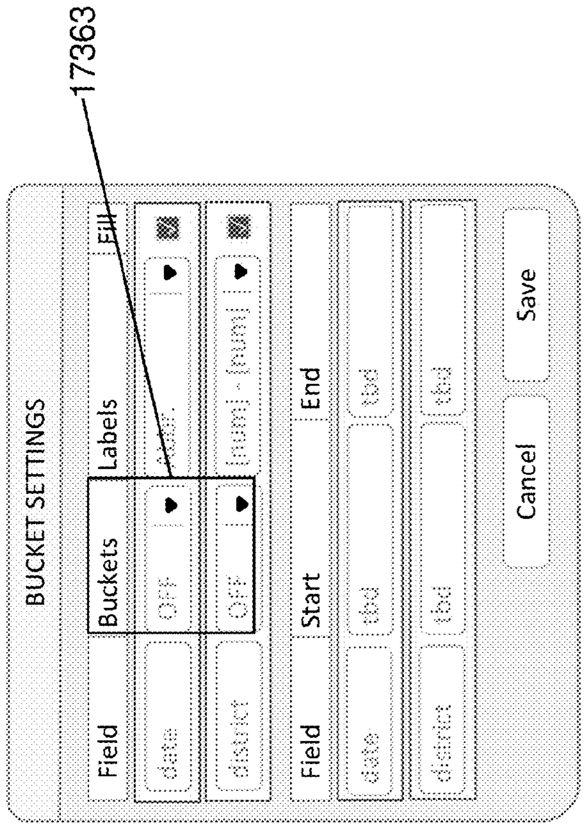

Bucketing/Grouping Optional Specifications in Functions Populating Multiple Cells—1D Paired (Nested) Buckets/Groups FIG. 172A through FIG. 175G examples the use of our optional bucketing/grouping capability in one of our one-dimensional multiple cells populating functions ('WRITE_V') with one dimensional paired (nested) bucketed/grouped values. FIG. 172A examples the user in this embodiment starting to access the optional bucketing capability by clicking the 'WRITE OPTIONS' button 17222 to alter the settings for the formula 17223 in cell 'A3' 17232 that has populated the values in cells 'A3' through 'B27' 17262. They want to create vertical headings that they can then use in a number of different analyses and would like both of the fields in those headings to be bucketed/grouped. In FIG. 173A the user then clicks the 'BUCKETS' option 17323 to get the 'BUCKET SETTINGS' popup FIG. 173A. It shows both of the fields populated in the formula 17223 in FIG. 172A. However, in this embodiment, all of the settings are greyed out because Buckets' are "OFF" 17363 for both of the fields. For brevity's sake we show the user selections in FIG. 173C (rather than showing each step of each selection as we have exampled previously). They selected a 'date' field 'Buckets' increment of 'Month' 17367 and a 'district' field 'Buckets' increment of '20' 17377. They look at the automatically set starts and ends 17388 and decide they are good, so they click 'Save' 17398 returning back to the hint in FIG. 173D where they click 'Go back' 17347 and then ENTER/RETURN to see the resulting bucketed/grouped results in cells 'A3' to 'B11' 17247 in FIG. 172B. The bucketing has shrunk the 'WRITE_V' output from the 50 cells 'A3' through 'B27' 17262 in FIG. 172A to the eighteen cells 'A3' through 'B11' 17247 in FIG. 172B. These cells are usable in regular spreadsheet cell calculations with their associated data. In this embodiment the bucket/group arguments are invisible in the formula 17228, although they could have been visible as previously exampled. All the application actions during the bucketing/grouping process and in delivering the results are exampled in FIG. 174A through FIG. 175G including the intelligent options, the automatic start and end determination, the integer matching for district and the automated filling. Our technology supports double and beyond bucketing/grouping of values in the different multiple cell populating functions.

Bucketing/Grouping Optional Specifications in Functions Populating Multiple Cells—1D Function with Calcs FIG. 119A through FIG. 124C examples text (alphabetical) buckets/groups optionally set up in one of our one-dimensional multiple cells populating functions ('WRITE_CALC_V'). It is also a very versatile version of the one-dimensional functions which were the subject of our U.S. application Ser. No. 17/374,901. It combines several capabilities including the ability to do calculations with range/array functions, non-range/array functions and/or complex algebraic operations. We will start with the Charity user doing some simple average and count data summarization calculations for their donors by first letter of last name.

Figure 119A:
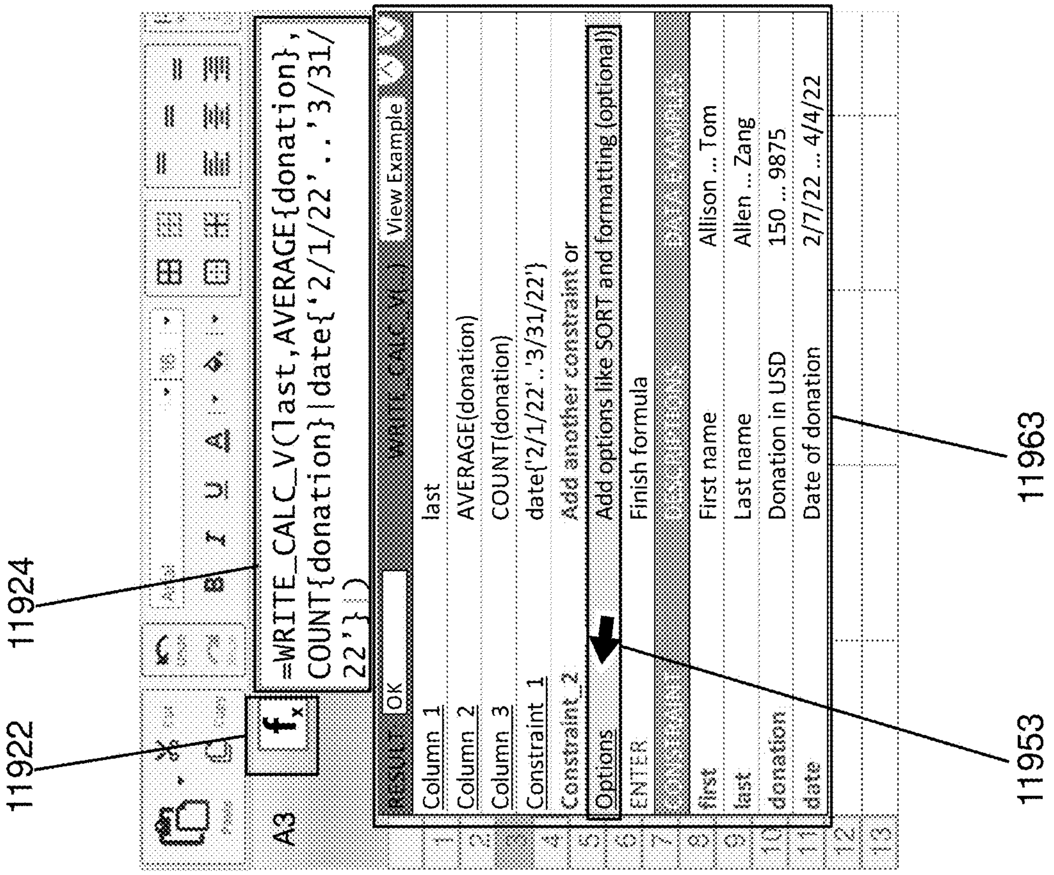
Figure 119B:
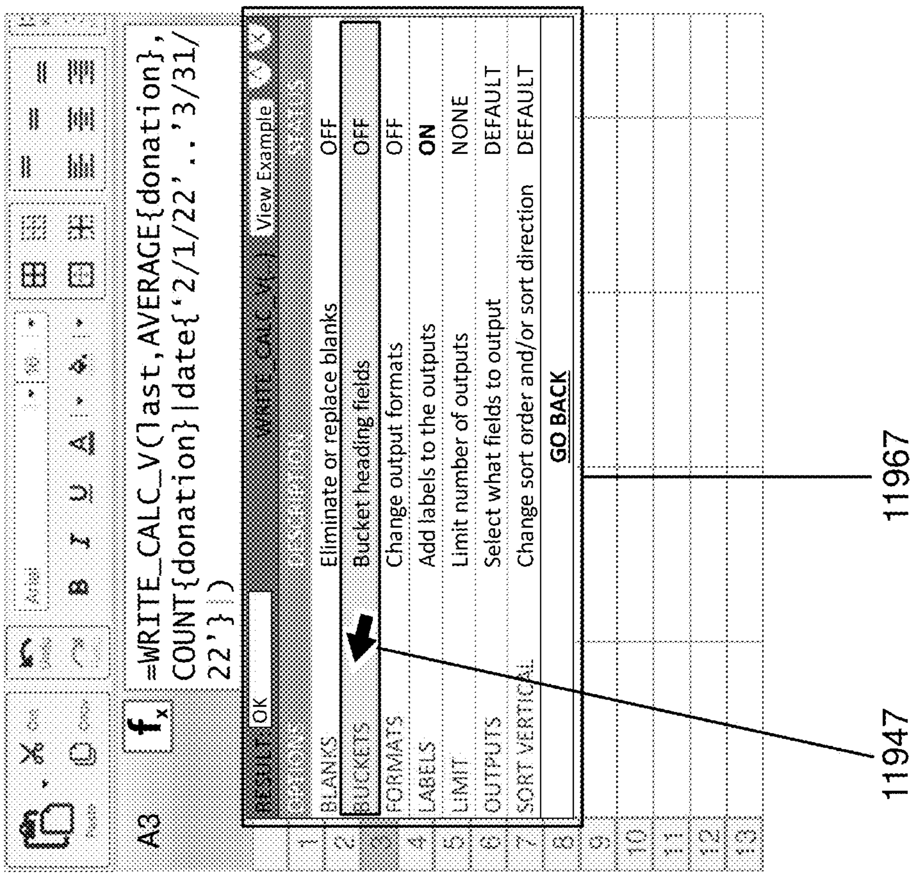
Figures 120A, 120B, 120C, 120D, 120E, 120F:
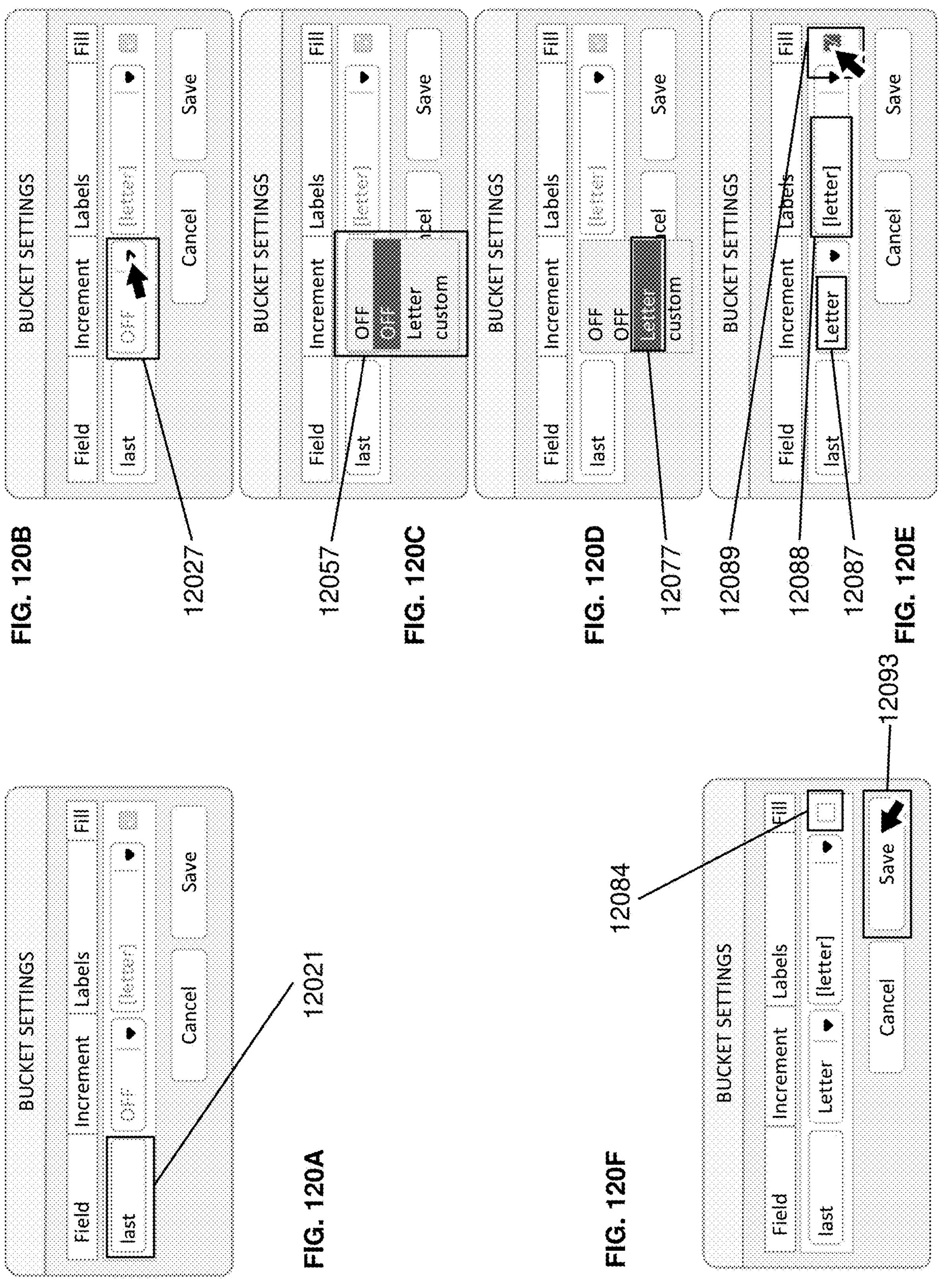
Figure 121B:
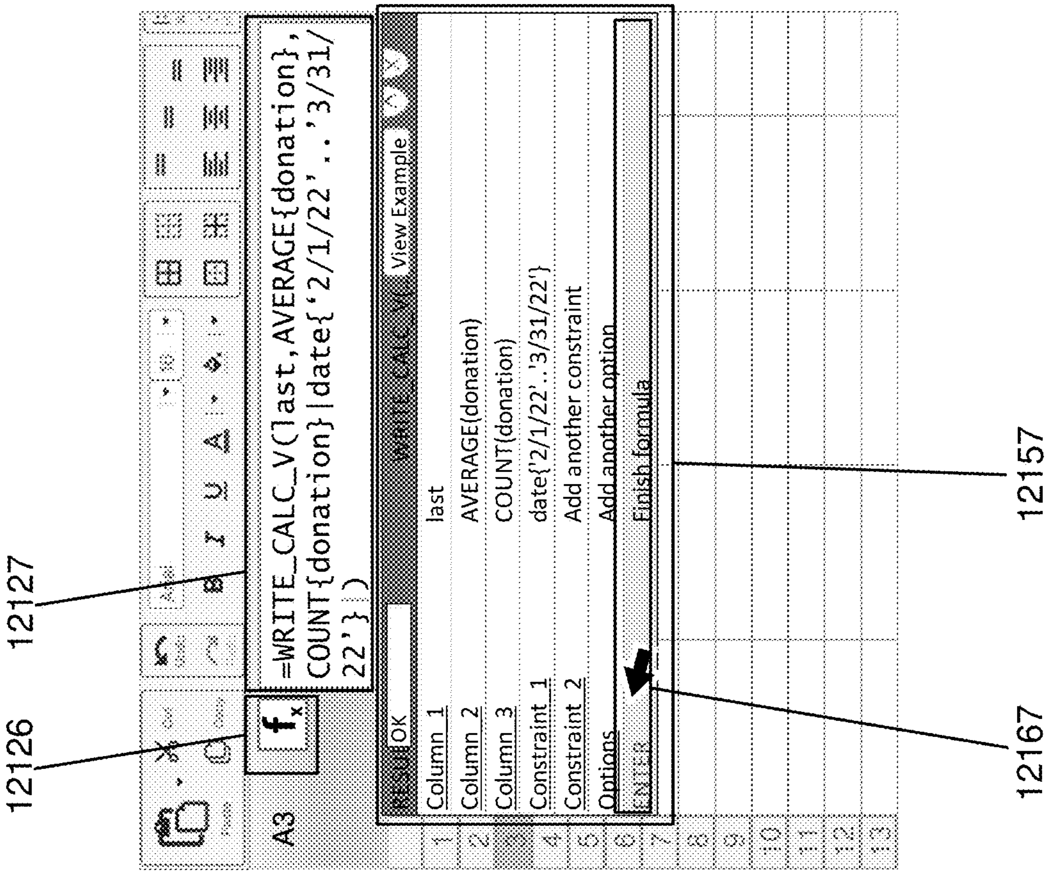
Figure 121A:
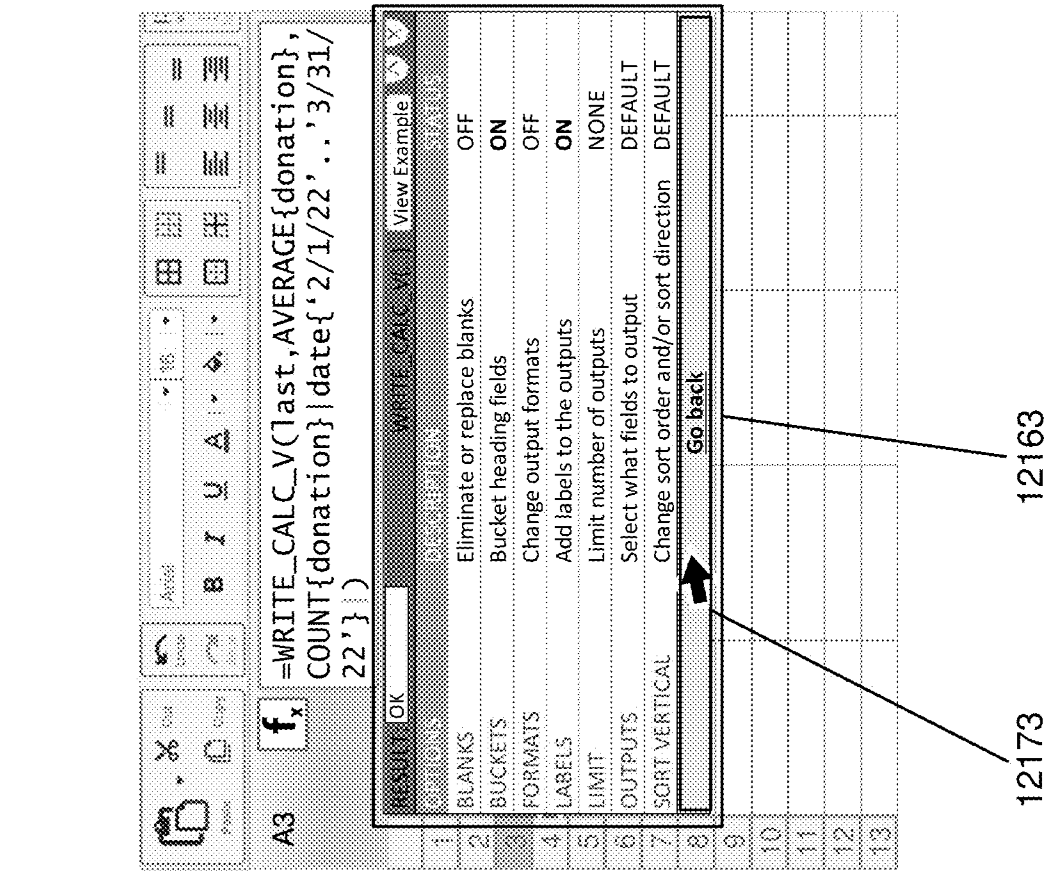

FIG. 119A examples the charity user looking to setup a one-dimensional summary of their average and number of donations by last name buckets/groups. They have created the formula 11924 they desire:

'=WRITE_CALC_V(last,|AVERAGE(donation), COUNT(donation)|date{'2/1/22' . . . '3/31/22'})'

However, this functional formula by itself does not bucket/group the 'last' values so in this embodiment the user clicks 'Options' 11953 in the hint 11963. This opens the 'OPTIONS' hint 11967 in FIG. 119B. The user then selects the 'BUCKETS' option 11947 in FIG. 119B to open the 'BUCKET SETTINGS' popup in FIG. 120A for the field 'last' 12021. The user then clicks the 'last' field 'Increment' dropdown selector 12027 in FIG. 120B to get 'OFF', "Letter' and 'custom' options 12057 in FIG. 120C. The user then selects 'Letter' 12077 in FIG. 120D as shown in 12087 in FIG. 120E. The user then decides they are fine with 'Labels' default setting of '[letter]' 12088 but decides to change the 'FILL' default checked by clicking it unchecked 12089. They see that unchecked result 12084 in FIG. 120F and then click 'Save' 12093 to return to the 'OPTIONS' HINT 12163 in FIG. 121A. The user then clicks 'Go back' 12173 to get the formula hint 12157 in FIG. 121B where they click 'ENTER' 12167 to populate the results 12263 in FIG. 122A. This functional formula with its optional specifications has created one set of alphabetical buckets 12262 and two sets of calculations 12264 using those buckets/groups, all with their heading labels 12253. All employing the 'date' constraint 12234.

Figure 122B:
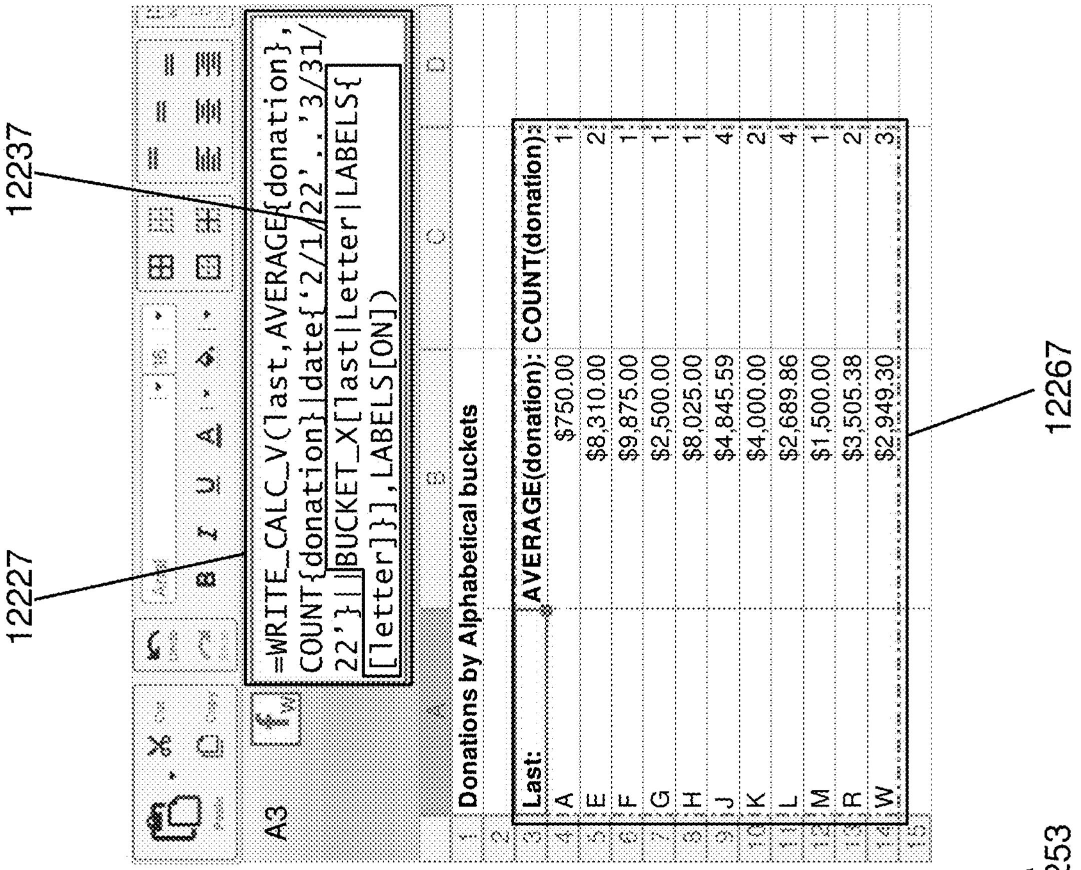
Figure 122A:
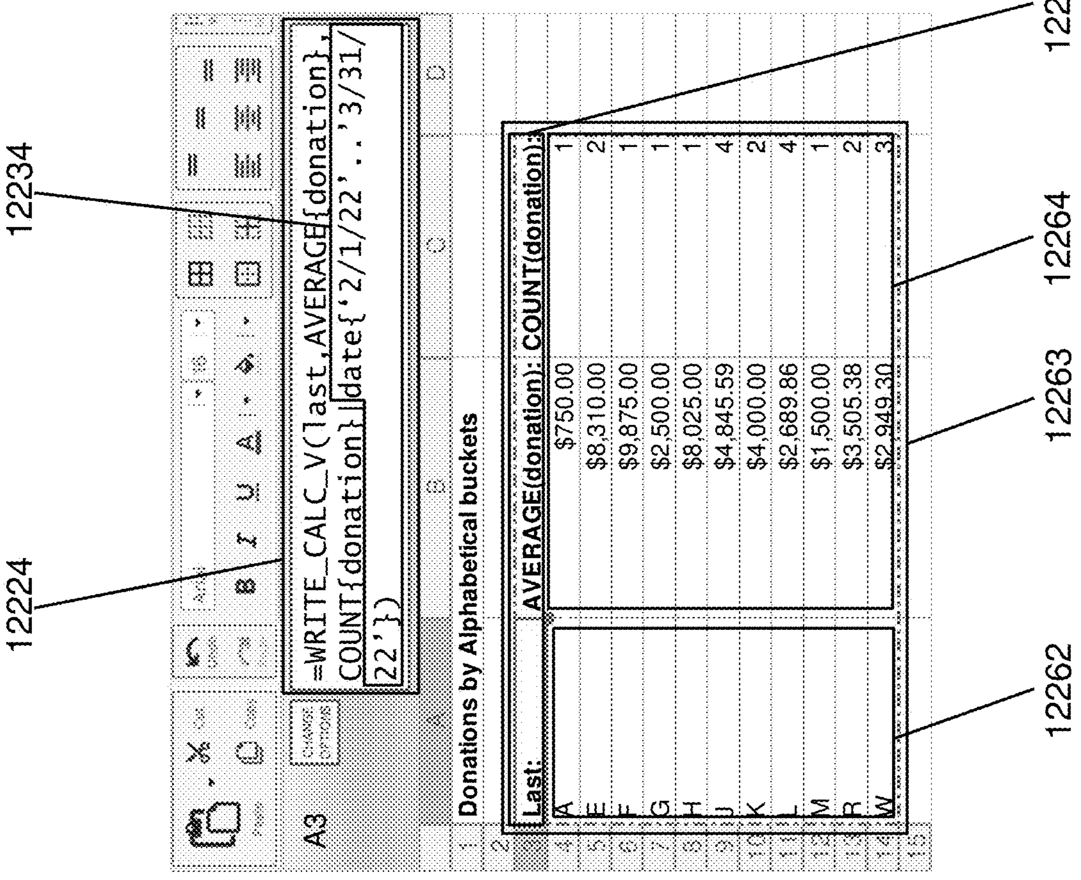

FIG. 123A through FIG. 124C illustratively examples the steps delivering those results 12263 in FIG. 122A. FIG. 123C examples the constraining/filtering of the data for the date range '2/1/22/ . . . '3/31/22'. FIG. 123D examples the bucket/group creation with NO filling. FIG. 124A and FIG. 124B examples the data organization and then the 'AVERAGE' and 'COUNT' calculations. FIG. 124C then examples the formatting of the results and the addition of the heading labels for cells 'A3' to 'C14' 12263 in FIG. 122A. This embodiment has the invisible option arguments (including 'BUCKETS') as per our contemporaneous U.S. Application No. 63/337,576, titled "Methods and Systems for Spreadsheet Function and Flex Copy-Paste Control of Formatting and Use of Selection List Panels". FIG. 122B examples the same result but with the option arguments 12237 visible in the cell formula 12227. Our technology supports visible and invisible arguments in a broad spectrum of one- and two-dimensional functions for a very broad spectrum of data summarization and data analytics. We will now example such a function employing our bucketing/grouping capability as an option doing complex analytics.

Bucketing/Grouping Optional Specifications in Functions Populations Multiple Cells—2D Complex Analytics FIG. 125A through FIG. 131B examples our Bucketing/grouping optional specification in functions populating multiple cells supporting two-dimensional complex analytics for both numeric and date bucketed values with filling. The scientist has already setup the 'exp' numeric buckets and 'date' date buckets with filling as previously exampled and indicated in this embodiment by the 'BUCKET[ON]' 12563 shown for 'Options' in the hint 12573 in FIG. 125A. When the user completes the formula 12523 by clicking on the 'factor_3' value 12583 and hitting 'ENTER/RETURN' they are delivered the results in 'A4' to 'D10' 12567 in FIG. 125B for the completed formula 12527. That 'WRITE_CALC_2D' formula contains the complex calc 12528:

'SUM(SQRT(factor_1)+1.3)/COUNT(factor_1)+DEVSQ(COS(factor_2))−SUM(LOG10(factor_3))'

It contains multiple range/array functions (i.e., SUM, COUNT, and DEVSQ), multiple non-array/range functions (i.e., SQRT, COS and LOG10), functions within functions (e.g., SQRT in SUM), and many algebraic operations going well beyond data summarization into complex analytics applied to the numeric and date bucketed/grouped data.

Figure 125A:
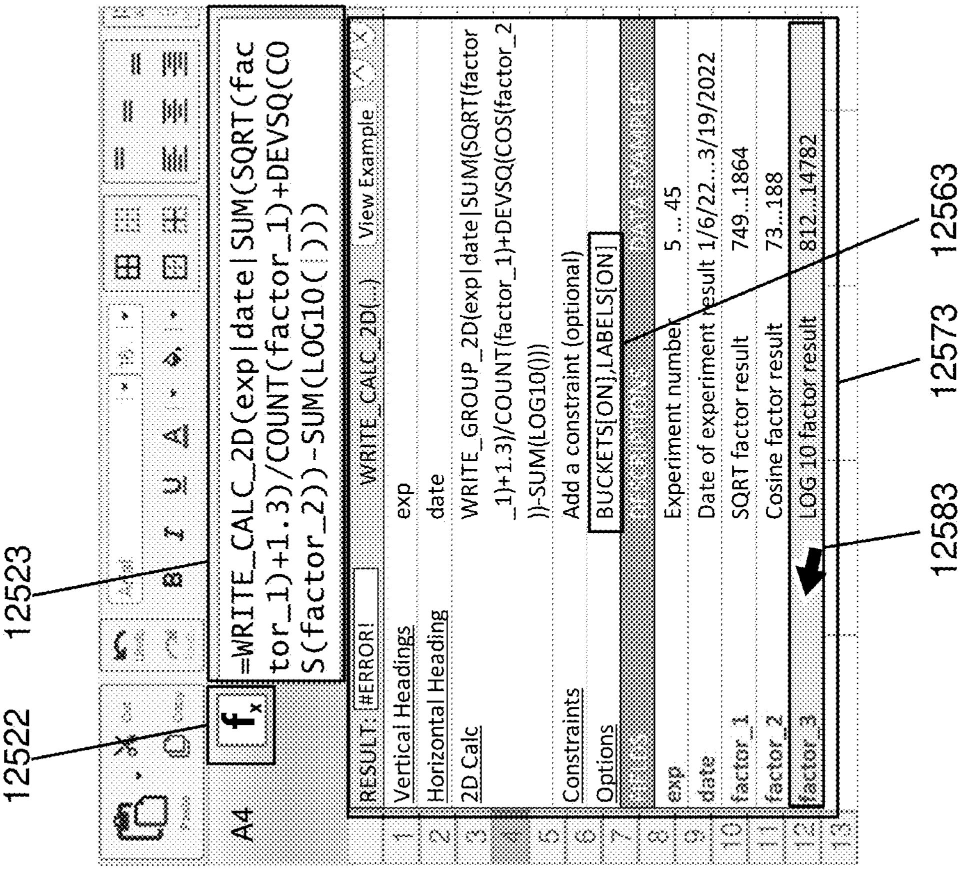
Figure 125B:
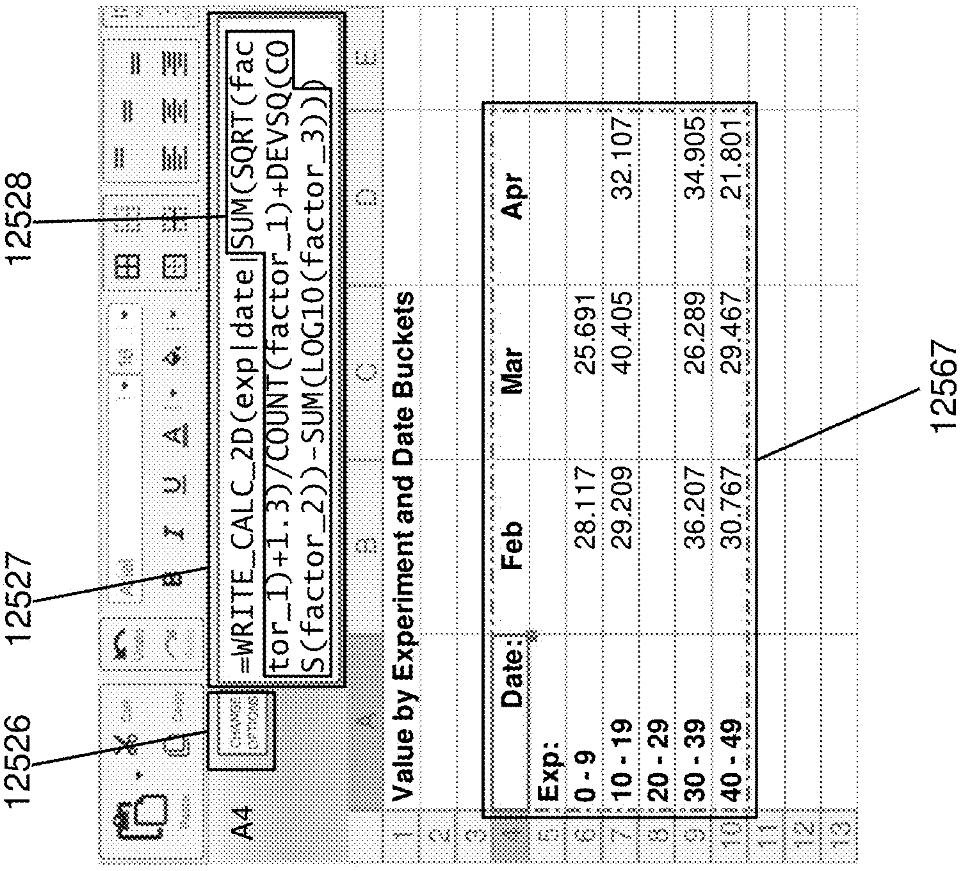

FIG. 126A through FIG. 131B illustratively examples the steps automatically delivering those results 12567 in FIG. 125B. FIG. 126C examples the numeric bucket/group intelligent options. FIG. 126D examples the creation of the 'exp' field buckets/groups. FIG. 127B examples the 'date' bucket/group intelligent options. FIG. 127C examples the creation of the 'date' field buckets/groups. FIG. 128 through FIG. 130B illustratively examples the bucketed/grouped associated data retrieval and all the calculations for each two-dimensional bucket combination calculated value shown in FIG. 130B. FIG. 131A examples the two-dimensional data organization and then FIG. 131B examples the formatting of the results and the addition of the heading labels for cells 'A4' to 'D10' 12567 in FIG. 125B.

Bucketing/Grouping Optional Specification in Functions Populating Multiple Cells—1D Paired (Nested) Buckets/Groups Complex Analytics FIG. 132A through FIG. 133B examples our technology supporting one-dimensional complex analytics in a function employing our bucketing/grouping optional specifications for both numeric and date paired (nested) bucketed values with filling. Like in the previous example, the scientist has already setup the 'exp' numeric buckets and 'date' date buckets with filling as previously exampled and indicated in this embodiment by the 'BUCKET[ON]' 13263 shown for 'Options' in the hint 13273 in FIG. 132A. When the user completes the formula 13223 by clicking on the 'factor_3' value 13283 and hitting 'ENTER/RETURN' they are delivered the results in 'A4' to 'D10' 13267 in FIG. 132B for the completed formula 13227. That 'WRITE_CALC_V' formula contains the complex calc 13228:

'SUM(SQRT(factor_1)+1.3)/COUNT(factor_1)+DEVSQ(COS(factor_2))−SUM(LOG10(factor_3))'

It contains multiple range/array functions (i.e., SUM, COUNT, and DEVSQ), multiple non-array/range functions (i.e., SQRT, COS and LOG10), functions within functions (e.g., SQRT in SUM), and many algebraic operations going well beyond data summarization into complex analytics applied to the numeric and date bucketed/grouped data.

Figure 132B:
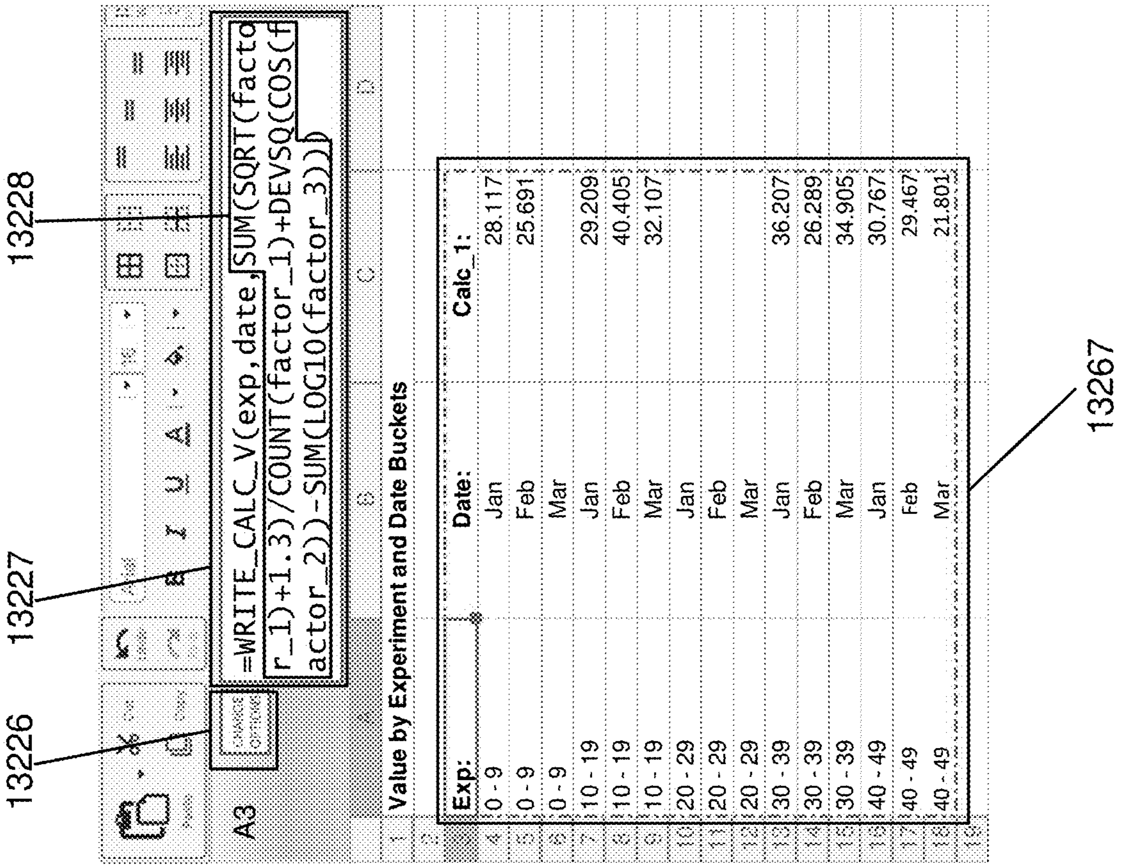
Figure 132A:
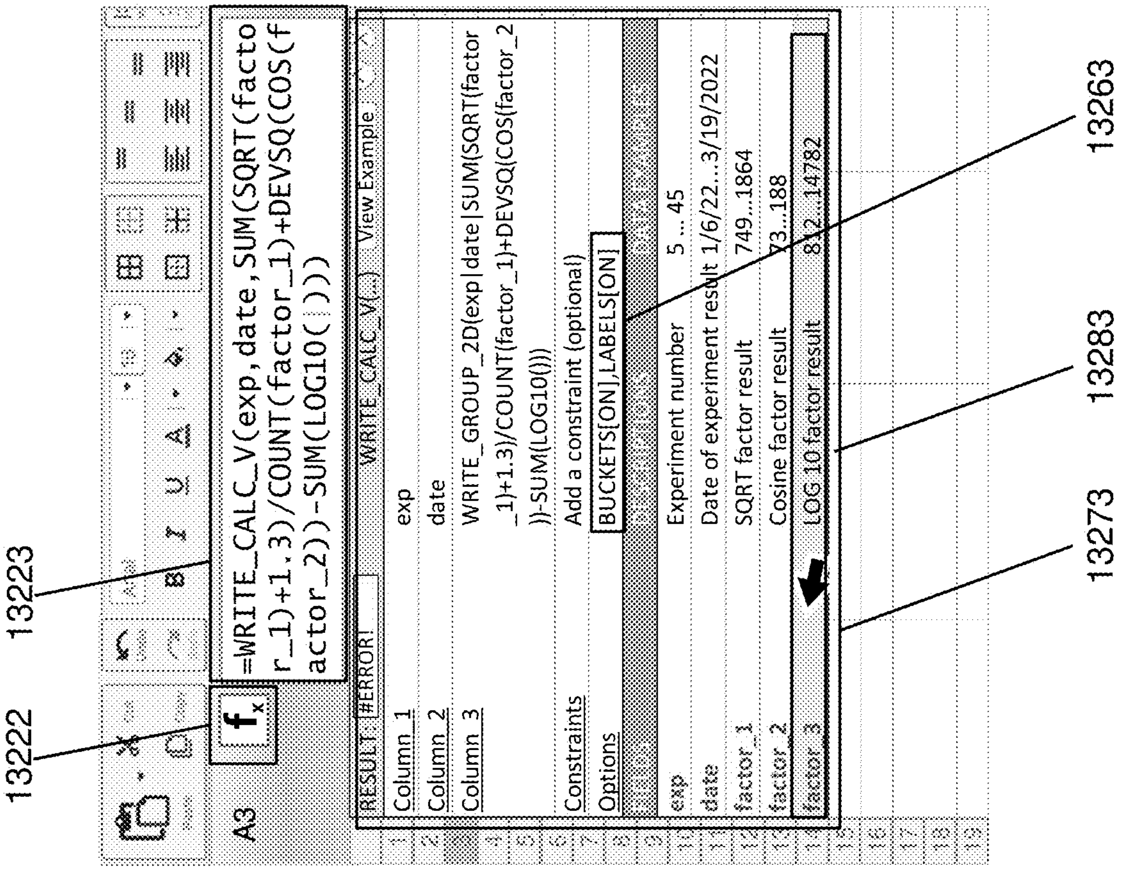

FIG. 126A through FIG. 130B, FIG. 133A and FIG. 133B illustratively examples the steps automatically delivering those results 13267 in FIG. 132B. FIG. 126C examples the numeric bucket/group intelligent options. FIG. 126D examples the creation of the 'exp' field buckets/groups. FIG. 127B examples the 'date' bucket/group intelligent options. FIG. 127C examples the creation of the 'date' field buckets/groups. FIG. 128 through FIG. 130B illustratively examples the bucketed/grouped associated data retrieval and all the calculations for each one-dimensional bucket combination calculated value shown in FIG. 130B. FIG. 133A examples the one-dimensional data organization and then FIG. 133B examples the formatting of the results and the addition of the heading labels for cells 'A3' to 'C18' 13267 in FIG. 132B.

As we have shown our technology supports one-dimensional and two-dimensional multi-value populating functions using option specified buckets/groups for calculations ranging from very simple to very complex. In the examples thus far, the calculations were done by the function employing the bucketing/grouping optional specification. However, we will now example calculations done by cell formulas referencing the buckets/groups generated by the optional specification employing function.

Figures 134A, 134B, 134C:
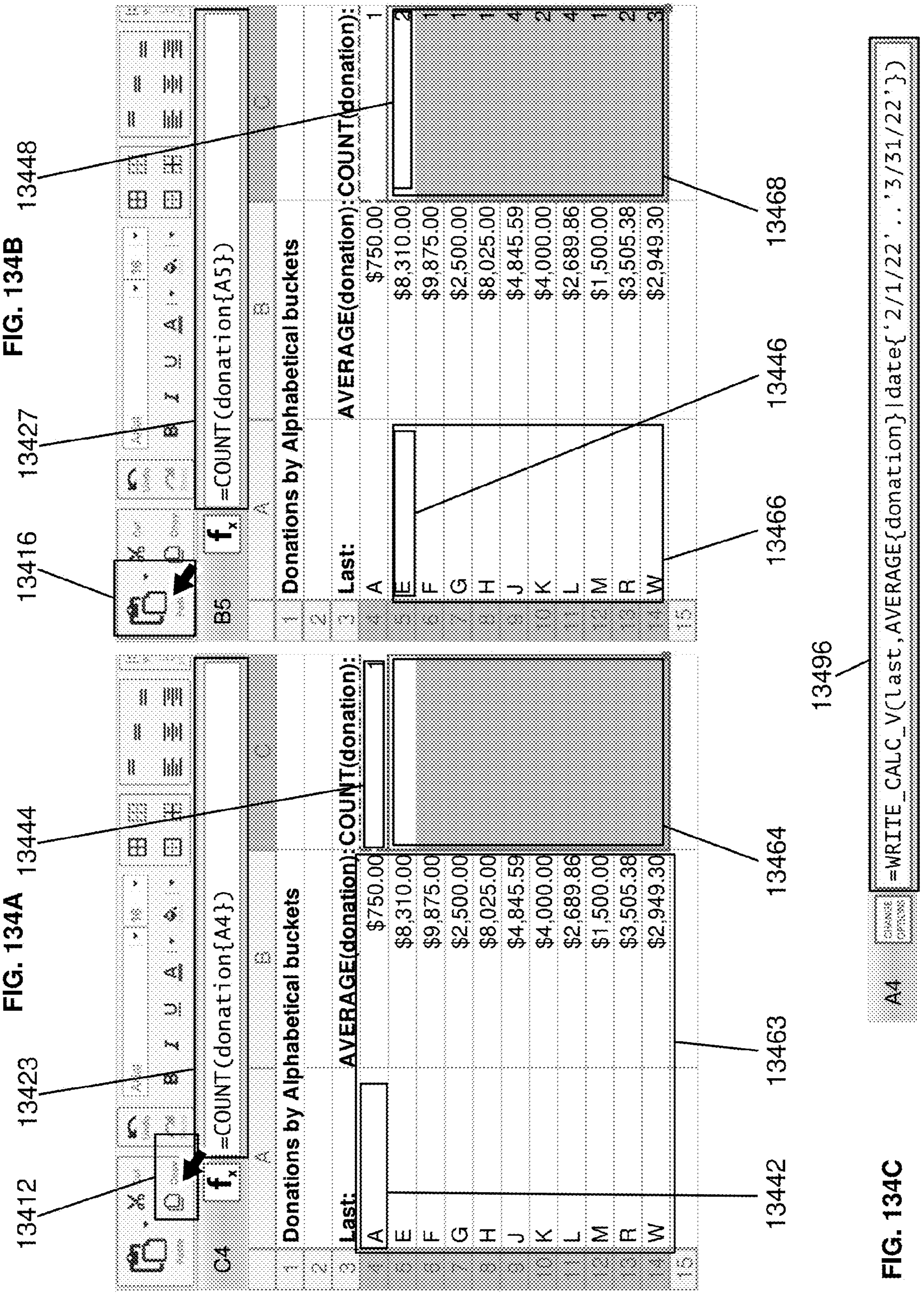

Bucketing/Grouping Optional Specification in Functions Populations Multiple Cells—Cell Reference Use in Formulas and Copy Paste FIG. 134A through FIG. 135D examples cell functional formula referenced use of one of the optionally created buckets/groups in the results of a multi-value populating function and then in the copy paste replication of that cell. FIG. 134A examples in cell 'C4' 13444 a cell formula 13423 value created by a 'COUNT' function calculation referencing in 'A4' 13442 a bucketed/grouped value of 'A' generated by the formula 13496 in FIG. 134C via an option setting with an invisible argument. FIG. 135A/FIG. 135B 13523 and FIG. 135C illustratively examples the automatically done steps for the formula 13423 in cell 'C4' 13444 doing the 'COUNT' calculation for the first bucket 'A'. The charity user then decides to copy paste cell 'C4' 13444 to the cells 'C5' to 'C14' 13464 clicking 'Copy' 13412 and then clicking 'Paste' 13416 in FIG. 134B to get the result in cells 'C5' to 'C14' 13468. FIG. 135A, FIG. 135B and FIG. 135D illustratively example the automatically done steps for the copy paste generation of the results in cells 'C5' to 'C14' 13468 in FIG. 134B. All those cell values having used the bucketed/grouped values in cells 'A5' to 'A14' 13466 and their associated data as exampled by formula 13427 for cell 'C5' 13449 using the bucketed/grouped value in cell 'A5' 13446.

Bucketing/Grouping Optional Specification in Functions Populating Multiple Cells—Cell Reference Use in Flex Copy Paste FIG. 136A and FIG. 136B examples cell functional formula referenced use of one of the optionally created buckets/groups in the results of a multi-value populating function and then in FLEX copy paste replication of that cell. FIG. 136A examples in cell 'C4' 13644 a cell formula 13623 value created by a 'COUNT' function calculation referencing in 'A4' 13642 a bucketed/grouped value of 'A' generated by the formula 13696 in FIG. 136C with an invisible bucket option setting. FIG. 135A/FIG. 135B 13523 and FIG. 135C illustratively examples the automatically done steps for the formula 13623 in cell 'C4' 13644 doing the 'COUNT' calculation for the first bucket 'A'. The charity user then decides this time to do a FLEX copy paste cell 'C4' 13644 to the cells 'C5' to 'C9' 13654 realizing that they are simply setting the direction of the paste not the size of it. They then click 'Copy' 13612 and then click the 'Paste' dropdown triangle 13616 in FIG. 136B to get the dropdown selections 13627 from which they click 'Flex' 13637 to get the results in cells 'C5' to 'C14' 13668. FIG. 135A, FIG. 135B and FIG. 135D illustratively example the automatically done steps for the FLEX copy paste generation of the results in cells 'C5' to 'C14' 13668 in FIG. 136B. All those cell values having used the bucketed/grouped values and their associated date in cells 'A5' to 'A14' 13666.

Figures 137A, 137B, 137C, 137D, 137E, 137F:
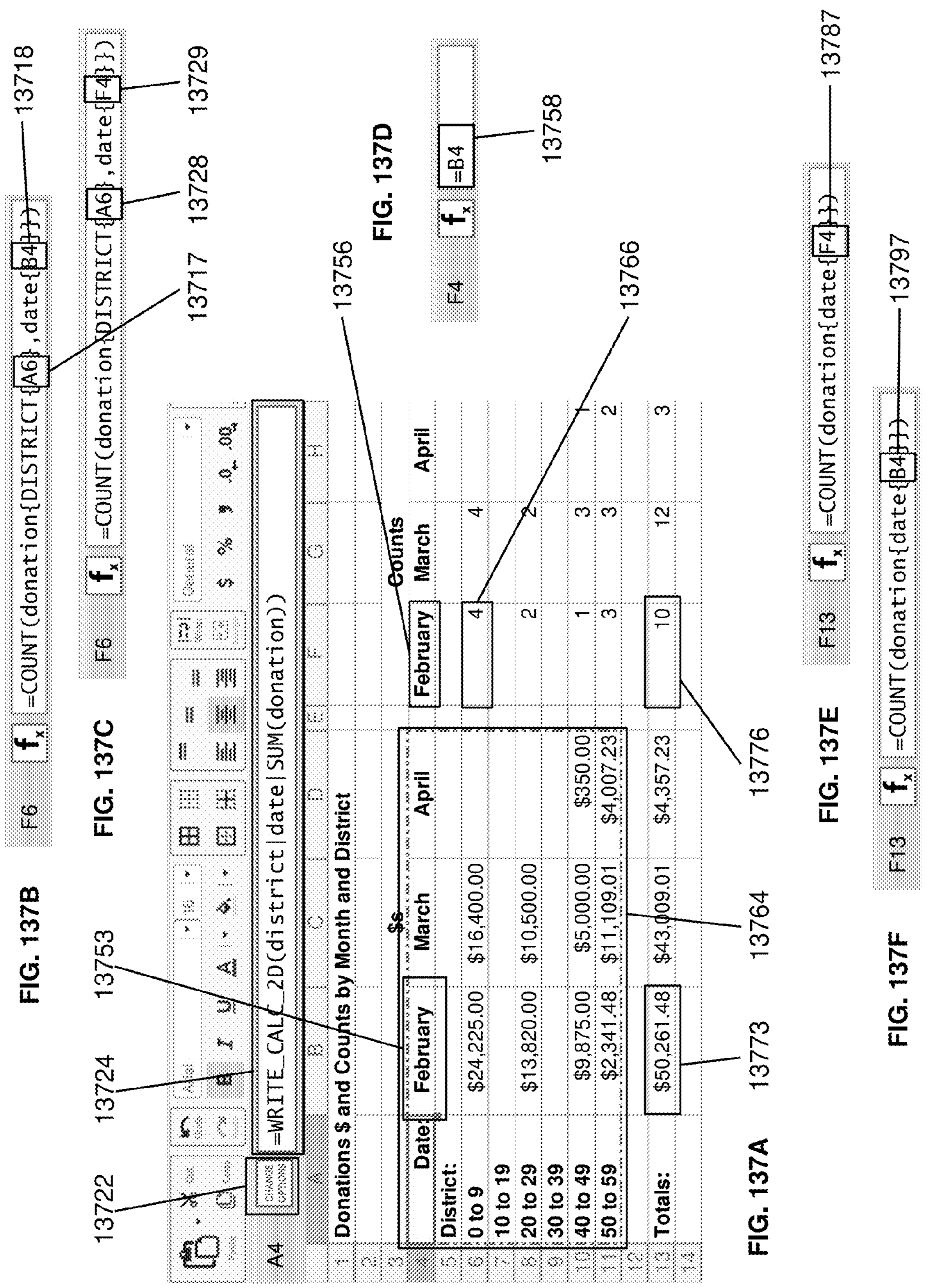

Bucketing/Grouping Optional Specification in Functions Populating Multiple Cells—Use Via Referenced Cell FIG. 137A through FIG. 138B examples use of the buckets/groups generated by an optional specification employing function by cell reference (referring to the value and associated data) and by functional calculations referencing that referencing cell and using the value and associated data as if they had referenced the original cell. FIG. 137A starts with cells 'A4' to 'D11' 13764 which were the result 11067 in FIG. 110. Those results have numeric and date buckets/groups generated by the function option selections in FIG. 106A through FIG. 109E. These buckets/groups are now used directly and indirectly (via a cell) in cell values and cell formulaic calculations.

Cell 'F4' 13756 in FIG. 137A examples a cell generating a bucketed/grouped value of 'February', via a formula '=B4' 13758 shown in FIG. 137D that references the cell 'B4' 13753 in FIG. 137A which contains a bucketed/grouped value generated by the 'WRITE' function option result for the formula 13724 in cell 'A4'. Our technology supports a cell referencing a bucketed/grouped value to get that value and the associated data with it. So that a formula referencing that cell ('F4' 13756) would access the same values and associated data as if they were referencing the original cell (B4' 13753).

Cell 'F6' 13766 in FIG. 137A examples how this use of the referenced cell gives the same result as the use of the original cell as either the formula in FIG. 137B or FIG. 137C gives the same result '4'. The formula in FIG. 137B uses both bucketed/grouped values 'A6' 13717 and 'B4' 13718 generated by the 'WRITE' function formula 13724. The formula in FIG. 137C uses one bucketed/grouped values 'A6' 13728 from the original area and 'F4' 13729 which gets it value by referencing 'B4' and yet in our technology delivers the same result of '4' 13766 via the automatically done calculations, illustratively exampled in FIG. 138A and FIG. 138B for the direct use of the data and FIG. 138C and FIG. 138D for the indirect use of the 'February' data in 'F4'. FIG. 137E and FIG. 137F example the same capability for an even simpler formula where the user gets the same result of '10' 13776 whether the formula directly references cell 'B4' 13753 as done by 13797 in FIG. 137F or indirectly references 'B4' 13753 as done by 'F4' 13787 in FIG. 137E.

While we could show further examples pf the optional specification generated bucket/group value usage by other cells directly or indirectly, instead we will example that type of usage by our single value bucketing/grouping functions and then our multi-value bucketing/grouping functions.

Single Value Bucketing/Grouping Functions—Use Via Referenced Cell

Figure 139:
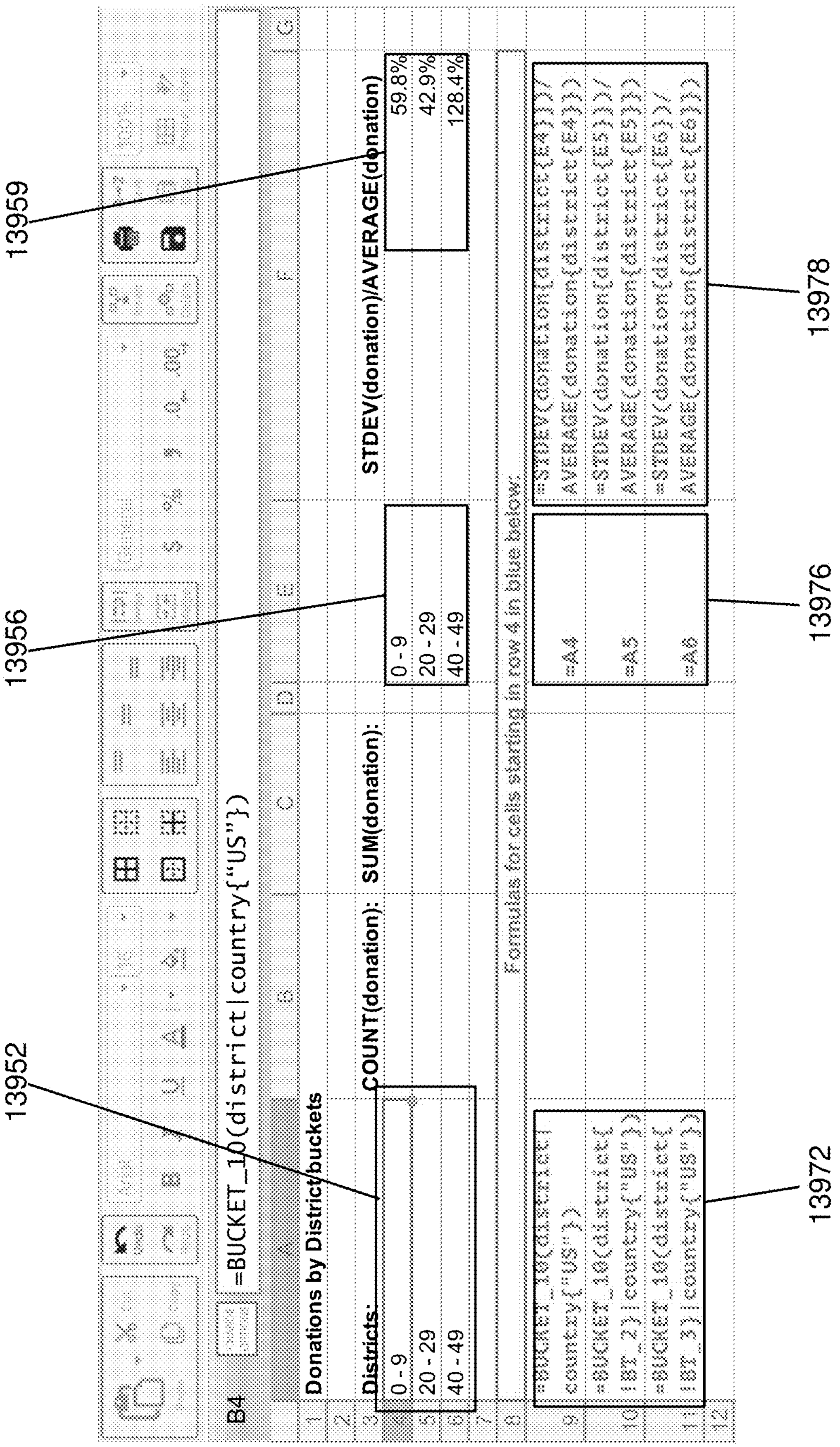

FIG. 139 through FIG. 140E examples use of the buckets/groups generated by three single value bucketing/grouping function results referenced by three cells (getting the value and associated data) and by functional calculations referencing those cells and using their values and associated data as if they had referenced the original cells. FIG. 139 starts with cells 'A4' to 'A6' 13952 which were the result of 6156 in FIG. 61B having numeric buckets/groups generated by the actions in FIG. 62A through FIG. 62G. This includes creating the first bucket/group value and then copy paste generating the next two. In this example, the formulas for the cells in rows 4 through 6 are shown in blue in rows 9 through 11 (using a 'FORMULATEXT' function). The three 'BUCKET_10' function generated values 'A4' to 'A6' 13952 have their formulas shown in 'A9' to 'A11' 13972. Those values are then replicated in cells 'E4' to 'E7' 13956 with their formulas of '=A4', '=A5' and '=A6' shown in 'E9' to 'E11' 13976. Those referenced values are then used in the 'STDEV' and 'AVERAGE' formula calculations done in cells 'F4' to'F6' 13959 with their formulas shown in 'F9' to 'F11' 13978. As the calculations illustratively exampled in FIG. 140A through FIG. 140E show our technology retains the bucketed/grouped data association (see FIG. 140A) across the referenced cells supporting the calculations working as if they referenced the original cells 'A4' to 'A6' 13952 when instead they reference the referring cells 'F4' to 'F6' 13956.

Multi-Value Bucketing/Grouping Functions—Use Via Referenced Cell

FIG. 141 examples use of three buckets/groups generated by one multi-value bucketing/grouping function referenced by three cells (getting the value and associated data) and by functional calculations referencing those cells and using their values and associated data as if they had referenced the original cells. FIG. 141 starts with cells 'A4' to 'A6' 14152 which are generated by the formula 14125 in cell 'A4' 14132. It generates non-filled numeric buckets/groups. In this example, the formulas for the cells in rows 4 through 6 are shown in blue in rows 9 through 11 (using a 'FORMULATEXT' function). The three 'WRITE_BUCKET_10' function generated values 'A4' to 'A6' 14152 have their formulas shown in 'A9' to 'A11' 14172. The values in 'A4' to 'A6' 14152 are then replicated in cells 'E4' to 'E7' 14156 with their formulas of '=A4', '=A5' and '=A6' shown in 'E9' to 'E11' 14176. Those referenced values are then used in the 'STDEV' and 'AVERAGE' formula calculations done in cells 'F4' to 'F6' 14159 with their formulas shown in 'F9' to 'F11' 14178. As the calculations illustratively exampled in FIG. 140A through FIG. 140E show our technology retains the bucketed/grouped data association (see FIG. 140A) across the referenced cells supporting the calculations working as if they referenced the original cells 'A4' to 'A6' 14152 when instead they reference the referring cells 'F4' to 'F6' 14156.

There are many different variants of using the bucket/group generated cell values however we will now move to the last major type of usage which is in functions or as a function optional specification that generates a selectable list of multiple values within a single cell.

Bucketing/Grouping Optional Specification in Function Populating Multiple Value Selections within a Single Cell Our technology supports addition of bucketing/grouping as an optional specification to the spreadsheet functions subject of our U.S. application Ser. No. 17/359,418. FIG. 142A through FIG. 148D examples one embodiment of our bucketing/grouping optional specification in one of our functions populating multiple value selections within a single cell (e.g., 'DROPDOWN' function).

Figure 142B:
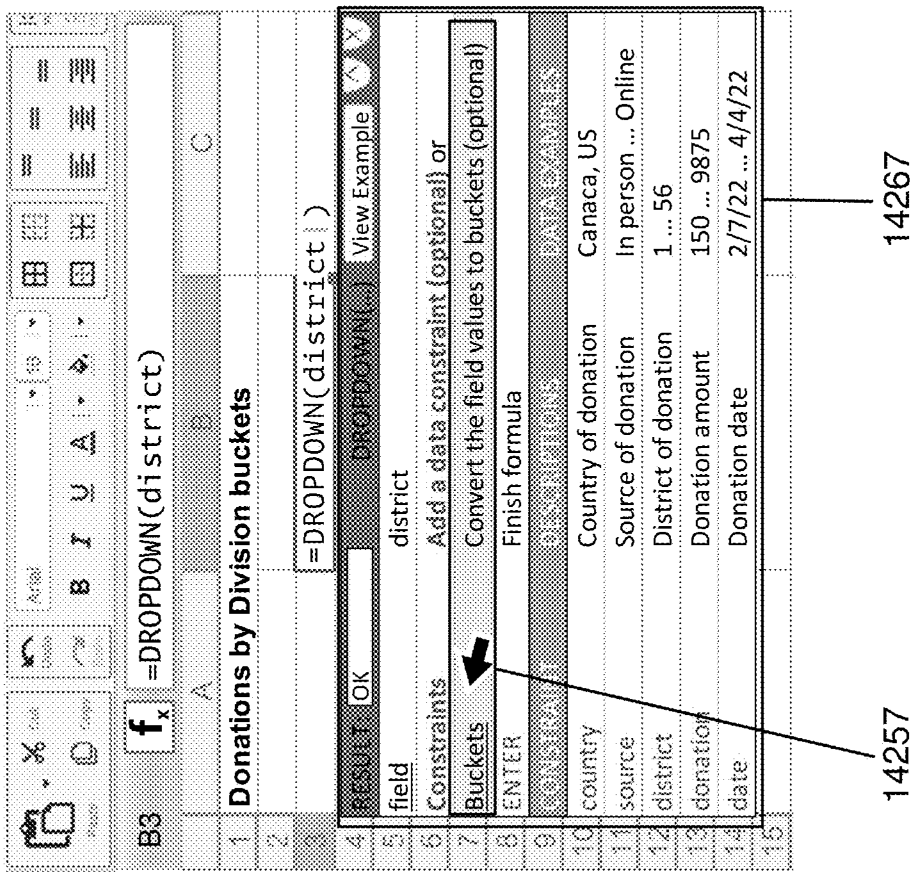
Figure 142A:
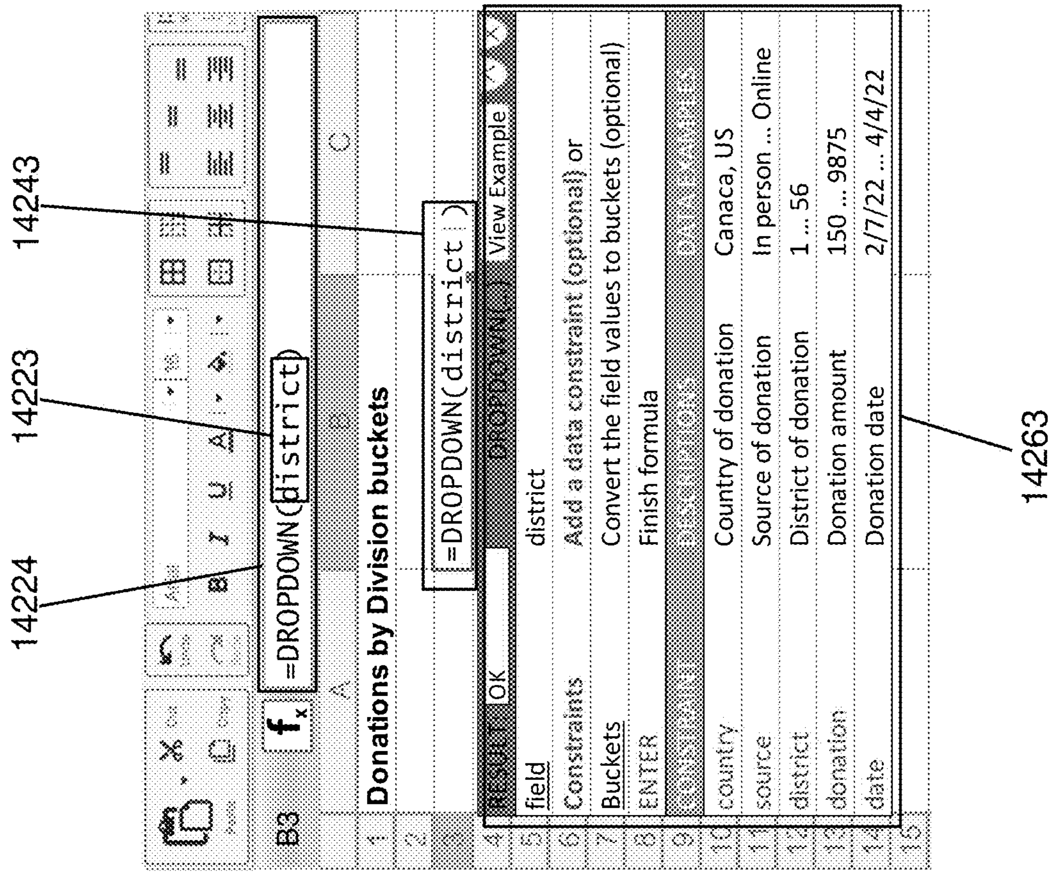
Figure 143B:
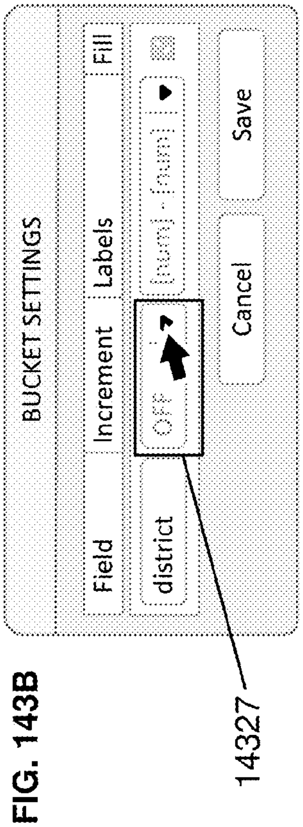
Figure 143C:
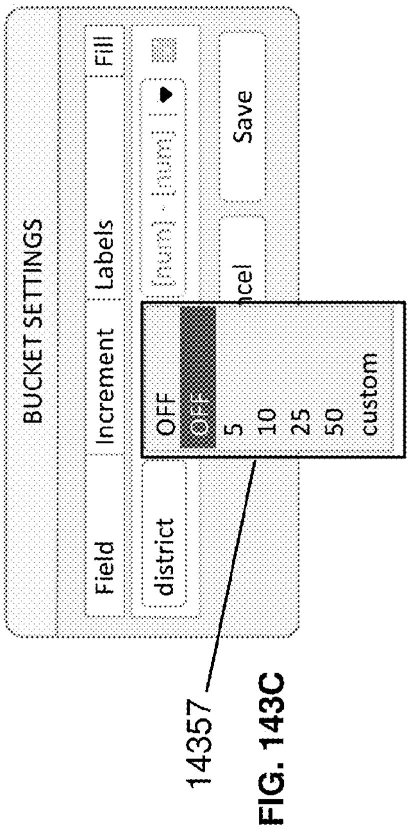
Figure 143D:
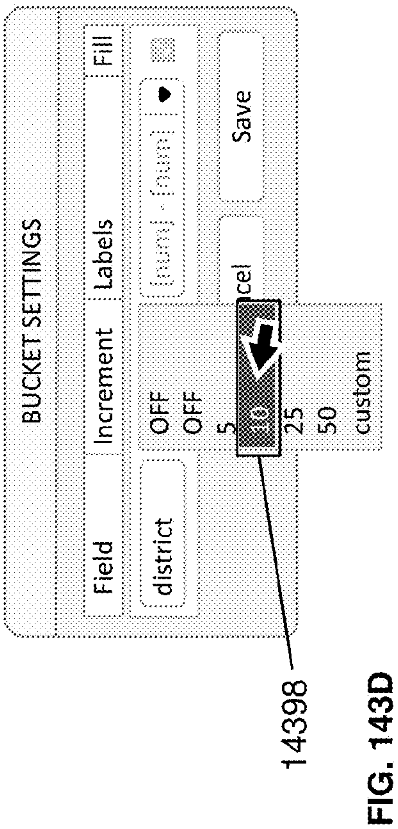
Figure 143A:
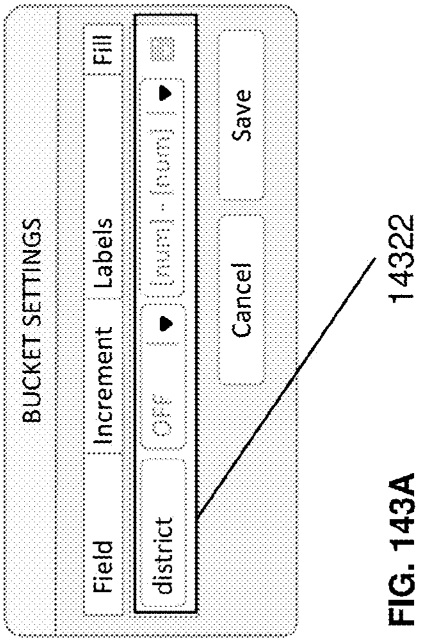
Figure 143E:
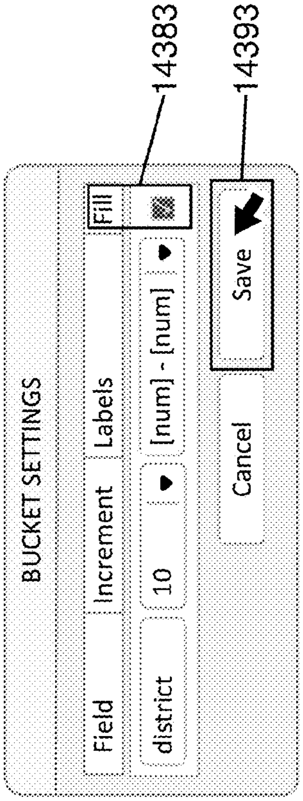
Figure 145B:
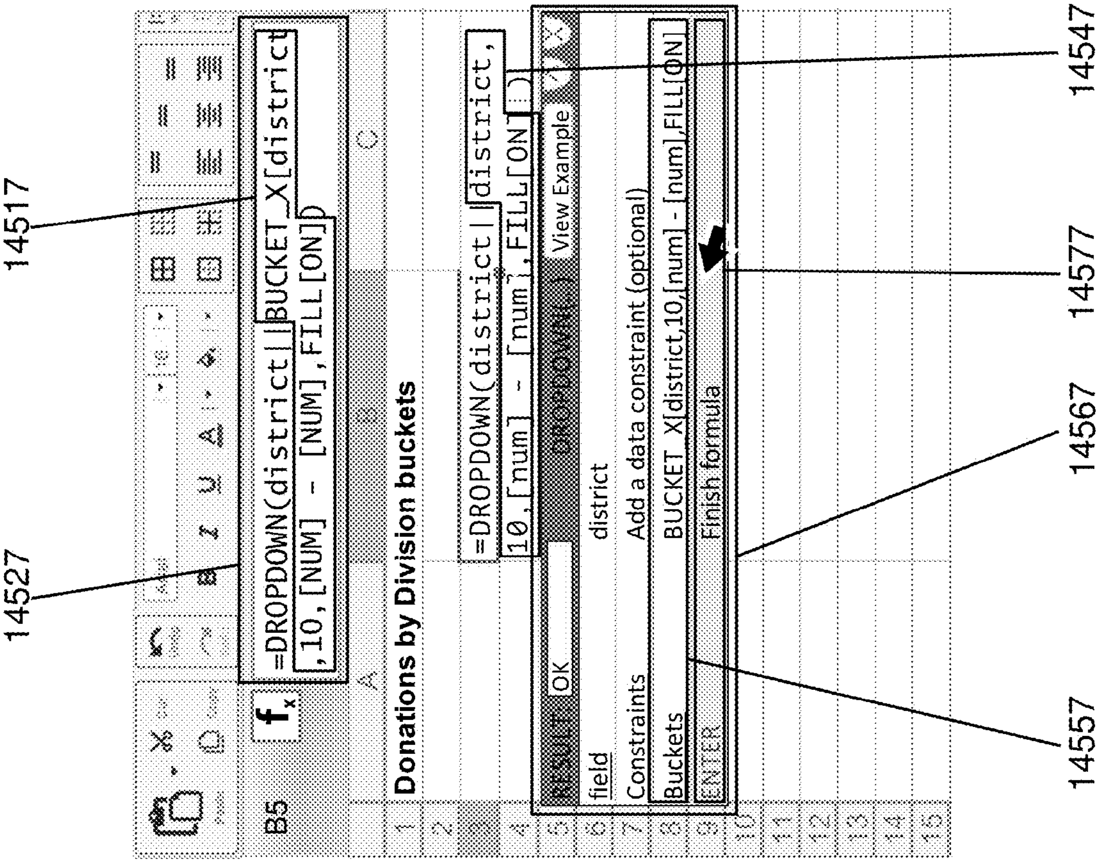
Figure 145A:
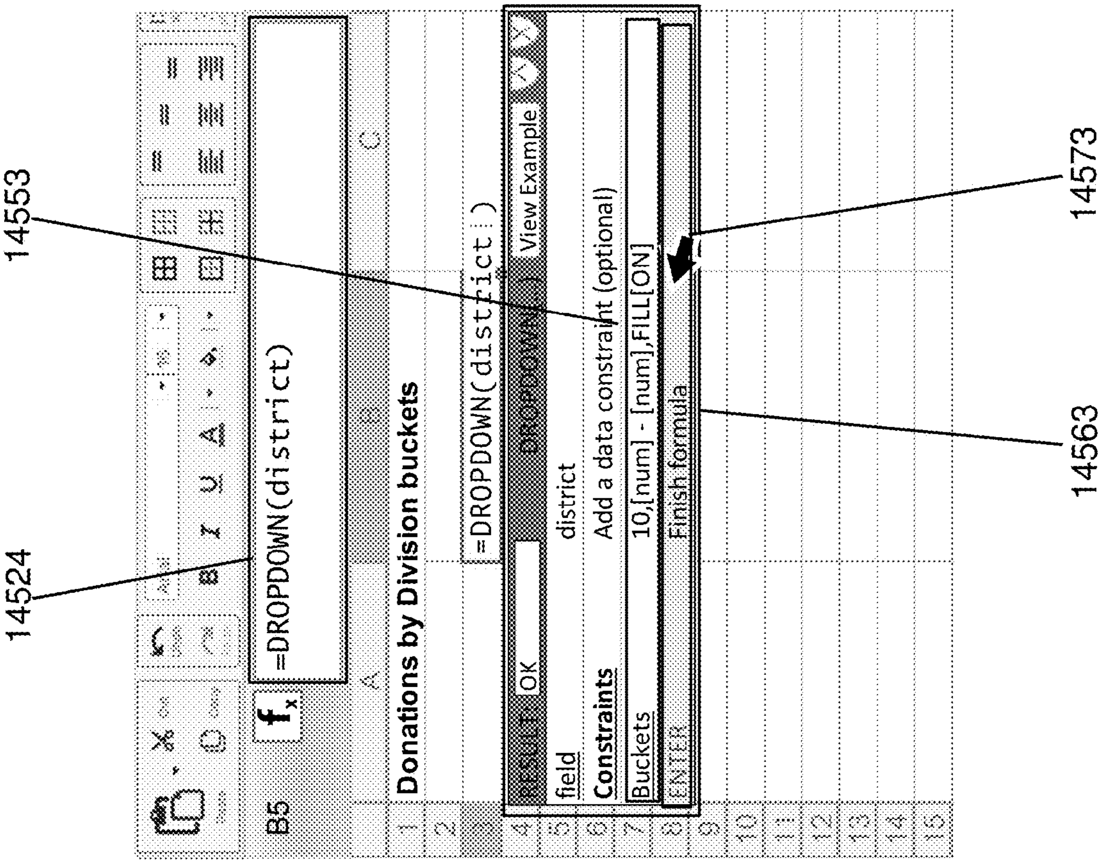

FIG. 142A examples the charity user creating a dropdown selector cell 'B3' 14243 for the formulaic data field, externally or in-cell data sourced, 'district' 14223. However, the formula 14224 as written will generate a dropdown with a selector for each value of 'district' and the user would like '10' increment buckets/groups. This can be accomplished with the addition of our new technology 'Buckets' as an option in the hint 14263. So, the user clicks the 'Buckets' option 14257 in FIG. 142B opening in this embodiment the 'BUCKET SETTINGS' popup in FIG. 143A. This popup is for the field 'district' and shows all the settings 14322 greyed out because they are 'OFF'. The user then clicks the 'Increment' dropdown triangle 14327 in FIG. 143B to open the intelligent option list 14357 in FIG. 143C. In FIG. 143D the user selects the '10' increment 14398 and then decides they are fine with the other settings for the 'Labels' and with the 'Fill' checked on 14383, so they click 'Save' 14393 in FIG. 143E to return to the hint 14563 in FIG. 145A. In this embodiment which has invisible 'Bucket' arguments the bucket/group settings are displayed in the hint 14553 but not in the cell formula 14524. Had the user instead been using an embodiment with visible 'Bucket' arguments then those arguments 14517 would have shown up in the formula 14527 and 14547 and the hint 14557 as exampled in FIG. 145B (or in just the formula and not the hint). In either embodiment the user clicks 'ENTER' 14573 or 14577 to populate the first bucket/group into cell 'B3' 14643 in FIG. 146A or 14647 in FIG. 146B. FIG. 144A through FIG. 144E example the illustrative steps automatically taken by our technology to deliver the buckets/groups in the 'DROPDOWN' function with the dropdown options shown in FIG. 144F.

FIG. 147A through FIG. 148D then examples the user using that 'DROPDOWN' to change the bucketed/grouped value. The user clicks the dropdown triangle 14743 in FIG. 147A or 14747 in FIG. 147B to expose the list of bucket/group values 14783 in FIG. 147C or 14787 in FIG. 147D. The user then changes the selection by clicking '40-49' 14863 in FIG. 148A or 14867 in FIG. 148B to see that selection in cell 'B3' 14883 in FIG. 148A or 14887 in FIG. 148B. In this embodiment this change does not change the formulas (14724 in FIG. 147A vs. 14873 in FIG. 148C or 14727 in FIG. 147A vs. 14877 in FIG. 148D) because the selected value is not visible in it. Other embodiments could show that selected value.

Before we example the usage of these bucketed/grouped selectable list values in cell formulas and formula calculations we will example how another embodiment of our technology generates the value.

Figure 149B:
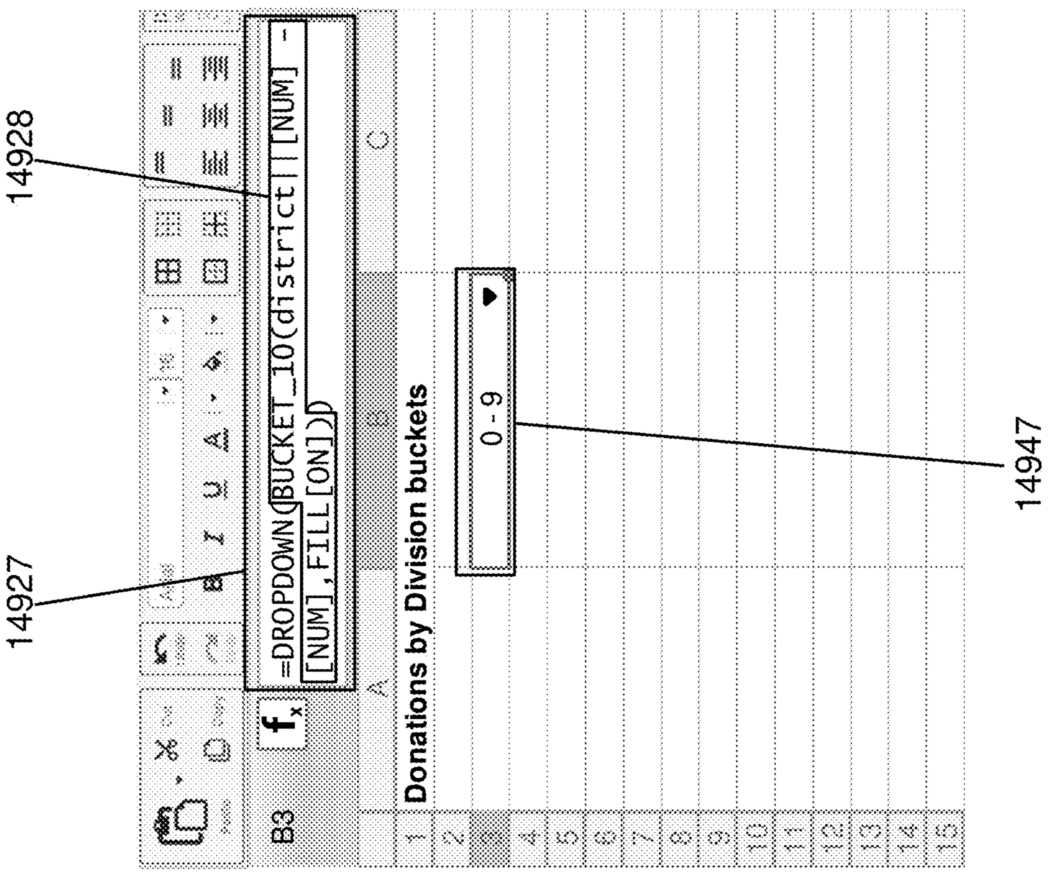
Figure 149A:
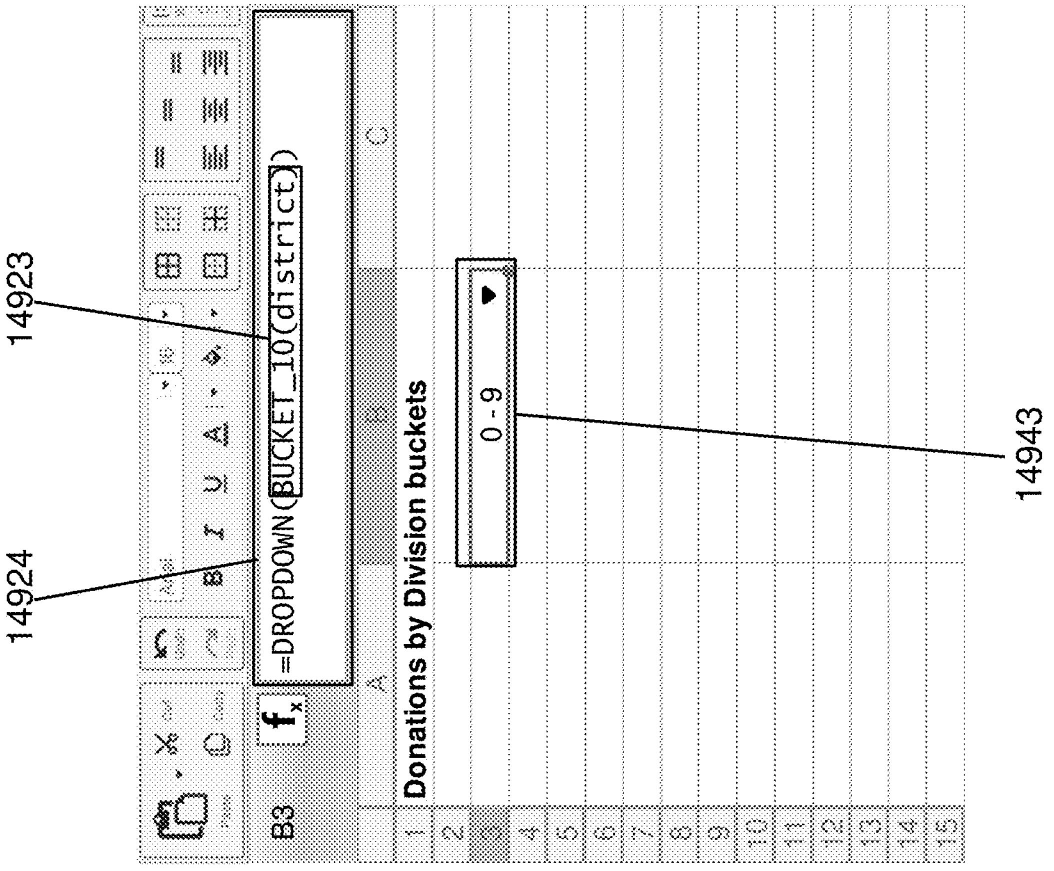
Figures 150A, 150B, 150C, 150D:
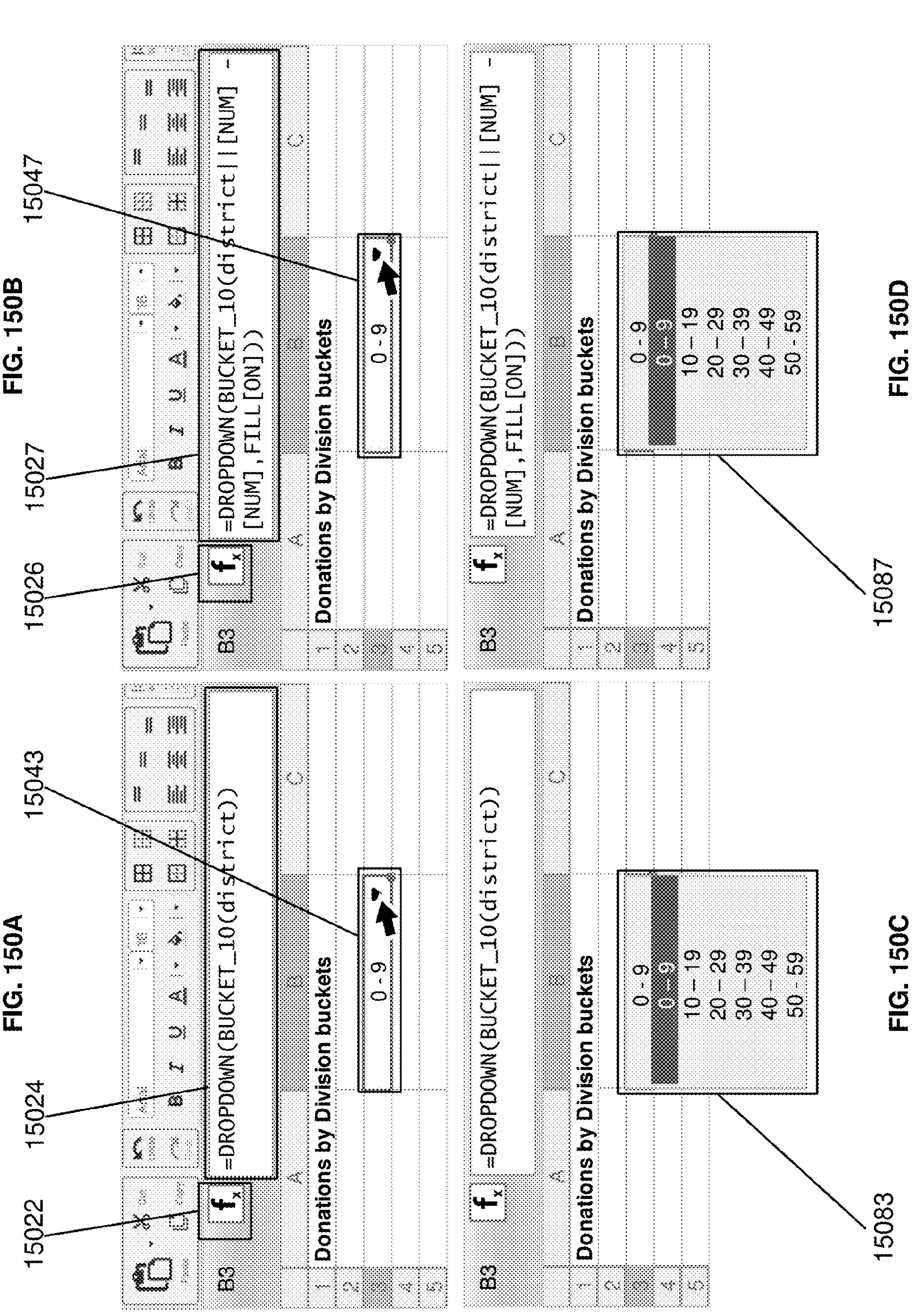
Figures 151A, 151B, 151C, 151D:
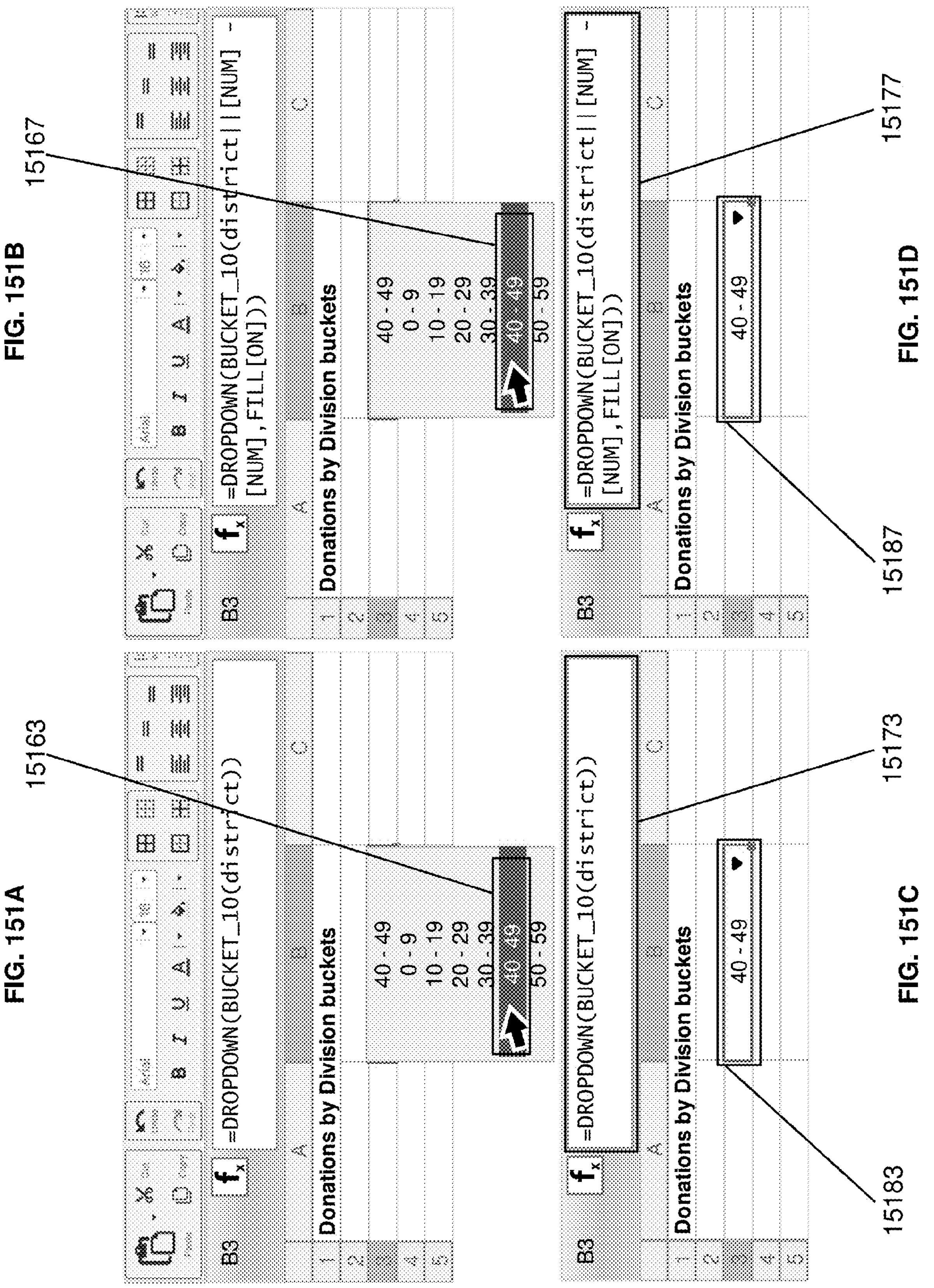
Figure 152B:
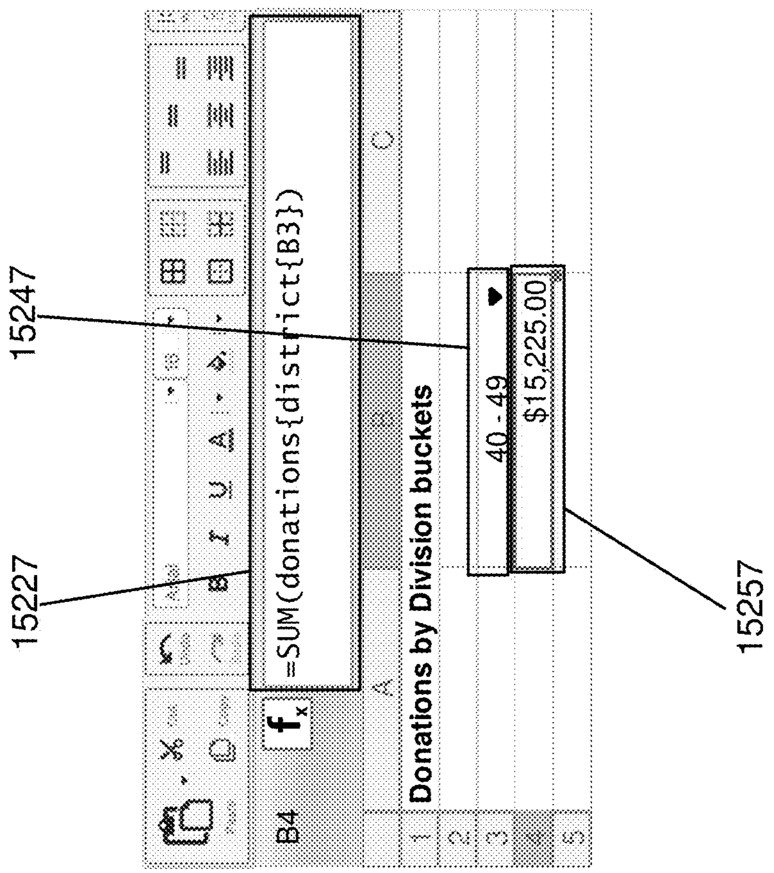
Figure 152A:
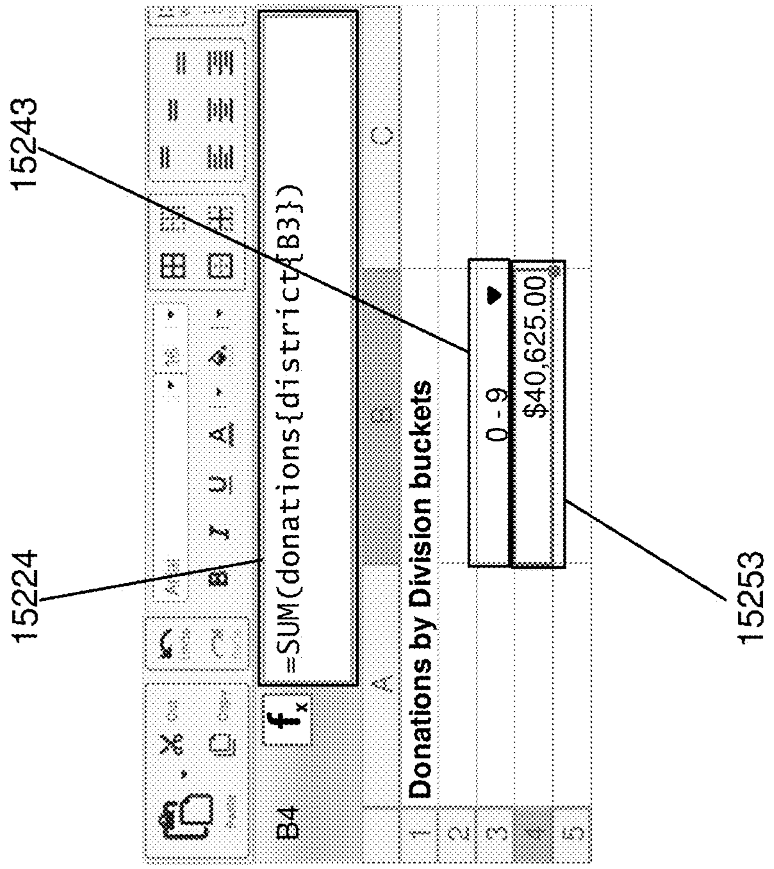

Bucketing/Grouping Function Use in a Function Populating Multiple Value Selections within a Single Cell FIG. 149A through FIG. 151D examples the use of one of our single value bucketing/grouping functions (e.g., 'BUCKET_10') in the field of one of our functions populating multiple value selections within a single cell (e.g., 'DROPDOWN' function). FIG. 149A examples a 'BUCKET_10' function for 'BUCKET_10(district)' 14923, in the field argument of the formula "DROPDOWN (BUCKET_10(donation))' 14924. This formula automatically executes the illustrative example steps in FIG. 144A, FIG. 144B, FIG. 144D and FIG. 144E to deliver the '0-9' value to cell 'B3' 14943 in FIG. 149A with invisible 'BUCKET' arguments or to 'B3' 14947 in FIG. 149B with visible 'BUCKET' arguments 14928 exampled in the formula 14927.

FIG. 150A through FIG. 151D then examples the user using the 'DROPDOWN' to change the bucketed/grouped value. The user clicks the dropdown triangle 15043 in FIG. 150A or 15047 in FIG. 150B to expose the list of bucket/group values 15083 in FIG. 150C or 15087 in FIG. 150D. The user then changes the selection by clicking '40-49' 15163 in FIG. 151A or 15167 in FIG. 151B to see that selection '40-49' in cell 'B3' 15183 in FIG. 151C or 15187 in FIG. 151D. Neither of the 'DROPDOWN' function formulas 15173 in FIG. 151A or 15177 in FIG. 151B displayed the selected value in the formula although in another embodiment that value would have been visible.

Selectable List of Buckets/Groups within a Cell—Reference Usage

FIG. 152A through FIG. 153E examples the use of a function populating multiple value selections within a single cell ('DROPDOWN') populated cell with a selected bucket/group value and its associated data referenced in a 'SUM' function formula. The 'DROPDOWN' cell 15243 in FIG. 152A could have been created by either of the previously described approaches, the function option or the function within a function and it would perform the same way in our technology. The 'SUM' formula 15224 for cell 'B4' 15253 references the 'district' value for the cell in 'B3' 15243 containing the bucketed/grouped value '0-9'. The automatically calculated value of '$40,625.00' 15253 is illustratively exampled in FIG. 153A through FIG. 153D. However, when the charity user changes the 'DROPDOWN' cell value to '40-49' 15247 in FIG. 152B that automatically triggers a recalculation of the value in cell 'B4' 15257 to the value ' '$15,225.00' as exampled in FIG. 153A through FIG. 153C and FIG. 153E. Our technology has supported the formulaic use in cell calculations referencing the selectable list of buckets/groups within a cell. While this example was done with a very simple functional formula, our technology supports referenced usage of selectable lists of buckets/groups with a cell in complicated analytical formulas. Our technology also supports selection of multiple buckets/groups within a single cell as exampled next.

Bucketing/Grouping Optional Specification in Function Populating Multiple Value Selections within a Single Cell—Multiple Group Selection Our U.S. application Ser. No. 17/359,418 supports selection of multiple values within a single cell. With the addition of our bucketing/grouping technology the combination supports selection of multiple buckets/groups within a single cell and then its usage by other cell formulas.

FIG. 154A through FIG. 155F examples the result of the use of a bucketing/grouping optional specification in a function populating multiple value selections within a single cell and supporting the selection of multiple different bucketing/group values with invisible and visible bucketing/grouping formula arguments. FIG. 154A examples the outcome of the charity user setting up a bucketing/grouping specification as exampled in the automatically executed steps illustratively exampled in FIG. 155A through FIG. 155F. FIG. 155B examples the constraint (filter) of the data to 'country{"US"}' 15425 as shown in the formula 15424 in FIG. 154A. FIG. 155C examples the creation of the intelligent option selections and those selections not offered. The user then selects 'Week' which is applied by our application to create the buckets/groups in FIG. 155D. Once difference with the 'DROPDOWN_MANY' function in this embodiment is that it also displays the number of dates within each bucket, so our application also does those counts. FIG. 155E examples the values which are displayed in the 'DROPDOWN_MANY' value selector UI 15464 in FIG. 154A while FIG. 155F examples the default value which in this embodiment is '!ALL' shown in cell 'B3' 15443 in FIG. 154A. FIG. 154B examples the exact same set of user and application actions as FIG. 154A and FIG. 155A through FIG. 155F except for an embodiment where the option arguments are visible 15437 as shown in the formula 15427 in FIG. 154B for the equivalent cell 'B3' 15447 showing the same 'DROPDOWN_MANY' value selector UI 15467.

FIG. 156A and FIG. 156B example the charity user having changed the bucket/group selections to four values (15674 in FIG. 156A and 15677 in FIG. 156B) in the 'DROPDOWN_MANY' value selector UI (15664 in FIG. 156A and 15667 in FIG. 156B) with invisible and visible bucketing/grouping formula arguments. In this embodiment the four values (in this example bucketed/grouped values) are indicated in the cell with '*4*' shown in 'B3' (15643 in FIG. 156A and 15647 in FIG. 156B) exampling our technology supporting the selection of multiple bucket/group values within a single cell.

FIG. 157A and FIG. 157B example the same UI selector outcome as FIG. 156A and FIG. 156B however achieved using 'BUCKET' functions within the 'DROPDOWN_MANY' functions. The invisible bucket argument example in FIG. 157A has a formula 15724:

'=DROPDOWN_MANY(BUCKET_WEEK(date)
|country{"US"})' which uses 'BUCKET_WEEK(date)15714 for the field input, thus supplying weekly buckets of the field 'date' for the values in the UI selector 15764. In this example the user has selected the same four values 15774 in FIG. 157A as in 15674 in FIG. 156A and for usage purposes the cell values (15743 in FIG. 157A and 15643 in FIG. 156A) and their related data are the same. FIG. 157B examples the same outcome except for a 'BUCKET' function with visible bucket arguments 15717 for the same four selections 15777 in the same 'DROPDOWN_MANY' UI value selector 15767. As exampled next, usage of these values and their related data is the same regardless of the different ways our technology supports creating those values.

Figure 158B:
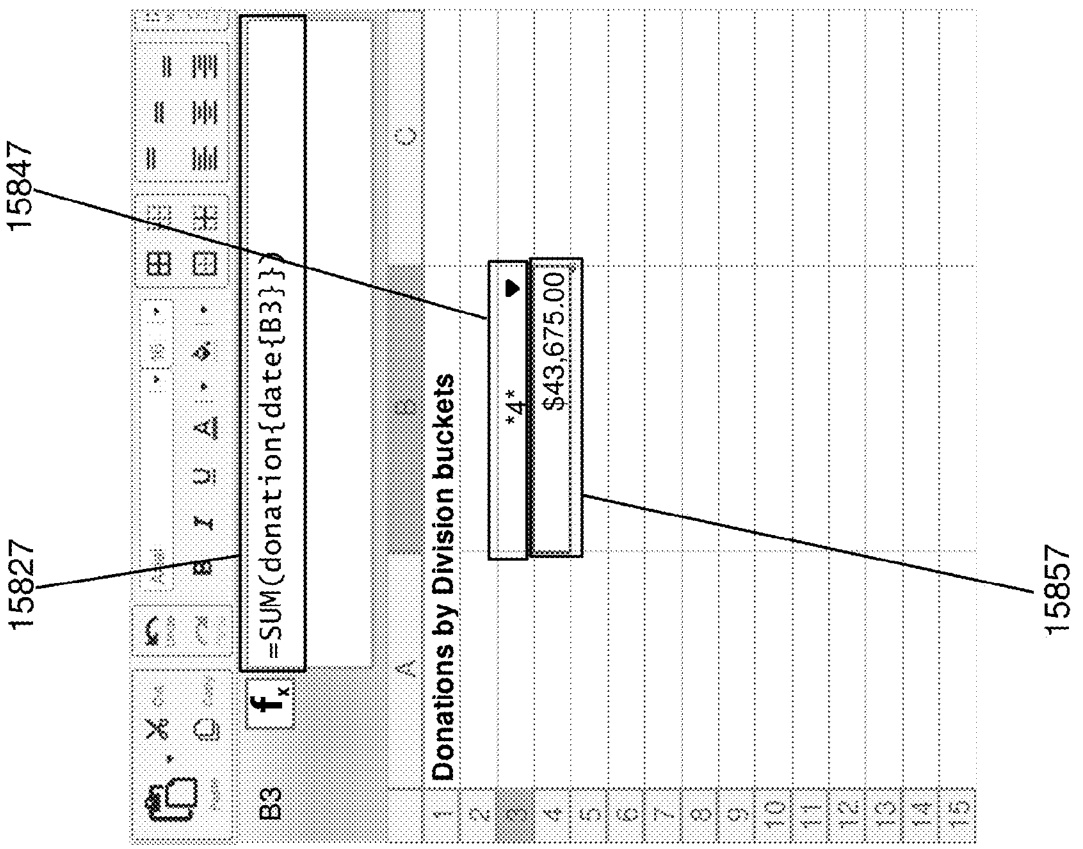
Figure 158A:
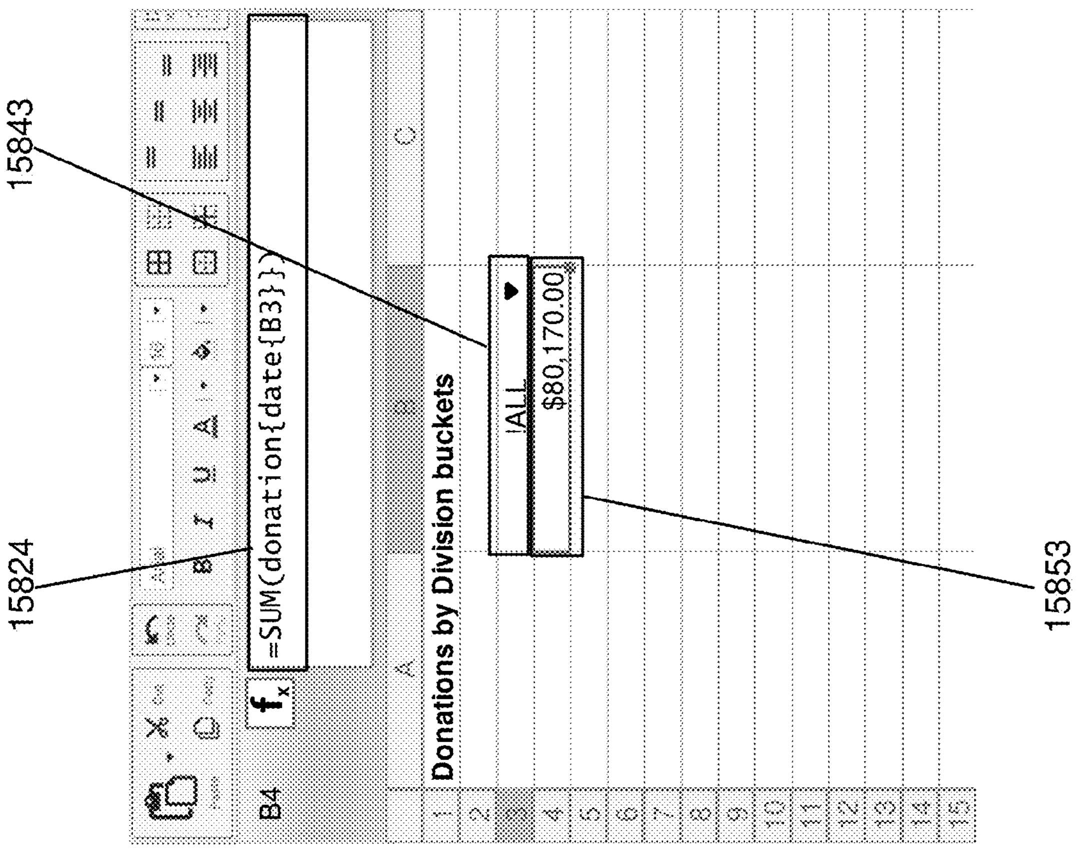

Selectable List of Buckets/Groups with Multiple Values within a Cell—Reference Usage FIG. 158A through FIG. 159H examples the use of a function populating multiple value selections with multiple values within a single ('DROPDOWN_MANY') populated cell with four selected bucket/group values and their associated data referenced in a 'SUM' function formula. The 'DROPDOWN_MANY' cell 15843 in FIG. 158A could have been created by either of the previously described approaches, the function option or the function within a function and it would perform the same way in our technology. FIG. 158A examples usage of cell 'B3' (15443 in FIG. 154A or 15447 in FIG. 154B or its equivalents done with the formulas in FIG. 157A or FIG. 157B selecting '!ALL') in a '=SUM(donation(date{B3}))' 15824 formula in cell 'B4' 15853 referring to the 'date' field bucketed/grouped values in 'B3' 15843. The calculations automatically done for cell 'B3' 15843 and cell 'B4' 15853 in FIG. 158A are illustratively exampled in FIG. 159A through FIG. 159F. When the charity user changes the 'DROPDOWN_MANY' selections in cell 'B3' 15847 in FIG. 158B to the equivalent of the four values selected in 15674 in FIG. 156A, 15677 in FIG. 156B, 15774 in FIG. 157A or 15777 in FIG. 157B that automatically recalculates the value in cell 'B4' 15857 as illustratively exampled in FIG. 159A through FIG. 159D, FIG. 159G and FIG. 159H. Thus, the calculation now done in cell 'B4' 15857 has used the four bucketed/grouped values and their associated data from cell 'B3' 15847.

As we have shown our selectable list of buckets/groups within a cell supports numeric and date bucketing/grouping and its usage supports functional analytics. It also supports text bucketing/grouping as we will example next.

Figure 160B:
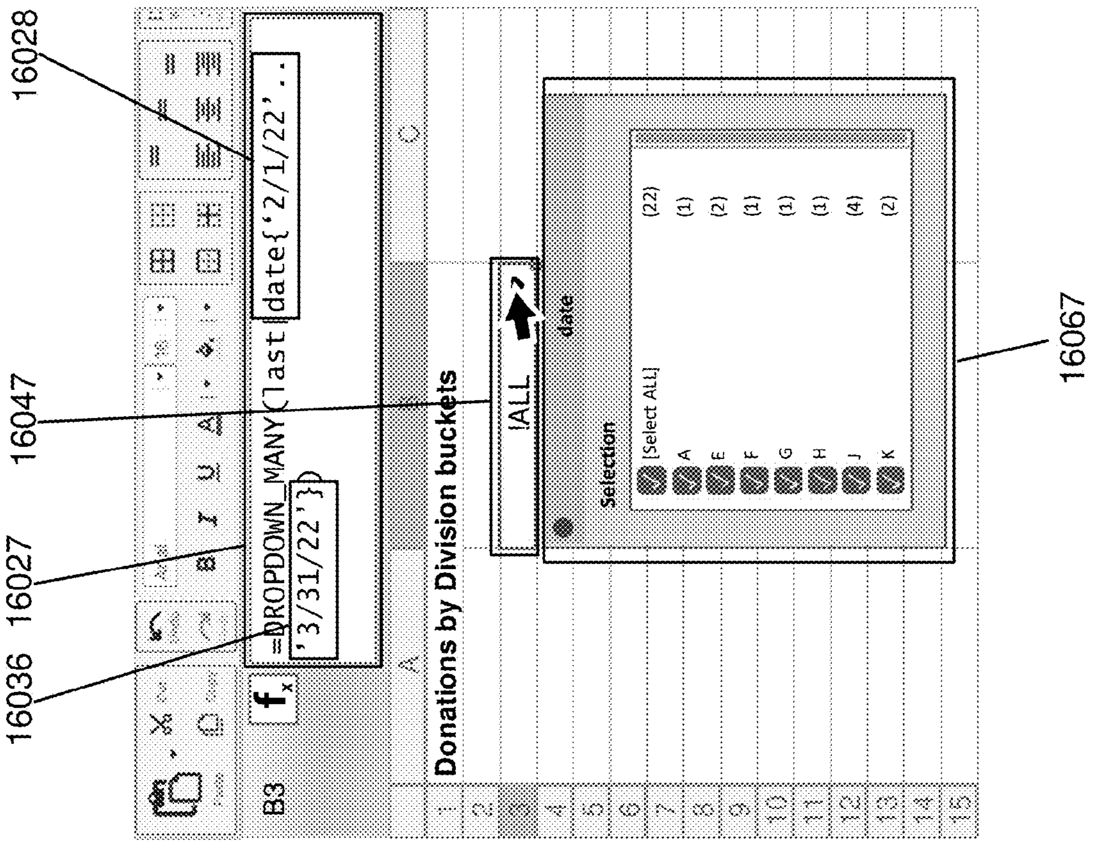
Figure 160A:
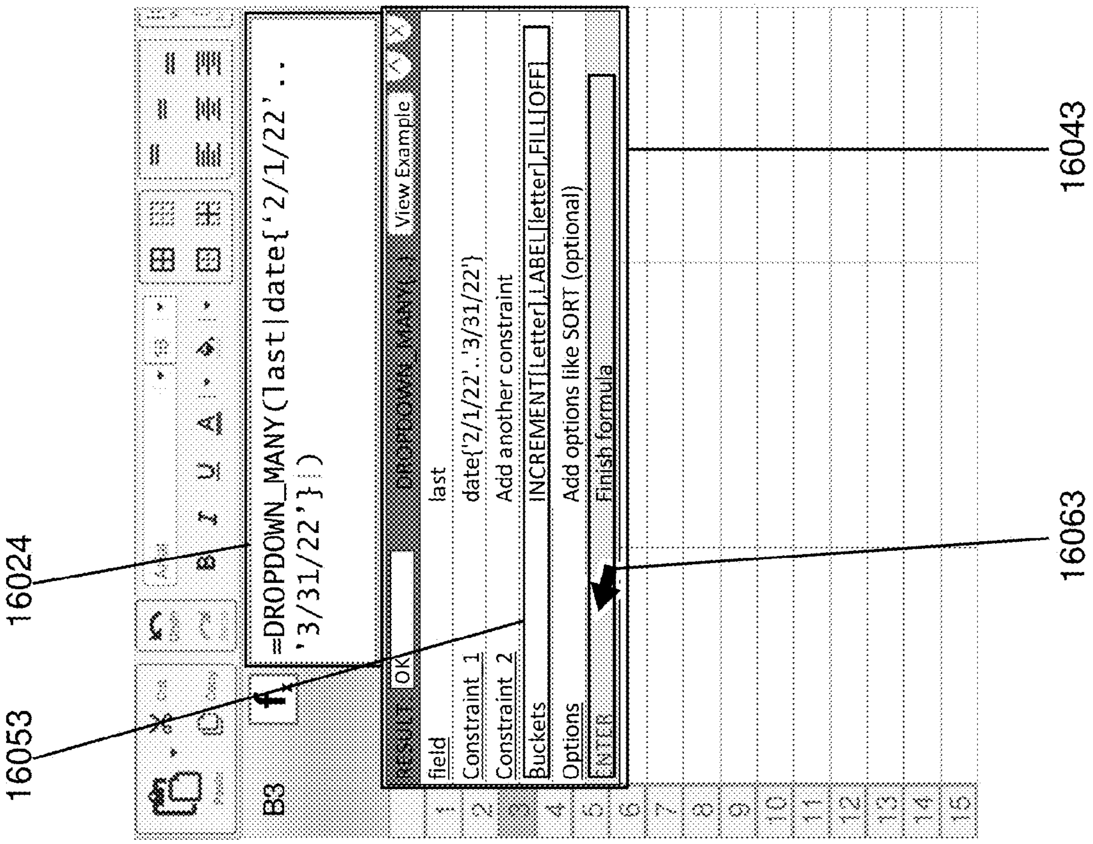

Bucketing/Grouping Optional Specification in Function Populating Multiple Value Selections within a Single Cell—Text Example FIG. 160A through FIG. 161E examples the use of a text (alphabetical) bucketing/grouping optional specification in a function ('DROPDOWN_MANY') populating multiple value selections within a single cell and supporting the selection of multiple different bucketing/group values with a constraint (filter), and no filling. FIG. 160A examples the selection of the bucket/group setting via an optional capability added to the 'DROPDOWN_MANY' function where the user has set an increment of 'Letter', a label of just the 'letter' and has filling 'OFF' 16053. They then finish the formula 16024 by clicking 'ENTER' 16063 to populate the cell 'B3' 16047 in FIG. 160B with '!ALL' via the automatically executed steps illustratively exampled in FIG. 161A through FIG. 161E. When the user clicks the triangle in cell 'B3' 16047 they get in this embodiment the popup 16067 within in which they can select any combination of the alphabetical bucketed/grouped values.

While we could continue to example mix and match combinations of the bucketing/grouping capabilities previously exampled for our selectable list of buckets/groups within a cell, e.g., supporting complex analytical cell calculations or indirect usage via another referencing cell, we will instead briefly example the technology supporting our capabilities.

Computer System

FIG. 181 is a block diagram of an example computer system, according to one implementation. Computer system 18110 typically includes at least one processor 18114 which communicates with a number of peripheral devices via bus subsystem 18112. These peripheral devices may include a storage subsystem 18124 including, for example, memory devices and a file storage subsystem, user interface input devices 18122, user interface output devices 18120, and a network interface subsystem 18116. The input and output devices allow user interaction with computer system 18110. Network interface subsystem 18116 provides an interface to outside networks, including an interface to communication network 18185, and is coupled via communication network 18185 to corresponding interface devices in other computer systems or in the cloud and usable for cloud applications.

User interface input devices 18122 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 18110 or onto communication network 18185.

User interface output devices 18120 may include a display subsystem, a printer, a fax machine, or non-visual displays such as audio output devices. The display subsystem may include a touch screen, a flat-panel device such as a liquid crystal display (LCD), a projection device, a cathode ray tube (CRT), or some other mechanism for creating a visible image. The display subsystem may also provide a non-visual display such as via audio output devices. In general, use of the term "output device" is intended to include all possible types of devices and ways to output information from computer system 18110 to the user or to another machine or computer system.

Storage subsystem 18124 stores programming and data constructs that provide the functionality of some or all of the modules and methods described herein. These software modules are generally executed by processor 18114 alone or in combination with other processors.

Memory 18126 used in the storage subsystem can include a number of memories including a main random-access memory (RAM) 18130 for storage of instructions and data during program execution and a read only memory (ROM) 18132 in which fixed instructions are stored. A file storage subsystem 18128 can provide persistent storage for program and data files, and may include a hard disk drive, SSD, a tape drive, an optical drive, or removable media cartridges. The modules implementing the functionality of certain implementations may be stored by file storage subsystem 18128 in the storage subsystem 18124, or in other machines accessible by the processor.

Bus subsystem 18112 provides a mechanism for letting the various components and subsystems of computer system 18110 communicate with each other as intended. Although bus subsystem 18112 is shown schematically as a single bus, alternative implementations of the bus subsystem may use multiple busses.

Computer system 18110 can be of varying types including a workstation, server, computing cluster, blade server, server farm, or any other data processing system or computing device. Due to the ever-changing nature of computers and networks, the description of computer system 18110 depicted in FIG. 181 is intended only as one example. Many other configurations of computer system 18110 are possible having more or fewer components than the computer system depicted in FIG. 181.

Some Particular Implementations

Some particular implementations and features are described in the following discussion.

Bucketing Function Implementations

One implementation is a method for generating one or more value range bucket/group and its associated data for populating one or more spreadsheet cell, as exampled in FIG. 34A and FIG. 35A through FIG. 35G and FIG. 34B and FIG. 37A through FIG. 37F, or populating one or more value range bucket/group for use in a spreadsheet cell formula, such as a formula calculating a SUM, COUNT or other predefined/built-in function formula as exampled in FIG. 51B and FIG. 53A through FIG. 54F. Wherein at least one of the value range buckets holds multiple unique data values as exampled with the three unique values ('1098.35', '1500' and ' ' 1750) 3536 in the '1000-1999.99 . . . ' bucket 3537 in FIG. 35F. The function has either a user specified 3428 (in FIG. 34B), or function specified 3424 (in FIG. 34A) increment that defines the boundaries or each of the value range buckets/groups. The range of buckets has either a user specified (e.g., 16287 and 16288 in FIG. 162C), or function specified (e.g., FIG. 35D and FIG. 35E) starting and ending point. The data associated with the bucket values, as exampled in FIG. 35A 3563 for the bucket '0-999.99' 3527 in FIG. 35F, is usable by formulas referencing the cell it is populated in (e.g., 4943 in FIG. 49A, 4948 in FIG. 49B, and 50A through FIG. 50G) or when the bucket function is directly populated in a formula it is usable by that formula (e.g., 5187 and, 5188 in FIG. 51B, with 52A through FIG. 52G).

Bucketing Function Implementations—Single Cell Population

In an implementation of our technology the bucket/group spreadsheet function populates a single cell with a bucket/group value and its associated data where the bucket value increment defines the boundaries between the value range buckets as exampled in FIG. 34A through FIG. 37F for function specified and user specified increments. The data associated with the bucket value is usable by formulas referencing the cell it is populated in, as exampled in FIG. 35A 3563 for the bucket '0-999.99' 3527 in FIG. 35F.

Bucketing Function Implementations—Multiple Cell Population

In another implementation of our technology the bucket/group spreadsheet function populates multiple adjoining cells each with a bucket/group value and its associated data where the bucket value increment defines the boundaries between the value range buckets as exampled in FIG. 84A through FIG. 85G. The data associated with the bucket values is usable by formulas referencing the cell it is populated in, as exampled for a single referenced cell in 8943 in FIG. 89A, 8948 in FIG. 89B, and 90A through FIG. 90G and exampled for the full set of populated cells in 9177 in FIG. 91B, and 92A through FIG. 92E.

Bucketing Function Implementations—Multiple Buckets Single Cell Population

In another implementation of our technology the bucket/group spreadsheet function populates multiple selectable buckets/group value ranges into a cell where the user can select a single bucket/group and its associated data as exampled in FIG. 176A through FIG. 177F. The same embodiment can also populate multiple bucket/group values and their associated data into a cell as exampled in FIG. 178A through FIG. 179F. The embodiment allows the user easy access for selection of the multiple buckets/groups as exampled in FIG. 178A and FIG. 178B. And as with all our populated bucket/group populated cells, the values and associated data are usable by other cell formula calculations.

Bucketing Function Implementations—Use in Range/Array Function Formulas

In another implementation, our bucket/group spreadsheet function is directly usable in a functional formula employing a range or array function, e.g., like those listed in FIG. 167. FIG. 51B and FIG. 53A through FIG. 54F examples that for a functional formula using SUM and a functional formula using COUNT with each of the two functions employing one of our bucket spreadsheet prebuilt functions within an argument. In our technology those functional formulas employing a bucket prebuilt function can be increment copy pasted as exampled in FIG. 58A through FIG. 60D.

Bucketing Function Implementations—Use in Multicell Populating Functions

In another implementation our technology supports the use of our bucketing/grouping functions in our multicell populating functions as exampled in FIG. 80A through FIG. 83D. Where the multicell populating functions (e.g., WRITE_V, WRITE_CALC_H and WRITE_CALC_2D), subject of our filings U.S. application Ser. Nos. 16/191,402, 17/374,901 and U.S. Application No. 63/240,828, replicate the bucket values and their associated data for cell population and were functionally supported (e.g., WRITE_CALC_V) calculations within the function (the calc argument or arguments). The bucket values and their associated data are also usable in referenced formulas as exampled in FIG. 134A through FIG. 135D.

Bucketing Function Implementations—Use in Single Cell Multi-Values Selecting Functions In another implementation our bucketing/grouping functions can be employed in an argument by our single cell multi-values selecting functions (e.g., DROPDOWN, DROPDOWN_MANY), subject of our filing U.S. application Ser. No. 17/359,418. They then populate one or more bucket/group within a cell as exampled in FIG. 149A through FIG. 151D. That embodiment then supports usage of those buckets (values and associated data) in other cell formulas as exampled in FIG. 152A through FIG. 153E. In another use of that embodiment where the bucketing/grouping function is used in a multi-value selecting function (e.g., DROPDOWN_MANY), the combination of functions can populate multiple buckets within a single cell as exampled in FIG. 157A and FIG. 157B. That embodiment then supports usage of those buckets (values and associated data) in other cell formulas as exampled in FIG. 158A through FIG. 159H allowing users to select multiple buckets into a cell and then use those buckets and their associated data in calculations by other cells referencing that cell.

Bucketing Function Implementations—Data Sources

The data source applicability discussed in this section applies to all the preceding and following embodiments. All the embodiments of our bucketing/grouping predefined function technology supports formulaic data as exampled in FIG. 36A through FIG. 36C. That data can be sourced from our non-spreadsheet cell (NSC) externally sourced data described in our previously cited filings and exampled in FIG. 36C. That formulaic data can be sourced from spreadsheet cells as described in our previously cited filings and exampled in FIG. 36B. And that data can be sourced from any combinations of the data sources when appropriately matched or joined together as exampled in our previous filings using data from different data tables.

Bucketing Function Implementations—Additional Bucketing Related Capabilities

The additional bucketing related capability embodiments discussed next apply to all the preceding bucketing function embodiments.

Our technology works for the different data types as exampled in FIG. 65A through FIG. 66F for time/date data. Those figures example our spreadsheet technology uniquely supporting weekly increments for bucket functions generating a single bucket. FIG. 100A through FIG. 101E example an embodiment where our technology supports weekly increments for our bucket function technology that populates weekly bucket values to multiple adjacent cells. Where for these embodiments the starting/ending point of the week is function specified or user specified.

Our technology works for real numerical data as exampled in FIG. 34A through FIG. 37F and integer numeric data as exampled in FIG. 61A through FIG. 62I. Where an implementation of our technology for the numerical data type has an automatically generated start value which is the closest number equal or lower than the lowest data value for the specified field which when divided by the increment value yields an integer. FIG. 35D examples that for real data values and FIG. 62E examples that for integer data values. Thereby ensuring the automatically specified bucket ranges are more normal bucketing breaks like '0 to 999.99 . . . 'rather than '150 to 1149.99 . . . ' or '0 to 9' rather than '3 to 12'.

In another embodiment our technology automatically sets the numeric bucket ranges to distinguish data fields which are integer from those that are real. Where the integer bucket ranges are integers as exampled in FIG. 64D. Real bucket value ranges have at least one real value as exampled in FIG. 35F for single cell populating bucket functions and FIG. 98F for multicell populating bucket functions. In a related embodiment for the numeric data fields, our technology automatically sets the bucket ranges so there is no ambiguity as to where values fall, i.e., no overlapping values ranges. FIG. 35F examples this for real values with the '0-999.99 . . . ' not overlapping with the next bucket '1000-1999.99 . . . ' and so on. FIG. 64D examples this for integer values with the '0-9' not overlapping with the next bucket '10-19' and so on.

Another implementation of our technology supports text buckets/groups. Where the increment can be by first characters, sets of characters or other text combinations (e.g., charities and other entities often have id numbers where the first x characters are geographic or other designations). This is exampled for single cell populating bucket functions in FIG. 70A through FIG. 71E and exampled for multiple cells populating bucket functions in FIG. 103B 10386.

In another embodiment the bucket/group range value labels can be changed by the user via a selection as exampled in FIG. 46A 4643 and FIG. 46B 4676 or can be custom created by the user for usage and replicated by our technology as exampled in FIG. 47A through FIG. 47C. Thus, offering users the capability to tailor the presentation of the bucket range values.

In another embodiment our technology supports the automatic filling of a missing bucket increment or multiple missing increments as exampled by the automatic settings with the fill checked on 16274 in FIG. 162B for the bucket function 16223 in FIG. 162A. Where the bucket filling is exampled in FIG. 44D 4437 and 4447 for a single value bucket function. FIG. 85G 8538 and 8558 examples automatic filling for a multiple value bucket populating function shown in FIG. 164B with the automatic filling checked on 16475.

In another embodiment of our technology our bucketing/grouping predefined spreadsheet function has the capability to constrain (filter) the data used in the determination of the buckets as exampled in FIG. 61A through FIG. 62I for a single value bucketing function. And for the multiple value bucket populating function as exampled in FIG. 97A through FIG. 99G. In similar embodiment for a bucketing function used as an argument in another function, the bucketing function uses the filtering (constraining) of the data by the other function in the determination of its buckets. This is exampled in the formula 15724 in FIG. 157A where the constraining (filtering) of the bucket function 15714 values is done by the function 'DROPDOWN_MANY' into which the bucket function 15714 is populated as an argument. The DROPDOWN_MANY' constraint argument 'country{"US"}' 15733 constrains the bucket function 15714 range values shown in the UI 15764.

Another embodiment of our technology supports our bucket values and their associated data for referenced use in other cell formulas. FIG. 49A through FIG. 50G examples the direct reference usage of the bucket/group values in a formula calculation within a different cell. FIG. 89A through FIG. 90G examples the direct reference usage in a formula calculation of a multi-value bucketing function populated bucket/group range value and its associated data. We called the preceding direct reference usage as opposed to the capabilities we will example next which we will call indirect reference (e.g., replicated) usage of the bucket values and their associated data.

FIG. 139 13956 and 13976 example our embodiments' capabilities to support replication of the bucket/group values and their associated data in another cell. Values replicated this way support calculations using their associated data as if they were the originally populated cells. FIG. 139 13959 (calculated values) and 13978 (formulas) example a formula calculation using the replicated data 13956 (cells). With those replicated cells using the originally created bucket/group values 13952 and their related data as exampled in the illustrative automatic calculations done in FIG. 140A through FIG. 140E. Whether the calculations use the original cell values or the replicated bucket cell values makes no difference in our technology to the outcome of the calculations.

A related embodiment supports use of our bucket/group values and their associated data in cell formulas employing range/array functions as exampled in FIG. 49A through FIG. 50G. The breadth of range or array function supported includes those functions exampled in FIG. 167. A related embodiment supports the use of a broad spectrum of non-range/array functions working as exampled in FIG. 73A through FIG. 79C and as exampled in those same figures supports a combination of range/array functions, non-range/array functions and algebraic operators in complex analytics and copy paste replication of the complex analytics. These analytics involve usage of functions in each of the Microsoft Excel compatibility, engineering, financial, math and trigonometry, statistical, and even text families of prebuilt functions. With a substantial number (greater than 100) being non-range/array functions all of which could not be used in PivotTables or Power Pivot PivotTables and certainly not usable in any normal spreadsheet cell calculation using buckets/groupings and their associated data.

Bucketing Function Implementations—Copy Paste

Figure 55A:
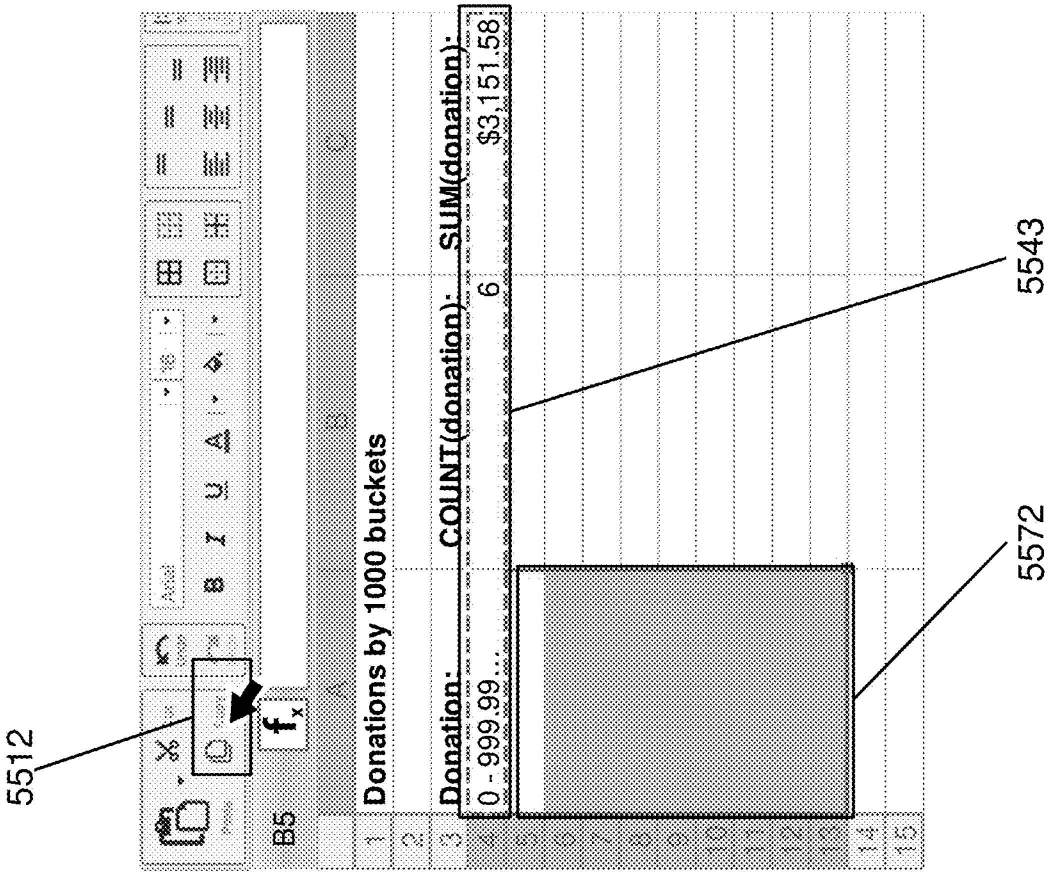
Figure 55B:
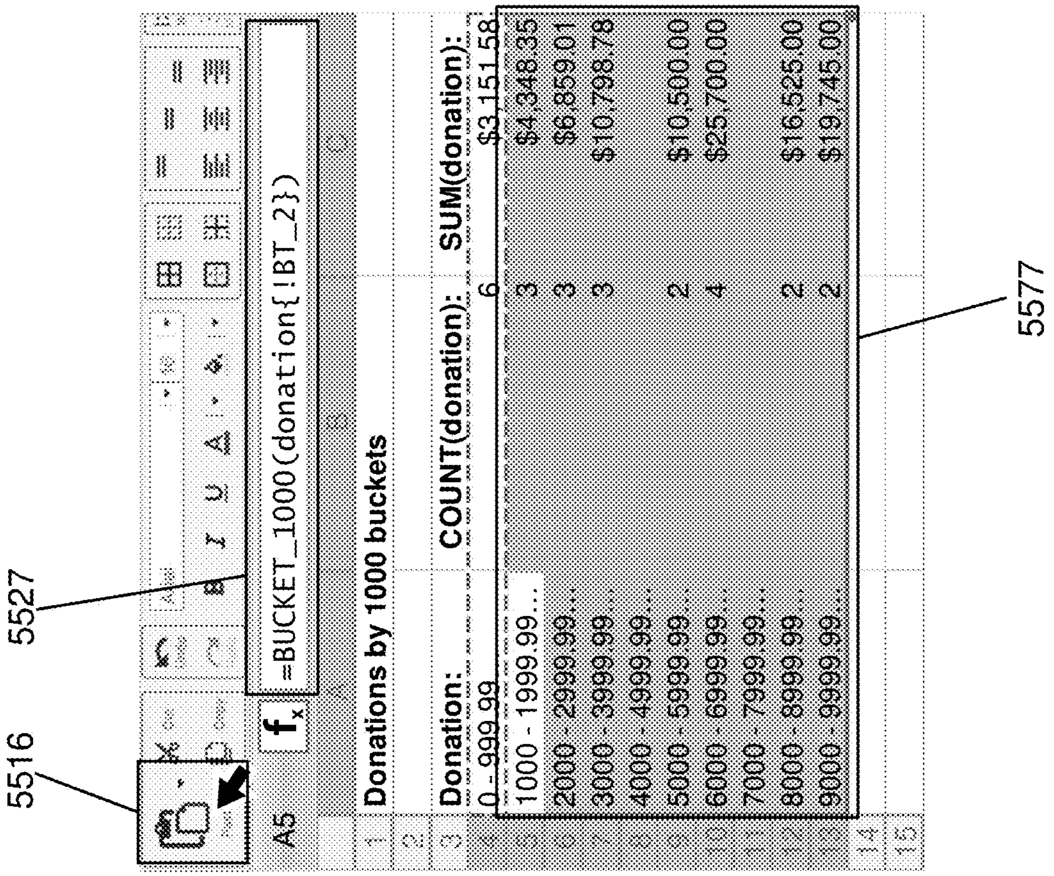

Another embodiment of our bucket function technology supports bucket incremental progression copy paste when used as a cell formula or used in a cell formula. FIG. 38A through FIG. 39E examples the copy paste bucket progression (with no bucket filling) of a single value bucket function populated cell to ten paste cells. FIG. 55A and FIG. 55B example the copy paste bucket progression (with filling) done as part of a broader copy paste of a bucket function populated cell and two cells referencing the bucket function formula cell. FIG. 180A and FIG. 180B examples our bucket function technology supporting bucket incremental progression copy paste when used in an argument of a (another) function in a cell formula.

Another embodiment of our bucket function technology supports bucket incremental progression flex copy paste when used as a cell formula or used as an argument in a cell formula. FIG. 40A and FIG. 40B examples the flex copy paste bucket progression (with no bucket filling) of a single value bucket function. FIG. 57A and FIG. 57B examples the flex copy paste bucket progression (with filling) done as part of a broader flex copy paste of a bucket function populated cell and two cells referencing the bucket function formula cell. FIG. 58A through FIG. 60D examples our bucket function technology supporting bucket incremental progression flex copy paste when used in a cell formula.

Bucketing Function Implementations—Bucket Replication in Functional Formulas

In another embodiment of our bucket function technology supports incremental bucket replication by a function (e.g., WRITEs) using our bucket function in an argument. FIG. 80A through FIG. 83D examples this for a 'WRITE_CALC_V' function using a 'BUCKET_10' in one of its arguments. Where our multi-cell populating functions replicate the bucket function buckets the way they would otherwise replicate a field in that argument.

Bucketing Function Implementations—Other Implementations

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above. We will now shift our discussion of particular embodiments to our bucket/grouping technology added as an optional capability to our existing and future functions (i.e., functions not dedicated to bucketing/grouping).

Bucketing/Grouping Capability Added to Function Implementations

One implementation is a method for adding bucketing/grouping of data as an optional capability to predefined (built-in) spreadsheet functions. The new capability adds to a predefined (built-in) spreadsheet function an optional capability creating one or more bucket values. FIG. 142A through FIG. 148D examples a 'DROPDOWN' function using an optional bucketing/grouping specification for populating a button selectable value (with this specification a bucket) in one cell. FIG. 106A through FIG. 113B examples a 'WRITE_CALC_2D' function using optional bucketing/grouping specifications to populate multiple cells with bucket values and multiple cells with calculated values using those bucket values and their associated data. The function works as it previously did except now with the added capability of creating buckets for one or more of its argument inputs. The embodiment includes specifying one or more option of the predefined (built-in) spreadsheet function that creates a plurality of value range buckets exampled in 11148 in FIG. 111F. Where the value range buckets have a starting 11176 and ending point 11178 and boundaries between those value range buckets defined by an increment exampled in FIG. 107E 10772. Where the associated data in at least one value range bucket holds multiple unique values as in FIG. 111F 11187 ('52', '53', '54' and '56') with an overall result in populating at least one value range bucket and its associated data into a spreadsheet cell as exampled in FIG. 110 11073. Where the associated data for each bucket is all the data associated with those bucket values as exampled for the '50 to 59' bucket 11187 by the associated data 11153 in FIG. 111A.

Bucketing Optional Specification Implementations—Visible Arguments

Figure 146B:
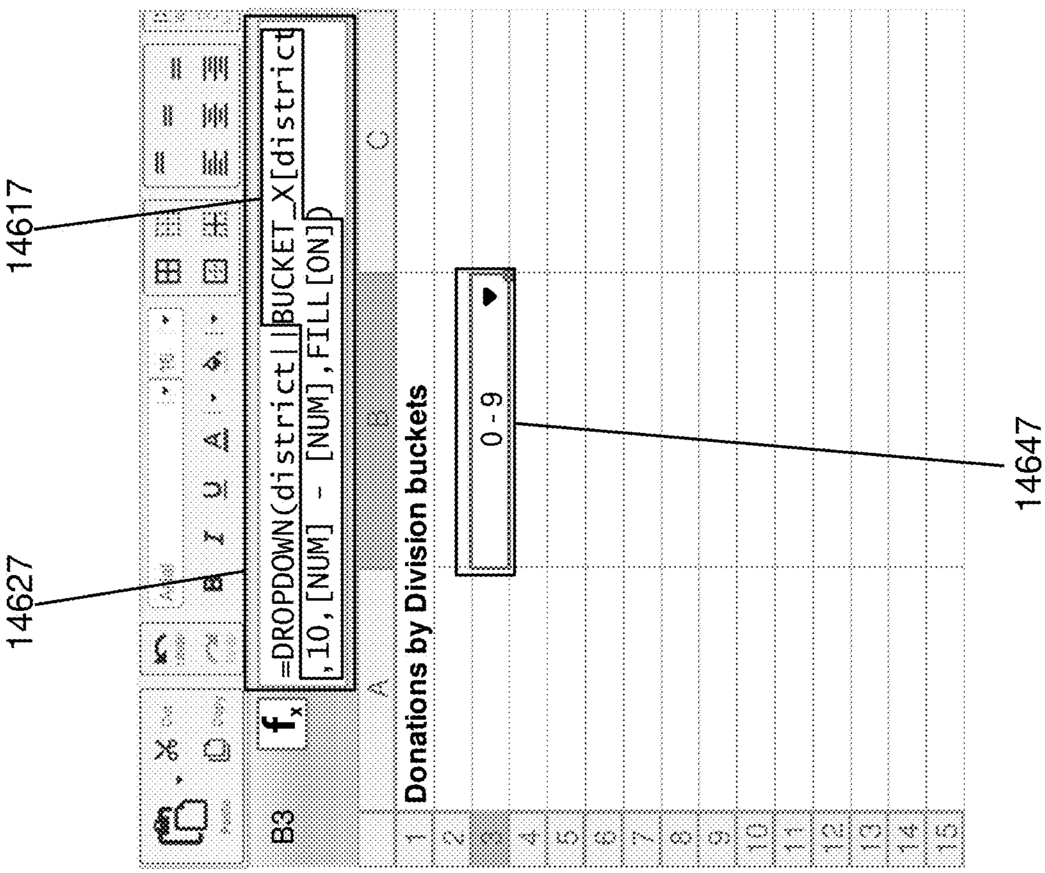

In another embodiment of our technology the optional specification of bucket/grouping capability appears as a text argument in the functional formula as exampled in FIG. 115B where the 'WRITE_CALC_2D' formula 11527 contains two bucketing/grouping arguments 11537 in the three option arguments 11598 exampled in FIG. 115D. FIG. 146B examples another function, 'DROPDOWN', employing the bucketing/grouping option with the argument visible 14617 in the formula 14627 as contrasted with FIG. 146A giving the exact same result with no visible bucketing/grouping argument in its formula 14624.

Bucketing Optional Specification Implementations—Invisible Arguments

Figure 146A:
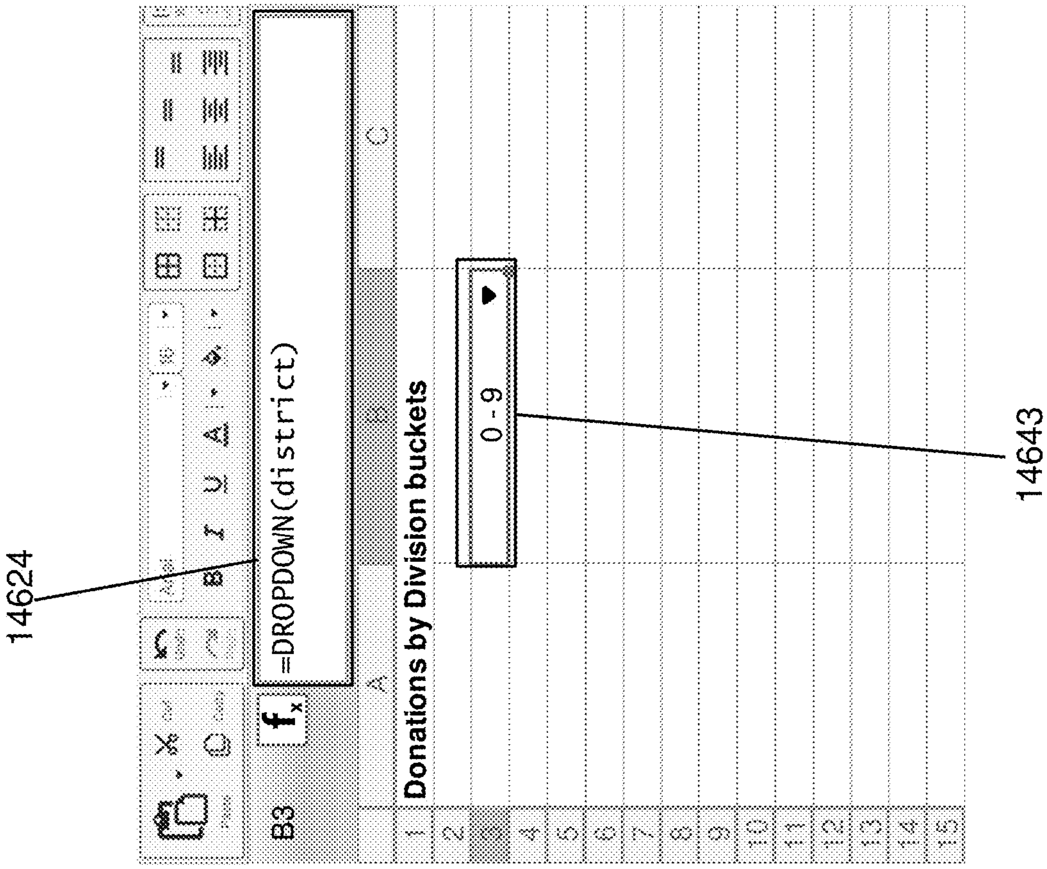

In another embodiment of our technology the optional specification of bucket/grouping capability does not appear as a text argument in the functional formula as exampled in FIG. 115A where the 'WRITE_CALC_2D' formula 11524 contains no bucketing/grouping arguments. Instead, the bucketing/grouping arguments are visible in a selector list panels such as those exampled in FIG. 106A through FIG. 109E giving the result in FIG. 110. FIG. 146A examples another function, 'DROPDOWN', employing the bucketing/grouping option with the argument invisible in the formula 14624 as contrasted with FIG. 146B giving the exact same result with a visible bucketing/grouping argument 14617 in its formula 14627. Once the user has set the optional bucketing/grouping with invisible arguments the user can then reopen the option selection list panel(s) to see the settings and make any desired changes.

Bucketing Optional Specification Implementations—Multiple Cell Population

In another embodiment of our technology the optional bucket/group capability in the built-in function populates multiple adjoining cells each with a bucket/group value and its associated data where the bucket value increment defines the boundaries between the value range buckets as exampled in FIG. 168B through FIG. 171C. That functional capability can also populate multiple bucket/group cells and cells using those buckets/groups and their associated data in calculations as exampled in FIG. 119A through FIG. 124C for a WRITE_CALC_V function and exampled in FIG. 106A through FIG. 113B for a WRITE_CALC_2D function.

Bucketing Optional Specification Implementations—Single Cell Single-Value and Multi-Value Selecting Functions In another embodiment our bucketing/grouping optional specification can be employed by our single cell multi-values selecting functions (e.g., DROPDOWN, DROPDOWN_MANY), subject of our filing U.S. application Ser. No. 17/359,418. FIG. 142A through FIG. 148D examples our bucketing optional specification utilized in our DROPDOWN function (an example of a single cell single-value selecting function) which then populates a single selected bucket into a cell. That embodiment then supports usage of those buckets (values and associated data) in other cell formulas as exampled in FIG. 152A through FIG. 153E. In a related embodiment our bucketing optional specification is added to our DROPDOWN_MANY function (an example of a single cell multi-value selecting function) which then populates multiple buckets within a single cell as exampled in FIG. 154A and FIG. 156B. That embodiment then supports usage of those buckets in other cell formulas as exampled in FIG. 158A through FIG. 159H allowing users to select multiple buckets into a cell and then use those buckets and their associated data in calculations by other cells referencing that cell.

Bucketing Optional Specification Implementations—Data Sources

The data source applicability discussed in this section applies to all the preceding and following embodiments. All the embodiments of our bucketing/grouping options added to prebuilt functions supports formulaic data as exampled in FIG. 36A through FIG. 36C. That data can be sourced from our non-spreadsheet cell (NSC) externally sourced data described in our previously cited filings and exampled in FIG. 36C. That formulaic data can be sourced from spreadsheet cells as described in our previously cited filings and exampled in FIG. 36B. And that data can be sourced from any combinations of the data sources when appropriately matched or joined together as example in our previous filings using data from different data tables.

Bucketing Optional Specification Implementations—Additional Bucketing Related Capabilities The additional bucketing related capability embodiments discussed next apply to all the preceding bucketing optional specification function embodiments.

Our technology bucketing optional specification addition to prebuilt spreadsheet functions works for the different data types as exampled in FIG. 108D 10868 for time/date data. FIG. 108E 10883 examples our spreadsheet optional specification bucket technology uniquely supporting weekly increments for bucket function buckets. FIG. 154A through FIG. 155F example an embodiment where our spreadsheet function optional specification bucketing technology supports weekly buckets for population into a single cell.

Our spreadsheet function bucket optional specification technology works for numerical data as exampled in FIG. 111F. Where an implementation of our technology for the numerical data type has an automatically generated start value which is the closest number equal or lower than the lowest data value for the specified field which when divided by the increment value yields an integer as exampled in FIG. 111D 11176. Thereby ensuring the automatically specified bucket ranges have more typical round number bucketing breaks like '0 to 9' rather than '3 to 12' or '1000 to 1999.99 . . . ' rather than '1023 to 2022.99 . . . '.

In another embodiment our spreadsheet function bucket optional specification technology automatically sets the numeric bucket ranges to distinguish data fields which are integer from those that are real. Where the integer bucket ranges are integers as exampled in FIG. 111F 11148 and the real bucket data fields have at least one real value as previously exampled. In a related embodiment for the numeric data fields our technology automatically sets the bucket ranges so there is no ambiguity as to where values fall, i.e., no overlapping values ranges. FIG. 111F examples this for integer values with the '0-9' not overlapping with the '10-19' next bucket and so on (not buckets like '0-10', '10-20' and so on).

Another implementation of our spreadsheet function bucket optional specification technology supports text buckets/groups as exampled in FIG. 119A through FIG. 124C. Where the increment can be by first characters, sets of characters or other text combinations (e.g., charities and other entities often have id numbers where the first x characters are geographic or other designations) as exampled in FIG. 123D for the first letter of the field values.

In another embodiment the bucket/group range value labels can be changed by the user via a selection as exampled in FIG. 108B 10839 vs. FIG. 108A 10834 or can be custom created by the user for usage and replicated by our technology as previously exampled in FIG. 47A through FIG. 47C. Thus, offering users the optional specification to tailor the presentation of the bucket range values.

In another embodiment our technology supports the automatic filling of a missing bucket increment or multiple missing increments as exampled in FIG. 111F with buckets '10-19' 11148 and '30-39' 11158. Thereby easily allowing consistent comparison across similar situations with different buckets missing data.

In another embodiment of our technology our bucketing/grouping optional specification can use the spreadsheet function's capability to constrain (filter) the data in the determination of the buckets as exampled in FIG. 114A through FIG. 118D and most particularly in the steps illustratively exampled in FIG. 116B and FIG. 116C. FIG. 154A through FIG. 155F examples this capability working in a single cell multi-value selecting function 'DROPDOWN_MANY'.

Another embodiment of our spreadsheet function bucket optional specification technology utilizes our bucket values and their associated data in formulas by another cell or multiple cells. FIG. 137A 13766, FIG. 137B, FIG. 138A, and FIG. 138B, examples a cell formula calculation referencing a spreadsheet function optional specification populated bucket/group value and its associated data. These optional specification populated bucket values and their associated data are usable by formula like other formulaic data fields.

Another embodiment of our spreadsheet function bucket optional specification technology replicates our bucket values and their associated data into another cell for formulaic use as if it were the original cell. FIG. 137A and FIG. 137D examples the replication in cell 'F4' 13756 (see formula 13758 in FIG. 137D) of an optional specification generated bucket value in cell 'B4' 13753. Then in a related embodiment the replicated value and its associated data can be used in a formulaic calculation as if it were the original optional specification populated value and associated data as exampled in FIG. 137A 13766, FIG. 137C 13729, FIG. 138C, and FIG. 138D. These optional specification populated bucket values with their associated data and their replicates are usable by formulas like other formulaic data fields.

Another embodiment of our spreadsheet function bucket optional specification technology supports use of our bucket/group values and their associated data in cell formulas employing range/array functions as exampled in FIG. 137A 13776 and FIG. 137E as well as FIG. 137A 13766, FIG. 137B, FIG. 138A, and FIG. 138B. The breadth of range or array function supported includes those exampled in FIG. 167. A related embodiment of our spreadsheet function bucket optional specification technology supports the use of a broad spectrum of non-range/array functions working as previously exampled in FIG. 73A through FIG. 79C and as exampled in those same figures supporting a combination of range/array functions, non-range/array functions and algebraic operators in complex analytics and replication of the complex analytics. These analytics involve usage of functions in each of the Microsoft Excel compatibility, engineering, financial, math and trigonometry, statistical, and even text families of prebuilt functions. With a substantial number (greater than 100) being non-range/array functions all of which could not be used in PivotTables or Power Pivot PivotTables and certainly not usable in any normal spreadsheet cell calculation using buckets/groupings and their associated data.

Bucketing Optional Specification Implementations—Other Implementations

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

CLAUSES

1. A method for determining and populating at least one value range bucket and associated data into at least one spreadsheet cell or spreadsheet cell formula using a bucket spreadsheet function, including:
   - responsive to a specification of the bucket spreadsheet function, creating at least one value range bucket, among a plurality of range buckets, wherein the associated data in the value range bucket holds multiple unique values in a range of retrieved values, wherein the range has a starting and an ending point (=upper and lower bounds) and a bucket value increment that defines boundaries between the value range buckets;
   - populating the at least one value range bucket and the associated data into a regular spreadsheet cell or spreadsheet cell formula.
2. The method of clause 1, wherein the regular spreadsheet cell can be used in calculations, with its associated data.
3. The method of clause 1, further including:
   - populating each of a plurality of adjoining spreadsheet cells using a bucket spreadsheet function with at least one value range bucket and associated data;
   - wherein a bucket value increment defines boundaries between value range buckets.
4. The method of clause 1, further including:
   - populating at least one spreadsheet cell using the bucket spreadsheet function with a plurality of value range buckets and associated data.
5. The method of clause 1, further including using the bucket spreadsheet function to specify input to a spreadsheet range or array function.
6. The method of clause 1, further including using the bucket spreadsheet function to specify input to a multicell populating function.
7. The method of clause 1, further including using the bucket spreadsheet function to specify input to a user interface picklist function in a cell.
8. The method of clause 7, where the user interface picklist function in a cell uses the bucket spreadsheet function to specify multiple buckets as input and output in the cell.
9. The method of clause 1, wherein the cell predefined spreadsheet function employs formulaic data.

10. The method of clause 9, wherein the formulaic data is sourced from non-spreadsheet cell externally sourced data.

11. The method of clause 9, wherein the formulaic data is sourced from spreadsheet cells.

12. The method of clause 1, wherein a buckets are created for time/date data types.

13. The method of clause 12, wherein a bucket increment specification of week is available for selection and successful use.

14. The method of clause 1, wherein the automatically generated integer/real data type starting point is the closest number below or equal to the first data point which when divided by the increment value yields an integer.

15. The method of clause 1, wherein the bucket values matches the integer or real data type of the data specified for bucketing in that integer data has only integer bucket values and real data has at least one bucket value as real.

16. The method of clause 15, wherein the ending bucket value eliminates ambiguity over where values fall by eliminating overlapping buckets.

17. The method of clause 1, wherein buckets are created for text data types.

18. The method of clause 17, wherein bucket increment applies to a first character of text data.

19. The method of clause 1, wherein the value range buckets include at least one placeholder bucket that is empty and available to receive an added unique value.

20. The method of clause 1, wherein missing bucket increment(s) are automatically filled.

21. The method of clause 1, wherein the bucketing function has the capability to filter the data used in the determination of the buckets.

22. The method of clause 1, wherein the bucketing function used as an argument in another function uses the filtering of the data by the function in the determination of the buckets.

23. The method of clause 1, further including using the bucket range value and its associated data as input to another cell or cells in formula calculation(s).

24. The method of clause 1, further including using the bucket range value and its associated data as input to another cell or cells to replicate the bucket value and its associated data.

25. The method of clause 1, further including using the bucket range value and its associated data as input indirectly through another cell or cells in formula calculation(s).

26. The method of clause 23, wherein the formula calculation(s) that use the bucket range value and its associated data are spreadsheet range or array functions.

27. The method of clause 23, wherein the formula calculation(s) that use the bucket range value and its associated data are non-range/array functions.

28. The method of clause 23, wherein the formula calculations that use the bucket range value and its associated data are a combination range/array functions, non-range/array functions and algebraic operators.

29. The method of clause 1, wherein the bucket function applies bucket incremental progression copy paste when used as a cell formula or used in cell formula.

30. The method of clause 29, wherein the copy paste is flex copy paste.

31. The method of clause 1, wherein the spreadsheet bucket function usage in an argument of a multicell populating function or in an argument of picklist function supports incremental bucket replication by that function.

32. A non-transitory computer readable memory, the memory impressed with computer instructions that, when executed on hardware, cause the hardware to carry out the method of any of clauses 1-31.

33. A system including processing hardware coupled to memory, the memory impressed with computer instructions that, when executed, cause the hardware to carry out the method of any of clauses 1-31.

34. A method for determining and populating at least one value range bucket and associated data into at least one spreadsheet cell using a spreadsheet function with a specification that defines the value range bucket and its associated data, including:

- responsive to specification of the spreadsheet function, creating a plurality of value range buckets,
- wherein the associated data in at least one of the value range buckets holds multiple unique values in an increment of retrieved values,
- the associated data in the plurality of value range buckets has a starting and an ending point and boundaries between value range buckets are defined by an increment;
- populating at least one value range bucket and associated data into a spreadsheet cell.

35. The method of clause 34, wherein specification of the spreadsheet function includes specification of a bucket function as an argument that appears as text in the spreadsheet function, wherein the bucket function defines the plurality of value range buckets.

36. The method of clause 34, further including:

- responsive to a first signal from a user invoking a selection list panel, causing display of the selection list panel that includes arguments for defining the plurality of value range buckets; and
- receiving at least one second signal from the user selecting at least one argument option defining the plurality of value range buckets;
- wherein the definition of the plurality of value range buckets is visible in the selection list panel and not reproduced as text in an argument of the spreadsheet function in the spreadsheet cell.

37. The method of clause 34, further including:

- populating each of a plurality of adjoining spreadsheet cells using the spreadsheet function and its specifications with at least one value range bucket and associated data;
- wherein a bucket value increment defines boundaries between value range buckets.

38. The method of clause 34 further including:

- populating at least one spreadsheet cell using the spreadsheet function and its specifications with a plurality of value range buckets and associated data.

39. The method of clause 34, wherein the cell function employing the bucket specification is one of our multicell populating functions.

40. The method of clause 34, wherein the bucketing function can be used in our single cell multi-value selecting functions.

41. The method of clause 34, wherein the function employed can populate multiple buckets within a single cell.

42. The method of clause 34, wherein the cell predefined spreadsheet function employs formulaic data.

43. The method of clause 42, wherein the formulaic data is sourced from non-spreadsheet cell externally sourced data.

44. The method of clause 42, wherein the formulaic data is sourced from spreadsheet cells.

45. The method of clause 34, wherein buckets are created for time/date data types, 46. The method of clause 45, wherein a bucket increment specification of week is available for selection and successful use.

47. The method of clause 34, wherein the automatically generated integer/real data type starting point is the closest number below or equal to the first data point which when divided by the increment value yields an integer.

48. The method of clause 34, wherein the bucket values matches the integer or real data type of the data specified for bucketing in that integer data has only integer bucket values and real data has at least one bucket value as real.

49. The method of clause 48, wherein the ending bucket value eliminates ambiguity over where values fall by eliminating overlapping buckets.

50. The method of clause 34, wherein buckets are created for text data types.

51. The method of clause 50, wherein bucket increment is the first character of the value.

52. The method of clause 34, wherein value increment bucket labels can be changed by users.

53. The method of clause 34, wherein missing bucket increment is automatically filled.

54. The method of clause 34, wherein the bucketing specification utilizes the function's capability to filter the data used in the determination of the value range buckets.

55. The method of clause 34, further including using the bucket range value and its associated data as input to another cell or cells in a formula calculation.

56. The method of clause 34, further including replicating the bucket range value and its associated data as input to another cell or cells.

57. The method of clause 56, further including using the replicated bucket range value and its associated data in formula calculation as if it were the pre-replication bucket range value and associated data.

58. The method of clause 55, wherein the formula calculation that uses the bucket range value and its associated data is a spreadsheet range or array functions.

59. The method of clause 55, wherein the formula calculation that uses the bucket range value and its associated data contains a non-range/array function.

60. The method of clause 55, wherein the formula calculation that uses the bucket range value and its associated data are a combination of range/array functions, non-range/array functions and algebraic operators.

61. A non-transitory computer readable memory, the memory impressed with computer instructions that, when executed on hardware, cause the hardware to carry out the method of any of clauses 34-60.

62. A system including processing hardware coupled to memory, the memory impressed with computer instructions that, when executed, cause the hardware to carry out the method of any of clauses 34-60.

We claim:

1. A method for determining and populating at least one value range bin from rows of data into at least one spreadsheet cell or a spreadsheet cell formula that references a prebuilt bucket spreadsheet function supplied by the spreadsheet and having a name and arguments, including:

responsive to a specification of the prebuilt bucket spreadsheet function:

the prebuilt bucket spreadsheet function receives data from a multi-row table of data that has at least a first column and creates the value range bin to hold multiple data values from the first column of the multi-row table of data;

the value range bin has lower and upper bounds; and a bin increment defines boundaries between successive value range bins; and creating a plurality of value range bins based on the data from the first column;

populating the at least one value range bin with multiple values between the lower and upper bounds from the rows of data and inserting the multiple values into a regular spreadsheet cell, wherein the multiple values become available for use in calculations; and causing display of the regular spreadsheet cell with a label that expresses the lower and upper bounds.

2. The method of claim 1, wherein the prebuilt spreadsheet function has the name followed by an opening parenthesis followed by the arguments, in a particular order, and followed by a closing parenthesis, and is used in a spreadsheet formula to generate a data manipulation or analysis result.

3. The method of claim 1, wherein the table of data includes additional columns, presence of values from the first column in the range value bin makes values in the additional columns of corresponding rows in which the values are present are available for use in calculations.

4. The method of claim 1, further including:

filling multiple adjoining spreadsheet cells in a sequence with successive value range bins.

5. The method of claim 1, further including:

populating the at least one spreadsheet cell using the prebuilt bucket spreadsheet function with a plurality of value range bins.

6. The method of claim 1, further including:

populating the at least one spreadsheet cell using the prebuilt bucket spreadsheet function with a plurality of value range bins; and receiving a user selection of one or more individual value ranges bins from the plurality of value range bins in the spreadsheet cell for use in calculations.

7. The method of claim 1, wherein the multi-row table of data is sourced from non-spreadsheet cell externally sourced data.

8. The method of claim 1, wherein the multi-row table of data is sourced from spreadsheet cells.

9. The method of claim 1, further including referencing the value range bin specified by the prebuilt bucket spreadsheet function in the regular spreadsheet cell from a spreadsheet range or array function in a second cell.

10. The method of claim 1, wherein the first column contains dates and the bin increment is a week or 7 days.

11. The method of claim 1, wherein the lower bounds of the plurality of value range bins are automatically generated integer multiples of the bin increment.

12. The method of claim 1, wherein the upper bounds of the plurality of value range bins are automatically generated integer multiples of the bin increment.

13. The method of claim 1, wherein the first column contains text data and the bin increment is one or more ascending letters.

14. The method of claim 1, wherein users can assign custom labels to the plurality of value range bins to replace the labels that express the lower and upper bounds.

15. The method of claim 1, wherein the prebuilt bucket spreadsheet function further accepts a constraint that filters the rows used to populate the plurality of value range bins.

16. The method of claim 1, wherein pasting the prebuilt bucket spreadsheet function formula into multiple adjoining cells fills the multiple adjoining cells with successive bins separated by the bin increment.

17. The method of claim 16, wherein the pasting is a flex copy paste that automatically pastes all rows of the multiple bins into adjoining cells.

18. A tangible computer readable storage media loaded with instructions that, when combined with a hardware device, configures the hardware device to carry out a method for determining and populating at least one value range bin from rows of data into at least one spreadsheet cell or a spreadsheet cell formula that references a prebuilt bucket spreadsheet function supplied by the spreadsheet and having a name and arguments, including:

responsive to a specification of the prebuilt bucket spreadsheet function:

the prebuilt bucket spreadsheet function receives data from a multi-row table of data that has at least a first column and creates the value range bin to hold multiple data values from the first column of the multi-row table of data;

the value range bin has lower and upper bounds; and a bin increment defines boundaries between successive value range bins; and creating a plurality of value range bins based on the data from the first column;

populating the at least one value range bin with multiple values between the lower and upper bounds from the rows of data and inserting the multiple values into a regular spreadsheet cell, wherein the multiple values become available for use in calculations; and causing display of the regular spreadsheet cell with a label that expresses the lower and upper bounds.

19. The tangible computer readable storage media of claim 18, wherein the table of data includes additional columns, presence of values from the first column in the range value bin makes values in the additional columns of corresponding rows in which the values are present are available for use in calculations.

20. The tangible computer readable storage media of claim 18, further including:

filling multiple adjoining spreadsheet cells in a sequence with successive value range bins.

21. The tangible computer readable storage media of claim 18, further including:

populating the at least one spreadsheet cell using the prebuilt bucket spreadsheet function with a plurality of value range bins.

22. The tangible computer readable storage media of claim 18, further including:

populating the at least one spreadsheet cell using the prebuilt bucket spreadsheet function with a plurality of value range bins; and receiving a user selection of one or more individual value ranges bins from the plurality of value range bins in the spreadsheet cell for use in calculations.

23. The tangible computer readable storage media of claim 18, wherein the multi-row table of data is sourced from non-spreadsheet cell externally sourced data.

24. The tangible computer readable storage media of claim 18, wherein the multi-row table of data is sourced from spreadsheet cells.

25. The tangible computer readable storage media of claim 18, further including referencing the value range bin specified by the prebuilt bucket spreadsheet function in the regular spreadsheet cell from a spreadsheet range or array function in a second cell.

26. A device including a processor and memory, the memory loaded with instructions that, when executed, cause the processor to carry out a method for determining and populating at least one value range bin from rows of data into at least one spreadsheet cell or a spreadsheet cell formula that references a prebuilt bucket spreadsheet function supplied by the spreadsheet and having a name and arguments, including:

responsive to a specification of the prebuilt bucket spreadsheet function:

the prebuilt bucket spreadsheet function receives data from a multi-row table of data that has at least a first column and creates the value range bin to hold multiple data values from the first column of the multi-row table of data;

the value range bin has lower and upper bounds; and a bin increment defines boundaries between successive value range bins; and creating a plurality of value range bins based on the data from the first column;

populating the at least one value range bin with multiple values between the lower and upper bounds from the rows of data and inserting the multiple values into a regular spreadsheet cell, wherein the multiple values become available for use in calculations; and causing display of the regular spreadsheet cell with a label that expresses the lower and upper bounds.

27. The device including memory loaded with instructions of claim 26, wherein the table of data includes additional columns, presence of values from the first column in the range value bin makes values in the additional columns of corresponding rows in which the values are present are available for use in calculations.

28. The device including memory loaded with instructions of claim 26, further including:

filling multiple adjoining spreadsheet cells in a sequence with successive value range bins.

29. The device including memory loaded with instructions of claim 26, further including:

populating the at least one spreadsheet cell using the prebuilt bucket spreadsheet function with a plurality of value range bins.

30. The device including memory loaded with instructions of claim 26, further including:

populating the at least one spreadsheet cell using the prebuilt bucket spreadsheet function with a plurality of value range bins; and receiving a user selection of one or more individual value ranges bins from the plurality of value range bins in the spreadsheet cell for use in calculations.

31. The device including memory loaded with instructions of claim 26, wherein the multi-row table of data is sourced from non-spreadsheet cell externally sourced data.

32. The device including memory loaded with instructions of claim 26, wherein the multi-row table of data is sourced from spreadsheet cells.

33. The device including memory loaded with instructions of claim 26, further including referencing the value range bin specified by the prebuilt bucket spreadsheet function in the regular spreadsheet cell from a spreadsheet range or array function in a second cell.

* * * * *